US012445736B2

(12) United States Patent
Rivard et al.

(10) Patent No.: US 12,445,736 B2
(45) **Date of Patent: *Oct. 14, 2025**

(54) SYSTEMS AND METHODS FOR GENERATING A DIGITAL IMAGE

(71) Applicant: Duelight LLC, Sunnyvale, CA (US)

(72) Inventors: William Rivard, Menlo Park, CA (US); Adam Feder, Mountain View, CA (US); Brian Kindle, Sunnyvale, CA (US)

(73) Assignee: DUELIGHT LLC, Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/932,436

(22) Filed: Oct. 30, 2024

(65) Prior Publication Data

US 2025/0071430 A1 Feb. 27, 2025

Related U.S. Application Data

(63) Continuation-in-part of application No. 18/646,581, filed on Apr. 25, 2024, which is a continuation of (Continued)

(51) Int. Cl.
*H04N 23/741* (2023.01)
*G06T 5/50* (2006.01)
(Continued)

(52) U.S. Cl.
CPC ............. *H04N 23/741* (2023.01); *G06T 5/50* (2013.01); *H04N 23/6811* (2023.01); (Continued)

(58) Field of Classification Search
CPC .. H04N 23/741; H04N 23/6811; H04N 23/72; H04N 23/76; G06T 5/50; G06T 2207/20208; G06T 2207/20221
See application file for complete search history.

(56) References Cited

U.S. PATENT DOCUMENTS 4,057,809 A 11/1977 Nakamoto et al.
4,091,374 A 5/1978 Muller et al.
(Continued)

FOREIGN PATENT DOCUMENTS

CN 101290388 A 10/2008
CN 101408709 A 4/2009
(Continued)

OTHER PUBLICATIONS

Rivard et al., U.S. Appl. No. 15/643,311, filed Jul. 6, 2017.
(Continued)

*Primary Examiner* — Kelly L Jerabek
(74) *Attorney, Agent, or Firm* — Zilka-Kotab, P.C.

(57) ABSTRACT

A system, method, and computer program product for generating a digital image is disclosed. In use, a first image and a second image are received from a first image sensor, where the first image sensor detects wavelengths of a visible spectrum. A third image and a fourth image are received from a second image sensor, where the second image sensor detects wavelengths of a non-visible spectrum. Using an image processing subsystem, a resulting image is generated by combining one of the first image or the second image, with one of the third image or the fourth image.

286 Claims, 75 Drawing Sheets

Related U.S. Application Data application No. 17/321,166, filed on May 14, 2021, now Pat. No. 12,003,864, which is a continuation of application No. 16/857,016, filed on Apr. 23, 2020, now Pat. No. 11,025,831, which is a continuation of application No. 16/519,244, filed on Jul. 23, 2019, now Pat. No. 10,652,478, which is a continuation of application No. 15/891,251, filed on Feb. 7, 2018, now Pat. No. 10,382,702, which is a continuation of application No. 14/823,993, filed on Aug. 11, 2015, now Pat. No. 9,918,017, which is a continuation-in-part of application No. 14/702,549, filed on May 1, 2015, now Pat. No. 9,531,961.

(51) Int. Cl.
*H04N 23/68* (2023.01)
*H04N 23/72* (2023.01)
*H04N 23/76* (2023.01)

(52) U.S. Cl.
CPC ............ *H04N 23/72* (2023.01); *H04N 23/76* (2023.01); *G06T 2207/20208* (2013.01); *G06T 2207/20221* (2013.01)

(56) References Cited

U.S. PATENT DOCUMENTS 4,371,928 A 2/1983 Barlow et al.
4,425,031 A 1/1984 Tamura et al.
4,470,676 A 9/1984 Kinoshita et al.
4,638,365 A 1/1987 Kato
4,712,136 A 12/1987 Tsunekawa et al.
4,720,723 A 1/1988 Harunari et al.
4,734,762 A 3/1988 Aoki et al.
4,811,086 A 3/1989 Hieda
4,821,099 A 4/1989 Sakamoto
4,832,518 A 5/1989 Moriyama
4,873,561 A 10/1989 Wen
4,884,972 A 12/1989 Gasper
4,980,773 A 12/1990 Suda et al.
5,101,253 A 3/1992 Mizutani et al.
5,109,236 A 4/1992 Watanabe et al.
5,115,124 A 5/1992 Muto et al.
5,126,777 A 6/1992 Akashi et al.
5,132,783 A 7/1992 Hieda
5,146,316 A 9/1992 Suzuki
5,151,796 A 9/1992 Ito et al.
5,175,615 A 12/1992 Ohara
5,185,668 A 2/1993 Ohta
5,200,828 A 4/1993 Jang et al.
5,262,870 A 11/1993 Nakamura et al.
5,282,024 A 1/1994 Takei
5,291,151 A 3/1994 Fujiwara et al.
5,317,406 A 5/1994 Kobayashi et al.
5,321,528 A 6/1994 Nakamura
5,355,234 A 10/1994 Kim
5,363,209 A 11/1994 Eschbach et al.
5,384,904 A 1/1995 Sprague et al.
5,477,070 A 12/1995 Nam
5,553,864 A 9/1996 Sitrick
5,559,770 A 9/1996 Hiroki et al.
5,572,633 A 11/1996 Lo et al.
5,579,530 A 11/1996 Solomon et al.
5,633,677 A 5/1997 Okino et al.
5,650,818 A 7/1997 Takano
5,689,437 A 11/1997 Nakagawa
5,698,844 A 12/1997 Shinohara et al.
5,699,108 A 12/1997 Katayama et al.
5,726,670 A 3/1998 Tabata et al.
5,734,760 A 3/1998 Yoshida
5,737,547 A 4/1998 Zuravleff et al.
5,754,705 A 5/1998 Okino
5,757,369 A 5/1998 Ohsawa et al.
5,764,246 A 6/1998 Wataya et al.
5,784,569 A 7/1998 Miller et al.
5,790,234 A 8/1998 Matsuyama
5,790,692 A 8/1998 Price et al.
5,812,799 A 9/1998 Zuravleff et al.
5,818,977 A 10/1998 Tansley
5,835,639 A 11/1998 Honsinger et al.
5,838,463 A 11/1998 Gahang
5,859,712 A 1/1999 Kim
5,859,921 A 1/1999 Suzuki
5,867,215 A 2/1999 Kaplan
5,867,735 A 2/1999 Zuravleff et al.
5,872,867 A 2/1999 Bergen
5,877,715 A 3/1999 Gowda et al.
5,889,956 A 3/1999 Hauser et al.
5,900,909 A 5/1999 Parulski et al.
5,909,594 A 6/1999 Ross et al.
5,917,494 A 6/1999 Arai et al.
5,949,916 A 9/1999 Chun
5,983,261 A 11/1999 Riddle
5,986,668 A 11/1999 Szeliski et al.
5,987,164 A 11/1999 Szeliski et al.
5,987,186 A 11/1999 Oida et al.
6,018,599 A 1/2000 Kawai
6,026,188 A 2/2000 Dionysian
6,038,074 A 3/2000 Kitaguchi et al.
6,038,333 A 3/2000 Wang
6,041,351 A 3/2000 Kho
6,055,326 A 4/2000 Chang et al.
6,061,696 A 5/2000 Lee et al.
6,085,241 A 7/2000 Otis
6,092,137 A 7/2000 Huang et al.
6,115,025 A 9/2000 Buxton et al.
6,115,065 A 9/2000 Yadid-Pecht et al.
6,115,717 A 9/2000 Mehrotra et al.
6,137,468 A 10/2000 Martinez et al.
6,148,092 A 11/2000 Qian
6,184,516 B1 2/2001 Sawada et al.
6,184,940 B1 2/2001 Sano
6,208,349 B1 3/2001 Davidson et al.
6,241,609 B1 6/2001 Rutgers
6,243,430 B1 6/2001 Mathe
6,246,226 B1 6/2001 Kawase et al.
6,262,769 B1 7/2001 Anderson et al.
6,293,284 B1 9/2001 Rigg
6,301,440 B1 10/2001 Bolle et al.
6,326,978 B1 12/2001 Robbins
6,332,033 B1 12/2001 Qian
6,348,697 B1 2/2002 Kitajima
6,365,950 B1 4/2002 Sohn
6,385,169 B1 5/2002 Wang
6,385,580 B1 5/2002 Lyberg et al.
6,442,294 B1 8/2002 Nishizawa et al.
6,453,068 B1 9/2002 Li
6,473,159 B1 10/2002 Wakui et al.
6,498,926 B1 12/2002 Ciccarelli et al.
6,519,001 B1 2/2003 Lee
6,530,639 B1 3/2003 Matsuda
6,532,011 B1 3/2003 Francini et al.
6,539,129 B1 3/2003 Yushiya
6,546,150 B2 4/2003 Inui
6,577,613 B1 6/2003 Ramanathan
6,594,279 B1 7/2003 Nguyen et al.
6,597,399 B2 7/2003 Horii
6,600,160 B2 7/2003 Kobayashi et al.
6,608,622 B1 8/2003 Katayama et al.
6,627,896 B1 9/2003 Hashimoto et al.
6,642,962 B1 11/2003 Lin et al.
6,650,774 B1 11/2003 Szeliski
6,658,457 B2 12/2003 Nishikawa et al.
6,662,233 B1 12/2003 Skarpness et al.
6,704,007 B1 3/2004 Clapper
6,704,844 B2 3/2004 Arimilli et al.
6,734,905 B2 5/2004 Fossum et al.
6,735,566 B1 5/2004 Brand
6,744,471 B1 6/2004 Kakinuma et al.
6,748,443 B1 6/2004 Parry et al.
6,757,795 B2 6/2004 Barri et al.
6,760,748 B1 7/2004 Hakim
6,778,948 B1 8/2004 Kanetaka et al.

(56) References Cited

U.S. PATENT DOCUMENTS 6,787,778 B2 9/2004 Kobayashi et al.
6,788,338 B1 9/2004 Dinev et al.
6,789,155 B2 9/2004 Jeddeloh
6,810,031 B1 10/2004 Hegde et al.
6,842,265 B1 1/2005 Votipka et al.
6,862,374 B1 3/2005 Nagai et al.
6,864,886 B1 3/2005 Cavallaro et al.
6,885,761 B2 4/2005 Kage
6,906,332 B2 6/2005 Tashiro et al.
6,920,619 B1 7/2005 Milekic
6,944,319 B1 9/2005 Huang et al.
6,950,132 B1 9/2005 Kozuka
6,952,015 B2 10/2005 Kameshima
6,956,226 B2 10/2005 Bennewitz et al.
6,959,157 B2 10/2005 Nakayama
6,961,088 B2 11/2005 Kameshima et al.
6,965,707 B1 11/2005 Kozlowski
6,975,750 B2 12/2005 Yan et al.
6,989,863 B1 1/2006 Takahashi
6,993,769 B2 1/2006 Simonson et al.
6,996,186 B2 2/2006 Ngai et al.
7,027,054 B1 4/2006 Cheiky et al.
7,030,868 B2 4/2006 Clapper
7,030,912 B1 4/2006 Honma
7,030,922 B2 4/2006 Sakuragi
7,046,284 B2 5/2006 Kozlowski et al.
7,076,563 B1 7/2006 Yamanaka et al.
7,084,905 B1 8/2006 Nayar et al.
7,085,590 B2 8/2006 Kennedy et al.
7,088,351 B2 8/2006 Wang
7,095,879 B2 8/2006 Yan et al.
7,098,952 B2 8/2006 Morris et al.
7,113,497 B2 9/2006 Cromer et al.
7,113,648 B1 9/2006 Aihara
7,116,138 B2 10/2006 Lim
7,127,081 B1 10/2006 Erdem
7,133,070 B2 11/2006 Wheeler et al.
7,138,639 B2 11/2006 Kameshima
7,142,697 B2 11/2006 Huang et al.
7,145,966 B2 12/2006 Lai et al.
7,164,423 B1 1/2007 Westen
7,193,199 B2 3/2007 Jang
7,206,449 B2 4/2007 Raskar et al.
7,235,772 B2 6/2007 Ko et al.
7,256,381 B2 8/2007 Asaba
7,256,724 B2 8/2007 Lee
7,265,784 B1 9/2007 Frank
7,319,483 B2 1/2008 Park et al.
7,348,533 B2 3/2008 Ko et al.
7,352,361 B2 4/2008 Yi
7,362,886 B2 4/2008 Rowe et al.
7,379,011 B2 5/2008 Ham et al.
7,381,963 B2 6/2008 Endo et al.
7,382,941 B2 6/2008 Hwang
7,397,020 B2 7/2008 Roh
7,408,443 B2 8/2008 Nam
7,415,152 B2 8/2008 Jiang et al.
7,417,601 B2 8/2008 Brown Elliott
7,417,675 B2 8/2008 Loose
7,421,063 B2 9/2008 Takenaka et al.
7,428,378 B1 9/2008 Warpakowski Furlan
7,433,547 B2 10/2008 Yamamoto
7,443,435 B2 10/2008 Loose
7,443,443 B2 10/2008 Raskar et al.
7,470,911 B2 12/2008 Yagi
7,508,427 B2 3/2009 Choi
7,514,690 B2 4/2009 Endo et al.
7,518,645 B2 4/2009 Farrier
7,522,210 B2 4/2009 Shimada
7,535,486 B2 5/2009 Motomura et al.
7,538,808 B2 5/2009 Lee
7,554,478 B2 6/2009 Lim
7,554,584 B2 6/2009 Lim
7,564,037 B2 7/2009 Tashiro et al.
7,573,037 B1 8/2009 Kameshima et al.
7,587,099 B2 9/2009 Szeliski et al.
7,590,775 B2 9/2009 Gildfind et al.
7,592,599 B2 9/2009 Kameshima
7,595,831 B2 9/2009 Kameshima et al.
7,598,481 B2 10/2009 Hwang et al.
7,599,541 B2 10/2009 Hayashida
7,599,569 B2 10/2009 Smirnov et al.
7,609,860 B2 10/2009 Lee et al.
7,612,819 B2 11/2009 Nam
7,616,243 B2 11/2009 Kozlowski
7,622,698 B2 11/2009 Igaki et al.
7,626,598 B2 12/2009 Manchester
7,633,528 B2 12/2009 Fukushima et al.
7,639,292 B2 12/2009 Kwon et al.
7,646,417 B2 1/2010 Goto et al.
7,646,909 B2 1/2010 Jiang et al.
7,649,557 B2 1/2010 Song et al.
7,652,714 B2 1/2010 Gotanda
7,656,456 B2 2/2010 Zhang
7,660,464 B1 2/2010 Peterson
7,671,908 B2 3/2010 Lee
7,675,562 B2 3/2010 Kim et al.
7,676,170 B2 3/2010 Hata
7,679,542 B2 3/2010 Ham et al.
7,683,304 B2 3/2010 Nam et al.
7,687,755 B2 3/2010 Bae et al.
7,688,357 B2 3/2010 Lee et al.
7,697,049 B1 4/2010 Lavi
7,701,462 B2 4/2010 Hu
7,701,497 B2 4/2010 Fraenkel et al.
7,705,911 B2 4/2010 Kameshima
7,715,598 B2 5/2010 Li et al.
7,724,292 B2 5/2010 Ueno et al.
7,724,735 B2 5/2010 Locatelli et al.
7,730,422 B2 6/2010 Russo
7,734,060 B2 6/2010 Yoo et al.
7,746,397 B2 6/2010 Nam
7,750,281 B2 7/2010 Asaba et al.
7,750,913 B1 7/2010 Parenteau et al.
7,755,531 B2 7/2010 Yeom
7,755,679 B2 7/2010 Rossi et al.
7,760,246 B2 7/2010 Dalton et al.
7,760,250 B2 7/2010 Rossi
7,760,258 B2 7/2010 Huang et al.
7,764,880 B2 7/2010 Hamada
7,768,920 B2 8/2010 Goshen et al.
7,783,126 B2 8/2010 Yamashita et al.
7,796,831 B2 9/2010 Tanaka
7,800,618 B1 9/2010 Westen
7,802,866 B2 9/2010 Kanno et al.
7,813,583 B2 10/2010 Yoo et al.
7,825,974 B2 11/2010 Itano et al.
7,827,490 B2 11/2010 Kapur et al.
7,835,585 B2 11/2010 Cho et al.
7,835,586 B2 11/2010 Porikli
7,842,927 B2 11/2010 Tashiro et al.
7,844,076 B2 11/2010 Corcoran et al.
7,847,259 B2 12/2010 Tashiro et al.
7,852,379 B2 12/2010 Aoki et al.
7,864,229 B2 1/2011 Lee et al.
7,903,115 B2 3/2011 Platzer et al.
7,907,791 B2 3/2011 Kinrot et al.
7,908,410 B2 3/2011 Gildfind et al.
7,911,506 B2 3/2011 Suzuki
7,916,061 B2 3/2011 Chae et al.
7,916,198 B2 3/2011 Yeom
7,919,993 B2 4/2011 Keel et al.
7,923,695 B2 4/2011 Ishii et al.
7,923,696 B2 4/2011 Kameshima
7,933,071 B2 4/2011 Seo
7,949,201 B2 5/2011 Suzuki
7,952,077 B2 5/2011 Tashiro et al.
7,952,621 B2 5/2011 Yamauchi
7,953,286 B2 5/2011 Chiang et al.
7,962,030 B2 6/2011 Trevelyan
7,966,661 B2 6/2011 Gunawardena
7,969,480 B2 6/2011 Kim et al.
7,978,182 B2 7/2011 Ording et al.
7,978,237 B2 7/2011 Lee et al.

(56) References Cited

U.S. PATENT DOCUMENTS

| | | | |
|---|---|---|---|
| 7,984,177 | B2 | 7/2011 | Girardeau, Jr. et al. |
| 7,985,993 | B2 | 7/2011 | Lee et al. |
| 7,990,304 | B2 | 8/2011 | Lim et al. |
| 7,990,437 | B2 | 8/2011 | Kim et al. |
| 7,991,887 | B2 | 8/2011 | Sutardja |
| 7,998,782 | B2 | 8/2011 | Kim et al. |
| 7,999,340 | B2 | 8/2011 | Rossi et al. |
| 7,999,858 | B2 | 8/2011 | Nayar et al. |
| 8,004,586 | B2 | 8/2011 | Yoo et al. |
| 8,009,905 | B2 | 8/2011 | Choe et al. |
| 8,018,525 | B2 | 9/2011 | Trevelyan et al. |
| 8,021,912 | B2 | 9/2011 | Kim et al. |
| 8,031,243 | B2 | 10/2011 | Imai et al. |
| 8,054,350 | B2 | 11/2011 | Kyung |
| 8,063,964 | B2 | 11/2011 | Kozlowski |
| 8,063,967 | B2 | 11/2011 | Itano et al. |
| 8,068,121 | B2 | 11/2011 | Williamson et al. |
| 8,081,606 | B2 | 12/2011 | Cai et al. |
| 8,107,497 | B2 | 1/2012 | Zerillo et al. |
| 8,111,301 | B2 | 2/2012 | Kim et al. |
| 8,114,172 | B2 | 2/2012 | Givon |
| 8,115,829 | B2 | 2/2012 | Ha et al. |
| 8,120,625 | B2 | 2/2012 | Hinckley |
| 8,120,670 | B2 | 2/2012 | Kwon et al. |
| 8,125,499 | B2 | 2/2012 | Yamada |
| 8,125,526 | B2 | 2/2012 | Maruyama et al. |
| 8,129,760 | B2 | 3/2012 | Hiromatsu |
| 8,134,619 | B2 | 3/2012 | Tonkikh |
| 8,135,235 | B2 | 3/2012 | Kang et al. |
| 8,139,129 | B2 | 3/2012 | Kozlowski |
| 8,144,221 | B2 | 3/2012 | Hiromichi et al. |
| 8,144,228 | B2 | 3/2012 | Gelfand |
| 8,144,253 | B2 | 3/2012 | Su et al. |
| RE43,314 | E | 4/2012 | Kozlowski |
| 8,149,310 | B2 | 4/2012 | Yin |
| 8,155,391 | B1 | 4/2012 | Tang et al. |
| 8,155,397 | B2 | 4/2012 | Bigioi et al. |
| 8,159,552 | B2 | 4/2012 | Lim et al. |
| 8,170,576 | B2 | 5/2012 | Wu |
| 8,175,386 | B2 | 5/2012 | Kim |
| 8,179,456 | B2 | 5/2012 | Kim et al. |
| 8,189,097 | B2 | 5/2012 | Chou et al. |
| 8,189,944 | B1 | 5/2012 | Lim |
| 8,193,497 | B2 | 6/2012 | Park et al. |
| 8,194,993 | B1 | 6/2012 | Chen et al. |
| 8,199,203 | B2 | 6/2012 | Sugimoto |
| 8,200,019 | B2 | 6/2012 | Zhang et al. |
| 8,208,051 | B2 | 6/2012 | Kitani |
| 8,217,964 | B2 | 7/2012 | Laine et al. |
| 8,218,070 | B2 | 7/2012 | Kameshima |
| 8,218,625 | B2 | 7/2012 | Ward et al. |
| 8,224,176 | B1 | 7/2012 | Pillman et al. |
| 8,228,560 | B2 | 7/2012 | Hooper |
| 8,233,003 | B2 | 7/2012 | Obinata |
| 8,237,813 | B2 | 8/2012 | Garten |
| 8,247,779 | B2 | 8/2012 | Kameshima et al. |
| 8,249,376 | B2 | 8/2012 | Kang et al. |
| 8,259,399 | B2 | 9/2012 | Seo |
| 8,266,507 | B2 | 9/2012 | Getman et al. |
| 8,269,854 | B2 | 9/2012 | Jung et al. |
| 8,270,764 | B1 | 9/2012 | Agarwala et al. |
| 8,275,213 | B2 | 9/2012 | Richardson |
| 8,276,085 | B2 | 9/2012 | Sherwani |
| 8,291,446 | B2 | 10/2012 | Kennedy |
| 8,294,723 | B2 | 10/2012 | Labour et al. |
| 8,294,797 | B2 | 10/2012 | Choe et al. |
| 8,295,629 | B2 | 10/2012 | Wey et al. |
| 8,300,119 | B2 | 10/2012 | Seo |
| 8,300,900 | B2 | 10/2012 | Lai et al. |
| 8,310,567 | B2 | 11/2012 | Kim et al. |
| 8,314,817 | B2 | 11/2012 | Williamson et al. |
| 8,330,811 | B2 | 12/2012 | Macguire, Jr. |
| 8,335,021 | B2 | 12/2012 | Tanaka et al. |
| 8,339,508 | B2 | 12/2012 | Levy |
| 8,345,327 | B2 | 1/2013 | Mikami |
| 8,346,923 | B2 | 1/2013 | Rowles et al. |
| 8,351,711 | B2 | 1/2013 | Takano et al. |
| 8,358,356 | B2 | 1/2013 | Kim et al. |
| 8,358,365 | B2 | 1/2013 | Tanaka |
| 8,363,122 | B2 | 1/2013 | Onozawa |
| 8,363,145 | B2 | 1/2013 | Iwamoto |
| 8,363,951 | B2 | 1/2013 | Bigioi et al. |
| 8,363,952 | B2 | 1/2013 | Bigioi et al. |
| 8,369,586 | B2 | 2/2013 | Corcoran et al. |
| 8,369,893 | B2 | 2/2013 | Kirch et al. |
| 8,385,678 | B2 | 2/2013 | Lim et al. |
| 8,390,690 | B2 | 3/2013 | Lim |
| 8,395,539 | B2 | 3/2013 | Lim et al. |
| 8,406,482 | B1 | 3/2013 | Chien et al. |
| 8,406,557 | B2 | 3/2013 | Park et al. |
| 8,411,153 | B2 | 4/2013 | Cho |
| 8,412,277 | B2 | 4/2013 | Fujiwara |
| 8,421,881 | B2 | 4/2013 | Chung et al. |
| 8,441,552 | B2 | 5/2013 | Yoshida |
| 8,441,560 | B2 | 5/2013 | Yanai |
| 8,446,488 | B2 | 5/2013 | Yim |
| 8,446,510 | B2 | 5/2013 | Lee et al. |
| 8,451,296 | B2 | 5/2013 | Ono |
| 8,462,101 | B2 | 6/2013 | Han et al. |
| 8,467,003 | B2 | 6/2013 | Yoo et al. |
| 8,471,928 | B2 | 6/2013 | Yoo et al. |
| 8,482,447 | B2 | 7/2013 | Hwang et al. |
| 8,488,032 | B2 | 7/2013 | Keel et al. |
| 8,488,219 | B2 | 7/2013 | Mikami |
| 8,493,413 | B2 | 7/2013 | Mo |
| 8,497,932 | B2 | 7/2013 | Morimoto |
| 8,508,600 | B2 | 8/2013 | Ibi |
| 8,514,306 | B2 | 8/2013 | Jung et al. |
| 8,515,169 | B2 | 8/2013 | Kim et al. |
| 8,520,104 | B2 | 8/2013 | Fossum et al. |
| 8,521,883 | B1 | 8/2013 | Wartnick et al. |
| RE44,499 | E | 9/2013 | Inoue et al. |
| 8,531,465 | B2 | 9/2013 | Platzer et al. |
| 8,531,570 | B2 | 9/2013 | Sugimura |
| 8,532,395 | B2 | 9/2013 | Mitsui |
| 8,543,946 | B2 | 9/2013 | Kethireddy |
| 8,547,451 | B2 | 10/2013 | Cho et al. |
| 8,547,461 | B2 | 10/2013 | Jung et al. |
| 8,548,257 | B2 | 10/2013 | Reid et al. |
| 8,558,915 | B2 | 10/2013 | Morimoto |
| 8,563,915 | B2 | 10/2013 | Takenaka et al. |
| 8,570,415 | B2 | 10/2013 | Takeda |
| 8,576,294 | B2 | 11/2013 | Kameshima et al. |
| 8,581,935 | B2 | 11/2013 | Handa |
| 8,586,903 | B2 | 11/2013 | Itzhak et al. |
| 8,587,671 | B2 | 11/2013 | Park et al. |
| 8,587,713 | B2 | 11/2013 | Park et al. |
| 8,599,280 | B2 | 12/2013 | Lipowezky et al. |
| 8,599,282 | B2 | 12/2013 | Imai et al. |
| 8,599,300 | B2 | 12/2013 | Park et al. |
| 8,605,142 | B2 | 12/2013 | Hayashi |
| 8,605,176 | B2 | 12/2013 | Jung et al. |
| 8,605,997 | B2 | 12/2013 | Lipowezky et al. |
| 8,610,724 | B2 | 12/2013 | Garg |
| 8,610,789 | B1 | 12/2013 | Nayar et al. |
| 8,610,790 | B2 | 12/2013 | Blanquart et al. |
| 8,611,610 | B2 | 12/2013 | Park et al. |
| 8,611,656 | B2 | 12/2013 | Kim et al. |
| 8,614,750 | B2 | 12/2013 | Kim et al. |
| 8,619,728 | B2 | 12/2013 | Frank et al. |
| 8,629,915 | B2 | 1/2014 | Gwak |
| 8,630,505 | B2 | 1/2014 | Kim |
| 8,633,431 | B2 | 1/2014 | Kim |
| 8,633,978 | B2 | 1/2014 | Yang et al. |
| 8,634,011 | B2 | 1/2014 | Hur et al. |
| 8,644,644 | B2 | 2/2014 | Yadav |
| 8,648,945 | B2 | 2/2014 | Ovsiannikov et al. |
| 8,659,339 | B2 | 2/2014 | Jung et al. |
| 8,665,350 | B2 | 3/2014 | Richardson et al. |
| 8,666,151 | B2 | 3/2014 | Kim et al. |
| 8,675,086 | B1 | 3/2014 | Linzer |
| 8,675,272 | B2 | 3/2014 | Cho et al. |
| 8,675,960 | B2 | 3/2014 | Reid et al. |
| 8,681,236 | B2 | 3/2014 | Baek |

(56) References Cited

U.S. PATENT DOCUMENTS 8,681,244 B2 3/2014 Lee et al.
8,681,245 B2 3/2014 Lee
8,682,029 B2 3/2014 Piramuthu
8,687,174 B2 4/2014 Fossum et al.
8,692,851 B2 4/2014 Ording et al.
8,692,917 B2 4/2014 Takeda
8,698,062 B2 4/2014 Yoshida
8,699,822 B2 4/2014 Park et al.
8,711,016 B2 4/2014 Kim et al.
8,711,268 B2 4/2014 Ostrovsky
8,712,160 B2 4/2014 Bigioi et al.
8,712,189 B2 4/2014 Bitouk et al.
8,716,769 B2 5/2014 Ihara et al.
8,717,293 B2 5/2014 Wong et al.
8,717,454 B2 5/2014 Yoshida
8,717,649 B2 5/2014 Kim et al.
8,723,284 B1 5/2014 Hynecek
8,723,997 B2 5/2014 Koh
8,736,721 B2 5/2014 Park et al.
8,749,415 B2 6/2014 Jung et al.
8,749,653 B2 6/2014 Kim
8,754,956 B2 6/2014 Lim et al.
8,754,965 B2 6/2014 Han et al.
8,754,978 B2 6/2014 Hayashi et al.
8,761,245 B2 6/2014 Puri et al.
8,763,056 B2 6/2014 Bagasra
8,764,560 B2 7/2014 Sitrick
8,767,074 B2 7/2014 Kim et al.
8,767,085 B2 7/2014 Park et al.
8,773,544 B2 7/2014 Koh et al.
8,774,553 B1 7/2014 Winn
8,774,554 B1 7/2014 Winn
8,780,420 B1 7/2014 Bluzer et al.
8,783,816 B2 7/2014 Masuda
8,785,870 B2 7/2014 Matsumoto et al.
8,786,725 B2 7/2014 Maruyama et al.
8,786,920 B2 7/2014 Mikami
8,792,020 B2 7/2014 Lee et al.
8,792,679 B2 7/2014 Sengupta et al.
8,793,714 B2 7/2014 Kelsen et al.
8,794,733 B2 8/2014 Kanno et al.
8,797,337 B1 8/2014 Labour et al.
8,797,445 B2 8/2014 Kang
8,803,273 B2 8/2014 Fossum et al.
8,805,091 B1 8/2014 Hensel et al.
8,809,760 B2 8/2014 Takenaka et al.
8,810,676 B2 8/2014 Lim et al.
8,811,757 B2 8/2014 Batur
8,817,048 B2 8/2014 Kerr et al.
8,823,846 B2 9/2014 Blanquart et al.
8,824,747 B2 9/2014 Free
8,830,177 B2 9/2014 Woo
8,830,261 B2 9/2014 Asai
8,830,363 B2 9/2014 Jang
8,836,837 B2 9/2014 Kinugasa
8,849,984 B2 9/2014 Yamagishi
8,852,003 B2 10/2014 Oku
8,854,325 B2 10/2014 Byrd et al.
8,854,421 B2 10/2014 Kasahara
8,861,805 B2 10/2014 Hwang et al.
8,861,847 B2 10/2014 Srinivasan et al.
8,861,886 B2 10/2014 Huo et al.
8,866,060 B2 10/2014 Kwon et al.
8,867,105 B2 10/2014 Mikami
8,872,855 B2 10/2014 Doll
8,872,931 B2 10/2014 Roh et al.
8,872,932 B2 10/2014 Han
8,878,117 B2 11/2014 Ogushi
8,878,963 B2 11/2014 Prabhudesai et al.
8,881,057 B2 11/2014 Mori et al.
8,890,897 B2 11/2014 Homma et al.
8,896,632 B2 11/2014 MacDougall et al.
8,897,501 B2 11/2014 Okada et al.
8,897,504 B2 11/2014 Steinberg et al.
8,902,342 B2 12/2014 Araoka et al.
8,902,411 B2 12/2014 Park et al.
8,908,101 B2 12/2014 Lee et al.
8,908,932 B2 12/2014 Corcoran et al.
8,914,744 B2 12/2014 Spencer et al.
8,915,437 B2 12/2014 Hoshino et al.
8,928,654 B2 1/2015 Givon
8,928,775 B2 1/2015 Lee
8,928,777 B2 1/2015 Park et al.
8,933,960 B2 1/2015 Lindahl et al.
8,934,029 B2 1/2015 Nayar et al.
8,935,767 B2 1/2015 Li et al.
8,937,735 B2 1/2015 Mori
8,942,436 B2 1/2015 Mori et al.
8,947,382 B2 2/2015 Winkler et al.
8,948,584 B2 2/2015 Inoue et al.
8,953,094 B2 2/2015 Baer
8,953,882 B2 2/2015 Lim et al.
8,957,994 B2 2/2015 Jakobson
8,965,390 B2 2/2015 Morrison
8,966,401 B2 2/2015 Kang et al.
8,970,770 B2 3/2015 Nanu et al.
8,976,264 B2 3/2015 Rivard et al.
8,977,073 B2 3/2015 Kwon et al.
8,982,259 B2 3/2015 Yoo et al.
8,988,349 B2 3/2015 Alberth et al.
8,988,548 B2 3/2015 Manabe
8,988,559 B2 3/2015 Chao et al.
8,988,561 B2 3/2015 Yamauchi
9,001,092 B2 4/2015 Kim
9,001,232 B2 4/2015 Tatsumi
9,001,249 B2 4/2015 Iwane
9,003,293 B2 4/2015 Grosz et al.
9,006,630 B2 4/2015 Richardson et al.
9,007,505 B2 4/2015 Ichikawa
9,013,624 B2 4/2015 Bae et al.
9,014,459 B2 4/2015 Xiang et al.
9,015,640 B2 4/2015 de Leon
9,019,410 B2 4/2015 Lim et al.
9,025,047 B2 5/2015 Yoshida
9,025,050 B2 5/2015 Lee
9,030,566 B2 5/2015 Miyasako
9,030,572 B2 5/2015 Iha
9,030,587 B2 5/2015 Suzuki et al.
9,030,590 B2 5/2015 Kim et al.
9,035,309 B2 5/2015 Park et al.
9,036,056 B2 5/2015 Ohtsuka
9,042,673 B2 5/2015 Cho et al.
9,049,363 B2 6/2015 Choi et al.
9,055,003 B2 6/2015 Baratakke et al.
9,055,250 B2 6/2015 Park et al.
9,058,655 B2 6/2015 Doepke et al.
9,070,185 B2 6/2015 Lee et al.
9,070,229 B2 6/2015 Williamson et al.
9,071,237 B2 6/2015 Lee et al.
9,077,900 B2 7/2015 Baek et al.
9,077,943 B2 7/2015 Lim et al.
9,080,914 B2 7/2015 Kinugasa
9,081,257 B2 7/2015 Miyazaki
9,083,887 B2 7/2015 Voronov
9,083,905 B2 7/2015 Wan et al.
9,083,935 B2 7/2015 Demandolx et al.
9,086,494 B2 7/2015 Han et al.
9,098,069 B2 8/2015 Dickinson et al.
9,100,514 B2 8/2015 Gu et al.
9,104,410 B2 8/2015 Wong et al.
9,106,813 B2 8/2015 Fainstain et al.
9,106,888 B2 8/2015 Chou
9,113,086 B2 8/2015 Kim et al.
9,113,114 B2 8/2015 Lee
9,118,876 B2 8/2015 Felt
9,123,164 B2 9/2015 Park et al.
9,123,621 B2 9/2015 Watanabe
9,124,811 B2 9/2015 Lee
9,124,814 B2 9/2015 Kim et al.
9,124,829 B2 9/2015 Patel
9,129,550 B2 9/2015 Doll
9,131,172 B2 9/2015 Tsuzuki
9,135,679 B2 9/2015 Choi et al.
9,137,432 B2 9/2015 Ahn et al.

(56) References Cited

U.S. PATENT DOCUMENTS 9,137,455 B1 * 9/2015 Rivard .................. H04N 23/72
9,144,714 B2 9/2015 Hollinger
9,148,600 B2 9/2015 Park et al.
9,151,711 B2 10/2015 Cho et al.
9,154,708 B1 10/2015 Rivard et al.
9,158,492 B2 10/2015 Miyata
9,160,936 B1 10/2015 Rivard et al.
9,165,533 B2 10/2015 Paulson
9,167,169 B1 * 10/2015 Rivard ................. H04N 25/771
9,167,174 B1 10/2015 Rivard et al.
9,171,514 B2 10/2015 Kim et al.
9,177,362 B2 11/2015 Restrepo et al.
9,179,062 B1 11/2015 Rivard et al.
9,179,085 B1 11/2015 Rivard et al.
9,185,316 B2 11/2015 Cheon et al.
9,189,069 B2 11/2015 Hinckley
9,191,015 B2 11/2015 Kim et al.
9,191,598 B2 11/2015 Blanquart et al.
9,191,599 B2 11/2015 Park et al.
9,195,880 B1 11/2015 Levoy et al.
9,196,076 B1 11/2015 MacLeod
9,208,548 B1 12/2015 Noble et al.
9,210,330 B2 12/2015 Seo
9,210,342 B2 12/2015 Oh
9,215,389 B2 12/2015 Usui
9,215,405 B2 12/2015 Atkinson
9,215,433 B2 12/2015 Rivard et al.
9,218,662 B1 12/2015 Feder et al.
9,219,825 B2 12/2015 Sheikh Naziruddin et al.
9,223,467 B1 12/2015 Landry
9,225,922 B2 12/2015 Lee et al.
9,230,343 B2 1/2016 Ozawa
9,232,124 B2 1/2016 Song
9,232,164 B2 1/2016 Minowa et al.
9,232,173 B1 1/2016 Duggal et al.
9,237,280 B2 1/2016 Kim et al.
9,239,947 B2 1/2016 Auberger et al.
9,247,160 B2 1/2016 Lee et al.
9,256,974 B1 2/2016 Hines
9,257,462 B2 2/2016 Park et al.
9,258,539 B2 2/2016 Kim
9,261,909 B2 2/2016 Lam
9,263,489 B2 2/2016 Kozlowski
9,264,597 B2 2/2016 Wallner
9,270,232 B2 2/2016 Park et al.
9,270,961 B2 2/2016 Rudoy
9,277,135 B2 3/2016 Ichikawa
9,282,167 B2 3/2016 Jo et al.
9,282,224 B2 3/2016 Komada et al.
9,282,264 B2 3/2016 Park et al.
9,285,729 B2 3/2016 Saito et al.
9,288,461 B2 3/2016 Ahn et al.
9,292,154 B2 3/2016 Ji et al.
9,292,911 B2 3/2016 Paris et al.
9,294,744 B2 3/2016 Takeda
9,298,745 B2 3/2016 Lee et al.
9,300,945 B2 3/2016 Seo
9,307,135 B2 4/2016 Noh et al.
9,310,488 B2 4/2016 Park et al.
9,313,413 B2 4/2016 Cho et al.
9,317,910 B2 4/2016 Jeon et al.
9,324,754 B2 4/2016 Ahn et al.
9,325,301 B2 4/2016 Lee
9,325,314 B2 4/2016 Shin
9,336,574 B2 5/2016 Zhang et al.
9,336,619 B2 5/2016 Kim et al.
9,338,366 B2 5/2016 Seo et al.
9,342,138 B2 5/2016 Ding
9,344,657 B2 5/2016 Kim et al.
9,354,184 B2 5/2016 Dowaki
9,361,319 B2 6/2016 Feder et al.
9,369,144 B2 6/2016 Kim et al.
9,380,231 B2 6/2016 Yang et al.
9,383,202 B2 7/2016 Zhou et al.
9,384,384 B1 7/2016 Tyagi
9,392,160 B2 7/2016 Sfaradi et al.
9,395,237 B2 7/2016 Choi
9,402,067 B2 7/2016 Park et al.
9,406,147 B2 8/2016 Rivard et al.
9,407,675 B1 8/2016 Ludwig et al.
9,413,379 B2 8/2016 Kim et al.
9,417,836 B2 8/2016 Postal et al.
9,418,408 B1 8/2016 Thompson
9,418,425 B2 8/2016 Park et al.
9,420,159 B2 8/2016 Hamada
9,421,462 B2 8/2016 Oku
9,424,798 B2 8/2016 Park
9,426,398 B2 8/2016 Ohshitanai
9,427,174 B2 8/2016 Tuliakov et al.
9,432,574 B2 8/2016 Matsuo
9,438,804 B2 9/2016 Ryu et al.
9,438,809 B2 9/2016 Sheikh et al.
9,438,836 B2 9/2016 Tashiro et al.
9,443,132 B2 9/2016 Linguraru et al.
9,443,898 B2 9/2016 Oh et al.
9,445,029 B2 9/2016 Shimizu
9,448,771 B2 9/2016 Feder et al.
9,451,240 B2 9/2016 You et al.
9,456,144 B2 9/2016 Miyazaki
9,459,781 B2 10/2016 Wilson et al.
9,460,118 B2 10/2016 Feder et al.
9,460,125 B2 10/2016 Feder et al.
9,460,492 B2 10/2016 Takeru
9,462,199 B2 10/2016 Kim et al.
9,467,607 B2 10/2016 Ng et al.
9,478,012 B2 10/2016 Uratani et al.
9,485,483 B2 11/2016 Cho et al.
9,489,927 B2 11/2016 Aizawa
9,495,025 B2 11/2016 Ishikawa et al.
9,507,379 B2 11/2016 Kamei et al.
9,507,445 B2 11/2016 Sutton et al.
9,508,133 B2 11/2016 Kindle et al.
9,509,919 B2 11/2016 Rivard et al.
9,516,217 B2 12/2016 Corcoran et al.
9,516,221 B2 12/2016 Lee
9,531,961 B2 12/2016 Rivard et al.
9,538,111 B2 1/2017 Yang et al.
9,538,112 B2 1/2017 Wada et al.
9,544,505 B2 1/2017 Tsuzuki
9,544,508 B2 1/2017 Cheng et al.
9,544,513 B2 1/2017 Shin et al.
9,549,140 B2 1/2017 Jung et al.
9,552,076 B2 1/2017 Homma et al.
9,554,013 B2 1/2017 Kim et al.
9,560,269 B2 1/2017 Baldwin
9,565,374 B2 2/2017 Kim et al.
9,571,745 B2 2/2017 Mahowald
9,571,760 B2 2/2017 Kang et al.
9,578,211 B2 2/2017 Kong et al.
9,578,260 B2 2/2017 Song et al.
9,578,268 B2 2/2017 Kim et al.
9,591,225 B2 3/2017 Jung et al.
9,594,945 B2 3/2017 Park et al.
9,595,086 B2 3/2017 Kim
9,600,735 B2 3/2017 Nakagome et al.
9,600,741 B1 3/2017 Su et al.
9,608,147 B2 3/2017 Kim et al.
9,609,221 B2 3/2017 Kim et al.
9,609,246 B2 3/2017 Meddeler
9,609,250 B2 3/2017 Lee et al.
9,621,796 B2 4/2017 Muukki et al.
9,628,647 B2 4/2017 Tomono et al.
9,635,279 B2 4/2017 Lee et al.
9,635,333 B2 4/2017 Cho et al.
9,639,742 B2 5/2017 Lee et al.
9,641,789 B2 5/2017 Cho et al.
9,646,576 B2 5/2017 Masuko
9,648,221 B2 5/2017 Seo
9,658,643 B2 5/2017 Jeong et al.
9,661,290 B2 5/2017 Moriya
9,661,327 B2 5/2017 Nilsson
9,667,892 B2 5/2017 Sakuragi
9,684,434 B2 6/2017 Lewin et al.
9,686,489 B2 6/2017 Hsu

(56) References Cited

U.S. PATENT DOCUMENTS 9,692,996 B2 6/2017 Choi et al.
9,704,250 B1 7/2017 Shah et al.
9,706,074 B2 7/2017 Baek et al.
9,712,773 B2 7/2017 Lim et al.
9,716,880 B2 7/2017 Chen et al.
9,721,375 B1 8/2017 Rivard et al.
9,723,238 B2 8/2017 Lee et al.
9,736,405 B2 8/2017 Kozlowski
9,741,150 B2 8/2017 Feder et al.
9,742,596 B2 8/2017 Goyal et al.
9,749,613 B2 8/2017 Park et al.
9,756,267 B2 9/2017 Dowaki et al.
9,760,764 B2 9/2017 Mishra et al.
9,761,033 B2 9/2017 Flider
9,762,829 B2 9/2017 Choi et al.
9,769,382 B2 9/2017 Kim et al.
9,769,404 B2 9/2017 Ohshitanai
9,769,686 B2 9/2017 Kang et al.
9,773,827 B2 9/2017 Minowa et al.
9,774,347 B2 9/2017 Chae et al.
9,774,781 B2 9/2017 Cho
9,779,287 B2 10/2017 Steinberg et al.
9,779,481 B2 10/2017 Yuasa
9,793,909 B2 10/2017 Kim et al.
9,794,607 B2 10/2017 Joy et al.
9,798,395 B2 10/2017 Ye et al.
9,800,638 B2 10/2017 Munagala et al.
9,800,814 B2 10/2017 Jin et al.
9,806,721 B2 10/2017 Kim et al.
9,807,322 B2 10/2017 Feder et al.
9,813,615 B2 11/2017 Lee et al.
9,819,849 B1 11/2017 Rivard et al.
9,820,705 B2 11/2017 Kim
9,832,382 B2 11/2017 Hasan et al.
9,843,756 B2 12/2017 Wang et al.
9,846,804 B2 12/2017 Lim et al.
9,848,116 B2 12/2017 Shimokawa et al.
9,854,218 B2 12/2017 Yu et al.
9,858,648 B2 1/2018 Li et al.
9,860,448 B2 1/2018 Yoo et al.
9,860,461 B2 1/2018 Feder et al.
9,886,192 B2 2/2018 Masuko
9,886,766 B2 2/2018 Madineni et al.
9,894,289 B2 2/2018 Rivard et al.
9,894,347 B2 2/2018 Yoon et al.
9,898,674 B2 2/2018 Connell, II et al.
9,900,492 B2 2/2018 Seo
9,912,928 B2 3/2018 Rivard et al.
9,918,017 B2 * 3/2018 Rivard .................. H04N 23/76
9,924,147 B2 3/2018 Rivard et al.
9,934,561 B2 4/2018 Feder et al.
9,942,464 B2 4/2018 Voss
9,942,501 B2 4/2018 Jung et al.
9,942,504 B2 4/2018 Nishizawa
9,953,454 B1 4/2018 Rivard et al.
9,959,803 B2 5/2018 Kim et al.
9,961,272 B2 5/2018 Lee et al.
9,973,709 B2 5/2018 You et al.
9,978,431 B2 5/2018 Jung et al.
9,979,910 B2 5/2018 Ikedo
9,986,163 B2 5/2018 Park et al.
9,989,642 B2 6/2018 Kang et al.
9,997,133 B2 6/2018 Kim
9,998,721 B2 6/2018 Rivard et al.
9,998,730 B2 6/2018 Park et al.
9,998,935 B2 6/2018 Rivard et al.
10,007,842 B2 6/2018 Hu
10,015,428 B2 7/2018 Lee et al.
10,025,972 B2 7/2018 Matas et al.
10,027,726 B1 7/2018 Ozog
10,033,917 B1 7/2018 Silverstein et al.
10,038,866 B2 7/2018 Lee et al.
10,043,058 B2 8/2018 Ahmed
10,049,425 B2 8/2018 Cornell
10,055,646 B2 8/2018 Bataller et al.
10,078,198 B2 9/2018 Lee et al.
10,088,866 B2 10/2018 Braun et al.
10,088,989 B2 10/2018 Rivard et al.
10,095,941 B2 10/2018 Kang et al.
10,097,765 B2 10/2018 Sheikh et al.
10,102,829 B2 10/2018 Paulson
10,109,098 B2 10/2018 Feder et al.
10,109,107 B2 10/2018 Knorr et al.
10,110,867 B2 10/2018 Rivard et al.
10,110,870 B2 10/2018 Rivard et al.
10,115,753 B2 10/2018 Baek
10,127,455 B2 11/2018 Han et al.
10,129,476 B1 11/2018 Hushchyn et al.
10,129,514 B2 11/2018 Rivard et al.
10,134,787 B2 11/2018 Moon
10,145,891 B2 12/2018 Cho et al.
10,146,034 B2 12/2018 Choi et al.
10,148,898 B2 12/2018 Dowaki et al.
10,154,214 B2 12/2018 Liim et al.
10,178,300 B2 1/2019 Rivard et al.
10,178,323 B2 1/2019 Rivard et al.
10,182,197 B2 1/2019 Feder et al.
10,186,019 B2 1/2019 Homma et al.
10,194,093 B2 1/2019 Takahashi
10,225,479 B2 3/2019 Shabtay et al.
10,257,426 B2 4/2019 Lee et al.
10,270,958 B2 4/2019 Rivard et al.
10,271,001 B2 4/2019 Uchida et al.
10,277,807 B2 4/2019 Song
10,284,834 B2 5/2019 Rivard et al.
10,291,842 B2 5/2019 Kim et al.
10,346,676 B2 7/2019 Ahmed
10,346,677 B2 7/2019 Steinberg et al.
10,360,716 B1 7/2019 van der Meulen et al.
10,365,820 B2 7/2019 Lee et al.
10,366,526 B2 7/2019 Rivard et al.
10,367,024 B2 7/2019 Nah et al.
10,372,971 B2 8/2019 Rivard et al.
10,375,367 B2 8/2019 Rivard et al.
10,375,369 B2 8/2019 Rivard et al.
10,382,702 B2 * 8/2019 Rivard ................ H04N 23/741
10,387,963 B1 8/2019 Leise et al.
10,396,119 B2 8/2019 Kim et al.
10,404,930 B2 9/2019 Shin et al.
10,410,061 B2 9/2019 Kim et al.
10,410,605 B2 9/2019 Gardenfors et al.
10,469,714 B2 11/2019 Rivard et al.
10,477,077 B2 11/2019 Rivard et al.
10,477,087 B2 11/2019 Rivard et al.
10,477,093 B2 11/2019 Hong et al.
10,491,834 B2 11/2019 Rivard et al.
10,498,978 B2 12/2019 Chou et al.
10,498,982 B2 12/2019 Feder et al.
10,506,463 B2 12/2019 Rivard et al.
10,521,946 B1 12/2019 Roche et al.
10,552,016 B2 2/2020 Cherna et al.
10,552,946 B2 2/2020 Furukawa
10,554,890 B1 2/2020 Le et al.
10,554,943 B2 2/2020 Rivard et al.
10,558,848 B2 2/2020 Rivard et al.
10,586,097 B2 3/2020 Rivard et al.
10,586,369 B1 3/2020 Roche et al.
10,587,864 B2 3/2020 Hayasaka et al.
10,605,922 B2 3/2020 Deane
10,613,585 B2 4/2020 Park
10,621,771 B2 4/2020 Matts et al.
10,623,677 B2 4/2020 Koh et al.
10,627,854 B2 4/2020 Gurr et al.
10,628,666 B2 4/2020 Sareen et al.
10,628,729 B2 4/2020 Sareen
10,630,903 B2 4/2020 Srivastava et al.
10,652,478 B2 * 5/2020 Rivard ............... H04N 23/6811
10,708,545 B2 7/2020 Rivard et al.
10,742,892 B1 8/2020 Le et al.
10,747,995 B2 8/2020 Huang et al.
10,785,401 B2 9/2020 Rivard et al.
10,802,144 B2 10/2020 Lee et al.
10,810,781 B2 10/2020 Feder et al.
10,832,388 B2 11/2020 Liu et al.

(56) References Cited

U.S. PATENT DOCUMENTS 10,834,329 B2 11/2020 Gatt et al.
10,842,466 B2 11/2020 Kang et al.
10,867,405 B2 12/2020 Yoo et al.
10,869,018 B2 12/2020 Kim et al.
10,880,521 B2 12/2020 Rivard et al.
10,887,495 B2 1/2021 Chung et al.
10,904,505 B2 1/2021 Rivard et al.
10,917,571 B2 2/2021 Shanmugam et al.
10,924,688 B2 2/2021 Rivard et al.
10,929,945 B2 2/2021 Lim et al.
10,931,897 B2 2/2021 Feder et al.
10,937,222 B2 3/2021 Rivard et al.
10,955,983 B2 3/2021 Post et al.
11,025,831 B2 * 6/2021 Rivard .................. H04N 23/72
11,113,523 B2 9/2021 Son et al.
11,113,821 B2 9/2021 Rivard et al.
11,113,859 B1 9/2021 Xiao et al.
11,202,047 B2 12/2021 Rivard et al.
11,205,305 B2 12/2021 Sadi et al.
11,252,589 B2 2/2022 Rivard et al.
11,308,626 B2 4/2022 Rivard et al.
11,356,647 B2 6/2022 Rivard
11,363,179 B2 6/2022 Rivard et al.
11,375,085 B2 6/2022 Rivard et al.
11,394,894 B2 7/2022 Rivard et al.
11,394,895 B2 7/2022 Rivard et al.
11,455,829 B2 9/2022 Rivard et al.
11,463,630 B2 10/2022 Rivard et al.
11,477,409 B2 10/2022 Kim
11,620,754 B2 4/2023 Rivard et al.
11,683,448 B2 6/2023 Rivard et al.
11,699,219 B2 7/2023 Rivard et al.
11,729,518 B2 8/2023 Rivard et al.
12,003,853 B2 6/2024 Rivard et al.
12,003,864 B2 * 6/2024 Rivard ................. H04N 23/741
12,143,842 B2 11/2024 Rivard et al.
12,175,632 B2 12/2024 Gao et al.
12,316,978 B2 5/2025 Rivard et al.
2001/0009437 A1 7/2001 Klein et al.
2001/0030770 A1 10/2001 Ohashi
2001/0033284 A1 10/2001 Chan
2001/0033336 A1 10/2001 Kameshima et al.
2001/0033675 A1 10/2001 Maurer et al.
2001/0039582 A1 11/2001 McKinnon et al.
2002/0003545 A1 1/2002 Nakamura
2002/0006232 A1 1/2002 Inui
2002/0012450 A1 1/2002 Tsujii
2002/0059432 A1 5/2002 Masuda et al.
2002/0060566 A1 5/2002 Debbins et al.
2002/0063714 A1 5/2002 Haas et al.
2002/0070945 A1 6/2002 Kage
2002/0087300 A1 7/2002 Patwari
2002/0106114 A1 8/2002 Yan et al.
2002/0107750 A1 8/2002 Kanevsky et al.
2002/0113882 A1 8/2002 Pollard et al.
2002/0114296 A1 8/2002 Hardy
2002/0122014 A1 9/2002 Rajasingham
2002/0141256 A1 10/2002 Barri et al.
2002/0146074 A1 10/2002 Ariel et al.
2002/0196472 A1 12/2002 Enomoto
2003/0015645 A1 1/2003 Brickell et al.
2003/0025816 A1 2/2003 Sakuragi
2003/0039211 A1 2/2003 Hvostov et al.
2003/0042425 A1 3/2003 Tashiro et al.
2003/0046477 A1 3/2003 Jeddeloh
2003/0086002 A1 5/2003 Cahill et al.
2003/0090577 A1 5/2003 Shirakawa
2003/0097531 A1 5/2003 Arimilli et al.
2003/0103523 A1 6/2003 Frossard et al.
2003/0133599 A1 7/2003 Tian et al.
2003/0142745 A1 7/2003 Osawa
2003/0148811 A1 8/2003 Sitrick
2003/0152096 A1 8/2003 Chapman
2003/0179911 A1 9/2003 Ho et al.
2003/0184660 A1 10/2003 Skow
2003/0197784 A1 10/2003 Bae
2003/0206654 A1 11/2003 Teng
2003/0210672 A1 11/2003 Cromer et al.
2003/0212792 A1 11/2003 Raymond
2003/0215153 A1 11/2003 Gindele et al.
2003/0218682 A1 11/2003 Lim et al.
2003/0222978 A9 12/2003 Thomason
2003/0223622 A1 12/2003 Simon et al.
2004/0021701 A1 2/2004 Iwema et al.
2004/0027471 A1 2/2004 Koseki et al.
2004/0042807 A1 3/2004 Nakayama
2004/0045006 A1 3/2004 Simonson et al.
2004/0052248 A1 3/2004 Frank et al.
2004/0059783 A1 3/2004 Kazui et al.
2004/0070676 A1 4/2004 Lawther et al.
2004/0071465 A1 4/2004 Smart et al.
2004/0085259 A1 5/2004 Tarlton et al.
2004/0135912 A1 7/2004 Hofflinger et al.
2004/0145674 A1 7/2004 Hoppe et al.
2004/0150622 A1 8/2004 Bohn
2004/0158582 A1 8/2004 Takagi et al.
2004/0178349 A1 9/2004 Kameshima
2004/0181375 A1 9/2004 Szu et al.
2004/0184115 A1 9/2004 Suzuki
2004/0184677 A1 9/2004 Raskar et al.
2004/0201589 A1 10/2004 Ekstrom
2004/0204144 A1 10/2004 Lim
2004/0228528 A1 11/2004 Lao
2004/0234259 A1 11/2004 Muramatsu
2004/0239792 A1 12/2004 Shibutani et al.
2004/0247177 A1 12/2004 Rowe et al.
2004/0252199 A1 12/2004 Cheung et al.
2004/0263510 A1 12/2004 Marschner et al.
2005/0010697 A1 1/2005 Kinawi et al.
2005/0022131 A1 1/2005 Saint-Hilaire et al.
2005/0047333 A1 3/2005 Todd et al.
2005/0068432 A1 3/2005 Kozuka
2005/0088570 A1 4/2005 Seo
2005/0089212 A1 4/2005 Mashitani et al.
2005/0093997 A1 5/2005 Dalton et al.
2005/0104848 A1 5/2005 Yamaguchi et al.
2005/0128438 A1 6/2005 Kang et al.
2005/0134723 A1 6/2005 Lee et al.
2005/0143124 A1 6/2005 Kennedy et al.
2005/0147292 A1 7/2005 Huang et al.
2005/0151853 A1 7/2005 Suh
2005/0154798 A1 7/2005 Nurmi
2005/0155043 A1 7/2005 Schulz et al.
2005/0173646 A1 8/2005 Tashiro et al.
2005/0180657 A1 8/2005 Zhang et al.
2005/0182808 A1 8/2005 Kanai
2005/0196069 A1 9/2005 Yonaha
2005/0218333 A1 10/2005 Kameshima
2005/0237587 A1 10/2005 Nakamura
2005/0237588 A1 10/2005 Gohara et al.
2005/0253945 A1 11/2005 Shinohara
2005/0253946 A1 11/2005 Shinohara
2005/0264688 A1 12/2005 Ouchi
2005/0286559 A1 12/2005 Miernik et al.
2006/0007346 A1 1/2006 Nakamura et al.
2006/0008171 A1 1/2006 Petschnigg et al.
2006/0012689 A1 1/2006 Dalton et al.
2006/0015308 A1 1/2006 Marschner et al.
2006/0017837 A1 1/2006 Sorek et al.
2006/0026535 A1 2/2006 Hotelling et al.
2006/0028987 A1 2/2006 Alexander Gildfind et al.
2006/0029292 A1 2/2006 Hagiwara
2006/0033724 A1 2/2006 Chaudhri et al.
2006/0033760 A1 2/2006 Koh
2006/0038899 A1 2/2006 Tamaru et al.
2006/0039630 A1 2/2006 Kotani
2006/0050165 A1 3/2006 Amano
2006/0050335 A1 3/2006 Dorrell et al.
2006/0053371 A1 3/2006 Anderson
2006/0054834 A1 3/2006 Kameshima
2006/0067668 A1 3/2006 Kita
2006/0072810 A1 4/2006 Scharlack et al.
2006/0085541 A1 4/2006 Cuomo et al.
2006/0087702 A1 4/2006 Satoh et al.

(56) References Cited

U.S. PATENT DOCUMENTS

2006/0109373 A1 5/2006 Kurane
2006/0115157 A1 6/2006 Mori et al.
2006/0120571 A1 6/2006 Tu et al.
2006/0133375 A1 6/2006 Napierala
2006/0133695 A1 6/2006 Obinata
2006/0138488 A1 6/2006 Kim
2006/0139460 A1 6/2006 Ozaki
2006/0153127 A1 7/2006 Lee
2006/0177150 A1 8/2006 Uyttendaele et al.
2006/0181614 A1 8/2006 Yen et al.
2006/0188132 A1 8/2006 Shigeta
2006/0192130 A1 8/2006 Yagi
2006/0192785 A1 8/2006 Marschner et al.
2006/0195252 A1 8/2006 Orr et al.
2006/0203100 A1 9/2006 Ajito et al.
2006/0212538 A1 9/2006 Sutardja
2006/0215016 A1 9/2006 Cohen et al.
2006/0222260 A1 10/2006 Sambongi et al.
2006/0225034 A1 10/2006 Peck et al.
2006/0231875 A1 10/2006 Patrick et al.
2006/0245014 A1 11/2006 Haneda
2006/0245639 A1 11/2006 Jiang et al.
2006/0262363 A1 11/2006 Henley
2006/0280343 A1 12/2006 Lee et al.
2007/0002897 A1 1/2007 Goshen et al.
2007/0004451 A1 1/2007 Anderson
2007/0019000 A1 1/2007 Motomura et al.
2007/0023798 A1 2/2007 McKee
2007/0025714 A1 2/2007 Shiraki
2007/0025717 A1 2/2007 Raskar et al.
2007/0025720 A1 2/2007 Raskar et al.
2007/0030357 A1 2/2007 Levien et al.
2007/0045433 A1 3/2007 Chapman et al.
2007/0052838 A1 3/2007 Zhang
2007/0060135 A1 3/2007 Lin
2007/0069144 A1 3/2007 Kameshima
2007/0070364 A1 3/2007 Henley
2007/0080299 A1 4/2007 Endo et al.
2007/0092137 A1 4/2007 Zhao et al.
2007/0101067 A1 5/2007 Shafi et al.
2007/0101251 A1 5/2007 Lee et al.
2007/0110305 A1 5/2007 Corcoran et al.
2007/0121182 A1 5/2007 Fukushima et al.
2007/0122034 A1 5/2007 Maor
2007/0133988 A1 6/2007 Kim et al.
2007/0136208 A1 6/2007 Hamashima et al.
2007/0145447 A1 6/2007 Lee et al.
2007/0146529 A1 6/2007 Suzuki
2007/0146538 A1 6/2007 Kakinuma et al.
2007/0165960 A1 7/2007 Yamada
2007/0171210 A1 7/2007 Chaudhri et al.
2007/0182823 A1 8/2007 Maruyama et al.
2007/0182936 A1 8/2007 Suzuki
2007/0189748 A1 8/2007 Drimbarean et al.
2007/0198931 A1 8/2007 Ono et al.
2007/0200663 A1 8/2007 White et al.
2007/0200925 A1 8/2007 Kim
2007/0201853 A1 8/2007 Petschnigg
2007/0206885 A1 9/2007 Wen
2007/0211307 A1 9/2007 Uvarov
2007/0223062 A1 9/2007 Tanaka et al.
2007/0223954 A1 9/2007 Hata
2007/0236515 A1 10/2007 Montague
2007/0236709 A1 10/2007 Mitani
2007/0242900 A1 10/2007 Chen et al.
2007/0244925 A1 10/2007 Albouze
2007/0248342 A1 10/2007 Tamminen et al.
2007/0258008 A1 11/2007 Kameshima et al.
2007/0260979 A1 11/2007 Hertzfeld et al.
2007/0263099 A1 11/2007 Motta et al.
2007/0263106 A1 11/2007 Tanaka et al.
2007/0264000 A1 11/2007 Hsieh et al.
2007/0274331 A1 11/2007 Locatelli et al.
2007/0280505 A1 12/2007 Breed
2007/0291081 A1 12/2007 Kanno et al.
2007/0296820 A1 12/2007 Lonn
2007/0297567 A1 12/2007 Takenaka et al.
2008/0001945 A1 1/2008 Kashito et al.
2008/0001950 A1 1/2008 Lin et al.
2008/0004946 A1 1/2008 Schwarz
2008/0012973 A1 1/2008 Park et al.
2008/0018763 A1 1/2008 Sato
2008/0018911 A1 1/2008 Igaki et al.
2008/0019575 A1 1/2008 Scalise et al.
2008/0019680 A1 1/2008 Kasahara et al.
2008/0025576 A1 1/2008 Li et al.
2008/0030592 A1 2/2008 Border et al.
2008/0037829 A1 2/2008 Givon
2008/0043032 A1 2/2008 Mamona et al.
2008/0043114 A1 2/2008 Sung et al.
2008/0050022 A1 2/2008 Okada et al.
2008/0052945 A1 3/2008 Matas et al.
2008/0076481 A1 3/2008 Iwasaki et al.
2008/0079842 A1 4/2008 Aoki et al.
2008/0092051 A1 4/2008 Sidon et al.
2008/0094419 A1 4/2008 Leigh et al.
2008/0105909 A1 5/2008 Ham et al.
2008/0106636 A1 5/2008 Wernersson
2008/0107411 A1 5/2008 Hope
2008/0112361 A1 5/2008 Wu
2008/0122796 A1 5/2008 Jobs et al.
2008/0122933 A1 5/2008 Murayama
2008/0129848 A1 6/2008 Yamauchi
2008/0151097 A1 6/2008 Chen et al.
2008/0158398 A1 7/2008 Yaffe et al.
2008/0158403 A1 7/2008 Itano et al.
2008/0165144 A1 7/2008 Forstall et al.
2008/0170131 A1 7/2008 Lee et al.
2008/0170158 A1 7/2008 Jung et al.
2008/0170160 A1 7/2008 Lukac
2008/0174570 A1 7/2008 Jobs et al.
2008/0180540 A1 7/2008 Kim et al.
2008/0181597 A1 7/2008 Tamura
2008/0192064 A1 8/2008 Hong et al.
2008/0192131 A1 8/2008 Kim et al.
2008/0192773 A1 8/2008 Ou et al.
2008/0192819 A1 8/2008 Ward et al.
2008/0192991 A1 8/2008 Gremse et al.
2008/0193119 A1 8/2008 Miyazaki
2008/0198219 A1 8/2008 Yoshida et al.
2008/0199172 A1 8/2008 Hamada
2008/0207322 A1 8/2008 Mizrahi
2008/0212591 A1 9/2008 Wu et al.
2008/0218611 A1 9/2008 Parulski et al.
2008/0225057 A1 9/2008 Hertzfeld et al.
2008/0266326 A1 10/2008 Porwal
2008/0269958 A1 10/2008 Filev et al.
2008/0275881 A1 11/2008 Conn et al.
2008/0278603 A1 11/2008 Lee et al.
2008/0297596 A1 12/2008 Inomata et al.
2008/0298794 A1 12/2008 Subbotin et al.
2008/0303813 A1 12/2008 Joung et al.
2008/0307363 A1 12/2008 Jalon et al.
2008/0309788 A1 12/2008 Onozawa
2008/0309810 A1 12/2008 Smith et al.
2008/0310753 A1 12/2008 Edgar
2008/0316226 A1 12/2008 Weibrecht et al.
2008/0317376 A1 12/2008 Kasperkiewicz
2009/0002335 A1 1/2009 Chaudhri
2009/0002391 A1 1/2009 Williamson et al.
2009/0002395 A1 1/2009 Yamada
2009/0002475 A1 1/2009 Jelley et al.
2009/0006626 A1 1/2009 Yamagishi
2009/0009636 A1 1/2009 Endo
2009/0015581 A1 1/2009 Hirohara
2009/0021937 A1 1/2009 Sloan et al.
2009/0027516 A1 1/2009 Suzuki
2009/0034460 A1 2/2009 Moratt et al.
2009/0040364 A1 2/2009 Rubner
2009/0041376 A1 2/2009 Carletta et al.
2009/0046928 A1 2/2009 Kwak et al.
2009/0052748 A1 2/2009 Jiang et al.
2009/0058845 A1 3/2009 Fukuda et al.
2009/0058873 A1 3/2009 Brown Elliott et al.

(56) References Cited

U.S. PATENT DOCUMENTS

2009/0058882 A1 3/2009 Adachi et al.
2009/0060379 A1 3/2009 Manabe
2009/0066782 A1 3/2009 Choi et al.
2009/0080713 A1 3/2009 Bigioi et al.
2009/0085919 A1 4/2009 Chen et al.
2009/0110274 A1 4/2009 Atanassov et al.
2009/0134433 A1 5/2009 Jung
2009/0141149 A1 6/2009 Zhang et al.
2009/0153245 A1 6/2009 Lee
2009/0160944 A1 6/2009 Trevelyan et al.
2009/0160992 A1 6/2009 Inaba et al.
2009/0166547 A1 7/2009 Endo et al.
2009/0172516 A1 7/2009 Gill
2009/0175551 A1 7/2009 Thorn
2009/0175555 A1 7/2009 Mahowald
2009/0181770 A1 7/2009 Viner et al.
2009/0185659 A1 7/2009 Ishii et al.
2009/0196236 A1 8/2009 Cai et al.
2009/0218476 A1 9/2009 Kameshima et al.
2009/0219387 A1 9/2009 Marman et al.
2009/0230290 A1 9/2009 Tashiro et al.
2009/0230312 A1 9/2009 Tashiro et al.
2009/0231468 A1 9/2009 Yasuda
2009/0237420 A1 9/2009 Lawrenz
2009/0238419 A1 9/2009 Steinberg et al.
2009/0257683 A1 10/2009 Cloud et al.
2009/0262074 A1 10/2009 Nasiri et al.
2009/0262087 A1 10/2009 Kim
2009/0268055 A1 10/2009 Hamilton, Jr. et al.
2009/0278922 A1 11/2009 Tinker et al.
2009/0295941 A1 12/2009 Nakajima et al.
2009/0303373 A1 12/2009 Yamada
2009/0304070 A1 12/2009 Lamy-Bergot et al.
2009/0309035 A1 12/2009 Kameshima
2009/0309985 A1 12/2009 Ibi
2009/0309990 A1 12/2009 Levoy et al.
2009/0309994 A1 12/2009 Inoue
2009/0322903 A1 12/2009 Hashimoto et al.
2009/0323897 A1 12/2009 Kameshima et al.
2010/0007603 A1 1/2010 Kirkup
2010/0007665 A1 1/2010 Smith et al.
2010/0010986 A1 1/2010 Icho et al.
2010/0013842 A1 1/2010 Green et al.
2010/0017545 A1 1/2010 Gildfind et al.
2010/0020822 A1 1/2010 Zerillo et al.
2010/0026836 A1 2/2010 Sugimoto
2010/0034291 A1 2/2010 Cho
2010/0066763 A1 3/2010 MacDougall et al.
2010/0066822 A1 3/2010 Steinberg et al.
2010/0073499 A1 3/2010 Gere
2010/0079491 A1 4/2010 Nonaka
2010/0079494 A1 4/2010 Sung et al.
2010/0079655 A1 4/2010 Eom et al.
2010/0092036 A1 4/2010 Das et al.
2010/0115462 A1 5/2010 Spencer et al.
2010/0115605 A1 5/2010 Beattie et al.
2010/0118038 A1 5/2010 Labour et al.
2010/0118115 A1 5/2010 Takahashi et al.
2010/0118204 A1 5/2010 Proca et al.
2010/0121964 A1 5/2010 Rowles et al.
2010/0123737 A1 5/2010 Williamson et al.
2010/0123805 A1 5/2010 Craig et al.
2010/0123929 A1 5/2010 Yoshimoto
2010/0128145 A1 5/2010 Pitts et al.
2010/0135541 A1 6/2010 Lai et al.
2010/0146446 A1 6/2010 Ahn et al.
2010/0149377 A1 6/2010 Shintani et al.
2010/0157079 A1 6/2010 Atanassov et al.
2010/0157139 A1 6/2010 Velarde et al.
2010/0160049 A1 6/2010 Oku
2010/0165178 A1 7/2010 Chou et al.
2010/0165181 A1 7/2010 Murakami et al.
2010/0172578 A1 7/2010 Reid et al.
2010/0172579 A1 7/2010 Reid et al.
2010/0182465 A1 7/2010 Okita
2010/0183071 A1 7/2010 Segall et al.
2010/0194851 A1 8/2010 Pasupaleti et al.
2010/0194963 A1 8/2010 Terashima
2010/0201831 A1 8/2010 Weinstein
2010/0201846 A1 8/2010 Silverbrook
2010/0208099 A1 8/2010 Nomura
2010/0214320 A1 8/2010 Mo
2010/0215259 A1 8/2010 Scalise et al.
2010/0218113 A1 8/2010 White et al.
2010/0220933 A1 9/2010 Takano et al.
2010/0231747 A1 9/2010 Yim
2010/0231761 A1 9/2010 Yanai
2010/0257239 A1 10/2010 Roberts
2010/0265079 A1 10/2010 Yin
2010/0278452 A1 11/2010 Sarkijarvi et al.
2010/0299630 A1 11/2010 McCutchen et al.
2010/0302278 A1 12/2010 Shaffer et al.
2010/0302407 A1 12/2010 Ayers et al.
2010/0302408 A1 12/2010 Ito
2010/0315656 A1 12/2010 Agata
2010/0317332 A1 12/2010 Bathiche et al.
2010/0321439 A1 12/2010 Kanno et al.
2010/0322074 A1 12/2010 Nakahira
2010/0328442 A1 12/2010 Yang et al.
2010/0328486 A1 12/2010 Steinberg et al.
2010/0329564 A1 12/2010 Hervas et al.
2010/0333044 A1 12/2010 Kethireddy
2011/0012914 A1 1/2011 Nakamura et al.
2011/0013042 A1 1/2011 Itano et al.
2011/0013043 A1 1/2011 Corcoran et al.
2011/0013052 A1 1/2011 Yanai
2011/0019051 A1 1/2011 Yin et al.
2011/0019094 A1 1/2011 Rossignol et al.
2011/0029635 A1 2/2011 Shkurko et al.
2011/0032384 A1 2/2011 Ono
2011/0036986 A1 2/2011 Tashiro et al.
2011/0037712 A1 2/2011 Kim et al.
2011/0037777 A1 2/2011 Lindahl et al.
2011/0057880 A1 3/2011 Kasahara
2011/0058060 A1 3/2011 Bigioi et al.
2011/0058237 A1 3/2011 Mikami
2011/0071911 A1 3/2011 Tung et al.
2011/0074973 A1 3/2011 Hayashi
2011/0085061 A1 4/2011 Kim
2011/0090256 A1 4/2011 Manchester
2011/0090385 A1 4/2011 Aoyama et al.
2011/0095169 A1 4/2011 Takenaka et al.
2011/0096192 A1 4/2011 Niikura
2011/0096375 A1 4/2011 Mikami
2011/0102631 A1 5/2011 Kim et al.
2011/0105229 A1 5/2011 Sitrick
2011/0115893 A1 5/2011 Hayashi
2011/0115971 A1 5/2011 Furuya et al.
2011/0123118 A1 5/2011 Nayar et al.
2011/0131041 A1 6/2011 Cortez et al.
2011/0131331 A1 6/2011 Brunson et al.
2011/0134267 A1 6/2011 Ohya
2011/0134283 A1 6/2011 Ryu
2011/0134297 A1 6/2011 Takeda
2011/0145694 A1 6/2011 Graves et al.
2011/0150332 A1 6/2011 Sibiryakov et al.
2011/0150357 A1* 6/2011 Prentice ................ H04N 23/70
382/274
2011/0157412 A1 6/2011 Yoshida
2011/0158473 A1 6/2011 Sun et al.
2011/0167382 A1 7/2011 van Os
2011/0185296 A1 7/2011 Lanier et al.
2011/0187749 A1 8/2011 Dehmann et al.
2011/0193982 A1 8/2011 Kook et al.
2011/0194618 A1 8/2011 Gish et al.
2011/0199519 A1 8/2011 Yamauchi
2011/0205395 A1 8/2011 Levy
2011/0205411 A1 8/2011 Voronov
2011/0212717 A1 9/2011 Rhoads et al.
2011/0221758 A1 9/2011 Livingston
2011/0221911 A1 9/2011 Kang
2011/0221935 A1 9/2011 Kameshima
2011/0227923 A1 9/2011 Mariani et al.
2011/0242334 A1 10/2011 Wilburn et al.

(56) References Cited

U.S. PATENT DOCUMENTS

2011/0249086 A1 10/2011 Guo et al.
2011/0254792 A1 10/2011 Waters et al.
2011/0254860 A1 10/2011 Zontrop et al.
2011/0256886 A1 10/2011 Velusamy
2011/0261075 A1 10/2011 Tanaka
2011/0279698 A1 11/2011 Yoshikawa
2011/0279699 A1 11/2011 Matsui
2011/0280541 A1 11/2011 Lee
2011/0283346 A1 11/2011 Li et al.
2011/0286658 A1 11/2011 Mitsui
2011/0292242 A1 12/2011 Imai
2011/0298828 A1 12/2011 Suzuki
2011/0298982 A1 12/2011 Kobayashi
2011/0299741 A1 12/2011 Zhang et al.
2011/0304613 A1 12/2011 Thoresson
2011/0304752 A1 12/2011 Lee et al.
2011/0310094 A1 12/2011 Park et al.
2011/0311150 A1 12/2011 Okamoto
2011/0312376 A1 12/2011 Woo et al.
2011/0316859 A1 12/2011 Nikula et al.
2011/0316888 A1 12/2011 Sachs et al.
2011/0317005 A1 12/2011 Atkinson
2011/0317917 A1 12/2011 Free
2012/0001943 A1 1/2012 Ishidera
2012/0002082 A1 1/2012 Johnson et al.
2012/0002089 A1 1/2012 Wang et al.
2012/0007859 A1 1/2012 Lee et al.
2012/0007908 A1 1/2012 Masuda
2012/0008011 A1 1/2012 Garcia Manchado
2012/0026359 A1 2/2012 Fukushima et al.
2012/0033118 A1 2/2012 Lee et al.
2012/0033262 A1 2/2012 Sakurai
2012/0036051 A1 2/2012 Sachson
2012/0038635 A1 2/2012 Stamate et al.
2012/0044266 A1 2/2012 Mori
2012/0044543 A1 2/2012 Mikami
2012/0056889 A1 3/2012 Carter et al.
2012/0057051 A1 3/2012 Ito et al.
2012/0057064 A1 3/2012 Gardiner et al.
2012/0057786 A1 3/2012 Yano
2012/0066355 A1 3/2012 Tiwari et al.
2012/0068051 A1 3/2012 Ahn et al.
2012/0069213 A1 3/2012 Jannard et al.
2012/0075285 A1 3/2012 Oyagi et al.
2012/0075492 A1 3/2012 Nanu et al.
2012/0081382 A1 4/2012 Lindahl et al.
2012/0104267 A1 5/2012 Matsumoto et al.
2012/0105579 A1 5/2012 Jeon et al.
2012/0105584 A1 5/2012 Gallagher et al.
2012/0113092 A1 5/2012 Bar-Zeev et al.
2012/0113106 A1 5/2012 Choi et al.
2012/0117499 A1 5/2012 Mori et al.
2012/0120304 A1 5/2012 Corcoran et al.
2012/0127072 A1 5/2012 Kim
2012/0127333 A1 5/2012 Maruyama et al.
2012/0133745 A1 5/2012 Takizawa
2012/0139904 A1 6/2012 Lee et al.
2012/0144347 A1 6/2012 Jo et al.
2012/0154276 A1 6/2012 Shin et al.
2012/0154541 A1 6/2012 Scott
2012/0154627 A1 6/2012 Rivard et al.
2012/0154628 A1 6/2012 Horiuchi
2012/0159372 A1 6/2012 Stallings et al.
2012/0162251 A1 6/2012 Minamino et al.
2012/0162263 A1 6/2012 Griffin et al.
2012/0162465 A1 6/2012 Culbert et al.
2012/0172088 A1 7/2012 Kirch et al.
2012/0173889 A1 7/2012 Wong et al.
2012/0176413 A1 7/2012 Kulik et al.
2012/0176474 A1 7/2012 Border
2012/0176477 A1 7/2012 Givon
2012/0177352 A1 7/2012 Pillman et al.
2012/0182394 A1 7/2012 Bae et al.
2012/0188386 A1 7/2012 Kulkarni et al.
2012/0188392 A1 7/2012 Smith
2012/0194545 A1 8/2012 Shibata et al.
2012/0194905 A1 8/2012 Ushio et al.
2012/0200731 A1 8/2012 Park et al.
2012/0206488 A1 8/2012 Wong et al.
2012/0206506 A1 8/2012 Kim et al.
2012/0206582 A1 8/2012 DiCarlo et al.
2012/0210275 A1 8/2012 Park et al.
2012/0212661 A1 8/2012 Yamaguchi et al.
2012/0213407 A1 8/2012 Haikin et al.
2012/0218290 A1 8/2012 Waschbuesch et al.
2012/0224042 A1 9/2012 Saijo
2012/0224788 A1 9/2012 Jia et al.
2012/0226800 A1 9/2012 Baratakke et al.
2012/0229370 A1 9/2012 Stroffolino et al.
2012/0242683 A1 9/2012 Asai
2012/0242844 A1 9/2012 Walker et al.
2012/0242886 A1 9/2012 Kawarada
2012/0250082 A1 10/2012 Mori
2012/0250952 A1 10/2012 Kveton et al.
2012/0254808 A1 10/2012 Gildfind
2012/0256959 A1 10/2012 Ye et al.
2012/0262450 A1 10/2012 Aiba
2012/0262600 A1 10/2012 Velarde et al.
2012/0273651 A1 11/2012 Willassen
2012/0274661 A1 11/2012 Ye et al.
2012/0274806 A1 11/2012 Mori
2012/0277914 A1 11/2012 Crow et al.
2012/0278727 A1 11/2012 Ananthakrishnan et al.
2012/0287223 A1 11/2012 Zhang et al.
2012/0293556 A1 11/2012 Kim et al.
2012/0294533 A1 11/2012 Ikenoue
2012/0299964 A1 11/2012 Homma et al.
2012/0307096 A1 12/2012 Ford et al.
2012/0307097 A1 12/2012 Araoka et al.
2012/0307100 A1 12/2012 Iwane
2012/0314100 A1 12/2012 Frank
2012/0314124 A1 12/2012 Kaizu et al.
2012/0324400 A1 12/2012 Caliendo, Jr. et al.
2013/0001402 A1 1/2013 Ogushi
2013/0001429 A1 1/2013 Dowaki et al.
2013/0002932 A1 1/2013 Guenter et al.
2013/0006953 A1 1/2013 Epshtein et al.
2013/0010075 A1 1/2013 Gallagher et al.
2013/0010138 A1 1/2013 Bigioi et al.
2013/0011039 A1 1/2013 Kadir et al.
2013/0016122 A1 1/2013 Bhatt et al.
2013/0016222 A1 1/2013 Jiang et al.
2013/0019196 A1 1/2013 Bhatt
2013/0021358 A1 1/2013 Nordlund et al.
2013/0021377 A1 1/2013 Doll
2013/0021447 A1 1/2013 Brisedoux et al.
2013/0026349 A1 1/2013 Kinugasa
2013/0027580 A1 1/2013 Olsen et al.
2013/0038634 A1 2/2013 Yamada et al.
2013/0044237 A1 2/2013 Ikizyan et al.
2013/0050460 A1 2/2013 Steinberg et al.
2013/0050520 A1 2/2013 Takeuchi
2013/0050551 A1 2/2013 Ichikawa
2013/0057713 A1 3/2013 Khawand
2013/0058436 A1 3/2013 Kim et al.
2013/0063571 A1 3/2013 Ishii
2013/0063633 A1 3/2013 Hayashi et al.
2013/0067093 A1 3/2013 Moreno et al.
2013/0069988 A1 3/2013 Kamei et al.
2013/0069989 A1 3/2013 Nagata et al.
2013/0070111 A1 3/2013 Ohtsuka
2013/0070145 A1 3/2013 Matsuyama
2013/0101219 A1 4/2013 Bosworth et al.
2013/0101220 A1 4/2013 Bosworth et al.
2013/0107062 A1 5/2013 Okazaki
2013/0108123 A1 5/2013 Hwang et al.
2013/0111337 A1 5/2013 Deng et al.
2013/0111369 A1 5/2013 Pasquero et al.
2013/0114853 A1 5/2013 Sengupta et al.
2013/0114894 A1 5/2013 Yadav et al.
2013/0120011 A1 5/2013 Yamazaki et al.
2013/0120256 A1 5/2013 Ishidera et al.
2013/0120607 A1 5/2013 Manabe
2013/0129142 A1 5/2013 Miranda-Steiner

(56) References Cited

U.S. PATENT DOCUMENTS

2013/0129209 A1 5/2013 Reid et al.
2013/0132903 A1 5/2013 Krishnaswamy
2013/0135447 A1 5/2013 Kim
2013/0140435 A1 6/2013 Kikuchi
2013/0141456 A1 6/2013 Sokolov et al.
2013/0141464 A1 6/2013 Hunt et al.
2013/0147979 A1* 6/2013 McMahon ............. H04N 25/00 348/218.1
2013/0148013 A1 6/2013 Shiohara
2013/0154978 A1 6/2013 Kim et al.
2013/0162542 A1 6/2013 Badali et al.
2013/0162848 A1 6/2013 Miyasako
2013/0162874 A1* 6/2013 Hashimoto ............ H04N 25/60 348/300
2013/0176222 A1 7/2013 Tanaka
2013/0176442 A1 7/2013 Shuster et al.
2013/0176458 A1 7/2013 Van Dalen et al.
2013/0179308 A1 7/2013 Agustin et al.
2013/0179831 A1 7/2013 Izaki
2013/0187934 A1 7/2013 Kim et al.
2013/0188069 A1 7/2013 Sendik et al.
2013/0188886 A1 7/2013 Petrou et al.
2013/0194963 A1 8/2013 Hampel
2013/0196653 A1 8/2013 Morrison
2013/0201217 A1 8/2013 Morinaga et al.
2013/0205244 A1 8/2013 Decker et al.
2013/0215113 A1 8/2013 Corazza et al.
2013/0222231 A1 8/2013 Gardenfors et al.
2013/0222275 A1 8/2013 Byrd et al.
2013/0222516 A1 8/2013 Do et al.
2013/0222646 A1 8/2013 Tsubota et al.
2013/0223530 A1 8/2013 Demos
2013/0227469 A1 8/2013 Park
2013/0228673 A1 9/2013 Hashimoto et al.
2013/0235068 A1 9/2013 Ubillos et al.
2013/0235069 A1 9/2013 Ubillos et al.
2013/0235071 A1 9/2013 Ubillos et al.
2013/0235081 A1 9/2013 Ishibashi
2013/0239057 A1 9/2013 Ubillos et al.
2013/0239154 A1 9/2013 Bagasra
2013/0240710 A1 9/2013 Choi
2013/0241442 A1 9/2013 Trattler
2013/0243271 A1 9/2013 Kawahara et al.
2013/0251202 A1 9/2013 Auberger et al.
2013/0257877 A1 10/2013 Davis
2013/0258040 A1 10/2013 Kaytaz et al.
2013/0258044 A1 10/2013 Betts-Lacroix
2013/0258118 A1 10/2013 Felt
2013/0262258 A1 10/2013 Jennings
2013/0262486 A1 10/2013 O'Dell et al.
2013/0271622 A1 10/2013 Tatsumi
2013/0271631 A1 10/2013 Tatsuzawa et al.
2013/0277534 A1 10/2013 Watanabe
2013/0278482 A1 10/2013 Hsu
2013/0278798 A1 10/2013 Hattori
2013/0278819 A1 10/2013 Liaw
2013/0278979 A1 10/2013 Mikami
2013/0279584 A1 10/2013 Demos
2013/0286876 A1 10/2013 Moratt et al.
2013/0287265 A1 10/2013 Nepomniachtchi et al.
2013/0293502 A1 11/2013 Kitatani
2013/0293744 A1 11/2013 Attar et al.
2013/0294688 A1 11/2013 Auberger et al.
2013/0301729 A1 11/2013 Demos
2013/0301885 A1 11/2013 Mori et al.
2013/0303247 A1 11/2013 Wu et al.
2013/0307999 A1 11/2013 Motta
2013/0314576 A1 11/2013 Suzuki et al.
2013/0321671 A1 12/2013 Cote et al.
2013/0326422 A1 12/2013 Kang et al.
2013/0328864 A1 12/2013 Lee et al.
2013/0328935 A1 12/2013 Tu
2013/0329015 A1 12/2013 Pulli et al.
2013/0335317 A1 12/2013 Liu et al.
2013/0335596 A1 12/2013 Demandolx et al.
2013/0336600 A1 12/2013 Bitouk et al.
2013/0342526 A1 12/2013 Ng et al.
2013/0342739 A1 12/2013 Yanowitz et al.
2013/0342740 A1 12/2013 Govindarao
2014/0001340 A1 1/2014 Takenaka et al.
2014/0002606 A1 1/2014 Blayvas et al.
2014/0002718 A1 1/2014 Spielberg
2014/0009636 A1 1/2014 Lee et al.
2014/0009664 A1 1/2014 Kinugasa
2014/0016001 A1 1/2014 Ichikawa
2014/0028894 A1 1/2014 Lee et al.
2014/0036118 A1 2/2014 Dowaki et al.
2014/0036121 A1 2/2014 Minowa et al.
2014/0043628 A1 2/2014 Kishino et al.
2014/0055494 A1 2/2014 Mikawa
2014/0055638 A1 2/2014 Son et al.
2014/0063287 A1 3/2014 Yamada
2014/0063301 A1 3/2014 Solhusvik
2014/0063611 A1 3/2014 Raymond et al.
2014/0070965 A1 3/2014 Letsu-Dake
2014/0075286 A1 3/2014 Harada
2014/0075372 A1 3/2014 Wu et al.
2014/0078171 A1 3/2014 Miyatake et al.
2014/0079279 A1 3/2014 Pulli et al.
2014/0085339 A1 3/2014 Brady et al.
2014/0085422 A1 3/2014 Aronsson et al.
2014/0085430 A1 3/2014 Komori et al.
2014/0085508 A1 3/2014 Ichikawa
2014/0096064 A1 4/2014 Suzuki
2014/0098118 A1 4/2014 Liu et al.
2014/0098248 A1 4/2014 Okazaki
2014/0098259 A1 4/2014 Song et al.
2014/0111548 A1 4/2014 Shin
2014/0111657 A1 4/2014 Weatherford et al.
2014/0112299 A1 4/2014 Frank et al.
2014/0118256 A1 5/2014 Sonoda et al.
2014/0118579 A1 5/2014 Kim et al.
2014/0119290 A1 5/2014 Grewal et al.
2014/0125856 A1 5/2014 Kim et al.
2014/0129966 A1 5/2014 Kolesnikov et al.
2014/0132735 A1 5/2014 Lee et al.
2014/0140630 A1 5/2014 Hwang et al.
2014/0146210 A1 5/2014 Lee et al.
2014/0153900 A1 6/2014 Tanaka
2014/0160333 A1 6/2014 Takeda
2014/0161351 A1 6/2014 Yagnik
2014/0168271 A1 6/2014 Yu et al.
2014/0168468 A1 6/2014 Levoy et al.
2014/0176458 A1 6/2014 Matsuda
2014/0176750 A1 6/2014 Pajak et al.
2014/0176757 A1 6/2014 Rivard et al.
2014/0176759 A1 6/2014 Goto
2014/0176774 A1 6/2014 Morimoto
2014/0177008 A1 6/2014 Raymond et al.
2014/0181089 A1 6/2014 Desmond et al.
2014/0184865 A1* 7/2014 Muto ..................... H04N 25/78 348/300
2014/0184894 A1 7/2014 Motta
2014/0186050 A1 7/2014 Oshima et al.
2014/0189181 A1 7/2014 Cheng et al.
2014/0192216 A1 7/2014 Matsumoto
2014/0192267 A1 7/2014 Biswas et al.
2014/0193088 A1 7/2014 Capata et al.
2014/0197302 A1 7/2014 Araoka et al.
2014/0198242 A1 7/2014 Weng et al.
2014/0204084 A1 7/2014 Corazza et al.
2014/0208208 A1 7/2014 Chevallier et al.
2014/0210754 A1 7/2014 Ryu et al.
2014/0210847 A1 7/2014 Knibbeler et al.
2014/0211852 A1 7/2014 Demos
2014/0215365 A1 7/2014 Hiraga et al.
2014/0219517 A1 8/2014 Mishra et al.
2014/0219526 A1 8/2014 Linguraru et al.
2014/0232449 A1 8/2014 Shin
2014/0240453 A1 8/2014 Kim et al.
2014/0240543 A1 8/2014 Kim et al.
2014/0244858 A1 8/2014 Okazaki
2014/0247342 A1 9/2014 Ellenby et al.
2014/0247870 A1 9/2014 Mertens

(56) References Cited

U.S. PATENT DOCUMENTS

| | | | |
|---|---|---|---|
| 2014/0247979 | A1 | 9/2014 | Roffet et al. |
| 2014/0253752 | A1 | 9/2014 | Kawano et al. |
| 2014/0258674 | A1 | 9/2014 | Kim et al. |
| 2014/0267833 | A1 | 9/2014 | Chen et al. |
| 2014/0267869 | A1 | 9/2014 | Sawa |
| 2014/0269550 | A1 | 9/2014 | Webb |
| 2014/0270543 | A1 | 9/2014 | Zhang et al. |
| 2014/0279181 | A1 | 9/2014 | Wills |
| 2014/0283113 | A1 | 9/2014 | Hanna |
| 2014/0289360 | A1 | 9/2014 | Mahkovec et al. |
| 2014/0298323 | A1 | 10/2014 | Stolberg et al. |
| 2014/0300795 | A1 | 10/2014 | Bilcu et al. |
| 2014/0301642 | A1 | 10/2014 | Muninder |
| 2014/0306899 | A1 | 10/2014 | Hicks |
| 2014/0307001 | A1 | 10/2014 | Aizawa |
| 2014/0307117 | A1 | 10/2014 | Feng et al. |
| 2014/0307126 | A1 | 10/2014 | Son et al. |
| 2014/0310788 | A1 | 10/2014 | Ricci |
| 2014/0317295 | A1 | 10/2014 | Martini |
| 2014/0320720 | A1 | 10/2014 | Ohshitanai |
| 2014/0337791 | A1 | 11/2014 | Agnetta et al. |
| 2014/0340428 | A1 | 11/2014 | Shibayama |
| 2014/0351687 | A1 | 11/2014 | Hall |
| 2014/0354781 | A1 | 12/2014 | Matsuyama |
| 2014/0359517 | A1 | 12/2014 | Elings et al. |
| 2014/0359656 | A1 | 12/2014 | Banica et al. |
| 2014/0362117 | A1 | 12/2014 | Paulson |
| 2014/0364241 | A1 | 12/2014 | Oku |
| 2014/0365977 | A1 | 12/2014 | Elyada et al. |
| 2014/0372914 | A1 | 12/2014 | Byrd et al. |
| 2014/0373123 | A1 | 12/2014 | Kang |
| 2014/0375837 | A1 | 12/2014 | Ichihara |
| 2014/0375854 | A1 | 12/2014 | Mandelli |
| 2015/0005637 | A1 | 1/2015 | Stegman et al. |
| 2015/0015740 | A1 | 1/2015 | Cho et al. |
| 2015/0015774 | A1 | 1/2015 | Sugie |
| 2015/0016693 | A1 | 1/2015 | Gattuso |
| 2015/0016735 | A1 | 1/2015 | Kikuchi |
| 2015/0025359 | A1 | 1/2015 | Fenchel et al. |
| 2015/0026101 | A1 | 1/2015 | Lin et al. |
| 2015/0029226 | A1 | 1/2015 | Feder et al. |
| 2015/0030242 | A1 | 1/2015 | Shen |
| 2015/0030246 | A1 | 1/2015 | Wilensky et al. |
| 2015/0035991 | A1 | 2/2015 | Sachs et al. |
| 2015/0042669 | A1 | 2/2015 | Van Nostrand et al. |
| 2015/0042743 | A1 | 2/2015 | Cullen |
| 2015/0049119 | A1 | 2/2015 | Homma et al. |
| 2015/0054966 | A1 | 2/2015 | Wang |
| 2015/0055835 | A1 | 2/2015 | Ozawa |
| 2015/0060646 | A1 | 3/2015 | Choi et al. |
| 2015/0062038 | A1 | 3/2015 | Taniuchi |
| 2015/0062044 | A1 | 3/2015 | Chen et al. |
| 2015/0062368 | A1 | 3/2015 | Li |
| 2015/0063694 | A1 | 3/2015 | Shroff et al. |
| 2015/0067600 | A1 | 3/2015 | Steinberg et al. |
| 2015/0070458 | A1 | 3/2015 | Kim et al. |
| 2015/0077326 | A1 | 3/2015 | Kramer et al. |
| 2015/0077581 | A1 | 3/2015 | Baltz et al. |
| 2015/0077603 | A1 | 3/2015 | Matsuzawa et al. |
| 2015/0078661 | A1 | 3/2015 | Granados et al. |
| 2015/0084885 | A1 | 3/2015 | Kawamoto |
| 2015/0085184 | A1 | 3/2015 | Vidal et al. |
| 2015/0091945 | A1 | 4/2015 | Uratani et al. |
| 2015/0092019 | A1 | 4/2015 | Asano et al. |
| 2015/0092073 | A1 | 4/2015 | Park |
| 2015/0092077 | A1 | 4/2015 | Feder et al. |
| 2015/0092852 | A1 | 4/2015 | Demos |
| 2015/0093044 | A1 | 4/2015 | Feder et al. |
| 2015/0095775 | A1 | 4/2015 | Lewis et al. |
| 2015/0098014 | A1 | 4/2015 | Raskar et al. |
| 2015/0098651 | A1 | 4/2015 | Rivard et al. |
| 2015/0103192 | A1 | 4/2015 | Venkatraman et al. |
| 2015/0109505 | A1 | 4/2015 | Sakuragi |
| 2015/0113368 | A1 | 4/2015 | Flider |
| 2015/0113370 | A1 | 4/2015 | Flider |
| 2015/0113371 | A1 | 4/2015 | Flider |
| 2015/0116365 | A1 | 4/2015 | Ding |
| 2015/0116523 | A1 | 4/2015 | Sinha et al. |
| 2015/0117786 | A1 | 4/2015 | James et al. |
| 2015/0127775 | A1 | 5/2015 | Munagala et al. |
| 2015/0130907 | A1 | 5/2015 | Kim et al. |
| 2015/0130978 | A1 | 5/2015 | Tashiro et al. |
| 2015/0138366 | A1 | 5/2015 | Keelan et al. |
| 2015/0142182 | A1 | 5/2015 | Kimura et al. |
| 2015/0146079 | A1 | 5/2015 | Kim |
| 2015/0146979 | A1 | 5/2015 | Paliy et al. |
| 2015/0169166 | A1 | 6/2015 | Kim et al. |
| 2015/0169940 | A1 | 6/2015 | Kang et al. |
| 2015/0172573 | A1 | 6/2015 | Wang et al. |
| 2015/0178977 | A1 | 6/2015 | Kontkanen |
| 2015/0189161 | A1 | 7/2015 | Chun et al. |
| 2015/0193912 | A1 | 7/2015 | Yuasa |
| 2015/0195330 | A1 | 7/2015 | Lee |
| 2015/0195469 | A1 | 7/2015 | Kim |
| 2015/0199022 | A1 | 7/2015 | Gottesman et al. |
| 2015/0205236 | A1 | 7/2015 | Saito et al. |
| 2015/0207920 | A1 | 7/2015 | Choi et al. |
| 2015/0213784 | A1 | 7/2015 | Jafarzadeh et al. |
| 2015/0215526 | A1 | 7/2015 | Jafarzadeh et al. |
| 2015/0215532 | A1 | 7/2015 | Jafarzadeh et al. |
| 2015/0222809 | A1 | 8/2015 | Osuka et al. |
| 2015/0222836 | A1 | 8/2015 | Wada et al. |
| 2015/0229819 | A1 | 8/2015 | Rivard et al. |
| 2015/0229898 | A1 | 8/2015 | Rivard et al. |
| 2015/0235073 | A1 | 8/2015 | Hua et al. |
| 2015/0244980 | A1 | 8/2015 | Matthews |
| 2015/0249795 | A1 | 9/2015 | Cho et al. |
| 2015/0249810 | A1 | 9/2015 | Sasaki |
| 2015/0254502 | A1 | 9/2015 | Lim et al. |
| 2015/0256752 | A1 | 9/2015 | Ninan et al. |
| 2015/0264273 | A1 | 9/2015 | Feder et al. |
| 2015/0269423 | A1 | 9/2015 | Nakagome et al. |
| 2015/0278853 | A1 | 10/2015 | McLaughlin et al. |
| 2015/0278999 | A1 | 10/2015 | Summers et al. |
| 2015/0279113 | A1 | 10/2015 | Knorr et al. |
| 2015/0281606 | A1 | 10/2015 | Livneh et al. |
| 2015/0287189 | A1 | 10/2015 | Hirai et al. |
| 2015/0288870 | A1 | 10/2015 | Nagaraja et al. |
| 2015/0296145 | A1 | 10/2015 | Hwang et al. |
| 2015/0302587 | A1 | 10/2015 | Hirano et al. |
| 2015/0304478 | A1 | 10/2015 | Kim et al. |
| 2015/0310261 | A1 | 10/2015 | Lee et al. |
| 2015/0312397 | A1 | 10/2015 | Chiang |
| 2015/0312492 | A1 | 10/2015 | Kim |
| 2015/0312553 | A1 | 10/2015 | Ng et al. |
| 2015/0324983 | A1 | 11/2015 | Takasugi et al. |
| 2015/0334318 | A1 | 11/2015 | Georgiev et al. |
| 2015/0339002 | A1 | 11/2015 | Arnold et al. |
| 2015/0339006 | A1 | 11/2015 | Chaland et al. |
| 2015/0341536 | A1 | 11/2015 | Huang et al. |
| 2015/0341593 | A1 | 11/2015 | Zhang et al. |
| 2015/0350516 | A1 | 12/2015 | Rivard et al. |
| 2015/0350562 | A1 | 12/2015 | Hubel et al. |
| 2015/0363915 | A1 | 12/2015 | Li et al. |
| 2015/0363922 | A1 | 12/2015 | Elliott et al. |
| 2015/0370399 | A1 | 12/2015 | Kim et al. |
| 2015/0373414 | A1 | 12/2015 | Kinoshita |
| 2015/0379690 | A1 | 12/2015 | Stepanov et al. |
| 2016/0006949 | A1 | 1/2016 | Kim et al. |
| 2016/0006987 | A1 | 1/2016 | Li et al. |
| 2016/0014312 | A1 | 1/2016 | Nikkanen et al. |
| 2016/0014421 | A1 | 1/2016 | Cote et al. |
| 2016/0026658 | A1 | 1/2016 | Krishnaraj et al. |
| 2016/0027150 | A1 | 1/2016 | Lee et al. |
| 2016/0028948 | A1 | 1/2016 | Omori et al. |
| 2016/0028960 | A1 | 1/2016 | Ko et al. |
| 2016/0034166 | A1 | 2/2016 | Wilson et al. |
| 2016/0034167 | A1 | 2/2016 | Wilson et al. |
| 2016/0037101 | A1 | 2/2016 | Shim et al. |
| 2016/0044258 | A1 | 2/2016 | Kim et al. |
| 2016/0044293 | A1 | 2/2016 | Rivard et al. |
| 2016/0050377 | A1 | 2/2016 | Hizi et al. |
| 2016/0054851 | A1 | 2/2016 | Kim et al. |
| 2016/0057348 | A1 | 2/2016 | Liang et al. |

(56) References Cited

U.S. PATENT DOCUMENTS

| | | | |
|---|---|---|---|
| 2016/0062515 | A1 | 3/2016 | Bae et al. |
| 2016/0062615 | A1 | 3/2016 | Price et al. |
| 2016/0062645 | A1 | 3/2016 | Masuko |
| 2016/0065926 | A1 | 3/2016 | Nonaka et al. |
| 2016/0070963 | A1 | 3/2016 | Chakraborty et al. |
| 2016/0071241 | A1 | 3/2016 | Karunamuni et al. |
| 2016/0071289 | A1 | 3/2016 | Kobayashi et al. |
| 2016/0086318 | A1 | 3/2016 | Hannuksela et al. |
| 2016/0092472 | A1 | 3/2016 | Feder et al. |
| 2016/0093273 | A1 | 3/2016 | Wang et al. |
| 2016/0110168 | A1 | 4/2016 | Feder et al. |
| 2016/0119525 | A1 | 4/2016 | Wolf |
| 2016/0132130 | A1 | 5/2016 | Lu |
| 2016/0133037 | A1 | 5/2016 | Vemulapalli et al. |
| 2016/0139774 | A1 | 5/2016 | Rivard et al. |
| 2016/0140702 | A1 | 5/2016 | Kindle et al. |
| 2016/0142610 | A1 | 5/2016 | Rivard et al. |
| 2016/0143040 | A1 | 5/2016 | Rivard et al. |
| 2016/0148551 | A1 | 5/2016 | Jian |
| 2016/0148648 | A1 | 5/2016 | Dimson et al. |
| 2016/0150147 | A1 | 5/2016 | Shioya |
| 2016/0150175 | A1 | 5/2016 | Hynecek |
| 2016/0154994 | A1 | 6/2016 | Kim et al. |
| 2016/0157587 | A1 | 6/2016 | Yamanashi et al. |
| 2016/0163289 | A1 | 6/2016 | Masuko |
| 2016/0165135 | A1 | 6/2016 | Lee et al. |
| 2016/0170608 | A1 | 6/2016 | Zambetti et al. |
| 2016/0173782 | A1 | 6/2016 | Dimson et al. |
| 2016/0179387 | A1 | 6/2016 | Gaur et al. |
| 2016/0180567 | A1 | 6/2016 | Lee |
| 2016/0182874 | A1 | 6/2016 | Richards et al. |
| 2016/0191973 | A1 | 6/2016 | Joy et al. |
| 2016/0196042 | A1 | 7/2016 | Laute et al. |
| 2016/0202866 | A1 | 7/2016 | Zambetti et al. |
| 2016/0202872 | A1 | 7/2016 | Jang et al. |
| 2016/0210716 | A1 | 7/2016 | Ghosh et al. |
| 2016/0219211 | A1 | 7/2016 | Katayama |
| 2016/0231883 | A1 | 8/2016 | Zambetti et al. |
| 2016/0232419 | A1 | 8/2016 | Bai et al. |
| 2016/0240168 | A1 | 8/2016 | Keal et al. |
| 2016/0248968 | A1 | 8/2016 | Baldwin |
| 2016/0269624 | A1 | 9/2016 | Jeong et al. |
| 2016/0274622 | A1 | 9/2016 | Braun et al. |
| 2016/0274768 | A1 | 9/2016 | Tian et al. |
| 2016/0275650 | A1 | 9/2016 | Case et al. |
| 2016/0277656 | A1 | 9/2016 | Tsunoda |
| 2016/0284065 | A1 | 9/2016 | Cohen |
| 2016/0292905 | A1 | 10/2016 | Nehmadi et al. |
| 2016/0313781 | A1 | 10/2016 | Jeon et al. |
| 2016/0315830 | A1 | 10/2016 | Cote et al. |
| 2016/0316154 | A1 | 10/2016 | Elmfors et al. |
| 2016/0316156 | A1 | 10/2016 | Ohshitanai |
| 2016/0323518 | A1 | 11/2016 | Rivard et al. |
| 2016/0330383 | A1 | 11/2016 | Oyama |
| 2016/0342863 | A1 | 11/2016 | Kwon et al. |
| 2016/0344927 | A1 | 11/2016 | Brasket et al. |
| 2016/0350587 | A1 | 12/2016 | Bataller et al. |
| 2016/0352996 | A1 | 12/2016 | Qian et al. |
| 2016/0353017 | A1 | 12/2016 | Kim et al. |
| 2016/0357420 | A1 | 12/2016 | Wilson et al. |
| 2016/0366331 | A1 | 12/2016 | Barron et al. |
| 2016/0371824 | A1 | 12/2016 | Feder et al. |
| 2016/0372507 | A1 | 12/2016 | Yang et al. |
| 2016/0373362 | A1 | 12/2016 | Cheng et al. |
| 2016/0373653 | A1 | 12/2016 | Park et al. |
| 2016/0381304 | A9 | 12/2016 | Feder et al. |
| 2016/0381348 | A1 | 12/2016 | Hayasaka et al. |
| 2017/0006322 | A1 | 1/2017 | Dury et al. |
| 2017/0011745 | A1 | 1/2017 | Navaratnam |
| 2017/0019617 | A1 | 1/2017 | Dowaki et al. |
| 2017/0026562 | A1 | 1/2017 | Rivard et al. |
| 2017/0032181 | A1 | 2/2017 | Hu |
| 2017/0034403 | A1 | 2/2017 | Seo et al. |
| 2017/0039750 | A1 | 2/2017 | Tong et al. |
| 2017/0048442 | A1 | 2/2017 | Cote et al. |
| 2017/0048449 | A1 | 2/2017 | Chen et al. |
| 2017/0052604 | A1 | 2/2017 | Hunt et al. |
| 2017/0054966 | A1 | 2/2017 | Zhou et al. |
| 2017/0055101 | A1 | 2/2017 | Studerus et al. |
| 2017/0061234 | A1 | 3/2017 | Lim et al. |
| 2017/0061236 | A1 | 3/2017 | Pope |
| 2017/0061567 | A1 | 3/2017 | Lim et al. |
| 2017/0061669 | A1 | 3/2017 | Hirano et al. |
| 2017/0064192 | A1 | 3/2017 | Mori |
| 2017/0064204 | A1 | 3/2017 | Sapiro et al. |
| 2017/0064227 | A1 | 3/2017 | Lin et al. |
| 2017/0064276 | A1 | 3/2017 | Rivard et al. |
| 2017/0068846 | A1 | 3/2017 | Linguraru et al. |
| 2017/0070690 | A1 | 3/2017 | Feder et al. |
| 2017/0076430 | A1 | 3/2017 | Xu |
| 2017/0085785 | A1 | 3/2017 | Corcoran et al. |
| 2017/0109807 | A1 | 4/2017 | Krishnan et al. |
| 2017/0109931 | A1 | 4/2017 | Knorr et al. |
| 2017/0115749 | A1 | 4/2017 | Li |
| 2017/0118394 | A1 | 4/2017 | Van Hoeckel et al. |
| 2017/0134634 | A1 | 5/2017 | Jin et al. |
| 2017/0140214 | A1 | 5/2017 | Matas et al. |
| 2017/0150080 | A1 | 5/2017 | Nishizawa |
| 2017/0150118 | A1 | 5/2017 | Pacheco et al. |
| 2017/0154211 | A1 | 6/2017 | Shaburov et al. |
| 2017/0154457 | A1 | 6/2017 | Theobald et al. |
| 2017/0169303 | A1 | 6/2017 | Connell, II et al. |
| 2017/0187938 | A1 | 6/2017 | Ichihara |
| 2017/0187953 | A1 | 6/2017 | Graham et al. |
| 2017/0201677 | A1 | 7/2017 | Otani |
| 2017/0201692 | A1 | 7/2017 | Wu |
| 2017/0208292 | A1 | 7/2017 | Smits |
| 2017/0213076 | A1 | 7/2017 | Francisco et al. |
| 2017/0228583 | A1 | 8/2017 | Lee et al. |
| 2017/0236253 | A1 | 8/2017 | Restrepo et al. |
| 2017/0237786 | A1 | 8/2017 | Crowe et al. |
| 2017/0237925 | A1 | 8/2017 | Uchida et al. |
| 2017/0256086 | A1 | 9/2017 | Park et al. |
| 2017/0262695 | A1 | 9/2017 | Ahmed |
| 2017/0274768 | A1 | 9/2017 | Hök et al. |
| 2017/0277941 | A1 | 9/2017 | Smith |
| 2017/0278292 | A1 | 9/2017 | Feder et al. |
| 2017/0280069 | A1 | 9/2017 | Smith |
| 2017/0285743 | A1 | 10/2017 | Yu et al. |
| 2017/0286752 | A1 | 10/2017 | Gusarov et al. |
| 2017/0300778 | A1 | 10/2017 | Sato |
| 2017/0302903 | A1 | 10/2017 | Ng et al. |
| 2017/0323149 | A1 | 11/2017 | Harary et al. |
| 2017/0337440 | A1 | 11/2017 | Green et al. |
| 2017/0337657 | A1 | 11/2017 | Cornell |
| 2017/0343887 | A1 | 11/2017 | Hoshino |
| 2017/0364752 | A1 | 12/2017 | Zhou et al. |
| 2017/0372108 | A1 | 12/2017 | Corcoran et al. |
| 2017/0374336 | A1 | 12/2017 | Rivard et al. |
| 2018/0005420 | A1 | 1/2018 | Bondich et al. |
| 2018/0007240 | A1 | 1/2018 | Rivard et al. |
| 2018/0020156 | A1 | 1/2018 | Zobel |
| 2018/0024661 | A1 | 1/2018 | Lin et al. |
| 2018/0025218 | A1 | 1/2018 | Steinberg et al. |
| 2018/0025244 | A1 | 1/2018 | Bohl et al. |
| 2018/0061126 | A1 | 3/2018 | Huang et al. |
| 2018/0063019 | A1 | 3/2018 | Martin |
| 2018/0063409 | A1 | 3/2018 | Rivard et al. |
| 2018/0063411 | A1 | 3/2018 | Rivard et al. |
| 2018/0067633 | A1 | 3/2018 | Wilson et al. |
| 2018/0070069 | A1 | 3/2018 | Rivard et al. |
| 2018/0074495 | A1 | 3/2018 | Myers et al. |
| 2018/0075637 | A1 | 3/2018 | Henry et al. |
| 2018/0077367 | A1 | 3/2018 | Feder et al. |
| 2018/0088775 | A1 | 3/2018 | Ye et al. |
| 2018/0109771 | A1 | 4/2018 | Rivard et al. |
| 2018/0114025 | A1 | 4/2018 | Cui et al. |
| 2018/0114351 | A1 | 4/2018 | Rivard et al. |
| 2018/0114352 | A1 | 4/2018 | Rivard et al. |
| 2018/0115702 | A1 | 4/2018 | Brauer et al. |
| 2018/0121716 | A1 | 5/2018 | Sun et al. |
| 2018/0130182 | A1 | 5/2018 | Bhatt et al. |
| 2018/0131855 | A1 | 5/2018 | Rivard et al. |
| 2018/0137375 | A1 | 5/2018 | Takemura et al. |

(56) References Cited

U.S. PATENT DOCUMENTS

| | | | |
|---|---|---|---|
| 2018/0137678 | A1 | 5/2018 | Kaehler |
| 2018/0160092 | A1 | 6/2018 | Rivard et al. |
| 2018/0165862 | A1 | 6/2018 | Sawaki |
| 2018/0183986 | A1 | 6/2018 | Smith et al. |
| 2018/0183989 | A1 | 6/2018 | Rivard et al. |
| 2018/0197281 | A1 | 7/2018 | Feder et al. |
| 2018/0204052 | A1 | 7/2018 | Li et al. |
| 2018/0211101 | A1 | 7/2018 | Ahmed |
| 2018/0253881 | A1 | 9/2018 | Edwards et al. |
| 2018/0262934 | A1 | 9/2018 | Rivard et al. |
| 2018/0288311 | A1 | 10/2018 | Baghert et al. |
| 2018/0295292 | A1 | 10/2018 | Lee et al. |
| 2018/0341383 | A1 | 11/2018 | Sully |
| 2018/0342091 | A1 | 11/2018 | Seibert et al. |
| 2018/0352241 | A1 | 12/2018 | Gatt et al. |
| 2018/0367774 | A1 | 12/2018 | Barron et al. |
| 2019/0005632 | A1 | 1/2019 | Huang |
| 2019/0012525 | A1 | 1/2019 | Wang et al. |
| 2019/0026010 | A1 | 1/2019 | Rivard et al. |
| 2019/0031145 | A1 | 1/2019 | Trelin |
| 2019/0035047 | A1 | 1/2019 | Lim et al. |
| 2019/0035135 | A1 | 1/2019 | Feder et al. |
| 2019/0037192 | A1 | 1/2019 | Rivard et al. |
| 2019/0039570 | A1 | 2/2019 | Foster et al. |
| 2019/0042833 | A1 | 2/2019 | Gernoth et al. |
| 2019/0043176 | A1 | 2/2019 | Li et al. |
| 2019/0045165 | A1 | 2/2019 | Rivard et al. |
| 2019/0057554 | A1 | 2/2019 | Knorr et al. |
| 2019/0080119 | A1 | 3/2019 | Wang et al. |
| 2019/0102279 | A1 | 4/2019 | Awan et al. |
| 2019/0108387 | A1 | 4/2019 | Rivard et al. |
| 2019/0108388 | A1 | 4/2019 | Rivard et al. |
| 2019/0109974 | A1 | 4/2019 | Rivard et al. |
| 2019/0116306 | A1 | 4/2019 | Rivard et al. |
| 2019/0122378 | A1 | 4/2019 | Aswin |
| 2019/0124280 | A1 | 4/2019 | Feder et al. |
| 2019/0149706 | A1 | 5/2019 | Rivard et al. |
| 2019/0174028 | A1 | 6/2019 | Rivard et al. |
| 2019/0179594 | A1 | 6/2019 | Alameh et al. |
| 2019/0188857 | A1 | 6/2019 | Rivard et al. |
| 2019/0197297 | A1 | 6/2019 | Rivard et al. |
| 2019/0197330 | A1 | 6/2019 | Mahmoud et al. |
| 2019/0208172 | A1 | 7/2019 | Rivard et al. |
| 2019/0215440 | A1 | 7/2019 | Rivard et al. |
| 2019/0222769 | A1 | 7/2019 | Srivastava et al. |
| 2019/0222807 | A1 | 7/2019 | Rivard et al. |
| 2019/0244010 | A1 | 8/2019 | Kim et al. |
| 2019/0251682 | A1 | 8/2019 | Feder et al. |
| 2019/0263415 | A1 | 8/2019 | Gong |
| 2019/0285881 | A1 | 9/2019 | Ilic et al. |
| 2019/0335151 | A1 | 10/2019 | Rivard et al. |
| 2019/0342534 | A1 | 11/2019 | Rivard et al. |
| 2019/0347843 | A1 | 11/2019 | Rivard et al. |
| 2019/0349510 | A1 | 11/2019 | Rivard et al. |
| 2019/0379863 | A1 | 12/2019 | Rivard et al. |
| 2019/0385311 | A1 | 12/2019 | Rivard et al. |
| 2020/0029008 | A1 | 1/2020 | Rivard et al. |
| 2020/0057654 | A1 | 2/2020 | Yang |
| 2020/0059575 | A1 | 2/2020 | Rivard et al. |
| 2020/0059582 | A1 | 2/2020 | Rivard et al. |
| 2020/0059806 | A1 | 2/2020 | Rivard et al. |
| 2020/0067715 | A1 | 2/2020 | Yi et al. |
| 2020/0077013 | A1 | 3/2020 | Rivard et al. |
| 2020/0084398 | A1 | 3/2020 | Feder et al. |
| 2020/0092596 | A1 | 3/2020 | Moore, Jr. et al. |
| 2020/0106956 | A1 | 4/2020 | Kimball et al. |
| 2020/0118315 | A1 | 4/2020 | Ranzinger |
| 2020/0126283 | A1 | 4/2020 | van Vuuren et al. |
| 2020/0154089 | A1 | 5/2020 | Rivard et al. |
| 2020/0193144 | A1 | 6/2020 | Rivard et al. |
| 2020/0242774 | A1 | 7/2020 | Park et al. |
| 2020/0249763 | A1 | 8/2020 | Moritani |
| 2020/0259991 | A1 | 8/2020 | Rivard et al. |
| 2020/0267299 | A1 | 8/2020 | Le et al. |
| 2020/0351432 | A1 | 11/2020 | Rivard et al. |
| 2021/0001810 | A1 | 1/2021 | Rivard et al. |
| 2021/0037178 | A1 | 2/2021 | Rivard et al. |
| 2021/0049984 | A1 | 2/2021 | Cain |
| 2021/0074051 | A1 | 3/2021 | Feder et al. |
| 2021/0110554 | A1 | 4/2021 | Rivard et al. |
| 2021/0152779 | A1 | 5/2021 | Rivard et al. |
| 2021/0274142 | A1 | 9/2021 | Rivard et al. |
| 2021/0314507 | A1 | 10/2021 | Feder et al. |
| 2021/0319613 | A1 | 10/2021 | Rivard et al. |
| 2021/0337104 | A1 | 10/2021 | Rivard et al. |
| 2021/0360141 | A1 | 11/2021 | Rivard et al. |
| 2021/0382969 | A1 | 12/2021 | Park |
| 2022/0107550 | A1 | 4/2022 | Yeh et al. |
| 2022/0210313 | A1 | 6/2022 | Rivard et al. |
| 2022/0210386 | A1 | 6/2022 | Rivard et al. |
| 2022/0215504 | A1 | 7/2022 | Moens |
| 2022/0224820 | A1 | 7/2022 | Liu et al. |
| 2022/0239866 | A1 | 7/2022 | Rivard et al. |
| 2022/0272553 | A1 | 8/2022 | Rivard et al. |
| 2022/0291758 | A1 | 9/2022 | Wang et al. |
| 2022/0343476 | A1 | 10/2022 | Feder et al. |
| 2022/0343509 | A1 | 10/2022 | Rivard et al. |
| 2022/0343678 | A1 | 10/2022 | Rivard et al. |
| 2022/0345613 | A1 | 10/2022 | Rivard et al. |
| 2022/0353712 | A1 | 11/2022 | Rivard et al. |
| 2022/0368793 | A1 | 11/2022 | Xu et al. |
| 2023/0005294 | A1 | 1/2023 | Rivard et al. |
| 2023/0008242 | A1 | 1/2023 | Rivard et al. |
| 2023/0047124 | A1 | 2/2023 | Rivard et al. |
| 2023/0050695 | A1 | 2/2023 | Rivard et al. |
| 2023/0052018 | A1 | 2/2023 | Rivard et al. |
| 2023/0060489 | A1 | 3/2023 | Rivard et al. |
| 2023/0061404 | A1 | 3/2023 | Feder et al. |
| 2023/0079783 | A1 | 3/2023 | Rivard et al. |
| 2023/0081630 | A1 | 3/2023 | Rivard et al. |
| 2023/0093132 | A1 | 3/2023 | Rivard et al. |
| 2023/0154097 | A1 | 5/2023 | Feder et al. |
| 2023/0156344 | A1 | 5/2023 | Rivard et al. |
| 2023/0156350 | A1 | 5/2023 | Feder et al. |
| 2023/0188676 | A1 | 6/2023 | Rivard et al. |
| 2023/0325080 | A1 | 10/2023 | Huo et al. |
| 2023/0351608 | A1 | 11/2023 | Rivard et al. |
| 2024/0064419 | A1 | 2/2024 | Rivard et al. |
| 2024/0073543 | A1 | 2/2024 | Rivard et al. |
| 2025/0030945 | A1 | 1/2025 | Rivard et al. |
| 2025/0053287 | A1 | 2/2025 | Rivard et al. |
| 2025/0056130 | A1 | 2/2025 | Rivard et al. |
| 2025/0056131 | A1 | 2/2025 | Rivard et al. |
| 2025/0063246 | A1 | 2/2025 | Rivard et al. |
| 2025/0086765 | A1 | 3/2025 | Feder et al. |
| 2025/0133298 | A1 | 4/2025 | Rivard et al. |
| 2025/0150719 | A1 | 5/2025 | Rivard et al. |
| 2025/0156054 | A1 | 5/2025 | Rivard et al. |
| 2025/0159326 | A1 | 5/2025 | Rivard et al. |
| 2025/0159356 | A1 | 5/2025 | Rivard et al. |
| 2025/0159357 | A1 | 5/2025 | Rivard et al. |
| 2025/0159358 | A1 | 5/2025 | Rivard et al. |
| 2025/0159359 | A1 | 5/2025 | Rivard et al. |
| 2025/0159360 | A1 | 5/2025 | Rivard et al. |

FOREIGN PATENT DOCUMENTS

| | | | |
|---|---|---|---|
| CN | 101547306 | A | 9/2009 |
| CN | 102053453 | A | 5/2011 |
| CN | 102165783 | A | 8/2011 |
| CN | 102521814 | A | 6/2012 |
| CN | 102608036 | A | 7/2012 |
| CN | 103152519 | A | 6/2013 |
| CN | 103581556 | A | 2/2014 |
| CN | 103813098 | A | 5/2014 |
| CN | 104040292 | A | 9/2014 |
| CN | 204316606 | U | 5/2015 |
| CN | 105026955 | A | 11/2015 |
| DE | 102011107844 | A1 | 1/2013 |
| EP | 1549080 | A1 | 6/2005 |
| EP | 2169946 | A2 | 3/2010 |
| EP | 2346079 | A1 | 7/2011 |
| EP | 2565843 | A2 | 3/2013 |
| EP | 2731326 | A2 | 5/2014 |

(56) References Cited

FOREIGN PATENT DOCUMENTS

| | | | |
|---|---|---|---|
| EP | 2879375 | A1 | 6/2015 |
| EP | 3105713 | A1 | 12/2016 |
| GB | 2486878 | A | 7/2012 |
| GB | 2487943 | A | 8/2012 |
| JP | H09-200617 | A | 7/1997 |
| JP | 2000278532 | A | 10/2000 |
| JP | 2000308068 | A | 11/2000 |
| JP | 2001245213 | A | 9/2001 |
| JP | 2002112008 | A | 4/2002 |
| JP | 2003101886 | A | 4/2003 |
| JP | 2003299067 | A | 10/2003 |
| JP | 2004247983 | A | 9/2004 |
| JP | 2004248061 | A | 9/2004 |
| JP | 2004326119 | A | 11/2004 |
| JP | 2004328532 | A | 11/2004 |
| JP | 2006080752 | A | 3/2006 |
| JP | 2006121612 | A | 5/2006 |
| JP | 2006311311 | A | 11/2006 |
| JP | 2007035028 | A | 2/2007 |
| JP | 2007228099 | A | 9/2007 |
| JP | 2008162498 | A | 7/2008 |
| JP | 2008177738 | A | 7/2008 |
| JP | 2008187615 | A | 8/2008 |
| JP | 2008236726 | A | 10/2008 |
| JP | 2009267923 | A | 11/2009 |
| JP | 2009303010 | A | 12/2009 |
| JP | 2010016416 | A | 1/2010 |
| JP | 2010512049 | A | 4/2010 |
| JP | 2010136224 | A | 6/2010 |
| JP | 2010157925 | A | 7/2010 |
| JP | 2010166281 | A | 7/2010 |
| JP | 2010239317 | A | 10/2010 |
| JP | 4649623 | B2 | 3/2011 |
| JP | 2011097141 | A | 5/2011 |
| JP | 2011101180 | A | 5/2011 |
| JP | 2011120087 | A | 6/2011 |
| JP | 2011120094 | A | 6/2011 |
| JP | 2011146957 | A | 7/2011 |
| JP | 2012080196 | A | 4/2012 |
| JP | 2012119840 | A | 6/2012 |
| JP | 2012156885 | A | 8/2012 |
| JP | 2012195660 | A | 10/2012 |
| JP | 2012213137 | A | 11/2012 |
| JP | 2013026734 | A | 2/2013 |
| JP | 2013055610 | A | 3/2013 |
| JP | 2013066142 | A | 4/2013 |
| JP | 2013093875 | A | 5/2013 |
| JP | 2013120254 | A | 6/2013 |
| JP | 2013207327 | A | 10/2013 |
| JP | 2013219708 | A | 10/2013 |
| JP | 2013258444 | A | 12/2013 |
| JP | 2013258510 | A | 12/2013 |
| JP | 2014057256 | A | 3/2014 |
| JP | 2014140246 | A | 7/2014 |
| JP | 2014140247 | A | 7/2014 |
| JP | 2014142836 | A | 8/2014 |
| JP | 2014155033 | A | 8/2014 |
| JP | 2016019196 | A | 2/2016 |
| JP | 2016066015 | A | 4/2016 |
| JP | 6333095 | B2 | 5/2018 |
| KR | 20100094200 | A | 8/2010 |
| KR | 20150130186 | A | 11/2015 |
| KR | 20160127606 | A | 11/2016 |
| TW | 201630406 | A | 8/2016 |
| WO | 9746001 | A1 | 12/1997 |
| WO | 0237830 | A2 | 5/2002 |
| WO | 2004064391 | A1 | 7/2004 |
| WO | 2008010559 | A1 | 1/2008 |
| WO | 2009074938 | A2 | 6/2009 |
| WO | 2009074938 | A3 | 8/2009 |
| WO | 2013184256 | A1 | 12/2013 |
| WO | 2014094199 | A1 | 6/2014 |
| WO | 2014172059 | A2 | 10/2014 |
| WO | 2015120873 | A1 | 8/2015 |
| WO | 2015123455 | A1 | 8/2015 |
| WO | 2015173565 | A1 | 11/2015 |
| WO | 2016073643 | A1 | 5/2016 |
| WO | 2018044314 | A1 | 3/2018 |
| WO | 2021003261 | A1 | 1/2021 |

OTHER PUBLICATIONS

Non-Final Office Action from U.S. Appl. No. 15/643,311, dated Jan. 4, 2018.
Final Office Action for U.S. Appl. No. 15/643,311 dated Jul. 24, 2018.
Notice of Allowance for U.S. Appl. No. 15/643,311, dated Oct. 31, 2018.
Supplemental Notice of Allowance for U.S. Appl. No. 15/643,311, dated Dec. 11, 2018.
Rivard et al., U.S. Appl. No. 16/213,041, filed Dec. 7, 2018.
Non-Final Office Action for U.S. Appl. No. 16/213,041, dated Oct. 30, 2019.
Notice of Allowance from U.S. Appl. No. 16/213,041, dated May 29, 2020.
Supplemental Notice of Allowance from U.S. Appl. No. 16/213,041, dated Jun. 17, 2020.
Supplemental Notice of Allowance from U.S. Appl. No. 16/213,041, dated Aug. 31, 2020.
Rivard et al., U.S. Appl. No. 17/000,098, filed Aug. 21, 2020.
Non-Final Office Action for U.S. Appl. No. 17/000,098, dated Dec. 7, 2021.
Final Office Action for U.S. Appl. No. 17/000,098, dated Aug. 25, 2022.
Non-Final Office Action for U.S. Appl. No. 17/000,098, dated Apr. 11, 2023.
Notice of Allowance for U.S. Appl. No. 17/000,098, dated Jan. 25, 2024.
Corrected Notice of Allowance for U.S. Appl. No. 17/000,098, dated May 1, 2024.
Rivard et al., U.S. Appl. No. 18/646,620, filed Apr. 25, 2024.
Rivard et al., U.S. Appl. No. 15/331,733, filed Oct. 21, 2016.
Notice of Allowance from U.S. Appl. No. 15/331,733, dated Dec. 7, 2016.
Notice of Allowance from U.S. Appl. No. 15/331,733, dated Apr. 17, 2017.
Rivard et al., U.S. Appl. No. 15/815,463, filed Nov. 16, 2017.
Non-Final Office Action from U.S. Appl. No. 15/815,463, dated Mar. 21, 2019.
Notice of Allowance from U.S. Appl. No. 15/815,463, dated Jul. 10, 2019.
Rivard et al., U.S. Appl. No. 16/663,015, filed Oct. 24, 2019.
Non-Final Office Action from U.S. Appl. No. 16/663,015, dated Jul. 9, 2020.
Final Office Action from U.S. Appl. No. 16/663,015, dated Feb. 4, 2021.
Non-Final Office Action from U.S. Appl. No. 16/663,015, dated Jul. 22, 2021.
Notice of Allowance from U.S. Appl. No. 16/663,015, dated Feb. 15, 2022.
Corrected Notice of Allowance from U.S. Appl. No. 16/663,015, dated May 11, 2022.
Rivard et al., U.S. Appl. No. 17/824,773, filed May 25, 2022.
Rivard et al., U.S. Appl. No. 15/452,639, filed Apr. 4, 2018.
Non-Final Office Action from U.S. Appl. No. 15/452,639, dated May 11, 2017.
Notice of Allowance from U.S. Appl. No. 15/452,639, dated Nov. 30, 2017.
Rivard et al., U.S. Appl. No. 15/642,074, filed Jul. 5, 2017.
Non-Final Office Action from U.S. Appl. No. 15/642,074, dated Oct. 19, 2018.
Notice of Allowance from U.S. Appl. No. 15/642,074, dated Apr. 10, 2019.
Rivard et al., U.S. Appl. No. 16/518,786, filed Jul. 22, 2019.
Non-Final Office Action from U.S. Appl. No. 16/518,786, dated Jun. 29, 2020.

(56) References Cited

OTHER PUBLICATIONS

Notice of Allowance from U.S. Appl. No. 16/518,786, dated Nov. 2, 2020.
Corrected Notice of Allowance from U.S. Appl. No. 16/518,786, dated Nov. 20, 2020.
Rivard et al., U.S. Appl. No. 17/180,526, filed Feb. 19, 2021.
Non-Final Office Action from U.S. Appl. No. 17/180,526, dated Jul. 25, 2022.
Final Office Action from U.S. Appl. No. 17/180,526, dated Jan. 23, 2023.
Non-Final Office Action from U.S. Appl. No. 17/180,526, dated Sep. 15, 2023.
Non-Final Office Action from U.S. Appl. No. 17/824,773, dated Feb. 16, 2023.
Final Office Action from U.S. Appl. No. 17/824,773, dated Sep. 27, 2023.
Rivard et al., U.S. Appl. No. 15/976,756, filed May 10, 2018.
Non-Final Office Action for U.S. Appl. No. 15/976,756, dated Jun. 27, 2019.
Notice of Allowance from U.S. Appl. No. 15/976,756, dated Oct. 4, 2019.
Rivard et al., U.S. Appl. No. 16/215,351, filed Dec. 10, 2018.
Non-Final Office Action from U.S. Appl. No. 16/244,982, dated Jun. 24, 2022.
Final Office Action from U.S. Appl. No. 16/244,982, dated Feb. 14, 2023.
Non-Final Office Action from U.S. Appl. No. 16/244,982, dated Aug. 3, 2023.
Rivard et al., U.S. Appl. No. 18/388,158, filed Nov. 8, 2023.
Rivard et al., U.S. Appl. No. 19/015,114, filed Jan. 9, 2025.
Rivard et al., U.S. Appl. No. 19/025,941, filed Jan. 16, 2025.
Rivard et al., U.S. Appl. No. 18/935,319, filed Nov. 1, 2024.
Non-Final Office Action for U.S. Appl. No. 18/935,319, dated Dec. 12, 2024.
Rivard et al., U.S. Appl. No. 19/025,910, filed Jan. 16, 2025.
Photoshop, "Photoshop Help/Levels adjustment," Photoshop Help, 2014, retrieved on Aug. 20, 2021 from https://web.archive.org/web/20141018232619/http://helpx.adobe.com:80/photoshop/using/levels-adjustment.html, 3 pages.
Office Action from Japanese Patent Application No. 2020-121537, dated Oct. 19, 2021.
Extended European Search Report from European Application No. 21196442.4, dated Dec. 13, 2021.
Huo et al., "Robust Automatic White Balance algorithm using Gray Color Points in Images," IEEE Transactions on Consumer Electronics, vol. 52, No. 2, May 2006, pp. 541-546.
Examination Report from European Application No. 15857386.5, dated Dec. 12, 2021.
Final Office Action from Japanese Patent Application No. 2017-544282, dated Mar. 1, 2022.
Notice of Final Rejection from Japanese Patent Application No. 2017-544282, dated Mar. 1, 2022.
Examination Report from Indian Application No. 201927010939, dated Mar. 25, 2022.
Examination Report from Indian Application No. 202027018945, dated Mar. 17, 2022.
Office Action from Japanese Patent Application No. 2021-076679, dated Aug. 2, 2022.
Office Action from Japanese Patent Application No. 2021-079285, dated Aug. 2, 2022.
Office Action from Japanese Patent Application No. 2021-096499, dated Sep. 6, 2022.
Office Action from Japanese Patent Application No. 2021-154653, dated Sep. 13, 2022.
Office Action from Chinese Patent Application No. 202110773625.1, dated Nov. 2, 2022.
Summons to Attend Oral Proceedings from European Application No. 16 915 389.7, dated Oct. 21, 2022.
Office Action from Australian Patent Application No. 2020299585, dated Nov. 24, 2022.
Srivastava et al., U.S. Appl. No. 15/870,689, filed Jan. 12, 2018.
Non-Final Office Action from U.S. Appl. No. 15/870,689, dated Mar. 17, 2019.
Final Office Action from U.S. Appl. No. 15/870,689, dated Sep. 5, 2019.
Advisory Action from U.S. Appl. No. 15/870,689, dated Nov. 14, 2019.
Notice of Allowance from U.S. Appl. No. 15/870,689, dated Dec. 17, 2019.
Decision for Rejection from Japanese Patent Application No. 2021-154653, dated May 23, 2023.
Second Office Action from Chinese Patent Application No. 202110773625.1, dated May 7, 2023.
Examination Report from European Application No. 18864431.4, dated Apr. 21, 2023.
Wang et al., "A High Dynamic Range CMOS APS Image Sensor," Semantic Scholar, 2001, pp. 1-4, retrived from https://www.semanticscholar.org/paper/A-High-Dynamic-Range-CMOS-APS-Image-Sensor-Wang/a824e97836438887089a3c62f4d9be77d47c9067.
Micron, "1/3-Inch, Wide-VGA CMOS Digital Image Sensor," Micron Technology, 2006, 15 pages, retrieved from https://media.digikey.com/pdf/Data%20Sheets/Micron%20Technology%20Inc%20PDFs/MT9V022.pdf.
Neo Film School, "A Final Nail in the Coffin of Film Cinematography!" Neo Film School Blog, Mar. 7, 2011, 4 pages, retrieved from https://neofilmschool.wordpress.com/2011/03/07/a-final-nail-in-the-coffin-of-film-cinematography/.
CMOSIS, "CMOSIS Outlining Low Noise/High Dynamic Image Sensor Concept," Photonics Online, Nov. 29, 2010, 1 page, retrieved from https://www.photonicsonline.com/doc/cmosis-outlining-low-noisehigh-dynamic-image-0001?VNETCOOKIE=NO.
Koifman et al., "Image Sensors World," Blog, Dec. 30, 2010, 62 pages, retrieved from http://image-sensors-world.blogspot.com/2010/.
Office Action from Chinese Patent Application No. 202111599811.4, dated Feb. 23, 2024, 7 pages.
Aksoy et al., "A Dataset of Flash and Ambient Illumination Pairs from the Crowd," ECCV, 2018, pp. 1-16.
Cornell, B., U.S. Appl. No. 15/162,326, filed May 23, 2016.
Non-Final Office Action from U.S. Appl. No. 15/162,326, dated Sep. 27, 2017.
Notice of Allowance from U.S. Appl. No. 15/162,326, dated Jan. 29, 2018.
Notice of Allowance from U.S. Appl. No. 15/162,326, dated Apr. 11, 2018.
Adnan et al., "Efficient Kernal Fusion Techniques for Massive Video Data Analysis on GPGPUs," arXiv, Sep. 15, 2015, 10 pages, retieved from https://arxiv.org/abs/1509.04394.
Liu et al., "An Efficient SAR Processor Based on GPU via CUDA," 2nd International Congress on Image and Signal Processing, Oct. 17, 2009, pp. 1-5.
Sung, Hsiang-Wei et al., "OpenCV Optimization on Heterogeneous Multi-Core Systems for Gesture Recognition Applications," IEEE 45th International Conference on Parallel Processing Workshops {ICPPW), Aug. 16, 2016, pp. 59-65.
U.S. Appl. No. 14/178,305, filed Feb. 12, 2014.
Final Office Action from U.S. Appl. No. 14/178,305, dated May 18, 2015.
Non-Final Office Action from U.S. Appl. No. 14/178,305, dated Aug. 11, 2014.
Le et al., U.S. Appl. No. 16/278,581, filed Feb. 18, 2019.
Zhen et al., U.S. Appl. No. 16/277,630, filed Feb. 15, 2019.
Le et al., U.S. Appl. No. 16/278,543, filed Feb. 18, 2019.
Notice of Allowance from U.S. Appl. No. 16/278,543, dated Apr. 3, 2020.
Lim et al., U.S. Appl. No. 15/663,005, filed Jul. 28, 2017.
First Action Interview Pilot Program Pre-Interview Communication from U.S. Appl. No. 15/663,005, dated May 28, 2020.
Final Office Action from U.S. Appl. No. 15/913,742, dated Feb. 14, 2022.
Feder et al., U.S. Appl. No. 17/865,299, filed Jul. 14, 2022.

(56) References Cited

OTHER PUBLICATIONS

Non-Final Office Action from U.S. Appl. No. 17/865,299, dated Feb. 22, 2024.
Final Office Action from U.S. Appl. No. 17/865,299, dated Sep. 12, 2024.
Rivard et al., U.S. Appl. No. 13/999,343, filed Feb. 11, 2014.
Notice of Allowance for U.S. Appl. No. 13/999,343, dated Jul. 17, 2015.
Rivard et al., U.S. Appl. No. 14/887,211, filed Oct. 19, 2015.
Non-Final Office Action from U.S. Appl. No. 14/887,211, dated Feb. 18, 2016.
Final Office Action from U.S. Appl. No. 14/887,211, dated Sep. 23, 2016.
Non-Final Office Action from U.S. Appl. No. 14/887,211, dated Jan. 17, 2017.
Notice of Allowance from U.S. Appl. No. 14/887,211, dated May 1, 2017.
Notice of Allowance from U.S. Appl. No. 14/887,211, dated Sep. 13, 2017.
Rivard et al., U.S. Appl. No. 15/808,753, filed Nov. 9, 2017.
Non-Final Office Action from U.S. Appl. No. 15/808,753, dated Feb. 23, 2018.
Notice of Allowance from U.S. Appl. No. 15/808,753, dated Jul. 10, 2018.
Rivard et al., U.S. Appl. No. 16/147,149, filed Sep. 28, 2018.
Notice of Allowance from U.S. Appl. No. 16/147,149, dated Jan. 14, 2019.
Rivard et al., U.S. Appl. No. 16/296,038, filed Mar. 7, 2019.
Notice of Allowance from U.S. Appl. No. 16/296,038, dated Apr. 12, 2019.
Rivard et al., U.S. Appl. No. 16/518,811, filed Jul. 22, 2019.
Notice of Allowance from U.S. Appl. No. 16/518,811, dated Sep. 25, 2019.
Rivard et al., U.S. Appl. No. 16/744,735, filed Jan. 16, 2020.
Notice of Allowance from U.S. Appl. No. 16/744,735, dated Aug. 18, 2021.
Rivard et al., U.S. Appl. No. 17/518,436, filed Nov. 3, 2021.
Non-Final Office Action from U.S. Appl. No. 17/518,436, dated Jul. 11, 2022.
Notice of Allowance from U.S. Appl. No. 17/518,436, dated Mar. 28, 2023.
Rivard et al., U.S. Appl. No. 18/213,198, filed Jun. 22, 2023.
Non-Final Office Action from U.S. Appl. No. 18/213,198, dated Feb. 1, 2024.
Feder et al., U.S. Appl. No. 13/999,678, filed Mar. 14, 2014.
Non-Final Office Action from U.S. Appl. No. 13/999,678, dated Aug. 12, 2015.
Final Office Action from U.S. Appl. No. 13/999,678, dated Mar. 28, 2016.
Non-Final Office Action from U.S. Appl. No. 13/999,678, dated Dec. 20, 2016.
Notice of Allowance from U.S. Appl. No. 13/999,678, dated Jun. 29, 2017.
Feder et al., U.S. Appl. No. 15/354,935, filed Nov. 17, 2016.
Non-Final Office Action from U.S. Appl. No. 15/354,935, dated Feb. 8, 2017.
Notice of Allowance from U.S. Appl. No. 15/354,935, dated Aug. 23, 2017.
Supplemental Notice of Allowance from U.S. Appl. No. 15/354,935, dated Dec. 1, 2017.
Feder et al., U.S. Appl. No. 15/814,238, filed Nov. 15, 2017.
Non-Final Office Action from U.S. Appl. No. 15/814,238, dated Feb. 8, 2018.
Notice of Allowance for U.S. Appl. No. 15/814,238 dated Oct. 4, 2018.
Corrected Notice of Allowance for U.S. Appl. No. 15/814,238 dated Nov. 13, 2018.
Feder et al., U.S. Appl. No. 16/217,848, filed Dec. 12, 2018.
Notice of Allowance from U.S. Appl. No. 16/217,848, dated Jul. 31, 2019.
Corrected Notice of Allowance from U.S. Appl. No. 16/217,848, dated Sep. 24, 2019.
Corrected Notice of Allowance from U.S. Appl. No. 16/217,848, dated Oct. 31, 2019.
Feder et al., U.S. Appl. No. 16/684,389, filed Nov. 14, 2019.
Notice of Allowance from U.S. Appl. No. 16/684,389, dated Oct. 29, 2020.
Corrected Notice of Allowance from U.S. Appl. No. 16/684,389, dated Nov. 27, 2020.
Corrected Notice of Allowance from U.S. Appl. No. 16/684,389, dated Dec. 23, 2020.
Feder et al., U.S. Appl. No. 17/171,800, filed Feb. 9, 2021.
Non-Final Office Action from U.S. Appl. No. 16/215,351, dated Jan. 24, 2019.
Notice of Allowance from U.S. Appl. No. 16/215,351, dated Apr. 1, 2019.
Rivard et al., U.S. Appl. No. 16/290,763, filed Mar. 1, 2019.
Non-Final Office Action for U.S. Appl. No. 16/290,763, dated Jun. 26, 2019.
Notice of Allowance from U.S. Appl. No. 16/290,763, dated Oct. 10, 2019.
Rivard et al., U.S. Appl. No. 16/796,497, filed Feb. 20, 2020.
Non-Final Office Action for U.S. Appl. No. 16/796,497, dated Dec. 8, 2021.
Notice of Allowance from U.S. Appl. No. 16/796,497, dated May 26, 2022.
Rivard et al., U.S. Appl. No. 17/694,458, filed Mar. 14, 2022.
Notice of Allowance from U.S. Appl. No. 17/694,458, dated Mar. 1, 2023.
Rivard et al., U.S. Appl. No. 17/745,668, filed May 16, 2022.
Non-Final Office Action for U.S. Appl. No. 17/745,668, dated Jun. 8, 2023.
Rivard et al., U.S. Appl. No. 16/221,289, filed Dec. 14, 2018.
Non-Final Office Action from U.S. Appl. No. 16/221,289, dated May 15, 2020.
Final Office Action from U.S. Appl. No. 16/221,289, dated Nov. 24, 2020.
Notice of Allowance from U.S. Appl. No. 16/221,289, dated May 12, 2021.
Supplemental Notice of Allowance from U.S. Appl. No. 16/221,289, dated Jul. 16, 2021.
Rivard et al., U.S. Appl. No. 16/552,649, filed Aug. 27, 2019.
Non-Final Office Action from U.S. Appl. No. 16/552,649, dated Jun. 18, 2021.
Notice of Allowance from U.S. Appl. No. 16/552,649, dated Dec. 17, 2021.
Rivard et al., U.S. Appl. No. 16/206,241, filed Nov. 30, 2018.
Non-Final Office Action from U.S. Appl. No. 16/206,241, dated Jun. 20, 2019.
Non-Final Office Action from U.S. Appl. No. 16/206,241, dated Sep. 26, 2019.
Notice of Allowance from U.S. Appl. No. 16/206,241, dated Mar. 5, 2020.
Rivard et al., U.S. Appl. No. 16/547,358, filed Aug. 21, 2019.
Non-Final Office Action from U.S. Appl. No. 16/547,358, dated Mar. 23, 2020.
Notice of Allowance from U.S. Appl. No. 16/547,358, dated Aug. 31, 2020.
Rivard et al., U.S. Appl. No. 17/108,867, filed Dec. 1, 2020.
Non-Final Office Action from U.S. Appl. No. 17/108,867, dated Aug. 20, 2021.
Final Office Action from U.S. Appl. No. 17/108,867, dated Jan. 28, 2022.
Advisory Action from U.S. Appl. No. 17/108,867, dated Jul. 18, 2022.
Rivard et al., U.S. Appl. No. 17/543,519, filed Dec. 6, 2021.
Notice of Allowance from U.S. Appl. No. 17/543,519, dated Oct. 19, 2022.
Notice of Allowance from U.S. Appl. No. 17/543,519, dated Feb. 8, 2023.
Supplemental Notice of Allowance from U.S. Appl. No. 17/543,519, dated Apr. 26, 2023.
Rivard et al., U.S. Appl. No. 17/875,263, filed Jul. 27, 2022.

(56) References Cited

OTHER PUBLICATIONS

Non-Final Office Action from U.S. Appl. No. 17/875,263, dated Mar. 27, 2023.
Final Office Action from U.S. Appl. No. 17/875,263, dated Sep. 7, 2023.
Rivard et al., U.S. Appl. No. 17/969,593, filed Oct. 19, 2022.
Non-Final Office Action from U.S. Appl. No. 17/969,593, dated May 17, 2023.
Rivard et al., U.S. Appl. No. 16/460,807, filed Jul. 2, 2019.
Non-Final Office Action for U.S. Appl. No. 16/460,807, dated Aug. 20, 2020.
Final Office Action for U.S. Appl. No. 16/460,807, dated Mar. 1, 2021.
Non-Final Office Action from U.S. Appl. No. 16/460,807, dated Aug. 30, 2021.
Final Office Action for U.S. Appl. No. 16/460,807, dated Mar. 2, 2022.
Rivard et al., U.S. Appl. No. 17/874,086, filed Jul. 26, 2022.
Non-Final Office Action from U.S. Appl. No. 17/874,086, dated Feb. 2, 2023.
Final Office Action from U.S. Appl. No. 17/874,086, dated Aug. 21, 2023.
Feder et al., U.S. Appl. No. 16/395,792, filed Apr. 26, 2019.
Non-Final Office Action from U.S. Appl. No. 16/395,792, dated Aug. 26, 2020.
Feder et al., U.S. Appl. No. 14/503,210, filed Sep. 30, 2014.
Restriction Requirement from U.S. Appl. No. 14/503,210, dated Oct. 16, 2015.
Non-Final Office Action from U.S. Appl. No. 14/503,210, dated Jan. 12, 2016.
Notice of Allowance from U.S. Appl. No. 14/503,210, dated May 31, 2016.
Feder et al., U.S. Appl. No. 14/503,224, filed Sep. 30, 2014.
Non-Final Office Action from U.S. Appl. No. 14/503,224, dated Sep. 2, 2015.
Notice of Allowance from U.S. Appl. No. 14/503,224, dated Feb. 3, 2016.
Rivard et al., U.S. Appl. No. 13/573,252, filed Sep. 4, 2012.
Restriction Requirement from U.S. Appl. No. 13/573,252, dated Apr. 21, 2014.
Non-Final Office Action from U.S. Appl. No. 13/573,252, dated Jul. 10, 2014.
Notice of Allowance from U.S. Appl. No. 13/573,252, dated Oct. 22, 2014.
Rivard et al., U.S. Appl. No. 14/568,045, filed Dec. 11, 2014.
Restriction Requirement from U.S. Appl. No. 14/568,045, dated Jan. 15, 2015.
Non-Final Office Action from U.S. Appl. No. 14/568,045, dated Mar. 24, 2015.
Final Office Action from U.S. Appl. No. 14/568,045, dated Sep. 18, 2015.
Notice of Allowance from U.S. Appl. No. 14/568,045, dated Apr. 26, 2016.
Notice of Allowance from U.S. Appl. No. 14/568,045, dated Jan. 12, 2016.
Corrected Notice of Allowance from U.S. Appl. No. 14/568,045, dated Feb. 19, 2016.
Corrected Notice of Allowance from U.S. Appl. No. 14/568,045, dated Jun. 30, 2016.
Feder et al., U.S. Appl. No. 14/517,731, filed Oct. 17, 2014.
Non-Final Office Action from U.S. Appl. No. 14/517,731, dated Oct. 6, 2015.
Notice of Allowance from U.S. Appl. No. 14/517,731, dated May 19, 2016.
Rivard et al., U.S. Appl. No. 14/534,068, filed Nov. 5, 2014.
Non-Final Office Action from U.S. Appl. No. 14/534,068, dated Feb. 17, 2015.
Notice of Allowance from U.S. Appl. No. 14/534,068, dated Jul. 29, 2015.
Corrected Notice of Allowance from U.S. Appl. No. 14/534,068, dated Sep. 22, 2015.
Rivard et al., U.S. Appl. No. 14/543,782, filed Nov. 17, 2014.
Non-Final Office Action from U.S. Appl. No. 14/543,782, dated Dec. 3, 2015.
Notice of Allowance from U.S. Appl. No. 14/543,782, dated Jul. 7, 2016.
Rivard et al., U.S. Appl. No. 15/289,039, filed Oct. 7, 2016.
Non-Final Office Action from U.S. Appl. No. 15/289,039, dated May 11, 2017.
Notice of Allowance from U.S. Appl. No. 15/289,039, dated Oct. 12, 2017.
Rivard et al., U.S. Appl. No. 15/863,785, filed Jan. 5, 2018.
Non-Final Office Action from U.S. Appl. No. 15/863,785, dated Apr. 11, 2018.
Notice of Allowance from U.S. Appl. No. 15/863,785, dated Sep. 11, 2018.
Rivard et al., U.S. Appl. No. 16/211,931, filed Dec. 6, 2018.
Non-Final Office Action from U.S. Appl. No. 16/211,931, dated Apr. 5, 2019.
Notice of Allowance from U.S. Appl. No. 16/211,931, dated Aug. 2, 2019.
Rivard et al., U.S. Appl. No. 16/677,385, filed Nov. 7, 2019.
Non-Final Office Action from U.S. Appl. No. 16/677,385, dated Jan. 8, 2021.
Final Office Action from U.S. Appl. No. 16/677,385, dated Sep. 17, 2021.
Notice of Allowance from U.S. Appl. No. 16/677,385, dated Mar. 22, 2022.
Corrected Notice of Allowance from U.S. Appl. No. 16/677,385, dated Apr. 6, 2022.
Rivard et al., U.S. Appl. No. 17/518,473, filed Nov. 3, 2021.
Non-Final Office Action from U.S. Appl. No. 17/518,473, dated Dec. 9, 2022.
Final Office Action from U.S. Appl. No. 17/518,473, dated Aug. 18, 2023.
Advisory Action from U.S. Appl. No. 17/518,473, dated Nov. 1, 2023.
Rivard et al., U.S. Appl. No. 17/694,441, filed Mar. 14, 2022.
Non-Final Office Action from U.S. Appl. No. 17/694,441, dated Jan. 23, 2023.
Final Office Action from U.S. Appl. No. 17/694,441, dated Oct. 2, 2023.
Final Office Action from U.S. Appl. No. 16/395,792, dated Feb. 24, 2021.
Non-Final Office Action from U.S. Appl. No. 16/395,792, dated Nov. 9, 2021.
Final Office Action from U.S. Appl. No. 16/395,792, dated Apr. 26, 2022.
Feder et al., U.S. Appl. No. 17/953,238, filed Sep. 26, 2022.
Non-Final Office Action from U.S. Appl. No. 17/953,238, dated Jul. 5, 2023.
Rivard et al., U.S. Appl. No. 17/063,487, filed Oct. 5, 2020.
Non-Final Office Action from U.S. Appl. No. 17/063,487, dated Oct. 14, 2022.
Final Office Action from U.S. Appl. No. 17/063,487, dated May 19, 2023.
Rivard et al., U.S. Appl. No. 16/584,486, filed Sep. 26, 2019.
Notice of Allowance from U.S. Appl. No. 16/584,486, dated Oct. 21, 2020.
Corrected Notice of Allowance from U.S. Appl. No. 16/584,486, dated Nov. 18, 2020.
Corrected Notice of Allowance from U.S. Appl. No. 16/584,486, dated Dec. 24, 2020.
Rivard et al., U.S. Appl. No. 17/163,086, filed Jan. 29, 2021.
Non-Final Office Action for U.S. Appl. No. 17/163,086, dated Oct. 13, 2021.
Notice of Allowance from U.S. Appl. No. 17/163,086, dated Mar. 21, 2022.
Rivard et al., U.S. Appl. No. 17/857,906, filed Jul. 5, 2022.
Non-Final Office Action for U.S. Appl. No. 17/857,906, dated Feb. 9, 2023.

(56) References Cited

OTHER PUBLICATIONS

Final Office Action for U.S. Appl. No. 17/857,906, dated Sep. 11, 2023.
Rivard et al., U.S. Appl. No. 16/931,286, filed Jul. 16, 2020.
Non-Final Office Action for U.S. Appl. No. 16/931,286, dated May 11, 2021.
Final Office Action for U.S. Appl. No. 16/931,286, dated Dec. 29, 2021.
Notice of Allowance from U.S. Appl. No. 16/931,286, dated Jun. 7, 2022.
Rivard et al., U.S. Appl. No. 17/945,939, filed Sep. 15, 2022.
Non-Final Office Action for U.S. Appl. No. 17/945,939, dated Mar. 20, 2023.
Final Office Action for U.S. Appl. No. 17/945,939, dated Oct. 27, 2023.
Feder et al., U.S. Appl. No. 17/694,472, filed Mar. 14, 2022.
Non-Final Office Action from U.S. Appl. No. 17/694,472, dated May 29, 2024.
International Search Report and Written Opinion from International Application No. PCT/US15/59348, dated Feb. 2, 2016.
International Search Report and Written Opinion from International Application No. PCT/US15/59097, dated Jan. 4, 2016.
International Search Report and Written Opinion from International Application No. PCT/US2015/060476, dated Feb. 10, 2016.
International Search Report and Written Opinion from International Application No. PCT/US2015/058895, dated Apr. 11, 2016.
International Search Report and Written Opinion from International Application No. PCT/US2015/059103, dated Dec. 21, 2015.
International Search Report and Written Opinion from International Application No. PCT/US2015/059105, dated Jul. 26, 2016.
International Search Report and Written Opinion from International Application No. PCT/US2015/058896, dated Aug. 26, 2016.
International Search Report and Written Opinion from International Application No. PCT/US2015/058891, dated Aug. 26, 2016.
International Search Report and Written Opinion from International Application No. PCT/US2016/050011, dated Nov. 10, 2016.
Wan et al., "CMOS Image Sensors With Multi-Bucket Pixels for Computational Photography," IEEE Journal of Solid- State Circuits, vol. 47, No. 4, Apr. 2012, pp. 1031-1042.
Chatterjee et al., "Clustering-Based Denoising With Locally Learned Dictionaries," IEEE Transactions on Image Processing, vol. 18, No. 7, Jul. 2009, pp. 1-14.
Burger et al., "Image denoising: Can plain Neural Networks compete with BM3D?," Computer Vision and Pattern Recognition (CVPR), IEEE, 2012, pp. 4321-4328.
Kervann et al., "Optimal Spatial Adaptation for Patch-Based Image Denoising," IEEE Transactions on Image Processing, vol. 15, No. 10, Oct. 2006, pp. 2866-2878.
Foi et al., "Practical Poissonian-Gaussian noise modeling and fitting for single-image raw-data," IEEE Transactions, 2007, pp. 1-18.
International Search Report and Written Opinion from PCT Application No. PCT/US17/39946, dated Sep. 25, 2017.
European Office Communication and Exam Report from European Application No. 15856814.7, dated Dec. 14, 2017.
European Office Communication and Exam Report from European Application No. 15856267.8, dated Dec. 12, 2017.
European Office Communication and Exam Report from European Application No. 15856710.7, dated Dec. 21, 2017.
European Office Communication and Exam Report from European Application No. 15857675.1, dated Dec. 21, 2017.
European Office Communication and Exam Report from European Application No. 15856212.4, dated Dec. 15, 2017.
European Office Communication and Exam Report from European Application No. 15857386.5, dated Jan. 11, 2018.
Kim et al., "A CMOS Image Sensor Based on Unified Pixel Architecture With Time-Division Multiplexing Scheme for Color and Depth Image Acquisition," IEEE Journal of Solid-State Circuits, vol. 47, No. 11, Nov. 2012, pp. 2834-2845.
European Office Communication and Exam Report from European Application No. 15857748.6, dated Jan. 10, 2018.
Notice of Allowance from U.S. Appl. No. 15/663,005, dated Oct. 29, 2020.
Sogaard et al., "Video Quality Assessment and Machine Learning: Performance and Interpretability," In Proceedings of IEEE QoMEX, 2015, 7 pages.
Aghazadeh et al., "Novelty Detection from an Ego-Centric Perspective," IEEE Conference on Computer Vision and Pattern Recognition, 2011, pp. 3297-3304.
Bouguet, J., "Pyramidal Implementation of the Affine Lucas Kanade Feature Tracker Description of the algorithm," Intel Corporation, 2001, 10 pages, retrieved from http://robots.stanford.edu/cs223b04/algo_affine_tracking.pdf.
Doherty et al., "Investigating Keyframe Selection Methods in the Novel Domain of Passively Captured Visual Lifelogs," ACM International Conference on Image and Video Retrieval, Jul. 2008, 10 pages.
Gokalp et al., "Scene Classification Using Bag-of-Regions Representations," IEEE Computer Society Conference on Computer Vision and Pattern Recognition, Jun. 2007, 9 pages.
Gygli et al., "Creating Summaries from User Videos," European Conference on Computer Vision, 2014, pp. 505-520.
Horn et al., "Determining Optical Flow," Artificial Intelligence, Aug. 1981, pp. 185-203.
Jain et al., "Displacement Measurement and Is Application in Interframe Image Coding," IEEE Transactions on Communications, vol. COM-29, No. 12, Dec. 1981, pp. 1799-1808.
Khosla et al., "Large-Scale Video Summarization using Web-Image Priors," IEEE Conference on Computer Vision and Pattern Recognition, 2013, 8 pages, retrieved from https://people.csail.mit.edu/khosla/papers/cvpr2013_khosla.pdf.
Lee et al., "Discovering Important People and Objects for Egocentric Video Summarization," IEEE Conference on Computer Vision and Pattern Recognition (CVPR), 2012, 8 pages, retrieved from https://vision.cs.utexas.edu/projects/egocentric/egocentric_cvpr2012.pdf.
Ling et al., "Method for Fast Shot Boundary Detection Based on SVM," Congress on Image and Signal Processing, 2008, pp. 445-449.
Liu et al., "Brief and High-Interest Video Summary Generation: Evaluating the AT&T Labs Rushes Summarizations," Proceedings of the 2nd ACM TRECVid Video Summarization Workshop, Oct. 2008, pp. 21-25.
Lu et al., "Fast Video Shot Boundary Detection Based on SVD and Pattern Matching," IEEE Transactions on Image Processing, vol. 22, Dec. 2013, pp. 5136-5145.
Lu et al., "Story-Driven Summarization for Egocentric Video," IEEE Conference on Computer Vision and Pattern Recognition, 2013, pp. 2714-2721.
Lucas et al., "An Iterative Image Registration Technique with an Application to Stereo Vision," Proceedings of DARPA Image Understanding Workshop, Apr. 1981, pp. 121-130.
Lupatini et al., "Scene Break Detection: A Comparison," Proceedings Eighth International Workshop on Research Issues in Data Engineering, Feb. 1998, 8 pages, retrieved from https://ieeexplore.ieee.org/document/658276.
Ma et al., "A Generic Framework of User Attention Model and its Application in Video Summarization," IEEE Transactions on Multimedia, vol. 7, Oct. 2005, pp. 907-919.
Marat et al., "Video Summarization using a Visual Attention Mode," European Signal Processing Conference, Sep. 2007, pp. 1784-1788.
Marpe et al., "The H.264/MPEG4 Advanced Video Coding Standard and its Applications," IEEE Communications Magazine, Aug. 2006, pp. 134-143.
Mertens et al., "Exposure Fusion," Pacific Conference on Computer Graphics and Applications (PG '07), 2007, 9 pages, retrieved from https://mericam.github.io/exposure_fusion/index.html.
Ngo et al., "On Clustering and Retrieval of Video Shots through Temporal Slices Analysis," IEEE Transactions on Multimedia, vol. 4, No. 4, Dec. 2002, pp. 446-458.
Sheikh et al., "Blind Quality Assessment of JPEG2000 Compressed Images," IEEE Asilomar Conference on Signals, Systems and Computers, Nov. 2002, 4 pages, retrieved from https://ece.uwaterloo.ca/~z70wang/publications/asilomar02.html.

(56) References Cited

OTHER PUBLICATIONS

Swain et al., "Indexing via Color Histograms," Proceedings Third International Conference on Computer Vision, Dec. 1990, pp. 390-393.
Wan et al., "A New Approach to Image Retrieval with Hierarchical Color Clustering," IEEE Transactions on Circuits and Systems for Video Technology, vol. 8, No. 5, Sep. 1998, pp. 628-643.
Wang, Z., "Objective Image Quality Assessment: Facing The Real-World Challenges," Electronic Imaging, Image Quality and System Performance, Feb. 2016, 6 pages.
Wang et al., "Reduced and No. Reference Visual Quality Assessment," IEEE Signal Processing Magazine, Special Issue on MuJtimedia Quality Assessment, vol. 29, Nov. 2011, pp. 29-40.
International Search Report and Written Opinion from PCT Application No. PCT/US18/61547, dated Jan. 25, 2019.
International Preliminary Examination Report from PCT Application No. PCT/US18/61547, dated May 28, 2020.
Extended European Search Report from European Application No. 18878357.5, dated May 31, 2021.
Wolf, W, "Key Frame Selection by Motion Analysis," IEEE International Conference on Acoustics, Speech, and Signal Processing Conference, May 1996, pp. 1228-1231.
Zhu et al., "A New Diamond Search Algorithm for Fast Block-Matching Motion Estimation," IEEE Transactions on Image Processing, vol. 9, No. 2, Feb. 2000, pp. 287-290.
T-Mobile, "T-Mobile Sets Your Music Free," T-Mobile Webpage, Newsroom, Jun. 19, 2014, 5 pages retrieved from https://www.t-mobile.com/news/press/t-mobile-sets-your-music-free.
T-Mobile, "T-Mobile Brings iPhone 6 & iphone 6 Plus to its Data Strong Network," T-Mobile Webpage, Newsroom, Sep. 8, 2014, 6 pages, retrieved from https://www.t-mobile.com/news/press/apple-devices.
Gatt et al., U.S. Appl. No. 15/978,122, filed May 12, 2018.
Non-Final Office Action from U.S. Appl. No. 15/978,122, dated Sep. 16, 2019.
Final Office Action from U.S. Appl. No. 15/978,122, dated Mar. 2, 2020.
Notice of Allowance from U.S. Appl. No. 15/978,122, dated Aug. 18, 2020.
Easy Flex, Two Examples of Layout Animations, Apr. 11, 2010, pp. 1-11, http://evtimmy.com/2010/04/two-examples-of-layout-animations/.
Tidwell, J., "Animated Transition," from Designing Interfaces, O'Reilly Media, Inc., Dec. 2010, pp. 127-129.
International Search Report and Written Opinion from PCT Application No. PCT/US17/57704, dated Nov. 16, 2017.
Extended European Search Report from European Application No. 17863122.2, dated Dec. 2, 2019.
European Search Report from European Application No. 17863122.2, dated Dec. 10, 2020.
Examination Report from Indian Application No. 201927013698, dated Jun. 9, 2021.
Examination Report from European Application No. 17863122.2, dated Aug. 4, 2021.
XP055828762, Google display tablet "iPad mini 2", device pictures, 2014, 5 pages.
Office Action from Chinese Patent Application No. 201780064462.1, dated Nov. 2, 2022.
Second Office Action from Chinese Patent Application No. 201780064462.1, dated Jun. 14, 2023.
International Search Report and Written Opinion from PCT Application No. PCT/US2018/066293, dated Mar. 15, 2019.
Yoon et al., "Image Contrast Enhancement based Sub-histogram Equalization Technique without Over-equalization Noise," World Academy of Science, Engineering and Technology, vol. 50, 2009, 7 pages.
Rivard et al., U.S. Appl. No. 17/868,536, filed Jul. 19, 2022.
Notice of Allowance from U.S. Appl. No. 17/868,536, dated Sep. 29, 2023.
Rivard et al., U.S. Appl. No. 14/534,079, filed Nov. 5, 2014.
Non-Final Office Action from U.S. Appl. No. 14/534,079, dated Jan. 29, 2015.
Notice of Allowance from U.S. Appl. No. 14/534,079, dated May 11, 2015.
Corrected Notice of Allowance from U.S. Appl. No. 14/534,079, dated Aug. 19, 2015.
Rivard et al., U.S. Appl. No. 14/534,089, filed Nov. 5, 2014.
Non-Final Office Action from U.S. Appl. No. 14/534,089, dated Feb. 25, 2015.
Notice of Allowance from U.S. Appl. No. 14/534,089, dated Jun. 23, 2015.
Corrected Notice of Allowance from U.S. Appl. No. 14/534,089, dated Aug. 25, 2015.
Corrected Notice of Allowance from U.S. Appl. No. 14/534,089, dated Sep. 23, 2015.
Rivard et al., U.S. Appl. No. 14/535,274, filed Nov. 6, 2014.
Non-Final Office Action from U.S. Appl. No. 14/535,274, dated Feb. 3, 2015.
Notice of Allowance from U.S. Appl. No. 14/535,274, dated May 26, 2015.
Corrected Notice of Allowance from U.S. Appl. No. 14/535,274, dated Aug. 25, 2015.
Rivard et al., U.S. Appl. No. 14/535,279, filed Nov. 6, 2014.
Notice of Allowance from U.S. Appl. No. 14/535,279, dated Aug. 31, 2015.
Rivard et al., U.S. Appl. No. 14/535,282, filed Nov. 6, 2014.
Non-Final Office Action from U.S. Appl. No. 14/535,282, dated Jan. 30, 2015.
Notice of Allowance from U.S. Appl. No. 14/535,282, dated Jun. 23, 2015.
Corrected Notice of Allowance from U.S. Appl. No. 14/535,282, dated Sep. 18, 2015.
Corrected Notice of Allowance from U.S. Appl. No. 14/535,282, dated Oct. 7, 2015.
Rivard et al., U.S. Appl. No. 14/536,524, filed Nov. 7, 2014.
Non-Final Office Action from U.S. Appl. No. 14/536,524, dated Mar. 3, 2015.
Notice of Allowance from U.S. Appl. No. 14/536,524, dated Jun. 29, 2015.
Supplemental Notice of Allowance from U.S. Appl. No. 14/536,524, dated Aug. 19, 2015.
Supplemental Notice of Allowance from U.S. Appl. No. 14/536,524, dated Sep. 18, 2015.
Feder et al., U.S. Appl. No. 14/535,285, filed Nov. 6, 2014.
Non-Final Office Action from U.S. Appl. No. 14/535,285, dated Feb. 3, 2015.
Notice of Allowance from U.S. Appl. No. 14/535,285, dated Jul. 31, 2015.
Notice of Allowance from U.S. Appl. No. 14/535,285, dated Oct. 15, 2015.
Corrected Notice of Allowance from U.S. Appl. No. 14/535,285, dated Nov. 16, 2015.
Kindle et al., U.S. Appl. No. 14/547,074, filed Nov. 18, 2014.
Non-Final Office Action from U.S. Appl. No. 14/547,074, dated Feb. 26, 2016.
Notice of Allowance from U.S. Appl. No. 14/547,074, dated Aug. 19, 2016.
Supplemental Notice of Allowance from U.S. Appl. No. 14/547,074, dated Oct. 31, 2016.
Rivard et al., U.S. Appl. No. 14/547,077, filed Nov. 18, 2014.
Non-Final Office Action from U.S. Appl. No. 14/547,077, dated Dec. 9, 2016.
Final Office Action from U.S. Appl. No. 14/547,077, dated May 12, 2017.
Non-Final Office Action from U.S. Appl. No. 14/547,077, dated Dec. 28, 2017.
Notice of Allowance from U.S. Appl. No. 14/547,077, dated Jun. 1, 2018.
Rivard et al., U.S. Appl. No. 16/116,715, filed Aug. 29, 2018.
Non-Final Office Action from U.S. Appl. No. 16/116,715, dated Feb. 18, 2020.
Final Office Action from U.S. Appl. No. 16/116,715, dated Sep. 28, 2020.

(56) References Cited

OTHER PUBLICATIONS

Non-Final Office Action from U.S. Appl. No. 16/116,715, dated Jul. 12, 2021.
Final Office Action from U.S. Appl. No. 16/116,715, dated Mar. 7, 2022.
Rivard et al., U.S. Appl. No. 17/874,102, filed Jul. 26, 2022.
Non-Final Office Action from U.S. Appl. No. 17/874,102, dated Jan. 23, 2023.
Final Office Action from U.S. Appl. No. 17/874,102, dated Jul. 20, 2023.
Kadir et al., "Non-parametric Estimation of Probability Distributions from Sampled Signals," Robotics Research Laboratory, Department of Engineering Science, University of Oxford, Jul. 4, 2005, pp. 1-22.
International Preliminary Examination Report from PCT Application No. PCT/US2018/066293, dated Jul. 2, 2020.
Sherrier et al., "Regionally Adaptive Histogram Equalization of the Chest," IEEE Transactions on Medical Imaging, vol. MI-6, No. 1, Mar. 1987, pp. 1-7.
International Search Report and Written Opinion from PCT Application No. PCT/US 19/13847, dated Apr. 12, 2019.
International Preliminary Examination Report from PCT Application No. PCT/US2019/13847, dated Jul. 30, 2020.
Office Action from Indian Patent Application No. 202027034317, dated Apr. 21, 2022.
Non-Final Office Action from U.S. Appl. No. 16/507,862, dated May 20, 2020.
Final Office Action from U.S. Appl. No. 16/507,862, dated Oct. 13, 2020.
Advisory Action from U.S. Appl. No. 16/507,862, dated Dec. 21, 2020.
Non-Final Office Action from U.S. Appl. No. 16/507,862, dated Feb. 5, 2021.
Notice of Allowance from U.S. Appl. No. 16/507,862, dated May 19, 2021.
Extended European Search Report from European Application No. 20835135.3, dated Jun. 14, 2023.
Canon, "Canon EOS 7D Mark II," Canon User Manual, 2014, 548 pages.
Canon, "Canon EOS 1200D," Canon User Manual, 2014, 342 pages.
Canon, "Canon PowerShot G1 X Mark II," Canon User Manual, 2014, 240 pages.
Canon, "Canon Powershot G7 X," Canon User Manual, 2014, 202 pages.
Canon, "Canon PowerShot S200," Canon User Manual, 2013, 183 pages.
Canon, "Canon PowerShot SX60 HS," Canon User Manual, 2014, 203 pages.
Canon, "Canon PowerShot SX520 HS," Canon User Manual, 2014, 139 pages.
Micron, "1/3.2-Inch 2-Megapixel SOC Digital Image Sensor Features," Micron Technology, MT9D111, 2012, 186 pages.
Google, "Google Search timeline Page," Google, 2018, 1 page.
Examination Report from Indian Application No. 202227003071, dated Jul. 1, 2022.
Examination Report from Canadian Application No. 3,144,478, dated Jan. 28, 2023.
Notice of Reasons for Refusal from Japanese Application No. 2021-576343, dated Jan. 31, 2023.
Ingle et al., "Samsung Proposes SEFET Sensor, Pixart Flips Color Filter and Microlens," Image Sensors World, Dec. 30, 2010, 7 pages.
Examination Report from Indian Application No. 202027030380, dated May 30, 2022.
Rivard et al., U.S. Appl. No. 17/696,717, filed Mar. 16, 2022.
Notice of Allowance from U.S. Appl. No. 17/696,717, dated Dec. 5, 2022.
Rivard et al., U.S. Appl. No. 18/121,579, filed Mar. 14, 2023.
Rivard et al., U.S. Appl. No. 18/646,581, filed Apr. 25, 2024.
Rivard et al., U.S. Appl. No. 18/930,881, filed Oct. 29, 2024.
Non-Final Office Action for U.S. Appl. No. 18/930,881, dated Dec. 23, 2024.
Notice of Allowance from U.S. Appl. No. 18/930,881, dated Feb. 4, 2025.
Rivard et al., U.S. Appl. No. 19/025,744, filed Jan. 16, 2025.
Rivard et al., U.S. Appl. No. 18/930,887, filed Oct. 29, 2024.
Notice of Allowance from U.S. Appl. No. 18/930,887, dated Dec. 20, 2024.
Rivard et al., U.S. Appl. No. 19/025,772, filed Jan. 16, 2025.
Rivard et al., U.S. Appl. No. 19/025,969, filed Jan. 16, 2025.
Rivard et al., U.S. Appl. No. 19/025,856, filed Jan. 16, 2025.
Rivard et al., U.S. Appl. No. 18/930,891, filed Oct. 29, 2024.
Non-Final Office Action from U.S. Appl. No. 18/930,891, filed Jan. 30, 2025.
Rivard et al., U.S. Appl. No. 19/025,870, filed Jan. 16, 2025.
Feder et al., U.S. Appl. No. 18/957,506, filed Nov. 22, 2024.
Non-Final Office Action from U.S. Appl. No. 18/957,506, dated Jan. 17, 2025.
Feder et al., U.S. Appl. No. 19/025,885, filed Jan. 16, 2025.
Rivard et al., U.S. Appl. No. 16/244,982, filed Jan. 10, 2019.
Non-Final Office Action from U.S. Appl. No. 16/244,982, dated Apr. 1, 2020.
Final Office Action from U.S. Appl. No. 16/244,982, dated Nov. 27, 2020.
Non-Final Office Action from U.S. Appl. No. 16/244,982, dated May 13, 2021.
Final Office Action from U.S. Appl. No. 16/244,982, dated Dec. 20, 2021.
Corrected Notice of Allowance from U.S. Appl. No. 16/505,278, dated Oct. 22, 2020.
Corrected Notice of Allowance from U.S. Appl. No. 16/505,278, dated Nov. 18, 2020.
Corrected Notice of Allowance from U.S. Appl. No. 16/505,278, dated Dec. 24, 2020.
Rivard et al., U.S. Appl. No. 17/144,915, filed Jan. 8, 2021.
Non-Final Office Action for U.S. Appl. No. 17/144,915, dated Aug. 13, 2021.
Notice of Allowance from U.S. Appl. No. 17/144,915, dated Feb. 10, 2022.
Rivard et al., U.S. Appl. No. 17/749,919, filed May 20, 2022.
Non-Final Office Action for U.S. Appl. No. 17/749,919, dated Feb. 16, 2023.
Final Office Action for U.S. Appl. No. 17/749,919, dated Sep. 11, 2023.
Rivard et al., U.S. Appl. No. 14/823,993, filed Aug. 11, 2015.
Non-Final Office Action from U.S. Appl. No. 14/823,993, dated Jul. 28, 2016.
Final Office Action from U.S. Appl. No. 14/823,993, dated Feb. 10, 2017.
Non-Final Office Action from U.S. Appl. No. 14/823,993, dated Jul. 14, 2017.
Notice of Allowance from U.S. Appl. No. 14/823,993, dated Oct. 31, 2017.
Corrected Notice of Allowance from U.S. Appl. No. 14/823,993, dated Dec. 27, 2017.
Corrected Notice of Allowance from U.S. Appl. No. 14/823,993, dated Jan. 4, 2018.
Corrected Notice of Allowance from U.S. Appl. No. 14/823,993, dated Feb. 8, 2018.
Rivard et al., U.S. Appl. No. 15/891,251, filed Feb. 7, 2018.
Non-Final Office Action for U.S. Appl. No. 15/891,251, dated May 31, 2018.
Final Office Action for U.S. Appl. No. 15/891,251, dated Nov. 29, 2018.
Notice of Allowance from U.S. Appl. No. 15/891,251, dated May 7, 2019.
Corrected Notice of Allowance from U.S. Appl. No. 15/891,251, dated Jul. 3, 2019.
Non-Final Office Action for U.S. Appl. No. 16/519,244, dated Sep. 23, 2019.
Notice of Allowance from U.S. Appl. No. 16/519,244, dated Jan. 14, 2020.

(56) References Cited

OTHER PUBLICATIONS

Corrected Notice of Allowance from U.S. Appl. No. 16/519,244, dated Feb. 20, 2020.
Corrected Notice of Allowance from U.S. Appl. No. 16/519,244, dated Apr. 9, 2020.
Rivard et al., U.S. Appl. No. 16/857,016, filed Apr. 23, 2020.
Non-Final Office Action for U.S. Appl. No. 16/857,016, dated Aug. 5, 2020.
Notice of Allowance from U.S. Appl. No. 16/857,016, dated Jan. 27, 2021.
Corrected Notice of Allowance from U.S. Appl. No. 16/857,016, dated Feb. 16, 2021.
Corrected Notice of Allowance from U.S. Appl. No. 16/857,016, dated Apr. 13, 2021.
Rivard et al., U.S. Appl. No. 17/321,166, filed May 14, 2021.
Non-Final Office Action for U.S. Appl. No. 17/321,166, dated Apr. 25, 2022.
Final Office Action for U.S. Appl. No. 17/321,166, dated Dec. 9, 2022.
Notice of Allowance from U.S. Appl. No. 17/321,166, dated Jun. 5, 2023.
Notice of Allowance from U.S. Appl. No. 17/321,166, dated Sep. 20, 2023.
Rivard et al., U.S. Appl. No. 16/519,244, filed Jul. 23, 2019.
Feder et al., U.S. Appl. No. 14/843,896, filed Sep. 2, 2015.
Non-Final Office Action from U.S. Appl. No. 14/843,896, dated Jan. 14, 2016.
Notice of Allowance from U.S. Appl. No. 14/843,896, dated Jun. 9, 2016.
Feder et al., U.S. Appl. No. 15/253,721, filed Aug. 31, 2016.
Non-Final Office Action from U.S. Appl. No. 15/253,721, dated Jun. 9, 2017.
Final Office Action from U.S. Appl. No. 15/253,721, dated Nov. 3, 2017.
Notice of Allowance from U.S. Appl. No. 15/253,721, dated Jan. 4, 2018.
Feder et al., U.S. Appl. No. 15/913,742, filed Mar. 6, 2018.
Non-Final Office Action from U.S. Appl. No. 15/913,742, dated Jul. 31, 2019.
Final Office Action from U.S. Appl. No. 15/913,742, dated Nov. 21, 2019.
Non-Final Office Action from U.S. Appl. No. 15/913,742, dated Jun. 18, 2020.
Final Office Action from U.S. Appl. No. 15/913,742, dated Dec. 16, 2020.
Non-Final Office Action from U.S. Appl. No. 15/913,742, dated Jun. 9, 2021.
Extended European Search Report from European Application No. 15891394.7 dated Jun. 19, 2018.
International Preliminary Examination Report from PCT Application No. PCT/US2017/39946, dated Jan. 10, 2019.
International Search Report and Written Opinion from International Application No. PCT/US 18/54014, dated Dec. 26, 2018.
Office Action from Chinese Patent Application No. 201580079444.1, dated Aug. 1, 2019.
Examination Report from European Application No. 15 856 814.7, dated Aug. 20, 2019.
Examination Report from European Application No. 15 857 675.1, dated Aug. 23, 2019.
Examination Report from European Application No. 15 856 710.7, dated Sep. 9, 2019.
Examination Report from European Application No. 15 857 386.5, dated Sep. 17, 2019.
Examination Report from European Application No. 15 857 748.6, dated Sep. 26, 2019.
Office Action from Japanese Patent Application No. 2017-544279, dated Oct. 23, 2019.
Office Action from Japanese Patent Application No. 2017-544280, dated Oct. 29, 2019.
Office Action from Japanese Patent Application No. 2017-544283, dated Oct. 29, 2019.
Office Action from Japanese Patent Application No. 2017-544547, dated Nov. 5, 2019.
Office Action from Japanese Patent Application No. 2017-544281, dated Nov. 26, 2019.
Extended European Search Report from European Application No. 16915389.7, dated Dec. 2, 2019.
Office Action from Japanese Patent Application No. 2017-544284, dated Dec. 10, 2019.
Office Action from Japanese Patent Application No. 2017-544282, dated Jan. 7, 2020.
Office Action from Chinese Patent Application No. 201780053926.9, dated Jan. 16, 2020.
Extended European Search Report from European Application No. 17821236.1, dated Jan. 24, 2020.
Petschnigg et al., "Digital Photography with Flash and No-Flash Image Pairs," ACM Transactions of Graphics, vol. 23, Aug. 2004, pp. 664-672.
International Preliminary Examination Report from PCT Application No. PCT/US2018/054014, dated Apr. 16, 2020.
Office Action from Chinese Patent Application No. 201680088945.0, dated May 21, 2020.
Office Action from Japanese Patent Application No. 2017-544284, dated Aug. 18, 2020.
International Search Report and Written Opinion from PCT Application No. PCT/US2020/040478, dated Sep. 25, 2020.
Summons to Attend Oral Proceedings from European Application No. 15 856 710.7, dated Sep. 18, 2020.
Office Action from Japanese Patent Application No. 2017-544281, dated Oct. 27, 2020.
Office Action from Chinese Patent Application No. 201780053926.9, dated Oct. 13, 2020.
Office Action from Japanese Patent Application No. 2017-544280, dated Jun. 30, 2020.
Second Office Action from Chinese Patent Application No. 201680088945.0, dated Dec. 17, 2020.
Office Action from Japanese Patent Application No. 2017-544282, dated Jan. 5, 2021.
Office Action from Japanese Patent Application No. 2017-544283, dated Jan. 12, 2021.
Decision to Refuse from European Application No. 15856710.7, dated Mar. 15, 2021.
Examination Report from Indian Application No. 201827049041, dated Mar. 19, 2021.
Decision to Refuse from European Application No. 15856212.4, dated Mar. 22, 2021.
Examination Report from European Application No. 16915389.7, dated Feb. 25, 2021.
Examination Report from European Application No. 15857386.5, dated Feb. 8, 2021.
Decision for Rejection and Decision of Dismissal of Amendment for Japanese Application No. 2017-544280, dated May 25, 2021.
Extended European Search Report from European Application No. 18864431.4, dated Jun. 1, 2021.
Kaufman et al., "Content-Aware Automatic Photo Enhancemen," Computer Graphics Forum, vol. 31, No. 08, 2012, pp. 2528-2540.
Battiato et al., "Automatic Image Enhancement by Content Dependent Exposure Correction," EURASIP Journal on Applied Signal Processing, 2004, pp. 1849-1860.
Mangiat et al., "Automatic scene relighting for video conferencing," IEEE 16th Annual International Conference on Image Processing (ICIP), Nov. 2009, pp. 2781-2784.
Weyrich et al., "Analysis of human faces using a measurement-based skin reflectance model," ACM Transactions on Graphics, vol. 25, No. 3, 2006, pp. 1013-1024.
Extended European Search Report from European Application No. 21169039.1, dated Jun. 16, 2021.
Office Action from Japanese Patent Application No. 2017-544284, dated Jul. 13, 2021.
Office Action from Japanese Patent Application No. 2017-544284, dated Jul. 3, 2021.

(56) References Cited

OTHER PUBLICATIONS

Office Action from Chinese Patent Application No. 202010904659.5, dated Jul. 28, 2021.
Extended European Search Report from European Application No. 21175832.1, dated Aug. 27, 2021.
Examination Report from Indian Application No. 201927010939, dated Jun. 9, 2021.
Summons to Attend Oral Proceedings from European Application No. 15856267.8, dated Sep. 3, 2021.
Photoshop, "Photoshop Help/Levels adjustment," Photoshop Help, retrieved on Aug. 20, 2021 from https://web.archive.org/web/20141018232619/http://helpx.adobe.com:80/photoshop/using/levels-adjustment.html, 3 pages.
Non-Final Office Action for U.S. Appl. No. 17/171,800, dated Aug. 18, 2022.
Notice of Allowance from U.S. Appl. No. 17/171,800, dated May 26, 2023.
Non-Final Office Action for U.S. Appl. No. 17/171,800, dated Oct. 4, 2023.
Feder et al., U.S. Appl. No. 14/340,557, filed Jul. 24, 2014.
Non-Final Office Action from U.S. Appl. No. 14/340,557, dated Jan. 21, 2016.
Final Office Action from U.S. Appl. No. 14/340,557, dated Sep. 16, 2016.
Notice of Allowance from U.S. Appl. No. 14/340,557, dated Mar. 3, 2017.
Corrected Notice of Allowance from U.S. Appl. No. 14/340,557, dated Jul. 27, 2017.
Feder et al., U.S. Appl. No. 15/622,520, filed Jun. 14, 2017.
Non-Final Office Action from U.S. Appl. No. 15/622,520, dated Jan. 10, 2018.
Notice of Allowance from U.S. Appl. No. 15/622,520, dated Jul. 18, 2018.
Feder et al., U.S. Appl. No. 16/147,206, filed Sep. 28, 2018.
Non-Final Office Action from U.S. Appl. No. 16/147,206, dated Oct. 18, 2019.
Notice of Allowance from U.S. Appl. No. 16/147,206, dated Jun. 19, 2020.
Corrected Notice of Allowance from U.S. Appl. No. 16/147,206, dated Aug. 27, 2020.
Feder et al., U.S. Appl. No. 17/023,159, filed Sep. 16, 2020.
Non-Final Office Action from U.S. Appl. No. 17/023,159, dated Sep. 2, 2021.
Final Office Action from U.S. Appl. No. 17/023,159, dated Apr. 15, 2022.
Feder et al., U.S. Appl. No. 17/945,922, filed Sep. 15, 2022.
Non-Final Office Action from U.S. Appl. No. 17/945,922, dated Mar. 31, 2023.
Rivard et al., U.S. Appl. No. 16/662,965, filed Oct. 24, 2019.
Final Office Action from U.S. Appl. No. 17/945,922, dated Sep. 19, 2023.
Rivard et al., U.S. Appl. No. 15/201,283, filed Jul. 1, 2016.
Non-Final Office Action from U.S. Appl. No. 15/201,283, dated Dec. 7, 2016.
Notice of Allowance from U.S. Appl. No. 15/201,283, dated Mar. 23, 2017.
Notice of Allowance from U.S. Appl. No. 15/201,283, dated Jul. 19, 2017.
Rivard et al., U.S. Appl. No. 15/636,324, filed Jun. 28, 2017.
Non-Final Office Action for U.S. Appl. No. 15/636,324, dated Oct. 18, 2018.
Final Office Action for U.S. Appl. No. 15/636,324, dated Mar. 22, 2019.
Non-Final Office Action for U.S. Appl. No. 15/636,324, dated Apr. 18, 2019.
Notice of Allowance from U.S. Appl. No. 15/636,324, dated Jul. 2, 2019.
Corrected Notice of Allowance from U.S. Appl. No. 15/636,324, dated Aug. 20, 2019.
Corrected Notice of Allowance from U.S. Appl. No. 15/636,324, dated Sep. 5, 2019.
Rivard et al., U.S. Appl. No. 16/271,604, filed Feb. 8, 2019.
Non-Final Office Action from U.S. Appl. No. 16/271,604, dated Apr. 5, 2019.
Notice of Allowance from U.S. Appl. No. 16/271,604, dated Jul. 2, 2019.
Corrected Notice of Allowance from U.S. Appl. No. 16/271,604, dated Aug. 8, 2019.
Corrected Notice of Allowance from U.S. Appl. No. 16/271,604, dated Sep. 19, 2019.
Non-Final Office Action for U.S. Appl. No. 16/662,965, dated Mar. 22, 2021.
Final Office Action for U.S. Appl. No. 16/662,965, dated Sep. 3, 2021.
Notice of Allowance from U.S. Appl. No. 16/662,965, dated Mar. 1, 2022.
Rivard et al., U.S. Appl. No. 17/835,823, filed Jun. 8, 2022.
Non-Final Office Action for U.S. Appl. No. 17/835,823, dated Apr. 18, 2023.
Final Office Action for U.S. Appl. No. 17/835,823, dated Nov. 14, 2023.
Rivard et al., U.S. Appl. No. 15/254,964, filed Apr. 3, 2019.
Non-Final Office Action from U.S. Appl. No. 15/254,964, dated Jan. 3, 2018.
Final Office Action for U.S. Appl. No. 15/254,964 dated Jul. 24, 2018.
Notice of Allowance for U.S. Appl. No. 15/254,964, dated Dec. 21, 2018.
Supplemental Notice of Allowance for U.S. Appl. No. 15/254,964, dated Feb. 1, 2019.
Supplemental Notice of Allowance for U.S. Appl. No. 15/254,964, dated Mar. 11, 2019.
Rivard et al., U.S. Appl. No. 14/547,079, filed Nov. 18, 2014.
Non-Final Office Action from U.S. Appl. No. 14/547,079, dated Nov. 7, 2016.
Non-Final Office Action from U.S. Appl. No. 14/547,079, dated Mar. 15, 2017.
Final Office Action from U.S. Appl. No. 14/547,079, dated Jul. 17, 2017.
Non-Final Office Action from U.S. Appl. No. 14/547,079, dated Nov. 9, 2017.
Notice of Allowance from U.S. Appl. No. 14/547,079, dated May 3, 2018.
Rivard et al., U.S. Appl. No. 15/975,646, filed May 9, 2018.
Non-Final Office Action from U.S. Appl. No. 15/975,646, dated Sep. 27, 2018.
Final Office Action from U.S. Appl. No. 15/975,646, dated Mar. 25, 2019.
Advisory Action from U.S. Appl. No. 15/975,646, dated Apr. 23, 2019.
Notice of Allowance from U.S. Appl. No. 15/975,646, dated Aug. 9, 2019.
Rivard et al., U.S. Appl. No. 16/666,215, filed Oct. 28, 2019.
Non-Final Office Action from U.S. Appl. No. 16/666,215, dated Apr. 2, 2021.
Notice of Allowance from U.S. Appl. No. 16/666,215, dated Oct. 8, 2021.
Rivard et al., U.S. Appl. No. 17/569,400, filed Jan. 5, 2022.
Non-Final Office Action from U.S. Appl. No. 17/569,400, dated Jan. 11, 2023.
Final Office Action from U.S. Appl. No. 17/569,400, dated Jun. 26, 2023.
Non-Final Office Action from U.S. Appl. No. 17/569,400, dated Nov. 24, 2023.
Non-Final Office Action from U.S. Appl. No. 17/569,400, dated Mar. 13, 2024.
Notice of Allowance from U.S. Appl. No. 17/569,400, dated Jul. 31, 2024.
Rivard et al., U.S. Appl. No. 17/701,484, filed Mar. 22, 2022.
Non-Final Office Action from U.S. Appl. No. 17/701,484, dated Feb. 13, 2023.

(56) References Cited

OTHER PUBLICATIONS

Final Office Action from U.S. Appl. No. 17/701,484, dated Jul. 24, 2023.
Final Office Action from U.S. Appl. No. 17/701,484, dated Jul. 18, 2024.
Rivard et al., U.S. Appl. No. 14/702,549, filed May 1, 2015.
Non-Final Office Action from U.S. Appl. No. 14/702,549, dated Jan. 25, 2016.
Notice of Allowance from U.S. Appl. No. 14/702,549, dated Aug. 15, 2016.
Corrected Notice of Allowance from U.S. Appl. No. 14/702,549, dated Nov. 10, 2016.
Corrected Notice of Allowance from U.S. Appl. No. 14/702,549, dated Dec. 1, 2016.
Rivard et al., U.S. Appl. No. 15/352,510, filed Nov. 15, 2016.
Notice of Allowance from U.S. Appl. No. 15/352,510, dated Oct. 17, 2017.
Corrected Notice of Allowance from U.S. Appl. No. 15/352,510, dated Jan. 8, 2018.
Corrected Notice of Allowance from U.S. Appl. No. 15/352,510, dated Jan. 29, 2018.
Rivard et al., U.S. Appl. No. 15/687,278, filed Aug. 25, 2017.
Non-Final Office Action for U.S. Appl. No. 15/687,278, dated Apr. 13, 2018.
Notice of Allowance from U.S. Appl. No. 15/687,278, dated Aug. 24, 2018.
Rivard et al., U.S. Appl. No. 15/836,655, filed Dec. 8, 2017.
Non-Final Office Action from U.S. Appl. No. 15/836,655, dated Apr. 6, 2018.
Notice of Allowance from U.S. Appl. No. 15/836,655, dated Apr. 30, 2018.
Corrected Notice of Allowance from U.S. Appl. No. 15/836,655, dated May 14, 2018.
Rivard et al., U.S. Appl. No. 15/885,296, filed Jan. 31, 2018.
Non-Final Office Action for U.S. Appl. No. 15/885,296, dated Jun. 4, 2018.
Notice of Allowance for U.S. Appl. No. 15/885,296 dated Sep. 21, 2018.
Corrected Notice of Allowance for U.S. Appl. No. 15/885,296 dated Oct. 16, 2018.
Rivard et al., U.S. Appl. No. 16/154,999, filed Oct. 9, 2018.
Non-Final Office Action for U.S. Appl. No. 16/154,999, dated Dec. 20, 2018.
Notice of Allowance from U.S. Appl. No. 16/154,999, dated Jun. 7, 2019.
Rivard et al., U.S. Appl. No. 16/505,278, filed Jul. 8, 2019.
Non-Final Office Action for U.S. Appl. No. 16/505,278, dated Jan. 10, 2020.
Notice of Allowance from U.S. Appl. No. 16/505,278, dated Sep. 25, 2020.
Notice of Allowance from U.S. Appl. No. 19/025,941, dated Mar. 26, 2025.
Non-Final Office Action from U.S. Appl. No. 17/865,299, dated Mar. 28, 2025.
Rivard, W. et al., U.S. Appl. No. 14/568,045, filed Dec. 11, 2014.
Rivard, W. et al., U.S. Appl. No. 14/534,068, filed Nov. 5, 2014.
Rivard, W. et al., U.S. Appl. No. 14/534,079, filed Nov. 5, 2014.
Rivard, W. et al., U.S. Appl. No. 14/534,089, filed Nov. 5, 2014.
Rivard, W. et al., U.S. Appl. No. 14/535,274, filed Nov. 6, 2014.
Rivard, W. et al., U.S. Appl. No. 14/535,279, filed Nov. 6, 2014.
Non-Final Office Action from U.S. Appl. No. 14/535,279, dated Feb. 5, 2015.
Rivard, W. et al., U.S. Appl. No. 14/535,282, filed Nov. 6, 2014.
Rivard, W. et al., U.S. Appl. No. 14/536,524, filed Nov. 7, 2014.
Rivard, W. et al., U.S. Appl. No. 14/702,549, filed May 1, 2015.
Rivard, W. et al., U.S. Appl. No. 15/891,251, filed Feb. 7, 2018.
Rivard, W. et al., U.S. Appl. No. 17/000,098, filed Aug. 21, 2020.
Examination Report from European Application No. 15 857 386.5, dated Jan. 3, 2023.
Decision for Rejection from Japanese Patent Application No. 2021-076679, dated Jun. 6, 2023.
BPCK et al., "A Wide-VGA CMOS Image Sensor with Global Shutter and Extended Dynamic Range," International Image Sensor Society, 2005, pp. 222-225, retrieved from https://www.imagesensors.org/Past%20Workshops/2005%20Workshop/2005%20Papers/56%20Bock%20et%20al.pdf>.
Bock et al., "A Wide-VGA CMOS Image Sensor with Global Shutter and Extended Dynamic Range," International Image Sensor Society, 2005, pp. 222-225, retrieved from https://www.imagesensors.org/Past%20Workshops/2005%20Workshop/2005%20Papers/56%20Bock%20et%20al.pdf>.
Notice of Allowance from U.S. Appl. No. 19/015,114, dated Mar. 24, 2025.
Final Office Action from U.S. Appl. No. 18/935,319, dated Apr. 1, 2025.
Non-Final Office Action from U.S. Appl. No. 19/025,772, dated Apr. 8, 2025.
Notice of Allowance from U.S. Appl. No. 18/930,887, dated Apr. 10, 2025.
Corrected Notice of Allowance from U.S. Appl. No. 19/015,114, dated Apr. 15, 2025.
Corrected Notice of Allowance from U.S. Appl. No. 19/025,941, dated Apr. 15, 2025.
Rivard et al., U.S. Appl. No. 19/190,481, filed Apr. 25, 2025.
Non-Final Office Action for U.S. Appl. No. 19/190,481, dated May 29, 2025.
Corrected Notice of Allowance from U.S. Appl. No. 18/930,881, dated Apr. 28, 2025.
Notice of Allowance for U.S. Appl. No. 18/957,506, dated May 8, 2025.
Corrected Notice of Allowance for U.S. Appl. No. 18/957,506, dated May 23, 2025.
Non-Final Office Action for U.S. Appl. No. 18/388, 158, dated May 19, 2025.

* cited by examiner

SYSTEMS AND METHODS FOR GENERATING A DIGITAL IMAGE

RELATED APPLICATIONS

The present application is a continuation in part, by virtue of the removal of subject matter (that was either expressly disclosed or incorporated by reference in one or more priority applications), with the purpose of claiming priority to and including herewith the full express and incorporated disclosure of U.S. patent application Ser. No. 14/702,549, now U.S. Pat. No. 9,531,961, titled "SYSTEMS AND METHODS FOR GENERATING A DIGITAL IMAGE USING SEPARATE COLOR AND INTENSITY DATA," filed May 1, 2015, which, at the time of the aforementioned May 1, 2015 filing, included (either expressly or by incorporation) a combination of the following applications, which are all incorporated herein by reference in their entirety for all purposes:

- application Ser. No. 13/573,252, filed Sep. 4, 2012, now U.S. Pat. No. 8,976,264, entitled "IMPROVED COLOR BALANCE IN DIGITAL PHOTOGRAPHY";
- application Ser. No. 14/534,068, filed Nov. 5, 2014, now U.S. Pat. No. 9,167,174, entitled "SYSTEMS AND METHODS FOR HIGH-DYNAMIC RANGE IMAGES";
- application Ser. No. 14/534,079, filed Nov. 5, 2014, now U.S. Pat. No. 9,137,455, entitled "IMAGE SENSOR APPARATUS AND METHOD FOR OBTAINING MULTIPLE EXPOSURES WITH ZERO INTERFRAME TIME";
- application Ser. No. 14/534,089, filed Nov. 5, 2014, now U.S. Pat. No. 9,167,169, entitled "IMAGE SENSOR APPARATUS AND METHOD FOR SIMULTANEOUSLY CAPTURING MULTIPLE IMAGES";
- application Ser. No. 14/535,274, filed Nov. 6, 2014, now U.S. Pat. No. 9,154,708, entitled "IMAGE SENSOR APPARATUS AND METHOD FOR SIMULTANEOUSLY CAPTURING FLASH AND AMBIENT ILLUMINATED IMAGES"; and
- application Ser. No. 14/535,279, filed Nov. 6, 2014, now U.S. Pat. No. 9,179,085, entitled "IMAGE SENSOR APPARATUS AND METHOD FOR OBTAINING LOW-NOISE, HIGH-SPEED CAPTURES OF A PHOTOGRAPHIC SCENE."

To accomplish the above, the present application is a continuation in part of, and claims priority to, U.S. patent application Ser. No. 18/646,581, entitled "IMAGE SENSOR APPARATUS AND METHOD FOR OBTAINING MULTIPLE EXPOSURES WITH ZERO INTERFRAME TIME," filed Apr. 25, 2024, which in turn is a continuation of, and claims priority to U.S. patent application Ser. No. 17/321,166, entitled, "IMAGE SENSOR APPARATUS AND METHOD FOR OBTAINING MULTIPLE EXPOSURES WITH ZERO INTERFRAME TIME," filed May 14, 2021, now U.S. Pat. No. 12,003,864, which in turn is a continuation of, and claims priority to U.S. patent application Ser. No. 16/857,016, entitled "IMAGE SENSOR APPARATUS AND METHOD FOR OBTAINING MULTIPLE EXPOSURES WITH ZERO INTERFRAME TIME," filed Apr. 23, 2020, now U.S. Pat. No. 11,025,831, which in turn is a continuation of, and claims priority to U.S. patent application Ser. No. 16/519,244, entitled "IMAGE SENSOR APPARATUS AND METHOD FOR OBTAINING MULTIPLE EXPOSURES WITH ZERO INTERFRAME TIME," filed Jul. 23, 2019, now U.S. Pat. No. 10,652,478, which in turn is a continuation of, and claims priority to U.S. patent application Ser. No. 15/891,251, entitled "IMAGE SENSOR APPARATUS AND METHOD FOR OBTAINING MULTIPLE EXPOSURES WITH ZERO INTERFRAME TIME," filed Feb. 7, 2018, now U.S. Pat. No. 10,382,702, which in turn, is a continuation of, and claims priority to U.S. patent application Ser. No. 14/823, 993, entitled "IMAGE SENSOR APPARATUS AND METHOD FOR OBTAINING MULTIPLE EXPOSURES WITH ZERO INTERFRAME TIME," filed Aug. 11, 2015, now U.S. Pat. No. 9,918,017.

Additionally, U.S. patent application Ser. No. 14/823,993 is a continuation-in-part of, and claims priority to U.S. patent application Ser. No. 14/702,549, now U.S. Pat. No. 9,531,961, entitled "SYSTEMS AND METHODS FOR GENERATING A DIGITAL IMAGE USING SEPARATE COLOR AND INTENSITY DATA," filed May 1, 2015, which is herein incorporated by reference in its entirety for all purposes.

FIELD OF THE INVENTION

The present invention relates generally to digital photographic systems, and more specifically to generating a digital image from separate color and intensity data.

BACKGROUND

The human eye reacts to light in different ways based on the response of rods and cones in the retina. Specifically, the perception of the response of the eye is different for different colors (e.g., red, green, and blue) in the visible spectrum as well as between luminance and chrominance. Conventional techniques for capturing digital images rely on a CMOS image sensor or CCD image sensor positioned under a color filter array such as a Bayer color filter. Each photodiode of the image sensor samples an analog value that represents an amount of light associated with a particular color at that pixel location. The information for three or more different color channels may then be combined (or filtered) to generate a digital image.

The resulting images generated by these techniques have a reduced spatial resolution due to the blending of values generated at different discrete locations of the image sensor into a single pixel value in the resulting image. Fine details in the scene could be represented poorly due to this filtering of the raw data.

Furthermore, based on human physiology, it is known that human vision is more sensitive to luminance information than chrominance information. In other words, the human eye can recognize smaller details due to changes in luminance when compared to changes in chrominance. However, conventional image capturing techniques do not typically exploit the differences in perception between chrominance and luminance information. Thus, there is a need to address these issues and/or other issues associated with the prior art.

SUMMARY

A system, method, and computer program product for generating a digital image is disclosed. In use, a first image and a second image are received from a first image sensor, where the first image sensor detects wavelengths of a visible spectrum. A third image and a fourth image are received from a second image sensor, where the second image sensor detects wavelengths of a non-visible spectrum. Using an image processing subsystem, a resulting image is generated by combining one of the first image or the second image, with one of the third image or the fourth image.

BRIEF DESCRIPTION OF THE DRAWINGS

FIG. 10-1B illustrates a second data flow process for generating a blended image based on at least an ambient image and a strobe image, according to one embodiment of the present invention;

FIG. 10-1C illustrates a third data flow process for generating a blended image based on at least an ambient image and a strobe image, according to one embodiment of the present invention;

FIG. 10-1D illustrates a fourth data flow process for generating a blended image based on at least an ambient image and a strobe image, according to one embodiment of the present invention;

FIG. 10-2A illustrates an image blend operation for blending a strobe image with an ambient image to generate a blended image, according to one embodiment of the present invention;

FIG. 10-2B illustrates a blend function for blending pixels associated with a strobe image and an ambient image, according to one embodiment of the present invention;

FIG. 10-2C illustrates a blend surface for blending two pixels, according to one embodiment of the present invention;

FIG. 10-2D illustrates a blend surface for blending two pixels, according to another embodiment of the present invention;

FIG. 10-2E illustrates an image blend operation for blending a strobe image with an ambient image to generate a blended image, according to one embodiment of the present invention;

FIG. 10-3A illustrates a patch-level analysis process for generating a patch correction array, according to one embodiment of the present invention;

FIG. 10-3B illustrates a frame-level analysis process for generating frame-level characterization data, according to one embodiment of the present invention;

FIG. 10-4A illustrates a data flow process for correcting strobe pixel color, according to one embodiment of the present invention;

FIG. 10-4B illustrates a chromatic attractor function, according to one embodiment of the present invention;

FIG. 10-5 is a flow diagram of method steps for generating an adjusted digital photograph, according to one embodiment of the present invention;

FIG. 10-6A is a flow diagram of method steps for blending a strobe image with an ambient image to generate a blended image, according to a first embodiment of the present invention;

FIG. 10-6B is a flow diagram of method steps for blending a strobe image with an ambient image to generate a blended image, according to a second embodiment of the present invention;

FIG. 10-7A is a flow diagram of method steps for blending a strobe image with an ambient image to generate a blended image, according to a third embodiment of the present invention;

FIG. 10-7B is a flow diagram of method steps for blending a strobe image with an ambient image to generate a blended image, according to a fourth embodiment of the present invention;

FIG. 11-1 illustrates an exemplary system for obtaining multiple exposures with zero interframe time, in accordance with one possible embodiment.

FIG. 11-2 illustrates an exemplary method carried out for obtaining multiple exposures with zero interframe time, in accordance with one embodiment.

FIGS. 11-3A-11-3E illustrate systems for converting optical scene information to an electronic representation of a photographic scene, in accordance with other embodiments.

FIG. 11-4 illustrates a system for converting analog pixel data to digital pixel data, in accordance with an embodiment.

FIG. 11-5 illustrates a system for converting analog pixel data of an analog signal to digital pixel data, in accordance with another embodiment.

FIG. 11-6 illustrates various timing configurations for amplifying analog signals, in accordance with other embodiments.

FIG. 11-7 illustrates a system for converting in parallel analog pixel data to multiple signals of digital pixel data, in accordance with one embodiment.

FIG. 11-8 illustrates a message sequence for generating a combined image utilizing a network, according to another embodiment.

FIG. 12-1 illustrates an exemplary system for simultaneously capturing multiple images.

FIG. 12-2 illustrates an exemplary method carried out for simultaneously capturing multiple images.

FIG. 12-3 illustrates a circuit diagram for a photosensitive cell, according to one embodiment.

FIG. 12-4 illustrates a system for converting analog pixel data of more than one analog signal to digital pixel data, in accordance with another embodiment.

FIG. 13-1 illustrates an exemplary system for simultaneously capturing flash and ambient illuminated images, in accordance with an embodiment.

FIG. 13-2 illustrates an exemplary method carried out for simultaneously capturing flash and ambient illuminated images, in accordance with an embodiment.

FIG. 13-3 illustrates a system for converting analog pixel data of more than one analog signal to digital pixel data, in accordance with another embodiment.

FIG. 13-4A illustrates a user interface system for generating a combined image, according to an embodiment.

FIG. 13-4B illustrates another user interface system for generating a combined image, according to one embodiment.

FIG. 13-4C illustrates user interface (UI) systems displaying combined images with differing levels of strobe exposure, according to an embodiment.

FIG. 14-1 illustrates an exemplary system for obtaining low-noise, high-speed captures of a photographic scene, in accordance with one embodiment.

FIG. 14-2 illustrates an exemplary system for obtaining low-noise, high-speed captures of a photographic scene, in accordance with another embodiment.

FIG. 14-3A illustrates a circuit diagram for a photosensitive cell, according to one embodiment.

FIG. 14-3B illustrates a circuit diagram for another photosensitive cell, according to another embodiment.

FIG. 14-3C illustrates a circuit diagram for a plurality of communicatively coupled photosensitive cells, according to yet another embodiment.

FIG. 14-4 illustrates implementations of different analog storage planes, in accordance with another embodiment.

FIG. 14-5 illustrates a system for converting analog pixel data of an analog signal to digital pixel data, in accordance with another embodiment.

FIG. 15-1 illustrates an exemplary system for outputting a blended brighter and a darker pixel, in accordance with one possible embodiment.

FIG. 15-2 illustrates a method for blending a brighter pixel and a darker pixel, in accordance with one embodiment.

FIG. 15-3 illustrates a system for outputting a HDR pixel, in accordance with another embodiment.

FIG. 15-4 illustrates a method for generating a HDR pixel based on combined HDR pixel and an effects function, in accordance with another embodiment.

FIG. 15-5 illustrates a system for outputting a HDR pixel, in accordance with another embodiment.

FIG. 15-6 illustrates a method for generating a HDR pixel based on combined HDR pixel and an effects function, in accordance with another embodiment.

FIG. 15-7 illustrates a method for generating a HDR pixel based on combined HDR pixel and an effects function, in accordance with another embodiment.

FIG. 15-8A illustrates a surface diagram, in accordance with another embodiment.

FIG. 15-8B illustrates a surface diagram, in accordance with another embodiment.

FIG. 15-9A illustrates a surface diagram, in accordance with another embodiment.

FIG. 15-9B illustrates a surface diagram, in accordance with another embodiment.

FIG. 15-10 illustrates a levels mapping diagram, in accordance with another embodiment.

FIG. 15-11 illustrates a levels mapping diagram, in accordance with another embodiment.

FIG. 15-12 illustrates an image synthesis operation, in accordance with another embodiment.

FIG. 15-13 illustrates a user interface (UI) system for generating a combined image, in accordance with another embodiment.

FIG. 15-14 is a flow diagram of method for generating a combined image, in accordance with another embodiment.

FIG. 15-15A illustrates a user interface (UI) system for adjusting a white point and a black point, in accordance with another embodiment.

FIG. 15-15B illustrates a user interface (UI) system for adjusting a white point, median point, and a black point, in accordance with another embodiment.

DETAILED DESCRIPTION

Embodiments of the present invention enable a digital photographic system to generate a digital image (or simply "image") of a photographic scene subjected to strobe illumination. Exemplary digital photographic systems include, without limitation, digital cameras and mobile devices such as smart phones that are configured to include a digital camera module and a strobe unit. A given photographic scene is a portion of an overall scene sampled by the digital photographic system.

The digital photographic system may capture separate image data for chrominance components (i.e., color) and luminance (i.e., intensity) components for a digital image. For example, a first image sensor may be used to capture chrominance data and a second image sensor may be used to capture luminance data. The second image sensor may be different than the first image sensor. For example, a resolution of the second image sensor may be higher than the first image sensor, thereby producing more detail related to the luminance information of the captured scene when compared to the chrominance information captured by the first image sensor. The chrominance information and the luminance information may then be combined to generate a resulting image that produces better images than captured with a single image sensor using conventional techniques.

In another embodiment, two or more images are sequentially sampled by the digital photographic system to generate an image set. Each image within the image set may be generated in conjunction with different strobe intensity, different exposure parameters, or a combination thereof. Exposure parameters may include sensor sensitivity ("ISO" parameter), exposure time (shutter speed), aperture size (f-stop), and focus distance. In certain embodiments, one or more exposure parameters, such as aperture size, may be constant and not subject to determination. For example, aperture size may be constant based on a given lens design associated with the digital photographic system. At least one of the images comprising the image set may be sampled in conjunction with a strobe unit, such as a light-emitting diode (LED) strobe unit, configured to contribute illumination to the photographic scene.

Separate image sets may be captured for chrominance information and luminance information. For example, a first image set may capture chrominance information under ambient illumination and strobe illumination at different strobe intensities and/or exposure parameters. A second image set may capture luminance information under the same settings. The chrominance information and luminance information may then be blended to produce a resulting image with greater dynamic range that could be captured using a single image sensor.

Figure 1:
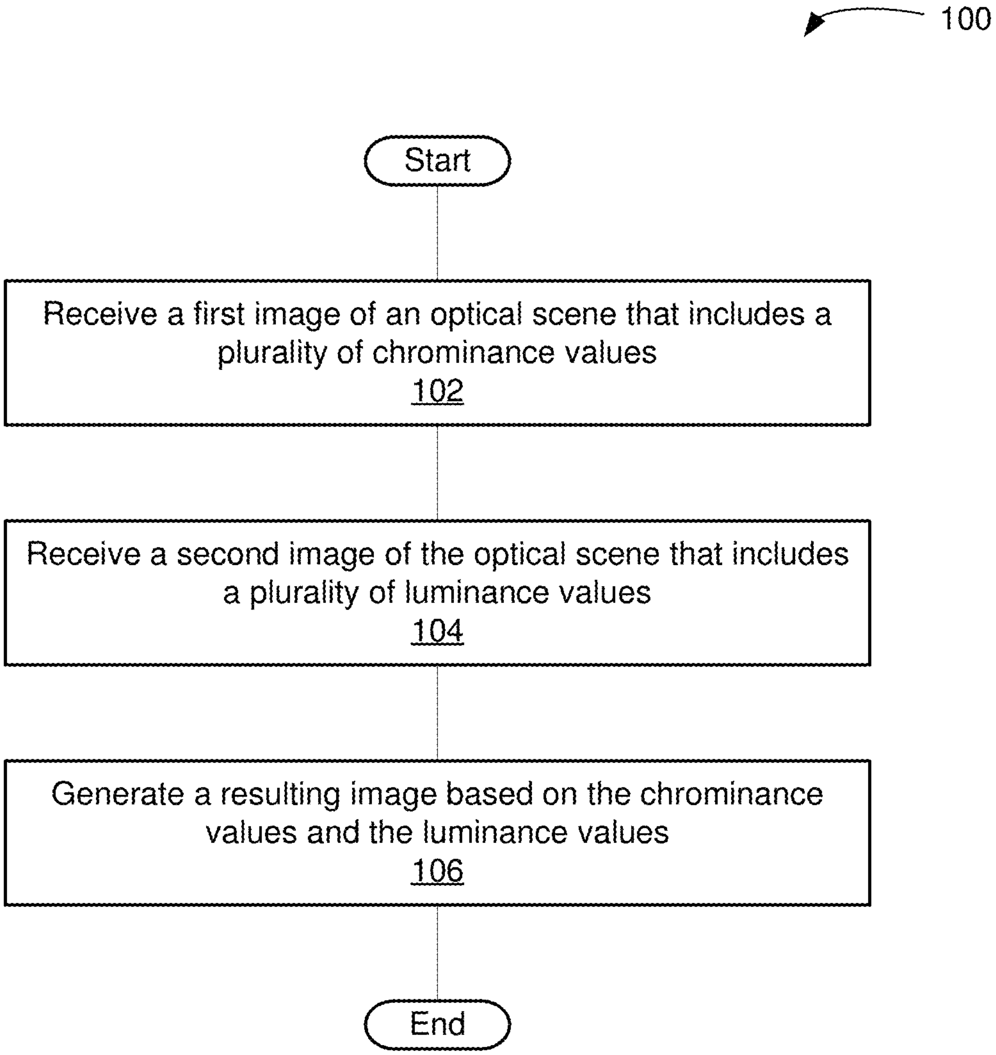
FIG. 1 illustrates a flow chart of a method 100 for generating a digital image, in accordance with one embodiment.

FIG. 1 illustrates a flow chart of a method 100 for generating a digital image, in accordance with one embodiment. Although method 100 is described in conjunction with the systems of FIGS. 2-7C, persons of ordinary skill in the art will understand that any system that performs method 100 is within the scope and spirit of embodiments of the present invention. In one embodiment, a digital photographic system, such as digital photographic system 300 of FIG. 3A, is configured to perform method 100. The digital photographic system 300 may be implemented within a digital camera, such as digital camera 302 of FIG. 3C, or a mobile device, such as mobile device 376 of FIG. 3D.

Method 100 begins at step 102, where a processor, such as processor complex 310, receives a first image of an optical scene that includes a plurality of chrominance values (referred to herein as a chrominance image). The chrominance image may be captured using a first image sensor, such as a CMOS image sensor or a CCD image sensor. In one embodiment, the chrominance image includes a plurality of pixels, where each pixel is associated with a different color channel component (e.g., red, green, blue, cyan, magenta, yellow, etc.). In another embodiment, each pixel is associated with a tuple of values, each value in the tuple associated with a different color channel component (i.e., each pixel includes a red value, a blue value, and a green value).

At step 104, the processor receives a second image of the optical scene that includes a plurality of luminance values (referred to herein as a luminance image). The luminance image may be captured using a second image sensor, which is different than the first image sensor. Alternatively, the luminance image may be captured using the first image sensor. For example, the chrominance values may be captured by a first subset of photodiodes of the first image sensor and the luminance values may be captured by a second subset of photodiodes of the first image sensor. In one embodiment, the luminance image includes a plurality of pixels, where each pixel is associated with an intensity component. The intensity component specifies a brightness of the image at that pixel. A bit depth of the intensity component may be equal to or different from a bit depth of each of the color channel components in the chrominance image. For example, each of the color channel components in the chrominance image may have a bit depth of 8 bits, but the intensity component may have a bit depth of 12 bits. The bit depths may be different where the first image sensor and the second image sensor sample analog values generated by the photodiodes in the image sensors using analog-to-digital converters (ADCs) having a different level of precision.

In one embodiment, each pixel in the chrominance image is associated with one or more corresponding pixels in the luminance image. For example, the chrominance image and the luminance image may have the same resolution and pixels in the chrominance image have a 1-to-1 mapping to corresponding pixels in the luminance image. Alternatively, the luminance image may have a higher resolution than the chrominance image, where each pixel in the chrominance image is mapped to two or more pixels in the luminance image. It will be appreciated that any manner of mapping the pixels in the chrominance image to the pixels in the luminance image is contemplated as being within the scope of the present invention.

At step 106, the processor generates a resulting image based on the first image and second image. In one embodiment, the resulting image has the same resolution as the second image (i.e., the luminance image). For each pixel in the resulting image, the processor blends the chrominance information and the luminance information to generate a resulting pixel value in the resulting image. In one embodiment, the processor determines one or more pixels in the chrominance image associated with the pixel in the resulting image. For example, the processor may select a corresponding pixel in the chrominance image that includes a red value, a green value, and a blue value that specifies a color in an RGB color space. The processor may convert the color specified in the RGB color space to a Hue-Saturation-Value (HSV) color value. In the HSV model, Hue represents a particular color, Saturation represents a "depth" of the color (i.e., whether the color is bright and bold or dim and grayish), and the Value represents a lightness of the color (i.e., whether the color intensity is closer to black or white). The processor may also determine one or more pixels in the luminance image associated with the pixel in the resulting image. A luminance value may be determined from the one or more pixels in the luminance image. The luminance value may be combined with the Hue value and Saturation value determined from the chrominance image to produce a new color specified in the HSV model. The new color may be different from the color specified by the chrominance information alone because the luminance value may be captured more accurately with respect to spatial resolution or precision (i.e., bit depth, etc.). In one embodiment, the new color specified in the HSV model may be converted back into the RGB color space and stored in the resulting image. Alternatively, the color may be converted into any technically feasible color space representation, such as YCrCb, R'G'B', or other types of color spaces well-known in the art.

In one embodiment, the processor may apply a filter to a portion of the chrominance image to select a number of color channel component values from the chrominance image. For example, a single RGB value may be determined based on a filter applied to a plurality of individual pixel values in the chrominance image, where each pixel specifies a value for a single color channel component.

More illustrative information will now be set forth regarding various optional architectures and features with which the foregoing framework may or may not be implemented, per the desires of the user. It should be strongly noted that the following information is set forth for illustrative purposes and should not be construed as limiting in any manner.

Any of the following features may be optionally incorporated with or without the exclusion of other features described.

In one embodiment, the first image may comprise a chrominance image generated by combining two or more chrominance images, as described in greater detail below. Furthermore, the second image may comprise a luminance image generated by combining two or more luminance images, as described in greater detail below.

Figure 2:
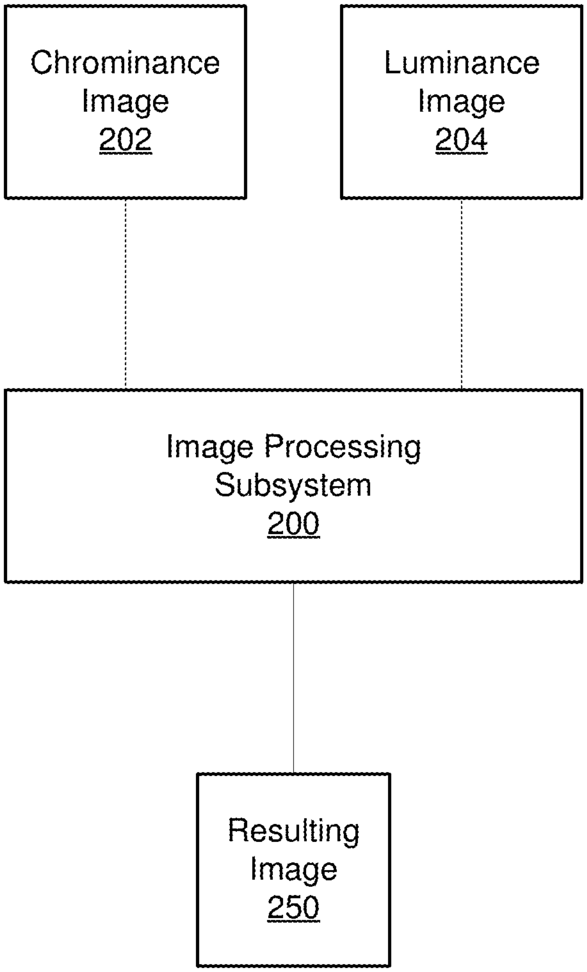
FIG. 2 illustrates an image processing subsystem configured to implement the method 100 of FIG. 1, in accordance with one embodiment.
Figure 3A:
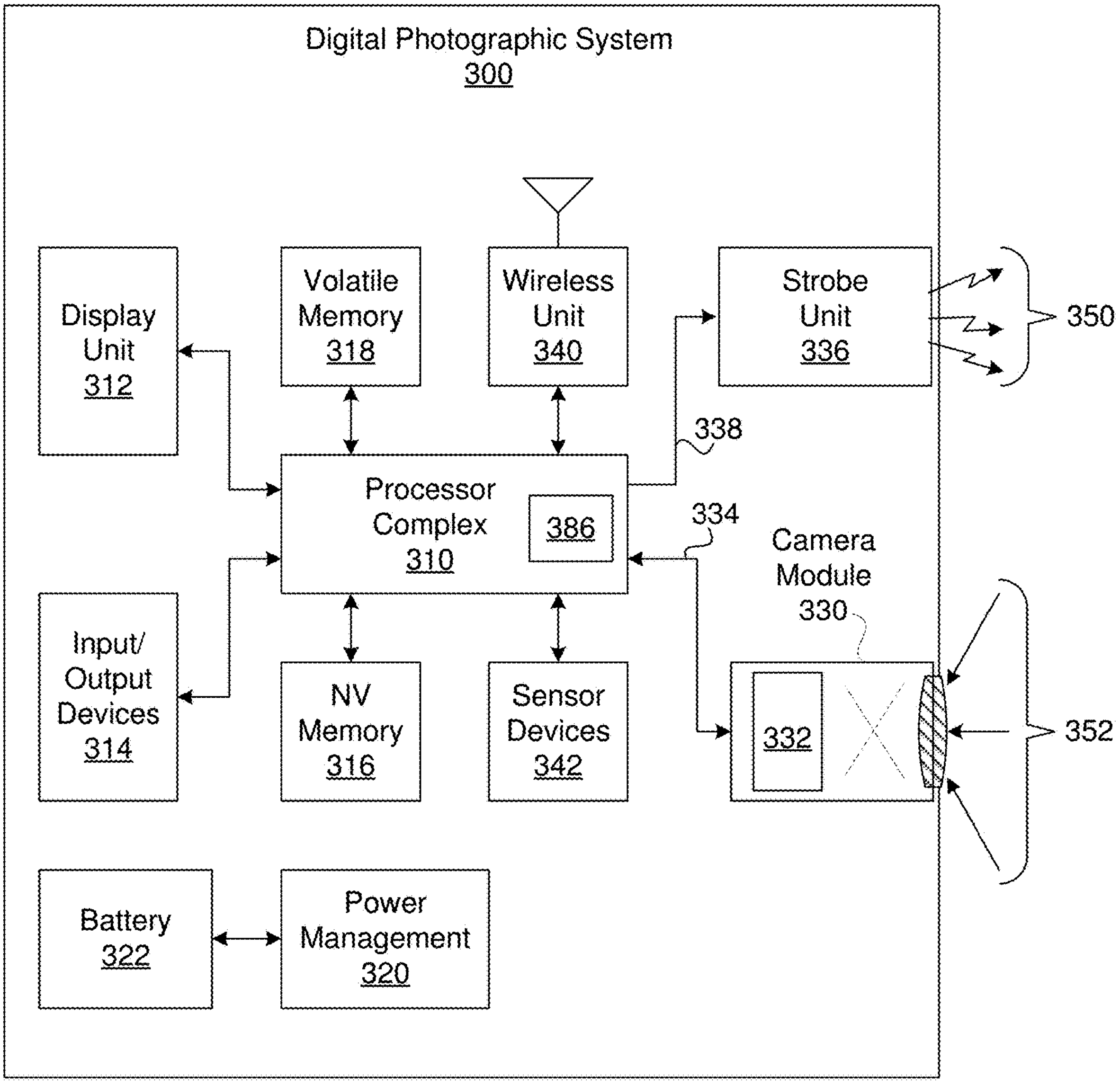
FIG. 3A illustrates a digital photographic system, configured to implement one or more aspects of the present invention.

FIG. 2 illustrates an image processing subsystem 200 configured to implement the method 100 of FIG. 1, in accordance with one embodiment. In one embodiment, the image processing subsystem 200 includes a software module, executed by a processor, which causes the processor to generate the resulting image 250 from the chrominance image 202 and the luminance image 204. The processor may be a highly parallel processor such as a graphics processing unit (GPU). In one embodiment, the software module may be a shader program, such as a pixel shader or fragment shader, which is executed by the GPU once per pixel in the resulting image 250. Each of the chrominance image 202 and the luminance image 204 may be stored as texture maps in a memory and accessed by the shader program using, e.g., a texture cache of the GPU.

In one embodiment, each instance of the shader program is executed for a corresponding pixel of the resulting image 250. Each pixel in the resulting image 250 is associated with a set of coordinates that specifies a location of the pixel in the resulting image 250. The coordinates may be used to access values in the chrominance image 202 as well as values in the luminance image 204. The values may be evaluated by one or more functions to generate a value(s) for the pixel in the resulting image 250. In one embodiment, at least two instances of the shader program associated with different pixels in the resulting image 250 may be executed in parallel.

In another embodiment, the image processing subsystem 200 may be a special function unit such as a logic circuit within an application-specific integrated circuit (ASIC). The ASIC may include the logic circuit for generating the resulting image 250 from a chrominance image 202 and a luminance image 204. In one embodiment, the chrominance image 202 is captured by a first image sensor at a first resolution and values for pixels in the chrominance image 202 are stored in a first format. Similarly, the luminance image 204 is captured by a second image sensor at a second resolution, which may be the same as or different from the first resolution, and values for pixels in the luminance image 204 are stored in a second format. The logic may be designed specifically for the chrominance image 202 at the first resolution and first format and the luminance image 204 at the second resolution and second format.

In yet another embodiment, the image processing subsystem 200 is a general purpose processor designed to process the chrominance image 202 and the luminance image 204 according to a specific algorithm. The chrominance image 202 and the luminance image 204 may be received from an external source. For example, the image processing subsystem 200 may be a service supplied by a server computer over a network. A source (i.e., a client device connected to the network) may send a request to the service to process a pair of images, including a chrominance image 202 and a luminance image 204. The source may transmit the chrominance image 202 and luminance image 204 to the service via the network. The image processing subsystem 200 may be configured to receive a plurality of pairs of images from one or more sources (e.g., devices connected to the network) and process each pair of images to generate a corresponding plurality of resulting images 250. Each resulting image 250 may be transmitted to the requesting source via the network.

As described above, a chrominance image and a luminance image may be combined to generate a resulting image that has better qualities than could be achieved with conventional techniques. For example, a typical image sensor may generate only chrominance data, which results in a perceived luminance from the combination of all color channel components. However, each individual color channel component may be sampled from a different discrete location and then combined to generate a digital image where each spatial location (i.e., pixel) is a combination of all color channel components. In other words, the digital image is a blurred version of the raw optical information captured by the image sensor. By utilizing luminance information that has not been filtered and then adding color component information to each pixel, a more precise digital image may be reproduced. Furthermore, splitting the capture of the chrominance information from the luminance information allows each component of the image to be captured separately, potentially with different image sensors tailored to each application. Such advantages will be discussed in more detail below.

FIG. 3A illustrates a digital photographic system 300, configured to implement one or more aspects of the present invention. Digital photographic system 300 includes a processor complex 310 coupled to a camera module 330 and a strobe unit 336. Digital photographic system 300 may also include, without limitation, a display unit 312, a set of input/output devices 314, non-volatile memory 316, volatile memory 318, a wireless unit 340, and sensor devices 342, each coupled to processor complex 310. In one embodiment, a power management subsystem 320 is configured to generate appropriate power supply voltages for each electrical load element within digital photographic system 300. A battery 322 may be configured to supply electrical energy to power management subsystem 320. Battery 322 may implement any technically feasible energy storage system, including primary or rechargeable battery technologies.

In one embodiment, strobe unit 336 is integrated into digital photographic system 300 and configured to provide strobe illumination 350 during an image sample event performed by digital photographic system 300. In an alternative embodiment, strobe unit 336 is implemented as an independent device from digital photographic system 300 and configured to provide strobe illumination 350 during an image sample event performed by digital photographic system 300. Strobe unit 336 may comprise one or more LED devices. In certain embodiments, two or more strobe units are configured to synchronously generate strobe illumination in conjunction with sampling an image.

In one embodiment, strobe unit 336 is directed through a strobe control signal 338 to either emit strobe illumination 350 or not emit strobe illumination 350. The strobe control signal 338 may implement any technically feasible signal transmission protocol. Strobe control signal 338 may indicate a strobe parameter, such as strobe intensity or strobe color, for directing strobe unit 336 to generate a specified intensity and/or color of strobe illumination 350. As shown, strobe control signal 338 may be generated by processor complex 310. Alternatively, strobe control signal 338 may be generated by camera module 330 or by any other technically feasible system element.

In one usage scenario, strobe illumination 350 comprises at least a portion of overall illumination in a photographic scene being photographed by camera module 330. Optical scene information 352, which may include strobe illumination 350 reflected from objects in the photographic scene, is focused as an optical image onto an image sensor 332, within camera module 330. Image sensor 332 generates an electronic representation of the optical image. The electronic representation comprises spatial color intensity information, which may include different color intensity samples, such as for red, green, and blue light. The spatial color intensity information may also include samples for white light. Alternatively, the color intensity samples may include spatial color intensity information for cyan, magenta, and yellow light. Persons skilled in the art will recognize that other and further sets of spatial color intensity information may be implemented. The electronic representation is transmitted to processor complex 310 via interconnect 334, which may implement any technically feasible signal transmission protocol.

Input/output devices 314 may include, without limitation, a capacitive touch input surface, a resistive tablet input surface, one or more buttons, one or more knobs, light-emitting devices, light detecting devices, sound emitting devices, sound detecting devices, or any other technically feasible device for receiving user input and converting the input to electrical signals, or converting electrical signals into a physical signal. In one embodiment, input/output devices 314 include a capacitive touch input surface coupled to display unit 312.

Non-volatile (NV) memory 316 is configured to store data when power is interrupted. In one embodiment, NV memory 316 comprises one or more flash memory devices. NV memory 316 may be configured to include programming instructions for execution by one or more processing units within processor complex 310. The programming instructions may implement, without limitation, an operating system (OS), UI modules, image processing and storage modules, one or more modules for sampling an image set through camera module 330, one or more modules for presenting the image set through display unit 312. The programming instructions may also implement one or more modules for merging images or portions of images within the image set, aligning at least portions of each image within the image set, or a combination thereof. One or more memory devices comprising NV memory 316 may be packaged as a module configured to be installed or removed by a user. In one embodiment, volatile memory 318 comprises dynamic random access memory (DRAM) configured to temporarily store programming instructions, image data such as data associated with an image set, and the like, accessed during the course of normal operation of digital photographic system 300.

Sensor devices 342 may include, without limitation, an accelerometer to detect motion and/or orientation, an electronic gyroscope to detect motion and/or orientation, a magnetic flux detector to detect orientation, a global positioning system (GPS) module to detect geographic position, or any combination thereof.

Wireless unit 340 may include one or more digital radios configured to send and receive digital data. In particular, wireless unit 340 may implement wireless standards known in the art as "WiFi" based on Institute for Electrical and Electronics Engineers (IEEE) standard 802.11, and may implement digital cellular telephony standards for data communication such as the well-known "3G" and "4G" suites of standards. Wireless unit 340 may further implement standards and protocols known in the art as LTE (long term evolution). In one embodiment, digital photographic system 300 is configured to transmit one or more digital photographs, sampled according to techniques taught herein, to an online or "cloud-based" photographic media service via wireless unit 340. The one or more digital photographs may reside within either NV memory 316 or volatile memory 318. In such a scenario, a user may possess credentials to access the online photographic media service and to transmit the one or more digital photographs for storage and presentation by the online photographic media service. The credentials may be stored or generated within digital photographic system 300 prior to transmission of the digital photographs. The online photographic media service may comprise a social networking service, photograph sharing service, or any other network-based service that provides storage and transmission of digital photographs. In certain embodiments, one or more digital photographs are generated by the online photographic media service based on an image set sampled according to techniques taught herein. In such embodiments, a user may upload source images comprising an image set for processing by the online photographic media service.

In one embodiment, digital photographic system 300 comprises a plurality of camera modules 330. Such an embodiment may also include at least one strobe unit 336 configured to illuminate a photographic scene, sampled as multiple views by the plurality of camera modules 330. The plurality of camera modules 330 may be configured to sample a wide angle view (greater than forty-five degrees of sweep among cameras) to generate a panoramic photograph. The plurality of camera modules 330 may also be configured to sample two or more narrow angle views (less than forty-five degrees of sweep among cameras) to generate a stereoscopic photograph. The plurality of camera modules 330 may include at least one camera module configured to sample chrominance information and at least one different camera module configured to sample luminance information.

Display unit 312 is configured to display a two-dimensional array of pixels to form an image for display. Display unit 312 may comprise a liquid-crystal display, an organic LED display, or any other technically feasible type of display. In certain embodiments, display unit 312 is able to display a narrower dynamic range of image intensity values than a complete range of intensity values sampled over a set of two or more images comprising the image set. Here, images comprising the image set may be merged according to any technically feasible high dynamic range (HDR) blending technique to generate a synthetic image for display within dynamic range constraints of display unit 312. In one embodiment, the limited dynamic range specifies an eight-bit per color channel binary representation of corresponding color intensities. In other embodiments, the limited dynamic range specifies a twelve-bit per color channel binary representation.

Figure 3B:
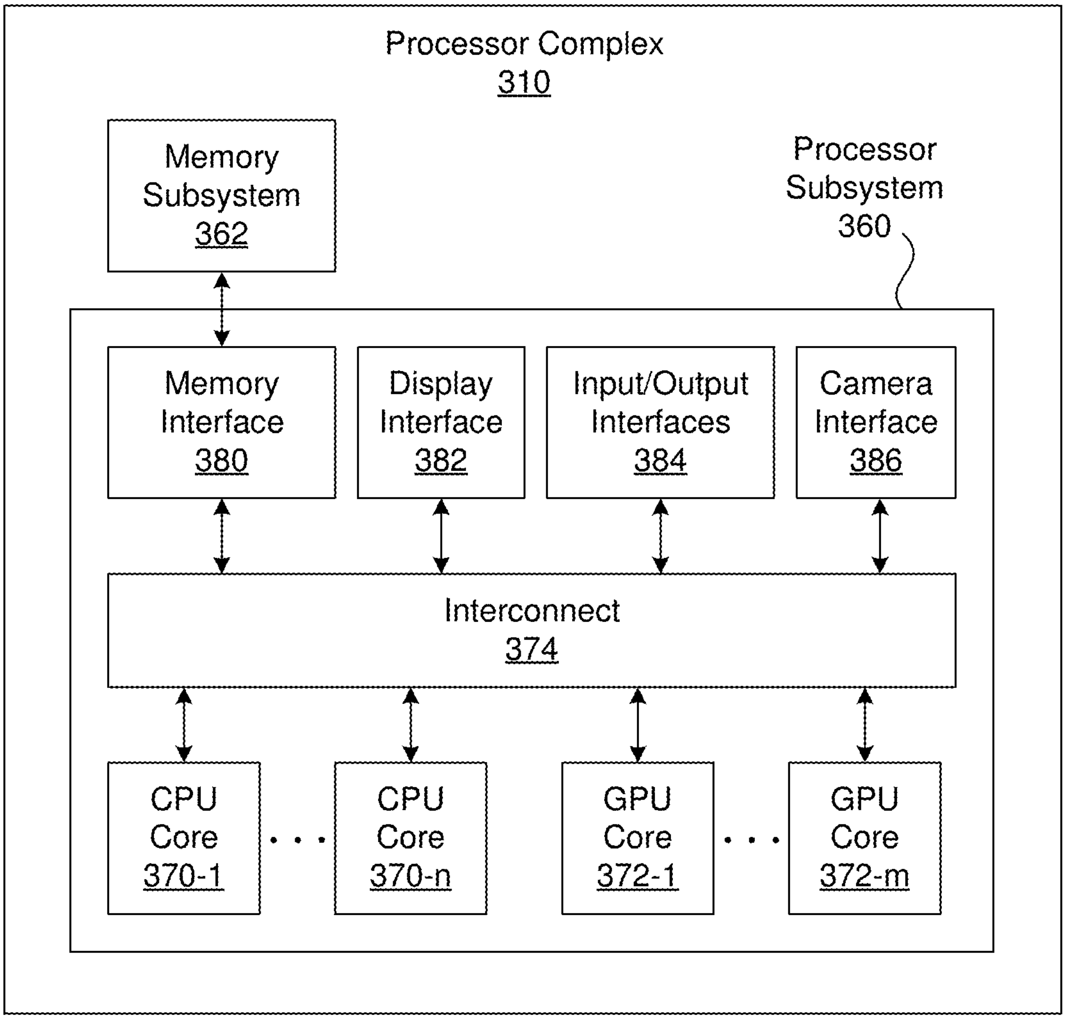
FIG. 3B illustrates a processor complex within digital photographic system of FIG. 3A, according to one embodiment of the present invention.

FIG. 3B illustrates a processor complex 310 within digital photographic system 300 of FIG. 3A, according to one embodiment of the present invention. Processor complex 310 includes a processor subsystem 360 and may include a memory subsystem 362. In one embodiment, processor complex 310 comprises a system on a chip (SoC) device that implements processor subsystem 360, and memory subsystem 362 comprising one or more DRAM devices coupled to processor subsystem 360. In one implementation of the embodiment, processor complex 310 comprises a multi-chip module (MCM) encapsulating the SoC device and the one or more DRAM devices.

Processor subsystem 360 may include, without limitation, one or more central processing unit (CPU) cores 370, a memory interface 380, input/output interfaces unit 384, and a display interface unit 382, each coupled to an interconnect 374. The one or more CPU cores 370 may be configured to execute instructions residing within memory subsystem 362, volatile memory 318, NV memory 316, or any combination thereof. Each of the one or more CPU cores 370 may be configured to retrieve and store data via interconnect 374 and memory interface 380. Each of the one or more CPU cores 370 may include a data cache, and an instruction cache. Two or more CPU cores 370 may share a data cache, an instruction cache, or any combination thereof. In one embodiment, a cache hierarchy is implemented to provide each CPU core 370 with a private cache layer, and a shared cache layer.

Processor subsystem 360 may further include one or more graphics processing unit (GPU) cores 372. Each GPU core 372 comprises a plurality of multi-threaded execution units that may be programmed to implement graphics acceleration functions. GPU cores 372 may be configured to execute multiple thread programs according to well-known standards such as OpenGL™, OpenCL™, CUDA™, and the like. In certain embodiments, at least one GPU core 372 implements at least a portion of a motion estimation function, such as a well-known Harris detector or a well-known Hessian-Laplace detector. Such a motion estimation function may be used for aligning images or portions of images within the image set.

Interconnect 374 is configured to transmit data between and among memory interface 380, display interface unit 382, input/output interfaces unit 384, CPU cores 370, and GPU cores 372. Interconnect 374 may implement one or more buses, one or more rings, a cross-bar, a mesh, or any other technically feasible data transmission structure or technique. Memory interface 380 is configured to couple memory subsystem 362 to interconnect 374. Memory interface 380 may also couple NV memory 316, volatile memory 318, or any combination thereof to interconnect 374. Display interface unit 382 is configured to couple display unit 312 to interconnect 374. Display interface unit 382 may implement certain frame buffer functions such as frame refresh. Alternatively, display unit 312 may implement frame refresh. Input/output interfaces unit 384 is configured to couple various input/output devices to interconnect 374.

In certain embodiments, camera module 330 is configured to store exposure parameters for sampling each image in an image set. When directed to sample an image set, the camera module 330 samples the image set according to the stored exposure parameters. A software module executing within processor complex 310 may generate and store the exposure parameters prior to directing the camera module 330 to sample the image set.

In other embodiments, camera module 330 is configured to store exposure parameters for sampling an image in an image set, and the camera interface unit 386 within the processor complex 310 is configured to cause the camera module 330 to first store exposure parameters for a given image comprising the image set, and to subsequently sample the image. In one embodiment, exposure parameters associated with images comprising the image set are stored within a parameter data structure. The camera interface unit 386 is configured to read exposure parameters from the parameter data structure for a given image to be sampled, and to transmit the exposure parameters to the camera module 330 in preparation of sampling an image. After the camera module 330 is configured according to the exposure parameters, the camera interface unit 386 directs the camera module 330 to sample an image. Each image within an image set may be sampled in this way. The data structure may be stored within the camera interface unit 386, within a memory circuit within processor complex 310, within volatile memory 318, within NV memory 316, or within any other technically feasible memory circuit. A software module executing within processor complex 310 may generate and store the data structure.

In one embodiment, the camera interface unit 386 transmits exposure parameters and commands to camera module 330 through interconnect 334. In certain embodiments, the camera interface unit 386 is configured to directly control the strobe unit 336 by transmitting control commands to the strobe unit 336 through strobe control signal 338. By directly controlling both the camera module 330 and the strobe unit 336, the camera interface unit 386 may cause the camera module 330 and the strobe unit 336 to perform their respective operations in precise time synchronization. That is, the camera interface unit 386 may synchronize the steps of configuring the camera module 330 prior to sampling an image, configuring the strobe unit 336 to generate appropriate strobe illumination, and directing the camera module 330 to sample a photographic scene subjected to strobe illumination.

Additional set-up time or execution time associated with each step may reduce overall sampling performance. Therefore, a dedicated control circuit, such as the camera interface unit 386, may be implemented to substantially minimize set-up and execution time associated with each step and any intervening time between steps.

In other embodiments, a software module executing within processor complex 310 directs the operation and synchronization of camera module 330 and the strobe unit 336, with potentially reduced performance.

In one embodiment, camera interface unit 386 is configured to accumulate statistics while receiving image data from the camera module 330. In particular, the camera interface unit 386 may accumulate exposure statistics for a given image while receiving image data for the image through interconnect 334. Exposure statistics may include an intensity histogram, a count of over-exposed pixels or under-exposed pixels, an intensity-weighted sum of pixel intensity, or any combination thereof. The camera interface unit 386 may present the exposure statistics as memory-mapped storage locations within a physical or virtual address space defined by a processor, such as a CPU core 370, within processor complex 310.

In certain embodiments, camera interface unit 386 accumulates color statistics for estimating scene white-balance. Any technically feasible color statistics may be accumulated for estimating white balance, such as a sum of intensities for different color channels comprising red, green, and blue color channels. The sum of color channel intensities may then be used to perform a white-balance color correction on an associated image, according to a white-balance model such as a gray-world white-balance model. In other embodiments, curve-fitting statistics are accumulated for a linear or a quadratic curve fit used for implementing white-balance correction on an image. In one embodiment, camera interface unit 386 accumulates spatial color statistics for performing color-matching between or among images, such as between or among one or more ambient images and one or more images sampled with strobe illumination. As with the exposure statistics, the color statistics may be presented as memory-mapped storage locations within processor complex 310.

In one embodiment, camera module 330 transmits strobe control signal 338 to strobe unit 336, enabling strobe unit

336 to generate illumination while the camera module 330 is sampling an image. In another embodiment, camera module 330 samples an image illuminated by strobe unit 336 upon receiving an indication from camera interface unit 386 that strobe unit 336 is enabled. In yet another embodiment, camera module 330 samples an image illuminated by strobe unit 336 upon detecting strobe illumination within a photographic scene via a rapid rise in scene illumination.

Figure 3C:
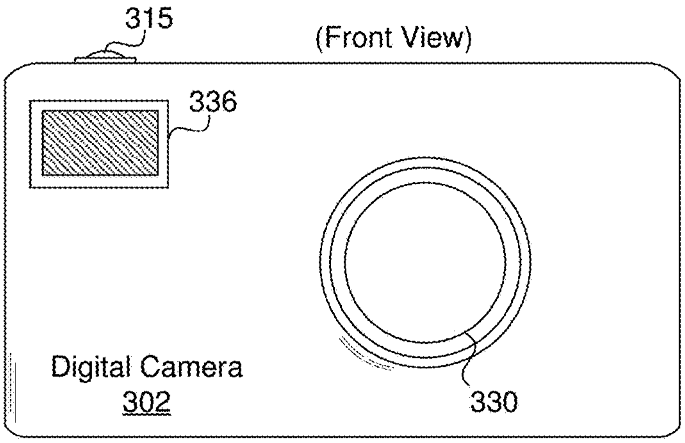
FIG. 3C illustrates a digital camera, in accordance with one embodiment.

FIG. 3C illustrates a digital camera 302, in accordance with one embodiment. As an option, the digital camera 302 may be implemented in the context of the details of any of the Figures disclosed herein. Of course, however, the digital camera 302 may be implemented in any desired environment. Further, the aforementioned definitions may equally apply to the description below.

In one embodiment, the digital camera 302 may be configured to include a digital photographic system, such as digital photographic system 300 of FIG. 3A. As shown, the digital camera 302 includes a camera module 330, which may include optical elements configured to focus optical scene information representing a photographic scene onto an image sensor, which may be configured to convert the optical scene information to an electronic representation of the photographic scene.

Additionally, the digital camera 302 may include a strobe unit 336, and may include a shutter release button 315 for triggering a photographic sample event, whereby digital camera 302 samples one or more images comprising the electronic representation. In other embodiments, any other technically feasible shutter release mechanism may trigger the photographic sample event (e.g. such as a timer trigger or remote control trigger, etc.).

Figure 3D:
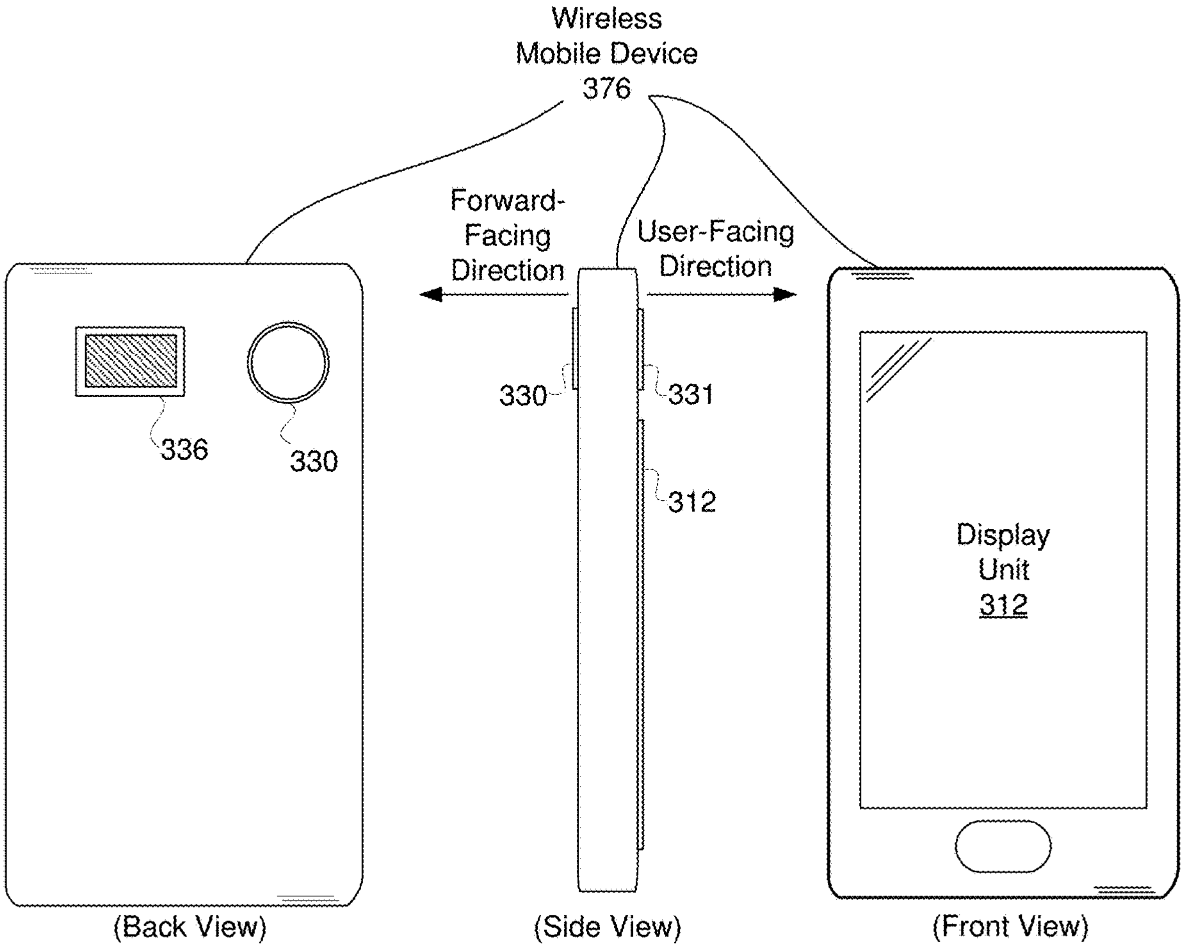
FIG. 3D illustrates a wireless mobile device, in accordance with one embodiment.

FIG. 3D illustrates a wireless mobile device 376, in accordance with one embodiment. As an option, the mobile device 376 may be implemented in the context of the details of any of the Figures disclosed herein. Of course, however, the mobile device 376 may be implemented in any desired environment. Further, the aforementioned definitions may equally apply to the description below.

In one embodiment, the mobile device 376 may be configured to include a digital photographic system (e.g. such as digital photographic system 300 of FIG. 3A), which is configured to sample a photographic scene. In various embodiments, a camera module 330 may include optical elements configured to focus optical scene information representing the photographic scene onto an image sensor, which may be configured to convert the optical scene information to an electronic representation of the photographic scene. Further, a shutter release command may be generated through any technically feasible mechanism, such as a virtual button, which may be activated by a touch gesture on a touch entry display system comprising display unit 312, or a physical button, which may be located on any face or surface of the mobile device 376. Of course, in other embodiments, any number of other buttons, external inputs/outputs, or digital inputs/outputs may be included on the mobile device 376, and which may be used in conjunction with the camera module 330.

As shown, in one embodiment, a touch entry display system comprising display unit 312 is disposed on the opposite side of mobile device 376 from camera module 330. In certain embodiments, the mobile device 376 includes a user-facing camera module 331 and may include a user-facing strobe unit (not shown). Of course, in other embodiments, the mobile device 376 may include any number of user-facing camera modules or rear-facing camera modules, as well as any number of user-facing strobe units or rear-facing strobe units.

In some embodiments, the digital camera 302 and the mobile device 376 may each generate and store a synthetic image based on an image stack sampled by camera module 330. The image stack may include one or more images sampled under ambient lighting conditions, one or more images sampled under strobe illumination from strobe unit 336, or a combination thereof. In one embodiment, the image stack may include one or more different images sampled for chrominance, and one or more different images sampled for luminance.

Figure 3E:
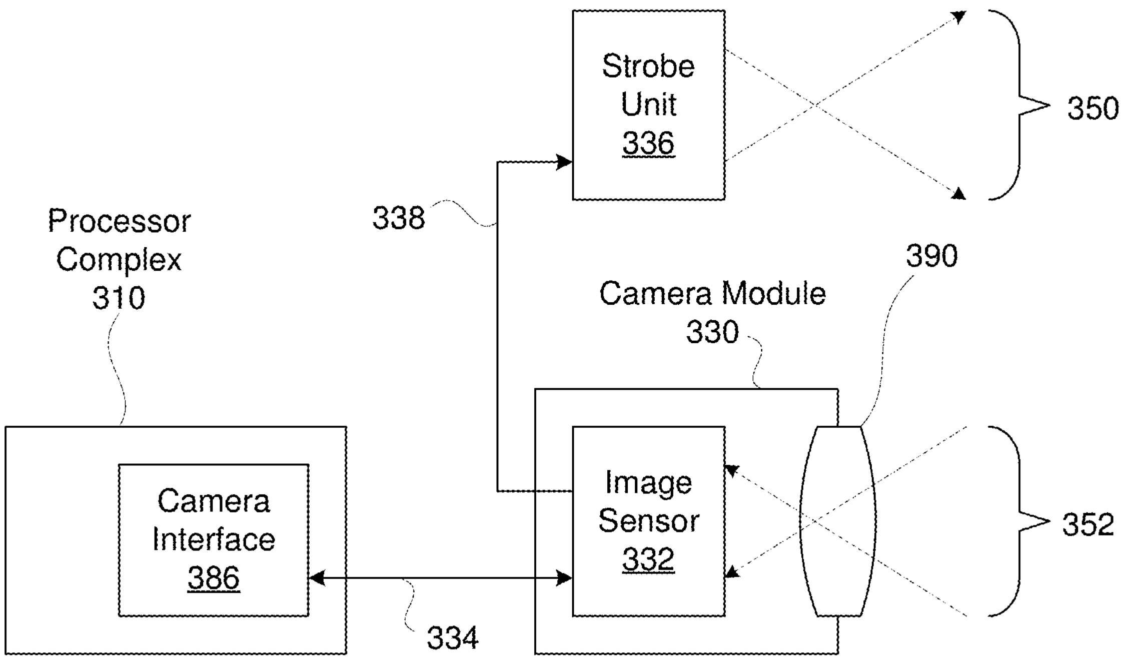
FIG. 3E illustrates camera module, in accordance with one embodiment.

FIG. 3E illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to control strobe unit 336 through strobe control signal 338. As shown, a lens 390 is configured to focus optical scene information 352 onto image sensor 332 to be sampled. In one embodiment, image sensor 332 advantageously controls detailed timing of the strobe unit 336 though the strobe control signal 338 to reduce inter-sample time between an image sampled with the strobe unit 336 enabled, and an image sampled with the strobe unit 336 disabled. For example, the image sensor 332 may enable the strobe unit 336 to emit strobe illumination 350 less than one microsecond (or any desired length) after image sensor 332 completes an exposure time associated with sampling an ambient image and prior to sampling a strobe image.

In other embodiments, the strobe illumination 350 may be configured based on a desired one or more target points. For example, in one embodiment, the strobe illumination 350 may light up an object in the foreground, and depending on the length of exposure time, may also light up an object in the background of the image. In one embodiment, once the strobe unit 336 is enabled, the image sensor 332 may then immediately begin exposing a strobe image. The image sensor 332 may thus be able to directly control sampling operations, including enabling and disabling the strobe unit 336 associated with generating an image stack, which may comprise at least one image sampled with the strobe unit 336 disabled, and at least one image sampled with the strobe unit 336 either enabled or disabled. In one embodiment, data comprising the image stack sampled by the image sensor 332 is transmitted via interconnect 334 to a camera interface unit 386 within processor complex 310. In some embodiments, the camera module 330 may include an image sensor controller, which may be configured to generate the strobe control signal 338 in conjunction with controlling operation of the image sensor 332.

Figure 3F:
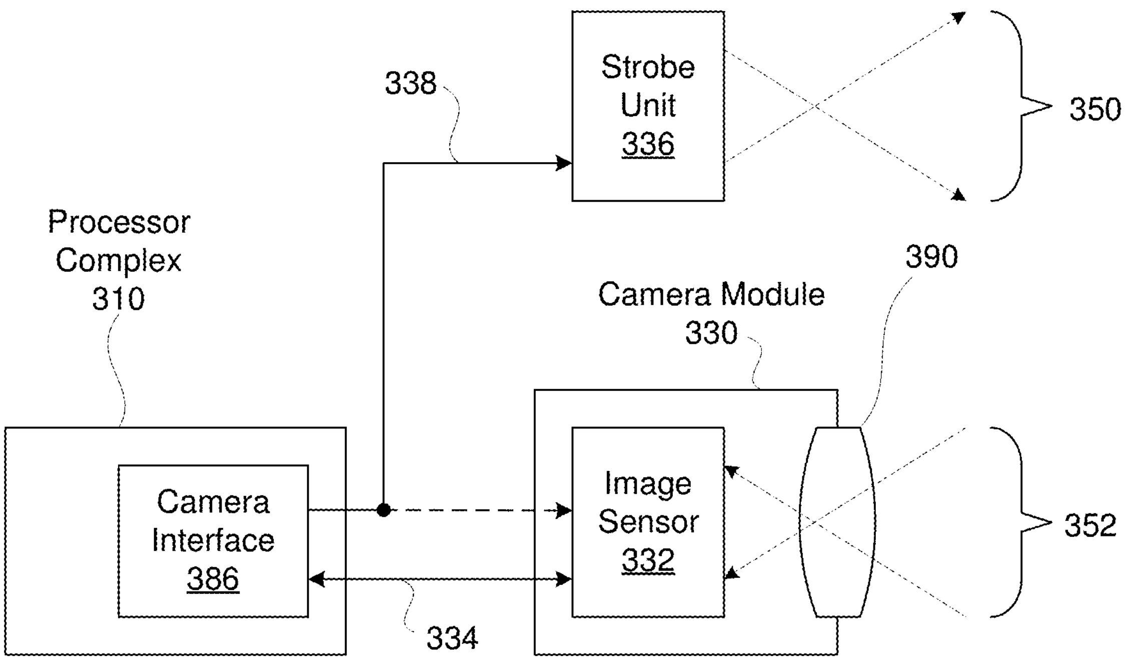
FIG. 3F illustrates a camera module, in accordance with one embodiment.

FIG. 3F illustrates a camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to sample an image based on state information for strobe unit 336. The state information may include, without limitation, one or more strobe parameters (e.g. strobe intensity, strobe color, strobe time, etc.), for directing the strobe unit 336 to generate a specified intensity and/or color of the strobe illumination 350. In one embodiment, commands for configuring the state information associated with the strobe unit 336 may be transmitted through a strobe control signal 338, which may be monitored by the camera module 330 to detect when the strobe unit 336 is enabled. For example, in one embodiment, the camera module 330 may detect when the strobe unit 336 is enabled or disabled within a microsecond or less of the strobe unit 336 being enabled or disabled by the strobe control signal 338. To sample an image requiring strobe illumination, a camera interface unit 386 may enable the strobe unit 336 by sending an enable command through the strobe control signal 338. In one embodiment, the camera interface unit 386 may be included as an interface of input/output interfaces 384 in a processor subsystem 360 of the processor complex 310 of FIG. 3B. The enable command may comprise a signal level transition, a data packet, a register write, or any other technically feasible transmission of a command. The camera module 330 may sense that the strobe unit 336 is enabled and then cause image sensor 332 to sample one or more images requiring strobe illumination while the strobe unit 336 is enabled. In such an implementation, the image sensor 332 may be configured to wait for an enable signal destined for the strobe unit 336 as a trigger signal to begin sampling a new exposure.

In one embodiment, camera interface unit 386 may transmit exposure parameters and commands to camera module 330 through interconnect 334. In certain embodiments, the camera interface unit 386 may be configured to directly control strobe unit 336 by transmitting control commands to the strobe unit 336 through strobe control signal 338. By directly controlling both the camera module 330 and the strobe unit 336, the camera interface unit 386 may cause the camera module 330 and the strobe unit 336 to perform their respective operations in precise time synchronization. In one embodiment, precise time synchronization may be less than five hundred microseconds of event timing error. Additionally, event timing error may be a difference in time from an intended event occurrence to the time of a corresponding actual event occurrence.

In another embodiment, camera interface unit 386 may be configured to accumulate statistics while receiving image data from camera module 330. In particular, the camera interface unit 386 may accumulate exposure statistics for a given image while receiving image data for the image through interconnect 334. Exposure statistics may include, without limitation, one or more of an intensity histogram, a count of over-exposed pixels, a count of under-exposed pixels, an intensity-weighted sum of pixel intensity, or any combination thereof. The camera interface unit 386 may present the exposure statistics as memory-mapped storage locations within a physical or virtual address space defined by a processor, such as one or more of CPU cores 370, within processor complex 310. In one embodiment, exposure statistics reside in storage circuits that are mapped into a memory-mapped register space, which may be accessed through the interconnect 334. In other embodiments, the exposure statistics are transmitted in conjunction with transmitting pixel data for a captured image. For example, the exposure statistics for a given image may be transmitted as in-line data, following transmission of pixel intensity data for the captured image. Exposure statistics may be calculated, stored, or cached within the camera interface unit 386.

In one embodiment, camera interface unit 386 may accumulate color statistics for estimating scene white-balance. Any technically feasible color statistics may be accumulated for estimating white balance, such as a sum of intensities for different color channels comprising red, green, and blue color channels. The sum of color channel intensities may then be used to perform a white-balance color correction on an associated image, according to a white-balance model such as a gray-world white-balance model. In other embodiments, curve-fitting statistics are accumulated for a linear or a quadratic curve fit used for implementing white-balance correction on an image.

In one embodiment, camera interface unit 386 may accumulate spatial color statistics for performing color-matching between or among images, such as between or among an ambient image and one or more images sampled with strobe illumination. As with the exposure statistics, the color statistics may be presented as memory-mapped storage locations within processor complex 310. In one embodiment, the color statistics are mapped in a memory-mapped register space, which may be accessed through interconnect 334, within processor subsystem 360. In other embodiments, the color statistics may be transmitted in conjunction with transmitting pixel data for a captured image. For example, in one embodiment, the color statistics for a given image may be transmitted as in-line data, following transmission of pixel intensity data for the image. Color statistics may be calculated, stored, or cached within the camera interface 386.

In one embodiment, camera module 330 may transmit strobe control signal 338 to strobe unit 336, enabling the strobe unit 336 to generate illumination while the camera module 330 is sampling an image. In another embodiment, camera module 330 may sample an image illuminated by strobe unit 336 upon receiving an indication signal from camera interface unit 386 that the strobe unit 336 is enabled. In yet another embodiment, camera module 330 may sample an image illuminated by strobe unit 336 upon detecting strobe illumination within a photographic scene via a rapid rise in scene illumination. In one embodiment, a rapid rise in scene illumination may include at least a rate of increasing intensity consistent with that of enabling strobe unit 336. In still yet another embodiment, camera module 330 may enable strobe unit 336 to generate strobe illumination while sampling one image, and disable the strobe unit 336 while sampling a different image.

Figure 3G:
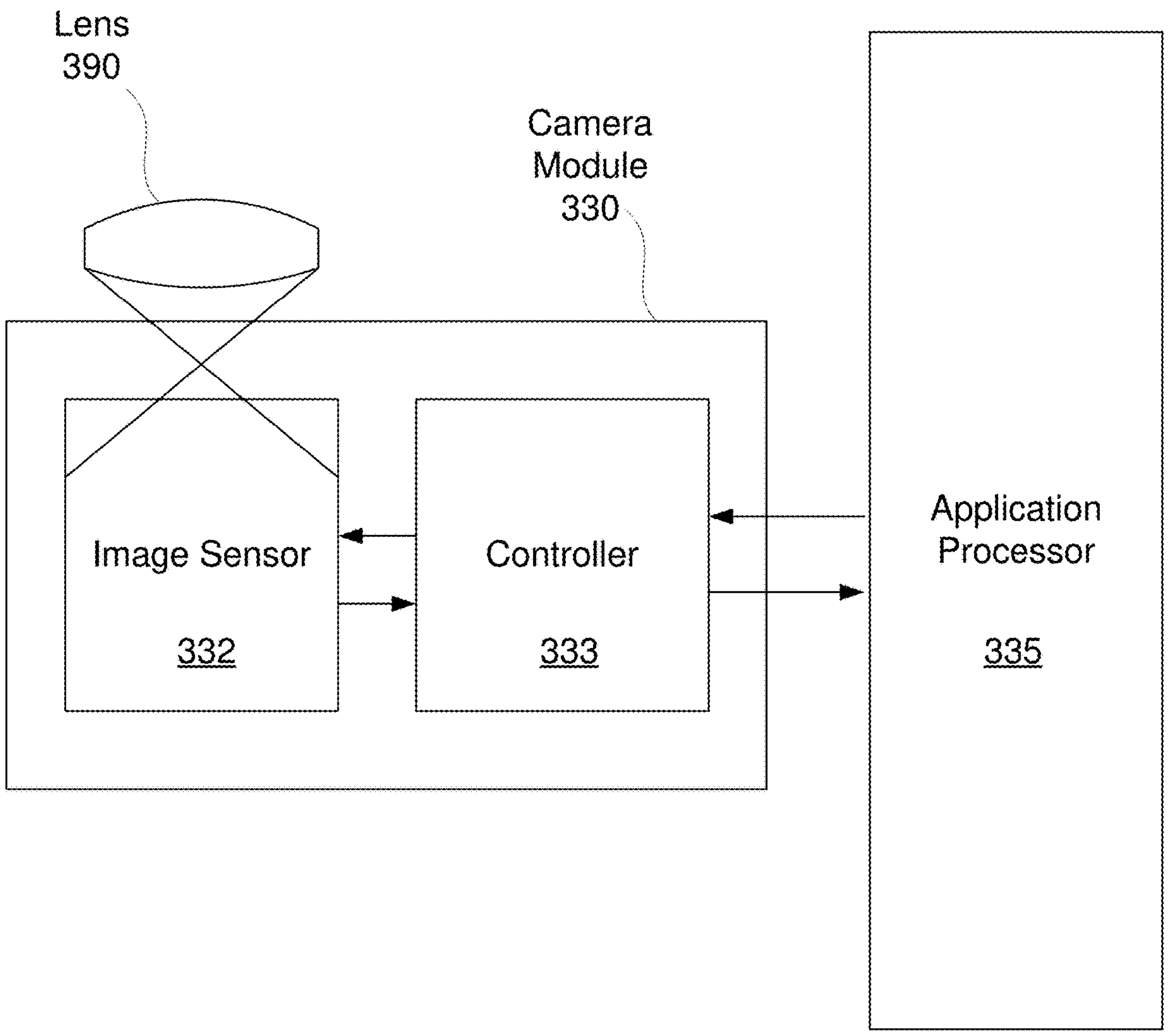
FIG. 3G illustrates camera module, in accordance with one embodiment.

FIG. 3G illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be in communication with an application processor 335. The camera module 330 is shown to include image sensor 332 in communication with a controller 333. Further, the controller 333 is shown to be in communication with the application processor 335.

In one embodiment, the application processor 335 may reside outside of the camera module 330. As shown, the lens 390 may be configured to focus optical scene information onto image sensor 332 to be sampled. The optical scene information sampled by the image sensor 332 may then be communicated from the image sensor 332 to the controller 333 for at least one of subsequent processing and communication to the application processor 335. In another embodiment, the controller 333 may control storage of the optical scene information sampled by the image sensor 332, or storage of processed optical scene information.

In another embodiment, the controller 333 may enable a strobe unit to emit strobe illumination for a short time duration (e.g. less than one microsecond, etc.) after image sensor 332 completes an exposure time associated with sampling an ambient image. Further, the controller 333 may be configured to generate strobe control signal 338 in conjunction with controlling operation of the image sensor 332.

In one embodiment, the image sensor 332 may be a complementary metal oxide semiconductor (CMOS) sensor or a charge-coupled device (CCD) sensor. In another embodiment, the controller 333 and the image sensor 332 may be packaged together as an integrated system or integrated circuit. In yet another embodiment, the controller 333 and the image sensor 332 may comprise discrete packages. In one embodiment, the controller 333 may provide circuitry for receiving optical scene information from the image sensor 332, processing of the optical scene information, timing of various functionalities, and signaling associated with the application processor 335. Further, in another embodiment, the controller 333 may provide circuitry for control of one or more of exposure, shuttering, white balance, and gain adjustment. Processing of the optical scene information by the circuitry of the controller 333 may include one or more of gain application, amplification, and analog-to-digital conversion. After processing the optical scene information, the controller 333 may transmit corresponding digital pixel data, such as to the application processor 335.

In one embodiment, the application processor 335 may be implemented on processor complex 310 and at least one of volatile memory 318 and NV memory 316, or any other memory device and/or system. The application processor 335 may be previously configured for processing of received optical scene information or digital pixel data communicated from the camera module 330 to the application processor 335.

Figure 4:
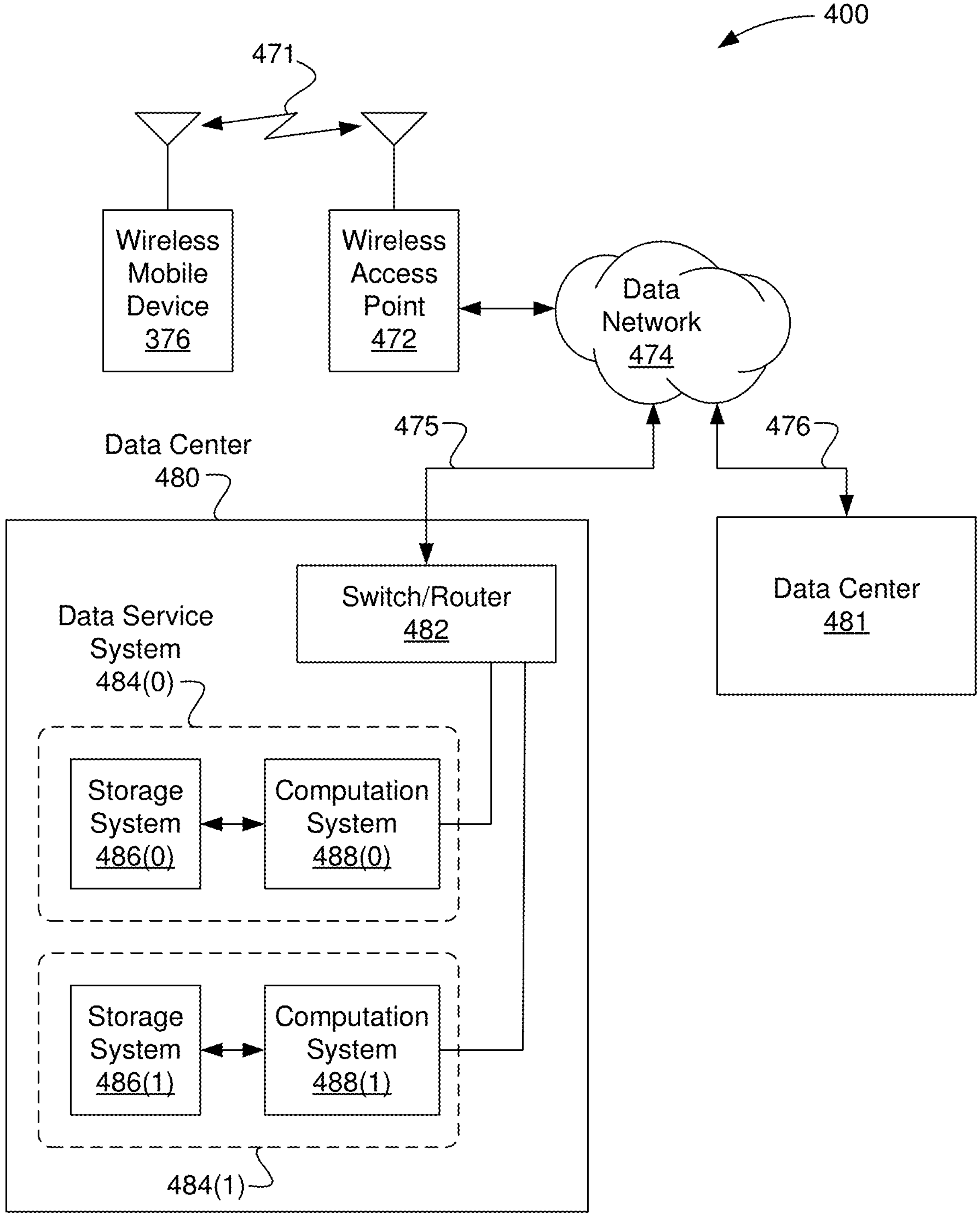
FIG. 4 illustrates a network service system, in accordance with one embodiment.

FIG. 4 illustrates a network service system 400, in accordance with one embodiment. As an option, the network service system 400 may be implemented in the context of the details of any of the Figures disclosed herein. Of course, however, the network service system 400 may be implemented in any desired environment. Further, the aforementioned definitions may equally apply to the description below.

In one embodiment, the network service system 400 may be configured to provide network access to a device implementing a digital photographic system. As shown, network service system 400 includes a wireless mobile device 376, a wireless access point 472, a data network 474, data center 480, and a data center 481. The wireless mobile device 376 may communicate with the wireless access point 472 via a digital radio link 471 to send and receive digital data, including data associated with digital images. The wireless mobile device 376 and the wireless access point 472 may implement any technically feasible transmission techniques for transmitting digital data via digital a radio link 471 without departing the scope and spirit of the present invention. In certain embodiments, one or more of data centers 480, 481 may be implemented using virtual constructs so that each system and subsystem within a given data center 480, 481 may comprise virtual machines configured to perform specified data processing and network tasks. In other implementations, one or more of data centers 480, 481 may be physically distributed over a plurality of physical sites.

The wireless mobile device 376 may comprise a smart phone configured to include a digital camera, a digital camera configured to include wireless network connectivity, a reality augmentation device, a laptop configured to include a digital camera and wireless network connectivity, or any other technically feasible computing device configured to include a digital photographic system and wireless network connectivity.

In various embodiments, the wireless access point 472 may be configured to communicate with wireless mobile device 376 via the digital radio link 471 and to communicate with the data network 474 via any technically feasible transmission media, such as any electrical, optical, or radio transmission media. For example, in one embodiment, wireless access point 472 may communicate with data network 474 through an optical fiber coupled to the wireless access point 472 and to a router system or a switch system within the data network 474. A network link 475, such as a wide area network (WAN) link, may be configured to transmit data between the data network 474 and the data center 480.

In one embodiment, the data network 474 may include routers, switches, long-haul transmission systems, provisioning systems, authorization systems, and any technically feasible combination of communications and operations subsystems configured to convey data between network endpoints, such as between the wireless access point 472 and the data center 480. In one implementation, a wireless the mobile device 376 may comprise one of a plurality of wireless mobile devices configured to communicate with the data center 480 via one or more wireless access points coupled to the data network 474.

Additionally, in various embodiments, the data center 480 may include, without limitation, a switch/router 482 and at least one data service system 484. The switch/router 482 may be configured to forward data traffic between and among a network link 475, and each data service system 484. The switch/router 482 may implement any technically feasible transmission techniques, such as Ethernet media layer transmission, layer 2 switching, layer 3 routing, and the like. The switch/router 482 may comprise one or more individual systems configured to transmit data between the data service systems 484 and the data network 474.

In one embodiment, the switch/router 482 may implement session-level load balancing among a plurality of data service systems 484. Each data service system 484 may include at least one computation system 488 and may also include one or more storage systems 486. Each computation system 488 may comprise one or more processing units, such as a central processing unit, a graphics processing unit, or any combination thereof. A given data service system 484 may be implemented as a physical system comprising one or more physically distinct systems configured to operate together. Alternatively, a given data service system 484 may be implemented as a virtual system comprising one or more virtual systems executing on an arbitrary physical system. In certain scenarios, the data network 474 may be configured to transmit data between the data center 480 and another data center 481, such as through a network link 476.

In another embodiment, the network service system 400 may include any networked mobile devices configured to implement one or more embodiments of the present invention. For example, in some embodiments, a peer-to-peer network, such as an ad-hoc wireless network, may be established between two different wireless mobile devices. In such embodiments, digital image data may be transmitted between the two wireless mobile devices without having to send the digital image data to a data center 480.

Figure 5A:
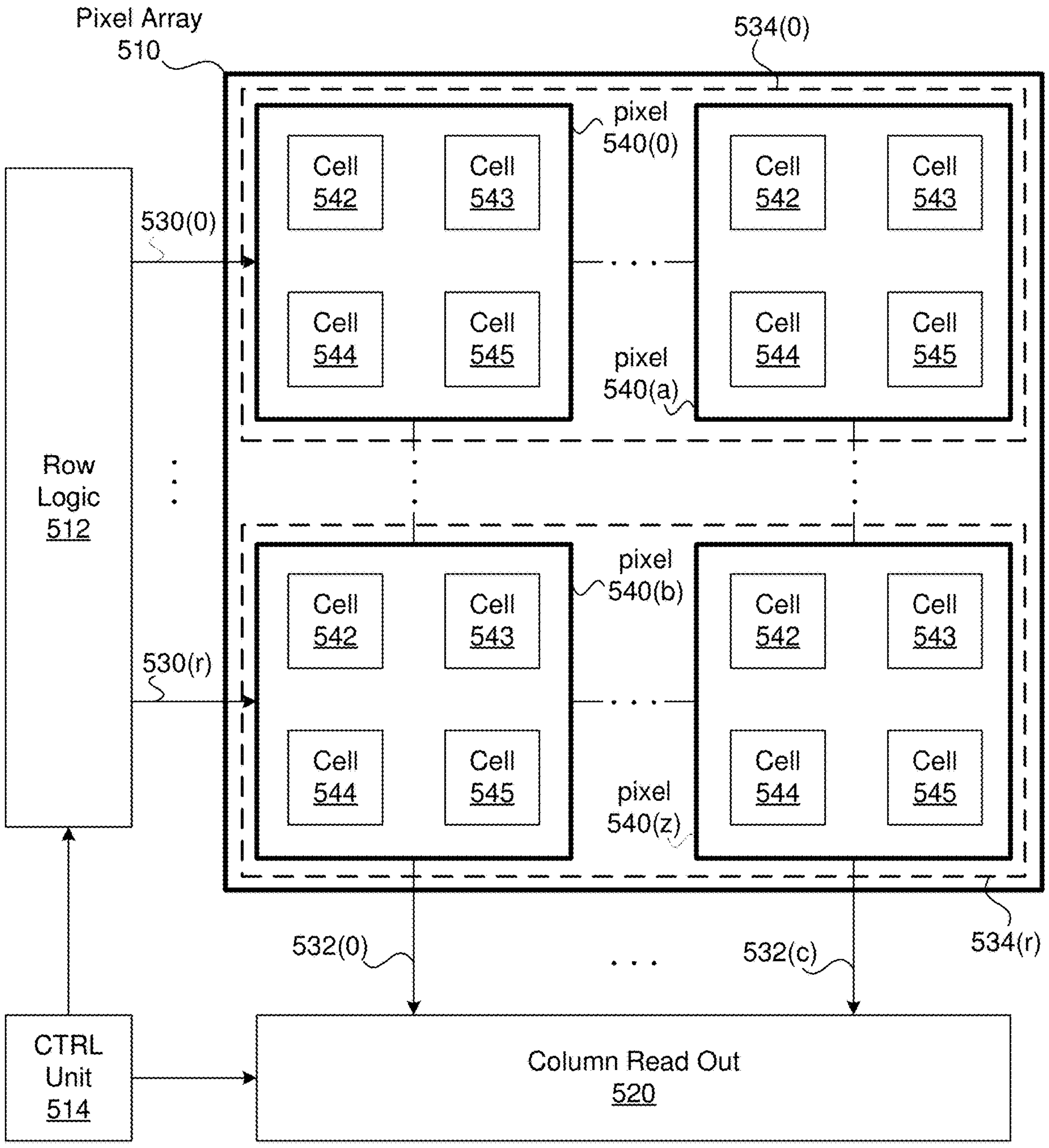
FIG. 5A illustrates a system for capturing optical scene information for conversion to an electronic representation of a photographic scene, in accordance with one embodiment.

FIG. 5A illustrates a system for capturing optical scene information for conversion to an electronic representation of a photographic scene, in accordance with one embodiment. As an option, the system of FIG. 5A may be implemented in the context of the details of any of the Figures. Of course, however, the system of FIG. 5A may be implemented in any desired environment. Further, the aforementioned definitions may equally apply to the description below.

As shown in FIG. 5A, a pixel array 510 is in communication with row logic 512 and a column read out circuit 520. Further, the row logic 512 and the column read out circuit 520 are both in communication with a control unit 514. Still further, the pixel array 510 is shown to include a plurality of pixels 540, where each pixel 540 may include four cells, cells 542-545. In the context of the present description, the pixel array 510 may be included in an image sensor, such as image sensor 132 or image sensor 332 of camera module 330.

As shown, the pixel array 510 includes a 2-dimensional array of the pixels 540. For example, in one embodiment, the pixel array 510 may be built to comprise 4,000 pixels 540 in a first dimension, and 3,000 pixels 540 in a second dimension, for a total of 12,000,000 pixels 540 in the pixel array 510, which may be referred to as a 12 megapixel pixel array. Further, as noted above, each pixel 540 is shown to include four cells 542-545. In one embodiment, cell 542 may be associated with (e.g. selectively sensitive to, etc.) a first color of light, cell 543 may be associated with a second color of light, cell 544 may be associated with a third color of light, and cell 545 may be associated with a fourth color of light. In one embodiment, each of the first color of light, second color of light, third color of light, and fourth color of light are different colors of light, such that each of the cells 542-545 may be associated with different colors of light. In another embodiment, at least two cells of the cells 542-545 may be associated with a same color of light. For example, the cell 543 and the cell 544 may be associated with the same color of light.

Further, each of the cells 542-545 may be capable of storing an analog value. In one embodiment, each of the cells 542-545 may be associated with a capacitor for storing a charge that corresponds to an accumulated exposure during an exposure time. In such an embodiment, asserting a row select signal to circuitry of a given cell may cause the cell to perform a read operation, which may include, without limitation, generating and transmitting a current that is a function of the stored charge of the capacitor associated with the cell. In one embodiment, prior to a readout operation, current received at the capacitor from an associated photodiode may cause the capacitor, which has been previously charged, to discharge at a rate that is proportional to an incident light intensity detected at the photodiode. The remaining charge of the capacitor of the cell may then be read using the row select signal, where the current transmitted from the cell is an analog value that reflects the remaining charge on the capacitor. To this end, an analog value received from a cell during a readout operation may reflect an accumulated intensity of light detected at a photodiode. The charge stored on a given capacitor, as well as any corresponding representations of the charge, such as the transmitted current, may be referred to herein as analog pixel data. Of course, analog pixel data may include a set of spatially discrete intensity samples, each represented by continuous analog values.

Still further, the row logic 512 and the column read out circuit 520 may work in concert under the control of the control unit 514 to read a plurality of cells 542-545 of a plurality of pixels 540. For example, the control unit 514 may cause the row logic 512 to assert a row select signal comprising row control signals 530 associated with a given row of pixels 540 to enable analog pixel data associated with the row of pixels to be read. As shown in FIG. 5A, this may include the row logic 512 asserting one or more row select signals comprising row control signals 530(0) associated with a row 534(0) that includes pixel 540(0) and pixel 540(*a*). In response to the row select signal being asserted, each pixel 540 on row 534(0) transmits at least one analog value based on charges stored within the cells 542-545 of the pixel 540. In certain embodiments, cell 542 and cell 543 are configured to transmit corresponding analog values in response to a first row select signal, while cell 544 and cell 545 are configured to transmit corresponding analog values in response to a second row select signal.

In one embodiment, analog values for a complete row of pixels 540 comprising each row 534(0) through 534(*r*) may be transmitted in sequence to column read out circuit 520 through column signals 532. In one embodiment, analog values for a complete row or pixels or cells within a complete row of pixels may be transmitted simultaneously. For example, in response to row select signals comprising row control signals 530(0) being asserted, the pixel 540(0) may respond by transmitting at least one analog value from the cells 542-545 of the pixel 540(0) to the column read out circuit 520 through one or more signal paths comprising column signals 532(0); and simultaneously, the pixel 540(*a*) will also transmit at least one analog value from the cells 542-545 of the pixel 540(*a*) to the column read out circuit 520 through one or more signal paths comprising column signals 532(*c*). Of course, one or more analog values may be received at the column read out circuit 520 from one or more other pixels 540 concurrently with receiving the at least one analog value from the pixel 540(0) and concurrently with receiving the at least one analog value from the pixel 540(*a*). Together, a set of analog values received from the pixels 540 comprising row 534(0) may be referred to as an analog signal, and this analog signal may be based on an optical image focused on the pixel array 510.

Further, after reading the pixels 540 comprising row 534(0), the row logic 512 may select a second row of pixels 540 to be read. For example, the row logic 512 may assert one or more row select signals comprising row control signals 530(*r*) associated with a row of pixels 540 that includes pixel 540(*b*) and pixel 540(*z*). As a result, the column read out circuit 520 may receive a corresponding set of analog values associated with pixels 540 comprising row 534(*r*).

Figure 6A:
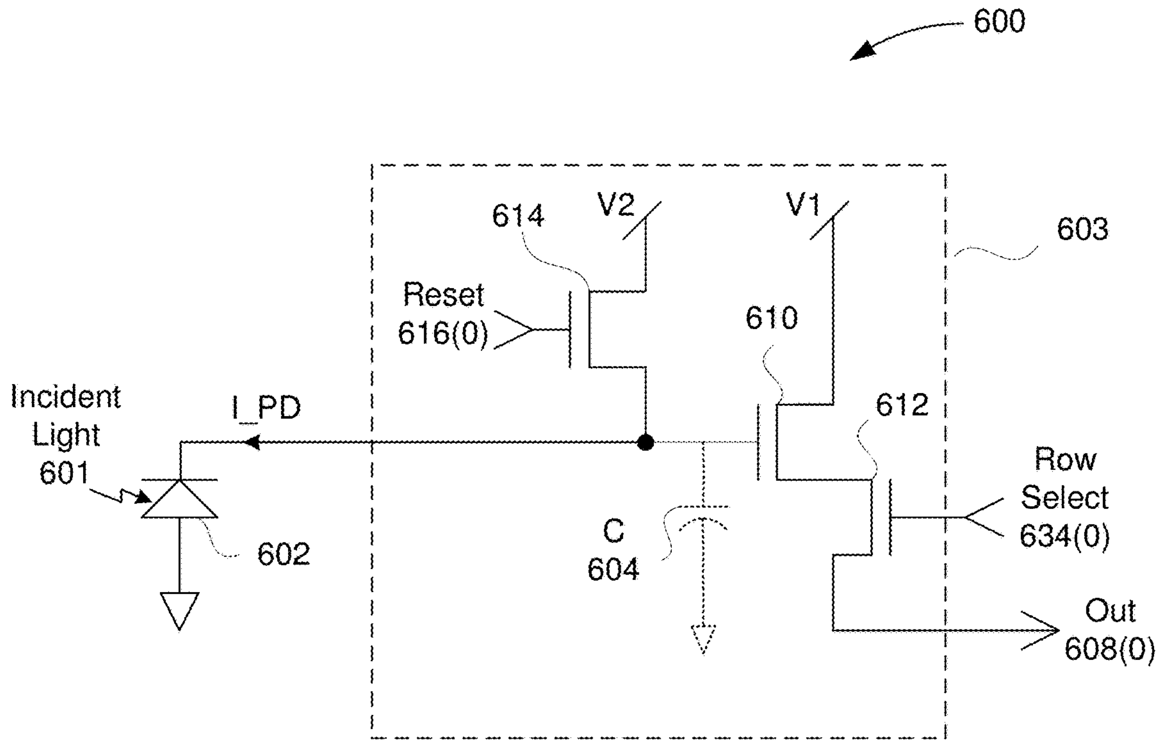
FIG. 6A illustrates a circuit diagram for a photosensitive cell, in accordance with one possible embodiment.
Figure 6B:
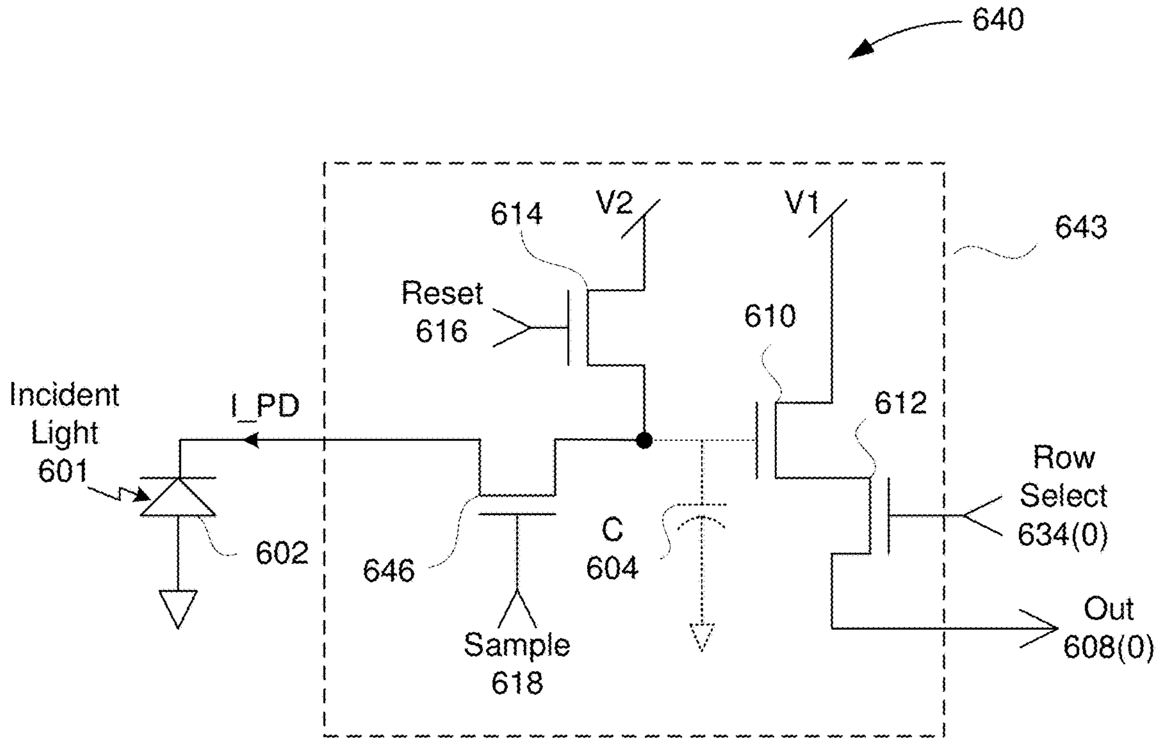
FIG. 6B illustrates a circuit diagram for a photosensitive cell, in accordance with another possible embodiment.
Figure 6C:
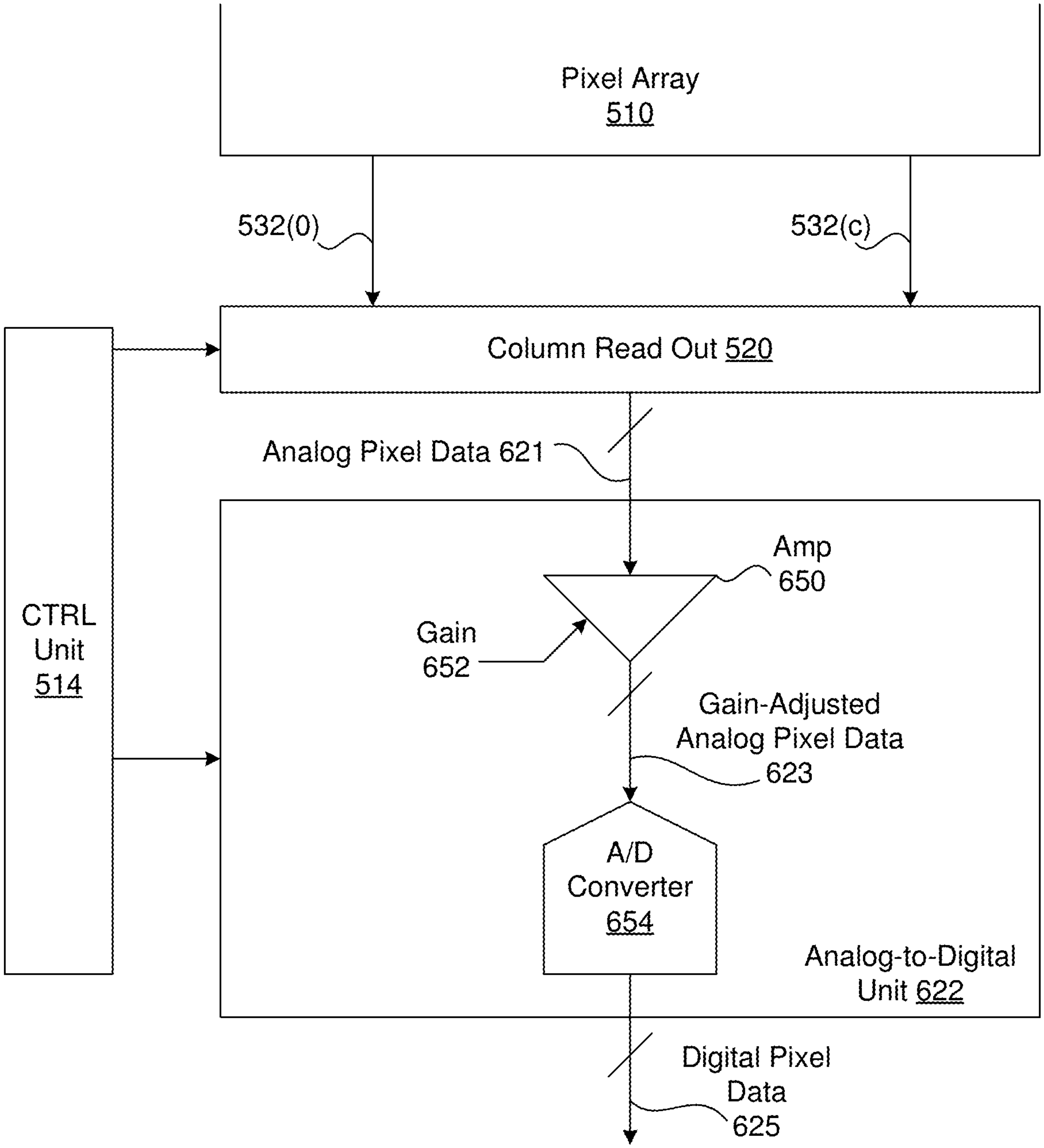
FIG. 6C illustrates a system for converting analog pixel data to digital pixel data, in accordance with an embodiment.

In one embodiment, the column read out circuit 520 may serve as a multiplexer to select and forward one or more received analog values to an analog-to-digital converter circuit, such as analog-to-digital unit 622 of FIG. 6C. The column read out circuit 520 may forward the received analog values in a predefined order or sequence. In one embodiment, row logic 512 asserts one or more row selection signals comprising row control signals 530, causing a corresponding row of pixels to transmit analog values through column signals 532. The column read out circuit 520 receives the analog values and sequentially selects and forwards one or more of the analog values at a time to the analog-to-digital unit 622. Selection of rows by row logic 512 and selection of columns by column read out circuit 620 may be directed by control unit 514. In one embodiment, rows 534 are sequentially selected to be read, starting with row 534(0) and ending with row 534(*r*), and analog values associated with sequential columns are transmitted to the analog-to-digital unit 622. In other embodiments, other selection patterns may be implemented to read analog values stored in pixels 540.

Further, the analog values forwarded by the column read out circuit 520 may comprise analog pixel data, which may later be amplified and then converted to digital pixel data for generating one or more digital images based on an optical image focused on the pixel array 510.

Figure 5B:
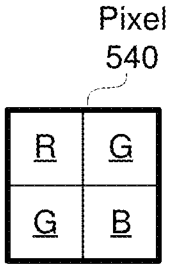
FIGS. 5B-5D illustrate three optional pixel configurations, according to one or more embodiments.
Figure 5C:
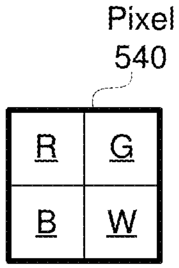
Figure 5D:
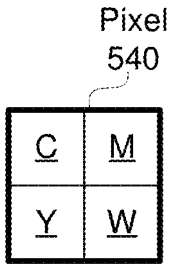

FIGS. 5B-5D illustrate three optional pixel configurations, according to one or more embodiments. As an option, these pixel configurations may be implemented in the context of the details of any of the Figures disclosed herein. Of course, however, these pixel configurations may be implemented in any desired environment. By way of a specific example, any of the pixels 540 of FIGS. 5B-5D may operate as one or more of the pixels 540 of the pixel array 510.

As shown in FIG. 5B, a pixel 540 is illustrated to include a first cell (R) for measuring red light intensity, second and third cells (G) for measuring green light intensity, and a fourth cell (B) for measuring blue light intensity, in accordance with one embodiment. As shown in FIG. 5C, a pixel 540 is illustrated to include a first cell (R) for measuring red light intensity, a second cell (G) for measuring green light intensity, a third cell (B) for measuring blue light intensity, and a fourth cell (W) for measuring white light intensity, in accordance with another embodiment. In one embodiment, chrominance pixel data for a pixel may be sampled by the first, second, and third cells (red, green, and blue), and luminance data for the pixel may be sampled by the fourth cell (white for unfiltered for red, green, or blue). As shown in FIG. 5D, a pixel 540 is illustrated to include a first cell (C) for measuring cyan light intensity, a second cell (M) for measuring magenta light intensity, a third cell (Y) for measuring yellow light intensity, and a fourth cell (W) for measuring white light intensity, in accordance with yet another embodiment.

Of course, while pixels 540 are each shown to include four cells, a pixel 540 may be configured to include fewer or more cells for measuring light intensity. Still further, in another embodiment, while certain of the cells of pixel 540 are shown to be configured to measure a single peak wavelength of light, or white light, the cells of pixel 540 may be configured to measure any wavelength, range of wavelengths of light, or plurality of wavelengths of light.

Figure 5E:
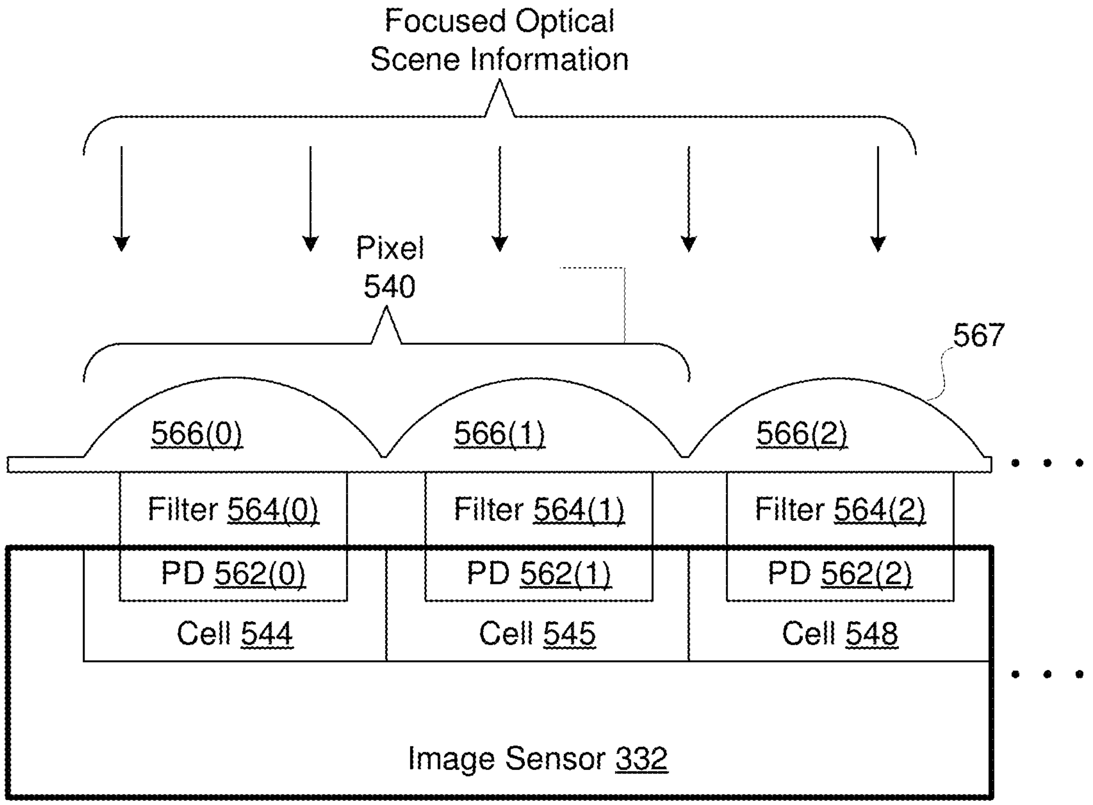
FIG. 5E illustrates a system is shown for capturing optical scene information focused as an optical image on an image sensor, in accordance with one embodiment.

Referring now to FIG. 5E, a system is shown for capturing optical scene information focused as an optical image on an image sensor 332, in accordance with one embodiment. As an option, the system of FIG. 5E may be implemented in the context of the details of any of the Figures. Of course, however, the system of FIG. 5E may be carried out in any desired environment. Further, the aforementioned definitions may equally apply to the description below.

As shown in FIG. 5E, an image sensor 332 is shown to include a first cell 544, a second cell 545, and a third cell 548. Further, each of the cells 544-548 is shown to include a photodiode 562. Still further, upon each of the photodiodes 562 is a corresponding filter 564, and upon each of the filters 564 is a corresponding microlens 566. For example, the cell 544 is shown to include photodiode 562(0), upon which is filter 564(0), and upon which is microlens 566(0). Similarly, the cell 545 is shown to include photodiode 562(1), upon which is filter 564(1), and upon which is microlens 566(1). Still yet, as shown in FIG. 5E, pixel 540 is shown to include each of cells 544 and 545, photodiodes 562(0) and 562(1), filters 564(0) and 564(1), and microlenses 566(0) and 566 (1).

In one embodiment, each of the microlenses 566 may be any lens with a diameter of less than 50 microns. However, in other embodiments each of the microlenses 566 may have a diameter greater than or equal to 50 microns. In one embodiment, each of the microlenses 566 may include a spherical convex surface for focusing and concentrating received light on a supporting substrate beneath the microlens 566. For example, as shown in FIG. 5E, the microlens 566(0) focuses and concentrates received light on the filter 564(0). In one embodiment, a microlens array 567 may include microlenses 566, each corresponding in placement to photodiodes 562 within cells 544 of image sensor 332.

In the context of the present description, the photodiodes 562 may comprise any semiconductor diode that generates a potential difference, or changes its electrical resistance, in response to photon absorption. Accordingly, the photodiodes 562 may be used to detect or measure light intensity. Further, each of the filters 564 may be optical filters for selectively transmitting light of one or more predetermined wavelengths. For example, the filter 564(0) may be configured to selectively transmit substantially only green light received from the corresponding microlens 566(0), and the filter 564(1) may be configured to selectively transmit substantially only blue light received from the microlens 566(1). Together, the filters 564 and microlenses 566 may be operative to focus selected wavelengths of incident light on a plane. In one embodiment, the plane may be a 2-dimensional grid of photodiodes 562 on a surface of the image sensor 332. Further, each photodiode 562 receives one or more predetermined wavelengths of light, depending on its associated filter. In one embodiment, each photodiode 562 receives only one of red, blue, or green wavelengths of filtered light. As shown with respect to FIGS. 5B-5D, it is contemplated that a photodiode may be configured to detect wavelengths of light other than only red, green, or blue. For example, in the context of FIGS. 5C-5D specifically, a photodiode may be configured to detect white, cyan, magenta, yellow, or non-visible light such as infrared or ultraviolet light.

To this end, each coupling of a cell, photodiode, filter, and microlens may be operative to receive light, focus and filter the received light to isolate one or more predetermined wavelengths of light, and then measure, detect, or otherwise quantify an intensity of light received at the one or more predetermined wavelengths. The measured or detected light may then be represented as one or more analog values stored within a cell. For example, in one embodiment, each analog value may be stored within the cell utilizing a capacitor. Further, each analog value stored within a cell may be output from the cell based on a selection signal, such as a row selection signal, which may be received from row logic 512. Further still, each analog value transmitted from a cell may comprise one analog value in a plurality of analog values of an analog signal, where each of the analog values is output by a different cell. Accordingly, the analog signal may comprise a plurality of analog pixel data values from a plurality of cells. In one embodiment, the analog signal may comprise analog pixel data values for an entire image of a photographic scene. In another embodiment, the analog signal may comprise analog pixel data values for a subset of the entire image of the photographic scene. For example, the analog signal may comprise analog pixel data values for a row of pixels of the image of the photographic scene. In the context of FIGS. 5A-5E, the row 534(0) of the pixels 540 of the pixel array 510 may be one such row of pixels of the image of the photographic scene.

FIG. 6A illustrates a circuit diagram for a photosensitive cell 600, in accordance with one possible embodiment. As an option, the cell 600 may be implemented in the context of any of the Figures disclosed herein. Of course, however, the cell 600 may be implemented in any desired environment. Further, the aforementioned definitions may equally apply to the description below.

As shown in FIG. 6A, a photosensitive cell 600 includes a photodiode 602 coupled to an analog sampling circuit 603. The photodiode 602 may be implemented as any of the photodiodes 562 of FIG. 5E. In one embodiment, a unique instance of photosensitive cell 600 may implemented as each of cells 542-545 comprising a pixel 540 within the context of FIGS. 5A-5E. The analog sampling circuit 603 comprises transistors 610, 612, 614, and a capacitor 604. In one embodiment, each of the transistors 610, 612, and 614 may be a field-effect transistor.

The photodiode 602 may be operable to measure or detect incident light 601 of a photographic scene. In one embodiment, the incident light 601 may include ambient light of the photographic scene. In another embodiment, the incident light 601 may include light from a strobe unit utilized to illuminate the photographic scene. In yet another embodiment, the incident light 601 may include ambient light and/or light from a strobe unit, where the composition of the incident light 601 changes as a function of exposure time. For example, the incident light 601 may include ambient light during a first exposure time, and light from a strobe unit during a second exposure time. Of course, the incident light 601 may include any light received at and measured by the photodiode 602. Further still, and as discussed above, the incident light 601 may be concentrated on the photodiode 602 by a microlens, and the photodiode 602 may be one photodiode of a photodiode array that is configured to include a plurality of photodiodes arranged on a two-dimensional plane.

In one embodiment, each capacitor 604 may comprise gate capacitance for a transistor 610 and diffusion capacitance for transistor 614. The capacitor 604 may also include additional circuit elements (not shown) such as, without limitation, a distinct capacitive structure, such as a metal-oxide stack, a poly capacitor, a trench capacitor, or any other technically feasible capacitor structures.

With respect to the analog sampling circuit 603, when reset 616(0) is active (e.g., high), transistor 614 provides a path from voltage source V2 to capacitor 604, causing capacitor 604 to charge to the potential of V2. When reset 616(0) is inactive (e.g., low), the capacitor 604 I allowed to discharge in proportion to a photodiode current (I_PD) generated by the photodiode 602 in response to the incident light 601. In this way, photodiode current I_PD is integrated for an exposure time when the reset 616(0) is inactive, resulting in a corresponding voltage on the capacitor 604. This voltage on the capacitor 604 may also be referred to as an analog sample. In embodiments, where the incident light 601 during the exposure time comprises ambient light, the sample may be referred to as an ambient sample; and where the incident light 601 during the exposure time comprises flash or strobe illumination, the sample may be referred to as a flash sample. When row select 634(0) is active, transistor 612 provides a path for an output current from V1 to output 608(0). The output current is generated by transistor 610 in response to the voltage on the capacitor 604. When the row select 634(0) is active, the output current at the output 608(0) may therefore be proportional to the integrated intensity of the incident light 601 during the exposure time.

The sample may be stored in response to a photodiode current I_PD being generated by the photodiode 602, where the photodiode current I_PD varies as a function of the incident light 601 measured at the photodiode 602. In particular, a greater amount of incident light 601 may be measured by the photodiode 602 during a first exposure time including strobe or flash illumination than during a second exposure time including ambient illumination. Of course, characteristics of the photographic scene, as well as adjustment of various exposure settings, such as exposure time and aperture for example, may result in a greater amount of incident light 601 being measured by the photodiode 602 during the second exposure time including the ambient illumination than during the first exposure time including the strobe or flash illumination.

In one embodiment, the photosensitive cell 600 of FIG. 6A may be implemented in a pixel array associated with a rolling shutter operation. As shown in FIG. 6A, the components of the analog sampling circuit 603 do not include any mechanism for storing the analog sample for a temporary amount of time. Thus, the exposure time for a particular sample measured by the analog sampling circuit 603 may refer to the time between when reset 616(0) is driven inactive and the time when the row select 634(0) is driven active in order to generate the output current at output 608(0).

It will be appreciated that because each column of pixels in the pixel array 510 may share a single column signal 532 transmitted to the column read-out circuitry 520, and that a column signal 532 corresponds to the output 608(0), that analog values from only a single row of pixels may be transmitted to the column read-out circuitry 520 at a time. Consequently, the rolling shutter operation refers to a manner of controlling the plurality of reset signals 616 and row select signals 634 transmitted to each row 534 of pixels 540 in the pixel array 510. For example, a first reset signal 616(0) may be asserted to a first row 534(0) of pixels 540 in the pixel array 510 at a first time, $t_0$. Subsequently, a second reset signal 616(1) may be asserted to a second row 534(1) of pixels 540 in the pixel array 510 at a second time, $t_1$, a third reset signal 616(2) may be asserted to a third row 534(2) of pixels 540 in the pixel array 510 at a third time, $t_2$, and so forth until the last reset signal 616(*z*) is asserted to a last row 534(*z*) of pixels 540 in the pixel array 510 at a last time, $t_z$. Thus, each row 534 of pixels 540 is reset sequentially from a top of the pixel array 510 to the bottom of the pixel array 510. In one embodiment, the length of time between asserting the reset signal 616 at each row may be related to the time required to read-out a row of sample data by the column read-out circuitry 520. In one embodiment, the length of time between asserting the reset signal 616 at each row may be related to the number of rows 534 in the pixel array 510 divided by an exposure time between frames of image data.

In order to sample all of the pixels 540 in the pixel array 510 with a consistent exposure time, each of the corresponding row select signals 634 are asserted a delay time after the corresponding reset signal 616 is reset for that row 534 of pixels 540, the delay time equal to the exposure time. The operation of sampling each row in succession, thereby capturing optical scene information for each row of pixels during different exposure time periods, may be referred to herein as a rolling shutter operation. While the circuitry included in an image sensor to perform a rolling shutter operation is simpler than other circuitry designed to perform a global shutter operation, discussed in more detail below, the rolling shutter operation can cause image artifacts to appear due to the motion of objects in the scene or motion of the camera. Objects may appear skewed in the image because the bottom of the object may have moved relative to the edge of a frame more than the top of the object when the analog signals for the respective rows 534 of pixels 540 were sampled.

FIG. 6B illustrates a circuit diagram for a photosensitive cell 640, in accordance with another possible embodiment. As an option, the cell 640 may be implemented in the context of any of the Figures disclosed herein. Of course, however, the cell 640 may be implemented in any desired environment. Further, the aforementioned definitions may equally apply to the description below.

As shown in FIG. 6B, a photosensitive cell 640 includes a photodiode 602 coupled to an analog sampling circuit 643. The photodiode 602 may be implemented as any of the photodiodes 562 of FIG. 5E. In one embodiment, a unique instance of photosensitive cell 640 may implemented as each of cells 542-545 comprising a pixel 540 within the context of FIGS. 5A-5E. The analog sampling circuit 643 comprises transistors 646, 610, 612, 614, and a capacitor 604. In one embodiment, each of the transistors 646, 610, 612, and 614 may be a field-effect transistor.

The transistors 610, 612, and 614 are similar in type and operation to the transistors 610, 612, and 614 of FIG. 6A. The transistor 646 may be similar in type to the transistors 610, 612, and 614, but the transistor 646 has the effect of turning capacitor 604 into an in-pixel-memory of an analog voltage value. In other words, the capacitor 604 is allowed to discharge in proportion to the photodiode currect (I_PD) when the transistor 646 is active, and the capacitor 604 is prevented from discharging when the transistor 646 is inactive. The capacitor 604 may comprise gate capacitance for a transistor 610 and diffusion capacitance for transistors 614 and 646. The capacitor 604 may also include additional circuit elements (not shown) such as, without limitation, a distinct capacitive structure, such as a metal-oxide stack, a poly capacitor, a trench capacitor, or any other technically feasible capacitor structures. Unlike analog sampling circuit 603, analog sampling circuit 643 may be used to implement a global shutter operation where all pixels 540 in the pixel array are configured to generate a sample at the same time.

With respect to the analog sampling circuit 643, when reset 616 is active (e.g., high), transistor 614 provides a path from voltage source V2 to capacitor 604, causing capacitor 604 to charge to the potential of V2. When reset 616 is inactive (e.g., low), the capacitor 604 is allowed to discharge in proportion to a photodiode current (I_PD) generated by the photodiode 602 in response to the incident light 601 as long as the transistor 646 is active. Transistor 646 may be activated by asserting the sample signal 618, which is utilized to control the exposure time of each of the pixels 540. In this way, photodiode current I_PD is integrated for an exposure time when the reset 616 is inactive and the sample 618 is active, resulting in a corresponding voltage on the capacitor 604. After the exposure time is complete, the sample signal 618 may be reset to deactivate transistor 646 and stop the capacitor from discharging. When row select 634(0) is active, transistor 612 provides a path for an output current from V1 to output 608(0). The output current is generated by transistor 610 in response to the voltage on the capacitor 604. When the row select 634(0) is active, the output current at the output 608(0) may therefore be proportional to the integrated intensity of the incident light 601 during the exposure time.

In a global shutter operation, all pixels 540 of the pixel array 510 may share a global reset signal 616 and a global sample signal 618, which control charging of the capacitors 604 and discharging of the capacitors 604 through the photodiode current I_PD. This effectively measures the amount of incident light hitting each photodiode 602 substantially simultaneously for each pixel 540 in the pixel array 510. However, the external read-out circuitry for converting the analog values to digital values for each pixel may still require each row 534 of pixels 540 to be read out sequentially. Thus, after the global sample signal 618 is reset each corresponding row select signal 634 may be asserted and reset in order to read-out the analog values for each of the pixels. This is similar to the operation of the row select signal 634 in the rolling shutter operation except that the transistor 646 is inactive during this time such that any further accumulation of the charge in capacitor 604 is halted while all of the values are read.

It will be appreciated that other circuits for analog sampling circuits 603 and 643 may be implemented in lieu of the circuits set forth in FIGS. 6A and 6B, and that such circuits may be utilized to implement a rolling shutter operation or a global shutter operation, respectively. For example, the analog sampling circuits 603, 643 may include per cell amplifiers (e.g., op-amps) that provide a gain for the voltage stored in capacitor 604 when the read-out is performed. In other embodiments, an analog sampling circuit 643 may include other types of analog memory implementations decoupled from capacitor 604 such that the voltage of capacitor 604 is stored in the analog memory when the sample signal 618 is reset and capacitor 604 is allowed to continue to discharge through the photodiode 602. In yet another embodiment, each output 608 associated with a column of pixels may be coupled to a dedicated analog-to-digital converter (ADC) that enables the voltage at capacitor 604 to be sampled and converted substantially simultaneously for all pixels 540 in a row or portion of a row comprising the pixel array 510. In certain embodiments, odd rows and even rows may be similarly coupled to dedicated ADC circuits to provide simultaneous conversion of all color information for a given pixel. In one embodiment, a white color cell comprising a pixel is coupled to an ADC circuit configured to provide a higher dynamic range (e.g., 12 bits or 14 bits) than a dynamic range for ADC circuits coupled to a cell having color (e.g., red, green, blue) filters (e.g., 8 bits or 10 bits).

FIG. 6C illustrates a system for converting analog pixel data to digital pixel data, in accordance with an embodiment. As an option, the system of FIG. 6C may be implemented in the context of the details of any of the Figures disclosed herein. Of course, however, the system of FIG. 6C may be implemented in any desired environment. Further, the aforementioned definitions may equally apply to the description below.

As shown in FIG. 6C, analog pixel data 621 is received from column read out circuit 520 at analog-to-digital unit 622 under the control of control unit 514. The analog pixel data 621 may be received within an analog signal, as noted hereinabove. Further, the analog-to-digital unit 622 generates digital pixel data 625 based on the received analog pixel data 621. In one embodiment, a unique instance of analog pixel data 621 may include, as an ordered set of individual analog values, all analog values output from all corresponding analog sampling circuits or sample storage nodes. For example, in the context of the foregoing figures, each cell of cells 542-545 of a plurality of pixels 540 of a pixel array 510 may include an analog sampling circuit 603 or analog sampling circuit 643.

With continuing reference to FIG. 6C, the analog-to-digital unit 622 includes an amplifier 650 and an analog-to-digital converter 654. In one embodiment, the amplifier 650 receives an instance of analog pixel data 621 and a gain 652, and applies the gain 652 to the analog pixel data 621 to generate gain-adjusted analog pixel data 623. The gain-adjusted analog pixel data 623 is transmitted from the amplifier 650 to the analog-to-digital converter 654. The analog-to-digital converter 654 receives the gain-adjusted analog pixel data 623, and converts the gain-adjusted analog pixel data 623 to the digital pixel data 625, which is then transmitted from the analog-to-digital converter 654. In other embodiments, the amplifier 650 may be implemented within the column read out circuit 520 or in each individual cell instead of within the analog-to-digital unit 622. The analog-to-digital converter 654 may convert the gain-adjusted analog pixel data 623 to the digital pixel data 625 using any technically feasible analog-to-digital conversion technique.

In an embodiment, the gain-adjusted analog pixel data 623 results from the application of the gain 652 to the analog pixel data 621. In one embodiment, the gain 652 may be selected by the analog-to-digital unit 622. In another embodiment, the gain 652 may be selected by the control unit 514, and then supplied from the control unit 514 to the analog-to-digital unit 622 for application to the analog pixel data 621.

It should be noted, in one embodiment, that a consequence of applying the gain 652 to the analog pixel data 621 is that analog noise may appear in the gain-adjusted analog pixel data 623. If the amplifier 650 imparts a significantly large gain to the analog pixel data 621 in order to obtain highly sensitive data from the pixel array 510, then a significant amount of noise may be expected within the gain-adjusted analog pixel data 623. In one embodiment, the detrimental effects of such noise may be reduced by capturing the optical scene information at a reduced overall exposure. In such an embodiment, the application of the gain 652 to the analog pixel data 621 may result in gain-adjusted analog pixel data with proper exposure and reduced noise.

In one embodiment, the amplifier 650 may be a transimpedance amplifier (TIA). Furthermore, the gain 652 may be specified by a digital value. In one embodiment, the digital value specifying the gain 652 may be set by a user of a digital photographic device, such as by operating the digital photographic device in a "manual" mode. Still yet, the digital value may be set by hardware or software of a digital photographic device. As an option, the digital value may be set by the user working in concert with the software of the digital photographic device.

In one embodiment, a digital value used to specify the gain 652 may be associated with an ISO. In the field of photography, the ISO system is a well-established standard for specifying light sensitivity. In one embodiment, the amplifier 650 receives a digital value specifying the gain 652 to be applied to the analog pixel data 621. In another embodiment, there may be a mapping from conventional ISO values to digital gain values that may be provided as the gain 652 to the amplifier 650. For example, each of ISO 100, ISO 200, ISO 400, ISO 800, ISO 1600, etc. may be uniquely mapped to a different digital gain value, and a selection of a particular ISO results in the mapped digital gain value being provided to the amplifier 650 for application as the gain 652. In one embodiment, one or more ISO values may be mapped to a gain of 1. Of course, in other embodiments, one or more ISO values may be mapped to any other gain value.

Accordingly, in one embodiment, each analog pixel value may be adjusted in brightness given a particular ISO value. Thus, in such an embodiment, the gain-adjusted analog pixel data 623 may include brightness corrected pixel data, where the brightness is corrected based on a specified ISO. In another embodiment, the gain-adjusted analog pixel data 623 for an image may include pixels having a brightness in the image as if the image had been sampled at a certain ISO.

Figure 7A:
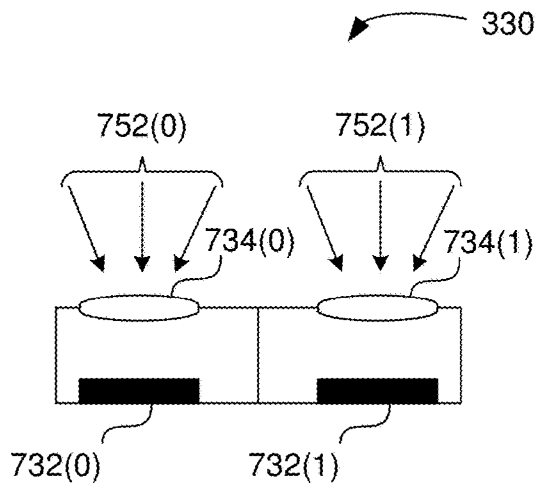
FIG. 7A illustrates a configuration of the camera module, in accordance with one embodiment.

FIG. 7A illustrates a configuration of the camera module 330, in accordance with one embodiment. As shown in FIG. 7A, the camera module 330 may include two lenses 734 positioned above two image sensors 732. A first lens 734(0) is associated with a first image sensor 732(0) and focuses optical scene information 752(0) from a first viewpoint onto the first image sensor 732(0). A second lens 734(1) is associated with a second image sensor 732(1) and focuses optical scene information 752(1) from a second viewpoint onto the second image sensor 732(1).

In one embodiment, the first image sensor 732(0) may be configured to capture chrominance information associated with the scene and the second image sensor 732(1) may be configured to capture luminance information associated with the scene. The first image sensor 732(0) may be the same or different than the second image sensor 732(1). For example, the first image sensor 732(0) may be an 8 megapixel CMOS image sensor 732(0) having a Bayer color filter array (CFA), as shown in the arrangement of pixel 540 of FIG. 5B, that is configured to capture red, green, and blue color information; and the second image sensor 732(1) may be a 12 megapixel CMOS image sensor 732(1) having no color filter array (or a color filter array in which every cell is a white color filter) that is configured to capture intensity information (over substantially all wavelengths of the visible spectrum).

In operation, the camera module 330 may receive a shutter release command from the camera interface 386. The camera module 330 may reset both the first image sensor 732(0) and the second image sensor 732(1). One or both of the first image sensor 732(0) and the second image sensor 732(1) may then be sampled under ambient light conditions (i.e., the strobe unit 336 is disabled). In one embodiment, both the first image sensor 732(0) and the second image sensor 732(1) are sampled substantially simultaneously to generate a chrominance image and a luminance image under ambient illumination. Once the pair of images (chrominance image and luminance image) has been captured, one or more additional pairs of images may be captured under ambient illumination (e.g., using different exposure parameters for each pair of images) or under strobe illumination. The additional pairs of images may be captured in quick succession (e.g., less than 200 milliseconds between sampling each simultaneously captured pair) such that relative motion between the objects in the scene and the camera, or relative motion between two distinct objects in the scene, is minimized.

In the camera module 330, it may be advantageous to position the first lens 734(0) and first image sensor 732(0) proximate to the second lens 734(1) and the second image sensor 732(0) in order to capture the images of the scene from substantially the same viewpoint. Furthermore, direction of the field of view for both the first image sensor 732(0) and the second image sensor 732(1) should be approximately parallel. Unlike stereoscopic cameras configured to capture two images using parallax to represent depth of objects within the scene, the pair of images captured by the first image sensor 732(0) and the second image sensor

732(1) is not meant to capture displacement information for a given object from two disparate viewpoints.

One aspect of the invention is to generate a new digital image by combining the chrominance image with the luminance image to generate a more detailed image of a scene than could be captured with a single image sensor. In other words, the purpose of having two image sensors in the same camera module 330 is to capture different aspects of the same scene to create a blended image. Thus, care should be taken to minimize any differences between the images captured by the two image sensors. For example, positioning the first image sensor 732(0) and the second image sensor 732(1) close together may minimize image artifacts resulting from parallax of nearby objects. This may be the opposite approach taken for cameras designed to capture stereoscopic image data using two image sensors in which the distance between the two image sensors may be selected to mimic an intra-ocular distance of the human eyes.

In one embodiment, the images generated by the first image sensor 732(0) and the second image sensor 732(1) are close enough that blending the two images will not results in any image artifacts. In another embodiment, one of the images may be warped to match the other image to correct for the disparate viewpoints. There are many techniques available to warp one image to match another and any technically feasible technique may be employed to match the two images. For example, homography matrices may be calculated that describe the transformation from a portion (i.e., a plurality of pixels) of one image to a portion of another image. A homography matrix may describe a plurality of affine transformations (e.g., translation, rotation, scaling, etc.) that, when applied to a portion of an image, transform the portion of the image into another portion of a second image. By applying the homography matrices to various portions of the first image, the first image may be warped to match the second image. In this manner, any image artifacts resulting from blending the first image with the second image may be reduced.

In one embodiment, each of the image sensors 732 may be configured to capture an image using either a rolling shutter operation or a global shutter operation. The image sensors 732 may be configured to use the same type of shutter operation or different shutter operations. For example, the first image sensor 732(0) configured to capture chrominance information may be a cheaper image sensor that only includes analog sampling circuitry capable of implementing in a rolling shutter operation. In contrast, the second image sensor 732(1) configured to capture luminance information may be a more expensive image sensor that includes more advanced analog sampling circuitry capable of implementing a global shutter operation. Thus, the first image may be captured according to a rolling shutter operation while the second image may be captured according to a global shutter operation. Of course, both image sensors 732 may be configured to use the same shutter operation, either a rolling shutter operation or a global shutter operation. The type of shutter operation implemented by the image sensor 732 may be controlled by a control unit, such as control unit 514, included in the image sensor 732 and may be triggered by a single shutter release command.

Figure 7B:
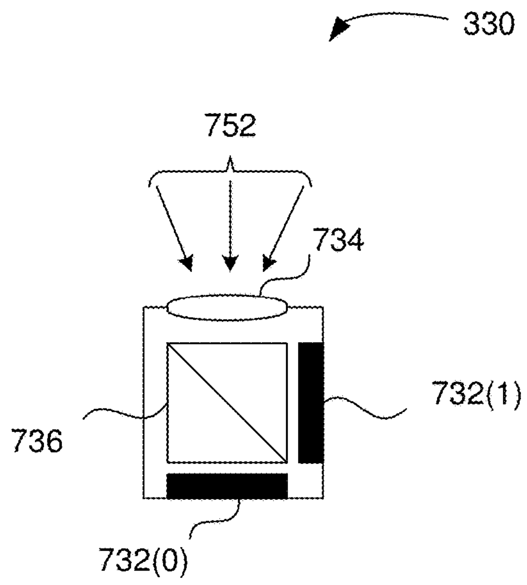
FIG. 7B illustrates a configuration of the camera module, in accordance with another embodiment.

FIG. 7B illustrates a configuration of the camera module 330, in accordance with another embodiment. As shown in FIG. 7B, the camera module 330 may include a lens 734 positioned above a beam splitter 736. The beam splitter 736 may act to split the optical information 752 received through the lens 734 into two separate transmission paths. The beam splitter 736 may be a cube made from two triangular glass prisms, a pellicle mirror like those typically utilized in single-lens reflex (SLR) cameras, or any other type of device capable of splitting a beam of light into two different directions. A first beam of light is directed onto the first image sensor 732(0) and a second beam of light is directed onto the second image sensor 732(1). In one embodiment, the first beam of light and the second beam of light include approximately the same optical information for the scene.

The two transmission paths focus the optical information 752 from the same viewpoint onto both the first image sensor 732(0) and the second image sensor 732(1). Because the same beam of light is split into two paths, it will be appreciated that intensity of light reaching each of the image sensors 732 is decreased. In order to compensate for the decrease in light reaching the image sensors, the exposure parameters can be adjusted (e.g., increasing the time between resetting the image sensor and sampling the image sensor to allow more light to activate the charge of each of the pixel sites). Alternatively, a gain applied to the analog signals may be increased, but this may also increase the noise in the analog signals as well.

Figure 7C:
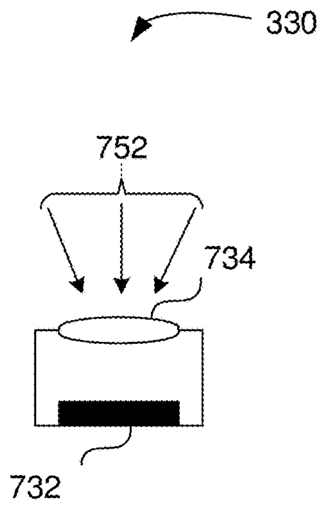
FIG. 7C illustrates a configuration of the camera module, in accordance with yet another embodiment.

FIG. 7C illustrates a configuration of the camera module 330, in accordance with yet another embodiment. As shown in FIG. 7C, the camera module 330 may include a lens 734 positioned above a single image sensor 732. The optical information 752 is focused onto the image sensor 732 by the lens 734. In such embodiments, both the chrominance information and the luminance information may be captured by the same image sensor. A color filter array (CFA) may include a plurality of different color filters, each color filter positioned over a particular photodiode of the image sensor 732 to filter the wavelengths of light that are measured by that particular photodiode. Some color filters may be associated with photodiodes configured to measure chrominance information, such as red color filters, blue color filters, green color filters, cyan color filters, magenta color filters, or yellow color filters. Other color filters may be associated with photodiodes configured to measure luminance information, such as white color filters. As used herein, white color filters are filters that allow a substantially uniform amount of light across the visible spectrum to pass through the color filter. The color filters in the CFA may be arranged such that a first portion of the photodiodes included in the image sensor 732 capture samples for a chrominance image from the optical information 752 and a second portion of the photodiodes included in the image sensor 732 capture samples for a luminance image from the optical information 752.

In one embodiment, the each pixel in the image sensor 732 may be configured with a plurality of filters as shown in FIG. 5C. The photodiodes associated with the red, green, and blue color filters may capture samples included in the chrominance image as an RGB tuple. The photodiodes associated with the white color filter may capture samples included in the luminance image. It will be appreciated that each pixel 540 in the pixel array 510 of the image sensor 732 will produce one color in an RGB format stored in the chrominance image as well as an intensity value stored in a corresponding luminance image. In other words, the chrominance image and the luminance image will have the same resolution with one value per pixel.

In another embodiment, the each pixel in the image sensor 732 may be configured with a plurality of filters as shown in FIG. 5D. The photodiodes associated with the cyan, magenta, and yellow color filters may capture samples included in the chrominance image as a CMY tuple. The photodiodes associated with the white color filter may capture samples included in the luminance image. It will be appreciated that each pixel 540 in the pixel array 510 of the image sensor 732 will produce one color in a CMY format stored in the chrominance image as well as an intensity value stored in a corresponding luminance image.

In yet another embodiment, the CFA 460 may contain a majority of color filters for producing luminance information and a minority of color filters for producing chrominance information (e.g., 60% white, 10% red, 20% green, and 10% blue, etc.). Having a majority of the color filters being related to collecting luminance information will produce a higher resolution luminance image compared to the chrominance image. In one embodiment, the chrominance image has a lower resolution than the luminance image, due to the fewer number of photodiodes associated with the filters of the various colors. Furthermore, various techniques may be utilized to interpolate or "fill-in" values of either the chrominance image or the luminance image to fill in values associated with photodiodes that captured samples for the luminance image or chrominance image, respectively. For example, an interpolation of two or more values in the chrominance image or the luminance image may be performed to generate virtual samples in the chrominance image or the luminance image. It will be appreciated that a number of techniques for converting the raw digital pixel data associated with the individual photodiodes into a chrominance image and/or a luminance image may be implemented and is within the scope of the present invention.

Figure 8:
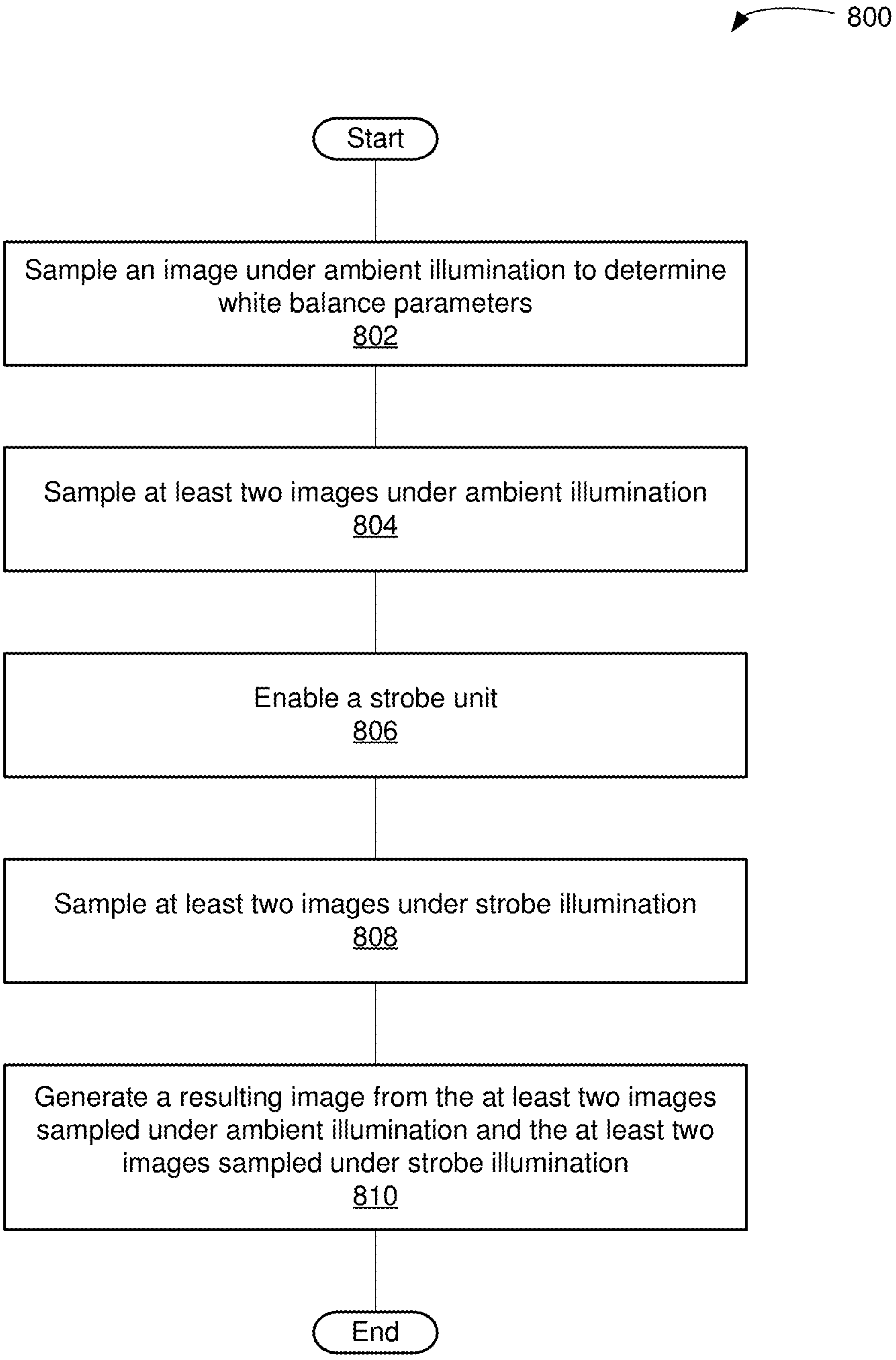
FIG. 8 illustrates a flow chart of a method for generating a digital image, in accordance with one embodiment.

FIG. 8 illustrates a flow chart of a method 800 for generating a digital image, in accordance with one embodiment. Although method 800 is described in conjunction with the systems of FIGS. 2-7C, persons of ordinary skill in the art will understand that any system that performs method 800 is within the scope and spirit of embodiments of the present invention. In one embodiment, a digital photographic system, such as digital photographic system 300 of FIG. 3A, is configured to perform method 800. The digital photographic system 300 may be implemented within a digital camera, such as digital camera 302 of FIG. 3C, or a mobile device, such as mobile device 376 of FIG. 3D.

The method 800 begins at step 802, where the digital photographic system 300 samples an image under ambient illumination to determine white balance parameters for the scene. For example, the white balance parameters may include separate linear scale factors for red, green, and blue for a gray world model of white balance. The white balance parameters may include quadratic parameters for a quadratic model of white balance, and so forth. In one embodiment, the digital photographic system 300 causes the camera module 330 to capture an image with one or more image sensors 332. The digital photographic system 300 may then analyze the captured image to determine appropriate white balance parameters. In one embodiment, the white balance parameters indicate a color shift to apply to all pixels in images captured with ambient illumination. In such an embodiment, the white balance parameters may be used to adjust images captured under ambient illumination. A strobe unit 336 may produce a strobe illumination of a pre-set color that is sufficient to reduce the color shift caused by ambient illumination. In another embodiment, the white balance parameters may identify a color for the strobe unit 336 to generate in order to substantially match the color of ambient light during strobe illumination. In such an embodiment, the strobe unit 336 may include red, green, and blue LEDs, or, separately, a set of discrete LED illuminators having different phosphor mixes that each produce different, corresponding chromatic peaks, to create color-controlled strobe illumination. The color-controlled strobe illumination may be used to match scene illumination for images captured under only ambient illumination and images captured under both ambient illumination and color-controlled strobe illumination.

At step 804, the digital photographic system 300 captures (i.e., samples) two or more images under ambient illumination. In one embodiment, the two or more images include a chrominance image 202 from a first image sensor 332(0) and a luminance image 204 from a second image sensor 332(1) that form an ambient image pair. The ambient image pair may be captured using a first set of exposure parameters.

In one embodiment, the two or more images may also include additional ambient image pairs captured successively using different exposure parameters. For example, a first image pair may be captured using a short exposure time that may produce an underexposed image. Additional image pairs may capture images with increasing exposure times, and a last image pair may be captured using a long exposure time that may produce an overexposed image. These images may form an image set captured under ambient illumination. Furthermore, these images may be combined in any technically feasible HDR blending or combining technique to generate an HDR image, including an HDR image rendered into a lower dynamic range for display. Additionally, these images may be captured using a successive capture rolling shutter technique, whereby complete images are captured at successively higher exposures by an image sensor before the image sensor is reset in preparation for capturing a new set of images.

At step 806, the digital photographic system 300 may enable a strobe unit 336. The strobe unit 336 may be enabled at a specific time prior to or concurrent with the capture of an image under strobe illumination. Enabling the strobe unit 336 should cause the strobe unit 336 to discharge or otherwise generate strobe illumination. In one embodiment, enabling the strobe unit 336 includes setting a color for the strobe illumination. The color may be set by specifying an intensity level of each of a red, green, and blue LED to be discharged substantially simultaneously; for example the color may be set in accordance with the white balance parameters.

At step 808, the digital photographic system 300 captures (i.e., samples) two or more images under strobe illumination. In one embodiment, the two or more images include a chrominance image 202 from a first image sensor 332(0) and a luminance image 204 from a second image sensor 332(1) that form a strobe image pair. The strobe image pair may be captured using a first set of exposure parameters.

In one embodiment, the two or more images may also include additional pairs of chrominance and luminance images captured successively using different exposure parameters. For example, a first image pair may be captured using a short exposure time that may produce an underexposed image. Additional image pairs may capture images with increasing exposure times, and a last image pair may be captured using a long exposure time that may produce an overexposed image. The changing exposure parameters may also include changes to the configuration of the strobe illumination unit 336, such as an intensity of the discharge or a color of the discharge. These images may form an image set captured under strobe illumination. Furthermore, these images may be combined in any technically feasible HDR blending or combining technique to generate an HDR image, including an HDR image rendered into a lower dynamic range for display. Additionally, these images may be captured using a successive capture rolling shutter technique, whereby complete images are captured at successively higher exposures by an image sensor before the image sensor is reset in preparation for capturing a new set of images.

At step 810, the digital photographic system 300 generates a resulting image from the at least two images sampled under ambient illumination and the at least two images sampled under strobe illumination. In one embodiment, the digital photographic system 300 blends the chrominance image sampled under ambient illumination with the chrominance image sampled under strobe illumination. In another embodiment, the digital photographic system 300 blends the luminance image sampled under ambient illumination with the luminance image sampled under strobe illumination. In yet another embodiment, the digital photographic system 300 may blend a chrominance image sampled under ambient illumination with a chrominance image sampled under strobe illumination to generate a consensus chrominance image, such as through averaging, or weighted averaging. The consensus chrominance image may then be blended with a selected luminance image, the selected luminance image being sampled under ambient illumination or strobe illumination, or a combination of both luminance images.

In one embodiment, blending two images may include performing an alpha blend between corresponding pixel values in the two images. In such an embodiment, the alpha blend weight may be determined by one or more pixel attributes (e.g., intensity) of a pixel being blended, and may be further determined by pixel attributes of surrounding pixels. In another embodiment, blending the two images may include, for each pixel in the resulting image, determining whether a corresponding pixel in a first image captured under ambient illumination is underexposed. If the pixel is underexposed, then the pixel in the resulting image is selected from the second image captured under strobe illumination. Blending the two images may also include, for each pixel in the resulting image, determining whether a corresponding pixel in a second image captured under strobe illumination is overexposed. If the pixel is overexposed, then the pixel in the resulting image is selected from the first image captured under ambient illumination. If pixel in the first image is not underexposed and the pixel in the second image is not overexposed, then the pixel in the resulting image is generated based on an alpha blend between corresponding pixel values in the two images. Furthermore, any other blending technique or techniques may be implemented in this context without departing the scope and spirit of embodiments of the present invention.

In one embodiment, the at least two images sampled under ambient illumination may include two or more pairs of images sampled under ambient illumination utilizing different exposure parameters. Similarly, the at least two images sampled under strobe illumination may include two or more pairs of images sampled under strobe illumination utilizing different exposure parameters. In such an embodiment, blending the two images may include selecting two pairs of images captured under ambient illumination and selecting two pairs of images captured under strobe illumination. The two pairs of images sampled under ambient illumination may be blended using any technically feasible method to generate a blended pair of images sampled under ambient illumination. Similarly, the two pairs of images sampled under strobe illumination may be blended using any technically feasible method to generate a blended pair of images sampled under strobe illumination. Then, the blended pair of images sampled under ambient illumination may be blended with the blended pair of images sampled under strobe illumination.

Figure 9A:
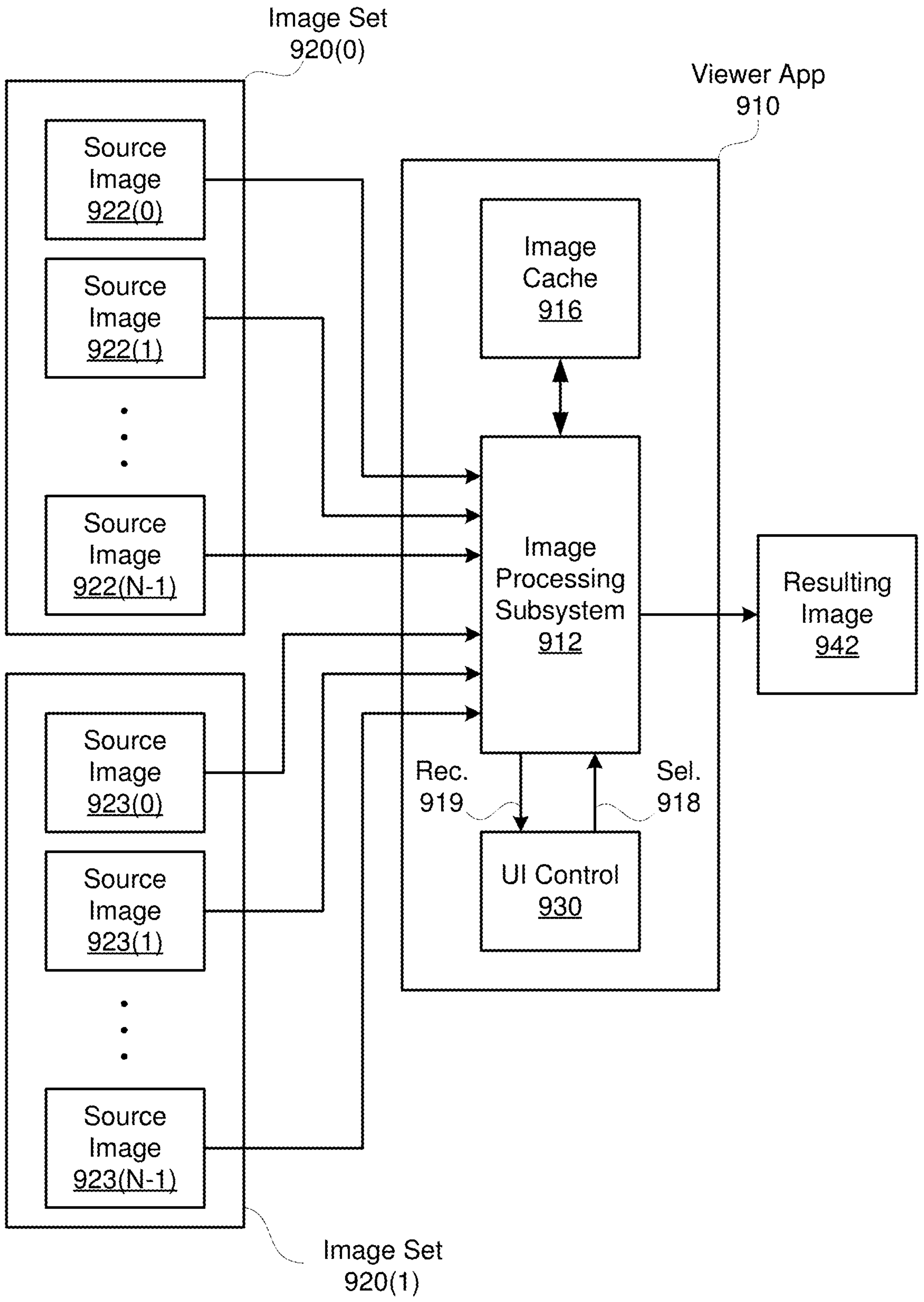
FIG. 9A illustrates a viewer application configured to generate a resulting image based two image sets, in accordance with one embodiment.

FIG. 9A illustrates a viewer application 910 configured to generate a resulting image 942 based two image sets 920, in accordance with one embodiment. A first image set 920(0) includes two or more source images 922, which may be generated by sampling a first image sensor 732(0) of the camera module 330. The source images 922 may correspond to chrominance images. A second image set 920(1) includes two or more source images 923, which may be generated by sampling a second image sensor 732(1) of the camera module 330. The source images 923 may correspond to luminance images. Each source image 922 in the first image set 920(0) has a corresponding source image 923 in the second image set 920(1). In another embodiment, the source images 922 may be generated by sampling a first portion of photodiodes in an image sensor 732 and the source images 923 may be generated by sampling a second portion of photodiodes in the image sensor 732.

In one embodiment, the resulting image 942 represents a pair of corresponding source images 922(*i*), 923(*i*) that are selected from the image set 920(0) and 920(1), respectively, and blended using a color space blend technique, such as the HSV technique described above in conjunction with FIGS. 1 & 2. The pair of corresponding source images may be selected according to any technically feasible technique. For example, a given source image 922 from the first image set 920(0) may be selected automatically based on exposure quality. Then, a corresponding source image 923 from the second image set 920(1) may be selected based on the source image 922 selected in the first image set 920(0).

Alternatively, a pair of corresponding source images may be selected manually through a UI control 930, discussed in greater detail below in FIG. 9B. The UI control 930 generates a selection parameter 918 that indicates the manual selection. An image processing subsystem 912 is configured to generate the resulting image 942 by blending the selected source image 922 with the corresponding source image 923. In certain embodiments, the image processing subsystem 912 automatically selects a pair of corresponding source images and transmits a corresponding recommendation 919 to the UI control 930. The recommendation 919 indicates, through the UI control 930, which pair of corresponding source images was automatically selected. A user may keep the recommendation or select a different pair of corresponding source images using the UI control 930.

In an alternative embodiment, viewer application 910 is configured to combine two or more pairs of corresponding source images to generate a resulting image 942. The two or more pairs of corresponding source images may be mutually aligned by the image processing subsystem 912 prior to being combined. Selection parameter 918 may include a weight assigned to each of two or more pairs of corresponding source images. The weight may be used to perform a transparency/opacity blend (known as an alpha blend) between two or more pairs of corresponding source images.

In certain embodiments, source images 922(0) and 923(0) are sampled under exclusively ambient illumination, with the strobe unit off. Source image 922(0) is generated to be white-balanced, according to any technically feasible white balancing technique. Source images 922(1) through 922(N−1) as well as corresponding source images 923(1) though 923(N−1) are sampled under strobe illumination, which may be of a color that is discordant with respect to ambient illumination. Source images 922(1) through 922(N−1) may be white-balanced according to the strobe illumination color.

Discordance in strobe illumination color may cause certain regions to appear incorrectly colored with respect to other regions in common photographic settings. For example, in a photographic scene with foreground subjects predominantly illuminated by white strobe illumination and white-balanced accordingly, background subjects that are predominantly illuminated by incandescent lights may appear excessively orange or even red.

In one embodiment, spatial color correction is implemented within image processing subsystem 912 to match the color of regions within a selected source image 922 to that of source image 922(0). Spatial color correction implements regional color-matching to ambient-illuminated source image 922(0). The regions may range in overall scene coverage from individual pixels, to blocks of pixels, to whole frames. In one embodiment, each pixel in a color-corrected image includes a weighted color correction contribution from at least a corresponding pixel and an associated block of pixels.

In certain implementations, viewer application 910 includes an image cache 916, configured to include a set of cached images corresponding to the source images 922, but rendered to a lower resolution than source images 922. The image cache 916 provides images that may be used to readily and efficiently generate or display resulting image 942 in response to real-time changes to selection parameter 918. In one embodiment, the cached images are rendered to a screen resolution of display unit 312. When a user manipulates the UI control 930 to select a pair of corresponding source images, a corresponding cached image may be displayed on the display unit 312. The cached images may represent a down-sampled version of a resulting image 942 generated based on the selected pair of corresponding source images. Caching images may advantageously reduce power consumption associated with rendering a given corresponding pair of source images for display. Caching images may also improve performance by eliminating a rendering process needed to resize a given corresponding pair of source images for display each time UI control 530 detects that a user has selected a different corresponding pair of source images.

Figure 9B:
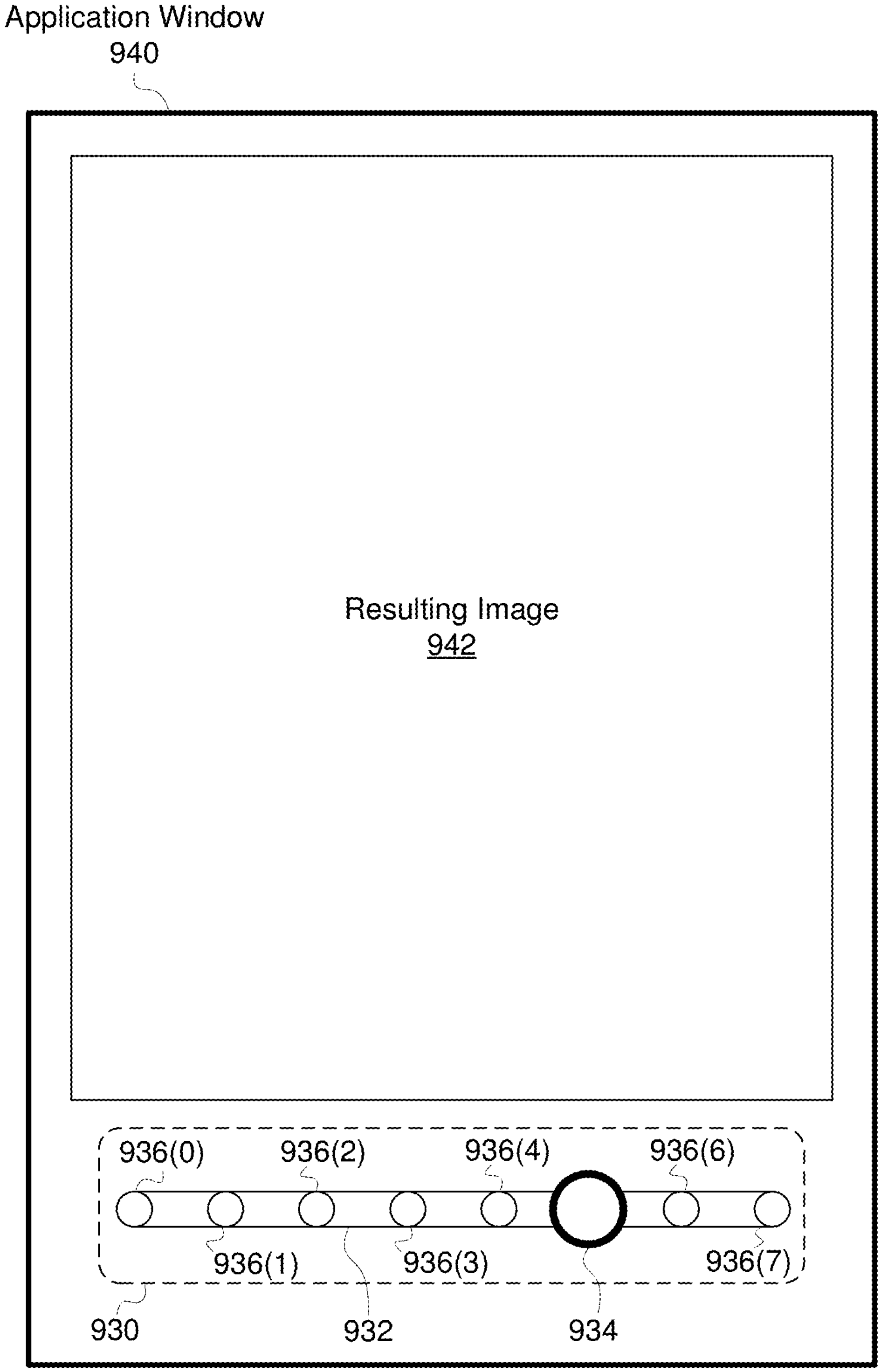
FIG. 9B illustrates an exemplary user interface associated with the viewer application 910 of FIG. 9A, in accordance with one embodiment.

FIG. 9B illustrates an exemplary user interface associated with the viewer application 910 of FIG. 9A, in accordance with one embodiment. The user interface comprises an application window 940 configured to display the resulting image 942 based on a position of the UI control 930. The viewer application 910 may invoke the UI control 930, configured to generate the selection parameter 918 based on a position of a control knob 934. The recommendation 919 may determine an initial position of the control knob 934, corresponding to a recommended corresponding pair of source images. In one embodiment, the UI control 930 comprises a linear slider control with a control knob 934 configured to slide along a slide path 932. A user may position the control knob 934 by performing a slide gesture. For example, the slide gesture may include touching the control knob 934 in a current position, and sliding the control knob 934 to a new position. Alternatively, the user may touch along the slide path 932 to move the control knob 934 to a new position defined by a location of the touch.

In one embodiment, positioning the control knob 934 into a discrete position 936 along the slide path 932 causes the selection parameter 918 to indicate selection of a source image 922(*i*) in the first image set 920(0) and a corresponding source image 923 in the second image set 920(1). For example, a user may move control knob 934 into discrete position 936(3), to indicate that source image 922(3) and corresponding source image 923(3) are selected. The UI control 930 then generates selection parameter 918 to indicate that source image 922(3) and corresponding source image 923(3) are selected. The image processing subsystem 912 responds to the selection parameter 918 by generating the resulting image 942 based on source image 922(3) and corresponding source image 923(3). The control knob 934 may be configured to snap to a closest discrete position 936 when released by a user withdrawing their finger.

In an alternative embodiment, the control knob 934 may be positioned between two discrete positions 936 to indicate that resulting image 942 should be generated based on two corresponding pairs of source images. For example, if the control knob 934 is positioned between discrete position 936(3) and discrete position 936(4), then the image processing subsystem 912 generates resulting image 942 from source images 922(3) and 922(4) as well as source images 923(3) and 923(4). In one embodiment, the image processing subsystem 912 generates resulting image 942 by aligning source images 922(3) and 922(4) as well as source images 923(3) and 923(4), and performing an alpha-blend between the aligned images according to the position of the control knob 934. For example, if the control knob 934 is positioned to be one quarter of the distance from discrete position 936(3) to discrete position 936(4) along slide path 932, then an aligned image corresponding to source image 922(4) may be blended with twenty-five percent opacity (seventy-five percent transparency) over a fully opaque aligned image corresponding to source image 922(3).

In one embodiment, UI control 930 is configured to include a discrete position 936 for each source image 922 within the first image set 920(0). Each image set 920 stored within the digital photographic system 300 of FIG. 3A may include a different number of source images 922, and UI control 930 may be configured to establish discrete positions 936 to correspond to the source images 922 for a given image set 920.

Figure 9C:
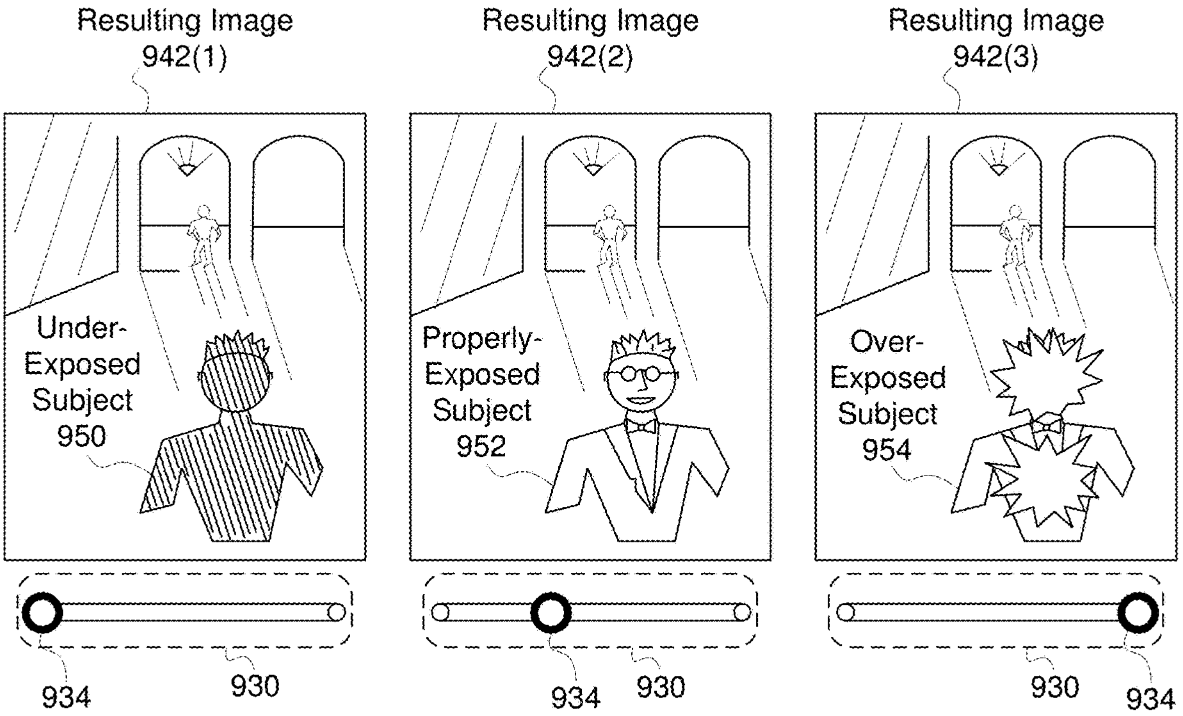
FIG. 9C illustrates a resulting image with differing levels of strobe exposure, in accordance with one embodiment.

FIG. 9C illustrates a resulting image 942 with differing levels of strobe exposure, in accordance with one embodiment. In this example, control knob 934 is configured to select source images 922 of FIG. 9A sampled under increasing strobe intensity from left to right. When the control knob 934 is in the left-most position, the selected source image may correspond to source image 922(0) captured under ambient illumination. When the control knob 934 is in the right-most position, the selected source image may correspond to source image 922(N−1) captured with strobe illumination. When the control knob 934 is in an intermediate position, the selected source image may correspond to one of the other source images 922(1)-922(N−2).

In one embodiment, the source images 922 may include more than one source image captured under ambient illumination. Source images 922 may include P images captured under ambient illumination using different exposure parameters. For example, source images 922 may include four images captured under ambient illumination with increasing exposure times. Similarly, the source images 922 may include more than one source image captured under strobe illumination.

As shown, resulting image 942(1) includes an under-exposed subject 950 sampled under insufficient strobe intensity, resulting image 942(2) includes a properly-exposed subject 952 sampled under appropriate strobe intensity, and resulting image 942(3) includes an over-exposed subject 954 sampled under excessive strobe intensity. A determination of appropriate strobe intensity is sometimes subjective, and embodiments of the present invention advantageously enable a user to subjectively select an image having a desirable or appropriate strobe intensity after a picture has been taken, and without loss of image quality or dynamic range. In practice, a user is able to take what is apparently one photograph by asserting a single shutter-release. The single shutter-release causes the digital photographic system 300 of FIG. 3A to sample multiple images in rapid succession, where each of the multiple images is sampled under varying strobe intensity. In one embodiment, time intervals of less than two-hundred milliseconds are defined herein to establish rapid succession. Again, the multiple images may include both chrominance images and corresponding luminance images. A resulting image set 920 enables the user to advantageously select a resulting image 942 later, such as after a particular photographic scene of interest is no longer available. This is in contrast to prior art solutions that conventionally force a user to manually take different photographs and manually adjust strobe intensity over the different photographs. This manual prior art process typically introduces substantial inter-image delay, resulting in a loss of content consistency among sampled images.

Figure 9D:
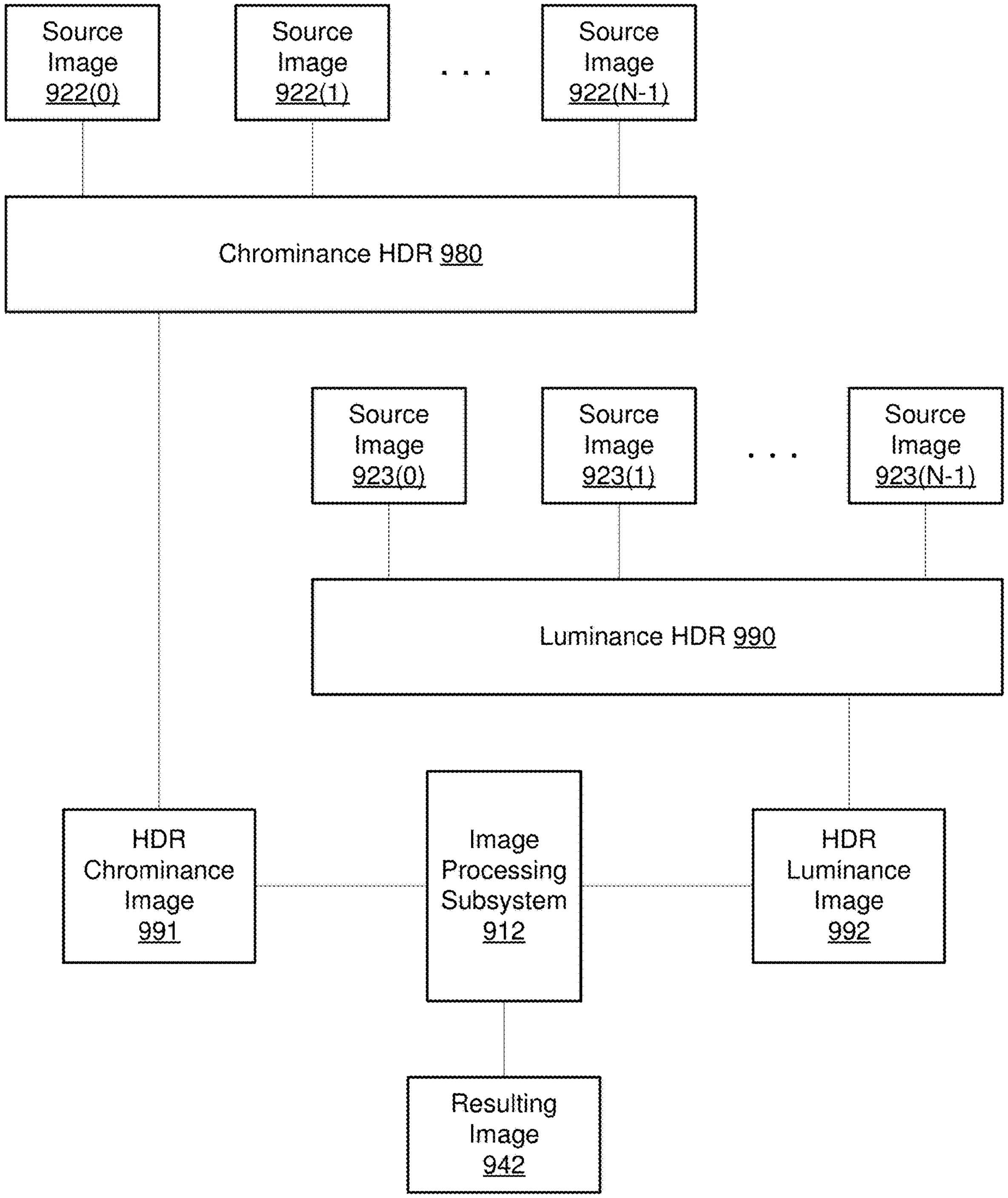
FIG. 9D illustrates a system for generating a resulting image from a high dynamic range chrominance image and a high dynamic range luminance image, in accordance with one embodiment.

FIG. 9D illustrates a system for generating a resulting image from a high dynamic range chrominance image and a high dynamic range luminance image, in accordance with one embodiment. The image sets 920 enable a user to generate a high dynamic range (HDR) image. For example, the sensitivity of an image sensor is limited. While some portions of the scene are bright, other portions may be dim. If the brightly lit portions of the scene are captured within the dynamic range of the image sensor, then the dimly lit portions of the scene may not be captured with sufficient detail (i.e., the signal to noise ratio at low analog values may not allow for sufficient details to be seen). In such cases, the image sets may be utilized to create HDR versions of both the chrominance image and the luminance image. In certain embodiments, luminance images may be sampled at an inherently higher analog dynamic range, and in one embodiment, one luminance image provides an HDR image for luminance.

A chrominance HDR module 980 may access two or more of the source images 922 to create an HDR chrominance image 991 with a high dynamic range. Similarly a luminance HDR module 990 may access two or more of the source images 923 to create an HDR luminance image 992 with a high dynamic range. The chrominance HDR module 980 and the luminance HDR module 990 may generate HDR images under any feasible technique, including techniques well-known in the art. The image processing subsystem 912 may then combine the HDR chrominance image 991 with the HDR luminance image 992 to generate the resulting image 942 as described above with respect to a single source image 922 and a single corresponding source image 923.

One advantage of the present invention is that a user may photograph a scene using a single shutter release command, and subsequently select an image sampled according to a strobe intensity that best satisfies user aesthetic requirements for the photographic scene. The one shutter release command causes a digital photographic system to rapidly sample a sequence of images with a range of strobe intensity and/or color. For example, twenty or more full-resolution images may be sampled within one second, allowing a user to capture a potentially fleeting photographic moment with the advantage of strobe illumination. Furthermore, the captured images may be captured using one or more image sensors for capturing separate chrominance and luminance information. The chrominance and luminance information may then be blended to produce the resulting images.

While various embodiments have been described above with respect to a digital camera 302 and a mobile device 376, any device configured to perform at least one aspect described herein is within the scope and spirit of the present invention. In certain embodiments, two or more digital photographic systems implemented in respective devices are configured to sample corresponding image sets in mutual time synchronization. A single shutter release command may trigger the two or more digital photographic systems.

Figures 1A, 10:
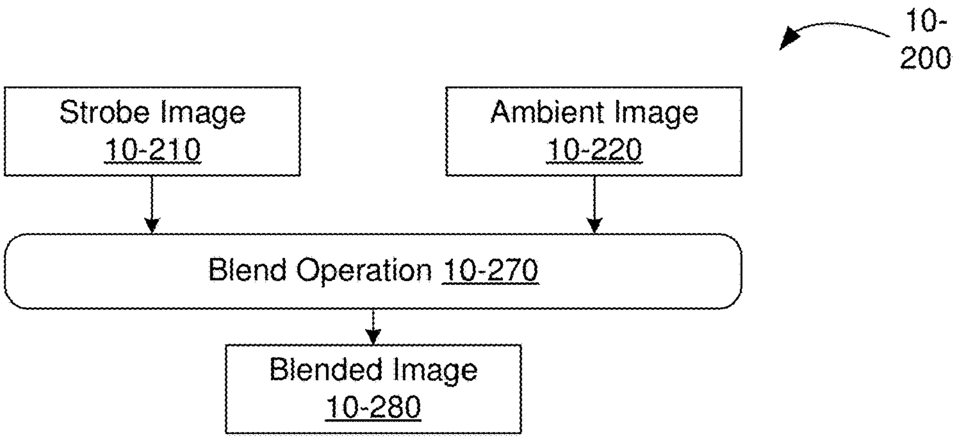
FIG. 10-1A illustrates a first data flow process for generating a blended image based on at least an ambient image and a strobe image, according to one embodiment of the present invention.

FIG. 10-1A illustrates a first data flow process 10-200 for generating a blended image 10-280 based on at least an ambient image 10-220 and a strobe image 10-210, according to one embodiment of the present invention. A strobe image 10-210 comprises a digital photograph sampled by camera unit 10-130 while strobe unit 10-136 is actively emitting strobe illumination 10-150. Ambient image 10-220 comprises a digital photograph sampled by camera unit 10-130 while strobe unit 10-136 is inactive and substantially not emitting strobe illumination 10-150.

In one embodiment, ambient image 10-220 is generated according to a prevailing ambient white balance for a scene being photographed. The prevailing ambient white balance may be computed using the well-known gray world model, an illuminator matching model, or any other technically feasible technique. Strobe image 10-210 should be generated according to an expected white balance for strobe illumination 10-150, emitted by strobe unit 10-136. Blend operation 10-270, discussed in greater detail below, blends strobe image 10-210 and ambient image 10-220 to generate a blended image 10-280 via preferential selection of image data from strobe image 10-210 in regions of greater intensity compared to corresponding regions of ambient image 10-220.

In one embodiment, data flow process 10-200 is performed by processor complex 10-110 within digital photographic system 10-100, and blend operation 10-270 is performed by at least one GPU core 10-172, one CPU core 10-170, or any combination thereof.

Figures 1B, 10:
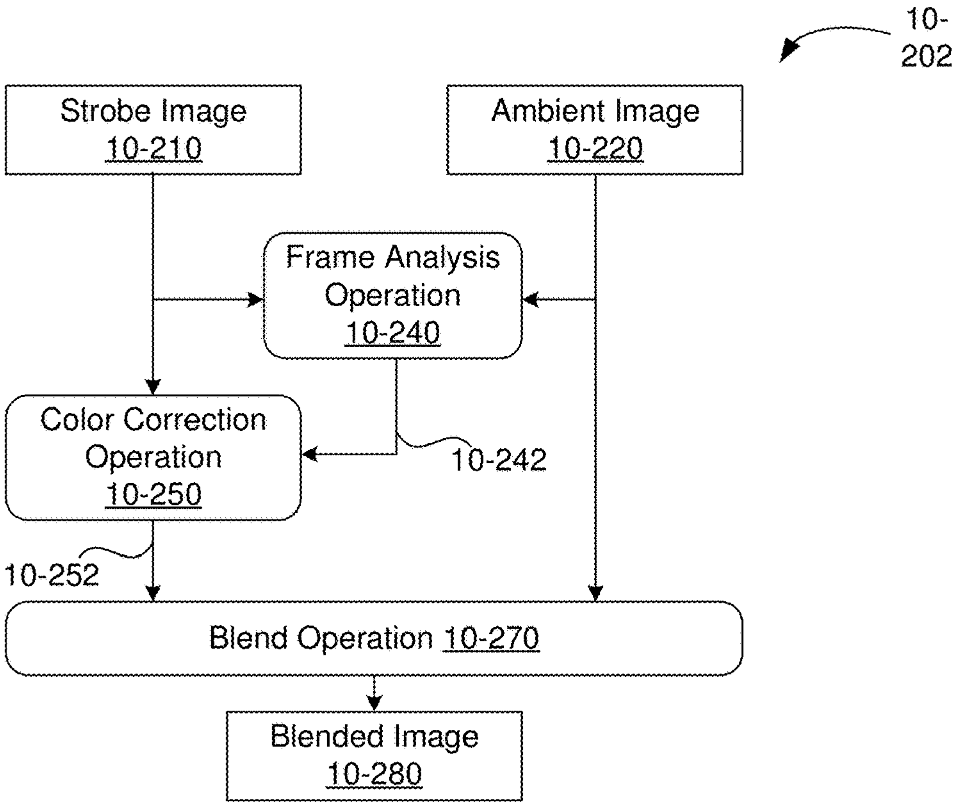

FIG. 10-1B illustrates a second data flow process 10-202 for generating a blended image 10-280 based on at least an ambient image 10-220 and a strobe image 10-210, according to one embodiment of the present invention. Strobe image 10-210 comprises a digital photograph sampled by camera unit 10-130 while strobe unit 10-136 is actively emitting strobe illumination 10-150. Ambient image 10-220 comprises a digital photograph sampled by camera unit 10-130 while strobe unit 10-136 is inactive and substantially not emitting strobe illumination 10-150.

In one embodiment, ambient image 10-220 is generated according to a prevailing ambient white balance for a scene being photographed. The prevailing ambient white balance may be computed using the well-known gray world model, an illuminator matching model, or any other technically feasible technique. In certain embodiments, strobe image 10-210 is generated according to the prevailing ambient white balance. In an alternative embodiment ambient image 10-220 is generated according to a prevailing ambient white balance, and strobe image 10-210 is generated according to an expected white balance for strobe illumination 10-150, emitted by strobe unit 10-136. In other embodiments, ambient image 10-220 and strobe image 10-210 comprise raw image data, having no white balance operation applied to either. Blended image 10-280 may be subjected to arbitrary white balance operations, as is common practice with raw image data, while advantageously retaining color consistency between regions dominated by ambient illumination and regions dominated by strobe illumination.

As a consequence of color balance differences between ambient illumination, which may dominate certain portions of strobe image 10-210 and strobe illumination 10-150, which may dominate other portions of strobe image 10-210, strobe image 10-210 may include color information in certain regions that is discordant with color information for the same regions in ambient image 10-220. Frame analysis operation 10-240 and color correction operation 10-250 together serve to reconcile discordant color information within strobe image 10-210. Frame analysis operation 10-240 generates color correction data 10-242, described in greater detail below, for adjusting color within strobe image 10-210 to converge spatial color characteristics of strobe image 10-210 to corresponding spatial color characteristics of ambient image 10-220. Color correction operation 10-250 receives color correction data 10-242 and performs spatial color adjustments to generate corrected strobe image data 10-252 from strobe image 10-210. Blend operation 10-270, discussed in greater detail below, blends corrected strobe image data 10-252 with ambient image 10-220 to generate blended image 10-280. Color correction data 10-242 may be generated to completion prior to color correction operation 10-250 being performed. Alternatively, certain portions of color correction data 10-242, such as spatial correction factors, may be generated as needed.

In one embodiment, data flow process 10-202 is performed by processor complex 10-110 within digital photographic system 10-100. In certain implementations, blend operation 10-270 and color correction operation 10-250 are performed by at least one GPU core 10-172, at least one CPU core 10-170, or a combination thereof. Portions of frame analysis operation 10-240 may be performed by at least one GPU core 10-172, one CPU core 10-170, or any combination thereof. Frame analysis operation 10-240 and color correction operation 10-250 are discussed in greater detail below.

Figures 1C, 10:
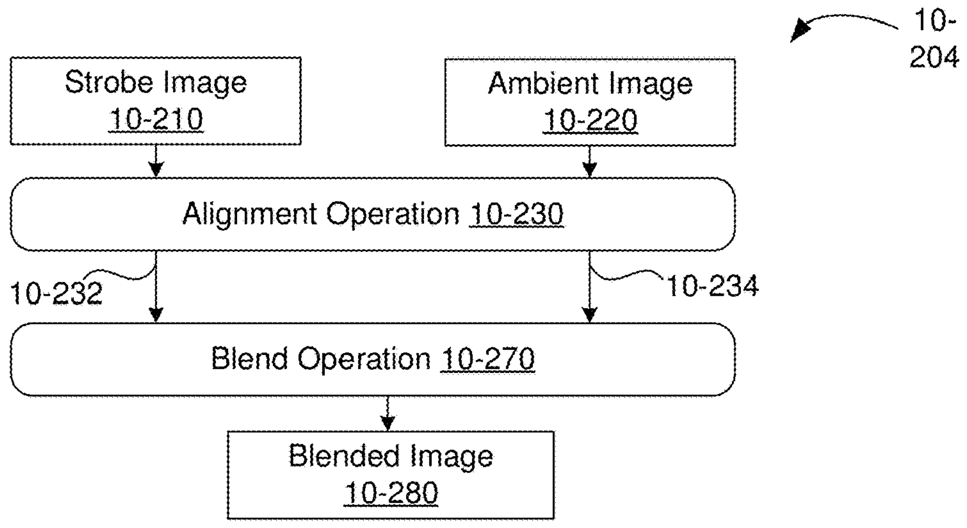

FIG. 10-1C illustrates a third data flow process 10-204 for generating a blended image 10-280 based on at least an ambient image 10-220 and a strobe image 10-210, according to one embodiment of the present invention. Strobe image 10-210 comprises a digital photograph sampled by camera unit 10-130 while strobe unit 10-136 is actively emitting strobe illumination 10-150. Ambient image 10-220 comprises a digital photograph sampled by camera unit 10-130 while strobe unit 10-136 is inactive and substantially not emitting strobe illumination 10-150.

In one embodiment, ambient image 10-220 is generated according to a prevailing ambient white balance for a scene being photographed. The prevailing ambient white balance may be computed using the well-known gray world model, an illuminator matching model, or any other technically feasible technique. Strobe image 10-210 should be generated according to an expected white balance for strobe illumination 10-150, emitted by strobe unit 10-136.

In certain common settings, camera unit 10-130 is packed into a hand-held device, which may be subject to a degree of involuntary random movement or "shake" while being held in a user's hand. In these settings, when the hand-held device sequentially samples two images, such as strobe image 10-210 and ambient image 10-220, the effect of shake may cause misalignment between the two images. The two images should be aligned prior to blend operation 10-270, discussed in greater detail below. Alignment operation 10-230 generates an aligned strobe image 10-232 from strobe image 10-210 and an aligned ambient image 10-234 from ambient image 10-220. Alignment operation 10-230 may implement any technically feasible technique for aligning images or sub-regions.

In one embodiment, alignment operation 10-230 comprises an operation to detect point pairs between strobe image 10-210 and ambient image 10-220, an operation to estimate an affine or related transform needed to substantially align the point pairs. Alignment may then be achieved by executing an operation to resample strobe image 10-210 according to the affine transform thereby aligning strobe image 10-210 to ambient image 10-220, or by executing an operation to resample ambient image 10-220 according to the affine transform thereby aligning ambient image 10-220 to strobe image 10-210. Aligned images typically overlap substantially with each other, but may also have non-overlapping regions. Image information may be discarded from non-overlapping regions during an alignment operation. Such discarded image information should be limited to relatively narrow boundary regions. In certain embodiments, resampled images are normalized to their original size via a scaling operation performed by one or more GPU cores 10-172.

In one embodiment, the point pairs are detected using a technique known in the art as a Harris affine detector. The operation to estimate an affine transform may compute a substantially optimal affine transform between the detected point pairs, comprising pairs of reference points and offset points. In one implementation, estimating the affine transform comprises computing a transform solution that minimizes a sum of distances between each reference point and each offset point subjected to the transform. Persons skilled in the art will recognize that these and other techniques may be implemented for performing the alignment operation 10-230 without departing the scope and spirit of the present invention.

In one embodiment, data flow process 10-204 is performed by processor complex 10-110 within digital photographic system 10-100. In certain implementations, blend operation 10-270 and resampling operations are performed by at least one GPU core.

Figures 1D, 10:
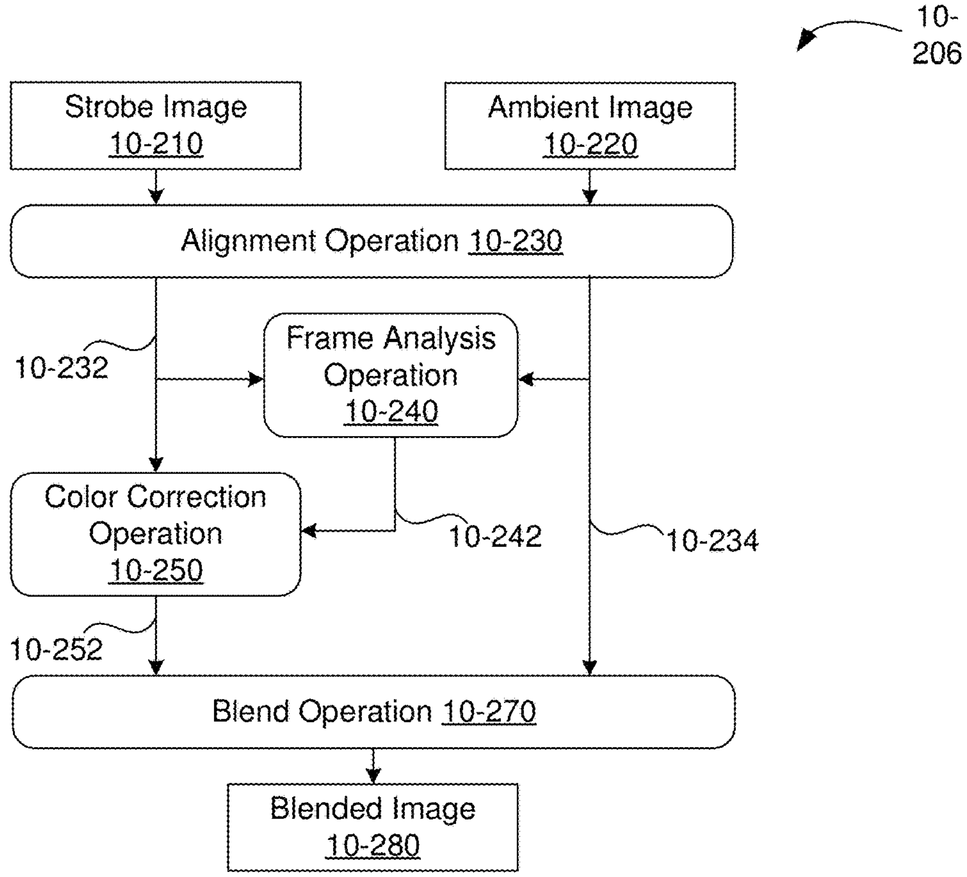

FIG. 10-1D illustrates a fourth data flow process 10-206 for generating a blended image 10-280 based on at least an ambient image 10-220 and a strobe image 10-210, according to one embodiment of the present invention. Strobe image 10-210 comprises a digital photograph sampled by camera unit 10-130 while strobe unit 10-136 is actively emitting strobe illumination 10-150. Ambient image 10-220 comprises a digital photograph sampled by camera unit 10-130 while strobe unit 10-136 is inactive and substantially not emitting strobe illumination 10-150.

In one embodiment, ambient image 10-220 is generated according to a prevailing ambient white balance for a scene being photographed. The prevailing ambient white balance may be computed using the well-known gray world model, an illuminator matching model, or any other technically feasible technique. In certain embodiments, strobe image 10-210 is generated according to the prevailing ambient white balance. In an alternative embodiment ambient image 10-220 is generated according to a prevailing ambient white balance, and strobe image 10-210 is generated according to an expected white balance for strobe illumination 10-150, emitted by strobe unit 10-136. In other embodiments, ambient image 10-220 and strobe image 10-210 comprise raw image data, having no white balance operation applied to either. Blended image 10-280 may be subjected to arbitrary white balance operations, as is common practice with raw image data, while advantageously retaining color consistency between regions dominated by ambient illumination and regions dominated by strobe illumination.

Alignment operation 10-230, discussed previously in FIG. 10-1C, generates an aligned strobe image 10-232 from strobe image 10-210 and an aligned ambient image 10-234 from ambient image 10-220. Alignment operation 10-230 may implement any technically feasible technique for aligning images.

Frame analysis operation 10-240 and color correction operation 10-250, both discussed previously in FIG. 10-1B, operate together to generate corrected strobe image data 10-252 from aligned strobe image 10-232. Blend operation 10-270, discussed in greater detail below, blends corrected strobe image data 10-252 with ambient image 10-220 to generate blended image 10-280.

Color correction data 10-242 may be generated to completion prior to color correction operation 10-250 being performed. Alternatively, certain portions of color correction data 10-242, such as spatial correction factors, may be generated as needed. In one embodiment, data flow process 10-206 is performed by processor complex 10-110 within digital photographic system 10-100.

While frame analysis operation 10-240 is shown operating on aligned strobe image 10-232 and aligned ambient image 10-234, certain global correction factors may be computed from strobe image 10-210 and ambient image 10-220. For example, in one embodiment, a frame level color correction factor, discussed below, may be computed from strobe image 10-210 and ambient image 10-220. In such an embodiment the frame level color correction may be advantageously computed in parallel with alignment operation 10-230, reducing overall time required to generate blended image 10-280.

In certain embodiments, strobe image 10-210 and ambient image 10-220 are partitioned into two or more tiles and color correction operation 10-250, blend operation 10-270, and resampling operations comprising alignment operation 10-230 are performed on a per tile basis before being combined into blended image 10-280. Persons skilled in the art will recognize that tiling may advantageously enable finer grain scheduling of computational tasks among CPU cores 10-170 and GPU cores 10-172. Furthermore, tiling enables GPU cores 10-172 to advantageously operate on images having higher resolution in one or more dimensions than native two-dimensional surface support may allow for the GPU cores. For example, certain generations of GPU core are only configured to operate on 2048 by 2048 pixel images, but popular mobile devices include camera resolution of more than 2048 in one dimension and less than 2048 in another dimension. In such a system, two tiles may be used to partition strobe image 10-210 and ambient image 10-220 into two tiles each, thereby enabling a GPU having a resolution limitation of 2048 by 2048 to operate on the images. In one embodiment, a first tile of blended image 10-280 is computed to completion before a second tile for blended image 10-280 is computed, thereby reducing peak system memory required by processor complex 10-110.

Figures 2A, 10:
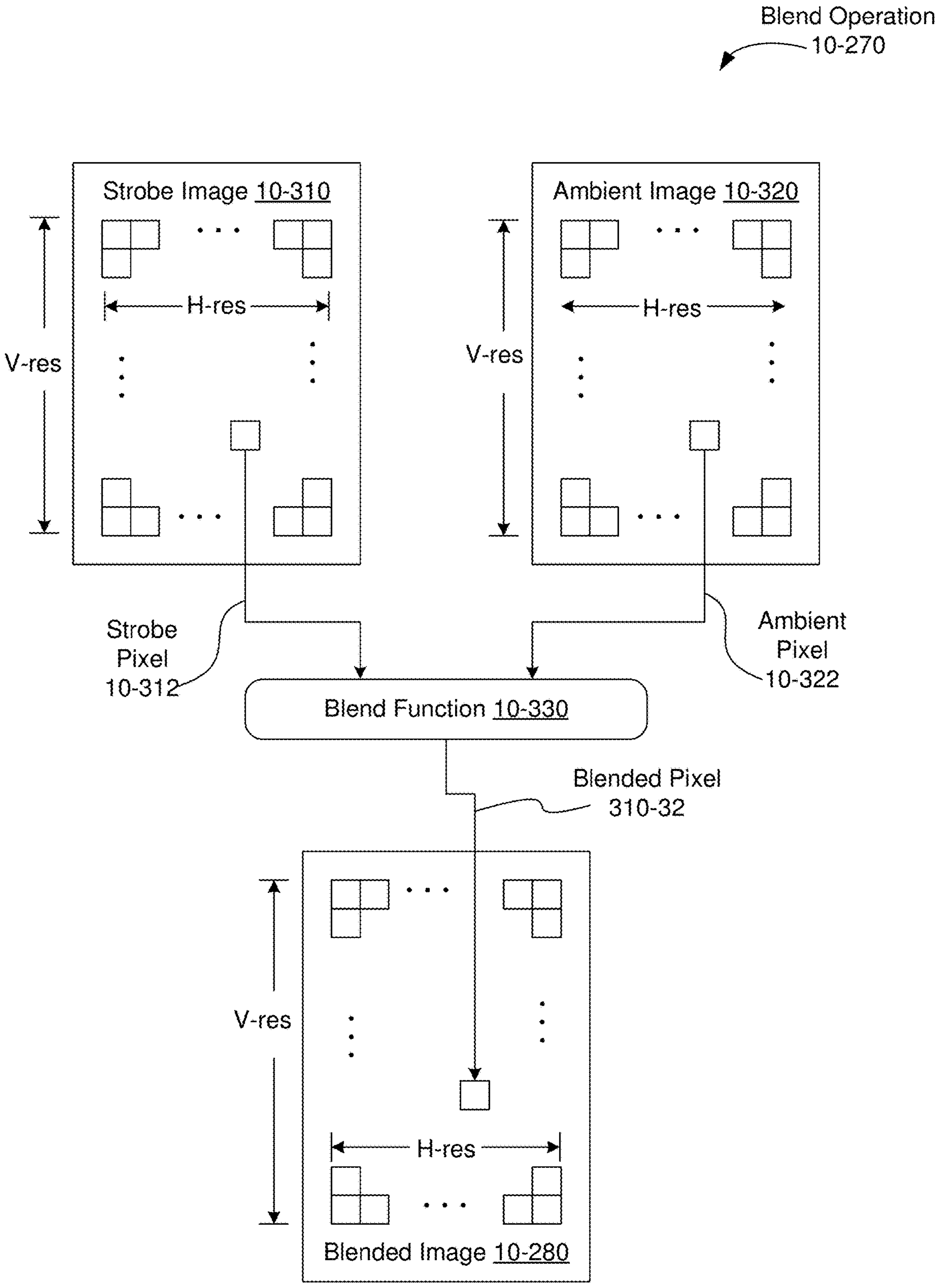

FIG. 10-2A illustrates image blend operation 10-270, according to one embodiment of the present invention. A strobe image 10-310 and an ambient image 10-320 of the same horizontal resolution (H-res) and vertical resolution (V-res) are combined via blend function 10-330 to generate blended image 10-280 having the same horizontal resolution and vertical resolution. In alternative embodiments, strobe image 10-310 or ambient image 10-320, or both images may be scaled to an arbitrary resolution defined by blended image 10-280 for processing by blend function 10-330. Blend function 10-330 is described in greater detail below in FIGS. 10-2B-10-2D.

As shown, strobe pixel 10-312 and ambient pixel 10-322 are blended by blend function 10-330 to generate blended pixel 10-332, stored in blended image 10-280. Strobe pixel 10-312, ambient pixel 10-322, and blended pixel 10-332 are located in substantially identical locations in each respective image.

In one embodiment, strobe image 10-310 corresponds to strobe image 10-210 of FIG. 10-1A and ambient image 10-320 corresponds to ambient image 10-220. In another embodiment, strobe image 10-310 corresponds to corrected strobe image data 10-252 of FIG. 10-1B and ambient image 10-320 corresponds to ambient image 10-220. In yet another embodiment, strobe image 10-310 corresponds to aligned strobe image 10-232 of FIG. 10-1C and ambient image 10-320 corresponds to aligned ambient image 10-234. In still yet another embodiment, strobe image 10-310 corresponds to corrected strobe image data 10-252 of FIG. 10-1D, and ambient image 10-320 corresponds to aligned ambient image 10-234.

Blend operation 10-270 may be performed by one or more CPU cores 10-170, one or more GPU cores 10-172, or any combination thereof. In one embodiment, blend function 10-330 is associated with a fragment shader, configured to execute within one or more GPU cores 10-172.

Figures 2B, 10:
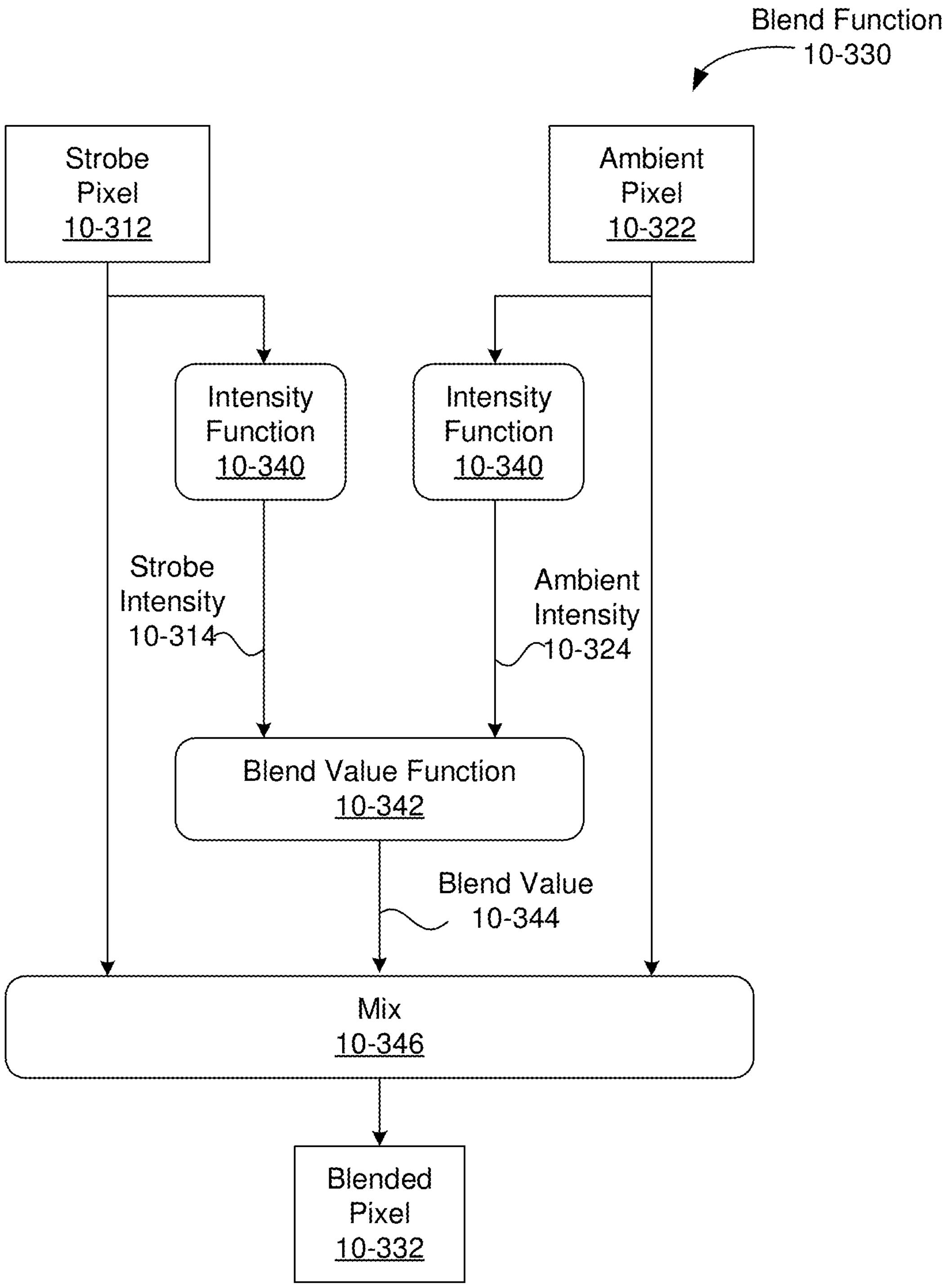

FIG. 10-2B illustrates blend function 10-330 of FIG. 10-2A for blending pixels associated with a strobe image and an ambient image, according to one embodiment of the present invention. As shown, a strobe pixel 10-312 from strobe image 10-310 and an ambient pixel 10-322 from ambient image 10-320 are blended to generate a blended pixel 10-332 associated with blended image 10-280.

Strobe intensity 10-314 is calculated for strobe pixel 10-312 by intensity function 10-340. Similarly, ambient intensity 10-324 is calculated by intensity function 10-340 for ambient pixel 10-322. In one embodiment, intensity function 10-340 implements Equation 10-1, where Cr, Cg, Cb are contribution constants and Red, Green, and Blue represent color intensity values for an associated pixel:

$$\text{Intensity} = Cr * \text{Red} + Cg * \text{Green} + Cb * \text{Blue} \quad \text{(Eq. 10-1)}$$

A sum of the contribution constants should be equal to a maximum range value for Intensity. For example, if Intensity is defined to range from 0.0 to 1.0, then Cr+Cg+Cb=1.0. In one embodiment Cr=Cg=Cb=⅓.

Blend value function 10-342 receives strobe intensity 10-314 and ambient intensity 10-324 and generates a blend value 10-344. Blend value function 10-342 is described in greater detail in FIGS. 10-2D and 10-2C. In one embodiment, blend value 10-344 controls a linear mix operation 10-346 between strobe pixel 10-312 and ambient pixel 10-322 to generate blended pixel 10-332. Linear mix operation 10-346 receives Red, Green, and Blue values for strobe pixel 10-312 and ambient pixel 10-322. Linear mix operation 10-346 receives blend value 10-344, which determines how much strobe pixel 10-312 versus how much ambient pixel 10-322 will be represented in blended pixel 10-332. In one embodiment, linear mix operation 10-346 is defined by Equation 10-2, where Out corresponds to blended pixel 10-332, Blend corresponds to blend value 10-344, "A"

corresponds to a color vector comprising ambient pixel 10-322, and "B" corresponds to a color vector comprising strobe pixel 10-312.

$$\text{Out} = (\text{Blend} * B) + (1.0 - \text{Blend}) * A \qquad \text{(Eq. 10-2)}$$

When blend value 10-344 is equal to 1.0, blended pixel 10-332 is entirely determined by strobe pixel 10-312. When blend value 10-344 is equal to 0.0, blended pixel 10-332 is entirely determined by ambient pixel 10-322. When blend value 10-344 is equal to 0.5, blended pixel 10-332 represents a per component average between strobe pixel 10-312 and ambient pixel 10-322.

Figures 2C, 10:
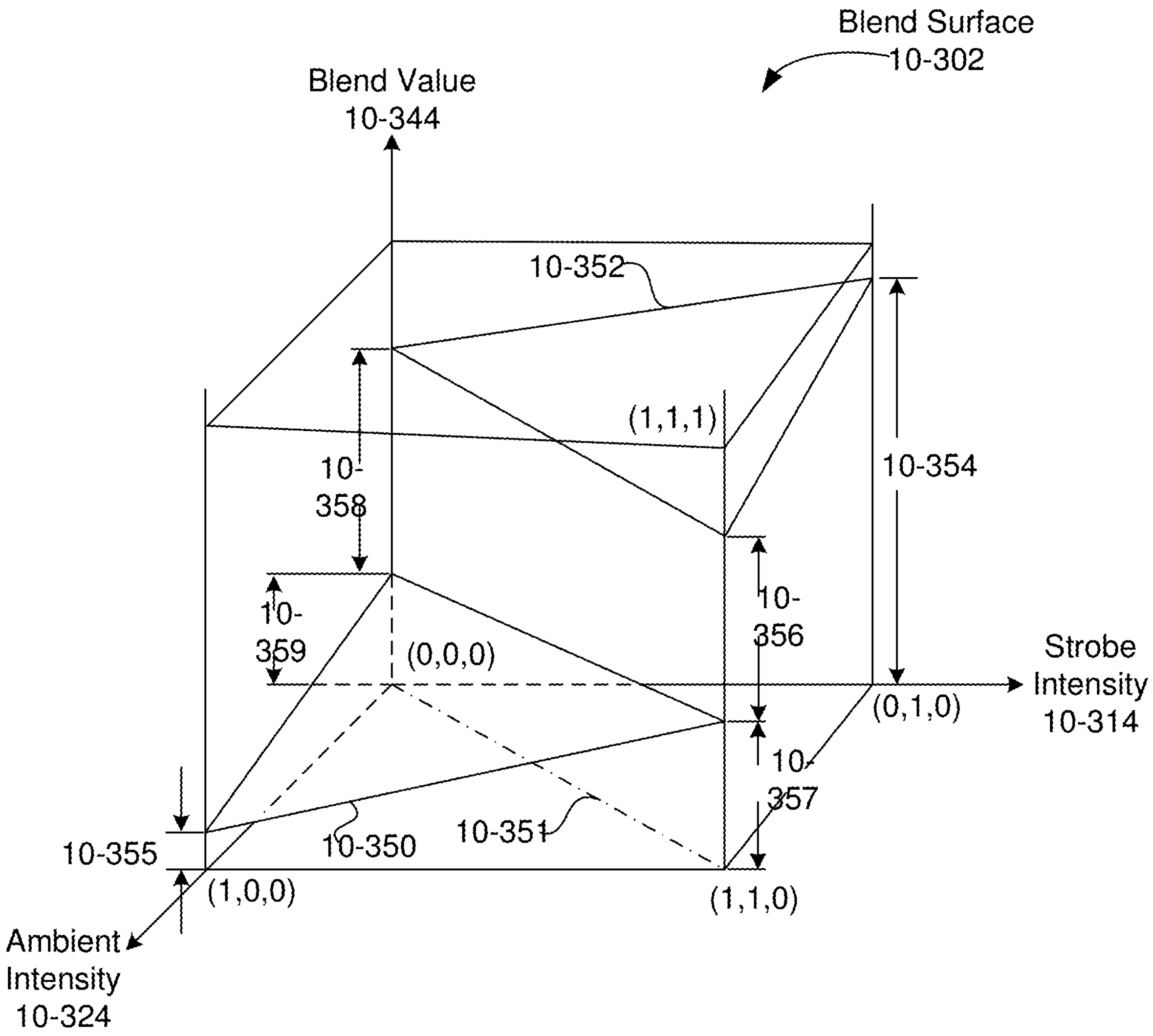

FIG. 10-2C illustrates a blend surface 10-302 for blending two pixels, according to one embodiment of the present invention. In one embodiment, blend surface 10-302 defines blend value function 10-342 of FIG. 10-2B. Blend surface 10-302 comprises a strobe dominant region 10-352 and an ambient dominant region 10-350 within a coordinate system defined by an axis for each of ambient intensity 10-324, strobe intensity 10-314, and blend value 10-344. Blend surface 10-302 is defined within a volume where ambient intensity 10-324, strobe intensity 10-314, and blend value 10-344 may range from 0.0 to 1.0. Persons skilled in the art will recognize that a range of 0.0 to 1.0 is arbitrary and other numeric ranges may be implemented without departing the scope and spirit of the present invention.

When ambient intensity 10-324 is larger than strobe intensity 10-314, blend value 10-344 may be defined by ambient dominant region 10-350. Otherwise, when strobe intensity 10-314 is larger than ambient intensity 10-324, blend value 10-344 may be defined by strobe dominant region 10-352. Diagonal 10-351 delineates a boundary between ambient dominant region 10-350 and strobe dominant region 10-352, where ambient intensity 10-324 is equal to strobe intensity 10-314. As shown, a discontinuity of blend value 10-344 in blend surface 10-302 is implemented along diagonal 10-351, separating ambient dominant region 10-350 and strobe dominant region 10-352.

For simplicity, a particular blend value 10-344 for blend surface 10-302 will be described herein as having a height above a plane that intersects three points including points at (1,0,0), (0,1,0), and the origin (0,0,0). In one embodiment, ambient dominant region 10-350 has a height 10-359 at the origin and strobe dominant region 10-352 has a height 10-358 above height 10-359. Similarly, ambient dominant region 10-350 has a height 10-357 above the plane at location (1,1), and strobe dominant region 10-352 has a height 10-356 above height 10-357 at location (1,1). Ambient dominant region 10-350 has a height 10-355 at location (1,0) and strobe dominant region 10-352 has a height of 354 at location (0,1).

In one embodiment, height 10-355 is greater than 0.0, and height 10-354 is less than 1.0. Furthermore, height 10-357 and height 10-359 are greater than 0.0 and height 10-356 and height 10-358 are each greater than 0.25. In certain embodiments, height 10-355 is not equal to height 10-359 or height 10-357. Furthermore, height 10-354 is not equal to the sum of height 10-356 and height 10-357, nor is height 10-354 equal to the sum of height 10-358 and height 10-359.

The height of a particular point within blend surface 10-302 defines blend value 10-344, which then determines how much strobe pixel 10-312 and ambient pixel 10-322 each contribute to blended pixel 10-332. For example, at location (0,1), where ambient intensity is 0.0 and strobe intensity is 1.0, the height of blend surface 10-302 is given as height 10-354, which sets blend value 10-344 to a value for height 10-354. This value is used as blend value 10-344 in mix operation 10-346 to mix strobe pixel 10-312 and ambient pixel 10-322. At (0,1), strobe pixel 10-312 dominates the value of blended pixel 10-332, with a remaining, small portion of blended pixel 10-322 contributed by ambient pixel 10-322. Similarly, at (1,0), ambient pixel 10-322 dominates the value of blended pixel 10-332, with a remaining, small portion of blended pixel 10-322 contributed by strobe pixel 10-312.

Figures 2D, 10:
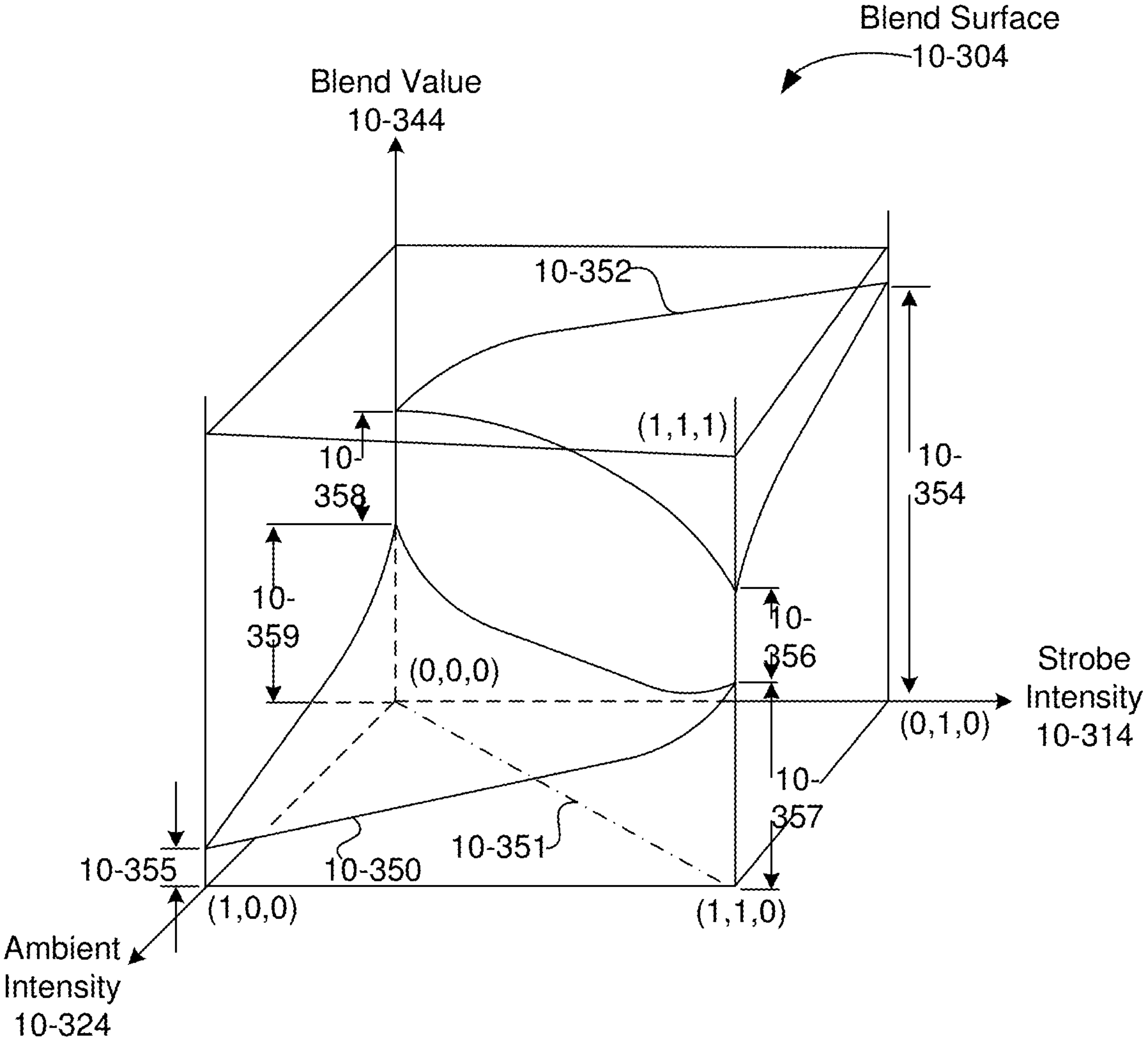

Ambient dominant region 10-350 and strobe dominant region 10-352 are illustrated herein as being planar sections for simplicity. However, as shown in FIG. 10-2D, certain curvature may be added, for example, to provide smoother transitions, such as along at least portions of diagonal 10-351, where strobe pixel 10-312 and ambient pixel 10-322 have similar intensity. A gradient, such as a table top or a wall in a given scene, may include a number of pixels that cluster along diagonal 10-351. These pixels may look more natural if the height difference between ambient dominant region 10-350 and strobe dominant region 10-352 along diagonal 10-351 is reduced compared to a planar section. A discontinuity along diagonal 10-351 is generally needed to distinguish pixels that should be strobe dominant versus pixels that should be ambient dominant. A given quantization of strobe intensity 10-314 and ambient intensity 10-324 may require a certain bias along diagonal 10-351, so that either ambient dominant region 10-350 or strobe dominant region 10-352 comprises a larger area within the plane than the other.

FIG. 10-2D illustrates a blend surface 10-304 for blending two pixels, according to another embodiment of the present invention. Blend surface 10-304 comprises a strobe dominant region 10-352 and an ambient dominant region 10-350 within a coordinate system defined by an axis for each of ambient intensity 10-324, strobe intensity 10-314, and blend value 10-344. Blend surface 10-304 is defined within a volume substantially identical to blend surface 10-302 of FIG. 10-2C.

As shown, upward curvature at locations (0,0) and (1,1) is added to ambient dominant region 10-350, and downward curvature at locations (0,0) and (1,1) is added to strobe dominant region 10-352. As a consequence, a smoother transition may be observed within blended image 10-280 for very bright and very dark regions, where color may be less stable and may diverge between strobe image 10-310 and ambient image 10-320. Upward curvature may be added to ambient dominant region 10-350 along diagonal 10-351 and corresponding downward curvature may be added to strobe dominant region 10-352 along diagonal 10-351.

In certain embodiments, downward curvature may be added to ambient dominant region 10-350 at (1,0), or along a portion of the axis for ambient intensity 10-324. Such downward curvature may have the effect of shifting the weight of mix operation 10-346 to favor ambient pixel 10-322 when a corresponding strobe pixel 10-312 has very low intensity.

In one embodiment, a blend surface, such as blend surface 10-302 or blend surface 10-304, is pre-computed and stored as a texture map that is established as an input to a fragment shader configured to implement blend operation 10-270. A surface function that describes a blend surface having an ambient dominant region 10-350 and a strobe dominant region 10-352 is implemented to generate and store the texture map. The surface function may be implemented on a CPU core 10-170 of FIG. 10-1A or a GPU core 10-172, or a combination thereof. The fragment shader executing on a GPU core may use the texture map as a lookup table implementation of blend value function 10-342. In alternative embodiments, the fragment shader implements the surface function and computes a blend value 10-344 as needed for each combination of a strobe intensity 10-314 and an ambient intensity 10-324. One exemplary surface function that may be used to compute a blend value 10-344 (blendValue) given an ambient intensity 10-324 (ambient) and a strobe intensity 10-314 (strobe) is illustrated below as pseudo-code in Table 10-1. A constant "e" is set to a value that is relatively small, such as a fraction of a quantization step for ambient or strobe intensity, to avoid dividing by zero. Height 10-355 corresponds to constant 0.125 divided by 3.0.

TABLE 10-1

```
fDivA = strobe/(ambient + e);
fDivB = (1.0 − ambient) / ((1.0 − strobe) + (1.0 − ambient) + e);
temp = (fDivA >= 1.0) ? 1.0 : 0.125;
blendValue = (temp + 2.0 * fDivB) / 3.0;
```

In certain embodiments, the blend surface is dynamically configured based on image properties associated with a given strobe image 10-310 and corresponding ambient image 10-320. Dynamic configuration of the blend surface may include, without limitation, altering one or more of heights 10-354 through 359, altering curvature associated with one or more of heights 10-354 through 359, altering curvature along diagonal 10-351 for ambient dominant region 10-350, altering curvature along diagonal 10-351 for strobe dominant region 10-352, or any combination thereof.

One embodiment of dynamic configuration of a blend surface involves adjusting heights associated with the surface discontinuity along diagonal 10-351. Certain images disproportionately include gradient regions having strobe pixels 10-312 and ambient pixels 10-322 of similar or identical intensity. Regions comprising such pixels may generally appear more natural as the surface discontinuity along diagonal 10-351 is reduced. Such images may be detected using a heat-map of ambient intensity 10-324 and strobe intensity 10-314 pairs within a surface defined by ambient intensity 10-324 and strobe intensity 10-314. Clustering along diagonal 10-351 within the heat-map indicates a large incidence of strobe pixels 10-312 and ambient pixels 10-322 having similar intensity within an associated scene. In one embodiment, clustering along diagonal 10-351 within the heat-map indicates that the blend surface should be dynamically configured to reduce the height of the discontinuity along diagonal 10-351. Reducing the height of the discontinuity along diagonal 10-351 may be implemented via adding downward curvature to strobe dominant region 10-352 along diagonal 10-351, adding upward curvature to ambient dominant region 10-350 along diagonal 10-351, reducing height 10-358, reducing height 10-356, or any combination thereof. Any technically feasible technique may be implemented to adjust curvature and height values without departing the scope and spirit of the present invention. Furthermore, any region of blend surfaces 10-302, 10-304 may be dynamically adjusted in response to image characteristics without departing the scope of the present invention.

In one embodiment, dynamic configuration of the blend surface comprises mixing blend values from two or more pre-computed lookup tables implemented as texture maps. For example, a first blend surface may reflect a relatively large discontinuity and relatively large values for heights 10-356 and 10-358, while a second blend surface may reflect a relatively small discontinuity and relatively small values for height 10-356 and 10-358. Here, blend surface 10-304 may be dynamically configured as a weighted sum of blend values from the first blend surface and the second blend surface. Weighting may be determined based on certain image characteristics, such as clustering of strobe intensity 10-314 and ambient intensity 10-324 pairs in certain regions within the surface defined by strobe intensity 10-314 and ambient intensity 10-324, or certain histogram attributes for strobe image 10-210 and ambient image 10-220. In one embodiment, dynamic configuration of one or more aspects of the blend surface, such as discontinuity height, may be adjusted according to direct user input, such as via a UI tool.

Figures 2E, 10:
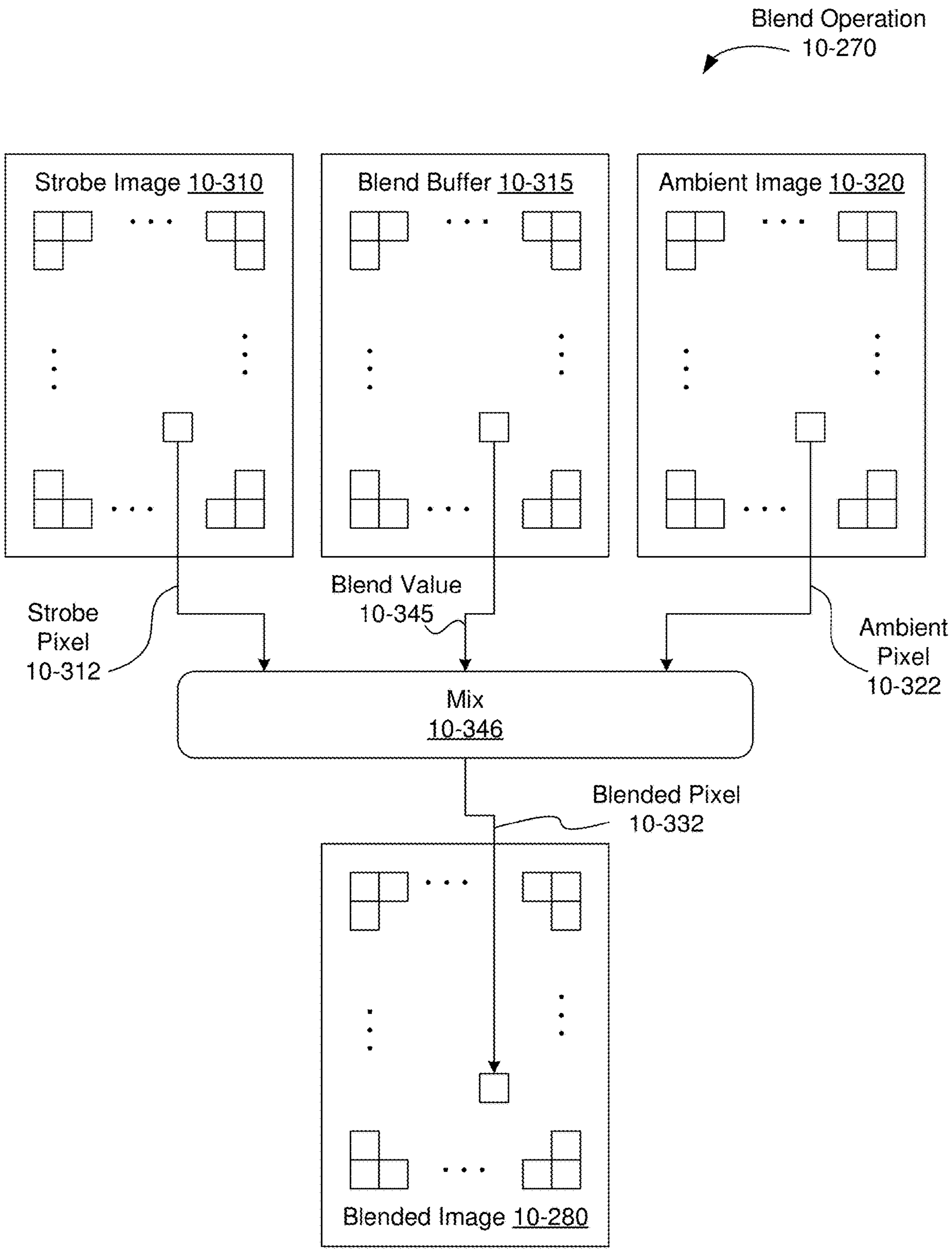
Figures 3A, 10:
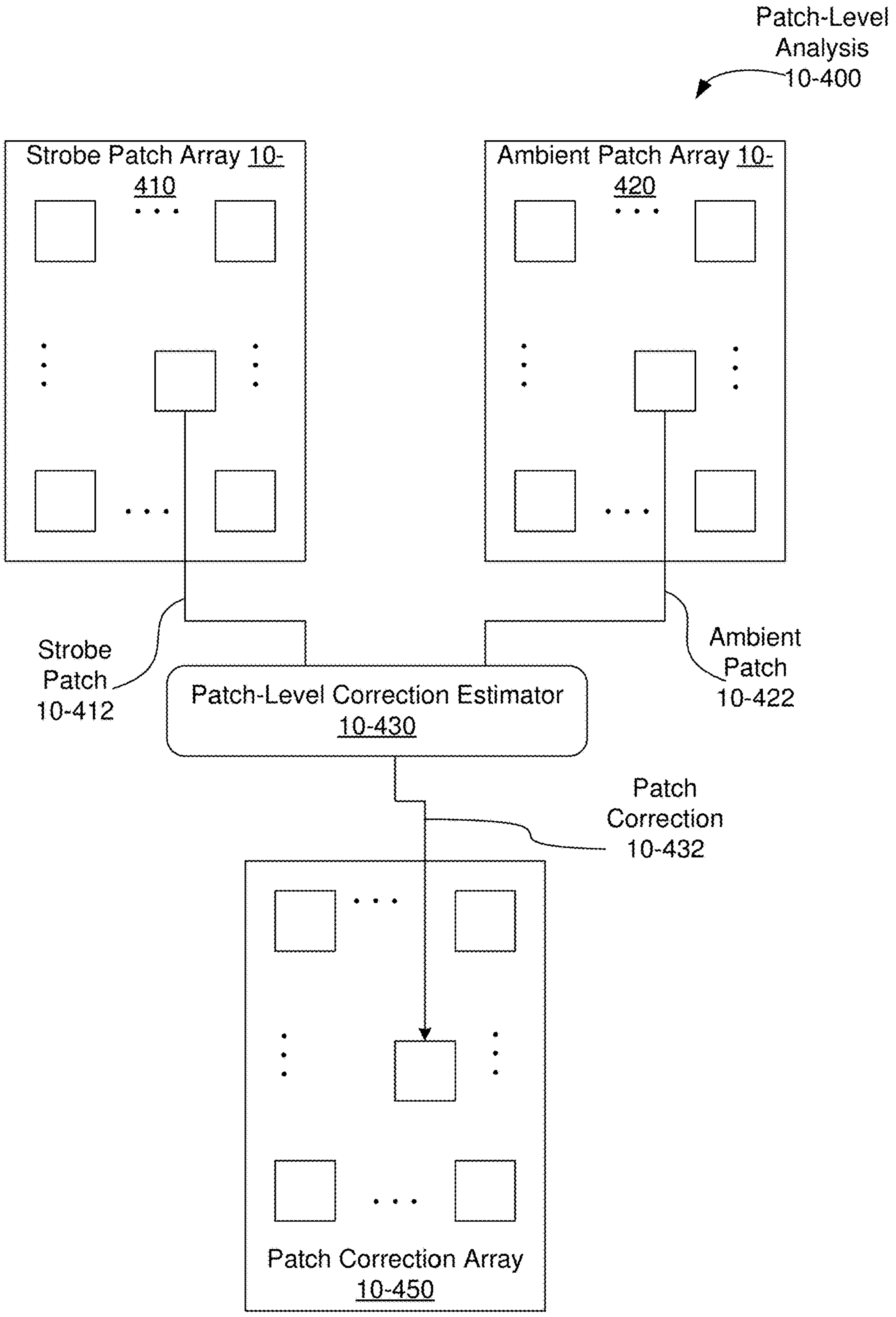
Figures 3B, 10:
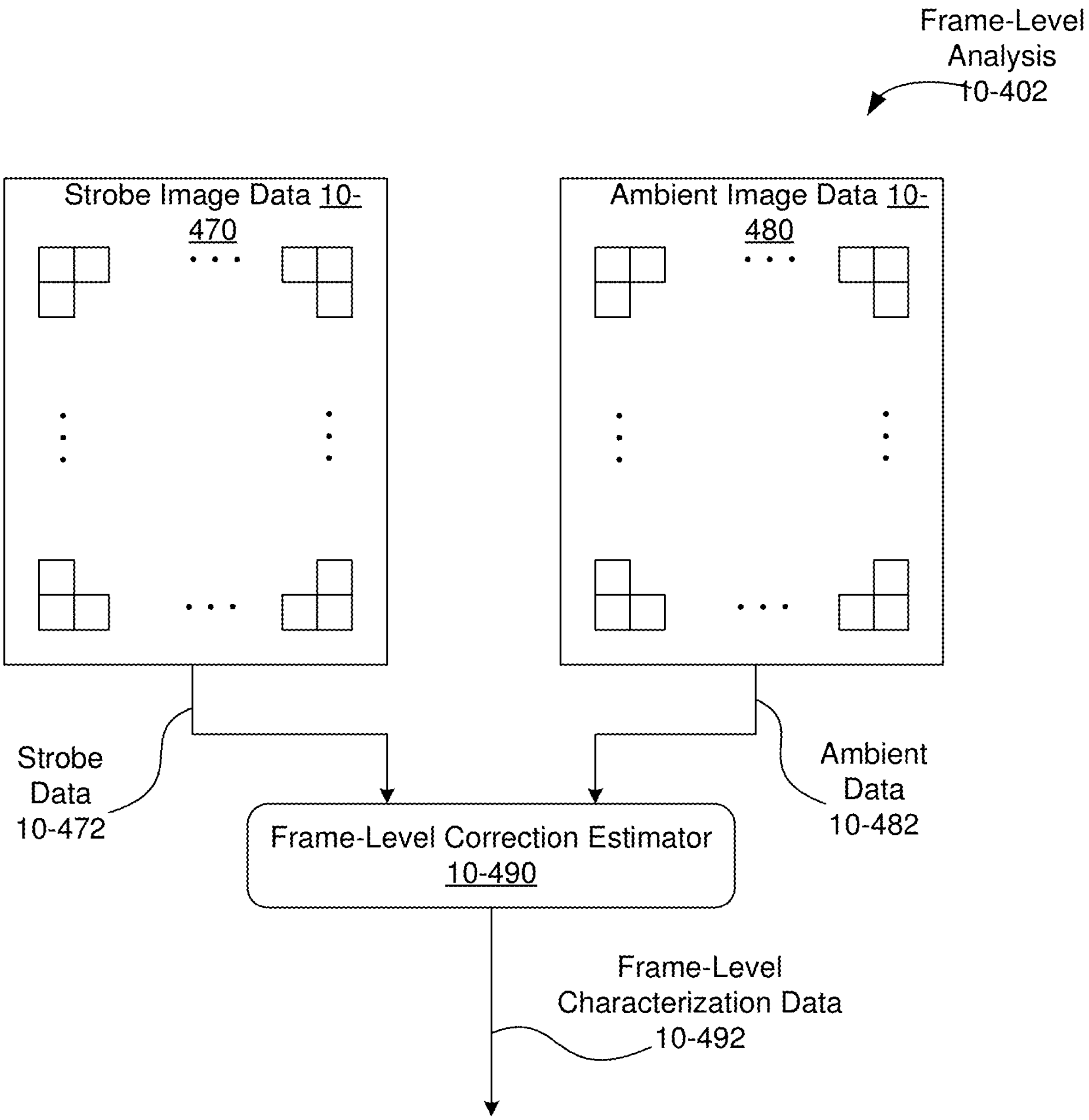

FIG. 10-2E illustrates an image blend operation for blending a strobe image with an ambient image to generate a blended image, according to one embodiment of the present invention. A strobe image 10-310 and an ambient image 10-320 of the same horizontal resolution and vertical resolution are combined via mix operation 10-346 to generate blended image 10-280 having the same resolution horizontal resolution and vertical resolution. In alternative embodiments, strobe image 10-310 or ambient image 10-320, or both images may be scaled to an arbitrary resolution defined by blended image 10-280 for processing by mix operation 10-346.

In certain settings, strobe image 10-310 and ambient image 10-320 include a region of pixels having similar intensity per pixel but different color per pixel. Differences in color may be attributed to differences in white balance for each image and different illumination contribution for each image. Because the intensity among adjacent pixels is similar, pixels within the region will cluster along diagonal 10-351 of FIGS. 10-2D and 10-2C, resulting in a distinctly unnatural speckling effect as adjacent pixels are weighted according to either strobe dominant region 10-352 or ambient dominant region 10-350. To soften this speckling effect and produce a natural appearance within these regions, blend values may be blurred, effectively reducing the discontinuity between strobe dominant region 10-352 and ambient dominant region 10-350. As is well-known in the art, blurring may be implemented by combining two or more individual samples.

In one embodiment, a blend buffer 10-315 comprises blend values 10-345, which are computed from a set of two or more blend samples. Each blend sample is computed according to blend function 10-330, described previously in FIGS. 10-2B-10-2D. In one embodiment, blend buffer 10-315 is first populated with blend samples, computed according to blend function 10-330. The blend samples are then blurred to compute each blend value 10-345, which is stored to blend buffer 10-315. In other embodiments, a first blend buffer is populated with blend samples computed according to blend function 10-330, and two or more blend samples from the first blend buffer are blurred together to generate blend each value 10-345, which is stored in blend buffer 10-315. In yet other embodiments, two or more blend samples from the first blend buffer are blurred together to generate each blend value 10-345 as needed. In still another embodiment, two or more pairs of strobe pixels 10-312 and ambient pixels 10-322 are combined to generate each blend value 10-345 as needed. Therefore, in certain embodiments, blend buffer 10-315 comprises an allocated buffer in memory, while in other embodiments blend buffer 10-315 comprises an illustrative abstraction with no corresponding allocation in memory.

As shown, strobe pixel 10-312 and ambient pixel 10-322 are mixed based on blend value 10-345 to generate blended pixel 10-332, stored in blended image 10-280. Strobe pixel 10-312, ambient pixel 10-322, and blended pixel 10-332 are located in substantially identical locations in each respective image.

In one embodiment, strobe image 10-310 corresponds to strobe image 10-210 and ambient image 10-320 corresponds to ambient image 10-220. In other embodiments, strobe image 10-310 corresponds to aligned strobe image 10-232 and ambient image 10-320 corresponds to aligned ambient image 10-234. In one embodiment, mix operation 10-346 is associated with a fragment shader, configured to execute within one or more GPU cores 10-172.

Figures 4A, 10:
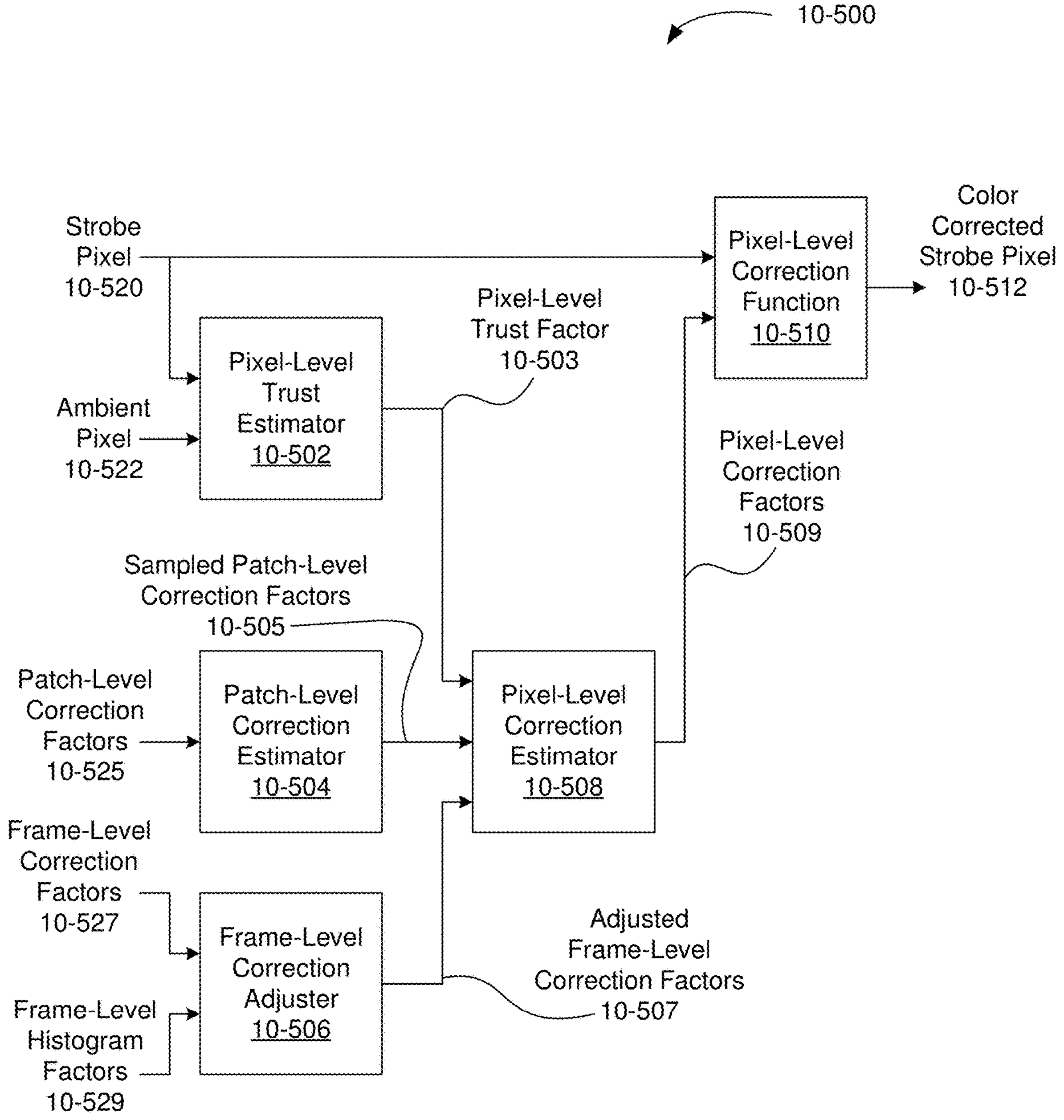
Figures 4B, 10:
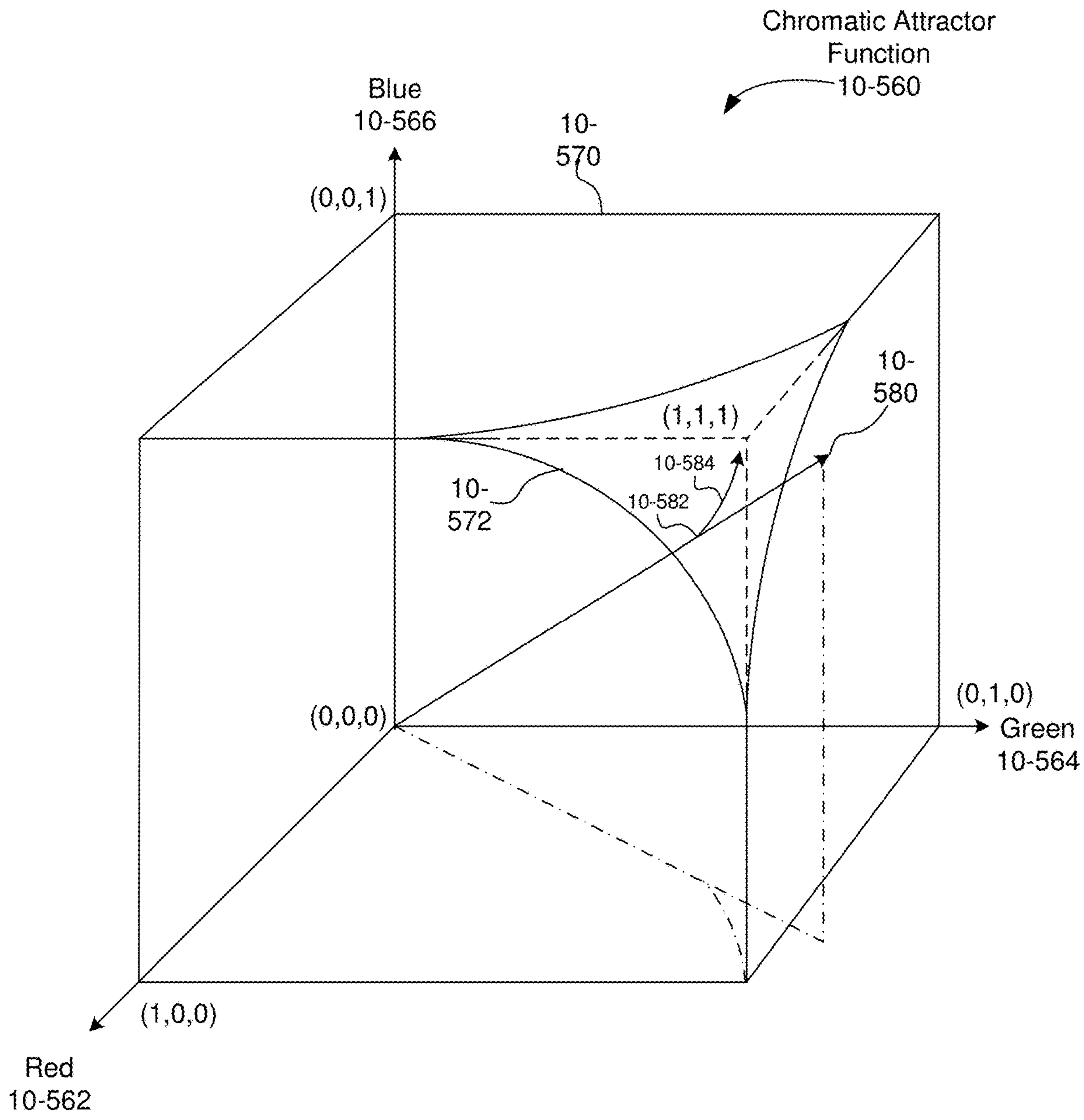

As discussed previously in FIGS. 10-1B and 10-1D, strobe image 10-210 may need to be processed to correct color that is divergent from color in corresponding ambient image 10-220. Strobe image 10-210 may include frame-level divergence, spatially localized divergence, or a combination thereof. FIGS. 10-3A and 10-3B describe techniques implemented in frame analysis operation 10-240 for computing color correction data 10-242. In certain embodiments, color correction data 10-242 comprises frame-level characterization data for correcting overall color divergence, and patch-level correction data for correcting localized color divergence. FIGS. 10-4A and 10-4B discuss techniques for implementing color correction operation 10-250, based on color correction data 10-242.

FIG. 10-3A illustrates a patch-level analysis process 10-400 for generating a patch correction array 10-450, according to one embodiment of the present invention. Patch-level analysis provides local color correction information for correcting a region of a source strobe image to be consistent in overall color balance with an associated region of a source ambient image. A patch corresponds to a region of one or more pixels within an associated source image. A strobe patch 10-412 comprises representative color information for a region of one or more pixels within strobe patch array 10-410, and an associated ambient patch 10-422 comprises representative color information for a region of one or more pixels at a corresponding location within ambient patch array 10-420.

In one embodiment, strobe patch array 10-410 and ambient patch array 10-420 are processed on a per patch basis by patch-level correction estimator 10-430 to generate patch correction array 10-450. Strobe patch array 10-410 and ambient patch array 10-420 each comprise a two-dimensional array of patches, each having the same horizontal patch resolution and the same vertical patch resolution. In alternative embodiments, strobe patch array 10-410 and ambient patch array 10-420 may each have an arbitrary resolution and each may be sampled according to a horizontal and vertical resolution for patch correction array 10-450.

In one embodiment, patch data associated with strobe patch array 10-410 and ambient patch array 10-420 may be pre-computed and stored for substantially entire corresponding source images. Alternatively, patch data associated with strobe patch array 10-410 and ambient patch array 10-420 may be computed as needed, without allocating buffer space for strobe patch array 10-410 or ambient patch array 10-420.

In data flow process 10-202 of FIG. 10-1B, the source strobe image comprises strobe image 10-210, while in data flow process 10-206 of FIG. 10-1D, the source strobe image comprises aligned strobe image 10-232. Similarly, ambient patch array 10-420 comprises a set of patches generated from a source ambient image. In data flow process 10-202, the source ambient image comprises ambient image 10-220, while in data flow process 10-206, the source ambient image comprises aligned ambient image 10-234.

In one embodiment, representative color information for each patch within strobe patch array 10-410 is generated by averaging color for a four-by-four region of pixels from the source strobe image at a corresponding location, and representative color information for each patch within ambient patch array 10-420 is generated by averaging color for a four-by-four region of pixels from the ambient source image at a corresponding location. An average color may comprise red, green and blue components. Each four-by-four region may be non-overlapping or overlapping with respect to other four-by-four regions. In other embodiments, arbitrary regions may be implemented. Patch-level correction estimator 10-430 generates patch correction 10-432 from strobe patch 10-412 and a corresponding ambient patch 10-422. In certain embodiments, patch correction 10-432 is saved to patch correction array 10-450 at a corresponding location. In one embodiment, patch correction 10-432 includes correction factors for red, green, and blue, computed according to the pseudo-code of Table 10-2, below.

TABLE 10-2

```
ratio.r = (ambient.r) / (strobe.r);
ratio.g = (ambient.g) / (strobe.g);
ratio.b = (ambient.b) / (strobe.b);
maxRatio = max(ratio.r, max(ratio.g, ratio.b));
correct.r = (ratio.r / maxRatio);
correct.g = (ratio.g / maxRatio);
correct.b = (ratio.b / maxRatio);
```

Here, "strobe.r" refers to a red component for strobe patch 10-412, "strobe.g" refers to a green component for strobe patch 10-412, and "strobe.b" refers to a blue component for strobe patch 10-412. Similarly, "ambient.r," "ambient.g," and "ambient.b" refer respectively to red, green, and blue components of ambient patch 10-422. A maximum ratio of ambient to strobe components is computed as "maxRatio," which is then used to generate correction factors, including "correct.r" for a red channel, "correct.g" for a green channel, and "correct.b" for a blue channel. Correction factors correct.r, correct.g, and correct.b together comprise patch correction 10-432. These correction factors, when applied fully in color correction operation 10-250, cause pixels associated with strobe patch 10-412 to be corrected to reflect a color balance that is generally consistent with ambient patch 10-422.

In one alternative embodiment, each patch correction 10-432 comprises a slope and an offset factor for each one of at least red, green, and blue components. Here, components of source ambient image pixels bounded by a patch are treated as function input values and corresponding components of source strobe image pixels are treated as function outputs for a curve fitting procedure that estimates slope and offset parameters for the function. For example, red components of source ambient image pixels associated with a given patch may be treated as "X" values and corresponding red pixel components of source strobe image pixels may be treated as "Y" values, to form (X,Y) points that may be processed according to a least-squares linear fit procedure, thereby generating a slope parameter and an offset parameter for the red component of the patch. Slope and offset parameters for green and blue components may be computed similarly. Slope and offset parameters for a component describe a line equation for the component. Each patch correction 10-432 includes slope and offset parameters for at least red, green, and blue components. Conceptually, pixels within an associated strobe patch may be color corrected by evaluating line equations for red, green, and blue components.

In a different alternative embodiment, each patch correction 10-432 comprises three parameters describing a quadratic function for each one of at least red, green, and blue components. Here, components of source strobe image pixels bounded by a patch are fit against corresponding components of source ambient image pixels to generate quadratic parameters for color correction. Conceptually, pixels within an associated strobe patch may be color corrected by evaluating quadratic equations for red, green, and blue components.

FIG. 10-3B illustrates a frame-level analysis process 10-402 for generating frame-level characterization data 10-492, according to one embodiment of the present invention. Frame-level correction estimator 10-490 reads strobe data 10-472 comprising pixels from strobe image data 10-470 and ambient data 10-482 comprising pixels from ambient image data 10-480 to generate frame-level characterization data 10-492.

In certain embodiments, strobe data 10-472 comprises pixels from strobe image 10-210 of FIG. 10-1A and ambient data 10-482 comprises pixels from ambient image 10-220. In other embodiments, strobe data 10-472 comprises pixels from aligned strobe image 10-232 of FIG. 10-1C, and ambient data 10-482 comprises pixels from aligned ambient image 10-234. In yet other embodiments, strobe data 10-472 comprises patches representing average color from strobe patch array 10-410, and ambient data 10-482 comprises patches representing average color from ambient patch array 10-420.

In one embodiment, frame-level characterization data 10-492 includes at least frame-level color correction factors for red correction, green correction, and blue correction. Frame-level color correction factors may be computed according to the pseudo-code of Table 10-3.

TABLE 10-3

```
ratioSum.r = (ambientSum.r) / (strobeSum.r);
ratioSum.g = (ambientSum.g) / (strobeSum.g);
ratioSum.b = (ambientSum.b) / (strobeSum.b);
maxSumRatio = max(ratioSum.r, max(ratioSum.g, ratioSum.b));
correctFrame.r = (ratioSum.r / maxSumRatio);
correctFrame.g = (ratioSum.g / maxSumRatio);
correctFrame.b = (ratioSum.b / maxSumRatio);
```

Here, "strobeSum.r" refers to a sum of red components taken over strobe image data 10-470, "strobeSum.g" refers to a sum of green components taken over strobe image data 10-470, and "strobeSum.b" refers to a sum of blue components taken over strobe image data 10-470. Similarly, "ambientSum.r," "ambientSum.g," and "ambientSum.b" each refer to a sum of components taken over ambient image data 10-480 for respective red, green, and blue components. A maximum ratio of ambient to strobe sums is computed as "maxSumRatio," which is then used to generate frame-level color correction factors, including "correctFrame.r" for a red channel, "correctFrame.g" for a green channel, and "correctFrame.b" for a blue channel. These frame-level color correction factors, when applied fully and exclusively in color correction operation 10-250, cause overall color balance of strobe image 10-210 to be corrected to reflect a color balance that is generally consistent with that of ambient image 10-220.

While overall color balance for strobe image 10-210 may be corrected to reflect overall color balance of ambient image 10-220, a resulting color corrected rendering of strobe image 10-210 based only on frame-level color correction factors may not have a natural appearance and will likely include local regions with divergent color with respect to ambient image 10-220. Therefore, as described below in FIG. 10-4A, patch-level correction may be used in conjunction with frame-level correction to generate a color corrected strobe image.

In one embodiment, frame-level characterization data 10-492 also includes at least a histogram characterization of strobe image data 10-470 and a histogram characterization of ambient image data 10-480. Histogram characterization may include identifying a low threshold intensity associated with a certain low percentile of pixels, a median threshold intensity associated with a fiftieth percentile of pixels, and a high threshold intensity associated with a high threshold percentile of pixels. In one embodiment, the low threshold intensity is associated with an approximately fifteenth percentile of pixels and a high threshold intensity is associated with an approximately eighty-fifth percentile of pixels, so that approximately fifteen percent of pixels within an associated image have a lower intensity than a calculated low threshold intensity and approximately eighty-five percent of pixels have a lower intensity than a calculated high threshold intensity.

In certain embodiments, frame-level characterization data 10-492 also includes at least a heat-map, described previously. The heat-map may be computed using individual pixels or patches representing regions of pixels. In one embodiment, the heat-map is normalized using a logarithm operator, configured to normalize a particular heat-map location against a logarithm of a total number of points contributing to the heat-map. Alternatively, frame-level characterization data 10-492 includes a factor that summarizes at least one characteristic of the heat-map, such as a diagonal clustering factor to quantify clustering along diagonal 10-351 of FIGS. 10-2C and 10-2D. This diagonal clustering factor may be used to dynamically configure a given blend surface.

While frame-level and patch-level correction coefficients have been discussed representing two different spatial extents, persons skilled in the art will recognize that more than two levels of spatial extent may be implemented without departing the scope and spirit of the present invention.

FIG. 10-4A illustrates a data flow process 10-500 for correcting strobe pixel color, according to one embodiment of the present invention. A strobe pixel 10-520 is processed to generate a color corrected strobe pixel 10-512. In one embodiment, strobe pixel 10-520 comprises a pixel associated with strobe image 10-210 of FIG. 10-1B, ambient pixel 10-522 comprises a pixel associated with ambient image 10-220, and color corrected strobe pixel 10-512 comprises a pixel associated with corrected strobe image data 10-252. In an alternative embodiment, strobe pixel 10-520 comprises a pixel associated with aligned strobe image 10-232 of FIG. 10-1D, ambient pixel 10-522 comprises a pixel associated with aligned ambient image 10-234, and color corrected strobe pixel 10-512 comprises a pixel associated with corrected strobe image data 10-252. Color corrected strobe pixel 10-512 may correspond to strobe pixel 10-312 in FIG. 10-2A, and serve as an input to blend function 10-330.

In one embodiment, patch-level correction factors 10-525 comprise one or more sets of correction factors for red, green, and blue associated with patch correction 10-432 of FIG. 10-3A, frame-level correction factors 10-527 comprise frame-level correction factors for red, green, and blue associated with frame-level characterization data 10-492 of FIG. 10-3B, and frame-level histogram factors 10-529 comprise at least a low threshold intensity and a median threshold intensity for both an ambient histogram and a strobe histogram associated with frame-level characterization data 10-492.

A pixel-level trust estimator 10-502 computes a pixel-level trust factor 10-503 from strobe pixel 10-520 and ambient pixel 10-522. In one embodiment, pixel-level trust factor 10-503 is computed according to the pseudo-code of Table 10-4, where strobe pixel 10-520 corresponds to strobePixel, ambient pixel 10-522 corresponds to ambientPixel, and pixel-level trust factor 10-503 corresponds to pixelTrust. Here, ambientPixel and strobePixel may comprise a vector variable, such as a well known vec3 or vec4 vector variable.

TABLE 10-4

```
ambientIntensity = intensity (ambientPixel);
strobeIntensity = intensity (strobePixel);
stepInput = ambientIntensity * strobeIntensity;
pixelTrust = smoothstep (lowEdge, highEdge, stepInput);
```

Here, an intensity function may implement Equation 10-1 to compute ambientIntensity and strobeIntensity, corresponding respectively to an intensity value for ambientPixel and an intensity value for strobePixel. While the same intensity function is shown computing both ambientIntensity and strobeIntensity, certain embodiments may compute each intensity value using a different intensity function. A product operator may be used to compute stepinput, based on ambientIntensity and strobeIntensity. The well-known smoothstep function implements a relatively smoothly transition from 0.0 to 1.0 as stepinput passes through lowEdge and then through highEdge. In one embodiment, lowEge=0.25 and highEdge=0.66.

A patch-level correction estimator 10-504 computes patch-level correction factors 10-505 by sampling patch-level correction factors 10-525. In one embodiment, patch-level correction estimator 10-504 implements bilinear sampling over four sets of patch-level color correction samples to generate sampled patch-level correction factors 10-505. In an alternative embodiment, patch-level correction estimator 10-504 implements distance weighted sampling over four or more sets of patch-level color correction samples to generate sampled patch-level correction factors 10-505. In another alternative embodiment, a set of sampled patch-level correction factors 10-505 is computed using pixels within a region centered about strobe pixel 10-520. Persons skilled in the art will recognize that any technically feasible technique for sampling one or more patch-level correction factors to generate sampled patch-level correction factors 10-505 is within the scope and spirit of the present invention.

In one embodiment, each one of patch-level correction factors 10-525 comprises a red, green, and blue color channel correction factor. In a different embodiment, each one of the patch-level correction factors 10-525 comprises a set of line equation parameters for red, green, and blue color channels. Each set of line equation parameters may include a slope and an offset. In another embodiment, each one of the patch-level correction factors 10-525 comprises a set of quadratic curve parameters for red, green, and blue color channels. Each set of quadratic curve parameters may include a square term coefficient, a linear term coefficient, and a constant.

In one embodiment, frame-level correction adjuster 10-506 computes adjusted frame-level correction factors 10-507 (adjCorrectFrame) from the frame-level correction factors for red, green, and blue according to the pseudo-code of Table 10-5. Here, a mix operator may function according to Equation 10-2, where variable A corresponds to 1.0, variable B corresponds to a correctFrame color value, and frameTrust may be computed according to an embodiment described below in conjunction with the pseudo-code of Table 10-5. As discussed previously, correctFrame comprises frame-level correction factors. Parameter frameTrust quantifies how trustworthy a particular pair of ambient image and strobe image may be for performing frame-level color correction.

TABLE 10-5

```
adjCorrectFrame.r = mix(1.0, correctFrame.r, frameTrust);
adjCorrectFrame.g = mix(1.0, correctFrame.g, frameTrust);
adjCorrectFrame.b = mix(1.0, correctFrame.b, frameTrust);
```

When frameTrust approaches zero (correction factors not trustworthy), the adjusted frame-level correction factors 10-507 converge to 1.0, which yields no frame-level color correction. When frameTrust is 1.0 (completely trustworthy), the adjusted frame-level correction factors 10-507 converge to values calculated previously in Table 10-3. The pseudo-code of Table 10-6 illustrates one technique for calculating frameTrust.

TABLE 10-6

```
strobeExp = (WSL*SL + WSM*SM + WSH*SH) /
(WSL + WSM + WSH);
ambientExp = (WAL*SL + WAM*SM + WAH*SH) /
(WAL + WAM + WAH);
frameTrustStrobe = smoothstep (SLE, SHE, strobeExp);
frameTrustAmbient = smoothstep (ALE, AHE, ambientExp);
frameTrust = frameTrustStrobe * frameTrustAmbient;
```

Here, strobe exposure (strobeExp) and ambient exposure (ambientExp) are each characterized as a weighted sum of corresponding low threshold intensity, median threshold intensity, and high threshold intensity values. Constants WSL, WSM, and WSH correspond to strobe histogram contribution weights for low threshold intensity, median threshold intensity, and high threshold intensity values, respectively. Variables SL, SM, and SH correspond to strobe histogram low threshold intensity, median threshold intensity, and high threshold intensity values, respectively. Similarly, constants WAL, WAM, and WAH correspond to ambient histogram contribution weights for low threshold intensity, median threshold intensity, and high threshold intensity values, respectively; and variables AL, AM, and AH correspond to ambient histogram low threshold intensity, median threshold intensity, and high threshold intensity values, respectively. A strobe frame-level trust value (frameTrustStrobe) is computed for a strobe frame associated with strobe pixel 10-520 to reflect how trustworthy the strobe frame is for the purpose of frame-level color correction. In one embodiment, WSL=WAL=1.0, WSM=WAM=2.0, and WSH=WAH=0.0. In other embodiments, different weights may be applied, for example, to customize the techniques taught herein to a particular camera apparatus. In certain embodiments, other percentile thresholds may be measured, and different combinations of weighted sums may be used to compute frame-level trust values.

In one embodiment, a smoothstep function with a strobe low edge (SLE) and strobe high edge (SHE) is evaluated based on strobeExp. Similarly, a smoothstep function with ambient low edge (ALE) and ambient high edge (AHE) is evaluated to compute an ambient frame-level trust value (frameTrustAmbient) for an ambient frame associated with ambient pixel 10-522 to reflect how trustworthy the ambient frame is for the purpose of frame-level color correction. In one embodiment, SLE=ALE=0.15, and SHE=AHE=0.30. In other embodiments, different low and high edge values may be used.

In one embodiment, a frame-level trust value (frameTrust) for frame-level color correction is computed as the product of frameTrustStrobe and frameTrustAmbient. When both the strobe frame and the ambient frame are sufficiently exposed and therefore trustworthy frame-level color references, as indicated by frameTrustStrobe and frameTrustAmbient, the product of frameTrustStrobe and frameTrustAmbient will reflect a high trust for frame-level color correction. If either the strobe frame or the ambient frame is inadequately exposed to be a trustworthy color reference, then a color correction based on a combination of strobe frame and ambient frame should not be trustworthy, as reflected by a low or zero value for frameTrust.

In an alternative embodiment, the frame-level trust value (frameTrust) is generated according to direct user input, such as via a UI color adjustment tool having a range of control positions that map to a frameTrust value. The UI color adjustment tool may generate a full range of frame-level trust values (0.0 to 1.0) or may generate a value constrained to a computed range. In certain settings, the mapping may be non-linear to provide a more natural user experience. In one embodiment, the control position also influences pixel-level trust factor 10-503 (pixelTrust), such as via a direct bias or a blended bias.

A pixel-level correction estimator 10-508 is configured to generate pixel-level correction factors 10-509 (pixCorrection) from sampled patch-level correction factors 10-505 (correct), adjusted frame-level correction factors 10-507, and pixel-level trust factor 10-503. In one embodiment, pixel-level correction estimator 10-508 comprises a mix function, whereby sampled patch-level correction factors 10-505 is given substantially full mix weight when pixel-level trust factor 10-503 is equal to 1.0 and adjusted frame-level correction factors 10-507 is given substantially full mix weight when pixel-level trust factor 10-503 is equal to 0.0. Pixel-level correction estimator 10-508 may be implemented according to the pseudo-code of Table 10-7.

TABLE 10-7

```
pixCorrection.r = mix(adjCorrectFrame.r, correct.r, pixelTrust);
pixCorrection.g= mix(adjCorrectFrame.g, correct.g, pixelTrust);
pixCorrection.b = mix(adjCorrectFrame.b, correct.b, pixelTrust);
```

In another embodiment, line equation parameters comprising slope and offset define sampled patch-level correction factors 10-505 and adjusted frame-level correction factors 10-507. These line equation parameters are mixed within pixel-level correction estimator 10-508 according to pixelTrust to yield pixel-level correction factors 10-509 comprising line equation parameters for red, green, and blue channels. In yet another embodiment, quadratic parameters define sampled patch-level correction factors 10-505 and adjusted frame-level correction factors 10-507. In one embodiment, the quadratic parameters are mixed within pixel-level correction estimator 10-508 according to pixelTrust to yield pixel-level correction factors 10-509 comprising quadratic parameters for red, green, and blue channels. In another embodiment, quadratic equations are evaluated separately for frame-level correction factors and patch level correction factors for each color channel, and the results of evaluating the quadratic equations are mixed according to pixelTrust.

In certain embodiments, pixelTrust is at least partially computed by image capture information, such as exposure time or exposure ISO index. For example, if an image was captured with a very long exposure at a very high ISO index, then the image may include significant chromatic noise and may not represent a good frame-level color reference for color correction.

Pixel-level correction function 10-510 generates color corrected strobe pixel 10-512 from strobe pixel 10-520 and pixel-level correction factors 10-509. In one embodiment, pixel-level correction factors 10-509 comprise correction factors pixCorrection.r, pixCorrection.g, and pixCorrection.b and color corrected strobe pixel 10-512 is computed according to the pseudo-code of Table 10-8.

TABLE 10-8

```
// scale red, green, blue
vec3 pixCorrection = (pixCorrection.r, pixCorrection.g, pixCorrection.b);
vec3 deNormCorrectedPixel = strobePixel * pixCorrection;
normalizeFactor = length(strobePixel) / length(deNormCorrectedPixel);
vec3 normCorrectedPixel = deNormCorrectedPixel * normalizeFactor;
vec3 correctedPixel = cAttractor(normCorrectedPixel);
```

Here, pixCorrection comprises a vector of three components (vec3) corresponding pixel-level correction factors pixCorrection.r, pixCorrection.g, and pixCorrection.b. A denormalized, color corrected pixel is computed as deNormCorrectedPixel. A pixel comprising a red, green, and blue component defines a color vector in a three-dimensional space, the color vector having a particular length. The length of a color vector defined by deNormCorrectedPixel may be different with respect to a color vector defined by strobePixel. Altering the length of a color vector changes the intensity of a corresponding pixel. To maintain proper intensity for color corrected strobe pixel 10-512, deNormCorrectedPixel is re-normalized via normalizeFactor, which is computed as a ratio of length for a color vector defined by strobePixel to a length for a color vector defined by deNormCorrectedPixel. Color vector normCorrectedPixel includes pixel-level color correction and re-normalization to maintain proper pixel intensity. A length function may be performed using any technically feasible technique, such as calculating a square root of a sum of squares for individual vector component lengths.

A chromatic attractor function (cAttractor) gradually converges an input color vector to a target color vector as the input color vector increases in length. Below a threshold length, the chromatic attractor function returns the input color vector. Above the threshold length, the chromatic attractor function returns an output color vector that is increasingly convergent on the target color vector. The chromatic attractor function is described in greater detail below in FIG. 10-4B.

In alternative embodiments, pixel-level correction factors comprise a set of line equation parameters per color channel, with color components of strobePixel comprising function inputs for each line equation. In such embodiments, pixel-level correction function 10-510 evaluates the line equation parameters to generate color corrected strobe pixel 10-512. This evaluation process is illustrated in the pseudo-code of Table 10-9.

TABLE 10-9

```
// evaluate line equation based on strobePixel for red, green, blue
vec3 pixSlope = (pixSlope.r, pixSlope.g, pixSlope.b);
vec3 pixOffset = (pixOffset.r, pixOffset.g, pixOffset.b);
vec3 deNormCorrectedPixel = (strobePixel * pixSlope) + pixOffset;
normalizeFactor = length(strobePixel) / length(deNormCorrectedPixel);
vec3 normCorrectedPixel = deNormCorrectedPixel * normalizeFactor;
vec3 correctedPixel = cAttractor(normCorrectedPixel);
```

In other embodiments, pixel level correction factors comprise a set of quadratic parameters per color channel, with color components of strobePixel comprising function inputs for each quadratic equation. In such embodiments, pixel-level correction function 10-510 evaluates the quadratic equation parameters to generate color corrected strobe pixel 10-512.

In certain embodiments chromatic attractor function (cAttractor) implements a target color vector of white (1, 1, 1), and causes very bright pixels to converge to white, providing a natural appearance to bright portions of an image. In other embodiments, a target color vector is computed based on spatial color information, such as an average color for a region of pixels surrounding the strobe pixel. In still other embodiments, a target color vector is computed based on an average frame-level color. A threshold length associated with the chromatic attractor function may be defined as a constant, or, without limitation, by a user input, a characteristic of a strobe image or an ambient image or a combination thereof. In an alternative embodiment, pixel-level correction function 10-510 does not implement the chromatic attractor function.

In one embodiment, a trust level is computed for each patch-level correction and applied to generate an adjusted patch-level correction factor comprising sampled patch-level correction factors 10-505. Generating the adjusted patch-level correction may be performed according to the techniques taught herein for generating adjusted frame-level correction factors 10-507.

Other embodiments include two or more levels of spatial color correction for a strobe image based on an ambient image, where each level of spatial color correction may contribute a non-zero weight to a color corrected strobe image comprising one or more color corrected strobe pixels. Such embodiments may include patches of varying size comprising varying shapes of pixel regions without departing the scope of the present invention.

FIG. 10-4B illustrates a chromatic attractor function 10-560, according to one embodiment of the present invention. A color vector space is shown having a red axis 10-562, a green axis 10-564, and a blue axis 10-566. A unit cube 10-570 is bounded by an origin at coordinate (0, 0, 0) and an opposite corner at coordinate (1, 1, 1). A surface 10-572 having a threshold distance from the origin is defined within the unit cube. Color vectors having a length that is shorter than the threshold distance are conserved by the chromatic attractor function 10-560. Color vectors having a length that is longer than the threshold distance are converged towards a target color. For example, an input color vector 10-580 is defined along a particular path that describes the color of the input color vector 10-580, and a length that describes the intensity of the color vector. The distance from the origin to point 10-582 along input color vector 10-580 is equal to the threshold distance. In this example, the target color is pure white (1, 1, 1), therefore any additional length associated with input color vector 10-580 beyond point 10-582 follows path 10-584 towards the target color of pure white.

One implementation of chromatic attractor function 10-560, comprising the cAttractor function of Tables 10-8 and 10-9 is illustrated in the pseudo-code of Table 10-10.

TABLE 10-10

```
extraLength = max(length (inputColor), distMin) ;
mixValue= (extraLength − distMin) / (distMax− distMin);
outputColor = mix (inputColor, targetColor, mixValue);
```

Here, a length value associated with inputColor is compared to distMin, which represents the threshold distance. If the length value is less than distMin, then the “max” operator returns distMin. The mixValue term calculates a parameterization from 0.0 to 1.0 that corresponds to a length value ranging from the threshold distance to a maximum possible length for the color vector, given by the square root of 3.0. If extraLength is equal to distMin, then mixValue is set equal to 0.0 and outputColor is set equal to the inputColor by the mix operator. Otherwise, if the length value is greater than distMin, then mixValue represents the parameterization, enabling the mix operator to appropriately converge inputColor to targetColor as the length of inputColor approaches the square root of 3.0. In one embodiment, distMax is equal to the square root of 3.0 and distMin=1.45. In other embodiments different values may be used for distMax and distMin. For example, if distMin=1.0, then chromatic attractor 10-560 begins to converge to targetColor much sooner, and at lower intensities. If distMax is set to a larger number, then an inputPixel may only partially converge on targetColor, even when inputPixel has a very high intensity. Either of these two effects may be beneficial in certain applications.

While the pseudo-code of Table 10-10 specifies a length function, in other embodiments, computations may be performed in length-squared space using constant squared values with comparable results.

In one embodiment, targetColor is equal to (1,1,1), which represents pure white and is an appropriate color to “burn” to in overexposed regions of an image rather than a color dictated solely by color correction. In another embodiment, targetColor is set to a scene average color, which may be arbitrary. In yet another embodiment, targetColor is set to a color determined to be the color of an illumination source within a given scene.

Figures 5, 10:
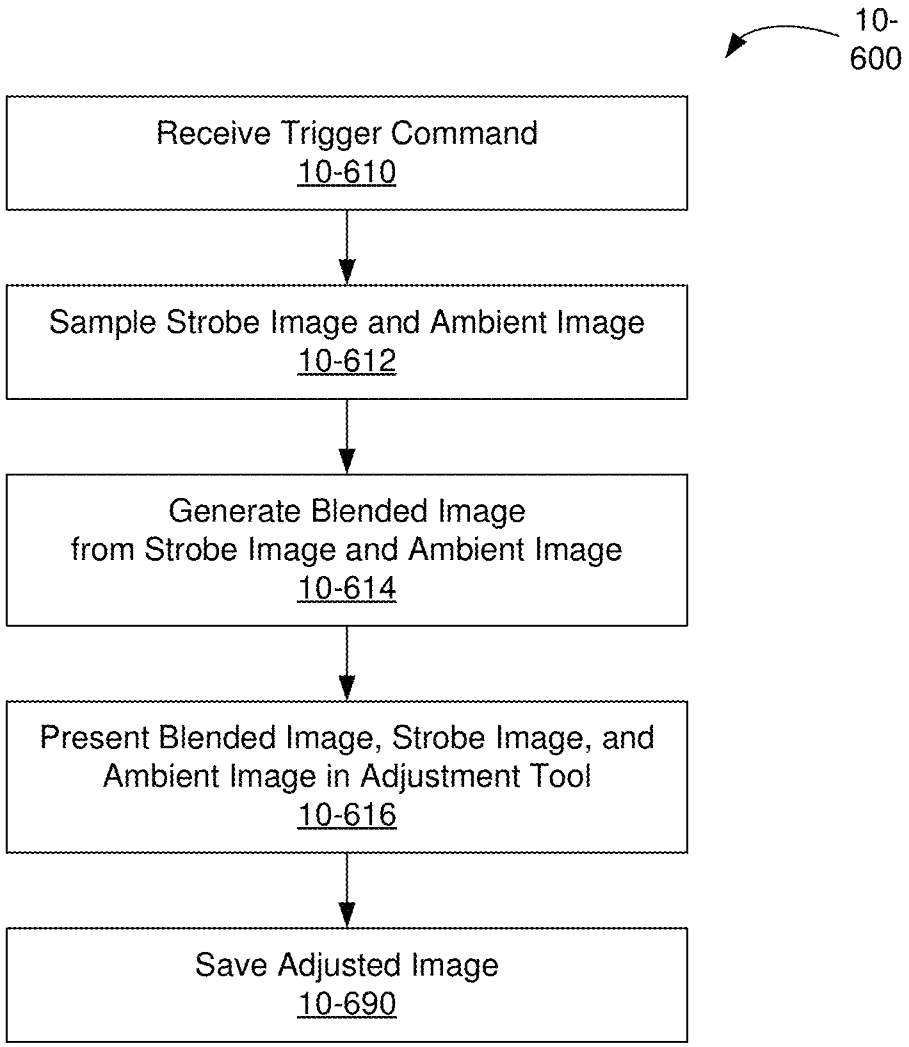
Figures 6A, 10:
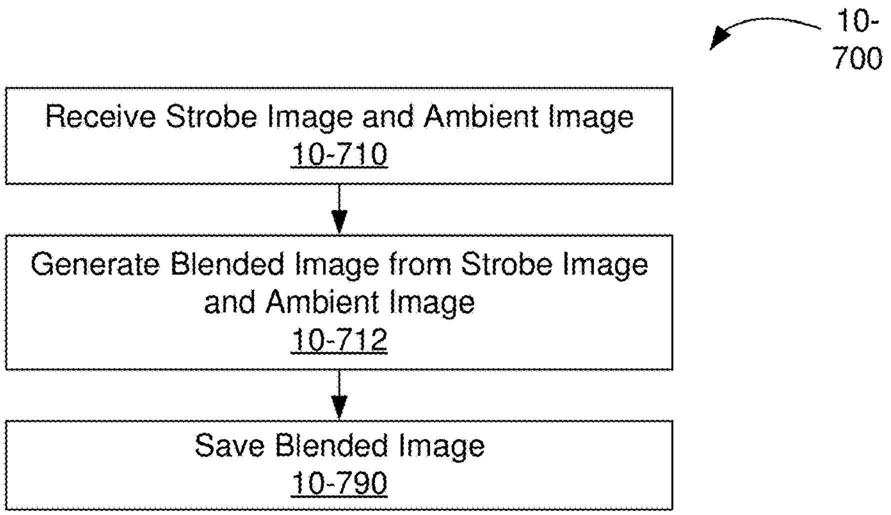
Figures 6B, 10:
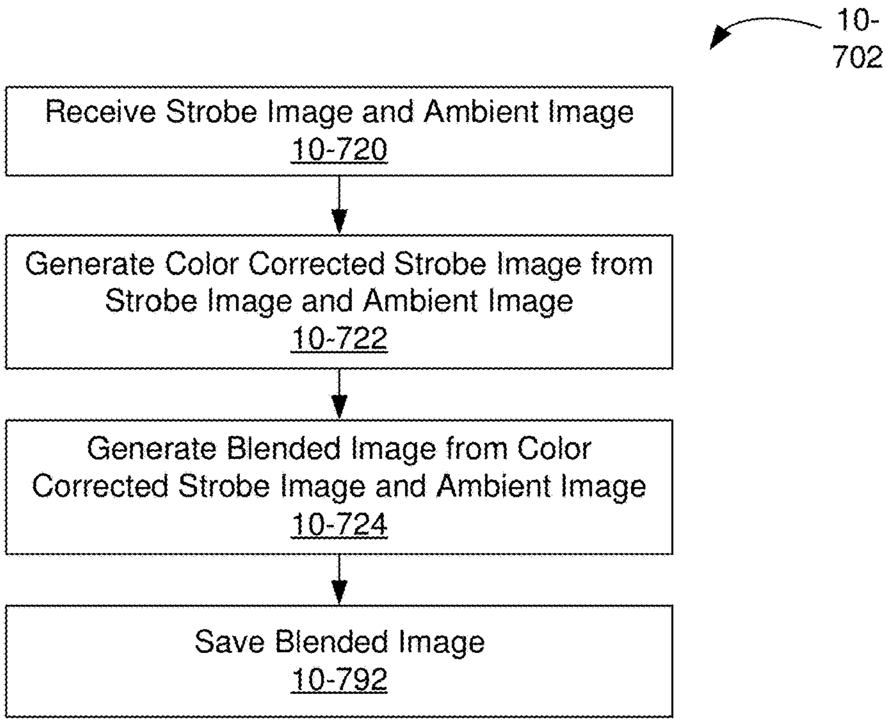
Figures 7A, 10:
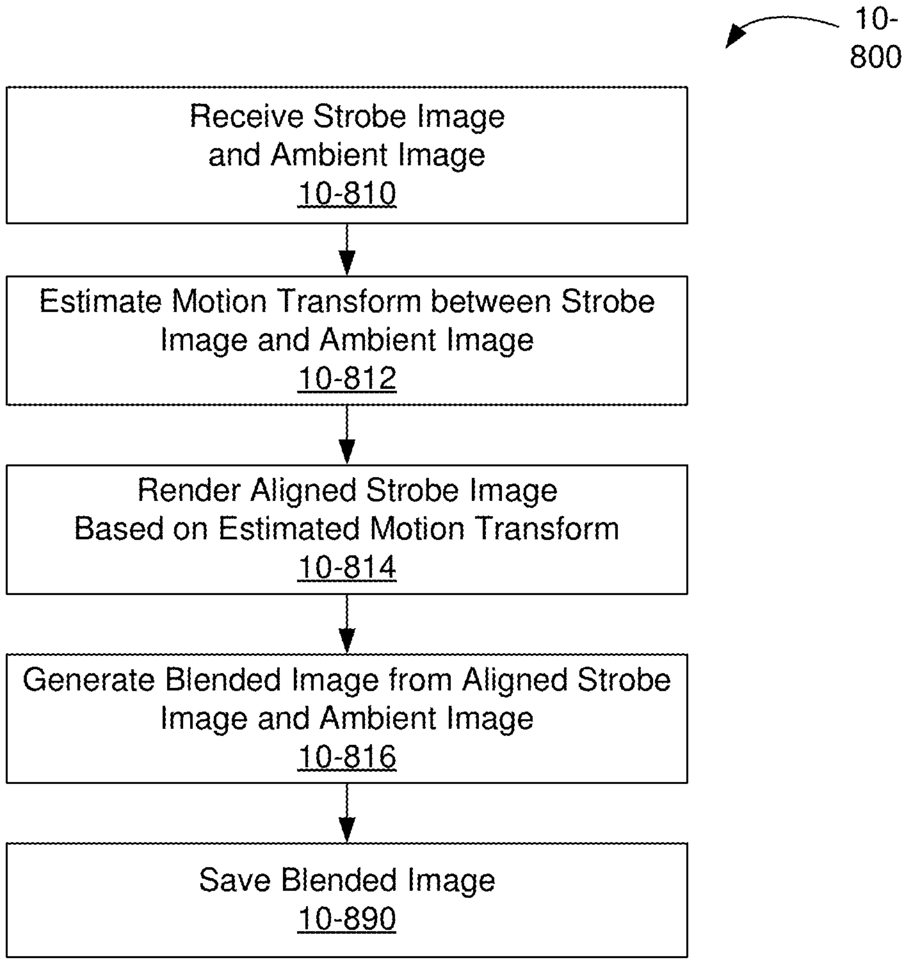
Figures 7B, 10:
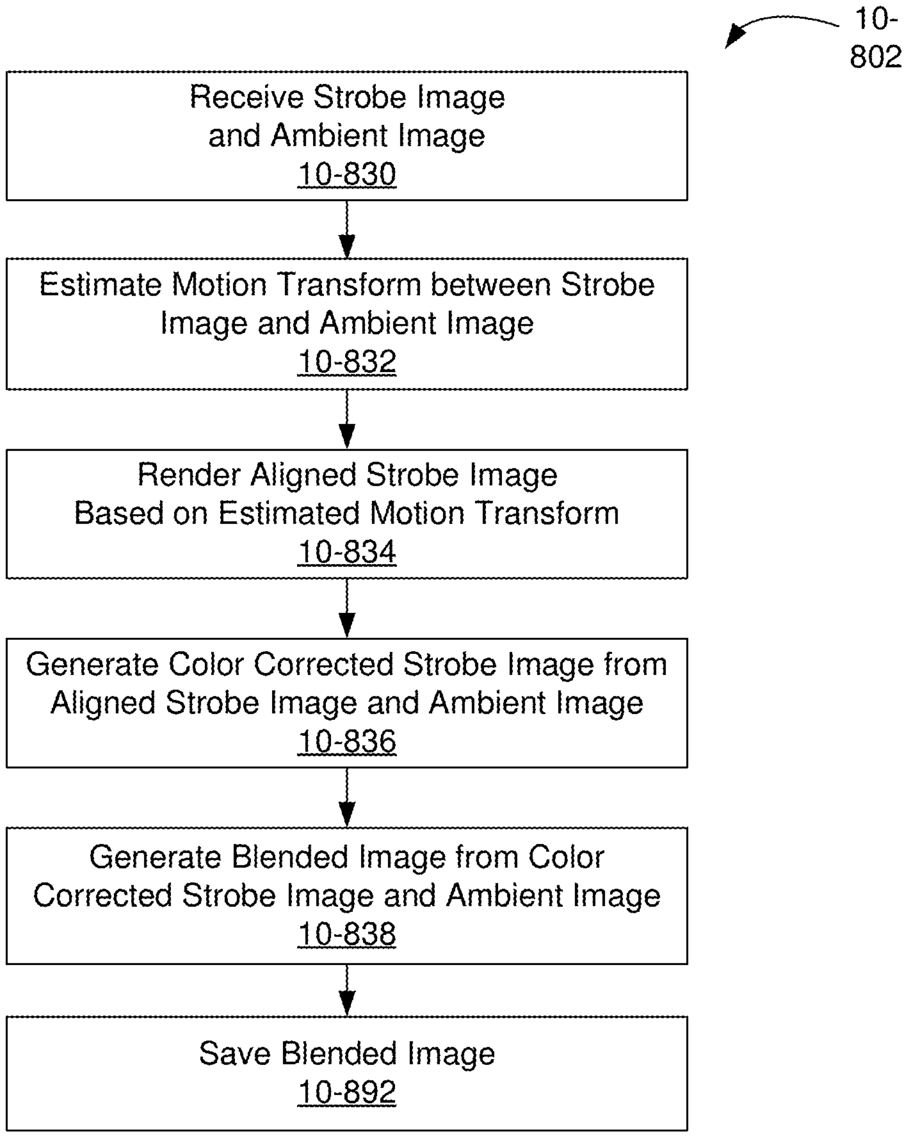

FIG. 10-5 is a flow diagram of method 10-500 for generating an adjusted digital photograph, according to one embodiment of the present invention. Although the method steps are described in conjunction with the systems disclosed herein, persons skilled in the art will understand that any system configured to perform the method steps, in any order, is within the scope of the present invention.

Method 10-500 begins in step 10-510, where a digital photographic system, such as digital photographic system 300 of FIG. 3A, receives a trigger command to take a digital photograph. The trigger command may comprise a user input event, such as a button press, remote control command related to a button press, completion of a timer count down, an audio indication, or any other technically feasible user input event. In one embodiment, the digital photographic system implements digital camera 302 of FIG. 3C, and the trigger command is generated when shutter release button 315 is pressed. In another embodiment, the digital photographic system implements mobile device 376 of FIG. 3D, and the trigger command is generated when a UI button is pressed.

In step 10-512, the digital photographic system samples a strobe image and an ambient image. In one embodiment, the strobe image is taken before the ambient image. Alternatively, the ambient image is taken before the strobe image. In certain embodiments, a white balance operation is performed on the ambient image. Independently, a white balance operation may be performed on the strobe image. In other embodiments, such as in scenarios involving raw digital photographs, no white balance operation is applied to either the ambient image or the strobe image.

In step 10-514, the digital photographic system generates a blended image from the strobe image and the ambient image. In one embodiment, the digital photographic system generates the blended image according to data flow process 10-200 of FIG. 10-1A. In a second embodiment, the digital photographic system generates the blended image according to data flow process 10-202 of FIG. 10-1B. In a third embodiment, the digital photographic system generates the blended image according to data flow process 10-204 of FIG. 10-1C. In a fourth embodiment, the digital photographic system generates the blended image according to data flow process 10-206 of FIG. 10-1D. In each of these embodiments, the strobe image comprises strobe image 10-210, the ambient image comprises ambient image 10-220, and the blended image comprises blended image 10-280.

In step 10-516, the digital photographic system presents an adjustment tool configured to present at least the blended image, the strobe image, and the ambient image, according to a transparency blend among two or more of the images. The transparency blend may be controlled by a user interface slider. The adjustment tool may be configured to save a particular blend state of the images as an adjusted image. The adjustment tool is described in greater detail hereinabove.

The method terminates in step 10-590, where the digital photographic system saves at least the adjusted image.

FIG. 10-6A is a flow diagram of method 10-700 for blending a strobe image with an ambient image to generate a blended image, according to a first embodiment of the present invention. Although the method steps are described in conjunction with the systems of FIGS. 3A-3D, persons skilled in the art will understand that any system configured to perform the method steps, in any order, is within the scope of the present invention. In one embodiment, method 10-700 implements data flow 10-200 of FIG. 10-1A. The strobe image and the ambient image each comprise at least one pixel and may each comprise an equal number of pixels.

The method begins in step 10-710, where a processor complex within a digital photographic system, such as processor complex 310 within digital photographic system 300 of FIG. 3A, receives a strobe image and an ambient image, such as strobe image 10-210 and ambient image 10-220, respectively. In step 10-712, the processor complex generates a blended image, such as blended image 10-280, by executing a blend operation 10-270 on the strobe image and the ambient image. The method terminates in step 10-790, where the processor complex saves the blended image, for example to NV memory 316, volatile memory 318, or memory system 362.

FIG. 10-6B is a flow diagram of method 10-702 for blending a strobe image with an ambient image to generate a blended image, according to a second embodiment of the present invention. Although the method steps are described in conjunction with the systems of FIGS. 3A-3D, persons skilled in the art will understand that any system configured to perform the method steps, in any order, is within the scope of the present invention. In one embodiment, method 10-702 implements data flow 10-202 of FIG. 10-1B. The strobe image and the ambient image each comprise at least one pixel and may each comprise an equal number of pixels.

The method begins in step 10-720, where a processor complex within a digital photographic system, such as processor complex 310 within digital photographic system 300 of FIG. 3A, receives a strobe image and an ambient image, such as strobe image 10-210 and ambient image 10-220, respectively. In step 10-722, the processor complex generates a color corrected strobe image, such as corrected strobe image data 10-252, by executing a frame analysis operation 10-240 on the strobe image and the ambient image and executing and a color correction operation 10-250 on the strobe image. In step 10-724, the processor complex generates a blended image, such as blended image 10-280, by executing a blend operation 10-270 on the color corrected strobe image and the ambient image. The method terminates in step 10-792, where the processor complex saves the blended image, for example to NV memory 316, volatile memory 318, or memory system 362.

FIG. 10-7A is a flow diagram of method 10-800 for blending a strobe image with an ambient image to generate a blended image, according to a third embodiment of the present invention. Although the method steps are described in conjunction with the systems of FIGS. 3A-3D, persons skilled in the art will understand that any system configured to perform the method steps, in any order, is within the scope of the present invention. In one embodiment, method 10-800 implements data flow 10-204 of FIG. 10-1C. The strobe image and the ambient image each comprise at least one pixel and may each comprise an equal number of pixels.

The method begins in step 10-810, where a processor complex within a digital photographic system, such as processor complex 310 within digital photographic system 300 of FIG. 3A, receives a strobe image and an ambient image, such as strobe image 10-210 and ambient image 10-220, respectively. In step 10-812, the processor complex estimates a motion transform between the strobe image and the ambient image. In step 10-814, the processor complex renders at least an aligned strobe image or an aligned ambient image based the estimated motion transform. In certain embodiments, the processor complex renders both the aligned strobe image and the aligned ambient image based on the motion transform. The aligned strobe image and the aligned ambient image may be rendered to the same resolution so that each is aligned to the other. In one embodiment, steps 10-812 and 814 together comprise alignment operation 10-230. In step 10-816, the processor complex generates a blended image, such as blended image 10-280, by executing a blend operation 10-270 on the aligned strobe image and the aligned ambient image. The method terminates in step 10-890, where the processor complex saves the blended image, for example to NV memory 316, volatile memory 318, or memory system 362.

FIG. 10-7B is a flow diagram of method steps for blending a strobe image with an ambient image to generate a blended image, according to a fourth embodiment of the present invention. Although the method steps are described in conjunction with the systems of FIGS. 3A-3D, persons skilled in the art will understand that any system configured to perform the method steps, in any order, is within the scope of the present invention. In one embodiment, method 10-802 implements data flow 10-206 of FIG. 10-1D. The strobe image and the ambient image each comprise at least one pixel and may each comprise an equal number of pixels.

The method begins in step 10-830, where a processor complex within a digital photographic system, such as processor complex 310 within digital photographic system 300 of FIG. 3A, receives a strobe image and an ambient image, such as strobe image 10-10 and ambient image 10-220, respectively. In step 10-832, the processor complex estimates a motion transform between the strobe image and the ambient image. In step 10-834, the processor complex may render at least an aligned strobe image or an aligned ambient image based the estimated motion transform. In certain embodiments, the processor complex renders both the aligned strobe image and the aligned ambient image based on the motion transform. The aligned strobe image and the aligned ambient image may be rendered to the same resolution so that each is aligned to the other. In one embodiment, steps 10-832 and 834 together comprise alignment operation 10-230.

In step 10-836, the processor complex generates a color corrected strobe image, such as corrected strobe image data 10-252, by executing a frame analysis operation 10-240 on the aligned strobe image and the aligned ambient image and executing a color correction operation 10-250 on the aligned strobe image. In step 10-838, the processor complex generates a blended image, such as blended image 10-280, by executing a blend operation 10-270 on the color corrected strobe image and the aligned ambient image. The method terminates in step 10-892, where the processor complex saves the blended image, for example to NV memory 316, volatile memory 318, or memory system 362.

While the techniques taught herein are discussed above in the context of generating a digital photograph having a natural appearance from an underlying strobe image and ambient image with potentially discordant color, these techniques may be applied in other usage models as well.

For example, when compositing individual images to form a panoramic image, color inconsistency between two adjacent images can create a visible seam, which detracts from overall image quality. Persons skilled in the art will recognize that frame analysis operation 10-240 may be used in conjunction with color correction operation 10-250 to generated panoramic images with color-consistent seams, which serve to improve overall image quality. In another example, frame analysis operation 10-240 may be used in conjunction with color correction operation 10-250 to improve color consistency within high dynamic range (HDR) images.

In yet another example, multispectral imaging may be improved by enabling the addition of a strobe illuminator, while maintaining spectral consistency. Multispectral imaging refers to imaging of multiple, arbitrary wavelength ranges, rather than just conventional red, green, and blue ranges. By applying the above techniques, a multispectral image may be generated by blending two or more multispectral images having different illumination sources.

In still other examples, the techniques taught herein may be applied in an apparatus that is separate from digital photographic system 10-100 of FIG. 10-1A. Here, digital photographic system 10-100 may be used to generate and store a strobe image and an ambient image. The strobe image and ambient image are then combined later within a computer system, disposed locally with a user, or remotely within a cloud-based computer system. In one embodiment, method 10-802 comprises a software module operable with an image processing tool to enable a user to read the strobe image and the ambient image previously stored, and to generate a blended image within a computer system that is distinct from digital photographic system 10-100.

Persons skilled in the art will recognize that while certain intermediate image data may be discussed in terms of a particular image or image data, these images serve as illustrative abstractions. Such buffers may be allocated in certain implementations, while in other implementations intermediate data is only stored as needed. For example, aligned strobe image 10-232 may be rendered to completion in an allocated image buffer during a certain processing step or steps, or alternatively, pixels associated with an abstraction of an aligned image may be rendered as needed without a need to allocate an image buffer to store aligned strobe image 10-232.

While the techniques described above discuss color correction operation 10-250 in conjunction with a strobe image that is being corrected to an ambient reference image, a strobe image may serve as a reference image for correcting an ambient image. In one embodiment ambient image 10-220 is subjected to color correction operation 10-250, and blend operation 10-270 operates as previously discussed for blending an ambient image and a strobe image.

In summary, a technique is disclosed for generating a digital photograph that beneficially blends an ambient image sampled under ambient lighting conditions and a strobe image sampled under strobe lighting conditions. The strobe image is blended with the ambient image based on a function that implements a blend surface. Discordant spatial coloration between the strobe image and the ambient image is corrected via a spatial color correction operation. An adjustment tool implements a user interface technique that enables a user to select and save a digital photograph from a gradation of parameters for combining related images.

On advantage of the present invention is that a digital photograph may be generated having consistent white balance in a scene comprising regions illuminated primarily by a strobe of one color balance and other regions illuminated primarily by ambient illumination of a different color balance.

Figures 1, 11:
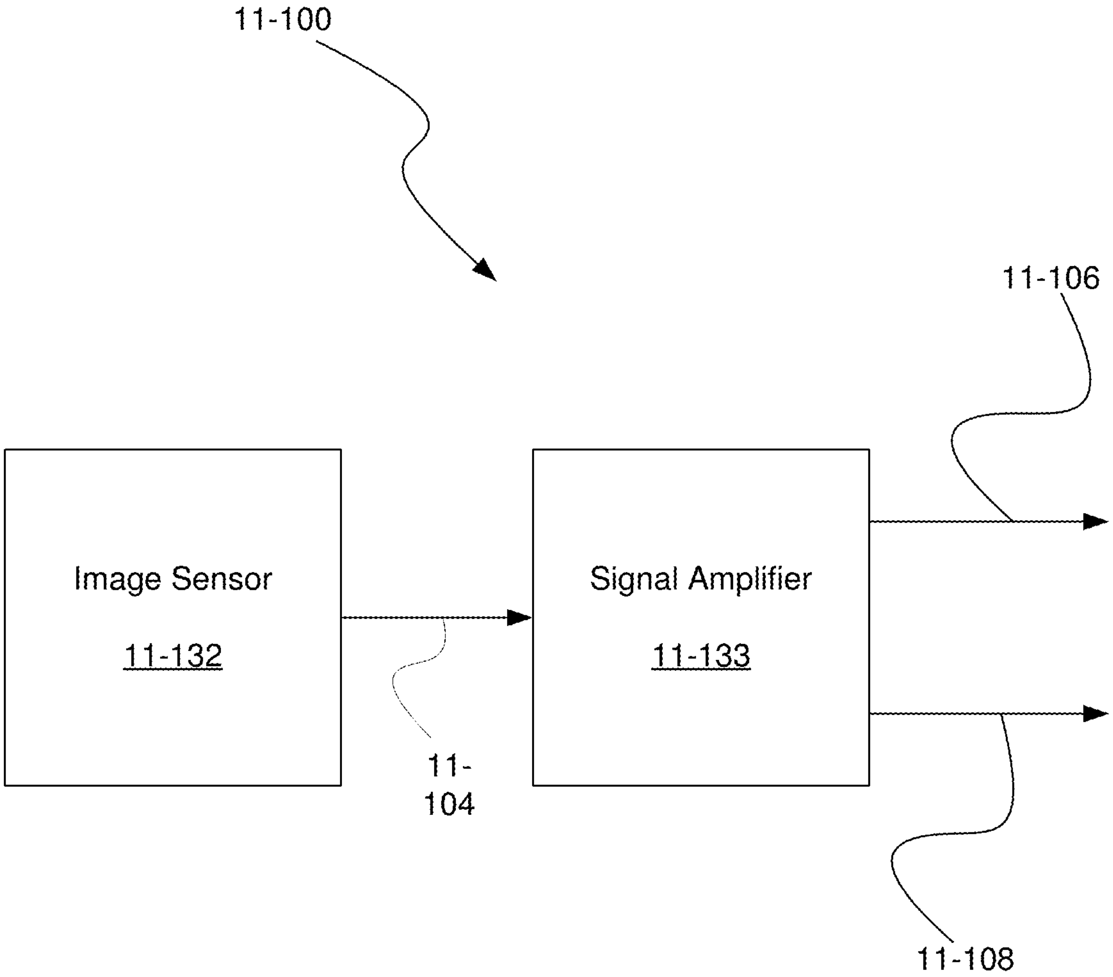
Figures 2, 11:
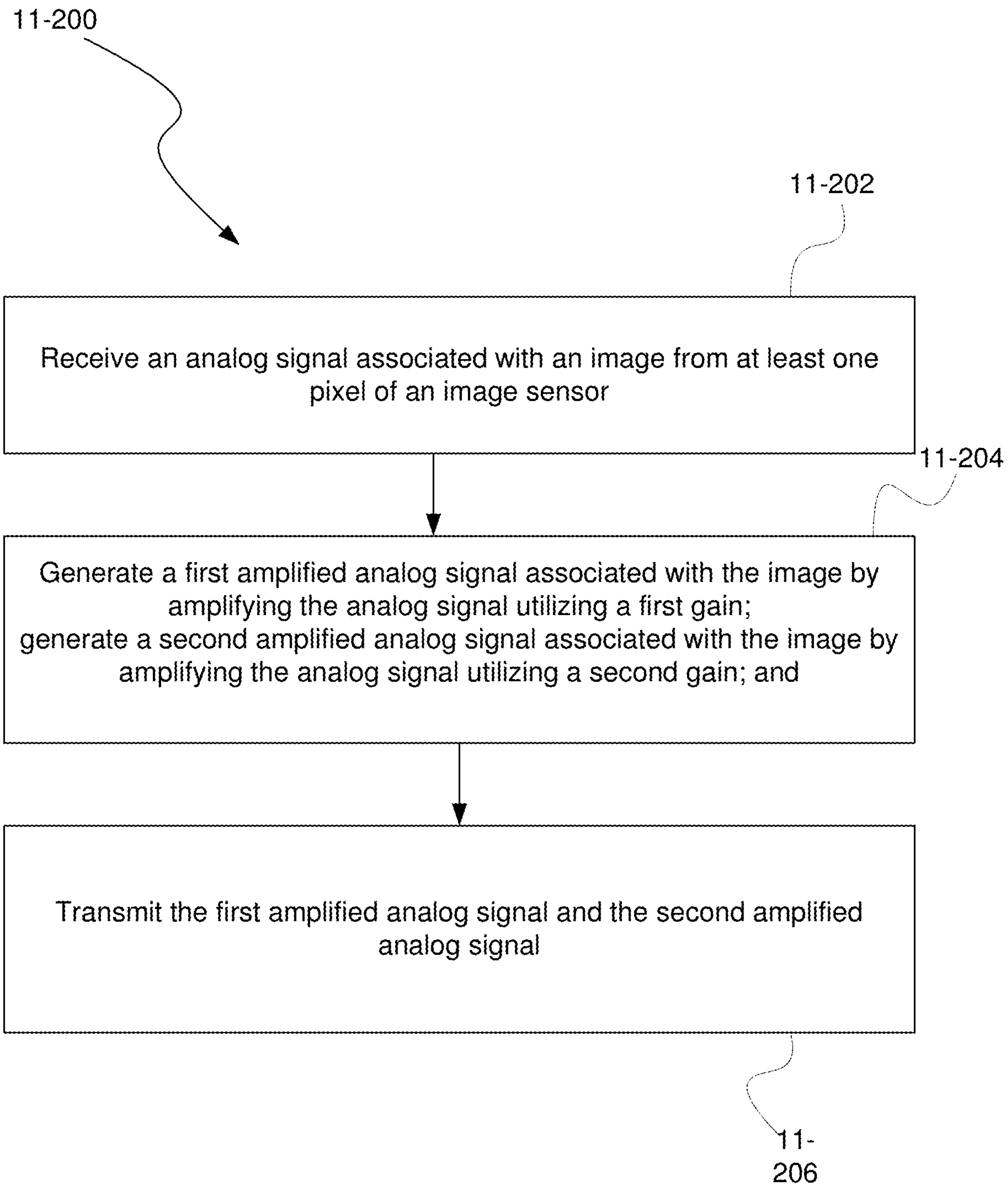
Figures 3A, 11:
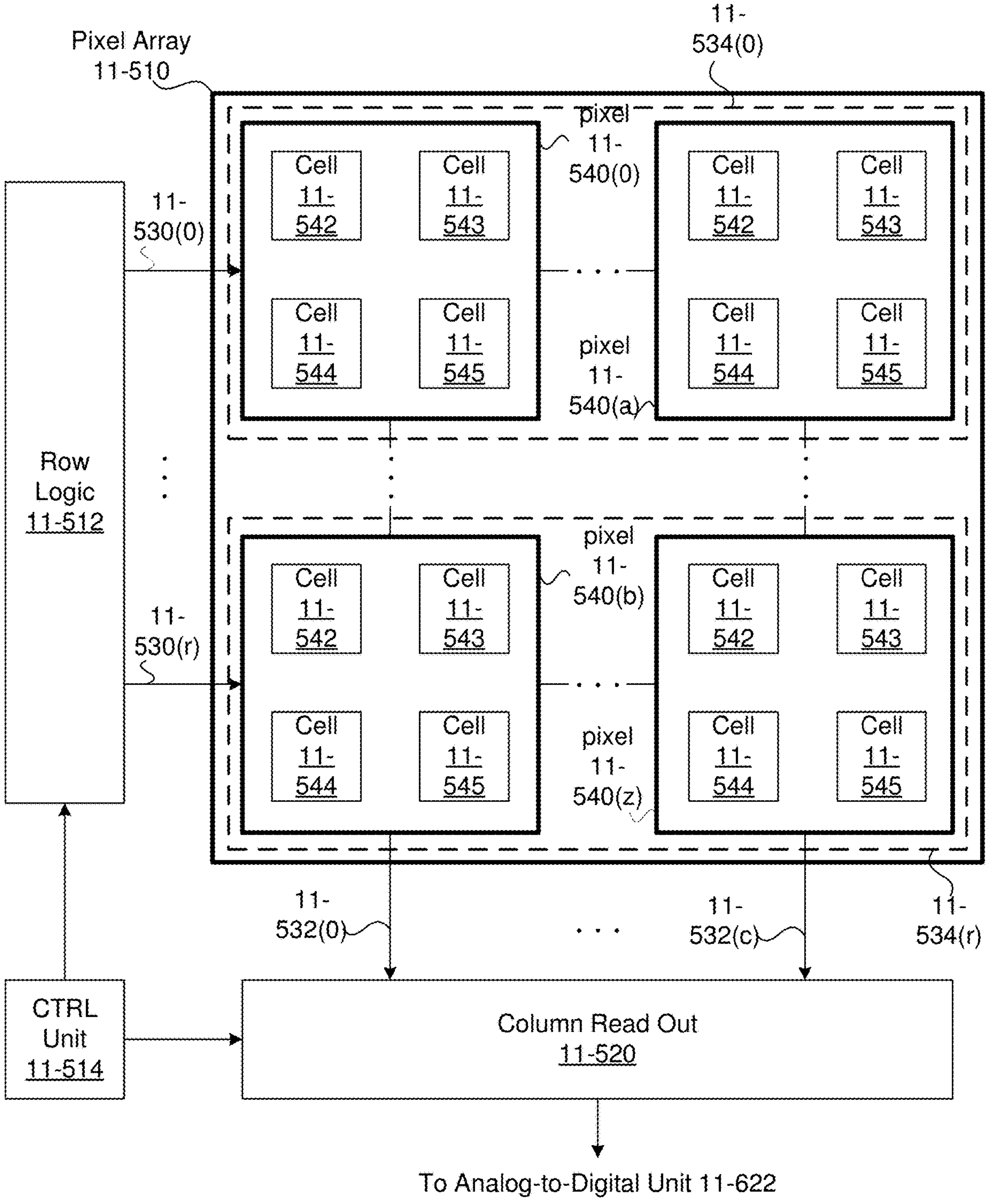
Figures 3B, 11:
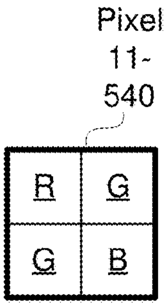
Figures 3C, 11:
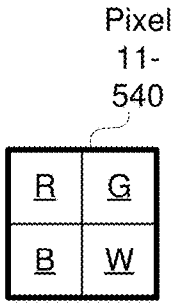
Figures 3D, 11:
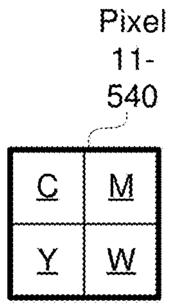
Figures 3E, 11:
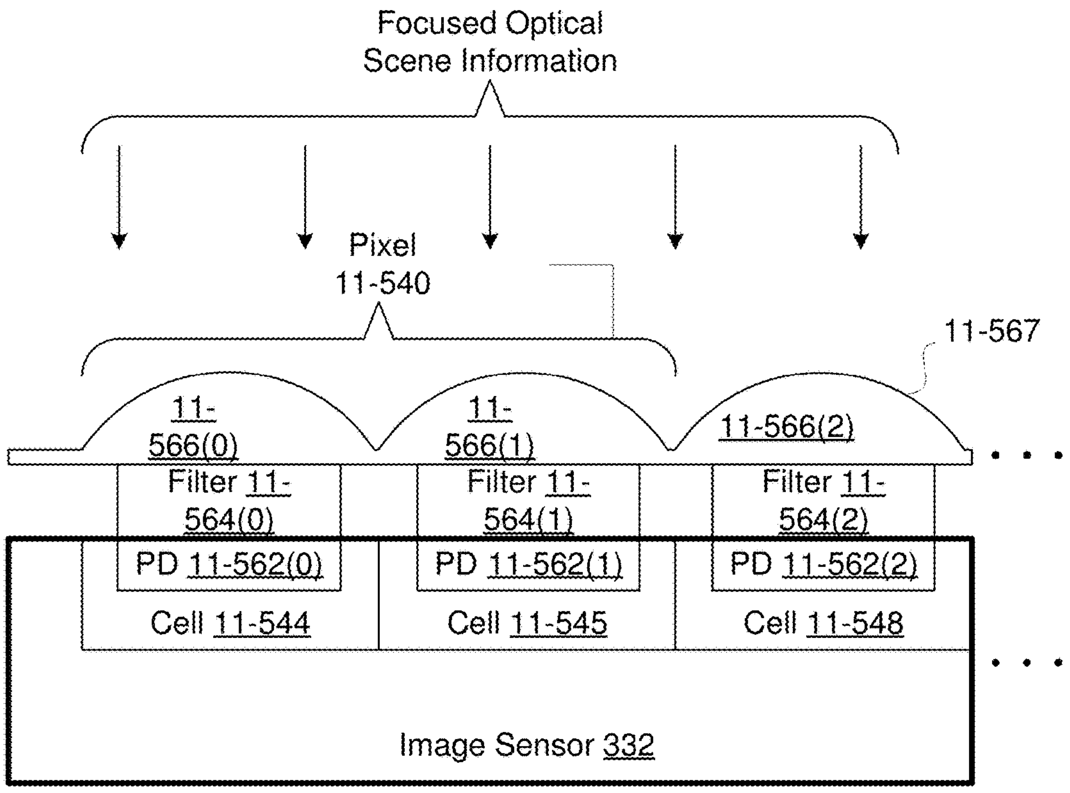
Figures 4, 11:
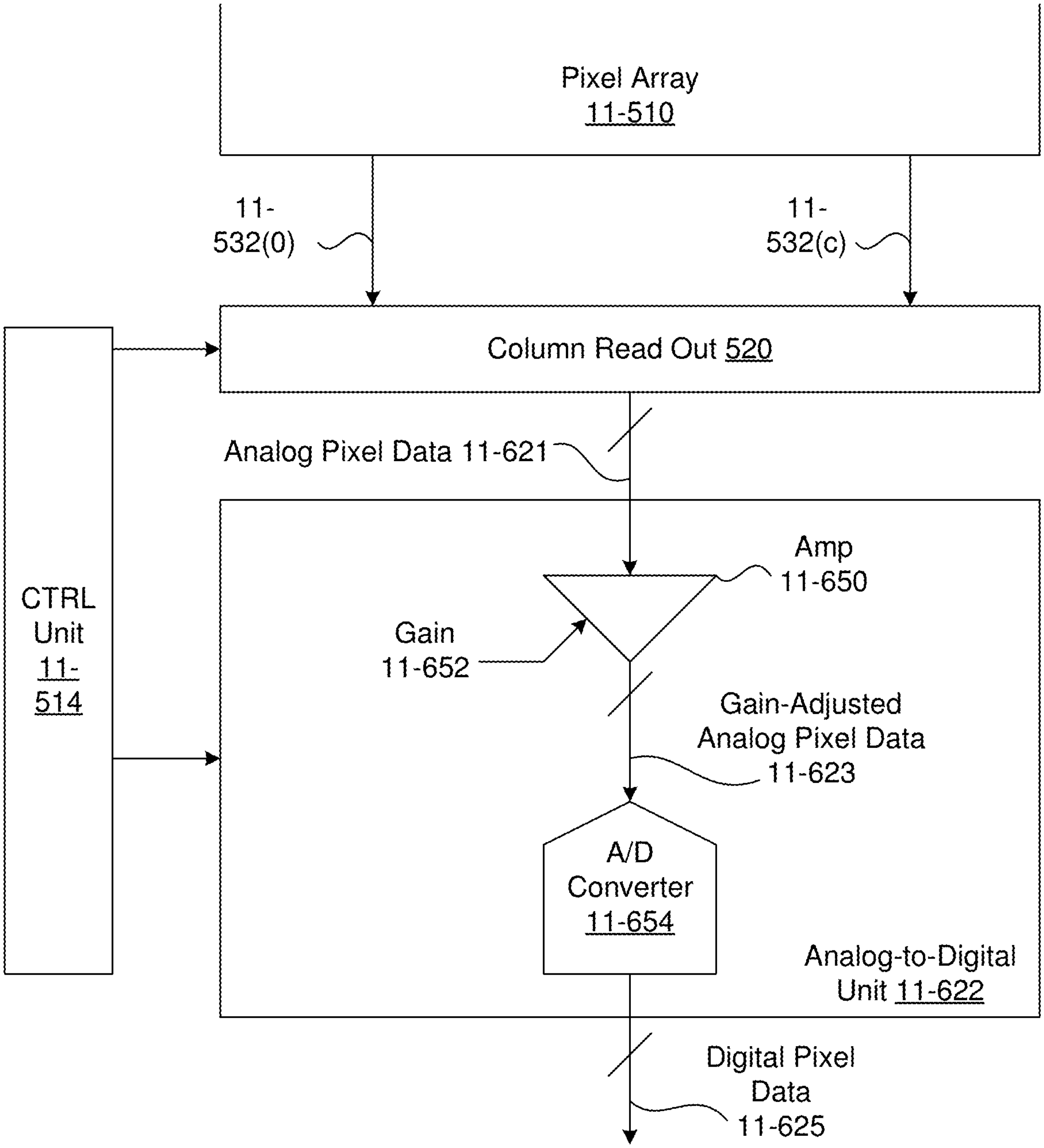
Figures 5, 11:
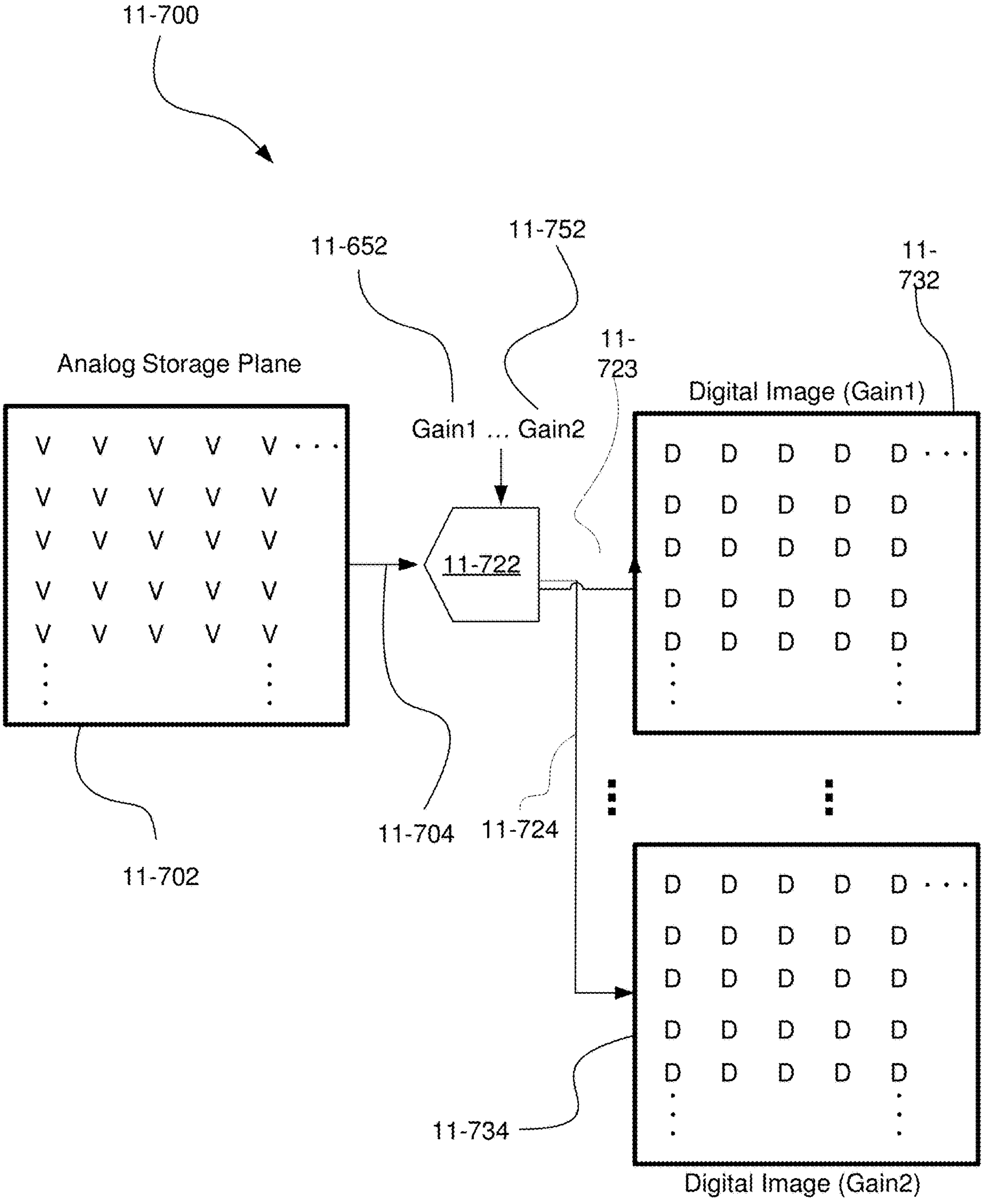

FIG. 11-1 illustrates a system 11-100 for obtaining multiple exposures with zero interframe time, in accordance with one possible embodiment. As an option, the system 11-100 may be implemented in the context of any of the Figures disclosed herein. Of course, however, the system 11-100 may be implemented in any desired environment. Further, the aforementioned definitions may equally apply to the description below.

As shown, a signal amplifier 11-133 receives an analog signal 11-104 from an image sensor 11-132. In response to receiving the analog signal 11-104, the signal amplifier 11-133 amplifies the analog signal 11-104 utilizing a first gain, and transmits a first amplified analog signal 11-106. Further, in response to receiving the analog signal 11-104, the signal amplifier 11-133 also amplifies the analog signal 11-104 utilizing a second gain, and transmits a second amplified analog signal 11-108.

In one specific embodiment, the analog signal 11-106 and the analog signal 11-108 are transmitted on a common electrical interconnect. In alternative embodiments, the analog signal 11-106 and the analog signal 11-108 are transmitted on different electrical interconnects.

In one embodiment, the analog signal 11-104 generated by image sensor 11-132 includes an electronic representation of an optical image that has been focused on the image sensor 11-132. In such an embodiment, the optical image may be focused on the image sensor 11-132 by a lens. The electronic representation of the optical image may comprise spatial color intensity information, which may include different color intensity samples (e.g. red, green, and blue light, etc.). In other embodiments, the spatial color intensity information may also include samples for white light. In one embodiment, the optical image may be an optical image of a photographic scene.

In one embodiment, the image sensor 11-132 may comprise a complementary metal oxide semiconductor (CMOS) image sensor, or charge-coupled device (CCD) image sensor, or any other technically feasible form of image sensor.

In an embodiment, the signal amplifier 11-133 may include a transimpedance amplifier (TIA), which may be dynamically configured, such as by digital gain values, to provide a selected gain to the analog signal 11-104. For example, a TIA could be configured to apply a first gain to the analog signal. The same TIA could then be configured to subsequently apply a second gain to the analog signal. In other embodiments, the gain may be specified to the signal amplifier 11-133 as a digital value. Further, the specified gain value may be based on a specified sensitivity or ISO. The specified sensitivity may be specified by a user of a photographic system, or instead may be set by software or hardware of the photographic system, or some combination of the foregoing working in concert.

In one embodiment, the signal amplifier 11-133 includes a single amplifier. In such an embodiment, the amplified analog signals 11-106 and 11-108 are transmitted or output in sequence. For example, in one embodiment, the output may occur through a common electrical interconnect. For example, the amplified analog signal 11-106 may first be transmitted, and then the amplified analog signal 11-108 may subsequently be transmitted. In another embodiment, the signal amplifier 11-133 may include a plurality of amplifiers. In such an embodiment, the amplifier 11-133 may transmit the amplified analog signal 11-106 in parallel with the amplified analog signal 11-108. To this end, the analog signal 11-106 may be amplified utilizing the first gain in serial with the amplification of the analog signal 11-108 utilizing the second gain, or the analog signal 11-106 may be amplified utilizing the first gain in parallel with the amplification of the analog signal 11-108 utilizing the second gain. In one embodiment, the amplified analog signals 11-106 and 11-108 each include gain-adjusted analog pixel data.

Each instance of gain-adjusted analog pixel data may be converted to digital pixel data by subsequent processes and/or hardware. For example, the amplified analog signal 11-106 may subsequently be converted to a first digital signal comprising a first set of digital pixel data representative of the optical image that has been focused on the image sensor 11-132. Further, the amplified analog signal 11-108 may subsequently or concurrently be converted to a second digital signal comprising a second set of digital pixel data representative of the optical image that has been focused on the image sensor 11-132. In one embodiment, any differences between the first set of digital pixel data and the second set of digital pixel data are a function of a difference between the first gain and the second gain applied by the signal amplifier 11-133. Further, each set of digital pixel data may include a digital image of the photographic scene. Thus, the amplified analog signals 11-106 and 11-108 may be used to generate two different digital images of the photographic scene. Furthermore, in one embodiment, each of the two different digital images may represent a different exposure level.

FIG. 11-2 illustrates a method 11-200 for obtaining multiple exposures with zero interframe time, in accordance with one embodiment. As an option, the method 11-200 may be carried out in the context of any of the Figures disclosed herein. Of course, however, the method 11-200 may be carried out in any desired environment. Further, the aforementioned definitions may equally apply to the description below.

As shown in operation 11-202, an analog signal associated with an image is received from at least one pixel of an image sensor. In the context of the present embodiment, the analog signal may include analog pixel data for at least one pixel of an image sensor. In one embodiment, the analog signal may include analog pixel data for every pixel of an image sensor. In another embodiment, each pixel of an image sensor may include a plurality of photodiodes. In such an embodiment, the analog pixel data received in the analog signal may include an analog value for each photodiode of each pixel of the image sensor. Each analog value may be representative of a light intensity measured at the photodiode associated with the analog value. Accordingly, an analog signal may be a set of spatially discrete intensity samples, each represented by continuous analog values, and analog pixel data may be analog signal values associated with one or more given pixels.

Additionally, as shown in operation 11-204, a first amplified analog signal associated with the image is generated by amplifying the analog signal utilizing a first gain, and a second amplified analog signal associated with the image is generated by amplifying the analog signal utilizing a second gain. Accordingly, the analog signal is amplified utilizing both the first gain and the second gain, resulting in the first amplified analog signal and the second amplified analog signal, respectively. In one embodiment, the first amplified analog signal may include first gain-adjusted analog pixel data. In such an embodiment, the second amplified analog signal may include second gain-adjusted analog pixel data. In accordance with one embodiment, the analog signal may be amplified utilizing the first gain simultaneously with the amplification of the analog signal utilizing the second gain. In another embodiment, the analog signal may be amplified utilizing the first gain during a period of time other than when the analog signal is amplified utilizing the second gain. For example, the first gain and the second gain may be applied to the analog signal in sequence. In one embodiment, a sequence for applying the gains to the analog signal may be predetermined.

Further, as shown in operation 11-206, the first amplified analog signal and the second amplified analog signal are both transmitted, such that multiple amplified analog signals are transmitted based on the analog signal associated with the image. In the context of one embodiment, the first amplified analog signal and the second amplified analog signal are transmitted in sequence. For example, the first amplified analog signal may be transmitted prior to the second amplified analog signal. In another embodiment, the first amplified analog signal and the second amplified signal may be transmitted in parallel.

The embodiments disclosed herein advantageously enable a camera module to sample images comprising an image stack with lower (e.g. at or near zero, etc.) inter-sample time (e.g. interframe, etc.) than conventional techniques. In certain embodiments, images comprising the image stack are effectively sampled during overlapping time intervals, which may reduce inter-sample time to zero. In other embodiments, the camera module may sample images in coordination with the strobe unit to reduce inter-sample time between an image sampled without strobe illumination and an image sampled with strobe illumination.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

FIG. 11-3A illustrates a system for capturing optical scene information for conversion to an electronic representation of a photographic scene, in accordance with one embodiment. As an option, the system of FIG. 11-3A may be implemented in the context of the details of any of the Figures.

As shown in FIG. 11-3A, a pixel array 11-510 is in communication with row logic 11-512 and a column read out circuit 11-520. Further, the row logic 11-512 and the column read out circuit 11-520 are both in communication with a control unit 11-514. Still further, the pixel array 11-510 is shown to include a plurality of pixels 11-540, where each pixel 11-540 may include four cells, cells 11-542-11-545. In the context of the present description, the pixel array 11-510 may be included in an image sensor, such as image sensor 132 or image sensor 332 of camera module 330.

As shown, the pixel array 11-510 includes a 2-dimensional array of the pixels 11-540. For example, in one embodiment, the pixel array 11-510 may be built to comprise 4,000 pixels 11-540 in a first dimension, and 3,000 pixels 11-540 in a second dimension, for a total of 12,000,000 pixels 11-540 in the pixel array 11-510, which may be referred to as a 12 megapixel pixel array. Further, as noted above, each pixel 11-540 is shown to include four cells 11-542-11-545. In one embodiment, cell 11-542 may be associated with (e.g. selectively sensitive to, etc.) a first color of light, cell 11-543 may be associated with a second color of light, cell 11-544 may be associated with a third color of light, and cell 11-545 may be associated with a fourth color of light. In one embodiment, each of the first color of light, second color of light, third color of light, and fourth color of light are different colors of light, such that each of the cells 11-542-11-545 may be associated with different colors of light. In another embodiment, at least two cells of the cells 11-542-11-545 may be associated with a same color of light. For example, the cell 11-543 and the cell 11-544 may be associated with the same color of light.

Further, each of the cells 11-542-11-545 may be capable of storing an analog value. In one embodiment, each of the cells 11-542-11-545 may be associated with a capacitor for storing a charge that corresponds to an accumulated exposure during an exposure time. In such an embodiment, asserting a row select signal to circuitry of a given cell may cause the cell to perform a read operation, which may include, without limitation, generating and transmitting a current that is a function of the stored charge of the capacitor associated with the cell. In one embodiment, prior to a readout operation, current received at the capacitor from an associated photodiode may cause the capacitor, which has been previously charged, to discharge at a rate that is proportional to an incident light intensity detected at the photodiode. The remaining charge of the capacitor of the cell may then be read using the row select signal, where the current transmitted from the cell is an analog value that reflects the remaining charge on the capacitor. To this end, an analog value received from a cell during a readout operation may reflect an accumulated intensity of light detected at a photodiode. The charge stored on a given capacitor, as well as any corresponding representations of the charge, such as the transmitted current, may be referred to herein as a type of analog pixel data. Of course, analog pixel data may include a set of spatially discrete intensity samples, each represented by continuous analog values.

Still further, the row logic 11-512 and the column read out circuit 11-520 may work in concert under the control of the control unit 11-514 to read a plurality of cells 11-542-11-545 of a plurality of pixels 11-540. For example, the control unit 11-514 may cause the row logic 11-512 to assert a row select signal comprising row control signals 11-530 associated with a given row of pixels 11-540 to enable analog pixel data associated with the row of pixels to be read. As shown in FIG. 11-3A, this may include the row logic 11-512 asserting one or more row select signals comprising row control signals 11-530(0) associated with a row 11-534(0) that includes pixel 11-540(0) and pixel 11-540(*a*). In response to the row select signal being asserted, each pixel 11-540 on row 11-534(0) transmits at least one analog value based on charges stored within the cells 11-542-11-545 of the pixel 11-540. In certain embodiments, cell 11-542 and cell 11-543 are configured to transmit corresponding analog values in response to a first row select signal, while cell 11-544 and cell 11-545 are configured to transmit corresponding analog values in response to a second row select signal.

In one embodiment, analog values for a complete row of pixels 11-540 comprising each row 11-534(0) through 11-534(*r*) may be transmitted in sequence to column read out circuit 11-520 through column signals 11-532. In one embodiment, analog values for a complete row or pixels or cells within a complete row of pixels may be transmitted simultaneously. For example, in response to row select signals comprising row control signals 11-530(0) being asserted, the pixel 11-540(0) may respond by transmitting at least one analog value from the cells 11-542-11-545 of the pixel 11-540(0) to the column read out circuit 11-520 through one or more signal paths comprising column signals 11-532(0); and simultaneously, the pixel 11-540(*a*) will also transmit at least one analog value from the cells 11-542-545 of the pixel 11-540(*a*) to the column read out circuit 11-520 through one or more signal paths comprising column signals 11-532(*c*). Of course, one or more analog values may be received at the column read out circuit 11-520 from one or more other pixels 11-540 concurrently to receiving the at least one analog value from pixel 11-540(0) and concurrently receiving the at least one analog value from the pixel 11-540(*a*). Together, a set of analog values received from the pixels 11-540 comprising row 11-534(0) may be referred to as an analog signal, and this analog signal may be based on an optical image focused on the pixel array 11-510. An analog signal may be a set of spatially discrete intensity samples, each represented by continuous analog values.

Further, after reading the pixels 11-540 comprising row 11-534(0), the row logic 11-512 may select a second row of pixels 11-540 to be read. For example, the row logic 11-512 may assert one or more row select signals comprising row control signals 11-530(*r*) associated with a row of pixels 11-540 that includes pixel 11-540(*b*) and pixel 11-540(*z*). As a result, the column read out circuit 11-520 may receive a corresponding set of analog values associated with pixels 11-540 comprising row 11-534(*r*).

The column read out circuit 11-520 may serve as a multiplexer to select and forward one or more received analog values to an analog-to-digital converter circuit, such as analog-to-digital unit 11-622 of FIG. 11-4. The column read out circuit 11-520 may forward the received analog values in a predefined order or sequence. In one embodiment, row logic 11-512 asserts one or more row selection signals comprising row control signals 11-530, causing a corresponding row of pixels to transmit analog values through column signals 11-532. The column read out circuit 11-520 receives the analog values and sequentially selects and forwards one or more of the analog values at a time to the analog-to-digital unit 11-622. Selection of rows by row logic 11-512 and selection of columns by column read out circuit 11-620 may be directed by control unit 11-514. In one embodiment, rows 11-534 are sequentially selected to be read, starting with row 11-534(0) and ending with row **11-534(*r*), and analog values associated with sequential columns are transmitted to the analog-to-digital unit 11-622. In other embodiments, other selection patterns may be implemented to read analog values stored in pixels 11-540**.

Further, the analog values forwarded by the column read out circuit 11-520 may comprise analog pixel data, which may later be amplified and then converted to digital pixel data for generating one or more digital images based on an optical image focused on the pixel array 11-510.

FIGS. 11-3B-11-3D illustrate three optional pixel configurations, according to one or more embodiments. As an option, these pixel configurations may be implemented in the context of the details of any of the Figures disclosed herein. Of course, however, these pixel configurations may be implemented in any desired environment. By way of a specific example, any of the pixels 11-540 of FIGS. 11-3B-11-3D may operate as one or more of the pixels 11-540 of the pixel array 11-510.

As shown in FIG. 11-3B, a pixel 11-540 is illustrated to include a first cell (R) for measuring red light intensity, second and third cells (G) for measuring green light intensity, and a fourth cell (B) for measuring blue light intensity, in accordance with one embodiment. As shown in FIG. 11-3C, a pixel 11-540 is illustrated to include a first cell (R) for measuring red light intensity, a second cell (G) for measuring green light intensity, a third cell (B) for measuring blue light intensity, and a fourth cell (W) for measuring white light intensity, in accordance with another embodiment. As shown in FIG. 11-3D, a pixel 11-540 is illustrated to include a first cell (C) for measuring cyan light intensity, a second cell (M) for measuring magenta light intensity, a third cell (Y) for measuring yellow light intensity, and a fourth cell (W) for measuring white light intensity, in accordance with yet another embodiment.

Of course, while pixels 11-540 are each shown to include four cells, a pixel 11-540 may be configured to include fewer or more cells for measuring light intensity. Still further, in another embodiment, while certain of the cells of pixel 11-540 are shown to be configured to measure a single peak wavelength of light, or white light, the cells of pixel 11-540 may be configured to measure any wavelength, range of wavelengths of light, or plurality of wavelengths of light.

Referring now to FIG. 11-3E, a system is shown for capturing optical scene information focused as an optical image on an image sensor 332, in accordance with one embodiment. As an option, the system of FIG. 11-3E may be implemented in the context of the details of any of the Figures. Of course, however, the system of FIG. 11-3E may be carried out in any desired environment. Further, the aforementioned definitions may equally apply to the description below.

As shown in FIG. 11-3E, an image sensor 332 is shown to include a first cell 11-544, a second cell 11-545, and a third cell 11-548. Further, each of the cells 11-544-548 is shown to include a photodiode 11-562. Still further, upon each of the photodiodes 11-562 is a corresponding filter 11-564, and upon each of the filters 11-564 is a corresponding microlens 11-566. For example, the cell 11-544 is shown to include photodiode 11-562(0), upon which is filter 11-564(0), and upon which is microlens 11-566(0). Similarly, the cell 11-545 is shown to include photodiode 11-562(1), upon which is filter 11-564(1), and upon which is microlens 11-566(1). Still yet, as shown in FIG. 11-3E, pixel 11-540 is shown to include each of cells 11-544 and 11-545, photodiodes 11-562(0) and 11-562(1), filters 11-564(0) and 11-564(1), and microlenses 11-566(0) and 11-566(1).

In one embodiment, each of the microlenses 11-566 may be any lens with a diameter of less than 50 microns. However, in other embodiments each of the microlenses 11-566 may have a diameter greater than or equal to 50 microns. In one embodiment, each of the microlenses 11-566 may include a spherical convex surface for focusing and concentrating received light on a supporting substrate beneath the microlens 11-566. For example, as shown in FIG. 11-3E, the microlens 11-566(0) focuses and concentrates received light on the filter 11-564(0). In one embodiment, a microlens array 11-567 may include microlenses 11-566, each corresponding in placement to photodiodes 11-562 within cells 11-544 of image sensor 332.

In the context of the present description, the photodiodes 11-562 may comprise any semiconductor diode that generates a potential difference, or changes its electrical resistance, in response to photon absorption. Accordingly, the photodiodes 11-562 may be used to detect or measure light intensity. Further, each of the filters 11-564 may be optical filters for selectively transmitting light of one or more predetermined wavelengths. For example, the filter 11-564(0) may be configured to selectively transmit substantially only green light received from the corresponding microlens 11-566(0), and the filter 11-564(1) may be configured to selectively transmit substantially only blue light received from the microlens 11-566(1). Together, the filters 11-564 and microlenses 11-566 may be operative to focus selected wavelengths of incident light on a plane. In one embodiment, the plane may be a 2-dimensional grid of photodiodes 11-562 on a surface of the image sensor 332. Further, each photodiode 11-562 receives one or more predetermined wavelengths of light, depending on its associated filter. In one embodiment, each photodiode 11-562 receives only one of red, blue, or green wavelengths of filtered light. As shown with respect to FIGS. 11-3B-11-3D, it is contemplated that a photodiode may be configured to detect wavelengths of light other than only red, green, or blue. For example, in the context of FIGS. 11-3C-11-3D specifically, a photodiode may be configured to detect white, cyan, magenta, yellow, or non-visible light such as infrared or ultraviolet light.

To this end, each coupling of a cell, photodiode, filter, and microlens may be operative to receive light, focus and filter the received light to isolate one or more predetermined wavelengths of light, and then measure, detect, or otherwise quantify an intensity of light received at the one or more predetermined wavelengths. The measured or detected light may then be represented as an analog value stored within a cell. For example, in one embodiment, the analog value may be stored within the cell utilizing a capacitor, as discussed in more detail above. Further, the analog value stored within the cell may be output from the cell based on a selection signal, such as a row selection signal, which may be received from row logic 11-512. Further still, the analog value transmitted from a single cell may comprise one analog value in a plurality of analog values of an analog signal, where each of the analog values is output by a different cell. Accordingly, the analog signal may comprise a plurality of analog pixel data values from a plurality of cells. In one embodiment, the analog signal may comprise analog pixel data values for an entire image of a photographic scene. In another embodiment, the analog signal may comprise analog pixel data values for a subset of the entire image of the photographic scene. For example, the analog signal may comprise analog pixel data values for a row of pixels of the image of the photographic scene. In the context of FIGS. 11-3A-11-3E, the row 11-534(0) of the pixels 11-540 of the pixel array 11-510 may be one such row of pixels of the image of the photographic scene.

FIG. 11-4 illustrates a system for converting analog pixel data to digital pixel data, in accordance with an embodiment. As an option, the system of FIG. 11-4 may be implemented in the context of the details of any of the Figures disclosed herein. Of course, however, the system of FIG. 11-4 may be implemented in any desired environment. Further, the aforementioned definitions may equally apply to the description below.

As shown in FIG. 11-4, analog pixel data 11-621 is received from column read out circuit 11-520 at analog-to-digital unit 11-622 under the control of control unit 11-514. The analog pixel data 11-621 may be received within an analog signal, as noted hereinabove. Further, the analog-to-digital unit 11-622 generates digital pixel data 11-625 based on the received analog pixel data 11-621.

More specifically, and as shown in FIG. 11-4, the analog-to-digital unit 11-622 includes an amplifier 11-650 and an analog-to-digital converter 11-654. In one embodiment, the amplifier 11-650 receives both the analog pixel data 11-621 and a gain 11-652, and applies the gain 11-652 to the analog pixel data 11-621 to generate gain-adjusted analog pixel data 11-623. The gain-adjusted analog pixel data 11-623 is transmitted from the amplifier 11-650 to the analog-to-digital converter 11-654. The analog-to-digital converter 11-654 receives the gain-adjusted analog pixel data 11-623, and converts the gain-adjusted analog pixel data 11-623 to the digital pixel data 11-625, which is then transmitted from the analog-to-digital converter 11-654. In other embodiments, the amplifier 11-650 may be implemented within the column read out circuit 520 instead of within the analog-to-digital unit 11-622. The analog-to-digital converter 11-654 may convert the gain-adjusted analog pixel data 11-623 to the digital pixel data 11-625 using any technically feasible analog-to-digital conversion system.

In an embodiment, the gain-adjusted analog pixel data 11-623 results from the application of the gain 11-652 to the analog pixel data 11-621. In one embodiment, the gain 11-652 may be selected by the analog-to-digital unit 11-622. In another embodiment, the gain 11-652 may be selected by the control unit 11-514, and then supplied from the control unit 11-514 to the analog-to-digital unit 11-622 for application to the analog pixel data 11-621.

It should be noted, in one embodiment, that a consequence of applying the gain 11-652 to the analog pixel data 11-621 is that analog noise may appear in the gain-adjusted analog pixel data 11-623. If the amplifier 11-650 imparts a significantly large gain to the analog pixel data 11-621 in order to obtain highly sensitive data from of the pixel array 11-510, then a significant amount of noise may be expected within the gain-adjusted analog pixel data 11-623. In one embodiment, the detrimental effects of such noise may be reduced by capturing the optical scene information at a reduced overall exposure. In such an embodiment, the application of the gain 11-652 to the analog pixel data 11-621 may result in gain-adjusted analog pixel data with proper exposure and reduced noise.

In one embodiment, the amplifier 11-650 may be a transimpedance amplifier (TIA). Furthermore, the gain 11-652 may be specified by a digital value. In one embodiment, the digital value specifying the gain 11-652 may be set by a user of a digital photographic device, such as by operating the digital photographic device in a "manual" mode. Still yet, the digital value may be set by hardware or software of a digital photographic device. As an option, the digital value may be set by the user working in concert with the software of the digital photographic device.

In one embodiment, a digital value used to specify the gain 11-652 may be associated with an ISO. In the field of photography, the ISO system is a well-established standard for specifying light sensitivity. In one embodiment, the amplifier 11-650 receives a digital value specifying the gain 11-652 to be applied to the analog pixel data 11-621. In another embodiment, there may be a mapping from conventional ISO values to digital gain values that may be provided as the gain 11-652 to the amplifier 11-650. For example, each of ISO 100, ISO 200, ISO 400, ISO 800, ISO 1600, etc. may be uniquely mapped to a different digital gain value, and a selection of a particular ISO results in the mapped digital gain value being provided to the amplifier 11-650 for application as the gain 11-652. In one embodiment, one or more ISO values may be mapped to a gain of 1. Of course, in other embodiments, one or more ISO values may be mapped to any other gain value.

Accordingly, in one embodiment, each analog pixel value may be adjusted in brightness given a particular ISO value. Thus, in such an embodiment, the gain-adjusted analog pixel data 11-623 may include brightness corrected pixel data, where the brightness is corrected based on a specified ISO. In another embodiment, the gain-adjusted analog pixel data 11-623 for an image may include pixels having a brightness in the image as if the image had been sampled at a certain ISO.

In accordance with an embodiment, the digital pixel data 11-625 may comprise a plurality of digital values representing pixels of an image captured using the pixel array 11-510.

FIG. 11-5 illustrates a system 11-700 for converting analog pixel data of an analog signal to digital pixel data, in accordance with an embodiment. As an option, the system 11-700 may be implemented in the context of the details of any of the Figures disclosed herein. Of course, however, the system 11-700 may be implemented in any desired environment. Further, the aforementioned definitions may equally apply to the description below.

The system 11-700 is shown in FIG. 11-5 to include an analog storage plane 11-702, an analog-to-digital unit 11-722, a first digital image 11-732, and a second digital image 11-734. Additionally, in one embodiment, analog values may each be depicted as a "V" within the analog storage plane 11-702 and corresponding digital values may each be depicted as a "D" within first digital image 11-732 and second digital image 11-734.

In the context of the present description, the analog storage plane 11-702 may comprise any collection of one or more analog values. In one embodiment, the analog storage plane 11-702 may comprise one or more analog pixel values. In some embodiments, the analog storage plane 11-702 may comprise at least one analog pixel value for each pixel of a row or line of a pixel array. Still yet, in another embodiment, the analog storage plane 11-702 may comprise at least one analog pixel value for each pixel of an entirety of a pixel array, which may be referred to as a frame. In one embodiment, the analog storage plane 11-702 may comprise an analog value for each cell of a pixel. In yet another embodiment, the analog storage plane 11-702 may comprise an analog value for each cell of each pixel of a row or line of a pixel array. In another embodiment, the analog storage plane 11-702 may comprise an analog value for each cell of each pixel of multiple lines or rows of a pixel array. For example, the analog storage plane 11-702 may comprise an analog value for each cell of each pixel of every line or row of a pixel array.

Further, the analog values of the analog storage plane 11-702 are output as analog pixel data 11-704 to the analog-to-digital unit 11-722. In one embodiment, the analog-to-digital unit 11-722 may be substantially identical to the analog-to-digital unit 11-622 described within the context of FIG. 11-4. For example, the analog-to-digital unit 11-722 may comprise at least one amplifier and at least one analog-to-digital converter, where the amplifier is operative to receive a gain value and utilize the gain value to gain-adjust analog pixel data received at the analog-to-digital unit 11-722. Further, in such an embodiment, the amplifier may transmit gain-adjusted analog pixel data to an analog-to-digital converter, which then generates digital pixel data from the gain-adjusted analog pixel data.

In the context of the system 11-700 of FIG. 11-5, the analog-to-digital unit 11-722 receives the analog pixel data 11-704, and applies at least two different gains to the analog pixel data 11-704 to generate at least a first gain-adjusted analog pixel data and a second gain-adjusted analog pixel data. Further, the analog-to-digital unit 11-722 converts each generated gain-adjusted analog pixel data to digital pixel data, and then outputs at least two digital outputs. To this end, the analog-to-digital unit 11-722 provides a different digital output corresponding to each gain applied to the analog pixel data 11-704. With respect to FIG. 11-5 specifically, the analog-to-digital unit 11-722 is shown to generate a first digital signal comprising first digital pixel data 11-723 corresponding to a first gain 11-652, and a second digital signal comprising second digital pixel data 11-724 corresponding to a second gain 11-752.

In one embodiment, the analog-to-digital unit 11-722 applies in sequence the at least two gains to the analog values. For example, the analog-to-digital unit 11-722 first applies the first gain 11-652 to the analog pixel data 11-704, and then subsequently applies the second gain 11-752 to the same analog pixel data 11-704. In other embodiments, the analog-to-digital unit 11-722 may apply in parallel the at least two gains to the analog values. For example, the analog-to-digital unit 11-722 may apply the first gain 652 to the analog pixel data 11-704 in parallel with the application of the second gain 11-752 to the analog pixel data 11-704. To this end, as a result of applying the at least two gains, the analog pixel data 11-704 is amplified utilizing at least the first gain 11-652 and the second gain 11-752.

In accordance with one embodiment, the at least two gains may be determined using any technically feasible technique based on an exposure of a photographic scene, metering data, user input, detected ambient light, a strobe control, or any combination of the foregoing. For example, a first gain of the at least two gains may be determined such that half of the digital values from the analog storage plane 11-702 are converted to digital values above a specified threshold (e.g., a threshold of 0.5 in a range of 0.0 to 1.0) for the dynamic range associated with digital values comprising the first digital image 11-732, which can be characterized as having an "EV0" exposure. Continuing the example, a second gain of the at least two gains may be determined as being twice that of the first gain to generate a second digital image 11-734 characterized as having an "EV+1" exposure.

In one embodiment, the analog-to-digital unit 11-722 converts in sequence the first gain-adjusted analog pixel data to the first digital pixel data 11-723, and the second gain-adjusted analog pixel data to the second digital pixel data 11-724. For example, the analog-to-digital unit 11-722 first converts the first gain-adjusted analog pixel data to the first digital pixel data 11-723, and then subsequently converts the second gain-adjusted analog pixel data to the second digital pixel data 11-724. In other embodiments, the analog-to-digital unit 11-722 may perform such conversions in parallel, such that the first digital pixel data 11-723 is generated in parallel with the second digital pixel data 11-724.

Still further, as shown in FIG. 11-5, the first digital pixel data 11-723 is used to provide the first digital image 11-732. Similarly, the second digital pixel data 11-724 is used to provide the second digital image 11-734. The first digital image 11-732 and the second digital image 11-734 are both based upon the same analog pixel data 11-704, however the first digital image 11-732 may differ from the second digital image 11-734 as a function of a difference between the first gain 11-652 (used to generate the first digital image 11-732) and the second gain 11-752 (used to generate the second digital image 11-752). Specifically, the digital image generated using the largest gain of the at least two gains may be visually perceived as the brightest or more exposed. Conversely, the digital image generated using the smallest gain of the at least two gains may be visually perceived as the darkest and less exposed. To this end, a first light sensitivity value may be associated with the first digital pixel data 11-723, and a second light sensitivity value may be associated with the second digital pixel data 11-724. Further, because each of the gains may be associated with a different light sensitivity value, the first digital image or first digital signal may be associated with a first light sensitivity value, and the second digital image or second digital signal may be associated with a second light sensitivity value.

It should be noted that while a controlled application of gain to the analog pixel data may greatly aid in HDR image generation, an application of too great of gain may result in a digital image that is visually perceived as being noisy, over-exposed, and/or blown-out. In one embodiment, application of two stops of gain to the analog pixel data may impart visually perceptible noise for darker portions of a photographic scene, and visually imperceptible noise for brighter portions of the photographic scene. In another embodiment, a digital photographic device may be configured to provide an analog storage plane of analog pixel data for a captured photographic scene, and then perform at least two analog-to-digital samplings of the same analog pixel data using the analog-to-digital unit 11-722. To this end, a digital image may be generated for each sampling of the at least two samplings, where each digital image is obtained at a different exposure despite all the digital images being generated from the same analog sampling of a single optical image focused on an image sensor.

In one embodiment, an initial exposure parameter may be selected by a user or by a metering algorithm of a digital photographic device. The initial exposure parameter may be selected based on user input or software selecting particular capture variables. Such capture variables may include, for example, ISO, aperture, and shutter speed. An image sensor may then capture a single exposure of a photographic scene at the initial exposure parameter, and populate an analog storage plane with analog values corresponding to an optical image focused on the image sensor. Next, a first digital image may be obtained utilizing a first gain in accordance with the above systems and methods. For example, if the digital photographic device is configured such that the initial exposure parameter includes a selection of ISO 400, the first gain utilized to obtain the first digital image may be mapped to, or otherwise associated with, ISO 400. This first digital image may be referred to as an exposure or image obtained at exposure value 0 (EV0). Further at least one more digital image may be obtained utilizing a second gain in accordance with the above systems and methods. For example, the same analog pixel data used to generate the first digital image may be processed utilizing a second gain to generate a second digital image.

In one embodiment, at least two digital images may be generated using the same analog pixel data and blended to generate an HDR image. The at least two digital images generated using the same analog signal may be blended by blending a first digital signal and a second digital signal. Because the at least two digital images are generated using the same analog pixel data, there may be zero interframe time between the at least two digital images. As a result of having zero interframe time between at least two digital images of a same photographic scene, an HDR image may be generated without motion blur or other artifacts typical of HDR photographs.

In another embodiment, the second gain may be selected based on the first gain. For example, the second gain may be selected on the basis of it being one stop away from the first gain. More specifically, if the first gain is mapped to or associated with ISO 400, then one stop down from ISO 400 provides a gain associated with ISO 200, and one stop up from ISO 400 provides a gain associated with ISO 800. In such an embodiment, a digital image generated utilizing the gain associated with ISO 200 may be referred to as an exposure or image obtained at exposure value −1 (EV−1), and a digital image generated utilizing the gain associated with ISO 800 may be referred to as an exposure or image obtained at exposure value +1 (EV+1).

Still further, if a more significant difference in exposures is desired between digital images generated utilizing the same analog signal, then the second gain may be selected on the basis of it being two stops away from the first gain. For example, if the first gain is mapped to or associated with ISO 400, then two stops down from ISO 400 provides a gain associated with ISO 100, and two stops up from ISO 400 provides a gain associated with ISO 1600. In such an embodiment, a digital image generated utilizing the gain associated with ISO 100 may be referred to as an exposure or image obtained at exposure value −2 (EV−2), and a digital image generated utilizing the gain associated with ISO 1600 may be referred to as an exposure or image obtained at exposure value +2 (EV+2).

In one embodiment, an ISO and exposure of the EV0 image may be selected according to a preference to generate darker or more saturated digital images. In such an embodiment, the intention may be to avoid blowing out or overexposing what will be the brightest digital image, which is the digital image generated utilizing the greatest gain. In another embodiment, an EV−1 digital image or EV−2 digital image may be a first generated digital image. Subsequent to generating the EV−1 or EV−2 digital image, an increase in gain at an analog-to-digital unit may be utilized to generate an EV0 digital image, and then a second increase in gain at the analog-to-digital unit may be utilized to generate an EV+1 or EV+2 digital image. In one embodiment, the initial exposure parameter corresponds to an EV-N digital image and subsequent gains are used to obtain an EV0 digital image, an EV+M digital image, or any combination thereof, where N and M are values ranging from 0 to −10.

In one embodiment, an EV−2 digital image, an EV0 digital image, and an EV+2 digital image may be generated in parallel by implementing three analog-to-digital units. Such an implementation may be also capable of simultaneously generating all of an EV−1 digital image, an EV0 digital image, and an EV+1 digital image. Similarly, any combination of exposures may be generated in parallel from two or more analog-to-digital units, three or more analog-to-digital units, or an arbitrary number of analog-to-digital units.

Figures 6, 11:
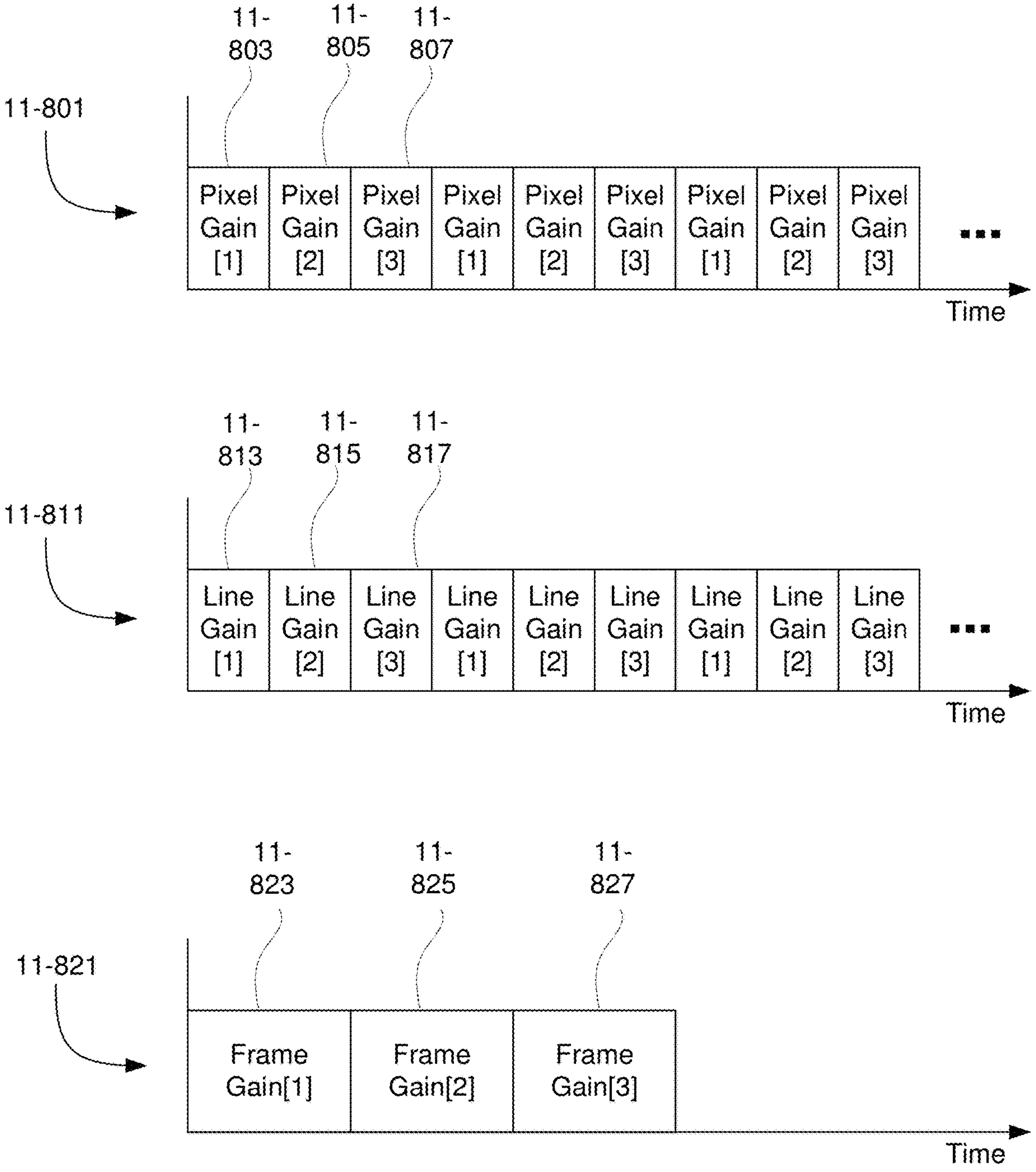

FIG. 11-6 illustrates various timing configurations for amplifying analog signals, in accordance with various embodiments. As an option, the timing configurations of FIG. 11-6 may be implemented in the context of the details of any of the Figures disclosed herein. Of course, however, the timing configurations of FIG. 11-6 may be carried out in any desired environment. Further, the aforementioned definitions may equally apply to the description below.

Specifically, as shown in FIG. 11-6, per pixel timing configuration 11-801 is shown to amplify analog signals on a pixel-by-pixel basis. Further, per line timing configuration 11-811 is shown to amplify analog signals on a line-by-line basis. Finally, per frame timing configuration 11-821 is shown to amplify analog signals on a frame-by-frame basis. Each amplified analog signal associated with analog pixel data may be converted to a corresponding digital signal value.

In systems that implement per pixel timing configuration 11-801, an analog signal containing analog pixel data may be received at an analog-to-digital unit. Further, the analog pixel data may include individual analog pixel values. In such an embodiment, a first analog pixel value associated with a first pixel may be identified within the analog signal and selected. Next, each of a first gain 11-803, a second gain 11-805, and a third gain 11-807 may be applied in sequence or concurrently to the same first analog pixel value. In some embodiments less than or more than three different gains may be applied to a selected analog pixel value. For example, in some embodiments applying only two different gains to the same analog pixel value may be sufficient for generating a satisfactory HDR image. In one embodiment, after applying each of the first gain 11-803, the second gain 11-805, and the third gain 11-807, a second analog pixel value associated with a second pixel may be identified within the analog signal and selected. The second pixel may be a neighboring pixel of the first pixel. For example, the second pixel may be in a same row as the first pixel and located adjacent to the first pixel on a pixel array of an image sensor. Next, each of the first gain 11-803, the second gain 11-805, and the third gain 11-807 may be applied in sequence or concurrently to the same second analog pixel value. To this end, in the per pixel timing configuration 11-801, a plurality of sequential analog pixel values may be identified within an analog signal, and a set of at least two gains are applied to each pixel in the analog signal on a pixel-by-pixel basis.

Further, in systems that implement the per pixel timing configuration 11-801, a control unit may select a next gain to be applied after each pixel is amplified using a previously selected gain. In another embodiment, a control unit may control an amplifier to cycle through a set of predetermined gains that will be applied to a first analog pixel value, such a first analog pixel data value comprising analog pixel data 11-704, associated with a first pixel so that each gain in the set may be used to amplify the first analog pixel data before applying the set of predetermined gains to a second analog pixel data that subsequently arrives at the amplifier. In one embodiment, and as shown in the context of FIG. 11-6, this may include selecting a first gain, applying the first gain to a received first analog pixel value, selecting a second gain, applying the second gain to the received first analog pixel value, selecting a third gain, applying the third selected gain to the received first analog pixel value, and then receiving a second analog pixel value and applying the three selected gains to the second pixel value in the same order as applied to the first pixel value. In one embodiment, each analog pixel value may be read a plurality of times. In general, an analog storage plane may be utilized to hold the analog pixel values of the pixels for reading.

In systems that implement per line timing configuration 11-811, an analog signal containing analog pixel data may be received at an analog-to-digital unit. Further, the analog pixel data may include individual analog pixel values. In one embodiment, a first line of analog pixel values associated with a first line of pixels of a pixel array may be identified within the analog signal and selected. Next, each of a first gain 11-813, a second gain 11-815, and a third gain 11-817 may be applied in sequence or concurrently to the same first line of analog pixel values. In some embodiments less than or more than three different gains may be applied to a selected line of analog pixel values. For example, in some embodiments applying only two different gains to the same line of analog pixel values may be sufficient for generating a satisfactory HDR image. In one embodiment, after applying each of the first gain 11-813, the second gain 11-815, and the third gain 11-817, a second line of analog pixel values associated with a second line of pixels may be identified within the analog signal and selected. The second line of pixels may be a neighboring line of the first line of pixels. For example, the second line of pixels may be located immediately above or immediately below the first line of pixels in a pixel array of an image sensor. Next, each of the first gain 11-813, the second gain 11-815, and the third gain 11-817 may be applied in sequence or concurrently to the same second line of analog pixel values. To this end, in the per line timing configuration 11-811, a plurality of sequential lines of analog pixel values are identified within an analog signal, and a set of at least two gains are applied to each line of analog pixel values in the analog signal on a line-by-line basis.

Further, in systems that implement the per line timing configuration 11-811, a control unit may select a next gain to be applied after each line is amplified using a previously selected gain. In another embodiment, a control unit may control an amplifier to cycle through a set of predetermined gains that will be applied to a line so that each gain in the set is used to amplify a first line of analog pixel values before applying the set of predetermined gains to a second line of analog pixel values that arrives at the amplifier subsequent to the first line of analog pixel values. In one embodiment, and as shown in the context of FIG. 11-6, this may include selecting a first gain, applying the first gain to a received first line of analog pixel values, selecting a second gain, applying the second gain to the received first line of analog pixel values, selecting a third gain, applying the third selected gain to the received first line of analog pixel values, and then receiving a second line of analog pixel values and applying the three selected gains to the second line of analog pixel values in the same order as applied to the first line of analog pixel values. In one embodiment, each line of analog pixel values may be read a plurality of times. In another embodiment, an analog storage plane may be utilized to hold the analog pixel data values of one or more lines for reading.

In systems that implement per frame timing configuration 11-821, an analog signal that contains a plurality of analog pixel data values comprising analog pixel values may be received at an analog-to-digital unit. In such an embodiment, a first frame of analog pixel values associated with a first frame of pixels may be identified within the analog signal and selected. Next, each of a first gain 11-823, a second gain 11-825, and a third gain 11-827 may be applied in sequence or concurrently to the same first frame of analog pixel values. In some embodiments less than or more than three different gains may be applied to a selected frame of analog pixel values. For example, in some embodiments applying only two different gains to the same frame of analog pixel values may be sufficient for generating a satisfactory HDR image.

In one embodiment, after applying each of the first gain 11-823, the second gain 11-825, and the third gain 11-827, a second frame of analog pixel values associated with a second frame of pixels may be identified within the analog signal and selected. The second frame of pixels may be a next frame in a sequence of frames that capture video data associated with a photographic scene. For example, a digital photographic system may be operative to capture 30 frames per second of video data. In such digital photographic systems, the first frame of pixels may be one frame of said thirty frames, and the second frame of pixels may be a second frame of said thirty frames. Further still, each of the first gain 11-823, the second gain 11-825, and the third gain 11-827 may be applied in sequence to the analog pixel values of the second frame. To this end, in the per frame timing configuration 11-821, a plurality of sequential frames of analog pixel values may be identified within an analog signal, and a set of at least two gains are applied to each frame of analog pixel values on a frame-by-frame basis.

Further, in systems that implement the per frame timing configuration 11-821, a control unit may select a next gain to be applied after each frame is amplified using a previously selected gain. In another embodiment, a control unit may control an amplifier to cycle through a set of predetermined gains that will be applied to a frame so that each gain is used to amplify a analog pixel values associated with the first frame before applying the set of predetermined gains to analog pixel values associated with a second frame that subsequently arrive at the amplifier. In one embodiment, and as shown in the context of FIG. 11-6, this may include selecting a first gain, applying the first gain to analog pixel values associated with the first frame, selecting a second gain, applying the second gain to analog pixel values associated with the first frame, selecting a third gain, and applying the third gain to analog pixel values associated with the first frame. In another embodiment, analog pixel values associated with a second frame may be received following the application of all three selected gains to analog pixel values associated with the first frame, and the three selected gains may then be applied to analog pixel values associated with the second frame in the same order as applied to the first frame.

In yet another embodiment, selected gains applied to the first frame may be different than selected gains applied to the second frame, such as may be the case when the second frame includes different content and illumination than the first frame. In general, an analog storage plane may be utilized to hold the analog pixel data values of one or more frames for reading.

In certain embodiments, an analog-to-digital unit is assigned for each different gain and the analog-to-digital units are configured to operate concurrently. Resulting digital values may be interleaved for output or may be output in parallel. For example, analog pixel data for a given row may be amplified according to gain 11-803 and converted to corresponding digital values by a first analog-to-digital unit, while, concurrently, the analog pixel data for the row may be amplified according to gain 11-805 and converted to corresponding digital values by a second analog-to-digital unit. Furthermore, and concurrently, the analog pixel data for the row may be amplified according to gain 11-807 and converted to corresponding digital values by a third analog-to-digital unit. Digital values from the first through third analog-to-digital units may be output as sets of pixels, with each pixel in a set of pixels corresponding to one of the three gains 11-803, 11-805, 11-807. Similarly, output data values may be organized as lines having different gain values, with each line comprising pixels with a gain corresponding to one of the three gains 11-803, 11-805, 11-807.

Figures 7, 11:
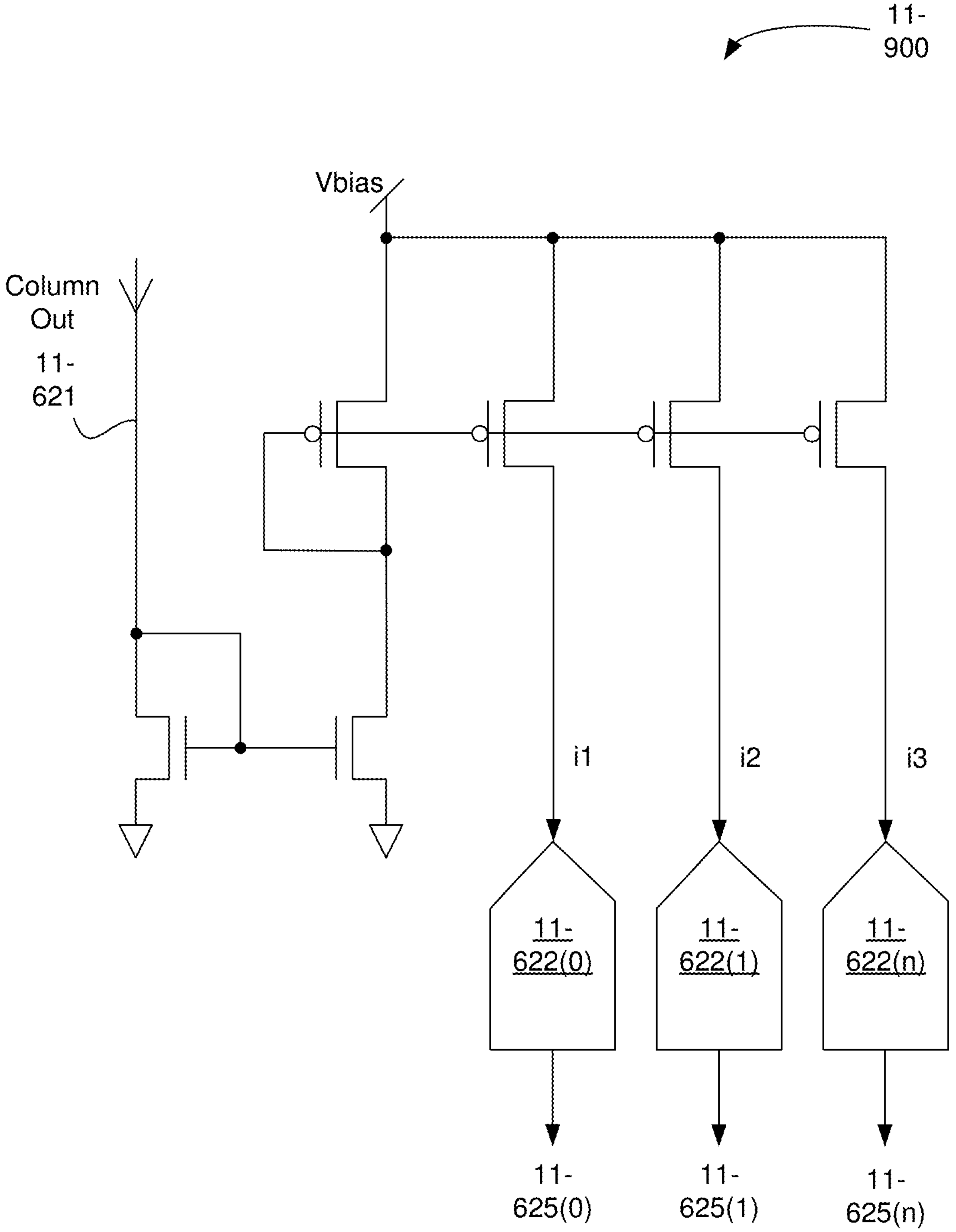
Figures 8, 11:
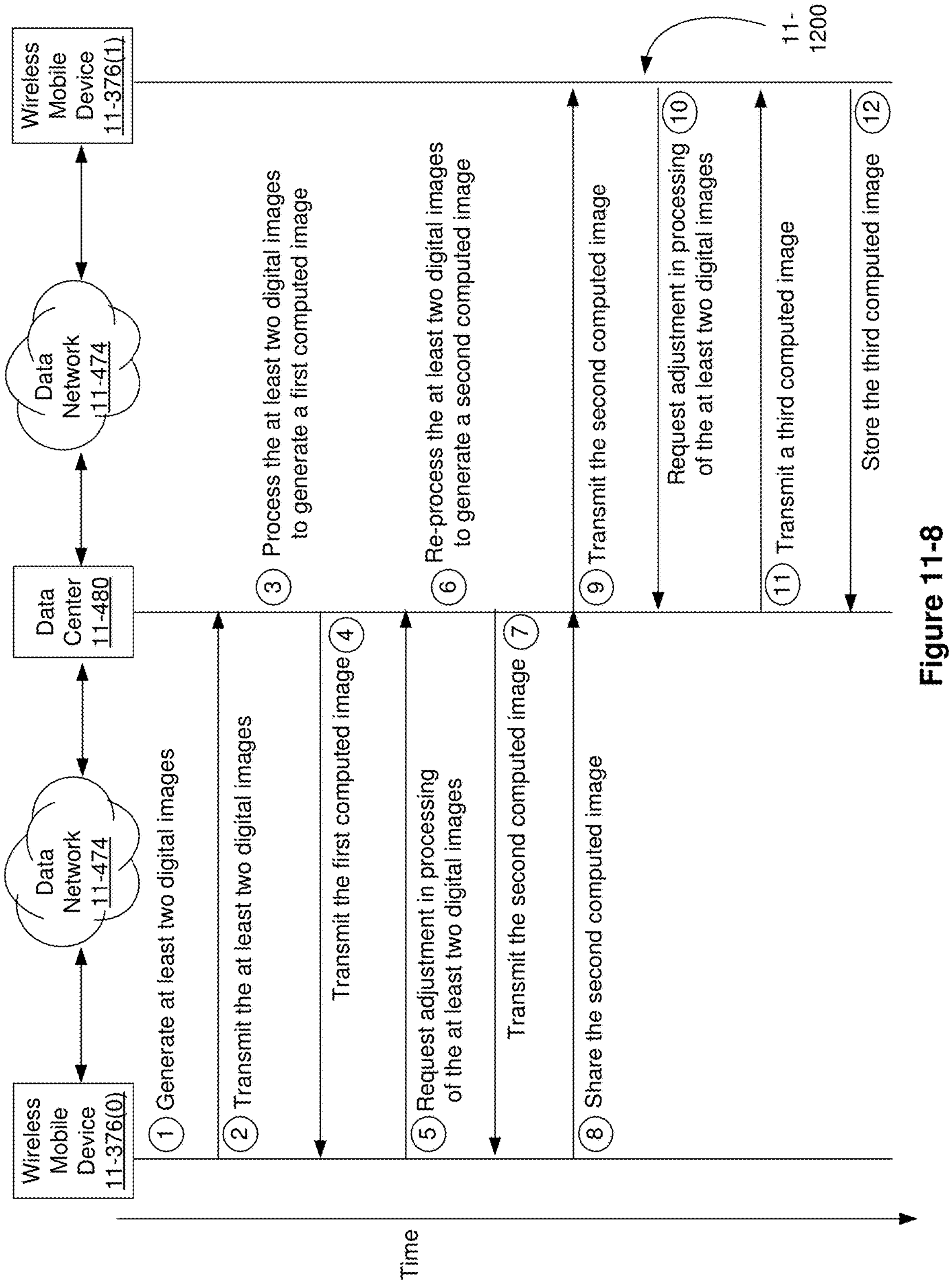

FIG. 11-7 illustrates a system 11-900 for converting in parallel analog pixel data to multiple signals of digital pixel data, in accordance with one embodiment. As an option, the system 11-900 may be implemented in the context of the details of any of the Figures disclosed herein. Of course, however, the system 11-900 may be implemented in any desired environment. Further, the aforementioned definitions may equally apply to the description below.

In the context of FIG. 11-7, the system 11-900 is shown to receive as input analog pixel data 11-621. The analog pixel data 11-621 may be received within an analog signal, as noted hereinabove. Further, the analog-to-digital units 11-622 may be configured to generate digital pixel data 11-625 based on the received analog pixel data 11-621.

As shown in FIG. 11-7, the system 11-900 is configured to mirror the current of the analog pixel data 11-621 such that each of analog-to-digital unit 11-622(0), analog-to-digital unit 11-622(1), and analog-to-digital unit **11-622(*n*) receive a scaled copy of the analog pixel data 11-621. In one embodiment, each of the analog-to-digital unit 11-622(0), the analog-to-digital unit 11-622(1), and the analog-to-digital unit 11-622(*n*) may be configured to apply a unique gain to the analog pixel data 11-621. Each scaled copy may be scaled according to physical dimensions for the transistors comprising system 11-900, which comprises a structure known in the art as a current mirror. As shown, each current i1, i2, i3 may be generated in an arbitrary ratio relative to input current Iin, based on the physical dimensions. For example, currents i1, i2, i3** may be generated in a ratio of 1:1:1, 1:2:4, 0.5:1:2, or any other technically feasible ratio relative to Iin.

In an embodiment, the unique gains may be configured at each of the analog-to-digital units 11-622 by a controller. By way of a specific example, the analog-to-digital unit 11-622 (0) may be configured to apply a gain of 1.0 to the analog pixel data 11-621, the analog-to-digital unit 11-622(1) may be configured to apply a gain of 2.0 to the analog pixel data 11-621, and the analog-to-digital unit **11-622(*n*) may be configured to apply a gain of 4.0 to the analog pixel data 11-621. Accordingly, while the same analog pixel data 11-621 may be input transmitted to each of the analog-to-digital unit 11-622(0), the analog-to-digital unit 11-622(1), and the analog-to-digital unit 11-622(*n*), each of digital pixel data 11-625(0), digital pixel data 11-625(1), and digital pixel data 11-625(*n*) may include different digital values based on the different gains applied within the analog-to-digital units 11-622**, and thereby provide unique exposure representations of the same photographic scene.

In the embodiment described above, where the analog-to-digital unit 11-622(0) may be configured to apply a gain of 1.0, the analog-to-digital unit 11-622(1) may be configured to apply a gain of 2.0, and the analog-to-digital unit **11-622(*n*) may be configured to apply a gain of 4.0, the digital pixel data 11-625(0) may provide the least exposed corresponding digital image. Conversely, the digital pixel data 11-625(*n*) may provide the most exposed digital image. In another embodiment, the digital pixel data 11-625(0) may be utilized for generating an EV−1 digital image, the digital pixel data 11-625(1) may be utilized for generating an EV0 digital image, and the digital pixel data 11-625(*n*) may be utilized for generating an EV+2 image. In another embodiment, system 11-900 is configured to generate currents i1, i2, and i3 in a ratio of 2:1:4, and each analog-to-digital unit 11-622 may be configured to apply a gain of 1.0, which results in corresponding digital images having exposure values of EV−1, EV0, and EV+1 respectively. In such an embodiment, further differences in exposure value may be achieved by applying non-unit gain within one or more analog-to-digital unit 11-622**.

While the system 11-900 is illustrated to include three analog-to-digital units 11-622, it is contemplated that multiple digital images may be generated by similar systems with more or less than three analog-to-digital units 11-622. For example, a system with two analog-to-digital units 11-622 may be implemented for simultaneously generating two exposures of a photographic scene with zero interframe time in a manner similar to that described above with respect to system 11-900. In one embodiment, the two analog-to-digital units 11-622 may be configured to generate two exposures each, for a total of four different exposures relative to one frame of analog pixel data.

FIG. 11-8 illustrates a message sequence 11-1200 for generating a combined image utilizing a network, according to one embodiment. As an option, the message sequence 11-1200 may be implemented in the context of the details of any of the Figures disclosed herein. Of course, however, the message sequence 11-1200 may be carried out in any desired environment. Further, the aforementioned definitions may equally apply to the description below.

As shown in FIG. 11-8, a wireless mobile device 11-376 (0) generates at least two digital images. In one embodiment, the at least two digital images may be generated by amplifying an analog signal with at least two gains, where each generated digital image corresponds to digital output of an applied gain. As described previously, at least two different gains may be applied by one or more amplifiers to an analog signal containing analog pixel data in order to generate gain-adjusted analog pixel data. Further, the gain-adjusted analog pixel data may then be converted to the at least two digital images utilizing at least one analog-to-digital converter, where each of the digital images provides a different exposure of a same photographic scene. For example, in one embodiment, the at least two digital images may include an EV−1 exposure of the photographic scene and an EV+1 exposure of the photographic scene. In another embodiment, the at least two digital images may include an EV−2 exposure of the photographic scene, an EV0 exposure of the photographic scene, and an EV+2 exposure of the photographic scene.

Referring again to FIG. 11-8, the at least two digital images are transmitted from the wireless mobile device 11-376(0) to a data center 11-480 by way of a data network 11-474. The at least two digital images may be transmitted by the wireless mobile device 11-376(0) to the data center 11-480 using any technically feasible network communication method.

Further, in one embodiment, the data center 11-480 may then process the at least two digital images to generate a first computed image. The processing of the at least two digital images may include any processing of the at least two digital images that blends or merges at least a portion of each of the at least two digital images to generate the first computed image. To this end, the first digital image and the second digital image may be combined remotely from the wireless mobile device 11-376(0). For example, the processing of the at least two digital images may include an any type of blending operation, including but not limited to, an HDR image combining operation. In one embodiment, the processing of the at least two digital images may include any computations that produce a first computed image having a greater dynamic range than any one of the digital images received at the data center 11-480. Accordingly, in one embodiment, the first computed image generated by the data center 11-480 may be an HDR image. In other embodiments, the first computed image generated by the data center 11-480 may be at least a portion of an HDR image.

After generating the first computed image, the data center 11-480 may then transmit the first computed image to the wireless mobile device 11-376(0). In one embodiment, the transmission of the at least two digital images from the wireless mobile device 11-376(0), and the receipt of the first computed image at the wireless device 11-376(0), may occur without any intervention or instruction being received from a user of the wireless mobile device 11-376(0). For example, in one embodiment, the wireless mobile device 11-376(0) may transmit the at least two digital images to the data center 11-480 immediately after capturing a photographic scene and generating the at least two digital images utilizing an analog signal representative of the photographic scene. The photographic scene may be captured based on a user input or selection of an electronic shutter control, or pressing of a manual shutter button, on the wireless mobile device 11-376 (0). Further, in response to receiving the at least two digital images, the data center 11-480 may generate an HDR image based on the at least two digital images, and transmit the HDR image to the wireless mobile device 11-376(0). The wireless mobile device 11-376(0) may then display the received HDR image. Accordingly, a user of the wireless mobile device 11-376(0) may view on the display of the wireless mobile device 11-376(0) an HDR image computed by the data center 11-480. Thus, even though the wireless mobile device 11-376(0) does not perform any HDR image processing, the user may view on the wireless mobile device 11-376(0) the newly computed HDR image substantially instantaneously after capturing the photographic scene and generating the at least two digital images on which the HDR image is based.

As shown in FIG. 11-8, the wireless mobile device 11-376(0) requests adjustment in processing of the at least two digital images. In one embodiment, upon receiving the first computed image from the data center 11-480, the wireless mobile device 11-376(0) may display the first computed image in a UI system, such as the UI system 13-1000 of FIG. 13-4A. In such an embodiment, the user may control a slider control, such as the slider control 13-1030, to adjust the processing of the at least two digital images transmitted to the data center 11-480. For example, user manipulation of a slider control may result in commands being transmitted to the data center 11-480. In one embodiment, the commands transmitted to the data center 11-480 may include mix weights for use in adjusting the processing of the at least two digital images. In other embodiments, the request to adjust processing of the at least two digital images includes any instructions from the wireless mobile device 11-376(0) that the data center 11-480 may use to again process the at least two digital images and generate a second computed image.

As shown in FIG. 11-8, upon receiving the request to adjust processing, the data center 11-480 re-processes the at least two digital images to generate a second computed image. In one embodiment, the data center 11-480 may re-process the at least two digital images using parameters received from the wireless mobile device 11-376(0). In such an embodiment, the parameters may be provided as input with the at least two digital images to an HDR processing algorithm that executes at the data center 11-480. After generating the second computed image, the second computed image may be then transmitted from the data center 11-480 to the wireless mobile device 11-376(0) for display to the user.

Referring again to FIG. 11-8, the wireless mobile device 11-376(0) shares the second computed image with another wireless mobile device 11-376(1). In one embodiment, the wireless mobile device 11-376(0) may share any computed image received from the data center 11-480 with the other wireless mobile device 11-376(1). For example, the wireless mobile device 11-376(0) may share the first computed image received from the data center 11-480. As shown in FIG. 11-8, the data center 11-480 communicates with the wireless mobile device 11-376(0) and the wireless mobile device 11-376(1) over the same data network 11-474. Of course, in other embodiments the wireless mobile device 11-376(0) may communicate with the data center 11-480 via a network different than a network utilized by the data center 11-480 and the wireless mobile device 11-376(1) for communication.

In another embodiment, the wireless mobile device 11-376(0) may share a computed image with the other wireless mobile device 11-376(1) by transmitting a sharing request to data center 11-480. For example, the wireless mobile device 11-376(0) may request that the data center 11-480 forward the second computed to the other wireless mobile device 11-376(1). In response to receiving the sharing request, the data center 11-480 may then transmit the second computed image to the wireless mobile device 11-376(1). In an embodiment, transmitting the second computed image to the other wireless mobile device 11-376(1) may include sending a URL at which the other wireless mobile device 11-376(1) may access the second computed image.

Still further, as shown in FIG. 11-8, after receiving the second computed image, the other wireless mobile device 11-376(1) may send to the data center 11-480 a request to adjust processing of the at least two digital images. For example, the other wireless mobile device 11-376(1) may display the second computed image in a UI system, such as the UI system 13-1000 of FIG. 13-4A. A user of the other wireless mobile device 11-376(1) may manipulate UI controls to adjust the processing of the at least two digital images transmitted to the data center 11-480 by the wireless mobile device 11-376(0). For example, user manipulation of a slider control at the other wireless mobile device 11-376(1) may result in commands being generated and transmitted to data center 11-480 for processing. In an embodiment, the request to adjust the processing of the at least two digital images sent from the other wireless mobile device 11-376(1) includes the commands generated based on the user manipulation of the slider control at the other wireless mobile device 11-376(1). In other embodiments, the request to adjust processing of the at least two digital images includes any instructions from the wireless mobile device 11-376(1) that the data center 11-480 may use to again process the at least two digital images and generate a third computed image.

As shown in FIG. 11-8, upon receiving the request to adjust processing, the data center 11-480 re-processes the at least two digital images to generate a third computed image. In one embodiment, the data center 11-480 may re-process the at least two digital images using mix weights received from the wireless mobile device 11-376(1). In such an embodiment, the mix weights received from the wireless mobile device 11-376(1) may be provided as input with the at least two digital images to an HDR processing algorithm that executes at the data center 11-480. After generating the third computed image, the third computed image is then transmitted from the data center 11-480 to the wireless mobile device 11-376(1) for display. Still further, after receiving the third computed image, the wireless mobile device 11-376(1) may send to the data center 11-480 a request to store the third computed image. In another embodiment, other wireless mobile devices 11-376 in communication with the data center 11-480 may request storage of a computed image. For example, in the context of FIG. 11-8, the wireless mobile device 11-376(0) may at any time request storage of the first computed image or the second computed image.

In response to receiving a request to store a computed image, the data center 11-480 may store the computed image for later retrieval. For example, the stored computed image may be stored such that the computed image may be later retrieved without re-applying the processing that was applied to generate the computed image. In one embodiment, the data center 11-480 may store computed images within a storage system 11-486 local to the data center 11-480. In other embodiments, the data center 11-480 may store computed images within hardware devices not local to the data center 11-480, such as a data center 11-481. In such embodiments, the data center 11-480 may transmit the computed images over the data network 11-474 for storage.

Still further, in some embodiments, a computed image may be stored with a reference to the at least two digital images utilized to generate the computed image. For example, the computed image may be associated with the at least two digital images utilized to generate the computed image, such as through a URL served by data center 11-480 or 11-481. By linking the stored computed image to the at least two digital images, any user or device with access to the computed image may also be given the opportunity to subsequently adjust the processing applied to the at least two digital images, and thereby generate a new computed image.

To this end, users of wireless mobile devices 11-376 may leverage processing capabilities of a data center 11-480 accessible via a data network 11-474 to generate an HDR image utilizing digital images that other wireless mobile devices 11-376 have captured and subsequently provided access to. For example, digital signals comprising digital images may be transferred over a network for being combined remotely, and the combined digital signals may result in at least a portion of a HDR image. Still further, a user may be able to adjust a blending of two or more digital images to generate a new HDR photograph without relying on their wireless mobile device 11-376 to perform the processing or computation necessary to generate the new HDR photograph. Subsequently, the user's device may receive at least a portion of a HDR image resulting from a combination of two or more digital signals. Accordingly, the user's wireless mobile device 11-376 may conserve power by offloading HDR processing to a data center. Further, the user may be able to effectively capture HDR photographs despite not having a wireless mobile device 11-376 capable of performing high-power processing tasks associated with HDR image generation. Finally, the user may be able to obtain an HDR photograph generated using an algorithm determined to be best for a photographic scene without having to select the HDR algorithm himself or herself and without having installed software that implements such an HDR algorithm on their wireless mobile device 11-376. For example, the user may rely on the data center 11-480 to identify and to select a best HDR algorithm for a particular photographic scene.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Figures 1, 12:
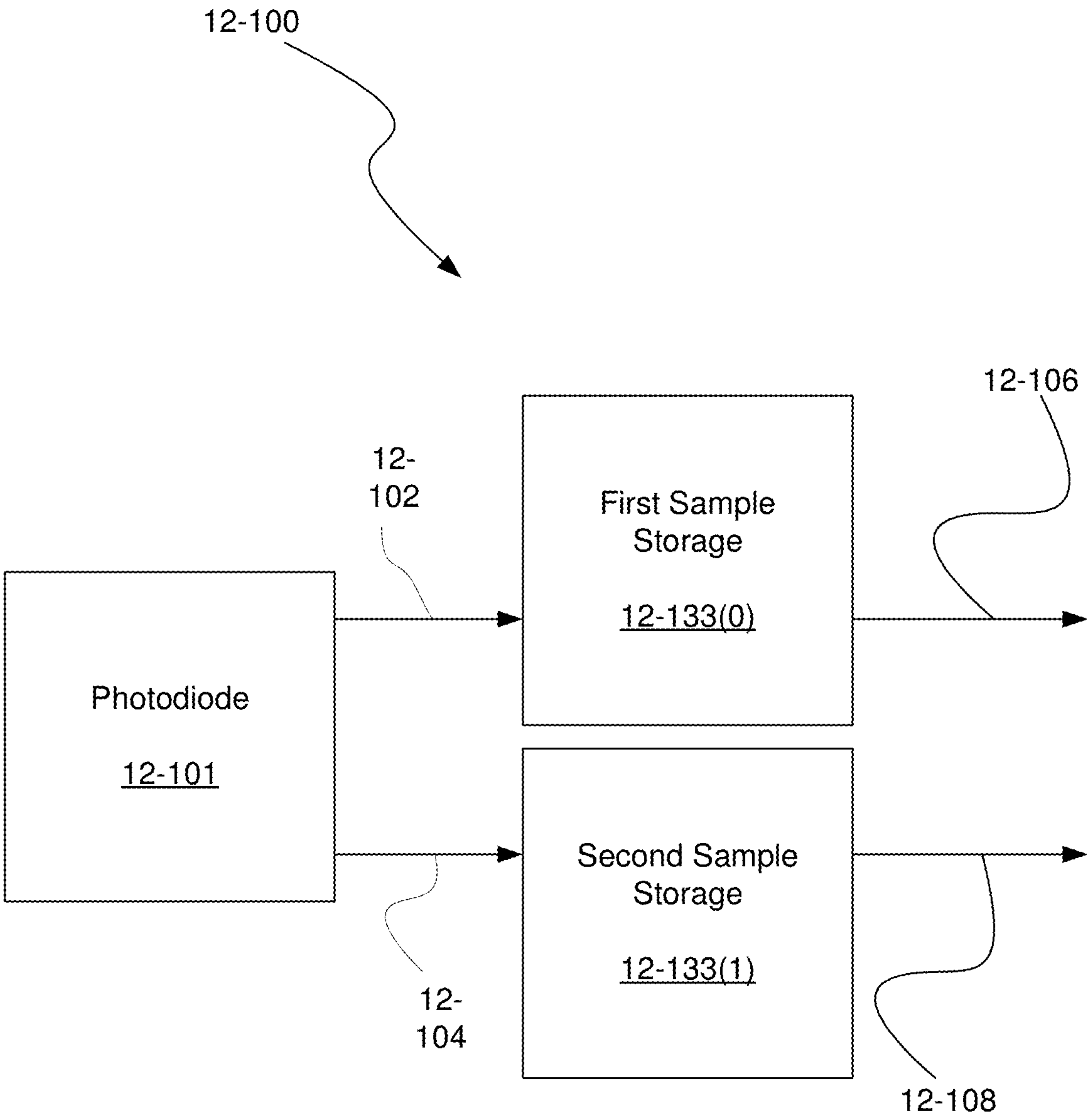
Figures 2, 12:
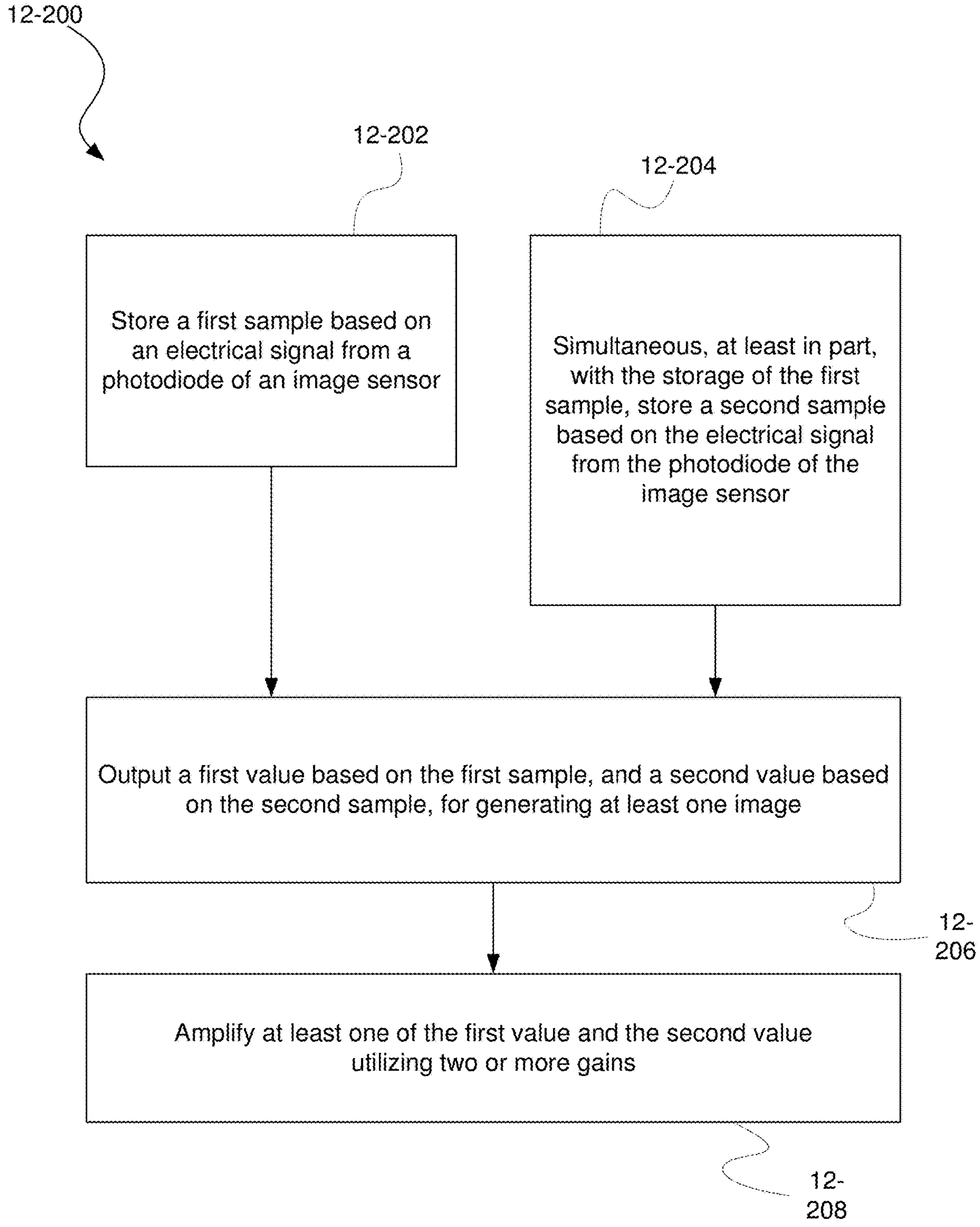

FIG. 12-1 illustrates a system 12-100 for simultaneously capturing multiple images, in accordance with one possible embodiment. As an option, the system 12-100 may be implemented in the context of any of the Figures disclosed herein. Of course, however, the system 12-100 may be implemented in any desired environment. Further, the aforementioned definitions may equally apply to the description below.

As shown in FIG. 12-1, the system 12-100 includes a first input 12-102 that is provided to a first sample storage node 12-133(0) based on a photodiode 12-101, and a second input 12-104 provided simultaneously, at least in part, to a second sample storage node 12-133(1) based on the photodiode 12-101. Accordingly, based on the input 12-102 to the first sample storage node 12-133(0) and the input 12-104 to the second sample storage node 12-133(1), a first sample is stored to the first sample storage node 12-133(0) simultaneously, at least in part, with storage of a second sample to the second sample storage node 12-133(1). In one embodiment, simultaneous storage of the first sample during a first time duration and storing the second sample during a second time duration includes storing the first sample and the second sample at least partially contemporaneously. In one embodiment, an entirety of the first sample may be stored simultaneously with storage of at least a portion of the second sample. For example, storage of the second sample may occur during an entirety of the storing of the first sample; however, because storage of the second sample may occur over a greater period of time than storage of the first sample, storage of the first sample may occur during only a portion of the storing of the second sample. In an embodiment, storage of the first sample and the second sample may be started at the same time.

While the following discussion describes an image sensor apparatus and method for simultaneously capturing multiple images using one or more photodiodes of an image sensor, any photo-sensing electrical element or photosensor may be used or implemented.

In one embodiment, the photodiode 12-101 may comprise any semiconductor diode that generates a potential difference, current, or changes its electrical resistance, in response to photon absorption. Accordingly, the photodiode 12-101 may be used to detect or measure a light intensity. Further, the input 12-102 and the input 12-104 received at sample storage nodes 12-133(0) and 12-133(1), respectively, may be based on the light intensity detected or measured by the photodiode 12-101. In such an embodiment, the first sample stored at the first sample storage node 12-133(0) may be based on a first exposure time to light at the photodiode 12-101, and the second sample stored at the second sample storage node 12-133(1) may be based on a second exposure time to the light at the photodiode 12-101.

In one embodiment, the first input 12-102 may include an electrical signal from the photodiode 12-101 that is received at the first sample storage node 12-133(0), and the second input 12-104 may include an electrical signal from the photodiode 12-101 that is received at the second sample storage node 12-133(1). For example, the first input 12-102 may include a current that is received at the first sample storage node 12-133(0), and the second input 12-104 may include a current that is received at the second sample storage node 12-133(1). In another embodiment, the first input 12-102 and the second input 12-104 may be transmitted, at least partially, on a shared electrical interconnect. In other embodiments, the first input 12-102 and the second input 12-104 may be transmitted on different electrical interconnects. In some embodiments, the input 12-102 may be the same as the input 12-104. For example, the input 12-102 and the input 12-104 may each include the same current. In other embodiments, the input 12-102 may include a first current, and the input 12-104 may include a second current that is different than the first current. In yet other embodiments, the first input 12-102 may include any input from which the first sample storage node 12-133(0) may be operative to store a first sample, and the second input 12-104 may include any input from which the second sample storage node 12-133(1) may be operative to store a second sample.

In one embodiment, the first input 12-102 and the second input 12-104 may include an electronic representation of a portion of an optical image that has been focused on an image sensor that includes the photodiode 12-101. In such an embodiment, the optical image may be focused on the image sensor by a lens. The electronic representation of the optical image may comprise spatial color intensity information, which may include different color intensity samples (e.g. red, green, and blue light, etc.). In other embodiments, the spatial color intensity information may also include samples for white light. In one embodiment, the optical image may be an optical image of a photographic scene. In some embodiments, the photodiode 12-101 may be a single photodiode of an array of photodiodes of an image sensor. Such an image sensor may comprise a complementary metal oxide semiconductor (CMOS) image sensor, or charge-coupled device (CCD) image sensor, or any other technically feasible form of image sensor. In other embodiments, photodiode 12-101 may include two or more photodiodes.

In one embodiment, each sample storage node 12-133 includes a charge storing device for storing a sample, and the stored sample may be a function of a light intensity detected at the photodiode 12-101. For example, each sample storage node 12-133 may include a capacitor for storing a charge as a sample. In such an embodiment, each capacitor stores a charge that corresponds to an accumulated exposure during an exposure time or sample time. For example, current received at each capacitor from an associated photodiode may cause the capacitor, which has been previously charged, to discharge at a rate that is proportional to an incident light intensity detected at the photodiode. The remaining charge of each capacitor may be subsequently output from the capacitor as a value. For example, the remaining charge of each capacitor may be output as an analog value that is a function of the remaining charge on the capacitor.

To this end, an analog value received from a capacitor may be a function of an accumulated intensity of light detected at an associated photodiode. In some embodiments, each sample storage node 12-133 may include circuitry operable for receiving input based on a photodiode. For example, such circuitry may include one or more transistors. The one or more transistors may be configured for rendering the sample storage node 12-133 responsive to various control signals, such as sample, reset, and row select signals received from one or more controlling devices or components. In other embodiments, each sample storage node 12-133 may include any device for storing any sample or value that is a function of a light intensity detected at the photodiode 12-101.

Further, as shown in FIG. 12-1, the first sample storage node 12-133(0) outputs first value 12-106, and the second sample storage node 12-133(1) outputs second value 12-108. In one embodiment, the first sample storage node 12-133(0) outputs the first value 12-106 based on the first sample stored at the first sample storage node 12-133(0), and the second sample storage node 12-133(1) outputs the second value 12-108 based on the second sample stored at the second sample storage node 12-133(1).

In some embodiments, the first sample storage node 12-133(0) outputs the first value 12-106 based on a charge stored at the first sample storage node 12-133(0), and the second sample storage node 12-133(1) outputs the second value 12-108 based on a second charge stored at the second sample storage node 12-133(1). The first value 12-106 may be output serially with the second value 12-108, such that one value is output prior to the other value; or the first value 12-106 may be output in parallel with the output of the second value 12-108. In various embodiments, the first value 12-106 may include a first analog value, and the second value 12-108 may include a second analog value. Each of these values may include a current, which may be output for inclusion in an analog signal that includes at least one analog value associated with each photodiode of a photodiode array. In such embodiments, the first analog value 12-106 may be included in a first analog signal, and the second analog value 12-108 may be included in a second analog signal that is different than the first analog signal. In other words, a first analog signal may be generated to include an analog value associated with each photodiode of a photodiode array, and a second analog signal may also be generated to include a different analog value associated with each of the photodiodes of the photodiode array. An analog signal may be a set of spatially discrete intensity samples, each represented by continuous analog values.

To this end, a single photodiode array may be utilized to generate a plurality of analog signals. The plurality of analog signal may be generated concurrently or in parallel. Further, the plurality of analog signals may each be amplified utilizing two or more gains, and each amplified analog signal may be converted to one or more digital signals such that two or more digital signals may be generated in total, where each digital signal may include a digital image. Accordingly, due to the partially contemporaneous storage of the first sample and the second sample, a single photodiode array may be utilized to concurrently generate multiple digital signals or digital images, where each digital signal is associated with a different exposure time or sample time of the same photographic scene. In such an embodiment, multiple digital signals having different exposure characteristics may be simultaneously generated for a single photographic scene. Such a collection of digital signals or digital images may be referred to as an image stack.

In certain embodiments, an analog signal comprises a plurality of distinct analog signals, and a signal amplifier comprises a corresponding set of distinct signal amplifier circuits. For example, each pixel within a row of pixels of an image sensor may have an associated distinct analog signal within an analog signal, and each distinct analog signal may have a corresponding distinct signal amplifier circuit. Further, two or more amplified analog signals may each include gain-adjusted analog pixel data representative of a common analog value from at least one pixel of an image sensor. For example, for a given pixel of an image sensor, a given analog value may be output in an analog signal, and then, after signal amplification operations, the given analog value is represented by a first amplified value in a first amplified analog signal, and by a second amplified value in a second amplified analog signal. Analog pixel data may be analog signal values associated with one or more given pixels.

FIG. 12-2 illustrates a method 12-200 for simultaneously capturing multiple images, in accordance with one embodiment. As an option, the method 12-200 may be carried out in the context of any of the Figures disclosed herein. Of course, however, the method 12-200 may be carried out in any desired environment. Further, the aforementioned definitions may equally apply to the description below.

As shown in operation 12-202, a first sample is stored based on an electrical signal from a photodiode of an image sensor. Further, simultaneous, at least in part, with the storage of the first sample, a second sample is stored based on the electrical signal from the photodiode of the image sensor at operation 12-204. As noted above, the photodiode of the image sensor may comprise any semiconductor diode that generates a potential difference, or changes its electrical resistance, in response to photon absorption. Accordingly, the photodiode may be used to detect or measure light intensity, and the electrical signal from the photodiode may include a photodiode current.

In some embodiments, each sample may include an electronic representation of a portion of an optical image that has been focused on an image sensor that includes the photodiode. In such an embodiment, the optical image may be focused on the image sensor by a lens. The electronic representation of the optical image may comprise spatial color intensity information, which may include different color intensity samples (e.g. red, green, and blue light, etc.). In other embodiments, the spatial color intensity information may also include samples for white light. In one embodiment, the optical image may be an optical image of a photographic scene. The photodiode may be a single photodiode of an array of photodiodes of the image sensor. Such an image sensor may comprise a complementary metal oxide semiconductor (CMOS) image sensor, or charge-coupled device (CCD) image sensor, or any other technically feasible form of image sensor.

In the context of one embodiment, each of the samples may be stored by storing energy. For example, each of the samples may include a charged stored on a capacitor. In such an embodiment, the first sample may include a first charge stored at a first capacitor, and the second sample may include a second charge stored at a second capacitor. In one embodiment, the first sample may be different than the second sample. For example, the first sample may include a first charge stored at a first capacitor, and the second sample may include a second charge stored at a second capacitor that is different than the first charge. In one embodiment, the first sample may be different than the second sample due to different sample times. For example, the first sample may be stored by charging or discharging a first capacitor for a first period of time, and the second sample may be stored by charging or discharging a second capacitor for a second period of time, where the first capacitor and the second capacitor may be substantially identical and charged or discharged at a substantially identical rate. Further, the second capacitor may be charged or discharged simultaneously, at least in part, with the charging or discharging of the first capacitor.

In another embodiment, the first sample may be different than the second sample due to, at least partially, different storage characteristics. For example, the first sample may be stored by charging or discharging a first capacitor for a period of time, and the second sample may be stored by charging or discharging a second capacitor for the same period of time, where the first capacitor and the second capacitor may have different storage characteristics and/or be charged or discharged at different rates. More specifically, the first capacitor may have a different capacitance than the second capacitor. Of course, the second capacitor may be charged or discharged simultaneously, at least in part, with the charging or discharging of the first capacitor.

Additionally, as shown at operation 12-206, after storage of the first sample and the second sample, a first value is output based on the first sample, and a second value is output based on the second sample, for generating at least one image. In the context of one embodiment, the first value and the second value are transmitted or output in sequence. For example, the first value may be transmitted prior to the second value. In another embodiment, the first value and the second value may be transmitted in parallel.

In one embodiment, each output value may comprise an analog value. For example, each output value may include a current representative of the associated stored sample. More specifically, the first value may include a current value representative of the stored first sample, and the second value may include a current value representative of the stored second sample. In one embodiment, the first value is output for inclusion in a first analog signal, and the second value is output for inclusion in a second analog signal different than the first analog signal. Further, each value may be output in a manner such that it is combined with other values output based on other stored samples, where the other stored samples are stored responsive to other electrical signals received from other photodiodes of an image sensor. For example, the first value may be combined in a first analog signal with values output based on other samples, where the other samples were stored based on electrical signals received from photodiodes that neighbor the photodiode from which the electrical signal utilized for storing the first sample was received. Similarly, the second value may be combined in a second analog signal with values output based on other samples, where the other samples were stored based on electrical signals received from the same photodiodes that neighbor the photodiode from which the electrical signal utilized for storing the second sample was received.

Finally, at operation 12-208, at least one of the first value and the second value are amplified utilizing two or more gains. In one embodiment, where each output value comprises an analog value, amplifying at least one of the first value and the second value may result in at least two amplified analog values. In another embodiment, where the first value is output for inclusion in a first analog signal, and the second value is output for inclusion in a second analog signal different than the first analog signal, one of the first analog signal or the second analog signal may be amplified utilizing the two or more gains. For example, a first analog signal that includes the first value may be amplified with a first gain and a second gain, such that the first value is amplified with the first gain and the second gain. Of course, more than two analog signals may be amplified using two or more gains. In one embodiment, each amplified analog signal may be converted to a digital signal comprising a digital image.

To this end, an array of photodiodes may be utilized to generate a first analog signal based on a first set of samples captured at a first exposure time or sample time, and a second analog signal based on a second set of samples captured at a second exposure time or sample time, where the first set of samples and the second set of samples may be two different sets of samples of the same photographic scene. Further, each analog signal may include an analog value generated based on each photodiode of each pixel of an image sensor. Each analog value may be representative of a light intensity measured at the photodiode associated with the analog value. Accordingly, an analog signal may be a set of spatially discrete intensity samples, each represented by continuous analog values, and analog pixel data may be analog signal values associated with one or more given pixels. Still further, each analog signal may undergo subsequent processing, such as amplification, which may facilitate conversion of the analog signal into one or more digital signals, each including digital pixel data, which may each comprise a digital image.

The embodiments disclosed herein may advantageously enable a camera module to sample images comprising an image stack with lower (e.g. at or near zero, etc.) inter-sample time (e.g. interframe, etc.) than conventional techniques. In certain embodiments, images comprising the image stack are effectively sampled or captured simultaneously, which may reduce inter-sample time to zero. In other embodiments, the camera module may sample images in coordination with the strobe unit to reduce inter-sample time between an image sampled without strobe illumination and an image sampled with strobe illumination.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figures 3, 12:
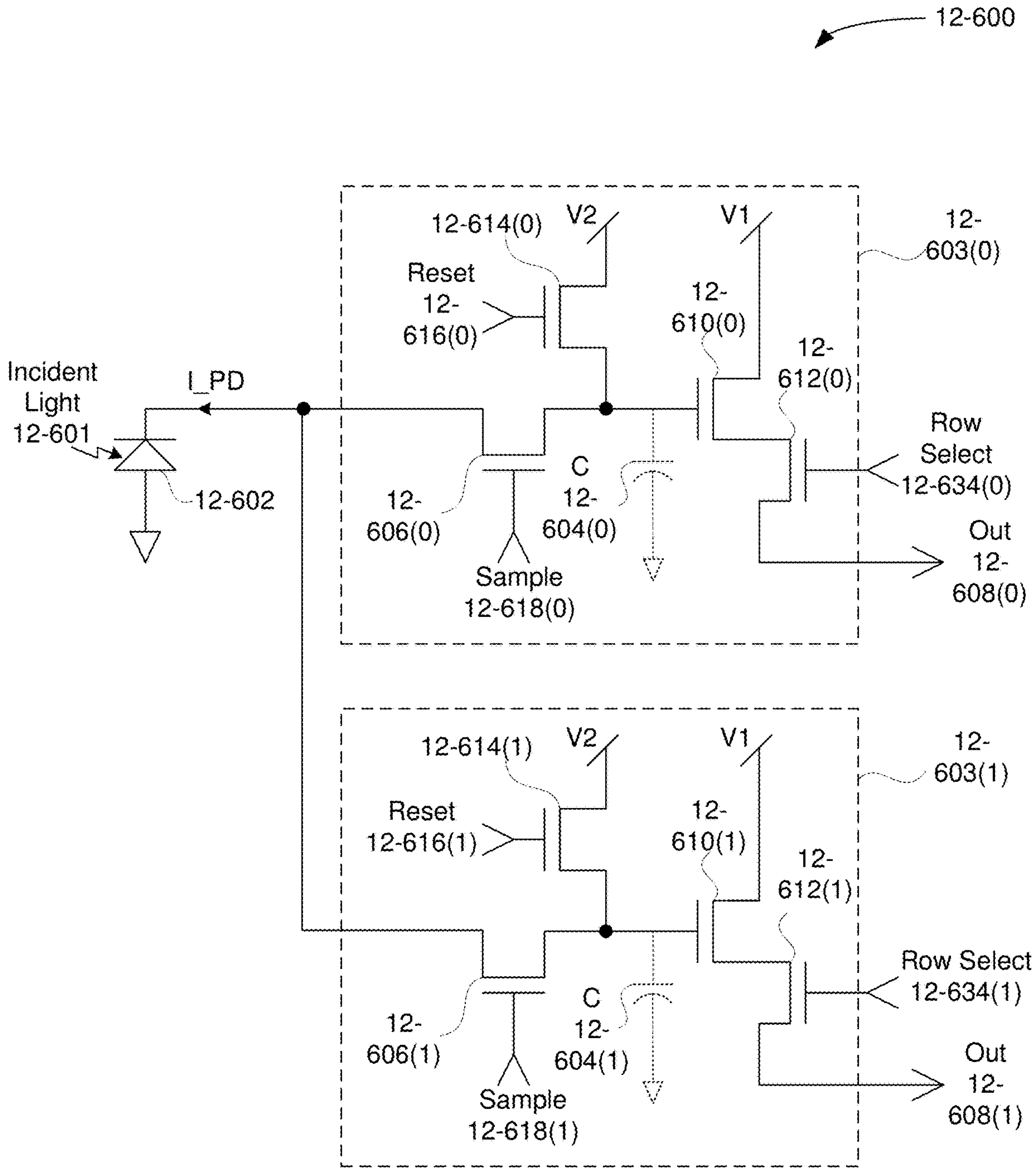
Figures 4, 12:
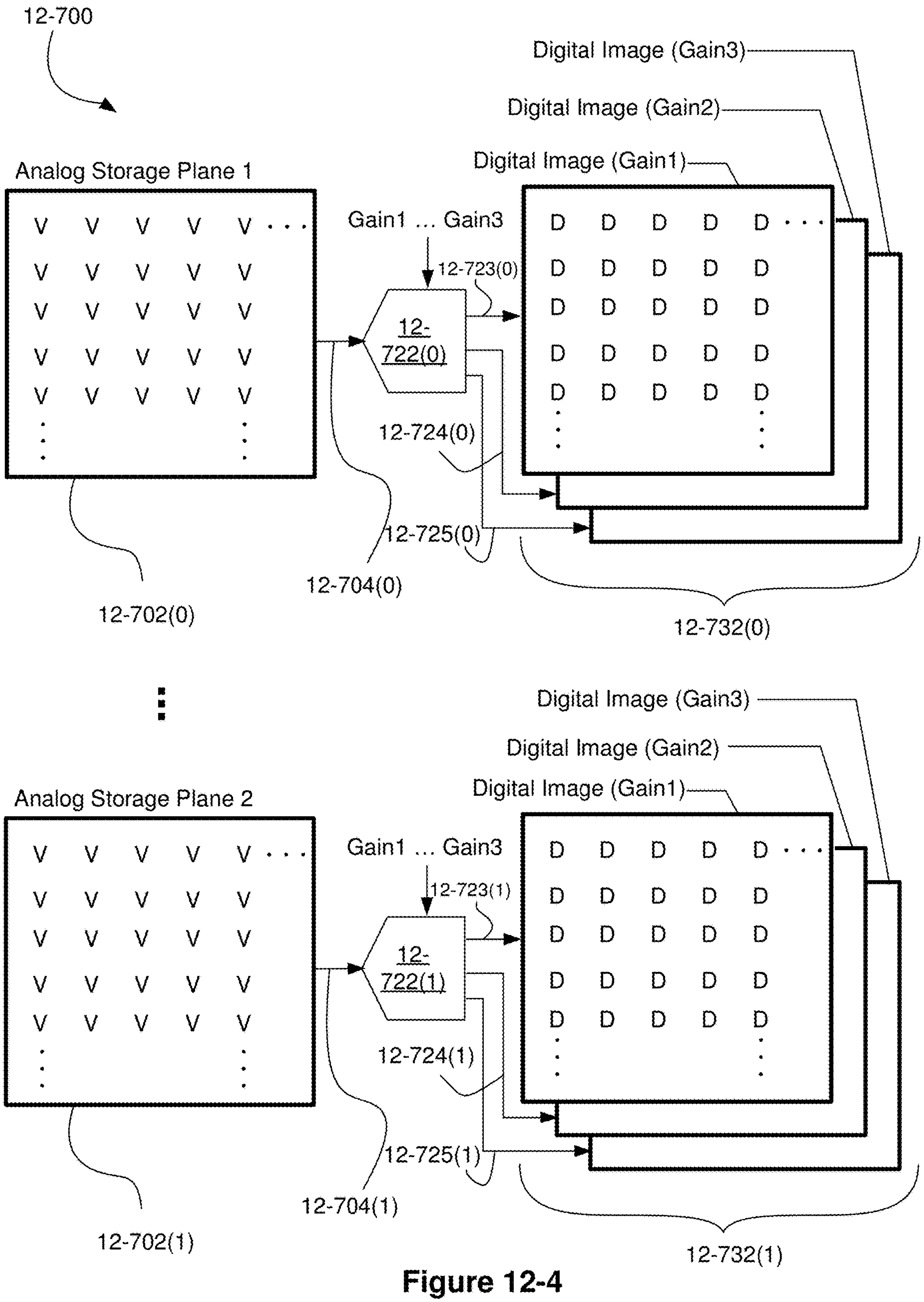

FIG. 12-3 illustrates a circuit diagram for a photosensitive cell 12-600, in accordance with one possible embodiment. As an option, the cell 12-600 may be implemented in the context of any of the Figures disclosed herein. Of course, however, the system 12-600 may be implemented in any desired environment. Further, the aforementioned definitions may equally apply to the description below.

As shown in FIG. 12-3, a photosensitive cell 12-600 includes a photodiode 12-602 coupled to a first analog sampling circuit 12-603(0) and a second analog sampling circuit 12-603(1). The photodiode 12-602 may be implemented as the photodiode 12-101 described within the context of FIG. 12-1, or any of the photodiodes 11-562 of FIG. 11-3E. Further, an analog sampling circuit 12-603 may be implemented as a sample storage node 12-133 described within the context of FIG. 12-1. In one embodiment, a unique instance of photosensitive cell 12-600 may be implemented as each of cells 11-542-11-545 comprising a pixel 11-540 within the context of FIGS. 11-3A-11-3E.

As shown, the photosensitive cell 12-600 comprises two analog sampling circuits 12-603, and a photodiode 12-602. The two analog sampling circuits 12-603 include a first analog sampling circuit 12-603(0) which is coupled to a second analog sampling circuit 12-603(1). As shown in FIG. 12-3, the first analog sampling circuit 12-603(0) comprises transistors 12-606(0), 12-610(0), 12-612(0), 12-614(0), and a capacitor 12-604(0); and the second analog sampling circuit 12-603(1) comprises transistors 12-606(1), 12-610(1), 12-612(1), 12-614(1), and a capacitor 12-604(1). In one embodiment, each of the transistors 12-606, 12-610, 12-612, and 12-614 may be a field-effect transistor.

The photodiode 12-602 may be operable to measure or detect incident light 12-601 of a photographic scene. In one embodiment, the incident light 12-601 may include ambient light of the photographic scene. In another embodiment, the incident light 12-601 may include light from a strobe unit utilized to illuminate the photographic scene. Of course, the incident light 12-601 may include any light received at and measured by the photodiode 12-602. Further still, and as discussed above, the incident light 12-601 may be concentrated on the photodiode 12-602 by a microlens, and the photodiode 12-602 may be one photodiode of a photodiode array that is configured to include a plurality of photodiodes arranged on a two-dimensional plane.

In one embodiment, the analog sampling circuits 12-603 may be substantially identical. For example, the first analog sampling circuit 12-603(0) and the second analog sampling circuit 12-603(1) may each include corresponding transistors, capacitors, and interconnects configured in a substantially identical manner. Of course, in other embodiments, the first analog sampling circuit 12-603(0) and the second analog sampling circuit 12-603(1) may include circuitry, transistors, capacitors, interconnects and/or any other components or component parameters (e.g. capacitance value of each capacitor 12-604) which may be specific to just one of the analog sampling circuits 12-603.

In one embodiment, each capacitor 12-604 may include one node of a capacitor comprising gate capacitance for a transistor 12-610 and diffusion capacitance for transistors 12-606 and 12-614. The capacitor 12-604 may also be coupled to additional circuit elements (not shown) such as, without limitation, a distinct capacitive structure, such as a metal-oxide stack, a poly capacitor, a trench capacitor, or any other technically feasible capacitor structures.

With respect to analog sampling circuit 12-603(0), when reset 12-616(0) is active (low), transistor 12-614(0) provides a path from voltage source V2 to capacitor 12-604(0), causing capacitor 12-604(0) to charge to the potential of V2. When sample signal 12-618(0) is active, transistor 12-606(0) provides a path for capacitor 12-604(0) to discharge in proportion to a photodiode current (I_PD) generated by the photodiode 12-602 in response to the incident light 12-601. In this way, photodiode current I_PD is integrated for a first exposure time when the sample signal 12-618(0) is active, resulting in a corresponding first voltage on the capacitor 12-604(0). This first voltage on the capacitor 12-604(0) may also be referred to as a first sample. When row select 12-634(0) is active, transistor 12-612(0) provides a path for a first output current from V1 to output 12-608(0). The first output current is generated by transistor 12-610(0) in response to the first voltage on the capacitor 12-604(0). When the row select 12-634(0) is active, the output current at the output 12-608(0) may therefore be proportional to the integrated intensity of the incident light 12-601 during the first exposure time. In one embodiment, sample signal 12-618(0) is asserted substantially simultaneously over substantially all photo sensitive cells 12-600 comprising an image sensor to implement a global shutter for all first samples within the image sensor.

With respect to analog sampling circuit 12-603(1), when reset 12-616(1) is active (low), transistor 12-614(1) provides a path from voltage source V2 to capacitor 12-604(1), causing capacitor 12-604(1) to charge to the potential of V2. When sample signal 12-618(1) is active, transistor 12-606(1) provides a path for capacitor 12-604(1) to discharge in proportion to a photodiode current (I_PD) generated by the photodiode 12-602 in response to the incident light 12-601. In this way, photodiode current I_PD is integrated for a second exposure time when the sample signal 12-618(1) is active, resulting in a corresponding second voltage on the capacitor 12-604(1). This second voltage on the capacitor 12-604(1) may also be referred to as a second sample. When row select 12-634(1) is active, transistor 12-612(1) provides a path for a second output current from V1 to output 12-608(1). The second output current is generated by transistor 12-610(1) in response to the second voltage on the capacitor 12-604(1). When the row select 12-634(1) is active, the output current at the output 12-608(1) may therefore be proportional to the integrated intensity of the incident light 12-601 during the second exposure time. In one embodiment, sample signal 12-618(1) is asserted substantially simultaneously over substantially all photo sensitive cells 12-600 comprising an image sensor to implement a global shutter for all second samples within the image sensor.

To this end, by controlling the first exposure time and the second exposure time such that the first exposure time is different than the second exposure time, the capacitor 12-604(0) may store a first voltage or sample, and the capacitor 12-604(1) may store a second voltage or sample different than the first voltage or sample, in response to a same photodiode current I_PD being generated by the photodiode 12-602. In one embodiment, the first exposure time and the second exposure time begin at the same time, overlap in time, and end at different times. Accordingly, each of the analog sampling circuits 12-603 may be operable to store an analog value corresponding to a different exposure. As a benefit of having two different exposure times, in situations where a photodiode 12-602 is exposed to a sufficient threshold of incident light 12-601, a first capacitor 12-604(0) may provide a blown out, or over-exposed image portion, and a second capacitor 12-604(1) of the same cell 12-600 may provide an analog value suitable for generating a digital image. Thus, for each cell 12-600, a first capacitor 12-604 may more effectively capture darker image content than another capacitor 12-604 of the same cell 12-600.

In other embodiments, it may be desirable to use more than two analog sampling circuits for the purpose of storing more than two voltages or samples. For example, an embodiment with three or more analog sampling circuits could be implemented such that each analog sampling circuit concurrently samples for a different exposure time the same photodiode current I_PD being generated by a photodiode. In such an embodiment, three or more voltages or samples could be obtained. To this end, a current I_PD generated by the photodiode 12-602 may be split over a number of analog sampling circuits 12-603 coupled to the photodiode 12-602 at any given time. Consequently, exposure sensitivity may vary as a function of the number of analog sampling circuits 12-603 that are coupled to the photodiode 12-602 at any given time, and the amount of capacitance that is associated with each analog sampling circuit 12-603. Such variation may need to be accounted for in determining an exposure time or sample time for each analog sampling circuit 12-603.

In various embodiments, capacitor 12-604(0) may be substantially identical to capacitor 12-604(1). For example, the capacitors 12-604(0) and 12-604(1) may have substantially identical capacitance values. In such embodiments, the photodiode current I_PD may be split evenly between the capacitors 12-604(0) and 12-604(1) during a first portion of time where the capacitors are discharged at a substantially identical rage. The photodiode current may be subsequently directed to one selected capacitor of the capacitors 12-604(0) and 12-604(1) during a second portion of time in which the selected capacitor discharges at twice the rate associated with the first portion of time. In one embodiment, to obtain different voltages or samples between the capacitors 12-604(0) and 12-604(1), a sample signal 12-618 of one of the analog sampling circuits may be activated for a longer or shorter period of time than a sample signal 12-618 is activated for any other analog sampling circuits 12-603 receiving at least a portion of photodiode current I_PD.

In an embodiment, an activation of a sample signal 12-618 of one analog sampling circuit 12-603 may be configured to be controlled based on an activation of another sample signal 12-618 of another analog sampling circuit 12-603 in the same cell 12-600. For example, the sample signal 12-618(0) of the first analog sampling circuit 12-603(0) may be activated for a period of time that is controlled to be at a ratio of 2:1 with respect to an activation period for the sample signal 12-618(1) of the second analog sampling circuit 12-603(1). By way of a more specific example, a controlled ratio of 2:1 may result in the sample signal 12-618(0) being activated for a period of 1/30 of a second when the sample signal 12-618(1) has been selected to be activated for a period of 1/60 of a second. Of course activation or exposure times for each sample signal 12-618 may be controlled to be for other periods of time, such as for 1 second, 1/120 of a second, 1/1000 of a second, etc., or for other ratios, such as 0.5:1, 1.2:1, 1.5:1, 3:1, etc. In one embodiment, a period of activation of at least one of the sample signals 12-618 may be controlled by software executing on a digital photographic system, such as digital photographic system 300, or by a user, such as a user interacting with a "manual mode" of a digital camera. For example, a period of activation of at least one of the sample signals 12-618 may be controlled based on a user selection of a shutter speed. To achieve a 2:1 exposure, a 3:1 exposure time may be needed due to current splitting during a portion of the overall exposure process.

In other embodiments, the capacitors 12-604(0) and 12-604(1) may have different capacitance values. In one embodiment, the capacitors 12-604(0) and 12-604(1) may have different capacitance values for the purpose of rendering one of the analog sampling circuits 12-603 more or less sensitive to the current I_PD from the photodiode 12-602 than other analog sampling circuits 12-603 of the same cell 12-600. For example, a capacitor 12-604 with a significantly larger capacitance than other capacitors 12-604 of the same cell 12-600 may be less likely to fully discharge when capturing photographic scenes having significant amounts of incident light 12-601. In such embodiments, any difference in stored voltages or samples between the capacitors 12-604(0) and 12-604(1) may be a function of the different capacitance values in conjunction with different activation times of the sample signals 12-618.

In an embodiment, sample signal 12-618(0) and sample signal 12-618(1) may be asserted to an active state independently. In another embodiment, the sample signal 12-618(0)

and the sample signal 12-618(1) are asserted to an active state simultaneously, and one is deactivated at an earlier time than the other, to generate images that are sampled substantially simultaneously for a portion of time, but with each having a different effective exposure time or sample time. Whenever both the sample signal 12-618(0) and the sample signal 12-618(1) are asserted simultaneously, photodiode current I_PD may be divided between discharging capacitor 12-604(0) and discharging capacitor 12-604(1).

In one embodiment, the photosensitive cell 12-600 may be configured such that the first analog sampling circuit 12-603(0) and the second analog sampling circuit 12-603(1) share at least one shared component. In various embodiments, the at least one shared component may include a photodiode 12-602 of an image sensor. In other embodiments, the at least one shared component may include a reset, such that the first analog sampling circuit 12-603(0) and the second analog sampling circuit 12-603(1) may be reset concurrently utilizing the shared reset. In the context of FIG. 12-3, the photosensitive cell 12-600 may include a shared reset between the analog sampling circuits 12-603(0) and 12-603(1). For example, reset 12-616(0) may be coupled to reset 12-616(1), and both may be asserted together such that the reset 12-616(0) is the same signal as the reset 12-616(1), which may be used to simultaneously reset both of the first analog sampling circuit 12-603(0) and the second analog sampling circuit 12-603(1). After reset, the first analog sampling circuit 12-603(0) and the second analog sampling circuit 12-603(1) may be asserted to sample together.

In another embodiment, a sample signal 12-618(0) for the first analog sampling circuit 12-603(0) may be independent of a sample signal 12-618(1) for the second analog sampling circuit 12-603(1). In one embodiment, a row select 12-634 (0) for the first analog sampling circuit 12-603(0) may be independent of a row select 12-634(1) for the second analog sampling circuit 12-603(1). In other embodiments, the row select 12-634(0) for the first analog sampling circuit 12-603 (0) may include a row select signal that is shared with the row select 12-634(1) for the second analog sampling circuit 12-603(1). In yet another embodiment, output signal at output 12-608(0) of the first analog sampling circuit 12-603 (0) may be independent of output signal at output 12-608(1) of the second analog sampling circuit 12-603(1). In another embodiment, the output signal of the first analog sampling circuit 12-603(0) may utilize an output shared with the output signal of the second analog sampling circuit 12-603 (1). In embodiments sharing an output, it may be necessary for the row select 12-634(0) of the first analog sampling circuit 12-603(0) to be independent of the row select 12-634 (1) of the second analog sampling circuit 12-603(1). In embodiments sharing a row select signal, it may be necessary for a line of the output 12-608(0) of the first analog sampling circuit 12-603(0) to be independent of a line of the output 12-608(1) of the second analog sampling circuit 12-603(1).

In one embodiment, a column signal 11-532 of FIG. 11-3A may comprise one output signal of a plurality of independent output signals of the outputs 12-608(0) and 12-608(1). Further, a row control signal 11-530 of FIG. 11-3A may comprise one of independent row select signals of the row selects 12-634(0) and 12-634(1), which may be shared for a given row of pixels. In embodiments of cell 12-600 that implement a shared row select signal, the row select 12-634(0) may be coupled to the row select 12-634(1), and both may be asserted together simultaneously.

In an embodiment, a given row of pixels may include one or more rows of cells, where each row of cells includes multiple instances of the photosensitive cell 12-600, such that each row of cells includes multiple pairs of analog sampling circuits 12-603(0) and 12-603(1). For example, a given row of cells may include a plurality of first analog sampling circuits 12-603(0), and may further include a different second analog sampling circuit 12-603(1) paired to each of the first analog sampling circuits 12-603(0). In one embodiment, the plurality of first analog sampling circuits 12-603(0) may be driven independently from the plurality of second analog sampling circuits 12-603(1). In another embodiment, the plurality of first analog sampling circuits 12-603(0) may be driven in parallel with the plurality of second analog sampling circuits 12-603(1). For example, each output 12-608(0) of each of the first analog sampling circuits 12-603(0) of the given row of cells may be driven in parallel through one set of column signals 11-532. Further, each output 12-608(1) of each of the second analog sampling circuits 12-603(1) of the given row of cells may be driven in parallel through a second, parallel, set of column signals 11-532.

To this end, the photosensitive cell 12-600 may be utilized to simultaneously, at least in part, generate and store both of a first sample and a second sample based on the incident light 12-601. Specifically, the first sample may be captured and stored on a first capacitor during a first exposure time, and the second sample may be simultaneously, at least in part, captured and stored on a second capacitor during a second exposure time. Further, an output current signal corresponding to the first sample of the two different samples may be coupled to output 12-608(0) when row select 12-634(0) is activated, and an output current signal corresponding to the second sample of the two different samples may be coupled to output 12-608(1) when row select 12-634(1) is activated.

In one embodiment, the first value may be included in a first analog signal containing first analog pixel data for a plurality of pixels at the first exposure time, and the second value may be included in a second analog signal containing second analog pixel data for the plurality of pixels at the second exposure time. Further, the first analog signal may be utilized to generate a first stack of one or more digital images, and the second analog signal may be utilized to generate a second stack of one or more digital images. Any differences between the first stack of images and the second stack of images may be based on, at least in part, a difference between the first exposure time and the second exposure time. Accordingly, an array of photosensitive cells 12-600 may be utilized for simultaneously capturing multiple digital images.

In one embodiment, a unique instance of analog pixel data 12-621 may include, as an ordered set of individual analog values, all analog values output from all corresponding analog sampling circuits or sample storage nodes. For example, in the context of the foregoing figures, each cell of cells 11-542-11-545 of a plurality of pixels 11-540 of a pixel array 11-510 may include both a first analog sampling circuit 12-603(0) and a second analog sampling circuit 12-603(1). Thus, the pixel array 11-510 may include a plurality of first analog sampling circuits 12-603(0) and also include a plurality of second analog sampling circuits 12-603(1). In other words, the pixel array 11-510 may include a first analog sampling circuit 12-603(0) for each cell, and also include a second analog sampling circuit 12-603(1) for each cell. In an embodiment, a first instance of analog pixel data 12-621 may be received containing a discrete analog value from each analog sampling circuit of a plurality of first analog sampling circuits 12-603(0), and a second instance of analog pixel data 12-621 may be received containing a discrete analog value from each analog sampling circuit of a plurality of second analog sampling circuits 12-603(1). Thus, in embodiments where cells of a pixel array include two or more analog sampling circuits, the pixel array may output two or more discrete analog signals, where each analog signal includes a unique instance of analog pixel data 12-621.

In some embodiments, only a subset of the cells of a pixel array may include two or more analog sampling circuits. For example, not every cell may include both a first analog sampling circuit 12-603(0) and a second analog sampling circuit 12-603(1).

With continuing reference to FIG. 11-4, the analog-to-digital unit 11-622 includes an amplifier 11-650 and an analog-to-digital converter 11-654. In one embodiment, the amplifier 11-650 receives an instance of analog pixel data 11-621 and a gain 11-652, and applies the gain 11-652 to the analog pixel data 11-621 to generate gain-adjusted analog pixel data 11-623. The gain-adjusted analog pixel data 11-623 is transmitted from the amplifier 11-650 to the analog-to-digital converter 11-654. The analog-to-digital converter 11-654 receives the gain-adjusted analog pixel data 11-623, and converts the gain-adjusted analog pixel data 11-623 to the digital pixel data 11-625, which is then transmitted from the analog-to-digital converter 11-654. In other embodiments, the amplifier 11-650 may be implemented within the column read out circuit 11-520 instead of within the analog-to-digital unit 11-622. The analog-to-digital converter 11-654 may convert the gain-adjusted analog pixel data 11-623 to the digital pixel data 11-625 using any technically feasible analog-to-digital conversion technique.

In an embodiment, the gain-adjusted analog pixel data 11-623 results from the application of the gain 11-652 to the analog pixel data 11-621. In one embodiment, the gain 11-652 may be selected by the analog-to-digital unit 11-622. In another embodiment, the gain 11-652 may be selected by the control unit 11-514, and then supplied from the control unit 11-514 to the analog-to-digital unit 11-622 for application to the analog pixel data 11-621.

It should be noted, in one embodiment, that a consequence of applying the gain 11-652 to the analog pixel data 11-621 is that analog noise may appear in the gain-adjusted analog pixel data 11-623. If the amplifier 11-650 imparts a significantly large gain to the analog pixel data 11-621 in order to obtain highly sensitive data from of the pixel array 11-510, then a significant amount of noise may be expected within the gain-adjusted analog pixel data 11-623. In one embodiment, the detrimental effects of such noise may be reduced by capturing the optical scene information at a reduced overall exposure. In such an embodiment, the application of the gain 11-652 to the analog pixel data 11-621 may result in gain-adjusted analog pixel data with proper exposure and reduced noise.

In one embodiment, the amplifier 11-650 may be a transimpedance amplifier (TIA). Furthermore, the gain 11-652 may be specified by a digital value. In one embodiment, the digital value specifying the gain 11-652 may be set by a user of a digital photographic device, such as by operating the digital photographic device in a "manual" mode. Still yet, the digital value may be set by hardware or software of a digital photographic device. As an option, the digital value may be set by the user working in concert with the software of the digital photographic device.

In one embodiment, a digital value used to specify the gain 11-652 may be associated with an ISO. In the field of photography, the ISO system is a well-established standard for specifying light sensitivity. In one embodiment, the amplifier 11-650 receives a digital value specifying the gain 11-652 to be applied to the analog pixel data 11-621. In another embodiment, there may be a mapping from conventional ISO values to digital gain values that may be provided as the gain 11-652 to the amplifier 11-650. For example, each of ISO 100, ISO 200, ISO 400, ISO 800, ISO 1600, etc. may be uniquely mapped to a different digital gain value, and a selection of a particular ISO results in the mapped digital gain value being provided to the amplifier 11-650 for application as the gain 11-652. In one embodiment, one or more ISO values may be mapped to a gain of 1. Of course, in other embodiments, one or more ISO values may be mapped to any other gain value.

Accordingly, in one embodiment, each analog pixel value may be adjusted in brightness given a particular ISO value. Thus, in such an embodiment, the gain-adjusted analog pixel data 11-623 may include brightness corrected pixel data, where the brightness is corrected based on a specified ISO. In another embodiment, the gain-adjusted analog pixel data 11-623 for an image may include pixels having a brightness in the image as if the image had been sampled at a certain ISO.

In accordance with an embodiment, the digital pixel data 11-625 may comprise a plurality of digital values representing pixels of an image captured using the pixel array 11-510.

In one embodiment, an instance of digital pixel data 11-625 may be output for each instance of analog pixel data 11-621 received. Thus, where a pixel array 11-510 includes a plurality of first analog sampling circuits 12-603(0) and also includes a plurality of second analog sampling circuits 12-603(1), then a first instance of analog pixel data 11-621 may be received containing a discrete analog value from each of the first analog sampling circuits 12-603(0) and a second instance of analog pixel data 11-621 may be received containing a discrete analog value from each of the second analog sampling circuits 12-603(1). In such an embodiment, a first instance of digital pixel data 11-625 may be output based on the first instance of analog pixel data 11-621, and a second instance of digital pixel data 11-625 may be output based on the second instance of analog pixel data 11-621.

Further, the first instance of digital pixel data 11-625 may include a plurality of digital values representing pixels of a first image captured using the plurality of first analog sampling circuits 12-603(0) of the pixel array 11-510, and the second instance of digital pixel data 11-625 may include a plurality of digital values representing pixels of a second image captured using the plurality of second analog sampling circuits 12-603(1) of the pixel array 11-510. Where the first instance of digital pixel data 11-625 and the second instance of digital pixel data 11-625 are generated utilizing the same gain 11-652, then any differences between the instances of digital pixel data may be a function of a difference between the exposure time of the plurality of first analog sampling circuits 12-603(0) and the exposure time of the plurality of second analog sampling circuits 12-603(1).

In some embodiments, two or more gains 11-652 may be applied to an instance of analog pixel data 11-621, such that two or more instances of digital pixel data 11-625 may be output for each instance of analog pixel data 11-621. For example, two or more gains may be applied to both of a first instance of analog pixel data 11-621 and a second instance of analog pixel data 11-621. In such an embodiment, the first instance of analog pixel data 11-621 may contain a discrete analog value from each of a plurality of first analog sampling circuits 12-603(0) of a pixel array 11-510, and the second instance of analog pixel data 11-621 may contain a discrete analog value from each of a plurality of second analog sampling circuits 12-603(1) of the pixel array 11-510. Thus, four or more instances of digital pixel data 11-625 associated with four or more corresponding digital images may be generated from a single capture by the pixel array 11-510 of a photographic scene.

FIG. 12-4 illustrates a system 12-700 for converting analog pixel data of an analog signal to digital pixel data, in accordance with an embodiment. As an option, the system 12-700 may be implemented in the context of the details of any of the Figures disclosed herein. Of course, however, the system 12-700 may be implemented in any desired environment. Further, the aforementioned definitions may equally apply to the description below.

The system 12-700 is shown in FIG. 12-4 to include a first analog storage plane 12-702(0), a first analog-to-digital unit 12-722(0), and a first digital image stack 12-732(0), and is shown to further include a second analog storage plane 12-702(1), a second analog-to-digital unit 12-722(1), and a second digital image stack 12-732(1). Accordingly, the system 12-700 is shown to include at least two analog storage planes 12-702(0) and 12-702(1). As illustrated in FIG. 12-4, a plurality of analog values are each depicted as a "V" within each of the analog storage planes 12-702, and corresponding digital values are each depicted as a "D" within digital images of each of the image stacks 12-732.

In the context of certain embodiments, each analog storage plane 12-702 may comprise any collection of one or more analog values. In some embodiments, each analog storage plane 12-702 may comprise at least one analog pixel value for each pixel of a row or line of a pixel array. Still yet, in another embodiment, each analog storage plane 12-702 may comprise at least one analog pixel value for each pixel of an entirety of a pixel array, which may be referred to as a frame. For example, each analog storage plane 12-702 may comprise an analog pixel value, or more generally, an analog value for each cell of each pixel of every line or row of a pixel array.

Further, the analog values of each analog storage plane 12-702 are output as analog pixel data 12-704 to a corresponding analog-to-digital unit 12-722. For example, the analog values of analog storage plane 12-702(0) are output as analog pixel data 12-704(0) to analog-to-digital unit 12-722(0), and the analog values of analog storage plane 12-702(1) are output as analog pixel data 12-704(1) to analog-to-digital unit 12-722(1). In one embodiment, each analog-to-digital unit 12-722 may be substantially identical to the analog-to-digital unit 11-622 described within the context of FIG. 11-4. For example, each analog-to-digital unit 12-722 may comprise at least one amplifier and at least one analog-to-digital converter, where the amplifier is operative to receive a gain value and utilize the gain value to gain-adjust analog pixel data received at the analog-to-digital unit 12-722. Further, in such an embodiment, the amplifier may transmit gain-adjusted analog pixel data to an analog-to-digital converter, which then generates digital pixel data from the gain-adjusted analog pixel data. To this end, an analog-to-digital conversion may be performed on the contents of each of two or more different analog storage planes 12-702.

In the context of the system 12-700 of FIG. 12-4, each analog-to-digital unit 12-722 receives corresponding analog pixel data 12-704, and applies at least two different gains to the received analog pixel data 12-704 to generate at least a first gain-adjusted analog pixel data and a second gain-adjusted analog pixel data. For example, the analog-to-digital unit 12-722(0) receives analog pixel data 12-704(0), and applies at least two different gains to the analog pixel data 12-704(0) to generate at least a first gain-adjusted analog pixel data and a second gain-adjusted analog pixel data based on the analog pixel data 12-704(0); and the analog-to-digital unit 12-722(1) receives analog pixel data 12-704(1), and applies at least two different gains to the analog pixel data 12-704(1) to generate at least a first gain-adjusted analog pixel data and a second gain-adjusted analog pixel data based on the analog pixel data 12-704(1).

Further, each analog-to-digital unit 12-722 converts each generated gain-adjusted analog pixel data to digital pixel data, and then outputs at least two digital outputs. In one embodiment, each analog-to-digital unit 12-722 provides a different digital output corresponding to each gain applied to the received analog pixel data 12-704. With respect to FIG. 12-4 specifically, the analog-to-digital unit 12-722(0) is shown to generate a first digital signal comprising first digital pixel data 12-723(0) corresponding to a first gain (Gain1), a second digital signal comprising second digital pixel data 12-724(0) corresponding to a second gain (Gain2), and a third digital signal comprising third digital pixel data 12-725(0) corresponding to a third gain (Gain3). Similarly, the analog-to-digital unit 12-722(1) is shown to generate a first digital signal comprising first digital pixel data 12-723(1) corresponding to a first gain (Gain1), a second digital signal comprising second digital pixel data 12-724(1) corresponding to a second gain (Gain2), and a third digital signal comprising third digital pixel data 12-725(1) corresponding to a third gain (Gain3). Each instance of each digital pixel data may comprise a digital image, such that each digital signal comprises a digital image.

Accordingly, as a result of the analog-to-digital unit 12-722(0) applying each of Gain1, Gain2, and Gain3 to the analog pixel data 12-704(0), and thereby generating first digital pixel data 12-723(0), second digital pixel data 12-724(0), and third digital pixel data 12-725(0), the analog-to-digital unit 12-722(0) generates a stack of digital images, also referred to as an image stack 12-732(0). Similarly, as a result of the analog-to-digital unit 12-722(1) applying each of Gain1, Gain2, and Gain3 to the analog pixel data 12-704(1), and thereby generating first digital pixel data 12-723(1), second digital pixel data 12-724(1), and third digital pixel data 12-725(1), the analog-to-digital unit 12-722(1) generates a second stack of digital images, also referred to as an image stack 12-732(1).

In one embodiment, each analog-to-digital unit 12-722 applies in sequence at least two gains to the analog values. For example, within the context of FIG. 12-4, the analog-to-digital unit 12-722(0) first applies Gain1 to the analog pixel data 12-704(0), then subsequently applies Gain2 to the same analog pixel data 12-704(0), and then subsequently applies Gain3 to the same analog pixel data 12-704(0). In other embodiments, each analog-to-digital unit 12-722 may apply in parallel at least two gains to the analog values. For example, an analog-to-digital unit may apply Gain1 to received analog pixel data in parallel with application of Gain2 and Gain3 to the analog pixel data. To this end, each instance of analog pixel data 12-704 is amplified utilizing at least two gains.

In one embodiment, the gains applied to the analog pixel data 12-704(0) at the analog-to-digital unit 12-722(0) may be the same as the gains applied to the analog pixel data 12-704(1) at the analog-to-digital unit 12-722(1). By way of a specific example, the Gain1 applied by both of the analog-to-digital unit 12-722(0) and the analog-to-digital unit 12-722(1) may be a gain of 12-1.0, the Gain2 applied by both of the analog-to-digital unit 12-722(0) and the analog-to-digital unit 12-722(1) may be a gain of 12-2.0, and the Gain3 applied by both of the analog-to-digital unit 12-722 (0) and the analog-to-digital unit 12-722(1) may be a gain of 4.0. In another embodiment, one or more of the gains applied to the analog pixel data 12-704(0) at the analog-to-digital unit 12-722(0) may be different from the gains applied to the analog pixel data 12-704(1) at the analog-to-digital unit 12-722(1). For example, the Gain1 applied at the analog-to-digital unit 12-722(0) may be a gain of 12-1.0, and the Gain1 applied at the analog-to-digital unit 12-722(1) may be a gain of 12-2.0. Accordingly, the gains applied at each analog-to-digital unit 12-722 may be selected dependently or independently of the gains applied at other analog-to-digital units 12-722 within system 12-700.

In accordance with one embodiment, the at least two gains may be determined using any technically feasible technique based on an exposure of a photographic scene, metering data, user input, detected ambient light, a strobe control, or any combination of the foregoing. For example, a first gain of the at least two gains may be determined such that half of the digital values from an analog storage plane 12-702 are converted to digital values above a specified threshold (e.g., a threshold of 0.5 in a range of 0.0 to 12-1.0) for the dynamic range associated with digital values comprising a first digital image of an image stack 12-732, which can be characterized as having an "EV0" exposure. Continuing the example, a second gain of the at least two gains may be determined as being twice that of the first gain to generate a second digital image of the image stack 12-732 characterized as having an "EV+1" exposure. Further still, a third gain of the at least two gains may be determined as being half that of the first gain to generate a third digital image of the image stack 12-732 characterized as having an "EV−1" exposure.

In one embodiment, an analog-to-digital unit 12-722 converts in sequence a first instance of the gain-adjusted analog pixel data to the first digital pixel data 12-723, a second instance of the gain-adjusted analog pixel data to the second digital pixel data 12-724, and a third instance of the gain-adjusted analog pixel data to the third digital pixel data 12-725. For example, an analog-to-digital unit 12-722 may first convert a first instance of the gain-adjusted analog pixel data to first digital pixel data 12-723, then subsequently convert a second instance of the gain-adjusted analog pixel data to second digital pixel data 12-724, and then subsequently convert a third instance of the gain-adjusted analog pixel data to third digital pixel data 12-725. In other embodiments, an analog-to-digital unit 12-722 may perform such conversions in parallel, such that one or more of a first digital pixel data 12-723, a second digital pixel data 12-724, and a third digital pixel data 12-725 are generated in parallel.

Still further, as shown in FIG. 12-4, each first digital pixel data 12-723 provides a first digital image. Similarly, each second digital pixel data 12-724 provides a second digital image, and each third digital pixel data 12-725 provides a third digital image. Together, each set of digital images produced using the analog values of a single analog storage plane 12-702 comprises an image stack 12-732. For example, image stack 12-732(0) comprises digital images produced using analog values of the analog storage plane 12-702(0), and image stack 12-732(1) comprises the digital images produced using the analog values of the analog storage plane 12-702(1).

As illustrated in FIG. 12-4, all digital images of an image stack 12-732 may be based upon a same analog pixel data 12-704. However, each digital image of an image stack 12-732 may differ from other digital images in the image stack 12-732 as a function of a difference between the gains used to generate the two digital images. Specifically, a digital image generated using the largest gain of at least two gains may be visually perceived as the brightest or more exposed of the digital images of the image stack 12-732. Conversely, a digital image generated using the smallest gain of the at least two gains may be visually perceived as the darkest and less exposed than other digital images of the image stack 12-732. To this end, a first light sensitivity value may be associated with first digital pixel data 12-723, a second light sensitivity value may be associated with second digital pixel data 12-724, and a third light sensitivity value may be associated with third digital pixel data 12-725. Further, because each of the gains may be associated with a different light sensitivity value, a first digital image or first digital signal may be associated with a first light sensitivity value, a second digital image or second digital signal may be associated with a second light sensitivity value, and a third digital image or third digital signal may be associated with a third light sensitivity value.

It should be noted that while a controlled application of gain to the analog pixel data may greatly aid in HDR image generation, an application of too great of gain may result in a digital image that is visually perceived as being noisy, over-exposed, and/or blown-out. In one embodiment, application of two stops of gain to the analog pixel data may impart visually perceptible noise for darker portions of a photographic scene, and visually imperceptible noise for brighter portions of the photographic scene. In another embodiment, a digital photographic device may be configured to provide an analog storage plane for analog pixel data of a captured photographic scene, and then perform at least two analog-to-digital samplings of the same analog pixel data using an analog-to-digital unit 12-722. To this end, a digital image may be generated for each sampling of the at least two samplings, where each digital image is obtained at a different exposure despite all the digital images being generated from the same analog sampling of a single optical image focused on an image sensor.

In one embodiment, an initial exposure parameter may be selected by a user or by a metering algorithm of a digital photographic device. The initial exposure parameter may be selected based on user input or software selecting particular capture variables. Such capture variables may include, for example, ISO, aperture, and shutter speed. An image sensor may then capture a photographic scene at the initial exposure parameter, and populate a first analog storage plane with a first plurality of analog values corresponding to an optical image focused on the image sensor. Simultaneous, at least in part, with populating the first analog storage plane, a second analog storage plane may be populated with a second plurality of analog values corresponding to the optical image focused on the image sensor. In the context of the foregoing Figures, a first analog storage plane 12-702(0) may be populated with a plurality of analog values output from a plurality of first analog sampling circuits 12-603(0) of a pixel array 11-510, and a second analog storage plane 12-702(1) may be populated with a plurality of analog values output from a plurality of second analog sampling circuits 12-603(1) of the pixel array 11-510.

In other words, in an embodiment where each photosensitive cell includes two analog sampling circuits, then two analog storage planes may be configured such that a first of the analog storage planes stores a first analog value output from one of the analog sampling circuits of a cell, and a second of the analog storage planes stores a second analog value output from the other analog sampling circuit of the same cell. In this configuration, each of the analog storage planes may store at least one analog value received from a pixel of a pixel array or image sensor.

Further, each of the analog storage planes may receive and store different analog values for a given pixel of the pixel array or image sensor. For example, an analog value received for a given pixel and stored in a first analog storage plane may be output based on a first sample captured during a first exposure time, and a corresponding analog value received for the given pixel and stored in a second analog storage plane may be output based on a second sample captured during a second exposure time that is different than the first exposure time. Accordingly, in one embodiment, substantially all analog values stored in a first analog storage plane may be based on samples obtained during a first exposure time, and substantially all analog values stored in a second analog storage plane may be based on samples obtained during a second exposure time that is different than the first exposure time.

In the context of the present description, a “single exposure” of a photographic scene at an initial exposure parameter may include simultaneously, at least in part, capturing the photographic scene using two or more sets of analog sampling circuits, where each set of analog sampling circuits may be configured to operate at different exposure times. During capture of the photographic scene using the two or more sets of analog sampling circuits, the photographic scene may be illuminated by ambient light or may be illuminated using a strobe unit. Further, after capturing the photographic scene using the two or more sets of analog sampling circuits, two or more analog storage planes (e.g., one storage plane for each set of analog sampling circuits) may be populated with analog values corresponding to an optical image focused on an image sensor. Next, one or more digital images of a first image stack may be obtained by applying one or more gains to the analog values of a first analog storage plane in accordance with the above systems and methods. Further, one or more digital images of a second image stack may be obtained by applying one or more gains to the analog values of a second analog storage plane in accordance with the above systems and methods.

To this end, one or more image stacks 12-732 may be generated based on a single exposure of a photographic scene. In one embodiment, each digital image of a particular image stack 12-732 may be generated based on a common exposure time or sample time, but be generated utilizing a unique gain. In such an embodiment, each of the image stacks 12-732 of the single exposure of a photographic scene may be generated based on different sample times.

In one embodiment, a first digital image of an image stack 12-732 may be obtained utilizing a first gain in accordance with the above systems and methods. For example, if a digital photographic device is configured such that initial exposure parameter includes a selection of ISO 400, the first gain utilized to obtain the first digital image may be mapped to, or otherwise associated with, ISO 400. This first digital image may be referred to as an exposure or image obtained at exposure value 0 (EV0). Further one more digital images may be obtained utilizing a second gain in accordance with the above systems and methods. For example, the same analog pixel data used to generate the first digital image may be processed utilizing a second gain to generate a second digital image. Still further, one or more digital images may be obtained utilizing a second analog storage plane in accordance with the above systems and methods. For example, second analog pixel data may be used to generate a second digital image, where the second analog pixel data is different from the analog pixel data used to generate the first digital image. Specifically, the analog pixel data used to generate the first digital image may have been captured using a first sample time, and the second analog pixel data may have been captured using a second sample time different than the first sample time. Specifically, the analog pixel data used to generate the first digital image may have been captured during a first exposure time, and the second analog pixel data may have been captured during a second exposure time different than the first exposure time.

To this end, at least two digital images may be generated utilizing different analog pixel data, and then blended to generate an HDR image. The at least two digital images may be blended by blending a first digital signal and a second digital signal. Where the at least two digital images are generated using different analog pixel data captured during a single exposure of a photographic scene, then there may be approximately, or near, zero interframe time between the at least two digital images. As a result of having zero, or near zero, interframe time between at least two digital images of a same photographic scene, an HDR image may be generated, in one possible embodiment, without motion blur or other artifacts typical of HDR photographs.

In one embodiment, after selecting a first gain for generating a first digital image of an image stack 12-732, a second gain may be selected based on the first gain. For example, the second gain may be selected on the basis of it being one stop away from the first gain. More specifically, if the first gain is mapped to or associated with ISO 400, then one stop down from ISO 400 provides a gain associated with ISO 200, and one stop up from ISO 400 provides a gain associated with ISO 800. In such an embodiment, a digital image generated utilizing the gain associated with ISO 200 may be referred to as an exposure or image obtained at exposure value −1 (EV−1), and a digital image generated utilizing the gain associated with ISO 800 may be referred to as an exposure or image obtained at exposure value +1 (EV+1).

Still further, if a more significant difference in exposures is desired between digital images generated utilizing the same analog signal, then the second gain may be selected on the basis of it being two stops away from the first gain. For example, if the first gain is mapped to or associated with ISO 400, then two stops down from ISO 400 provides a gain associated with ISO 100, and two stops up from ISO 400 provides a gain associated with ISO 1600. In such an embodiment, a digital image generated utilizing the gain associated with ISO 100 may be referred to as an exposure or image obtained at exposure value −2 (EV−2), and a digital image generated utilizing the gain associated with ISO 1600 may be referred to as an exposure or image obtained at exposure value +2 (EV+2).

In one embodiment, an ISO and exposure of the EV0 image may be selected according to a preference to generate darker digital images. In such an embodiment, the intention may be to avoid blowing out or overexposing what will be the brightest digital image, which is the digital image generated utilizing the greatest gain. In another embodiment, an EV−1 digital image or EV−2 digital image may be a first generated digital image. Subsequent to generating the EV−1 or EV−2 digital image, an increase in gain at an analog-to-digital unit may be utilized to generate an EV0 digital image, and then a second increase in gain at the analog-to-digital unit may be utilized to generate an EV+1 or EV+2 digital image. In one embodiment, the initial exposure parameter corresponds to an EV-N digital image and subsequent gains are used to obtain an EV0 digital image, an EV+M digital image, or any combination thereof, where N and M are values ranging from 0 to −10.

In one embodiment, three digital images having three different exposures (e.g. an EV−2 digital image, an EV0 digital image, and an EV+2 digital image) may be generated in parallel by implementing three analog-to-digital units. Each analog-to-digital unit may be configured to convert one or more analog signal values to corresponding digital signal values. Such an implementation may be also capable of simultaneously generating all of an EV−1 digital image, an EV0 digital image, and an EV+1 digital image. Similarly, in other embodiments, any combination of exposures may be generated in parallel from two or more analog-to-digital units, three or more analog-to-digital units, or an arbitrary number of analog-to-digital units. In other embodiments, a set of analog-to-digital units may be configured to each operate on either of two or more different analog storage planes.

In one embodiment, a combined image 13-1020 comprises a combination of at least two related digital images. In one embodiment, the combined image 13-1020 comprises, without limitation, a combined rendering of at least two digital images, such as two or more of the digital images of an image stack 12-732(0) and an image stack 12-732(1) of FIG. 12-4. In another embodiment, the digital images used to compute the combined image 13-1020 may be generated by amplifying each of a first analog signal and a second analog signal with at least two different gains, where each analog signal includes optical scene information captured based on an optical image focused on an image sensor. In yet another embodiment, each analog signal may be amplified using the at least two different gains on a pixel-by-pixel, line-by-line, or frame-by-frame basis.

In other embodiments, in addition to the indication point 13-1040-B, there may exist a plurality of additional indication points along the track 13-1032 between the indication points 13-1040-A and 13-1040-C. The additional indication points may be associated with additional digital images. For example, a first image stack 12-732 may be generated to include each of a digital image at EV−1 exposure, a digital image at EV0 exposure, and a digital image at EV+1 exposure. Said image stack 12-732 may be associated with a first analog storage plane captured at a first exposure time, such as the image stack 12-732(0) of FIG. 12-4. Thus, a first image stack may include a plurality of digital images all associated with a first exposure time, where each digital image is associated with a different ISO. Further, a second image stack 12-732 may also be generated to include each of a digital image at EV−1 exposure, a digital image at EV0 exposure, and a digital image at EV+1 exposure. However, the second image stack 12-732 may be associated with a second analog storage plane captured at a second exposure time different than the first exposure time, such as the image stack 12-732(1) of FIG. 12-4. Thus, a second image stack may include a second plurality of digital images all associated with a second exposure time, where each digital image is associated with a different ISO. After analog-to-digital units 12-722(0) and 12-722(1) generate the respective image stacks 12-732, the digital pixel data output by the analog-to-digital units 12-722(0) and 12-722(1) may be arranged together into a single sequence of digital images of increasing or decreasing exposure. In the context of the instant description, no two digital signals of the two image stacks may be associated with a same ISO+exposure time combination, thus each digital image or instance of digital pixel data may be considered as having a unique effective exposure.

In the context of the foregoing figures, arranging the digital images or instances of digital pixel data output by the analog-to-digital units 12-722(0) and 12-722(1) into a single sequence of digital images of increasing or decreasing exposure may be performed according to overall exposure. For example, the single sequence of digital images may combine gain and exposure time to determine an effective exposure. The digital pixel data may be rapidly organized to obtain a single sequence of digital images of increasing effective exposure, such as, for example: 12-723(0), 12-723(1), 12-724(0), 12-724(1), 12-725(0), and 12-725(1). Of course, any sorting of the digital images or digital pixel data based on effective exposure level will depend on an order of application of the gains and generation of the digital signals 12-723-725.

In one embodiment, exposure times and gains may be selected or predetermined for generating a number of adequately different effective exposures. For example, where three gains are to be applied, then each gain may be selected to be two exposure stops away from a nearest selected gain. Further, where multiple exposure times are to be used, then a first exposure time may be selected to be one exposure stop away from a second exposure time. In such an embodiment, selection of three gains separated two exposure stops, and two exposure times separated by one exposure stop, may ensure generation of six digital images, each having a unique effective exposure.

With continuing reference to the digital images of multiple image stacks sorted in a sequence of increasing exposure, each of the digital images may then be associated with indication points along the track 13-1032 of the UI system 13-1000. For example, the digital images may be sorted or sequenced along the track 13-1032 in the order of increasing effective exposure noted previously: 12-723(0), 12-723(1), 12-724(0), 12-724(1), 12-725(0), and 12-725(1). In such an embodiment, the slider control 13-1030 may then be positioned at any point along the track 13-1032 that is between two digital images generated based on two different analog storage planes. As a result, two digital images generated based on two different analog storage planes may then be blended to generate a combined image 13-1020.

For example, the slider control 13-1030 may be positioned at an indication point that may be equally associated with digital pixel data 12-724(0) and digital pixel data 12-724(1). As a result, the digital pixel data 12-724(0), which may include a first digital image generated from a first analog signal captured during a first sample time and amplified utilizing a gain, may be blended with the digital pixel data 12-724(1), which may include a second digital image generated from a second analog signal captured during a second sample time and amplified utilizing the same gain, to generate a combined image 13-1020.

Still further, as another example, the slider control 13-1030 may be positioned at an indication point that may be equally associated with digital pixel data 12-724(1) and digital pixel data 12-725(0). As a result, the digital pixel data 12-724(1), which may include a first digital image generated from a first analog signal captured during a first sample time and amplified utilizing a first gain, may be blended with the digital pixel data 12-725(0), which may include a second digital image generated from a second analog signal captured during a second sample time and amplified utilizing a different gain, to generate a combined image 13-1020.

Thus, as a result of the slider control 13-1030 positioning, two or more digital signals may be blended, and the blended digital signals may be generated utilizing analog values from different analog storage planes. As a further benefit of sorting effective exposures along a slider, and then allowing blend operations based on slider control position, each pair of neighboring digital images may include a higher noise digital image and a lower noise digital image. For example, where two neighboring digital signals are amplified utilizing a same gain, the digital signal generated from an analog signal captured with a lower sample time may have less noise. Similarly, where two neighboring digital signals are amplified utilizing different gains, the digital signal generated from an analog signal amplified with a lower gain value may have less noise. Thus, when digital signals are sorted based on effective exposure along a slider, a blend operation of two or more digital signals may serve to reduce the noise apparent in at least one of the digital signals.

Of course, any two or more effective exposures may be blended based on the indication point of the slider control 13-1030 to generate a combined image 13-1020 in the UI system 13-1000.

One advantage of the present invention is that a digital photograph may be selectively generated based on user input using two or more different images generated from a single exposure of a photographic scene. Accordingly, the digital photograph generated based on the user input may have a greater dynamic range than any of the individual images. Further, the generation of an HDR image using two or more different images with zero, or near zero, interframe time allows for the rapid generation of HDR images without motion artifacts.

Additionally, when there is any motion within a photographic scene, or a capturing device experiences any jitter during capture, any interframe time between exposures may result in a motion blur within a final merged HDR photograph. Such blur can be significantly exaggerated as interframe time increases. This problem renders current HDR photography an ineffective solution for capturing clear images in any circumstance other than a highly static scene.

Further, traditional techniques for generating a HDR photograph involve significant computational resources, as well as produce artifacts which reduce the image quality of the resulting image. Accordingly, strictly as an option, one or more of the above issues may or may not be addressed utilizing one or more of the techniques disclosed herein.

Still yet, in various embodiments, one or more of the techniques disclosed herein may be applied to a variety of markets and/or products. For example, although the techniques have been disclosed in reference to a photo capture, they may be applied to televisions, web conferencing (or live streaming capabilities, etc.), security cameras (e.g. increase contrast to determine characteristic, etc.), automobiles (e.g. driver assist systems, in-car infotainment systems, etc.), and/or any other product which includes a camera input.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Figures 1, 13:
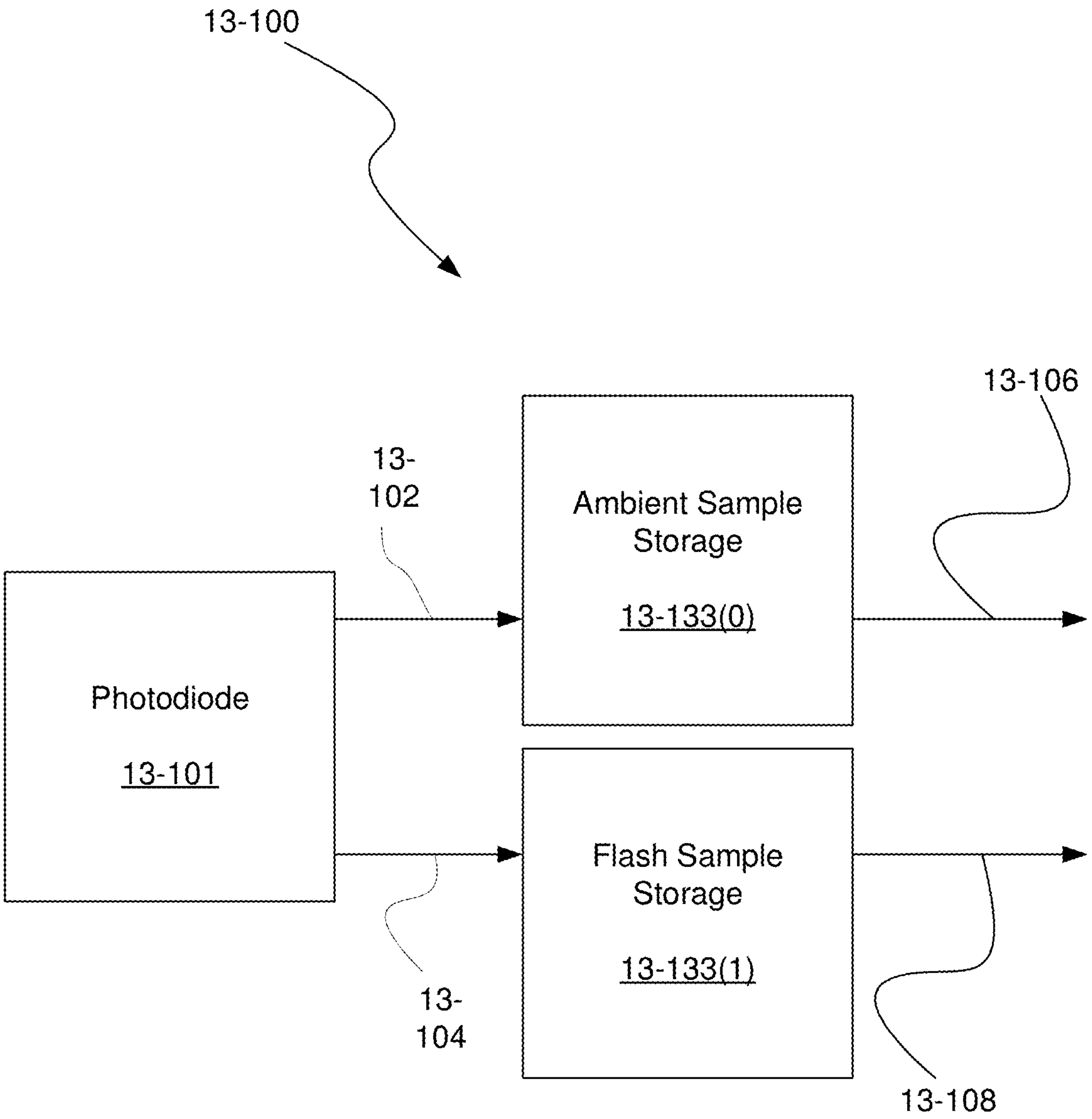
Figures 2, 13:
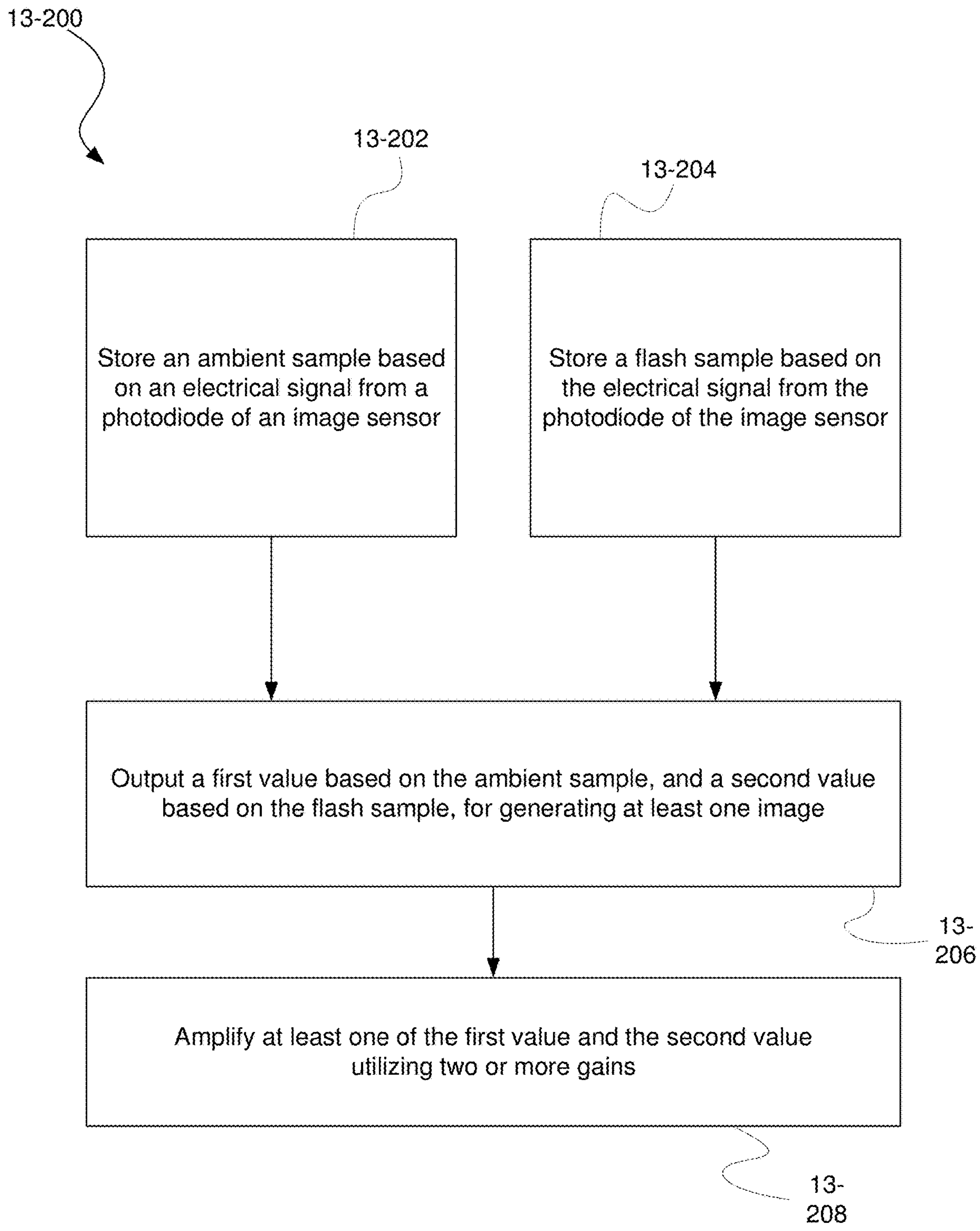
Figures 3, 13:
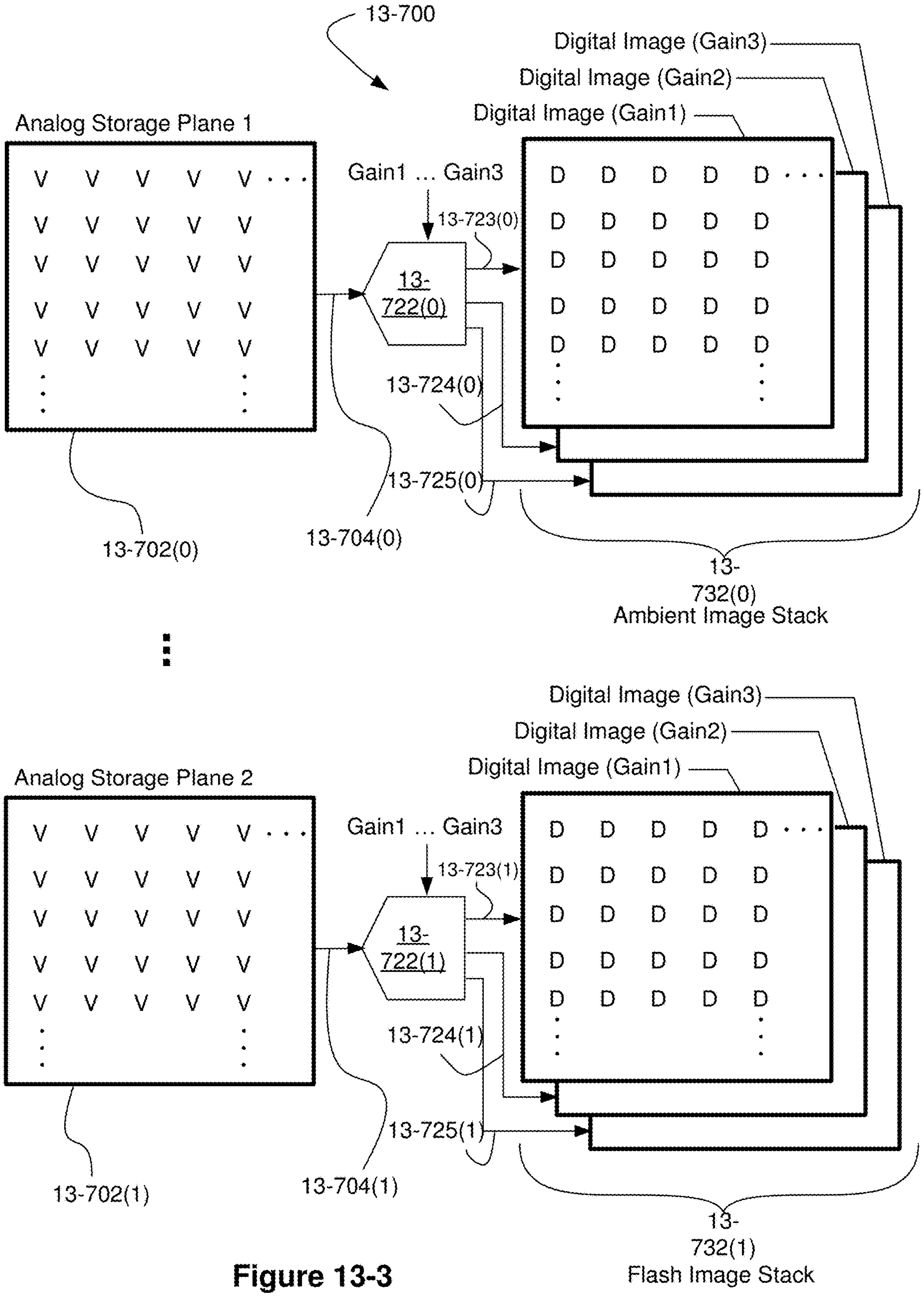
Figures 4A, 13:
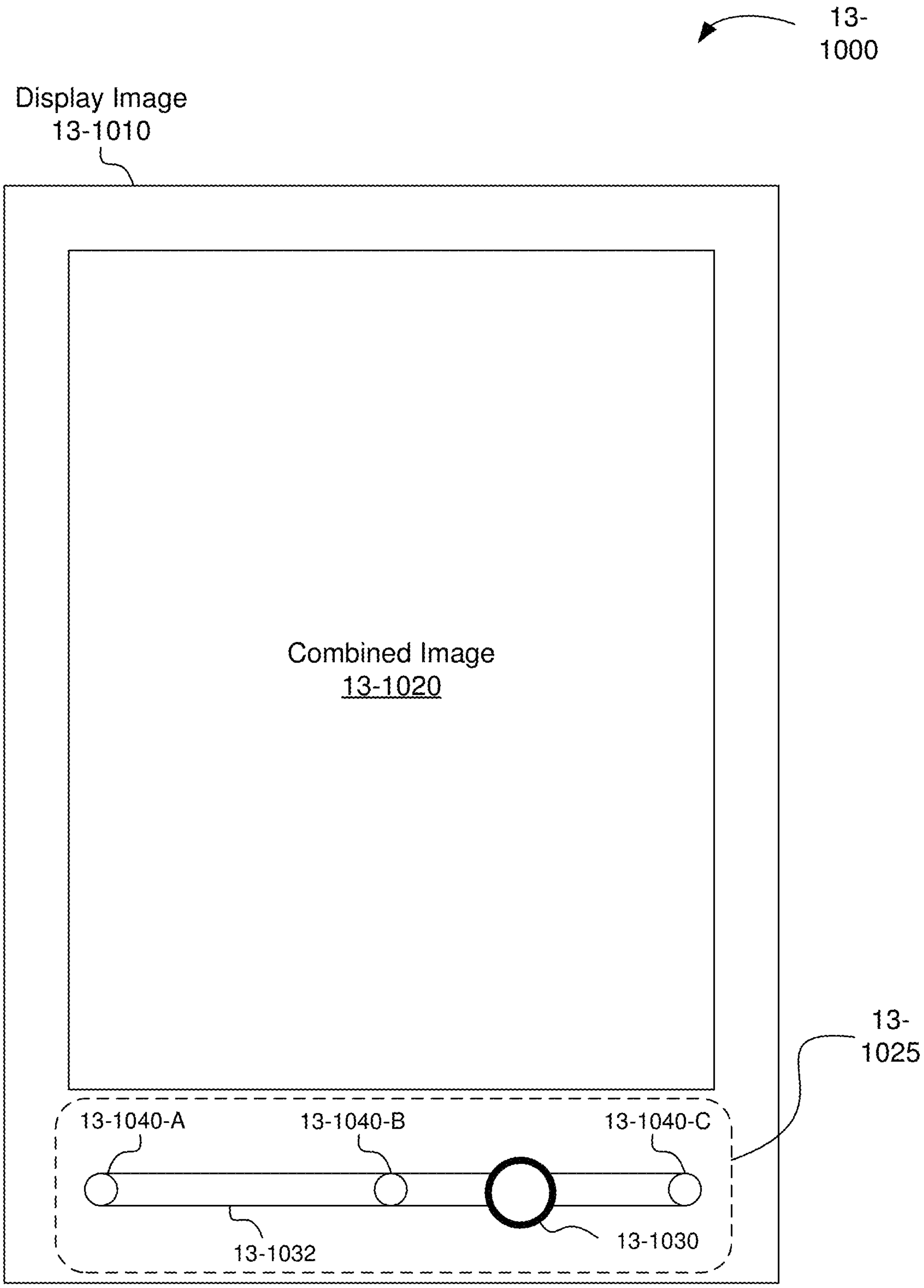
Figures 4B, 13:
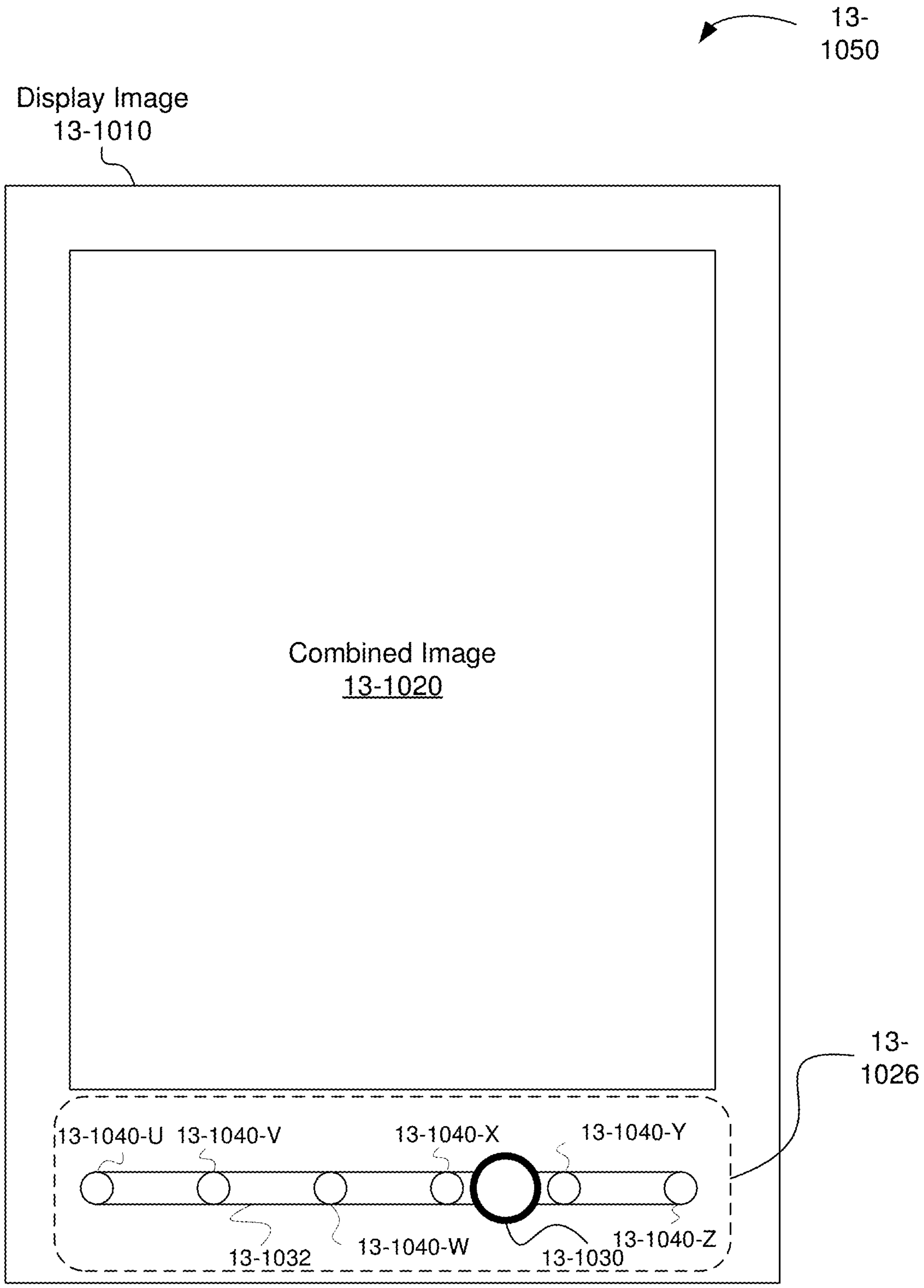

FIG. 13-1 illustrates a system 13-100 for capturing flash and ambient illuminated images, in accordance with one possible embodiment. As an option, the system 13-100 may be implemented in the context of any of the Figures disclosed herein. Of course, however, the system 13-100 may be implemented in any desired environment. Further, the aforementioned definitions may equally apply to the description below.

As shown in FIG. 13-1, the system 13-100 includes a first input 13-102 that is provided to an ambient sample storage node 13-133(0) based on a photodiode 13-101, and a second input 13-104 provided to a flash sample storage node 13-133(1) based on the photodiode 13-101. Based on the input 13-102 to the ambient sample storage node 13-133(0) and the input 13-104 to the flash sample storage node 13-133(1), an ambient sample is stored to the ambient sample storage node 13-133(0) sequentially, at least in part, with storage of a flash sample to the flash sample storage node 13-133(1). In one embodiment, simultaneous storage of the ambient sample and the flash sample includes storing the ambient sample and the second sample at least partially sequentially.

In one embodiment, the input 13-104 may be provided to the flash sample storage node 13-133(1) after the input 13-102 is provided to the ambient sample storage node 13-133(0). In such an embodiment, the process of storing the flash sample may occur after the process of storing the ambient sample. In other words, storing the ambient sample may occur during a first time duration, and storing the flash sample may occur during a second time duration that begins after the first time duration. The second time duration may begin nearly simultaneously with the conclusion of the first time duration.

While the following discussion describes an image sensor apparatus and method for simultaneously capturing multiple images using one or more photodiodes of an image sensor, any photo-sensing electrical element or photosensor may be used or implemented.

In one embodiment, the photodiode 13-101 may comprise any semiconductor diode that generates a potential difference, current, or changes its electrical resistance, in response to photon absorption. Accordingly, the photodiode 13-101 may be used to detect or measure a light intensity. Further, the input 13-102 and the input 13-104 received at sample storage nodes 13-133(0) and 13-133(1), respectively, may be based on the light intensity detected or measured by the photodiode 13-101. In such an embodiment, the ambient sample stored at the ambient sample storage node 13-133(0) may be based on a first exposure time to light at the photodiode 13-101, and the second sample stored at the flash sample storage node 13-133(1) may be based on a second exposure time to the light at the photodiode 13-101. The second exposure time may begin concurrently, or near concurrently, with the conclusion of the conclusion of the first exposure time.

In one embodiment, a rapid rise in scene illumination may occur after completion of the first exposure time, and during the second exposure time while input 13-104 is being received at the flash sample storage node 13-133(1). The rapid rise in scene illumination may be due to activation of a flash or strobe, or any other near instantaneous illumination. As a result of the rapid rise in scene illumination after the first exposure time, the light intensity detected or measured by the photodiode 13-101 during the second exposure time may be greater than the light intensity detected or measured by the photodiode 13-101 during the first exposure time. Accordingly, the second exposure time may be configured or selected based on an anticipated light intensity.

In one embodiment, the first input 13-102 may include an electrical signal from the photodiode 13-101 that is received at the ambient sample storage node 13-133(0), and the second input 13-104 may include an electrical signal from the photodiode 13-101 that is received at the flash sample storage node 13-133(1). For example, the first input 13-102 may include a current that is received at the ambient sample storage node 13-133(0), and the second input 13-104 may include a current that is received at the flash sample storage node 13-133(1). In another embodiment, the first input 13-102 and the second input 13-104 may be transmitted, at least partially, on a shared electrical interconnect. In other embodiments, the first input 13-102 and the second input 13-104 may be transmitted on different electrical interconnects. In some embodiments, the input 13-102 may include a first current, and the input 13-104 may include a second current that is different than the first current. The first current and the second current may each be a function of incident light intensity measured or detected by the photodiode 13-101. In yet other embodiments, the first input 13-102 may include any input from which the ambient sample storage node 13-133(0) may be operative to store an ambient sample, and the second input 13-104 may include any input from which the flash sample storage node 13-133(1) may be operative to store a flash sample.

In one embodiment, the first input 13-102 and the second input 13-104 may include an electronic representation of a portion of an optical image that has been focused on an image sensor that includes the photodiode 13-101. In such an embodiment, the optical image may be focused on the image sensor by a lens. The electronic representation of the optical image may comprise spatial color intensity information, which may include different color intensity samples (e.g. red, green, and blue light, etc.). In other embodiments, the spatial color intensity information may also include samples for white light. In one embodiment, the optical image may be an optical image of a photographic scene. In some embodiments, the photodiode 13-101 may be a single photodiode of an array of photodiodes of an image sensor. Such an image sensor may comprise a complementary metal oxide semiconductor (CMOS) image sensor, or charge-coupled device (CCD) image sensor, or any other technically feasible form of image sensor. In other embodiments, photodiode 13-101 may include two or more photodiodes.

In one embodiment, each sample storage node 13-133 includes a charge storing device for storing a sample, and the stored sample may be a function of a light intensity detected at the photodiode 13-101. For example, each sample storage node 13-133 may include a capacitor for storing a charge as a sample. In such an embodiment, each capacitor stores a charge that corresponds to an accumulated exposure during an exposure time or sample time. For example, current received at each capacitor from an associated photodiode may cause the capacitor, which has been previously charged, to discharge at a rate that is proportional to an incident light intensity detected at the photodiode. The remaining charge of each capacitor may be subsequently output from the capacitor as a value. For example, the remaining charge of each capacitor may be output as an analog value that is a function of the remaining charge on the capacitor.

To this end, an analog value received from a capacitor may be a function of an accumulated intensity of light detected at an associated photodiode. In some embodiments, each sample storage node 13-133 may include circuitry operable for receiving input based on a photodiode. For example, such circuitry may include one or more transistors. The one or more transistors may be configured for rendering the sample storage node 13-133 responsive to various control signals, such as sample, reset, and row select signals received from one or more controlling devices or components. In other embodiments, each sample storage node 13-133 may include any device for storing any sample or value that is a function of a light intensity detected at the photodiode 13-101.

Further, as shown in FIG. 13-1, the ambient sample storage node 13-133(0) outputs first value 13-106, and the flash sample storage node 13-133(1) outputs second value 13-108. In one embodiment, the ambient sample storage node 13-133(0) outputs the first value 13-106 based on the ambient sample stored at the ambient sample storage node 13-133(0), and the flash sample storage node 13-133(1) outputs the second value 13-108 based on the flash sample stored at the flash sample storage node 13-133(1). An ambient sample may include any value stored at an ambient sample storage node 13-133(0) due to input 13-102 from the photodiode 13-101 during an exposure time in which the photodiode 13-101 measures or detects ambient light. A flash sample may include any value stored at a flash storage node 13-133(1) due to input 13-104 from the photodiode 13-101 during an exposure time in which the photodiode 13-101 measures or detects flash or strobe illumination.

In some embodiments, the ambient sample storage node 13-133(0) outputs the first value 13-106 based on a charge stored at the ambient sample storage node 13-133(0), and the flash sample storage node 13-133(1) outputs the second value 13-108 based on a second charge stored at the flash sample storage node 13-133(1). The first value 13-106 may be output serially with the second value 13-108, such that one value is output prior to the other value; or the first value 13-106 may be output in parallel with the output of the second value 13-108. In various embodiments, the first value 13-106 may include a first analog value, and the second value 13-108 may include a second analog value. Each of these values may include a current, which may be output for inclusion in an analog signal that includes at least one analog value associated with each photodiode of a photodiode array. In such embodiments, the first analog value 13-106 may be included in an ambient analog signal, and the second analog value 13-108 may be included in a flash analog signal that is different than the ambient analog signal. In other words, an ambient analog signal may be generated to include an analog value associated with each photodiode of a photodiode array, and a flash analog signal may also be generated to include a different analog value associated with each of the photodiodes of the photodiode array. In such an embodiment, the analog values of the ambient analog signal would be sampled during a first exposure time in which the associated photodiodes were exposed to ambient light, and the analog values of the flash analog signal would be sampled during a second exposure time in which the associated photodiode were exposed to strobe or flash illumination.

To this end, a single photodiode array may be utilized to generate a plurality of analog signals. The plurality of analog signals may be generated concurrently or in parallel. Further, the plurality of analog signals may each be amplified utilizing two or more gains, and each amplified analog signal may converted to one or more digital signals such that two or more digital signals may be generated, where each digital signal may include a digital image. Accordingly, due to the contemporaneous storage of the ambient sample and the flash sample, a single photodiode array may be utilized to concurrently generate multiple digital signals or digital images, where at least one of the digital signals is associated with an ambient exposure photographic scene, and at least one of the digital signals is associated with a flash or strobe illuminated exposure of the same photographic scene. In such an embodiment, multiple digital signals having different exposure characteristics may be substantially simultaneously generated for a single photographic scene captured at ambient illumination. Such a collection of digital signals or digital images may be referred to as an ambient image stack. Further, multiple digital signals having different exposure characteristics may be substantially simultaneously generated for the single photographic scene captured with strobe or flash illumination. Such a collection of digital signals or digital images may be referred to as a flash image stack.

In certain embodiments, an analog signal comprises a plurality of distinct analog signals, and a signal amplifier comprises a corresponding set of distinct signal amplifier circuits. For example, each pixel within a row of pixels of an image sensor may have an associated distinct analog signal within an analog signal, and each distinct analog signal may have a corresponding distinct signal amplifier circuit. Further, two or more amplified analog signals may each include gain-adjusted analog pixel data representative of a common analog value from at least one pixel of an image sensor. For example, for a given pixel of an image sensor, a given analog value may be output in an analog signal, and then, after signal amplification operations, the given analog value is represented by a first amplified value in a first amplified analog signal, and by a second amplified value in a second amplified analog signal. Analog pixel data may be analog signal values associated with one or more given pixels.

In various embodiments, the digital images of the ambient image stack and the flash image stack may be combined or blended to generate one or more new blended images having a greater dynamic range than any of the individual images. Further, the digital images of the ambient image stack and the flash image stack may be combined or blended for controlling a flash contribution in the one or more new blended images.

FIG. 13-2 illustrates a method 13-200 for capturing flash and ambient illuminated images, in accordance with one embodiment. As an option, the method 13-200 may be carried out in the context of any of the Figures disclosed herein. Of course, however, the method 13-200 may be carried out in any desired environment. Further, the aforementioned definitions may equally apply to the description below.

As shown in operation 13-202, an ambient sample is stored based on an electrical signal from a photodiode of an image sensor. Further, sequentially, at least in part, with the storage of the ambient sample, a flash sample is stored based on the electrical signal from the photodiode of the image sensor at operation 13-204. As noted above, the photodiode of the image sensor may comprise any semiconductor diode that generates a potential difference, or changes its electrical resistance, in response to photon absorption. Accordingly, the photodiode may be used to detect or measure light intensity, and the electrical signal from the photodiode may include a photodiode current that varies as a function of the light intensity.

In some embodiments, each sample may include an electronic representation of a portion of an optical image that has been focused on an image sensor that includes the photodiode. In such an embodiment, the optical image may be focused on the image sensor by a lens. The electronic representation of the optical image may comprise spatial color intensity information, which may include different color intensity samples (e.g. red, green, and blue light, etc.). In other embodiments, the spatial color intensity information may also include samples for white light. In one embodiment, the optical image may be an optical image of a photographic scene. The photodiode may be a single photodiode of an array of photodiodes of the image sensor. Such an image sensor may comprise a complementary metal oxide semiconductor (CMOS) image sensor, or charge-coupled device (CCD) image sensor, or any other technically feasible form of image sensor.

In the context of one embodiment, each of the samples may be stored by storing energy. For example, each of the samples may include a charged stored on a capacitor. In such an embodiment, the ambient sample may include a first charge stored at a first capacitor, and the flash sample may include a second charge stored at a second capacitor. In one embodiment, the ambient sample may be different than the flash sample. For example, the ambient sample may include a first charge stored at a first capacitor, and the flash sample may include a second charge stored at a second capacitor that is different than the first charge.

In one embodiment, the ambient sample may be different than the flash sample due to being sampled at different sample times. For example, the ambient sample may be stored by charging or discharging a first capacitor during a first sample time, and the flash sample may be stored by charging or discharging a second capacitor during a second sample time, where the first capacitor and the second capacitor may be substantially identical and charged or discharged at a substantially identical rate for a given photodiode current. The second sample time may be contemporaneously, or near contemporaneously, with a conclusion of the first sample time, such that the second capacitor may be charged or discharged after the charging or discharging of the first capacitor has completed.

In another embodiment, the ambient sample may be different than the flash sample due to, at least partially, different storage characteristics. For example, the ambient sample may be stored by charging or discharging a first capacitor for a period of time, and the flash sample may be stored by charging or discharging a second capacitor for the same period of time, where the first capacitor and the second capacitor may have different storage characteristics and/or be charged or discharged at different rates. More specifically, the first capacitor may have a different capacitance than the second capacitor.

In another embodiment, the ambient sample may be different than the flash sample due to a flash or strobe illumination that occurs during the second exposure time, and that provides different illumination characteristics than the ambient illumination of the first exposure time. For example, the ambient sample may be stored by charging or discharging a first capacitor for a period of time of ambient illumination, and the flash sample may be stored by charging or discharging a second capacitor for a period of time of flash illumination. Due to the differences in illumination between the first exposure time and the second exposure time, the second capacitor may be charged or discharged faster than the first capacitor due to the increased light intensity associated with the flash illumination of the second exposure time.

Additionally, as shown at operation 13-206, after storage of the ambient sample and the flash sample, a first value is output based on the ambient sample, and a second value is output based on the flash sample, for generating at least one image. In the context of one embodiment, the first value and the second value are transmitted or output in sequence. For example, the first value may be transmitted prior to the second value. In another embodiment, the first value and the second value may be transmitted in parallel.

In one embodiment, each output value may comprise an analog value. For example, each output value may include a current representative of the associated stored sample, such as an ambient sample or a flash sample. More specifically, the first value may include a current value representative of the stored ambient sample, and the second value may include a current value representative of the stored flash sample. In one embodiment, the first value is output for inclusion in an ambient analog signal, and the second value is output for inclusion in a flash analog signal different than the ambient analog signal. Further, each value may be output in a manner such that it is combined with other values output based on other stored samples, where the other stored samples are stored responsive to other electrical signals received from other photodiodes of an image sensor. For example, the first value may be combined in an ambient analog signal with values output based on other ambient samples, where the other ambient samples were stored based on electrical signals received from photodiodes that neighbor the photodiode from which the electrical signal utilized for storing the ambient sample was received. Similarly, the second value may be combined in a flash analog signal with values output based on other flash samples, where the other flash samples were stored based on electrical signals received from the same photodiodes that neighbor the photodiode from which the electrical signal utilized for storing the flash sample was received.

Finally, at operation 13-208, at least one of the first value and the second value are amplified utilizing two or more gains. In one embodiment, where each output value comprises an analog value, amplifying at least one of the first value and the second value may result in at least two amplified analog values. In another embodiment, where the first value is output for inclusion in an ambient analog signal, and the second value is output for inclusion in a flash analog signal different than the ambient analog signal, one of the ambient analog signal or the flash analog signal may be amplified utilizing two or more gains each. For example, an ambient analog signal that includes the first value may be amplified with a first gain and a second gain, such that the first value is amplified with the first gain and the second gain. Amplifying the ambient analog signal with the first gain may result in a first amplified ambient analog signal, and amplifying the ambient analog signal with the second gain may result in a second amplified ambient analog signal. Of course, more than two analog signals may be amplified using two or more gains. In one embodiment, each amplified analog signal may be converted to a digital signal comprising a digital image.

To this end, an array of photodiodes may be utilized to generate an ambient analog signal based on a set of ambient samples captured at a first exposure time or sample time and illuminated with ambient light, and a flash analog signal based on a set of flash samples captured at a second exposure time or sample time and illuminated with flash or strobe illumination, where the set of ambient samples and the set of flash samples may be two different sets of samples of the same photographic scene. Further, each analog signal may include an analog value generated based on each photodiode of each pixel of an image sensor. Each analog value may be representative of a light intensity measured at the photodiode associated with the analog value. Accordingly, an analog signal may be a set of spatially discrete intensity samples, each represented by continuous analog values, and analog pixel data may be analog signal values associated with one or more given pixels. Still further, each analog signal may undergo subsequent processing, such as amplification, which may facilitate conversion of the analog signal into one or more digital signals, each including digital pixel data, which may each comprise a digital image.

The embodiments disclosed herein may advantageously enable a camera module to sample images comprising an image stack with lower (e.g. at or near zero, etc.) inter-sample time (e.g. interframe, etc.) than conventional techniques. In certain embodiments, images comprising an analog image stack or a flash image stack are effectively sampled or captured simultaneously, or near simultaneously, which may reduce inter-sample time to zero. In other embodiments, the camera module may sample images in coordination with the strobe unit to reduce inter-sample time between an image sampled without strobe illumination and an image sampled with strobe illumination.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

In one embodiment, the first exposure time and the second exposure time do not overlap in time. For example, a controller may be configured to control the second exposure time such that it begins contemporaneously, or near contemporaneously, with a conclusion of the first exposure time. In such an embodiment, the sample signal 12-618(1) may be activated as the sample signal 12-618(0) is deactivated.

As a benefit of having two different exposure conditions, in situations where a photodiode 12-602 is exposed to a sufficient threshold of incident light 12-601, a first capacitor 12-604(0) may provide an analog value suitable for generating a digital image, and a second capacitor 12-604(1) of the same cell 12-600 may provide a "blown out" or over exposed image portion due to excessive flash illumination. Thus, for each cell 12-600, a first capacitor 12-604 may more effectively capture darker image content than another capacitor 12-604 of the same cell 12-600. This may be useful, for example, in situations where strobe or flash illumination over-exposes foreground objects in a digital image of a photographic scene, or under-exposes background objects in the digital image of the photographic scene. In such an example, an image captured during another exposure time utilizing ambient illumination may help correct any over-exposed or under-exposed objects. Similarly, in situations where ambient light is unable to sufficiently illuminate particular elements of a photographic scene, and these elements appear dark or difficult to see in an associated digital image, an image captured during another exposure time utilizing strobe or flash illumination may help correct any under-exposed portions of the image.

In various embodiments, capacitor 12-604(0) may be substantially identical to capacitor 12-604(1). For example, the capacitors 12-604(0) and 12-604(1) may have substantially identical capacitance values. In one embodiment, a sample signal 12-618 of one of the analog sampling circuits may be activated for a longer or shorter period of time than a sample signal 12-618 is activated for any other analog sampling circuits 12-603.

As noted above, the sample signal 12-618(0) of the first analog sampling circuit 12-603(0) may be activated for a first exposure time, and a sample signal 12-618(1) of the second analog sampling circuit 12-603(1) may be activated for a second exposure time. In one embodiment, the first exposure time and/or the second exposure time may be determined based on an exposure setting selected by a user, by software, or by some combination of user and software. For example, the first exposure time may be selected based on a 1/60 second shutter time selected by a user of a camera. In response, the second exposure time may be selected based on the first exposure time. In one embodiment, the user's selected 1/60 second shutter time may be selected for an ambient image, and a metering algorithm may then evaluate the photographic scene to determine an optimal second exposure time for a flash or strobe capture. The second exposure time for the flash or strobe capture may be selected based on incident light metered during the evaluation of the photographic scene. Of course, in other embodiments, a user selection may be used to select the second exposure time, and then the first exposure time for an ambient capture may be selected according to the selected second exposure time. In yet other embodiments, the first exposure time may be selected independent of the second exposure time.

In other embodiments, the capacitors 12-604(0) and 12-604(1) may have different capacitance values. In one embodiment, the capacitors 12-604(0) and 12-604(1) may have different capacitance values for the purpose of rendering one of the analog sampling circuits 12-603 more or less sensitive to the current I_PD from the photodiode 12-602 than other analog sampling circuits 12-603 of the same cell 12-600. For example, a capacitor 12-604 with a significantly larger capacitance than other capacitors 12-604 of the same cell 12-600 may be less likely to fully discharge when capturing photographic scenes having significant amounts of incident light 12-601. In such embodiments, any difference in stored voltages or samples between the capacitors 12-604(0) and 12-604(1) may be a function of the different capacitance values, in conjunction with different activation times of the sample signals 12-618 and different incident light measurements during the respective exposure times.

In one embodiment, the photosensitive cell 12-600 may be configured such that the first analog sampling circuit 12-603(0) and the second analog sampling circuit 12-603(1) share at least one shared component. In various embodiments, the at least one shared component may include a photodiode 12-602 of an image sensor. In other embodiments, the at least one shared component may include a reset, such that the first analog sampling circuit 12-603(0) and the second analog sampling circuit 12-603(1) may be reset concurrently utilizing the shared reset. In the context of FIG. 12-3, the photosensitive cell 12-600 may include a shared reset between the analog sampling circuits 12-603(0) and 12-603(1). For example, reset 12-616(0) may be coupled to reset 12-616(1), and both may be asserted together such that the reset 12-616(0) is the same signal as the reset 12-616(1), which may be used to simultaneously reset both of the first analog sampling circuit 12-603(0) and the second analog sampling circuit 12-603(1). After reset, the first analog sampling circuit 12-603(0) and the second analog sampling circuit 12-603(1) may be asserted to sample independently.

To this end, the photosensitive cell 12-600 may be utilized to simultaneously store both of an ambient sample and a flash sample based on the incident light 12-601. Specifically, the ambient sample may be captured and stored on a first capacitor during a first exposure time, and the flash sample may be captured and stored on a second capacitor during a second exposure time. Further, during this second exposure time, a strobe may be activated for temporarily increasing illumination of a photographic scene, and increasing the incident light measured at one or more photodiodes of an image sensor during the second exposure time.

In one embodiment, a unique instance of analog pixel data 11-621 may include, as an ordered set of individual analog values, all analog values output from all corresponding analog sampling circuits or sample storage nodes. For example, in the context of the foregoing figures, each cell of cells 11-542-11-545 of a plurality of pixels 11-540 of a pixel array 11-510 may include both a first analog sampling circuit 11-603(0) and a second analog sampling circuit 11-603(1). Thus, the pixel array 11-510 may include a plurality of first analog sampling circuits 11-603(0) and also include a plurality of second analog sampling circuits 11-603(1). In other words, the pixel array 11-510 may include a first analog sampling circuit 11-603(0) for each cell, and also include a second analog sampling circuit 11-603(1) for each cell. In an embodiment, a first instance of analog pixel data 11-621 may be received containing a discrete analog value from each analog sampling circuit of a plurality of first analog sampling circuits 11-603(0), and a second instance of analog pixel data 11-621 may be received containing a discrete analog value from each analog sampling circuit of a plurality of second analog sampling circuits 11-603(1). Thus, in embodiments where cells of a pixel array include two or more analog sampling circuits, the pixel array may output two or more discrete analog signals, where each analog signal includes a unique instance of analog pixel data 11-621.

Further, each of the first analog sampling circuits 12-603(0) may sample a photodiode current during a first exposure time, during which a photographic scene is illuminated with ambient light; and each of the second sampling circuits 12-603(1) may sample the photodiode current during a second exposure time, during which the photographic scene is illuminated with a strobe or flash. Accordingly, a first analog signal, or ambient analog signal, may include analog values representative of the photographic scene when illuminated with ambient light; and a second analog signal, or flash analog signal, may include analog values representative of the photographic scene when illuminated with the strobe or flash.

In some embodiments, only a subset of the cells of a pixel array may include two or more analog sampling circuits. For example, not every cell may include both a first analog sampling circuit 12-603(0) and a second analog sampling circuit 12-603(1).

FIG. 13-3 illustrates a system 13-700 for converting analog pixel data of an analog signal to digital pixel data, in accordance with an embodiment. As an option, the system 13-700 may be implemented in the context of the details of any of the Figures disclosed herein. Of course, however, the system 13-700 may be implemented in any desired environment. Further, the aforementioned definitions may equally apply to the description below.

The system 13-700 is shown in FIG. 13-3 to include a first analog storage plane 13-702(0), a first analog-to-digital unit 13-722(0), and an ambient digital image stack 13-732(0), and is shown to further include a second analog storage plane 13-702(1), a second analog-to-digital unit 13-722(1), and a flash digital image stack 13-732(1). Accordingly, the system 13-700 is shown to include at least two analog storage planes 13-702(0) and 13-702(1). As illustrated in FIG. 13-3, a plurality of analog values are each depicted as a "V" within each of the analog storage planes 13-702, and corresponding digital values are each depicted as a "D" within digital images of each of the image stacks 13-732. In one embodiment, all of the analog values of the first analog storage plane 13-702(0) are captured during a first exposure time, during which a photographic scene was illuminated with ambient light; and all of the analog values of the second analog storage plane 13-702(1) are captured during a second exposure time, during which the photographic scene was illuminated using a strobe or flash.

In the context of certain embodiments, each analog storage plane 13-702 may comprise any collection of one or more analog values. In some embodiments, each analog storage plane 13-702 may comprise at least one analog pixel value for each pixel of a row or line of a pixel array. Still yet, in another embodiment, each analog storage plane 13-702 may comprise at least one analog pixel value for each pixel of an entirety of a pixel array, which may be referred to as a frame. For example, each analog storage plane 13-702 may comprise an analog pixel value, or more generally, an analog value for each cell of each pixel of every line or row of a pixel array.

Further, the analog values of each analog storage plane 13-702 are output as analog pixel data 13-704 to a corresponding analog-to-digital unit 13-722. For example, the analog values of analog storage plane 13-702(0) are output as analog pixel data 13-704(0) to analog-to-digital unit 13-722(0), and the analog values of analog storage plane 13-702(1) are output as analog pixel data 13-704(1) to analog-to-digital unit 13-722(1). In one embodiment, each analog-to-digital unit 13-722 may be substantially identical to the analog-to-digital unit 11-622 described within the context of FIG. 11-4. For example, each analog-to-digital unit 13-722 may comprise at least one amplifier and at least one analog-to-digital converter, where the amplifier is operative to receive a gain value and utilize the gain value to gain-adjust analog pixel data received at the analog-to-digital unit 13-722. Further, in such an embodiment, the amplifier may transmit gain-adjusted analog pixel data to an analog-to-digital converter, which then generates digital pixel data from the gain-adjusted analog pixel data. To this end, an analog-to-digital conversion may be performed on the contents of each of two or more different analog storage planes 13-702.

In the context of the system 13-700 of FIG. 13-3, each analog-to-digital unit 13-722 receives corresponding analog pixel data 13-704, and applies at least two different gains to the received analog pixel data 13-704 to generate at least a first gain-adjusted analog pixel data and a second gain-adjusted analog pixel data. For example, the analog-to-digital unit 13-722(0) receives analog pixel data 13-704(0), and applies at least two different gains to the analog pixel data 13-704(0) to generate at least a first gain-adjusted analog pixel data and a second gain-adjusted analog pixel data based on the analog pixel data 13-704(0); and the analog-to-digital unit 13-722(1) receives analog pixel data 13-704(1), and applies at least two different gains to the analog pixel data 13-704(1) to generate at least a first gain-adjusted analog pixel data and a second gain-adjusted analog pixel data based on the analog pixel data 13-704(1).

Further, each analog-to-digital unit 13-722 converts each generated gain-adjusted analog pixel data to digital pixel data, and then outputs at least two digital outputs. In one embodiment, each analog-to-digital unit 13-722 provides a different digital output corresponding to each gain applied to the received analog pixel data 13-704. With respect to FIG. 13-3 specifically, the analog-to-digital unit 13-722(0) is shown to generate a first digital signal comprising first digital pixel data 13-723(0) corresponding to a first gain (Gain1), a second digital signal comprising second digital pixel data 13-724(0) corresponding to a second gain (Gain2), and a third digital signal comprising third digital pixel data 13-725(0) corresponding to a third gain (Gain3).

Similarly, the analog-to-digital unit 13-722(1) is shown to generate a first digital signal comprising first digital pixel data 13-723(1) corresponding to a first gain (Gain1), a second digital signal comprising second digital pixel data 13-724(1) corresponding to a second gain (Gain2), and a third digital signal comprising third digital pixel data 13-725(1) corresponding to a third gain (Gain3). Each instance of each digital pixel data may comprise a digital image, such that each digital signal comprises a digital image.

Accordingly, as a result of the analog-to-digital unit 13-722(0) applying each of Gain1, Gain2, and Gain3 to the analog pixel data 13-704(0), and thereby generating first digital pixel data 13-723(0), second digital pixel data 13-724(0), and third digital pixel data 13-725(0), the analog-to-digital unit 13-722(0) generates a stack of digital images, also referred to as an ambient image stack 13-732(0). Similarly, as a result of the analog-to-digital unit 13-722(1) applying each of Gain1, Gain2, and Gain3 to the analog pixel data 13-704(1), and thereby generating first digital pixel data 13-723(1), second digital pixel data 13-724(1), and third digital pixel data 13-725(1), the analog-to-digital unit 13-722(1) generates a second stack of digital images, also referred to as a flash image stack 13-732(1). Each of the digital images of the ambient image stack 13-732(0) may be a digital image of the photographic scene captured with ambient illumination during a first exposure time. Each of the digital images of the flash image stack 13-732(1) may be a digital image of the photographic scene captured with strobe or flash illumination during a second exposure time.

In one embodiment, each analog-to-digital unit 13-722 applies in sequence at least two gains to the analog values. For example, within the context of FIG. 13-3, the analog-to-digital unit 13-722(0) first applies Gain1 to the analog pixel data 13-704(0), then subsequently applies Gain2 to the same analog pixel data 13-704(0), and then subsequently applies Gain3 to the same analog pixel data 13-704(0). In other embodiments, each analog-to-digital unit 13-722 may apply in parallel at least two gains to the analog values. For example, an analog-to-digital unit may apply Gain1 to received analog pixel data in parallel with application of Gain2 and Gain3 to the analog pixel data. To this end, each instance of analog pixel data 13-704 is amplified utilizing at least two gains.

In one embodiment, the gains applied to the analog pixel data 13-704(0) at the analog-to-digital unit 13-722(0) may be the same as the gains applied to the analog pixel data 13-704(1) at the analog-to-digital unit 13-722(1). By way of a specific example, the Gain1 applied by both of the analog-to-digital unit 13-722(0) and the analog-to-digital unit 13-722(1) may be a gain of 1.0, the Gain2 applied by both of the analog-to-digital unit 13-722(0) and the analog-to-digital unit 13-722(1) may be a gain of 2.0, and the Gain3 applied by both of the analog-to-digital unit 13-722(0) and the analog-to-digital unit 13-722(1) may be a gain of 4.0. In another embodiment, one or more of the gains applied to the analog pixel data 13-704(0) at the analog-to-digital unit 13-722(0) may be different from the gains applied to the analog pixel data 13-704(1) at the analog-to-digital unit 13-722(1). For example, the Gain1 applied at the analog-to-digital unit 13-722(0) may be a gain of 1.0, and the Gain1 applied at the analog-to-digital unit 13-722(1) may be a gain of 2.0. Accordingly, the gains applied at each analog-to-digital unit 13-722 may be selected dependently or independently of the gains applied at other analog-to-digital units 13-722 within system 13-700.

In accordance with one embodiment, the at least two gains may be determined using any technically feasible technique based on an exposure of a photographic scene, metering data, user input, detected ambient light, a strobe control, or any combination of the foregoing. For example, a first gain of the at least two gains may be determined such that half of the digital values from an analog storage plane 13-702 are converted to digital values above a specified threshold (e.g., a threshold of 0.5 in a range of 0.0 to 1.0) for the dynamic range associated with digital values comprising a first digital image of an image stack 13-732, which can be characterized as having an "EV0" exposure. Continuing the example, a second gain of the at least two gains may be determined as being twice that of the first gain to generate a second digital image of the image stack 13-732 characterized as having an "EV+1" exposure. Further still, a third gain of the at least two gains may be determined as being half that of the first gain to generate a third digital image of the image stack 13-732 characterized as having an "EV−1" exposure.

In one embodiment, an analog-to-digital unit 13-722 converts in sequence a first instance of the gain-adjusted analog pixel data to the first digital pixel data 13-723, a second instance of the gain-adjusted analog pixel data to the second digital pixel data 13-724, and a third instance of the gain-adjusted analog pixel data to the third digital pixel data 13-725. For example, an analog-to-digital unit 13-722 may first convert a first instance of the gain-adjusted analog pixel data to first digital pixel data 13-723, then subsequently convert a second instance of the gain-adjusted analog pixel data to second digital pixel data 13-724, and then subsequently convert a third instance of the gain-adjusted analog pixel data to third digital pixel data 13-725. In other embodiments, an analog-to-digital unit 13-722 may perform such conversions in parallel, such that one or more of a first digital pixel data 13-723, a second digital pixel data 13-724, and a third digital pixel data 13-725 are generated in parallel.

Still further, as shown in FIG. 13-3, each first digital pixel data 13-723 provides a first digital image. Similarly, each second digital pixel data 13-724 provides a second digital image, and each third digital pixel data 13-725 provides a third digital image. Together, each set of digital images produced using the analog values of a single analog storage plane 13-702 comprises an image stack 13-732. For example, ambient image stack 13-732(0) comprises digital images produced using analog values of the analog storage plane 13-702(0), and flash image stack 13-732(1) comprises the digital images produced using the analog values of the analog storage plane 13-702(1). As noted previously, each of the digital images of the ambient image stack 13-732(0) may be a digital image of the photographic scene captured with ambient illumination during a first exposure time. Similarly, each of the digital images of the flash image stack 13-732(1) may be a digital image of the photographic scene captured with strobe or flash illumination during a second exposure time.

As illustrated in FIG. 13-3, all digital images of an image stack 13-732 may be based upon a same analog pixel data 13-704. However, each digital image of an image stack 13-732 may differ from other digital images in the image stack 13-732 as a function of a difference between the gains used to generate the two digital images. Specifically, a digital image generated using the largest gain of at least two gains may be visually perceived as the brightest or more exposed of the digital images of the image stack 13-732. Conversely, a digital image generated using the smallest gain of the at least two gains may be visually perceived as the darkest and less exposed than other digital images of the image stack 13-732. To this end, a first light sensitivity value may be associated with first digital pixel data 13-723, a second light sensitivity value may be associated with second digital pixel data 13-724, and a third light sensitivity value may be associated with third digital pixel data 13-725. Further, because each of the gains may be associated with a different light sensitivity value, a first digital image or first digital signal may be associated with a first light sensitivity value, a second digital image or second digital signal may be associated with a second light sensitivity value, and a third digital image or third digital signal may be associated with a third light sensitivity value. In one embodiment, one or more digital images of an image stack may be blended, resulting in a blended image associated with a blended light sensitivity.

It should be noted that while a controlled application of gain to the analog pixel data may greatly aid in HDR image generation, an application of too great of gain may result in a digital image that is visually perceived as being noisy, over-exposed, and/or blown-out. In one embodiment, application of two stops of gain to the analog pixel data may impart visually perceptible noise for darker portions of a photographic scene, and visually imperceptible noise for brighter portions of the photographic scene. In another embodiment, a digital photographic device may be configured to provide an analog storage plane for analog pixel data of a captured photographic scene, and then perform at least two analog-to-digital samplings of the same analog pixel data using an analog-to-digital unit 13-722. To this end, a digital image may be generated for each sampling of the at least two samplings, where each digital image is obtained at a different exposure despite all the digital images being generated from the same analog sampling of a single optical image focused on an image sensor.

In one embodiment, an initial exposure parameter may be selected by a user or by a metering algorithm of a digital photographic device. The initial exposure parameter may be selected based on user input or software selecting particular capture variables. Such capture variables may include, for example, ISO, aperture, and shutter speed. An image sensor may then capture a photographic scene at the initial exposure parameter during a first exposure time, and populate a first analog storage plane with a first plurality of analog values corresponding to an optical image focused on the image sensor. Next, during a second exposure time, a second analog storage plane may be populated with a second plurality of analog values corresponding to the optical image focused on the image sensor. During the second exposure time, a strobe or flash unit may be utilized to illuminate at least a portion of the photographic scene. In the context of the foregoing Figures, a first analog storage plane 13-702(0) comprising a plurality of first analog sampling circuits 12-603(0) may be populated with a plurality of analog values associated with an ambient capture, and a second analog storage plane 13-702(1) comprising a plurality of second analog sampling circuits 12-603(1) may be populated with a plurality of analog values associated with a flash or strobe capture.

In other words, in an embodiment where each photosensitive cell includes two analog sampling circuits, then two analog storage planes may be configured such that a first of the analog storage planes stores a first analog value output from one of the analog sampling circuits of a cell, and a second of the analog storage planes stores a second analog value output from the other analog sampling circuit of the same cell.

Further, each of the analog storage planes may receive and store different analog values for a given pixel of the pixel array or image sensor. For example, an analog value received for a given pixel and stored in a first analog storage plane may be output based on an ambient sample captured during a first exposure time, and a corresponding analog value received for the given pixel and stored in a second analog storage plane may be output based on a flash sample captured during a second exposure time that is different than the first exposure time. Accordingly, in one embodiment, substantially all analog values stored in a first analog storage plane may be based on samples obtained during a first exposure time, and substantially all analog values stored in a second analog storage plane may be based on samples obtained during a second exposure time that is different than the first exposure time.

In the context of the present description, a "single exposure" of a photographic scene may include simultaneously, at least in part, storing analog values representative of the photographic scene using two or more sets of analog sampling circuits, where each set of analog sampling circuits may be configured to operate at different exposure times. During capture of the photographic scene using the two or more sets of analog sampling circuits, the photographic scene may be illuminated by ambient light during a first exposure time, and by a flash or strobe unit during a second exposure time. Further, after capturing the photographic scene using the two or more sets of analog sampling circuits, two or more analog storage planes (e.g., one storage plane for each set of analog sampling circuits) may be populated with analog values corresponding to an optical image focused on an image sensor. Next, one or more digital images of an ambient image stack may be obtained by applying one or more gains to the analog values of the first analog storage plane captured during the first exposure time, in accordance with the above systems and methods. Further, one or more digital images of a flash image stack may be obtained by applying one or more gains to the analog values of the second analog storage plane captured during the second exposure time, in accordance with the above systems and methods.

To this end, one or more image stacks 13-732 may be generated based on a single exposure of a photographic scene.

In one embodiment, a first digital image of an image stack 13-732 may be obtained utilizing a first gain in accordance with the above systems and methods. For example, if a digital photographic device is configured such that initial exposure parameter includes a selection of ISO 400, the first gain utilized to obtain the first digital image may be mapped to, or otherwise associated with, ISO 400. This first digital image may be referred to as an exposure or image obtained at exposure value 0 (EV0). Further one more digital images may be obtained utilizing a second gain in accordance with the above systems and methods. For example, the same analog pixel data used to generate the first digital image may be processed utilizing a second gain to generate a second digital image. Still further, one or more digital images may be obtained utilizing a second analog storage plane in accordance with the above systems and methods. For example, second analog pixel data may be used to generate a second digital image, where the second analog pixel data is different from the analog pixel data used to generate the first digital image. Specifically, the analog pixel data used to generate the first digital image may have been captured during a first exposure time, and the second analog pixel data may have been captured during a second exposure time different than the first exposure time.

To this end, at least two digital images may be generated utilizing different analog pixel data, and then blended to generate an HDR image. The at least two digital images may be blended by blending a first digital signal and a second digital signal. Where the at least two digital images are generated using different analog pixel data captured during a single exposure of a photographic scene, then there may be approximately, or near, zero interframe time between the at least two digital images. As a result of having zero, or near zero, interframe time between at least two digital images of a same photographic scene, an HDR image may be generated, in one possible embodiment, without motion blur or other artifacts typical of HDR photographs.

In one embodiment, after selecting a first gain for generating a first digital image of an image stack 13-732, a second gain may be selected based on the first gain. For example, the second gain may be selected on the basis of it being one stop away from the first gain. More specifically, if the first gain is mapped to or associated with ISO 400, then one stop down from ISO 400 provides a gain associated with ISO 200, and one stop up from ISO 400 provides a gain associated with ISO 800. In such an embodiment, a digital image generated utilizing the gain associated with ISO 200 may be referred to as an exposure or image obtained at exposure value −1 (EV−1), and a digital image generated utilizing the gain associated with ISO 800 may be referred to as an exposure or image obtained at exposure value +1 (EV+1).

Still further, if a more significant difference in exposures is desired between digital images generated utilizing the same analog signal, then the second gain may be selected on the basis of it being two stops away from the first gain. For example, if the first gain is mapped to or associated with ISO 400, then two stops down from ISO 400 provides a gain associated with ISO 100, and two stops up from ISO 400 provides a gain associated with ISO 1600. In such an embodiment, a digital image generated utilizing the gain associated with ISO 100 may be referred to as an exposure or image obtained at exposure value −2 (EV−2), and a digital image generated utilizing the gain associated with ISO 1600 may be referred to as an exposure or image obtained at exposure value +2 (EV+2).

In one embodiment, an ISO and exposure of the EV0 image may be selected according to a preference to generate darker digital images. In such an embodiment, the intention may be to avoid blowing out or overexposing what will be the brightest digital image, which is the digital image generated utilizing the greatest gain. In another embodiment, an EV−1 digital image or EV−2 digital image may be a first generated digital image. Subsequent to generating the EV−1 or EV−2 digital image, an increase in gain at an analog-to-digital unit may be utilized to generate an EV0 digital image, and then a second increase in gain at the analog-to-digital unit may be utilized to generate an EV+1 or EV+2 digital image. In one embodiment, the initial exposure parameter corresponds to an EV-N digital image and subsequent gains are used to obtain an EV0 digital image, an EV+M digital image, or any combination thereof, where N and M are values ranging from 0 to −10.

In one embodiment, three digital images having three different exposures (e.g. an EV−2 digital image, an EV0 digital image, and an EV+2 digital image) may be generated in parallel by implementing three analog-to-digital units. Each analog-to-digital unit may be configured to convert one or more analog signal values to corresponding digital signal values. Such an implementation may be also capable of simultaneously generating all of an EV−1 digital image, an EV0 digital image, and an EV+1 digital image. Similarly, in other embodiments, any combination of exposures may be generated in parallel from two or more analog-to-digital units, three or more analog-to-digital units, or an arbitrary number of analog-to-digital units. In other embodiments, a set of analog-to-digital units may be configured to each operate on either of two or more different analog storage planes.

In some embodiments, a set of gains may be selected for application to the analog pixel data 11-621 based on whether the analog pixel data is associated with an ambient capture or a flash capture. For example, if the analog pixel data 11-621 comprises a plurality of values from an analog storage plane associated with ambient sample storage, a first set of gains may be selected for amplifying the values of the analog storage plane associated with the ambient sample storage. Further, a second set of gains may be selected for amplifying values of an analog storage plane associated with the flash sample storage.

A plurality of first analog sampling circuits 12-603(0) may comprise the analog storage plane used for the ambient sample storage, and a plurality of second analog sampling circuits 12-603(1) may comprise the analog storage plane used for the flash sample storage. Either set of gains may be preselected based on exposure settings. For example, a first set of gains may be preselected for exposure settings associated with a flash capture, and a second set of gains may be preselected for exposure settings associated with an ambient capture. Each set of gains may be preselected based on any feasible exposure settings, such as, for example, ISO, aperture, shutter speed, white balance, and exposure. One set of gains may include gain values that are greater than each of their counterparts in the other set of gains. For example, a first set of gains selected for application to each ambient sample may include gain values of 0.5, 1.0, and 2.0, and a second set of gains selected for application to each flash sample may include gain values of 1.0, 2.0, and 4.0.

FIG. 13-4A illustrates a user interface (UI) system 13-1000 for generating a combined image 13-1020, according to one embodiment. As an option, the UI system 13-1000 may be implemented in the context of the details of any of the Figures disclosed herein. Of course, however, the UI system 13-1000 may be implemented in any desired environment. Further, the aforementioned definitions may equally apply to the description below.

In one embodiment, a combined image 13-1020 comprises a combination of at least two related digital images. For example the combined image 13-1020 may comprise, without limitation, a combined rendering of at least two digital images, such as two or more of the digital images of an ambient image stack 13-732(0) and a flash image stack 13-732(1) of FIG. 13-3. In another embodiment, the digital images used to compute the combined image 13-1020 may be generated by amplifying each of an ambient analog signal and a flash analog signal with at least two different gains, where each analog signal includes optical scene information captured based on an optical image focused on an image sensor. In yet another embodiment, each analog signal may be amplified using the at least two different gains on a pixel-by-pixel, line-by-line, or frame-by-frame basis.

In one embodiment, the UI system 13-1000 presents a display image 13-1010 that includes, without limitation, a combined image 13-1020, and a control region 13-1025, which in FIG. 13-4A is shown to include a slider control 13-1030 configured to move along track 13-1032, and two or more indication points 13-1040, which may each include a visual marker displayed within display image 13-1010.

In one embodiment, the UI system 13-1000 is generated by an adjustment tool executing within a processor complex 310 of a digital photographic system 300, and the display image 13-1010 is displayed on display unit 312. In one embodiment, at least two digital images comprise source images for generating the combined image 13-1020. The at least two digital images may reside within NV memory 316, volatile memory 318, memory subsystem 362, or any combination thereof. In another embodiment, the UI system 13-1000 is generated by an adjustment tool executing within a computer system, such as a laptop computer or a desktop computer. The at least two digital images may be transmitted to the computer system or may be generated by an attached camera device. In yet another embodiment, the UI system 13-1000 may be generated by a cloud-based server computer system, which may download the at least two digital images to a client browser, which may execute combining operations described below. In another embodiment, the UI system 13-1000 is generated by a cloud-based server computer system, which receives the at least two digital images from a digital photographic system in a mobile device, and which may execute the combining operations described below in conjunction with generating combined image 13-1020.

The slider control 13-1030 may be configured to move between two end points corresponding to indication points 13-1040-A and 13-1040-C. One or more indication points, such as indication point 13-1040-B may be positioned between the two end points. Of course, in other embodiment, the control region 13-1025 may include other configurations of indication points 13-1040 between the two end points. For example, the control region 13-1025 may include more or less than one indication point.

Each indication point 13-1040 may be associated with a specific rendering of a combined image 13-1020, or a specific combination of two or more digital images. For example, the indication point 13-1040-A may be associated with a first digital image generated from an ambient analog signal captured during a first exposure time, and amplified utilizing a first gain; and the indication point 13-1040-C may be associated with a second digital image generated from a flash analog signal captured during a second exposure time, and amplified utilizing a second gain. Both the first digital image and the second digital image may be from a single exposure, as described hereinabove. Further, the first digital image may include an ambient capture of the single exposure, and the second digital image may include a flash capture of the single exposure. In one embodiment, the first gain and the second gain may be the same gain. In another embodiment, when the slider control 13-1030 is positioned directly over the indication point 13-1040-A, only the first digital image may be displayed as the combined image 13-1020 in the display image 13-1010, and similarly when the slider control 13-1030 is positioned directly over the indication point 13-1040-C, only the second digital image may be displayed as the combined image 13-1020 in the display image 13-1010.

In one embodiment, indication point 13-1040-B may be associated with a blending of the first digital image and the second digital image. Further, the first digital image may be an ambient digital image, and the second digital image may be a flash digital image. Thus, when the slider control 13-1030 is positioned at the indication point 13-1040-B, the combined image 13-1020 may be a blend of the ambient digital image and the flash digital image. In one embodiment, blending of the ambient digital image and the flash digital image may comprise alpha blending, brightness blending, dynamic range blending, and/or tone mapping or other non-linear blending and mapping operations. In another embodiment, any blending of the first digital image and the second digital image may provide a new image that has a greater dynamic range or other visual characteristics that are different than either of the first image and the second image alone. In one embodiment, a blending of the first digital image and the second digital image may allow for control of a flash contribution within the combined image. Thus, a blending of the first digital image and the second digital image may provide a new computed image that may be displayed as combined image 13-1020 or used to generate combined image 13-1020. To this end, a first digital signal and a second digital signal may be combined, resulting in at least a portion of a combined image. Further, one of the first digital signal and the second digital signal may be further combined with at least a portion of another digital image or digital signal. In one embodiment, the other digital image may include another combined image, which may include an HDR image.

In one embodiment, when the slider control 13-1030 is positioned at the indication point 13-1040-A, the first digital image is displayed as the combined image 13-1020, and when the slider control 13-1030 is positioned at the indication point 13-1040-C, the second digital image is displayed as the combined image 13-1020; furthermore, when slider control 13-1030 is positioned at indication point 13-1040-B, a blended image is displayed as the combined image 13-1020. In such an embodiment, when the slider control 13-1030 is positioned between the indication point 13-1040-A and the indication point 13-1040-C, a mix (e.g. blend) weight may be calculated for the first digital image and the second digital image. For the first digital image, the mix weight may be calculated as having a value of 0.0 when the slider control 13-1030 is at indication point 13-1040-C and a value of 1.0 when slider control 13-1030 is at indication point 13-1040-A, with a range of mix weight values between 0.0 and 1.0 located between the indication points 13-1040-C and 13-1040-A, respectively. For the second digital image, the mix weight may be calculated as having a value of 0.0 when the slider control 13-1030 is at indication point 13-1040-A and a value of 1.0 when slider control 13-1030 is at indication point 13-1040-C, with a range of mix weight values between 0.0 and 1.0 located between the indication points 13-1040-A and 13-1040-C, respectively.

In another embodiment, the indication point 13-1040-A may be associated with a first combination of images, and the indication point 13-1040-C may be associated with a second combination of images. Each combination of images may include an independent blend of images. For example, the indication point 13-1040-A may be associated with a blending of the digital images of ambient image stack 13-732(0) of FIG. 13-3, and the indication point 13-1040-C may be associated with a blending of the digital images of flash image stack 13-732(1). In other words, the indication point 13-1040-A may be associated with a blended ambient digital image or blended ambient digital signal, and the indication point 13-1040-C may be associated with a blended flash digital image or blended flash digital signal. In such an embodiment, when the slider control 13-1030 is positioned at the indication point 13-1040-A, the blended ambient digital image is displayed as the combined image 13-1020, and when the slider control 13-1030 is positioned at the indication point 13-1040-C, the blended flash digital image is displayed as the combined image 13-1020. Each of the blended ambient digital image and the blended flash digital image may be associated with unique light sensitivities.

Further, when slider control 13-1030 is positioned at indication point 13-1040-B, the blended ambient digital image may be blended with the blended flash digital image to generate a new blended image. The new blended image may be associated with yet another unique light sensitivity, and may offer a balance of proper background exposure due to the blending of ambient images, with a properly lit foreground subject due to the blending of flash images. In such an embodiment, when the slider control 13-1030 is positioned between the indication point 13-1040-A and the indication point 13-1040-C, a mix (e.g. blend) weight may be calculated for the blended ambient digital image and the blended flash digital image. For the blended ambient digital image, the mix weight may be calculated as having a value of 0.0 when the slider control 13-1030 is at indication point 13-1040-C and a value of 1.0 when slider control 13-1030 is at indication point 13-1040-A, with a range of mix weight values between 0.0 and 1.0 located between the indication points 13-1040-C and 13-1040-A, respectively. For the blended flash digital image, the mix weight may be calculated as having a value of 0.0 when the slider control 13-1030 is at indication point 13-1040-A and a value of 1.0 when slider control 13-1030 is at indication point 13-1040-C, with a range of mix weight values between 0.0 and 1.0 located between the indication points 13-1040-A and 13-1040-C, respectively.

FIG. 13-4B illustrates a user interface (UI) system 13-1050 for generating a combined image 13-1020, according to one embodiment. As an option, the UI system 13-1050 may be implemented in the context of the details of any of the Figures disclosed herein. Of course, however, the UI system 13-1050 may be implemented in any desired environment. Further, the aforementioned definitions may equally apply to the description below.

As shown in FIG. 13-4B, the UI system 13-1050 may be substantially identical to the UI system 13-1000 of FIG. 13-4A, with exception of the control region 13-1025 of UI system 13-1000 and control region 13-1026 of UI system 13-1050. The control region 13-1026 of UI system 13-1050 is shown to include six indication points 13-1040-U, 13-1040-V, 13-1040-W, 13-1040-X, 13-1040-Y, and 13-1040-Z. The indication points 13-1040-U and 13-1040-Z may be representative of end points, similar to the indication points 13-1040-A and 13-1040-C, respectively, of UI system 13-1000. Further, the control region 13-1026 of UI system 13-1050 is shown to include a plurality of indication points 13-1040—such as indication points 13-1040-V, 13-1040-W, 13-1040-X, and 13-1040-Y—disposed between the two end points along track 13-1032. Each of the indication points may be associated with one or more digital images of image stacks 13-732.

For example, an ambient image stack 13-732 may be generated to include each of an ambient digital image at EV−1 exposure, an ambient digital image at EV0 exposure, and an ambient digital image at EV+1 exposure. Said ambient image stack 13-732 may be associated with a first analog storage plane captured at a first exposure time, such as the ambient image stack 13-732(0) of FIG. 13-3. Thus, an ambient image stack may include a plurality of digital images all associated with a first exposure time during an ambient capture, where each digital image is associated with a different ISO or light sensitivity. Further, a flash image stack 13-732 may also be generated to include each of a flash digital image at EV−1 exposure, a flash digital image at EV0 exposure, and a flash digital image at EV+1 exposure. However, the flash image stack 13-732 may be associated with a second analog storage plane captured at a second exposure time during which a strobe or flash was activated, such as the flash image stack 13-732(1) of FIG. 13-3. Thus, a flash image stack may include a second plurality of digital images all associated with a second exposure time during which a strobe or flash was activated, where each flash digital image is associated with a different ISO or light sensitivity.

After analog-to-digital units 13-722(0) and 13-722(1) generate the respective image stacks 13-732, the digital pixel data output by the analog-to-digital units 13-722(0) and 13-722(1) may be arranged together into a single sequence of digital images of increasing or decreasing exposure. In one embodiment, no two digital signals of the two image stacks may be associated with a same ISO+exposure time combination, such that each digital image or instance of digital pixel data may be considered as having a unique effective exposure.

In one embodiment, and in the context of the foregoing figures, each of the indication points 13-1040-U, 13-1040-V, and 13-1040-W may be associated with digital images of an image stack 13-732, and each of the indication points 13-1040-X, 13-1040-Y, and 13-1040-Z may be associated with digital images of another image stack 13-732. For example, each the indication points 13-1040-U, 13-1040-V, and 13-1040-W may be associated with a different ambient digital image or ambient digital signal. Similarly, each of the indication points 13-1040-X, 13-1040-Y, and 13-1040-Z may be associated with a different flash digital image or flash digital signal. In such an embodiment, as the slider 13-1030 is moved from left to right along the track 13-1032, exposure and flash contribution of the combined image 13-1020 may appear to be adjusted or changed. Of course, when the slider 13-1030 is between two indication points along the track 13-1032, the combined image 13-1032 may be a combination of any two or more images of the two image stacks 13-732.

In another embodiment, the digital images or instances of digital pixel data output by the analog-to-digital units 13-722(0) and 13-722(1) may be arranged into a single sequence of digital images of increasing or decreasing exposure. In such an embodiment, the sequence may alternate between ambient and flash digital images. For example, for each of the digital images, gain and exposure time may be combined to determine an effective exposure of the digital image. The digital pixel data may be rapidly organized to obtain a single sequence of digital images of increasing effective exposure, such as, for example: 13-723(0), 13-723(1), 13-724(0), 13-724(1), 13-725(0), and 13-725(1). In such an organization, the sequence of digital images may alternate between flash digital images and ambient digital images. Of course, any sorting of the digital images or digital pixel data based on effective exposure level will depend on an order of application of the gains and generation of the digital signals 13-723-13-725.

In one embodiment, exposure times and gains may be selected or predetermined for generating a number of adequately different effective exposures. For example, where three gains are to be applied, then each gain may be selected to be two exposure stops away from a nearest selected gain. Further, a first exposure time may be selected to be one exposure stop away from a second exposure time. In such an embodiment, selection of three gains separated by two exposure stops, and two exposure times separated by one exposure stop, may ensure generation of six digital images, each having a unique effective exposure.

In another embodiment, exposure times and gains may be selected or predetermined for generating corresponding images of similar exposures between the ambient image stack and the flash image stack. For example, a first digital image of an ambient image stack may be generated utilizing an exposure time and gain combination that corresponds to an exposure time and gain combination utilized to generate a first digital image of a flash image stack. This may be done so that the first digital image of the ambient image stack has a similar effective exposure to that of the first digital image of the flash image stack, which may assist in adjusting a flash contribution in a combined image generated by blending the two digital images.

With continuing reference to the digital images of multiple image stacks sorted in a sequence of increasing exposure, each of the digital images may then be associated with indication points along the track 13-1032 of the UI system 13-1050. For example, the digital images may be sorted or sequenced along the track 13-1032 in the order of increasing effective exposure noted previously (13-723(0), 13-723(1), 13-724(0), 13-724(1), 13-725(0), and 13-725(1)) at indication points 13-1040-U, 13-1040-V, 13-1040-W, 13-1040-X, 13-1040-Y, and 13-1040-Z, respectively.

In such an embodiment, the slider control 13-1030 may then be positioned at any point along the track 13-1032 that is between two digital images generated based on two different analog storage planes, where each analog storage plane is associated with a different scene illumination. As a result, a digital image generated based on an analog storage plane associated with ambient illumination may then be blended with a digital image generated based on an analog storage plane associated with flash illumination to generate a combined image 13-1020. In this way, one or more images captured with ambient illumination may be blended with one or more images captured with flash illumination.

For example, the slider control 13-1030 may be positioned at an indication point that may be equally associated with digital pixel data 13-724(0) and digital pixel data 13-724(1). As a result, the digital pixel data 13-724(0), which may include a first digital image generated from an ambient analog signal captured during a first exposure time with ambient illumination and amplified utilizing a gain, may be blended with the digital pixel data 13-724(1), which may include a second digital image generated from a flash analog signal captured during a second exposure time with flash illumination and amplified utilizing the same gain, to generate a combined image 13-1020.

Still further, as another example, the slider control 13-1030 may be positioned at an indication point that may be equally associated with digital pixel data 13-724(1) and digital pixel data 13-725(0). As a result, the digital pixel data 13-724(1), which may include a first digital image generated from an ambient analog signal captured during a first exposure time with ambient illumination and amplified utilizing a first gain, may be blended with the digital pixel data 13-725(0), which may include a second digital image generated from a flash analog signal captured during a second exposure time with flash illumination and amplified utilizing a different gain, to generate a combined image 13-1020.

Thus, as a result of the slider control 13-1030 positioning, two or more digital signals may be blended, and the blended digital signals may be generated utilizing analog values from different analog storage planes. As a further benefit of sorting effective exposures along a slider, and then allowing blend operations based on slider control position, each pair of neighboring digital images may include a higher noise digital image and a lower noise digital image. For example, where two neighboring digital signals are amplified utilizing a same gain, the digital signal generated from an analog signal captured with a lower exposure time may have less noise. Similarly, where two neighboring digital signals are amplified utilizing different gains, the digital signal generated from an analog signal amplified with a lower gain value may have less noise. Thus, when digital signals are sorted based on effective exposure along a slider, a blend operation of two or more digital signals may serve to reduce the noise apparent in at least one of the digital signals.

Of course, any two or more effective exposures may be blended based on the indication point of the slider control 13-1030 to generate a combined image 13-1020 in the UI system 13-1050.

In one embodiment, a mix operation may be applied to a first digital image and a second digital image based upon at least one mix weight value associated with at least one of the first digital image and the second digital image. In one embodiment, a mix weight of 1.0 gives complete mix weight to a digital image associated with the 1.0 mix weight. In this way, a user may blend between the first digital image and the second digital image. To this end, a first digital signal and a second digital signal may be blended in response to user input. For example, sliding indicia may be displayed, and a first digital signal and a second digital signal may be blended in response to the sliding indicia being manipulated by a user.

A system of mix weights and mix operations provides a UI tool for viewing a first digital image, a second digital image, and a blended image as a gradual progression from the first digital image to the second digital image. In one embodiment, a user may save a combined image 13-1020 corresponding to an arbitrary position of the slider control 13-1030. The adjustment tool implementing the UI system 13-1000 may receive a command to save the combined image 13-1020 via any technically feasible gesture or technique. For example, the adjustment tool may be configured to save the combined image 13-1020 when a user gestures within the area occupied by combined image 13-1020. Alternatively, the adjustment tool may save the combined image 13-1020 when a user presses, but does not otherwise move the slider control 13-1030. In another implementation, the adjustment tool may save the combined image 13-1020 when a user gestures, such as by pressing a UI element (not shown), such as a save button, dedicated to receive a save command.

To this end, a slider control may be used to determine a contribution of two or more digital images to generate a final computed image, such as combined image 13-1020. Persons skilled in the art will recognize that the above system of mix weights and mix operations may be generalized to include two or more indication points, associated with two or more related images. Such related images may comprise, without limitation, any number of digital images that have been generated from two or more analog storage planes, and which may have zero, or near zero, interframe time.

Furthermore, a different continuous position UI control, such as a rotating knob, may be implemented rather than the slider 13-1030.

Figures 4C, 13:
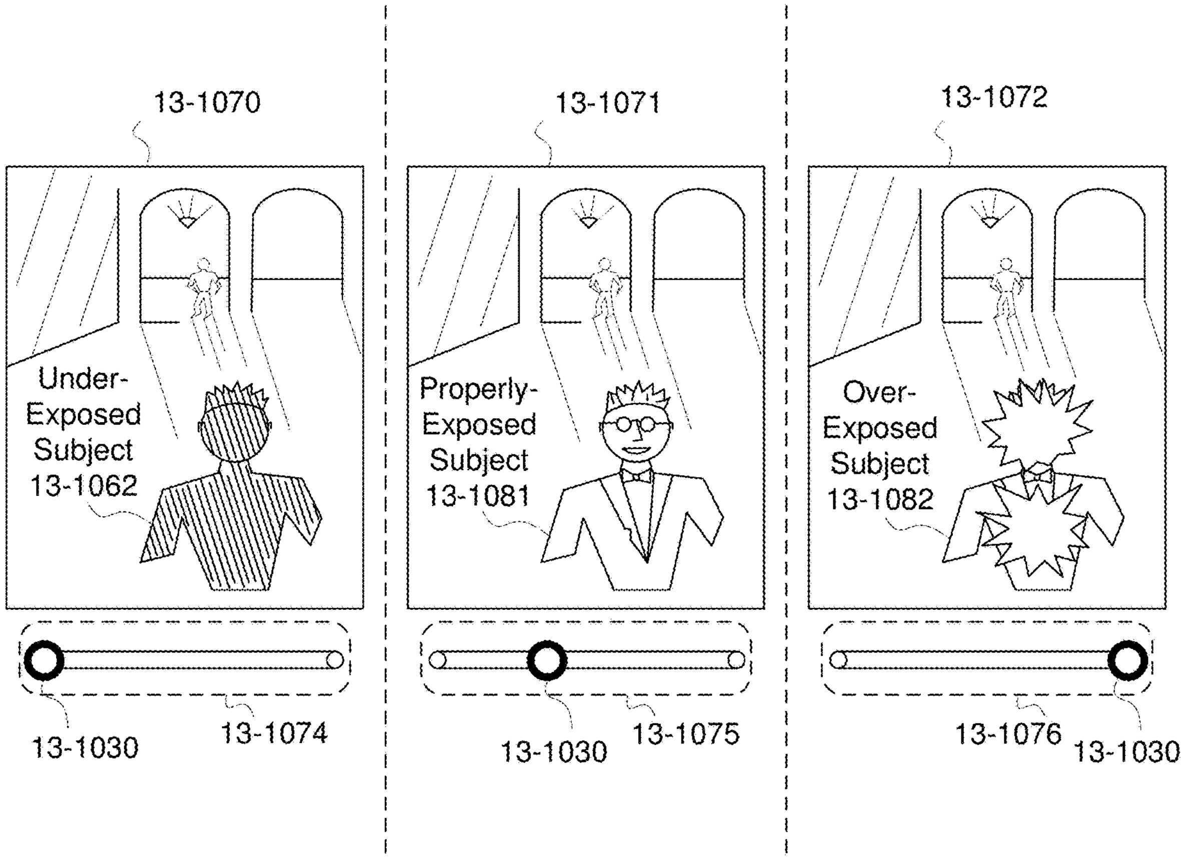

FIG. 13-4C illustrates user interface (UI) systems displaying combined images 13-1070-13-1072 with differing levels of strobe exposure, according to one embodiment. As an option, the UI systems of FIG. 13-4C may be implemented in the context of the details of any of the Figures disclosed herein. Of course, however, the UI systems be implemented in any desired environment. Further, the aforementioned definitions may equally apply to the description below.

As shown in FIG. 13-4C, a blended image may be blended from two or more images based on a position of slider control 13-1030. As shown, the slider control 13-1030 is configured to select one or more source images for input to a blending operation, where the source images are associated with increasing strobe intensity as the slider control 13-1030 moves from left to right.

For example, based on the position of slider control 13-1030 in control region 13-1074, first blended image 13-1070 may be generated utilizing one or more source images captured without strobe or flash illumination. As a specific example, the first blended image 13-1070 may be generated utilizing one or more images captured using only ambient illumination. The one or more images captured using only ambient illumination may comprise an image stack 13-732, such as the ambient image stack 13-732(0). As shown, the first blended image 13-1070 includes an under-exposed subject 13-1062. Further, based on the position of slider control 13-1030 in control region 13-1076, third blended image 13-1072 may be generated utilizing one or more source images captured using strobe or flash illumination. The one or more source images associated with the position of slider control 13-1030 in the control region 13-1076 may comprise an image stack 13-732, such as the flash image stack 13-732(1). As shown, the third blended image 13-1072 includes an over-exposed subject 13-1082.

By manipulating the slider control 13-1030, a user may be able to adjust the contribution of the source images used to generate the blended image. Or, in other words, the user may be able to adjust the blending of one or more images. For example, the user may be able to adjust or increase a flash contribution from the one or more source images captured using strobe or flash illumination. As illustrated in FIG. 13-4C, when a user positions the slider control 13-1030 along a track away from track end points, as shown in control region 13-1075, a flash contribution from the one or more source images captured using strobe or flash illumination may be blended with the one or more source images captured using ambient illumination. This may result in the generation of second blended image 13-1071, which includes a properly exposed subject 13-1081. To this end, by blending digital images captured in ambient lighting conditions with digital images of the same photographic scene captured with strobe or flash illumination, novel digital images may be generated. Further, a flash contribution of the digital images captured with strobe or flash illumination may be adjustable by a user to ensure that both foreground subjects and background objects are properly exposed.

A determination of appropriate strobe intensity may be subjective, and embodiments disclosed herein advantageously enable a user to subjectively select a final combined image having a desired strobe intensity after a digital image has been captured. In practice, a user is able to capture what is apparently a single photograph by asserting a single shutter-release. The single shutter-release may cause capture of a set of ambient samples to a first analog storage plane during a first exposure time, and capture of a set of flash samples to a second analog storage plane during a second exposure time that immediately follows the first exposure time. The ambient samples may comprise an ambient analog signal that is then used to generate multiple digital images of an ambient image stack. Further, the flash samples may comprise a flash analog signal that is then used to generate multiple digital images of a flash image stack. By blending two or more images of the ambient image stack and the flash image stack, the user may thereby identify a final combined image with desired strobe intensity. Further, both the ambient image stack and the flash image stack may be stored, such that the user can select the final combined image at a later time.

In other embodiments, two or more slider controls may be presented in a UI system. For example, in one embodiment, a first slider control may be associated with digital images of an ambient image stack, and a second slider control may be associated with digital images of a flash image stack. By manipulating the slider controls independently, a user may control a blending of ambient digital images independently from blending of flash digital images. Such an embodiment may allow a user to first select a blending of images from the ambient image stack that provides a preferred exposure of background objects. Next, the user may then select a flash contribution. For example, the user may select a blending of images from the flash image stack that provides a preferred exposure of foreground objects. Thus, by allowing for independent selection of ambient contribution and flash contribution, a final blended or combined image may include properly exposed foreground objects as well as properly exposed background objects.

In another embodiment, a desired exposure for one or more given regions of a blended image may be identified by a user selecting another region of the blended image. For example, the other region selected by the user may be currently displayed at a proper exposure within a UI system while the one or more given regions are currently under-exposed or over-exposed. In response to the user's selection of the other region, a blending of source images from an ambient image stack and a flash image stack may be identified to provide the proper exposure at the one or more given regions of the blended image. The blended image may then be updated to reflect the identified blending of source images that provides the proper exposure at the one or more given regions.

In another embodiment, images of a given image stack may be blended before performing any blending operations with images of a different image stack. For example, two or more ambient digital images or ambient digital signals, each with a unique light sensitivity, may be blended to generate a blended ambient digital image with a blended ambient light sensitivity. Further, the blended ambient digital image may then be subsequently blended with one or more flash digital images or flash digital signals. The blending with the one or more flash digital images may be in response to user input. In another embodiment, two or more flash digital images may be blended to generate a blended flash digital image with a blended flash light sensitivity, and the blended flash digital image may then be blended with the blended ambient digital image.

As another example, two or more flash digital images or flash digital signals, each with a unique light sensitivity, may be blended to generate a blended flash digital image with a blended flash light sensitivity. Further, the blended flash digital image may then be subsequently blended with one or more ambient digital images or ambient digital signals. The blending with the one or more ambient digital images may be in response to user input. In another embodiment, two or more ambient digital images may be blended to generate a blended ambient digital image with a blended ambient light sensitivity, and the blended ambient digital image may then be blended with the blended flash digital image.

In one embodiment, the ambient image stack may include digital images at different effective exposures than the digital images of the flash image stack. This may be due to application of different gain values for generating each of the ambient image stack and the flash image stack. For example, a particular gain value may be selected for application to an ambient analog signal, but not for application to a corresponding flash analog signal.

As shown in FIG. 11-8, a wireless mobile device 11-376 (0) generates at least two digital images. In one embodiment, the at least two digital images may be generated by amplifying analog values of two or more analog storage planes, where each generated digital image may correspond to digital output of an applied gain. In one embodiment, a first digital image may include an EV−1 exposure of a photographic scene, and a second digital image may include an EV+1 exposure of the photographic scene. In another embodiment, the at least two digital images may include an EV−2 exposure of a photographic scene, an EV0 exposure of the photographic scene, and an EV+2 exposure of the photographic scene. In yet another embodiment, the at least two digital images may comprise one or more image stacks. For example, the at least two digital images may comprise an ambient image stack and/or a flash image stack.

With respect to FIG. 11-8, user manipulation of the slider control may adjust a flash contribution of one or more source images captured with strobe or flash illumination.

One advantage of the present invention is that a digital photograph may be selectively generated based on user input using two or more different images generated from a single exposure of a photographic scene. Accordingly, the digital photograph generated based on the user input may have a greater dynamic range than any of the individual images. Additionally, a user may selectively adjust a flash contribution of the different images to the generated digital photograph. Further, the generation of an HDR image using two or more different images with zero, or near zero, interframe time allows for the rapid generation of HDR images without motion artifacts.

Additionally, when there is any motion within a photographic scene, or a capturing device experiences any jitter during capture, any interframe time between exposures may result in a motion blur within a final merged HDR photograph. Such blur can be significantly exaggerated as interframe time increases. This problem renders current HDR photography an ineffective solution for capturing clear images in any circumstance other than a highly static scene. Further, traditional techniques for generating a HDR photograph involve significant computational resources, as well as produce artifacts which reduce the image quality of the resulting image. Accordingly, strictly as an option, one or more of the above issues may or may not be addressed utilizing one or more of the techniques disclosed herein.

Still yet, in various embodiments, one or more of the techniques disclosed herein may be applied to a variety of markets and/or products. For example, although the techniques have been disclosed in reference to a photo capture, they may be applied to televisions, web conferencing (or live streaming capabilities, etc.), security cameras (e.g. increase contrast to determine characteristic, etc.), automobiles (e.g. driver assist systems, in-car infotainment systems, etc.), and/or any other product which includes a camera input.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Figures 1, 14:
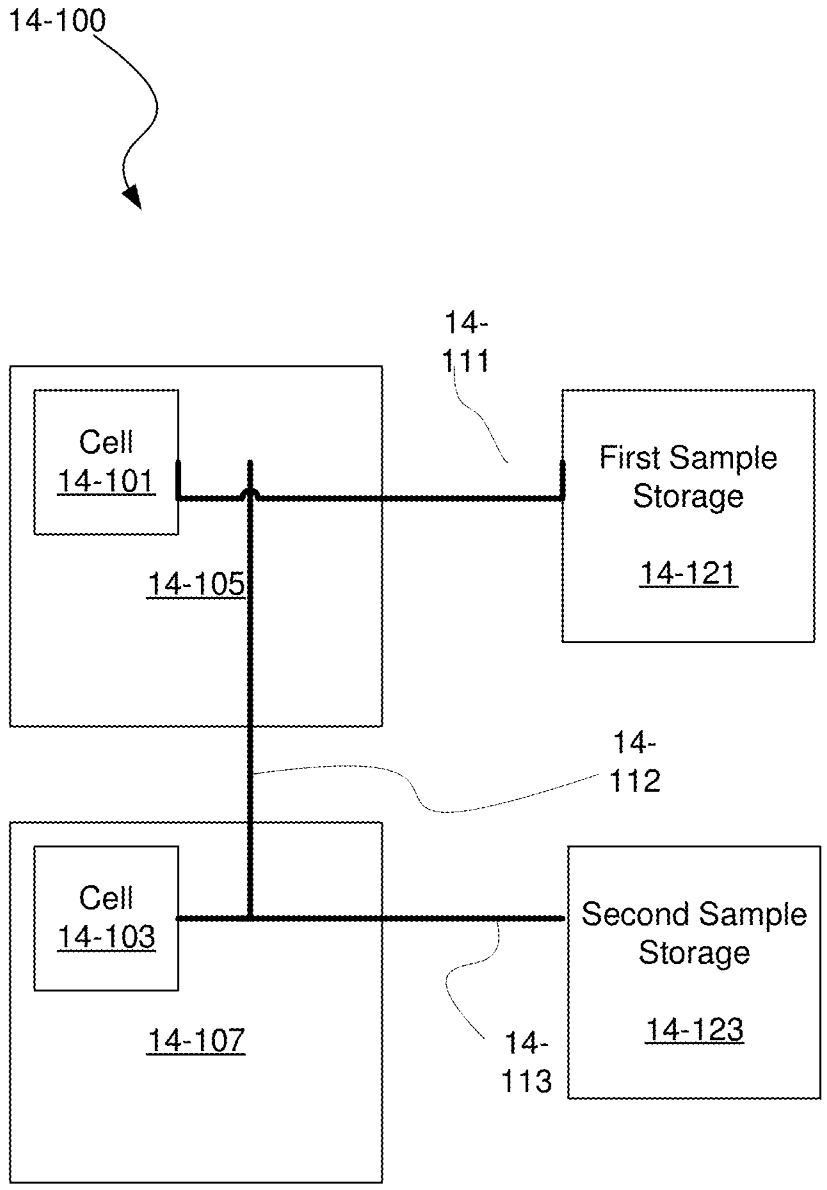
Figures 2, 14:
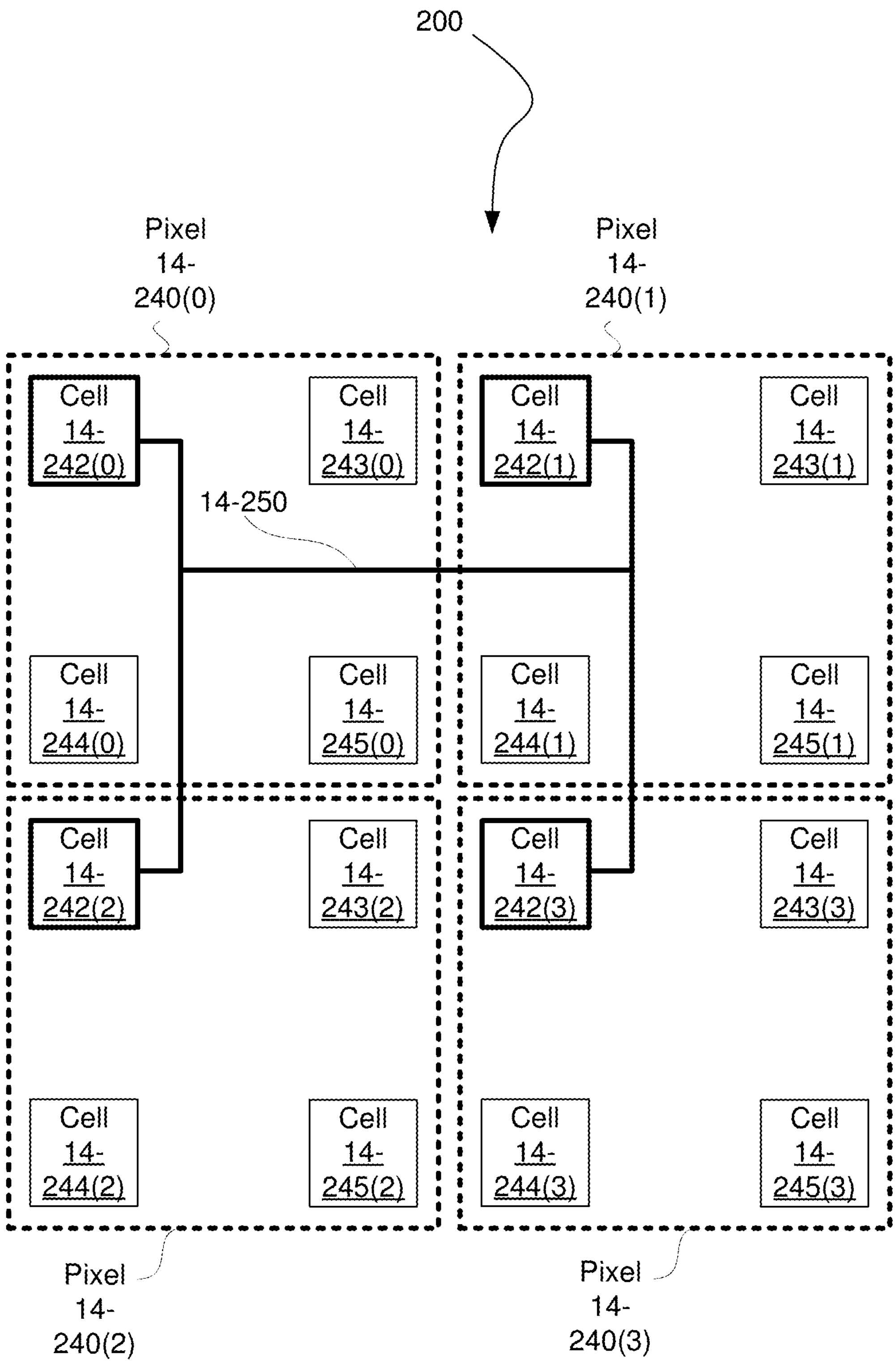
Figures 3A, 14:
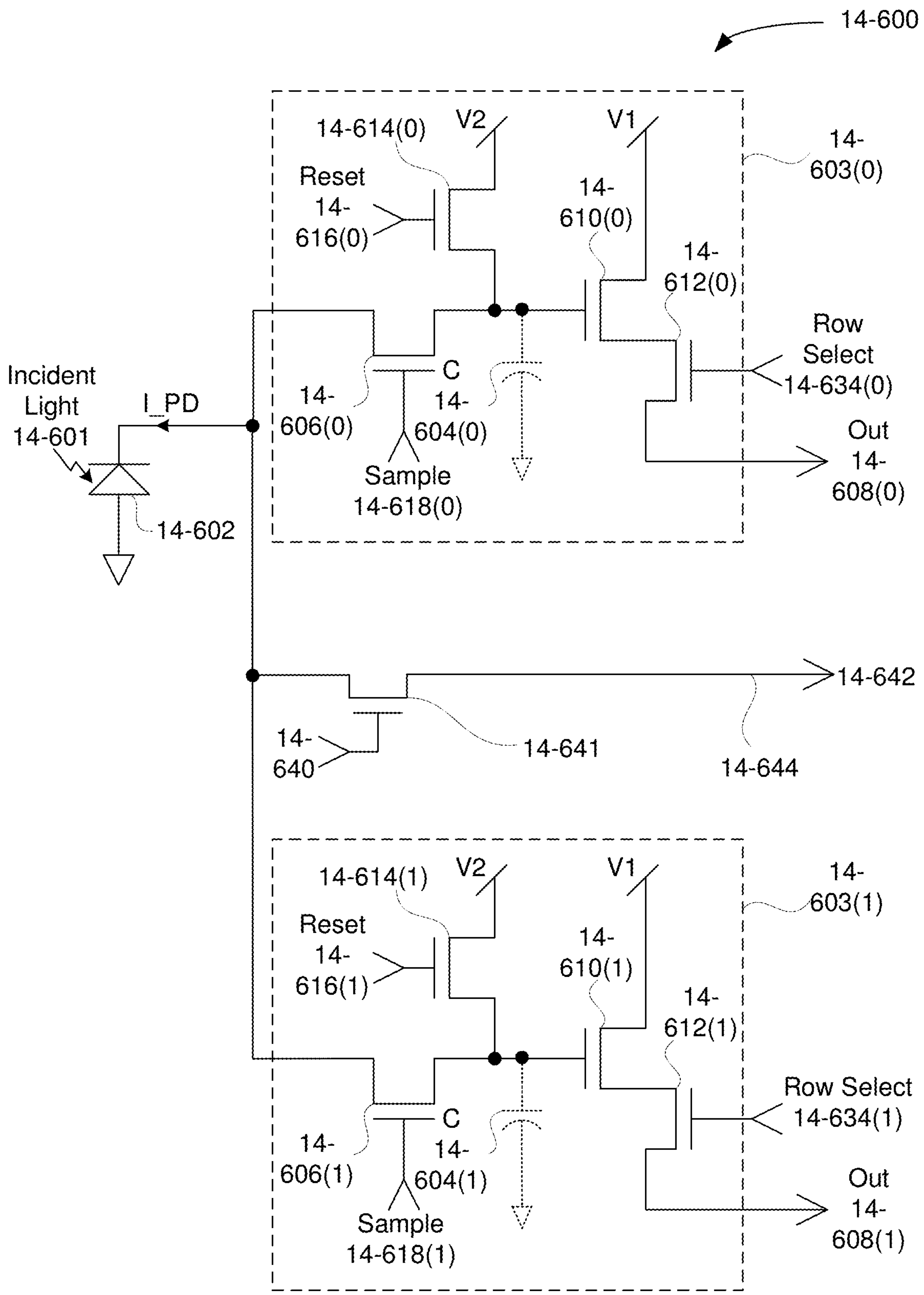
Figures 3B, 14:
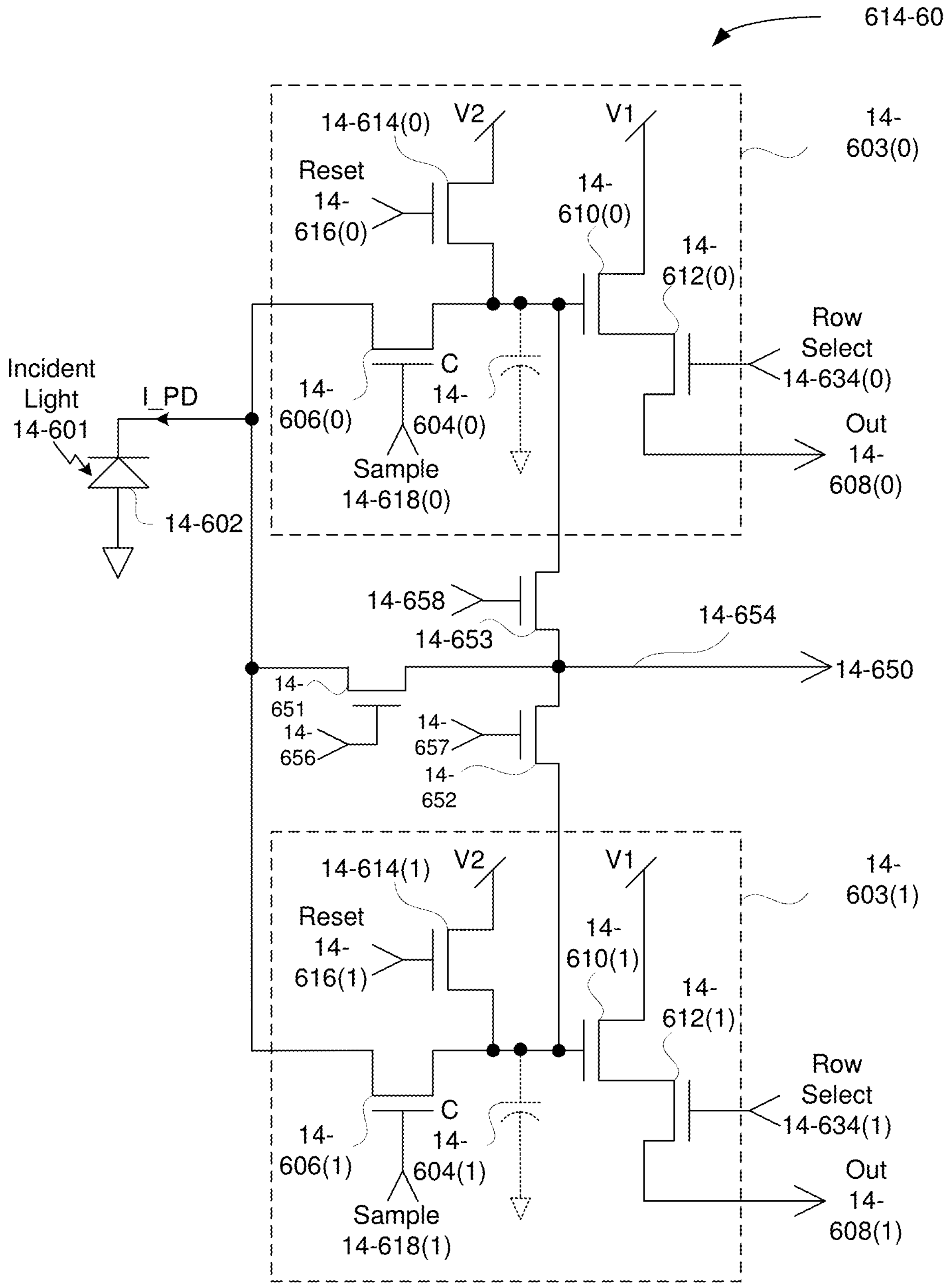
Figures 3C, 14:
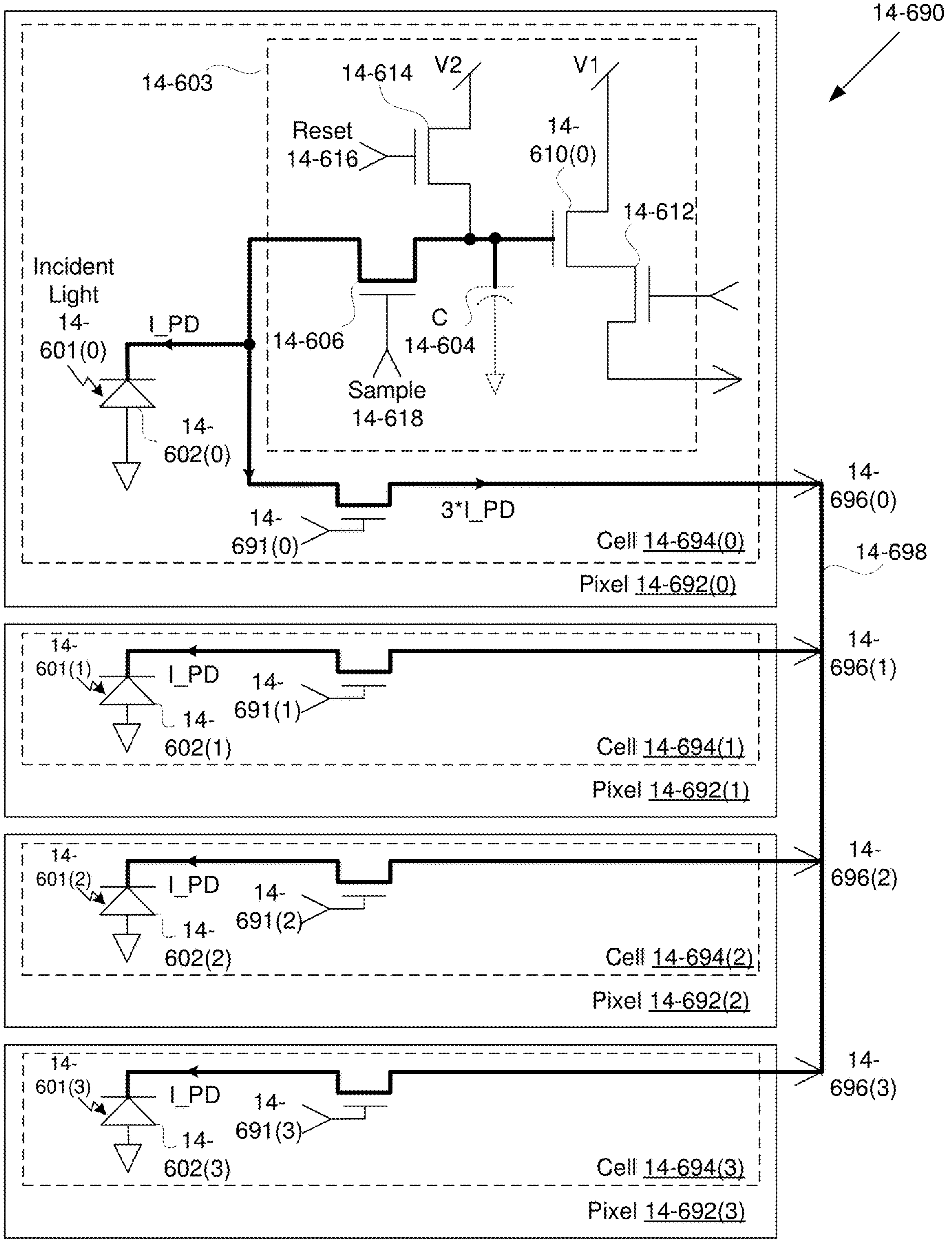
Figures 4, 14:
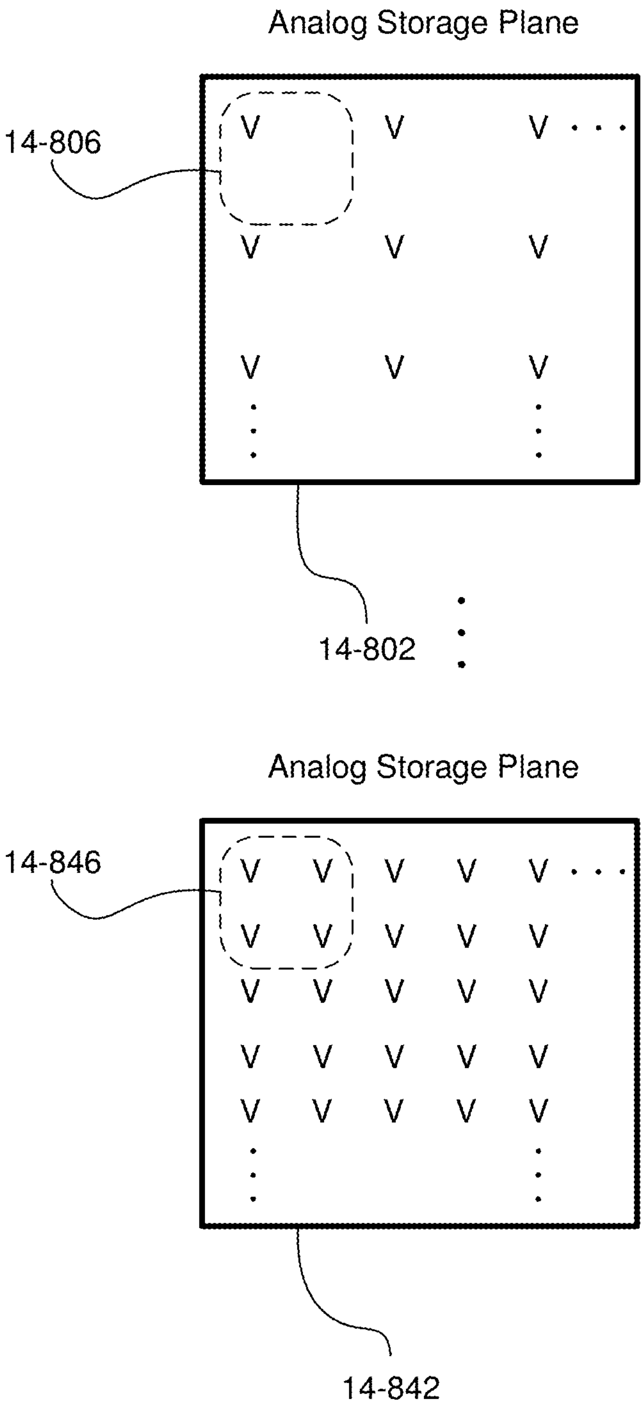
Figures 5, 14:
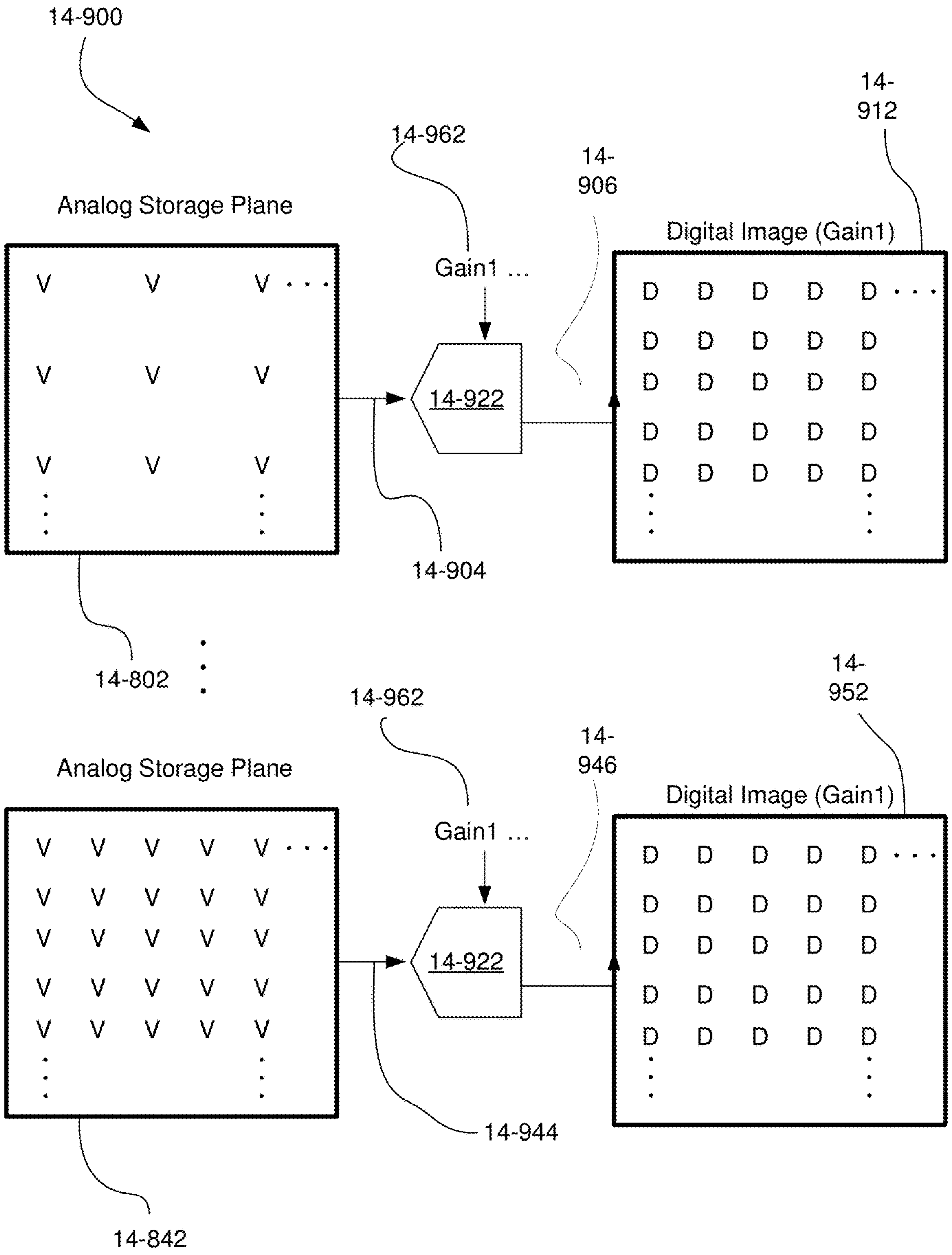

FIG. 14-1 illustrates a system 14-100 for obtaining low-noise, high-speed captures of a photographic scene, in accordance with one embodiment. As an option, the system 14-100 may be implemented in the context of any of the Figures disclosed herein. Of course, however, the system

14-100 may be implemented in any desired environment. Further, the aforementioned definitions may equally apply to the description below.

As shown in FIG. 14-1, the system 14-100 includes a first pixel 14-105, a second pixel 14-107, a first sample storage node 14-121, and a second sample storage node 14-123. Further, the first pixel 14-105 is shown to include a first cell 14-101, and the second pixel 14-107 is shown to include a second cell 14-103. In one embodiment, each pixel may include one or more cells. For example, in some embodiments, each pixel may include four cells. Further, each of the cells may include a photodiode, photosensor, or any photosensing electrical element. A photodiode may comprise any semiconductor diode that generates a potential difference, current, or changes its electrical resistance, in response to photon absorption. Accordingly, a photodiode may be used to detect or measure a light intensity.

Referring again to FIG. 14-1, the first cell 14-101 and the first sample storage node 14-121 are in communication via interconnect 14-111, the second cell 14-103 and the second sample storage node 14-123 are in communication via interconnect 14-113, and the first cell 14-101 and the second cell 14-103 are in communication via interconnect 14-112.

Each of the interconnects 14-111-14-113 may carry an electrical signal from one or more cells to a sample storage node. For example, the interconnect 14-111 may carry an electrical signal from the cell 14-101 to the first sample storage node 14-121. The interconnect 14-113 may carry an electrical signal from the cell 14-103 to the second sample storage node 14-123. Further, the interconnect 14-112 may carry an electrical signal from the cell 14-103 to the first sample storage node 14-121, or may carry an electrical signal from the cell 14-101 to the second sample storage node 14-123. In such embodiments, the interconnect 14-112 may enable a communicative coupling between the first cell 14-101 and the second cell 14-103. Further, in some embodiments, the interconnect 14-112 may be operable to be selectively enabled or disabled. In such embodiments, the interconnect 14-112 may be selectively enabled or disable using one or more transistors and/or control signals.

In one embodiment, each electrical signal carried by the interconnects 14-111-113 may include a photodiode current. For example, each of the cells 14-101 and 14-103 may include a photodiode. Each of the photodiodes of the cells 14-101 and 14-103 may generate a photodiode current which is communicated from the cells 14-101 and 14-103 via the interconnects 14-111-113 to one or more of the sample storage nodes 14-121 and 14-123. In configurations where the interconnect 14-112 is disabled, the interconnect 14-113 may communicate a photodiode current from the cell 14-103 to the second sample storage node 14-123, and, similarly, the interconnect 14-111 may communicate a photodiode current from the cell 14-101 to the first sample storage node 14-121. However, in configurations where the interconnect 14-112 is enabled, both the cell 14-101 and the cell 14-103 may communicate a photodiode current to the first sample storage node 14-121 and the second sample storage node 14-123.

Of course, each sample storage node may be operative to receive any electrical signal from one or more communicatively coupled cells, and then store a sample based upon the received electrical signal. In some embodiments, each sample storage node may be configured to store two or more samples. For example, the first sample storage node 14-121 may store a first sample based on a photodiode current from the cell 14-101, and may separately store a second sample based on, at least in part, a photodiode current from the cell 14-103.

In one embodiment, each sample storage node includes a charge storing device for storing a sample, and the sample stored at a given storage node may be a function of a light intensity detected at one or more associated photodiodes. For example, the first sample storage node 14-121 may store a sample as a function of a received photodiode current, which is generated based on a light intensity detected at a photodiode of the cell 14-101. Further, the second sample storage node 14-123 may store a sample as a function of a received photodiode current, which is generated based on a light intensity detected at a photodiode of the cell 14-103. As yet another example, when the interconnect 14-112 is enabled, the first sample storage node 14-121 may receive a photodiode current from each of the cells 14-101 and 14-103, and the first sample storage node 14-121 may thereby store a sample as a function of both the light intensity detected at the photodiode of the cell 14-101 and the light intensity detected at the photodiode of the cell 14-103.

In one embodiment, each sample storage node may include a capacitor for storing a charge as a sample. In such an embodiment, each capacitor stores a charge that corresponds to an accumulated exposure during an exposure time or sample time. For example, current received at each capacitor from one or more associated photodiodes may cause the capacitor, which has been previously charged, to discharge at a rate that is proportional to incident light intensity detected at the one or more photodiodes. The remaining charge of each capacitor may be referred to as a value or analog value, and may be subsequently output from the capacitor. For example, the remaining charge of each capacitor may be output as an analog value that is a function of the remaining charge on the capacitor. In one embodiment, via the interconnect 14-112, the cell 14-101 may be communicatively coupled to one or more capacitors of the first sample storage node 14-121, and the cell 14-103 may also be communicatively coupled to one or more capacitors of the first sample storage node 14-121.

In some embodiments, each sample storage node may include circuitry operable for receiving input based on one or more photodiodes. For example, such circuitry may include one or more transistors. The one or more transistors may be configured for rendering the sample storage node responsive to various control signals, such as sample, reset, and row select signals received from one or more controlling devices or components. In other embodiments, each sample storage node may include any device for storing any sample or value that is a function of a light intensity detected at one or more associated photodiode. In some embodiments, the interconnect 14-112 may be selectively enabled or disabled using one or more associated transistors. Accordingly, the cell 14-101 and the cell 14-103 may be in communication utilizing a communicative coupling that includes at least one transistor. In embodiments where each of the pixels 14-105 and 14-107 include additional cells (not shown), the additional cells may not be communicatively coupled to the cells 14-101 and 14-103 via the interconnect 14-112.

In various embodiments, the pixels 14-105 and 14-107 may be two pixels of an array of pixels of an image sensor. Each value stored at a sample storage node may include an electronic representation of a portion of an optical image that has been focused on the image sensor that includes the pixels 14-105 and 14-107. In such an embodiment, the optical image may be focused on the image sensor by a lens.

The electronic representation of the optical image may comprise spatial color intensity information, which may include different color intensity samples (e.g. red, green, and blue light, etc.). In other embodiments, the spatial color intensity information may also include samples for white light. In one embodiment, the optical image may be an optical image of a photographic scene. Such an image sensor may comprise a complementary metal oxide semiconductor (CMOS) image sensor, or charge-coupled device (CCD) image sensor, or any other technically feasible form of image sensor.

FIG. 14-2 illustrates a system 14-200 for obtaining low-noise, high-speed captures of a photographic scene, in accordance with another embodiment. As an option, the system 14-200 may be implemented in the context of any of the Figures disclosed herein. Of course, however, the system 14-200 may be implemented in any desired environment. Further, the aforementioned definitions may equally apply to the description below.

As shown in FIG. 14-2, the system 14-200 includes a plurality of pixels 14-240. Specifically, the system 14-200 is shown to include pixels 14-240(0), 14-240(1), 14-240(2), and 14-240(3). Each of the pixels 14-240 may be substantially identical with respect to composition and configuration. Further, each of the pixels 14-240 may be a single pixel of an array of pixels comprising an image sensor. To this end, each of the pixels 14-240 may comprise hardware that renders the pixel operable to detect or measure various wavelengths of light, and convert the measured light into one or more electrical signals for rendering or generating one or more digital images. Each of the pixels 14-240 may be substantially identical to the pixel 14-105 or the pixel 14-107 of FIG. 14-1.

Further, each of the pixels 14-240 is shown to include a cell 14-242, a cell 14-243, a cell 14-244 and a cell 14-245. In one embodiment, each of the cells 14-242-245 includes a photodiode operative to detect and measure one or more peak wavelengths of light. For example, each of the cells 14-242 may be operative to detect and measure red light, each of the cells 14-243 and 14-244 may be operative to detect and measure green light, and each of the cells 14-245 may be operative to detect and measure blue light. In other embodiments, a photodiode may be configured to detect wavelengths of light other than only red, green, or blue. For example, a photodiode may be configured to detect white, cyan, magenta, yellow, or non-visible light such as infrared or ultraviolet light. Any communicatively coupled cells may be configured to detect a same peak wavelength of light.

In various embodiments, each of the cells 14-242-14-245 may generate an electrical signal in response to detecting and measuring its associated one or more peak wavelengths of light. In one embodiment, each electrical signal may include a photodiode current. A given cell may generate a photodiode current which is sampled by a sample storage node for a selected sample time or exposure time, and the sample storage node may store an analog value based on the sampling of the photodiode current. Of course, as noted previously, each sample storage node may be capable of concurrently storing more than one analog value.

As shown in FIG. 14-2, each of the cells 14-242 are communicatively coupled via an interconnect 14-250. In one embodiment, the interconnect 14-250 may be enabled or disabled using one or more control signals. When the interconnect 14-250 is enabled, the interconnect may carry a combined electrical signal. The combined electrical signal may comprise a combination of electrical signals output from each of the cells 14-242. For example, the combined electrical signal may comprise a combined photodiode current, where the combined photodiode current includes photodiode current received from photodiodes of each of the cells 14-242. Thus, enabling the interconnect 14-250 may serve to increase a combined photodiode current generated based on one or more peak wavelengths of light. In some embodiments, the combined photodiode current may be used to more rapidly store an analog value at a sample storage node than if a photodiode current generated by only a single cell was used to store the analog value. To this end, the interconnect 14-250 may be enabled to render the pixels 14-240 of an image sensor more sensitive to incident light. Increasing the sensitivity of an image sensor may allow for more rapid capture of digital images in low light conditions, capture of digital images with reduced noise, and/or capture of brighter or better exposed digital images in a given exposure time.

The embodiments disclosed herein may advantageously enable a camera module to sample images to have less noise, less blur, and greater exposure in low-light conditions than conventional techniques. In certain embodiments, images may be effectively sampled or captured simultaneously, which may reduce inter-sample time to, or near, zero. In other embodiments, the camera module may sample images in coordination with the strobe unit to reduce inter-sample time between an image sampled without strobe illumination and an image sampled with strobe illumination.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

FIG. 14-3A illustrates a circuit diagram for a photosensitive cell 14-600, in accordance with one possible embodiment. As an option, the cell 14-600 may be implemented in the context of any of the Figures disclosed herein. Of course, however, the cell 14-600 may be implemented in any desired environment. Further, the aforementioned definitions may equally apply to the description below.

As shown in FIG. 14-3A, a photosensitive cell 14-600 includes a photodiode 14-602 coupled to a first analog sampling circuit 14-603(0) and a second analog sampling circuit 14-603(1). The photodiode 14-602 may be implemented as a photodiode of a cell 14-101 described within the context of FIG. 14-1, or any of the photodiodes 11-562 of FIG. 11-3E. In one embodiment, a unique instance of photosensitive cell 14-600 may be implemented as any of cells 14-242-14-245 within the context of FIG. 14-2, or any of cells 11-542-11-545 within the context of FIGS. 11-3A-11-5E. Further, the first analog sampling circuit 14-603(0) and the second analog sampling circuit 14-603(1) may separately, or in combination, comprise a sample storage node, such as one of the sample storage nodes 14-121 or 14-123 of FIG. 14-1.

As shown, the photosensitive cell 14-600 comprises two analog sampling circuits 14-603, and a photodiode 14-602. The two analog sampling circuits 14-603 include a first analog sampling circuit 14-603(0) which is coupled to a second analog sampling circuit 14-603(1). As shown in FIG. 14-3A, the first analog sampling circuit 14-603(0) comprises transistors 14-606(0), 14-610(0), 14-612(0), 14-614(0), and a capacitor 14-604(0); and the second analog sampling circuit 14-603(1) comprises transistors 14-606(1), 14-610(1), 14-612(1), 14-614(1), and a capacitor 14-604(1). In one embodiment, each of the transistors 14-606, 14-610, 14-612, and 14-614 may be a field-effect transistor.

The photodiode 14-602 may be operable to measure or detect incident light 14-601 of a photographic scene. In one embodiment, the incident light 14-601 may include ambient light of the photographic scene. In another embodiment, the incident light 14-601 may include light from a strobe unit utilized to illuminate the photographic scene. Of course, the incident light 14-601 may include any light received at and measured by the photodiode 14-602. Further still, and as discussed above, the incident light 14-601 may be concentrated on the photodiode 14-602 by a microlens, and the photodiode 14-602 may be one photodiode of a photodiode array that is configured to include a plurality of photodiodes arranged on a two-dimensional plane.

In one embodiment, the analog sampling circuits 14-603 may be substantially identical. For example, the first analog sampling circuit 14-603(0) and the second analog sampling circuit 14-603(1) may each include corresponding transistors, capacitors, and interconnects configured in a substantially identical manner. Of course, in other embodiments, the first analog sampling circuit 14-603(0) and the second analog sampling circuit 14-603(1) may include circuitry, transistors, capacitors, interconnects and/or any other components or component parameters (e.g. capacitance value of each capacitor 14-604) which may be specific to just one of the analog sampling circuits 14-603.

In one embodiment, each capacitor 14-604 may include one node of a capacitor comprising gate capacitance for a transistor 14-610 and diffusion capacitance for transistors 14-606 and 14-614. The capacitor 14-604 may also be coupled to additional circuit elements (not shown) such as, without limitation, a distinct capacitive structure, such as a metal-oxide stack, a poly capacitor, a trench capacitor, or any other technically feasible capacitor structures.

The cell 14-600 is further shown to include an interconnect 14-644 between the analog sampling circuit 14-603(0) and the analog sampling circuit 14-603(1). The interconnect 14-644 includes a transistor 14-641, which comprises a gate 14-640 and a source 14-642. A drain of the transistor 14-641 is coupled to each of the analog sampling circuit 14-603(0) and the analog sampling circuit 14-603(1). When the gate 14-640 is turned off, the cell 14-600 may operate in isolation. When operating in isolation, the cell 14-600 may operate in a manner whereby the photodiode 14-602 is sampled by one or both of the analog sampling circuits 14-603 of the cell 14-600. For example, the photodiode 14-602 may be sampled by the analog sampling circuit 14-603(0) and the analog sampling circuit 14-603(1) in a concurrent manner, or the photodiode 14-602 may be sampled by the analog sampling circuit 14-603(0) and the analog sampling circuit 14-603(1) in a sequential manner. In alternative embodiments, the drain terminal of transistor 14-641 is coupled to interconnect 14-644 and the source terminal of transistor 14-641 is coupled to the sampling circuits 14-603 and the photodiode 14-602.

With respect to analog sampling circuit 14-603(0), when reset 14-616(0) is active (low), transistor 14-614(0) provides a path from voltage source V2 to capacitor 14-604(0), causing capacitor 14-604(0) to charge to the potential of V2. When sample signal 14-618(0) is active, transistor 14-606 (0) provides a path for capacitor 14-604(0) to discharge in proportion to a photodiode current (I_PD) generated by the photodiode 14-602 in response to the incident light 14-601. In this way, photodiode current I_PD is integrated for a first exposure time when the sample signal 14-618(0) is active, resulting in a corresponding first voltage on the capacitor 14-604(0). This first voltage on the capacitor 14-604(0) may also be referred to as a first sample. When row select 14-634(0) is active, transistor 14-612(0) provides a path for a first output current from V1 to output 14-608(0). The first output current is generated by transistor 14-610(0) in response to the first voltage on the capacitor 14-604(0). When the row select 14-634(0) is active, the output current at the output 14-608(0) may therefore be proportional to the integrated intensity of the incident light 14-601 during the first exposure time.

With respect to analog sampling circuit 14-603(1), when reset 14-616(1) is active (low), transistor 14-614(1) provides a path from voltage source V2 to capacitor 14-604(1), causing capacitor 14-604(1) to charge to the potential of V2. When sample signal 14-618(1) is active, transistor 14-606 (1) provides a path for capacitor 14-604(1) to discharge in proportion to a photodiode current (I_PD) generated by the photodiode 14-602 in response to the incident light 14-601. In this way, photodiode current I_PD is integrated for a second exposure time when the sample signal 14-618(1) is active, resulting in a corresponding second voltage on the capacitor 14-604(1). This second voltage on the capacitor 14-604(1) may also be referred to as a second sample. When row select 14-634(1) is active, transistor 14-612(1) provides a path for a second output current from V1 to output 14-608(1). The second output current is generated by transistor 14-610(1) in response to the second voltage on the capacitor 14-604(1). When the row select 14-634(1) is active, the output current at the output 14-608(1) may therefore be proportional to the integrated intensity of the incident light 14-601 during the second exposure time.

As noted above, when the cell 14-600 is operating in an isolation mode, the photodiode current I_PD of the photodiode 14-602 may be sampled by one of the analog sampling circuits 14-603 of the cell 14-600; or may be sampled by both of the analog sampling circuits 14-603 of the cell 14-600, either concurrently or sequentially. When both the sample signal 14-618(0) and the sample signal 14-618(1) are activated simultaneously, the photodiode current I_PD of the photodiode 14-602 may be sampled by both analog sampling circuits 14-603 concurrently, such that the first exposure time and the second exposure time are, at least partially, overlapping.

When the sample signal 14-618(0) and the sample signal 14-618(1) are activated sequentially, the photodiode current I_PD of the photodiode 14-602 may be sampled by the analog sampling circuits 14-603 sequentially, such that the first exposure time and the second exposure time do not overlap.

In various embodiments, when the gate 14-640 is turned on, the cell 14-600 may be thereby communicatively coupled to one or more other instances of cell 14-600 of other pixels via the interconnect 14-644. In one embodiment, when two or more cells 14-600 are coupled together, the two or more corresponding instances of photodiode 14-602 may collectively provide a shared photodiode current on the interconnect 14-644. In such an embodiment, one or more analog sampling circuits 14-603 of the two instances of cell 14-600 may sample the shared photodiode current. For example, in one embodiment, a single sample signal 14-618(0) may be activated such that a single analog sampling circuit 14-603 samples the shared photodiode current. In another embodiment two instances of a sample signal 14-618(0), each associated with a different cell 14-600, may be activated to sample the shared photodiode current, such that two analog sampling circuits 14-603 of two different cells 14-600 sample the shared photodiode current. In yet another embodiment, both of a sample signal 14-618(0) and 14-618(1) of a single cell 14-600 may be activated to sample the shared photodiode current, such that two analog sampling circuits 14-603(0) and 14-603(1) of one of the cells 14-600 sample the shared photodiode current, and neither of the analog sampling circuits 14-603 of the other cell 14-600 sample the shared photodiode current.

In a specific example, two instances of cell 14-600 may be coupled via the interconnect 14-644. Each instance of the cell 14-600 may include a photodiode 14-602 and two analog sampling circuits 14-603. In such an example, the two photodiodes 14-602 may be configured to provide a shared photodiode current to one, two, three, or all four of the analog sampling circuits 14-603 via the interconnect 14-644. If the two photodiodes 14-602 detect substantially identical quantities of light, then the shared photodiode current may be twice the magnitude that any single photodiode current would be from a single one of the photodiodes 14-602. Thus, this shared photodiode current may otherwise be referred to as a 2× photodiode current. If only one analog sampling circuit 14-603 is activated to sample the 2× photodiode current, the analog sampling circuit 14-603 may effectively sample the 2× photodiode current twice as fast for a given exposure level as the analog sampling circuit 14-603 would sample a photodiode current received from a single photodiode 14-602. Further, if only one analog sampling circuit 14-603 is activated to sample the 2× photodiode current, the analog sampling circuit 14-603 may be able to obtain a sample twice as bright as the analog sampling circuit 14-603 would obtain by sampling a photodiode current received from a single photodiode 14-602 for a same exposure time. However, in such an embodiment, because only a single analog sampling circuit 14-603 of the two cells 14-600 actively samples the 2× photodiode current, one of the cells 14-600 does not store any analog value representative of the 2× photodiode current. Accordingly, when a 2× photodiode current is sampled by only a subset of corresponding analog sampling circuits 14-603, image resolution may be reduced in order to increase a sampling speed or sampling sensitivity.

In one embodiment, communicatively coupled cells 14-600 may be located in a same row of pixels of an image sensor. In such an embodiment, sampling with only a subset of communicatively coupled analog sampling circuits 14-603 may reduce an effective horizontal resolution of the image sensor by ½. In another embodiment, communicatively coupled cells 14-600 may be located in a same column of pixels of an image sensor. In such an embodiment, sampling with only a subset of communicatively coupled analog sampling circuits 14-603 may reduce an effective vertical resolution of the image sensor by ½.

In another embodiment, an analog sampling circuit 14-603 of each of the two cells 14-600 may be simultaneously activated to concurrently sample the 2× photodiode current. In such an embodiment, because the 2× photodiode current is shared by two analog sampling circuits 14-603, sampling speed and sampling sensitivity may not be improved in comparison to a single analog sampling circuit 14-603 sampling a photodiode current of a single photodiode 14-602. However, by sharing the 2× photodiode current over the interconnect 14-644 between the two cells 14-600, and then sampling the 2× photodiode current using an analog sampling circuit 14-603 in each of the cells 14-600, the analog values sampled by each of the analog sampling circuits 14-603 may be effectively averaged, thereby reducing the effects of any noise present in a photodiode current output by either of the coupled photodiodes 14-602.

In yet another example, two instances of cell 14-600 may be coupled via the interconnect 14-644. Each instance of the cell 14-600 may include a photodiode 14-602 and two analog sampling circuits 14-603. In such an example, the two photodiodes 14-602 may be configured to provide a shared photodiode current to one, two, three, or all four of the analog sampling circuits 14-603 via the interconnect 14-644. If the two photodiodes 14-602 detect substantially identical quantities of light, then the shared photodiode current may be twice the magnitude that any single photodiode current would be from a single one of the photodiodes 14-602. Thus, this shared photodiode current may otherwise be referred to as a 2× photodiode current. Two analog sampling circuits 14-603 of one of the cells 14-600 may be simultaneously activated to concurrently sample the 2× photodiode current in a manner similar to that described hereinabove with respect to the analog sampling circuits 14-603(0) and 14-603(1) sampling the photodiode current I_PD of the photodiode 14-602 in isolation. In such an embodiment, two analog storage planes may be populated with analog values at a rate that is 2× faster than if the analog sampling circuits 14-603(0) and 14-603(1) received a photodiode current from a single photodiode 14-602.

In another embodiment including two instances of cell 14-600 coupled via interconnect 14-644 for sharing a 2× photodiode current, such that four analog sampling circuits 14-603 may be simultaneously activated for a single exposure. In such an embodiment, the four analog sampling circuits 14-603 may concurrently sample the 2× photodiode current in a manner similar to that described hereinabove with respect to the analog sampling circuits 14-603(0) and 14-603(1) sampling the photodiode current I_PD of the photodiode 14-602 in isolation. In such an embodiment, the four analog sampling circuits 14-603 may be disabled sequentially, such that each of the four analog sampling circuits 14-603 stores a unique analog value representative of the 2× photodiode current. Thereafter, each analog value may be output in a different analog signal, and each analog signal may be amplified and converted to a digital signal comprising a digital image.

Thus, in addition to the 2× photodiode current serving to reduce noise in any final digital image, four different digital images may be generated for the single exposure, each with a different effective exposure and light sensitivity. These four digital images may comprise, and be processed as, an image stack. In other embodiments, the four analog sampling circuits 14-603 may be activated and deactivated together for sampling the 2× photodiode current, such that each of the analog sampling circuits 14-603 store a substantially identical analog value. In yet other embodiments, the four analog sampling circuits 14-603 may be activated and deactivated in a sequence for sampling the 2× photodiode current, such that no two analog sampling circuits 14-603 are actively sampling at any given moment.

Of course, while the above examples and embodiments have been described for simplicity in the context of two instances of a cell 14-600 being communicatively coupled via interconnect 14-644, more than two instances of a cell 14-600 may be communicatively coupled via the interconnect 14-644. For example, four instances of a cell 14-600 may be communicatively coupled via an interconnect 14-644. In such an example, eight different analog sampling circuits 14-603 may be addressable, in any sequence or combination, for sampling a 4× photodiode current shared between the four instances of cell 14-600. Thus, as an option, a single analog sampling circuit 14-603 may be able to sample the 4× photodiode current at a rate 4× faster than the analog sampling circuit 14-603 would be able to sample a photodiode current received from a single photodiode 14-602.

For example, an analog value stored by sampling a 4× photodiode current at a 1/120 second exposure time may be substantially identical to an analog value stored by sampling a 1× photodiode current at a 1/30 second exposure time. By reducing an exposure time required to sample a given analog value under a given illumination, blur may be reduced within a final digital image. Thus, sampling a shared photodiode current may effectively increase the ISO, or light sensitivity, at which a given photographic scene is sampled without increasing the noise associated with applying a greater gain.

As another option, the single analog sampling circuit 14-603 may be able to obtain, for a given exposure time, a sample 4× brighter than a sample obtained by sampling a photodiode current received from a single photodiode. Sampling a 4× photodiode current may allow for much more rapid sampling of a photographic scene, which may serve to reduce any blur present in a final digital image, to more quickly capture a photographic scene (e.g., 1/4 exposure time), to increase the brightness or exposure of a final digital image, or any combination of the foregoing. Of course, sampling a 4× photodiode current with a single analog sampling circuit 14-603 may result in an analog storage plane having 1/4 the resolution of an analog storage plane in which each cell 14-600 generates a sample. In another embodiment, where four instances of a cell 14-600 may be communicatively coupled via an interconnect 14-644, up to eight separate exposures may be captured by sequentially sampling the 4× photodiode current with each of the eight analog sampling circuits 14-603. In one embodiment, each cell includes one or more analog sampling circuits 14-603.

FIG. 14-3B illustrates a circuit diagram for a photosensitive cell 14-660, in accordance with one possible embodiment. As an option, the cell 14-660 may be implemented in the context of any of the Figures disclosed herein. Of course, however, the cell 14-660 may be implemented in any desired environment. Further, the aforementioned definitions may equally apply to the description below.

As shown, the photosensitive cell 14-660 comprises a photodiode 14-602 that is substantially identical to the photodiode 14-602 of cell 14-600, a first analog sampling circuit 14-603(0) that is substantially identical to the first analog sampling circuit 14-603(0) of cell 14-600, a second analog sampling circuit 14-603(1) that is substantially identical to the second analog sampling circuit 14-603(1) of cell 14-600, and an interconnect 14-654. The interconnect 14-654 is shown to comprise three transistors 14-651-653, and a source 14-650. Each of the transistors 14-651, 14-652, and 14-653, include a gate 14-656, 14-657, and 14-658, respectively. The cell 14-660 may operate in substantially the same manner as the cell 14-600 of FIG. 14-3A, however the cell 14-660 includes only two pass gates from photodiodes 14-602 of other cells 14-660 coupled via the interconnect 14-654, whereas the cell 14-600 includes three pass gates from the photodiodes 14-602 of other cells 14-600 coupled via the interconnect 14-644.

FIG. 14-3C illustrates a circuit diagram for a system 14-690 including plurality of communicatively coupled photosensitive cells 14-694, in accordance with one possible embodiment. As an option, the system 14-690 may be implemented in the context of any of the Figures disclosed herein. Of course, however, the system 14-690 may be implemented in any desired environment. Further, the aforementioned definitions may equally apply to the description below.

As illustrated in FIG. 14-3C, the system 14-690 is shown to include four pixels 14-692, where each of the pixels 14-692 includes a respective cell 14-694, and a set of related cells 14-694 are communicatively coupled via interconnect 14-698. Each of the pixels 14-692 may be implemented as a pixel 14-240 of FIG. 14-2, each of the cells 14-694 may be implemented as a cell 14-242 of FIG. 14-2, and the interconnect 14-698 may be implemented as the interconnect 14-250 of FIG. 14-2. Further, the interconnect 14-698 is shown to include multiple instances of a source 14-696, and multiple instances of a gate 14-691. Also, each cell 14-694 may include an analog sampling circuit 14-603 coupled to a photodiode 14-602 for measuring or detecting incident light 14-601. The analog sampling circuit 14-603 may be substantially identical to either of the analog sampling circuits 14-603(0) and 14-603(1) disclosed in the context of FIG. 14-3A.

When all instances of the gate 14-691 are turned on, each of the cells 14-694 may be thereby communicatively coupled to each of the other cells 14-694 of the other pixels 14-692 via the interconnect 14-698. As a result, a shared photodiode current may be generated. As shown in FIG. 14-3C, each of the cells 14-694(1), 14-694(2), and 14-694(3) output a substantially similar photodiode current I_PD on the interconnect 14-698. The photodiode current I_PD generated by each of the cells 14-694(1), 14-694(2), and 14-694(3) may be generated by the respective photodiodes 14-602(1), 14-602(2), and 14-602(3). The photodiode current from the cells 14-694(1), 14-694(2), and 14-694(3) may combine on the interconnect 14-698 to form a combined photodiode current of 3*I_PD, or a 3× photodiode current.

When sample signal 14-618 of analog sampling circuit 14-603 is asserted, the 3× photodiode combines with the photodiode current I_PD of photodiode 14-602(0), and a 4× photodiode current may be sampled by the analog sampling circuit 14-603. Thus, a sample may be stored to capacitor 14-604 of analog sampling circuit 14-603 of cell 14-694(0) at a rate 4× faster than if the single photodiode 14-602(0) generated the photodiode current I_PD sampled by the analog sampling circuit 14-603. As an option, the 4× photodiode current may be sampled for a same given exposure time that a 1× photodiode current would be sampled for, which may significantly increase or decrease a value of the analog value stored in the analog sampling circuit 14-603. For example, an analog value stored from sampling the 4× photodiode current for the given exposure time may be associated with a final digital pixel value that is effectively 4× brighter than an analog value stored from sampling a 1× photodiode current for the given exposure time.

When all instances of the gate 14-691 are turned off, each of the cells 14-694 may be uncoupled from the other cells 14-694 of the other pixels 14-692. When the cells 14-694 are uncoupled, each of the cells 14-694 may operate in isolation as discussed previously, for example with respect to FIG. 14-3A. For example, when operating in isolation, analog sampling circuit 14-603 may only sample, under the control of sample signal 14-618, a photodiode current I_PD from a respective photodiode 14-602(0).

In one embodiment, pixels 14-692 within an image sensor each include a cell 14-694 configured to be sensitive to red light (a "red cell"), a cell 14-694 configured to be sensitive to green light (a "green cell"), and a cell 14-694 configured to be sensitive to blue light (a "blue cell"). Furthermore, sets of two or more pixels 14-692 may be configured as described above in FIGS. 14-6A-6C to switch into a photodiode current sharing mode, whereby red cells within each set of pixels share photodiode current, green cells within each set of pixels share photodiode current, and blue cells within each set of pixels share photodiode current. In certain embodiments, the pixels 14-692 also each include a cell 14-694 configured to be sensitive to white light (a "white cell"), whereby each white cell may operate independently with respect to photodiode current while the red cells, green cells, and blue cells operate in a shared photodiode current mode. All other manufacturing parameters being equal, each white cell may be more sensitive (e.g., three times more sensitive) to incident light than any of the red cells, green cells, or blue cells, and, consequently, a white cell may require less exposure time or gain to generate a comparable intensity signal level. In such an embodiment, the resolution of color information (from the red cells, green cells, and blue cells) may be reduced to gain greater sensitivity and better noise performance, while the resolution of pure intensity information (from the white cells) may be kept at full sensor resolution without significantly sacrificing sensitivity or noise performance with respect to intensity information. For example, a 4K pixel by 4K pixel image sensor may be configured to operate as a 2K pixel by 2K pixel image sensor with respect to color, thereby improving color sensitivity by a factor of 4×, while, at the same time, being able to simultaneously capture a 4K pixel by 4K pixel intensity plane from the white cells. In such a configuration, the quarter resolution color information provided by the red cells, green cells, and blue cells may be fused with full resolution intensity information provided by the white cells. To this end, a full 4K by 4K resolution color image may be generated by the image sensor, with better overall sensitivity and noise performance than a comparable conventional image sensor.

FIG. 14-4 illustrates implementations of different analog storage planes, in accordance with another embodiment. As an option, the analog storage planes of FIG. 14-4 may be implemented in the context of the details of any of the Figures disclosed herein. Of course, however, the analog storage planes of FIG. 14-4 may be implemented in any desired environment. Further, the aforementioned definitions may equally apply to the description below.

FIG. 14-4 is illustrated to include a first analog storage plane 14-802 and a second analog storage plane 14-842. A plurality of analog values are each depicted as a "V" within the analog storage planes 14-802 and 14-842. In the context of certain embodiments, each analog storage plane may comprise any collection of one or more analog values. In some embodiments, an analog storage plane may be capable of storing at least one analog pixel value for each pixel of a row or line of a pixel array. In one embodiment, an analog storage plane may cable of storing an analog value for each cell of each pixel of a plurality of pixels of a pixel array. Still yet, in another embodiment, an analog storage plane may be capable of storing at least one analog pixel value for each pixel of an entirety of a pixel array, which may be referred to as a frame. For example, an analog storage plane may be capable of storing an analog value for each cell of each pixel of every line or row of a pixel array.

In one embodiment, the analog storage plane 14-842 may be representative of a portion of an image sensor in which an analog sampling circuit of each cell has been activated to sample a corresponding photodiode current. In other words, for a given region of an image sensor, all cells include an analog sampling circuit that samples a corresponding photodiode current, and stores an analog value as a result of the sampling operation. As a result, the analog storage plane 14-842 includes a greater analog value density 14-846 than an analog value density 14-806 of the analog storage plane 14-802.

In one embodiment, the analog storage plane 14-802 may be representative of a portion of an image sensor in which only one-quarter of the cells include analog sampling circuits activated to sample a corresponding photodiode current. In other words, for a given region of an image sensor, only one-quarter of the cells include an analog sampling circuit that samples a corresponding photodiode current, and stores an analog value as a result of the sampling operation. The analog value density 14-806 of the analog storage plane 14-802 may result from a configuration, as discussed above, wherein four neighboring cells are communicatively coupled via an interconnect such that a 4× photodiode current is sampled by a single analog sampling circuit of one of the four cells, and the remaining analog sampling circuits of the other three cells are not activated to sample.

FIG. 14-5 illustrates a system 14-900 for converting analog pixel data of an analog signal to digital pixel data, in accordance with another embodiment. As an option, the system 14-900 may be implemented in the context of the details of any of the Figures disclosed herein. Of course, however, the system 14-900 may be implemented in any desired environment. Further, the aforementioned definitions may equally apply to the description below.

The system 14-900 is shown in FIG. 14-5 to include a first analog storage plane 14-802, an analog-to-digital unit 14-922, a first digital image 14-912, a second analog storage plane 14-842, and a second digital image 14-952. As illustrated in FIG. 14-5, a plurality of analog values are each depicted as a "V" within each of the analog storage planes 14-802 and 14-842, and corresponding digital values are each depicted as a "D" within digital images 14-912 and 14-952, respectively.

As noted above, each analog storage plane 14-802 and 14-842 may comprise any collection of one or more analog values. In one embodiment, a given analog storage plane may comprise an analog value for each analog storage circuit 14-603 that receives an active sample signal 14-618, and thereby samples a photodiode current, during an associated exposure time.

In some embodiments, an analog storage plane may include analog values for only a subset of all the analog storage circuits 14-603 of an image sensor. This may occur, for example, when analog storage circuits 14-603 of only odd or even rows of pixels are activated to sample during a given exposure time. Similarly, this may occur when analog storage circuits 14-603 of only odd or even columns of pixels are activated to sample during a given exposure. As another example, this may occur when two or more photosensitive cells are communicatively coupled, such as by an interconnect 14-644, in a manner that distributes a shared photodiode current, such as a 2× or 4× photodiode current, between the communicatively coupled cells. In such an embodiment, only a subset of analog sampling circuits 14-603 of the communicatively coupled cells may be activated by a sample signal 14-618 to sample the shared photodiode current during a given exposure time. Any analog sampling circuits 14-603 activated by a sample signal 14-618 during the given exposure time may sample the shared photodiode current, and store an analog value to the analog storage plane associated with the exposure time. However, the analog storage plane associated with the exposure time would not include any analog values associated with the analog sampling circuits 14-603 that are not activated by a sample signal 14-618 during the exposure time.

Thus, an analog value density of a given analog storage plane may depend on a subset of analog sampling circuits 14-603 activated to sample photodiode current during a given exposure associated with the analog storage plane. Specifically, a greater analog value density may be obtained, such as for the more dense analog storage plane 14-842, when a sample signal 14-618 is activated for an analog sampling circuit 14-603 in each of a plurality of neighboring cells of an image sensor during a given exposure time. Conversely, a decreased analog value density may be obtained, such as for the less dense analog storage plane 14-802, when a sample signal 14-618 is activated for only a subset of neighboring cells of an image sensor during a given exposure time.

Returning now to FIG. 14-5, the analog values of the less dense analog storage plane 14-802 are output as analog pixel data 14-904 to the analog-to-digital unit 14-922. Further, the analog values of the more dense analog storage plane 14-842 are separately output as analog pixel data 14-944 to the analog-to-digital unit 14-922. In one embodiment, the analog-to-digital unit 14-922 may be substantially identical to the analog-to-digital unit 11-622 described within the context of FIG. 11-4. For example, the analog-to-digital unit 14-922 may comprise at least one amplifier and at least one analog-to-digital converter, where the amplifier is operative to receive a gain value and utilize the gain value to gain-adjust analog pixel data received at the analog-to-digital unit 14-922. Further, in such an embodiment, the amplifier may transmit gain-adjusted analog pixel data to an analog-to-digital converter, which then generates digital pixel data from the gain-adjusted analog pixel data. To this end, an analog-to-digital conversion may be performed on the contents of each of two or more different analog storage planes 14-802 and 14-842.

In one embodiment, the analog-to-digital unit 14-922 applies at least two different gains to each instance of received analog pixel data. For example, the analog-to-digital unit 14-922 may receive analog pixel data 14-904, and apply at least two different gains to the analog pixel data 14-904 to generate at least a first gain-adjusted analog pixel data and a second gain-adjusted analog pixel data based on the analog pixel data 14-904; and the analog-to-digital unit 14-922 may receive analog pixel data 14-944, and then apply at least two different gains to the analog pixel data 14-944 to generate at least a first gain-adjusted analog pixel data and a second gain-adjusted analog pixel data based on the analog pixel data 14-944.

Further, the analog-to-digital unit 14-922 may convert each instance of gain-adjusted analog pixel data to digital pixel data, and then output a corresponding digital signal. With respect to FIG. 14-5 specifically, the analog-to-digital unit 14-922 is shown to generate a first digital signal comprising first digital pixel data 14-906 corresponding to application of Gain1 to analog pixel data 14-904; and a second digital signal comprising second digital pixel data 14-946 corresponding to application of Gain1 to analog pixel data 14-944. Each instance of digital pixel data may comprise a digital image, such that the first digital pixel data 14-906 comprises a digital image 14-912, and the second digital pixel data 14-946 comprises a digital image 14-952. In other words, a first digital image 14-912 may be generated based on the analog values of the less dense analog storage plane 14-802, and a second digital image 14-952 may be generated based on the analog values of the more dense analog storage plane 14-842.

Of course, in other embodiments, the analog-to-digital unit 14-922 may apply a plurality of gains to each instance of analog pixel data, to thereby generate an image stack based on each analog storage plane 14-802 and 14-842. Each image stack may be manipulated as set forth in those applications, or as set forth below.

In some embodiments, the digital image 14-952 may have a greater resolution than the digital image 14-912. In other words, a greater number of pixels may comprise digital image 14-952 than a number of pixels that comprise digital image 14-912. This may be because the digital image 14-912 was generated from the less dense analog storage plane 14-802 that included, in one example, only one-quarter the number of sampled analog values of more dense analog storage plane 14-842. In other embodiments, the digital image 14-952 may have the same resolution as the digital image 14-912. In such an embodiment, a plurality of digital pixel data values may be generated to make up for the reduced number of sampled analog values in the less dense analog storage plane 14-802. For example, the plurality of digital pixel data values may be generated by interpolation to increase the resolution of the digital image 14-912.

In one embodiment, the digital image 14-912 generated from the less dense analog storage plane 14-802 may be used to improve the digital image 14-952 generated from the more dense analog storage plane 14-842. As a specific non-limiting example, each of the less dense analog storage plane 14-802 and the more dense analog storage plane 14-842 may storage analog values for a single exposure of a photographic scene. In the context of the present description, a "single exposure" of a photographic scene may include simultaneously, at least in part, capturing the photographic scene using two or more sets of analog sampling circuits, where each set of analog sampling circuits may be configured to operate at different exposure times. Further, the single exposure may be further broken up into multiple discrete exposure times or samples times, where the exposure times or samples times may occur sequentially, partially simultaneously, or in some combination of sequentially and partially simultaneously.

During capture of the single exposure of the photographic scene using the two or more sets of analog sampling circuits, some cells of the capturing image sensor may be communicatively coupled to one or more other cells. For example, cells of an image sensor may be communicatively coupled as shown in FIG. 14-2, such that each cell is coupled to three other cells associated with a same peak wavelength of light. Therefore, during the single exposure, each of the communicatively coupled cells may receive a 4× photodiode current.

During a first sample time of the single exposure, a first analog sampling circuit in each of the four cells may receive an active sample signal, which causes the first analog sampling circuit in each of the four cells to sample the 4× photodiode current for the first sample time. The more dense analog storage plane 14-842 may be representative of the analog values stored during such a sample operation. Further, a second analog sampling circuit in each of the four cells may be controlled to separately sample the 4× photodiode current. As one option, during a second sample time after the first sample time, only a single second analog sampling circuit of the four coupled cells may receive an active sample signal, which causes the single analog sampling circuit to sample the 4× photodiode current for the second sample time. The less dense analog storage plane 14-802 may be representative of the analog values stored during such a sample operation.

As a result, analog values stored during the second sample time of the single exposure are sampled with an increased sensitivity, but a decreased resolution, in comparison to the analog values stored during the first sample time. In situations involving a low-light photographic scene, the increased light sensitivity associated with the second sample time may generate a better exposed and/or less noisy digital image, such as the digital image 14-912. However, the digital image 14-952 may have a desired final image resolution or image size. Thus, in some embodiments, the digital image 14-912 may be blended or mixed or combined with digital image 14-952 to reduce the noise and improve the exposure of the digital image 14-952. For example, a digital image with one-half vertical or one-half horizontal resolution may be blended with a digital image at full resolution. In another embodiment any combination of digital images at one-half vertical resolution, one-half horizontal resolution, and full resolution may be blended.

In some embodiments, a first exposure time (or first sample time) and a second exposure time (or second sample time) are each captured using an ambient illumination of the photographic scene. In other embodiments, the first exposure time (or first sample time) and the second exposure time (or second sample time) are each captured using a flash or strobe illumination of the photographic scene. In yet other embodiments, the first exposure time (or first sample time) may be captured using an ambient illumination of the photographic scene, and the second exposure time (or second sample time) may be captured using a flash or strobe illumination of the photographic scene.

In embodiments in which the first exposure time is captured using an ambient illumination, and the second exposure time is captured using flash or strobe illumination, analog values stored during the first exposure time may be stored to an analog storage plane at a higher density than the analog values stored during the second exposure time. This may effectively increase the ISO or sensitivity of the capture of the photographic scene at ambient illumination. Subsequently, the photographic scene may then be captured at full resolution using the strobe or flash illumination. The lower resolution ambient capture and the full resolution strobe or flash capture may then be merged to create a combined image that includes detail not found in either of the individual captures.

One advantage of the present invention is that a digital photograph may be selectively generated based on user input using two or more different images generated from a single exposure of a photographic scene. Accordingly, the digital photograph generated based on the user input may have a greater dynamic range than any of the individual images. Further, the generation of an HDR image using two or more different images with zero, or near zero, interframe time allows for the rapid generation of HDR images without motion artifacts.

When there is any motion within a photographic scene, or a capturing device experiences any jitter during capture, any interframe time between exposures may result in a motion blur within a final merged HDR photograph. Such blur can be significantly exaggerated as interframe time increases. This problem renders current HDR photography an ineffective solution for capturing clear images in any circumstance other than a highly static scene. Further, traditional techniques for generating a HDR photograph involve significant computational resources, as well as produce artifacts which reduce the image quality of the resulting image. Accordingly, strictly as an option, one or more of the above issues may or may not be addressed utilizing one or more of the techniques disclosed herein.

Still yet, in various embodiments, one or more of the techniques disclosed herein may be applied to a variety of markets and/or products. For example, although the techniques have been disclosed in reference to a photo capture, they may be applied to televisions, web conferencing (or live streaming capabilities, etc.), security cameras (e.g. increase contrast to determine characteristic, etc.), automobiles (e.g. driver assist systems, in-car infotainment systems, etc.), and/or any other product which includes a camera input.

Figures 1, 15:
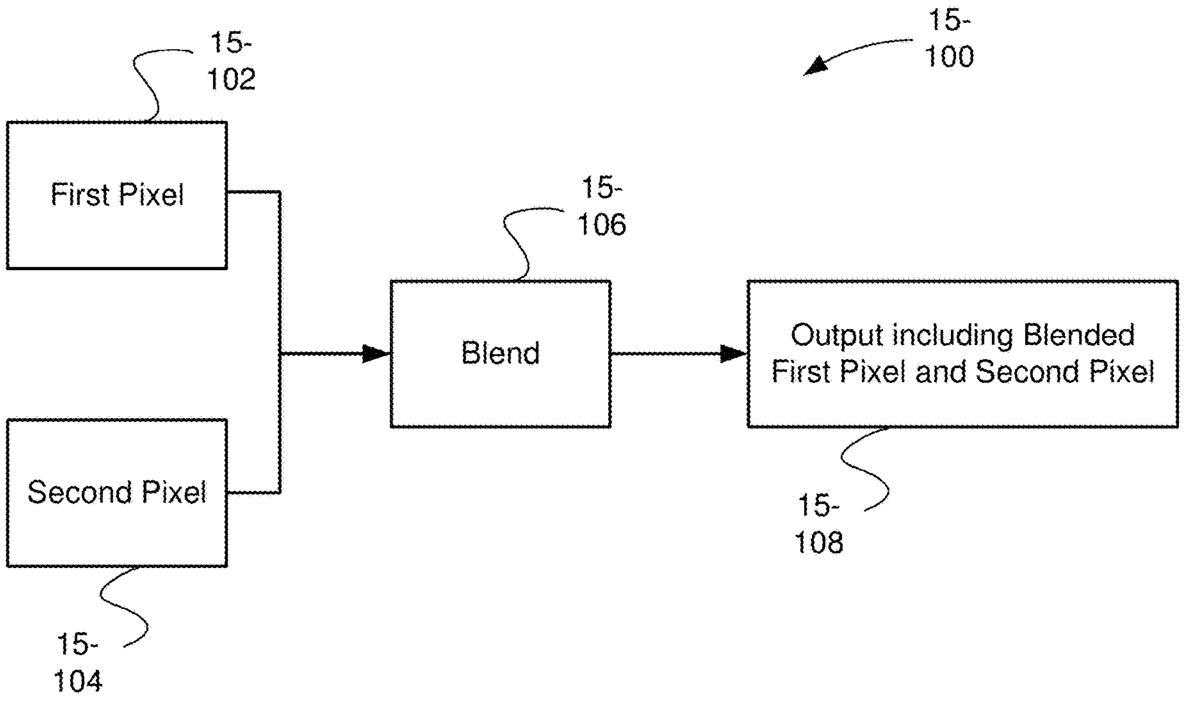
Figures 2, 15:
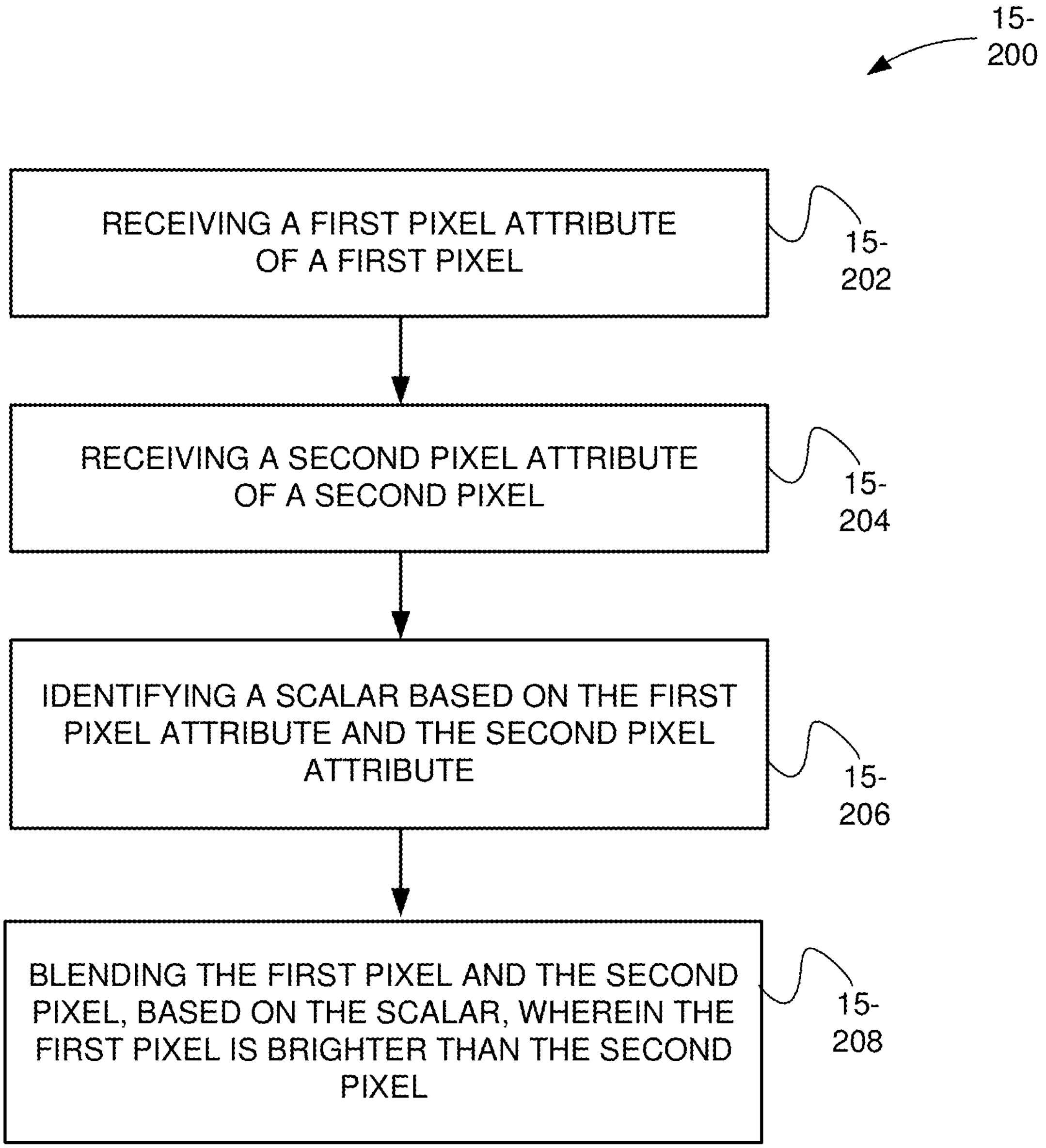
Figures 3, 15:
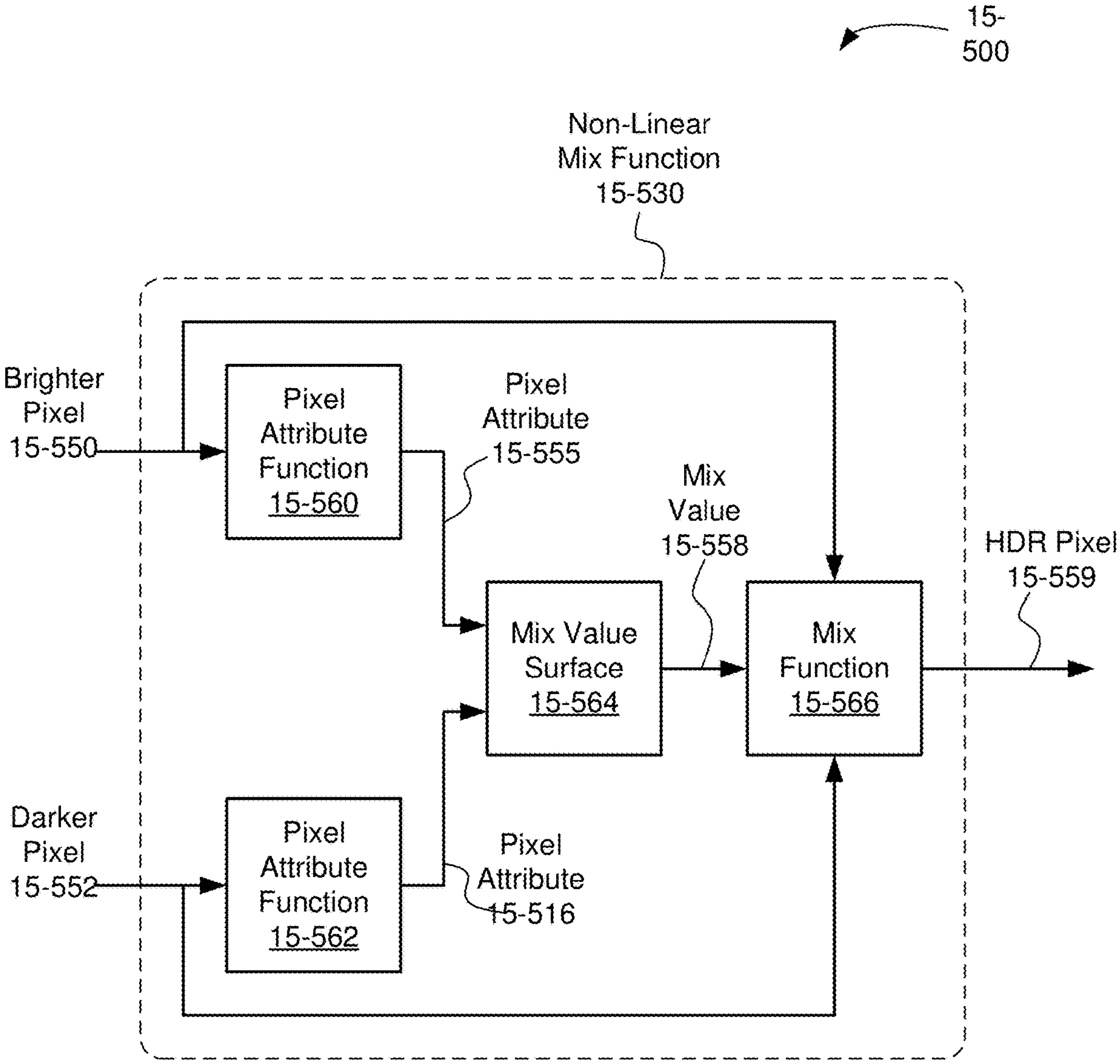
Figures 4, 15:
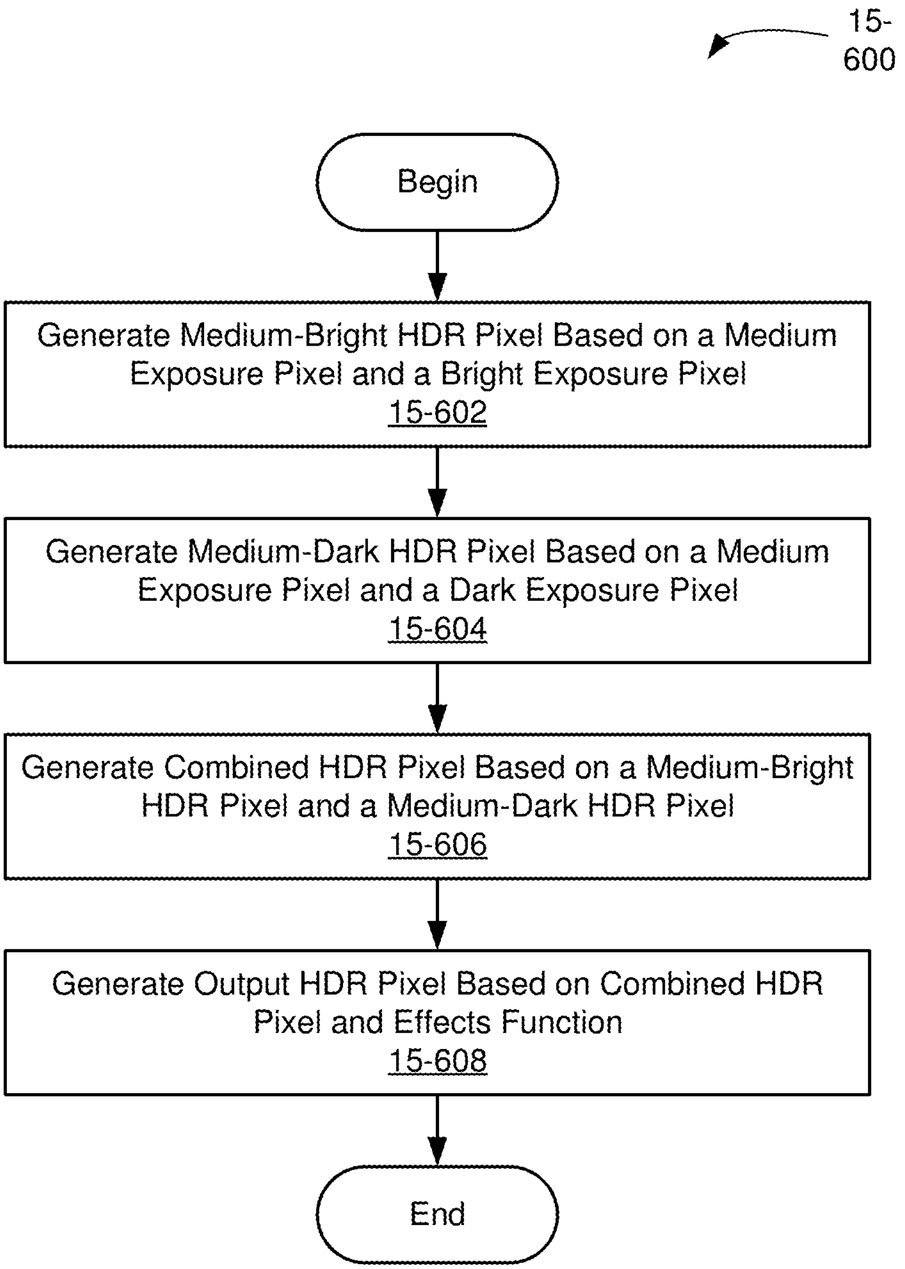
Figures 5, 15:
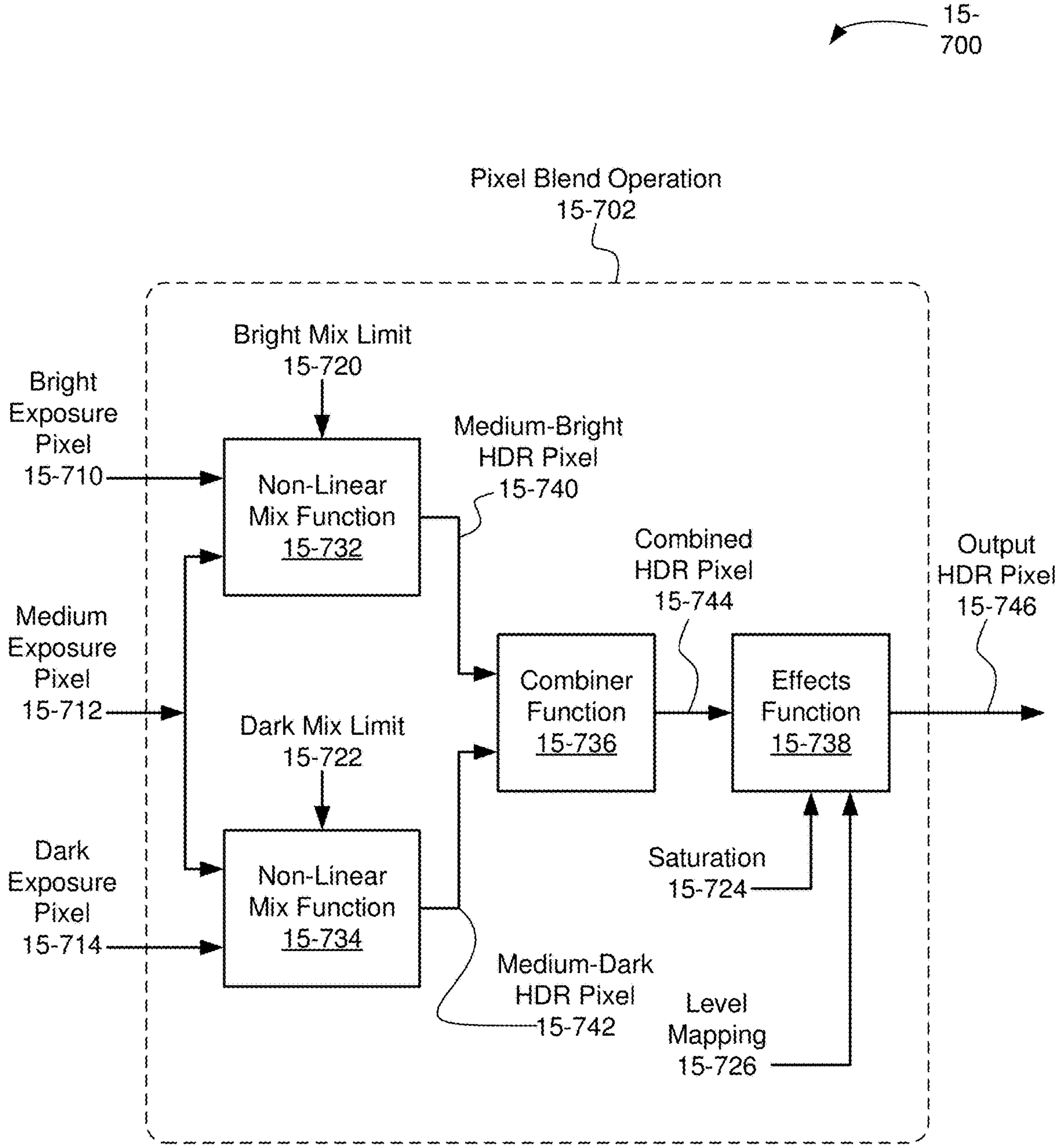
Figures 6, 15:
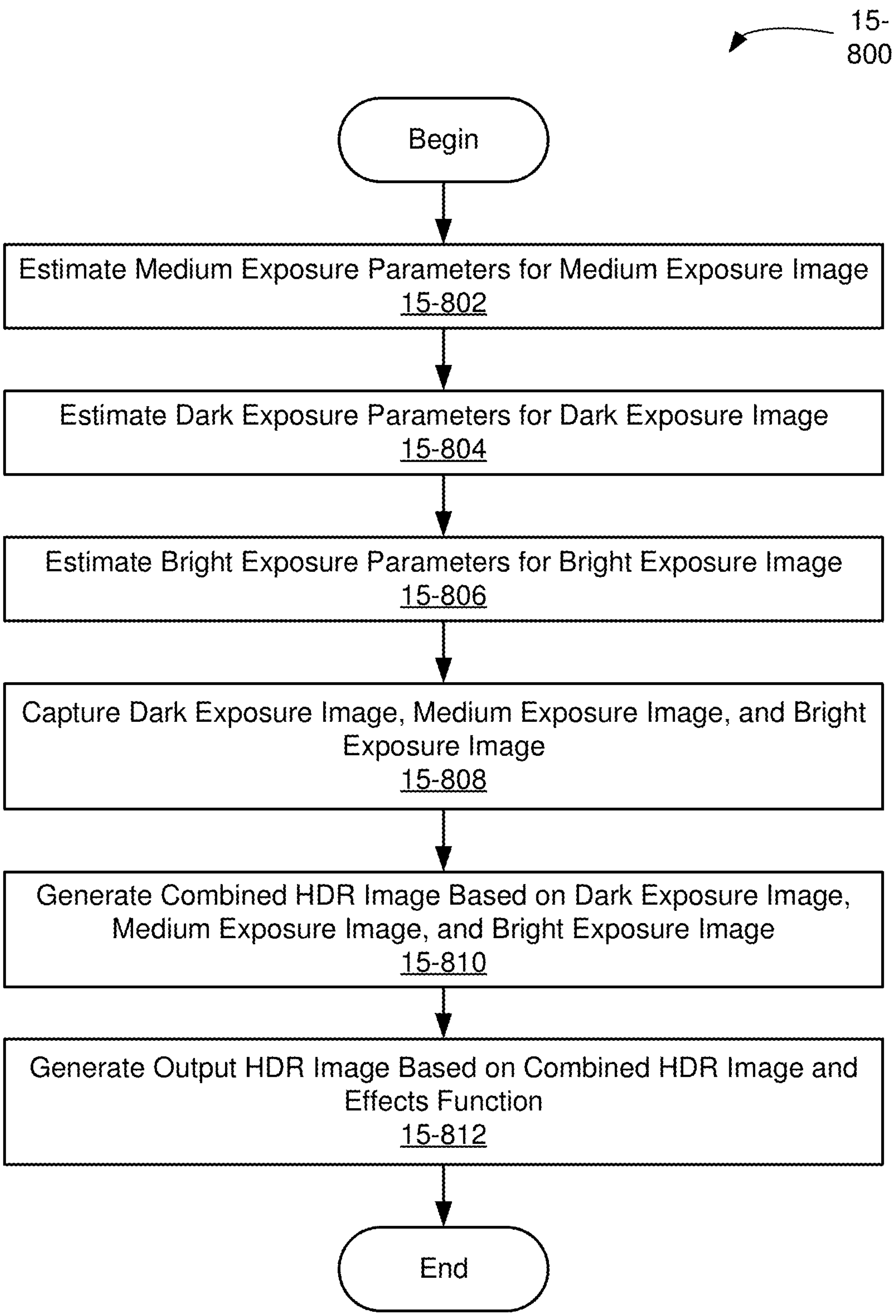
Figures 7, 15:
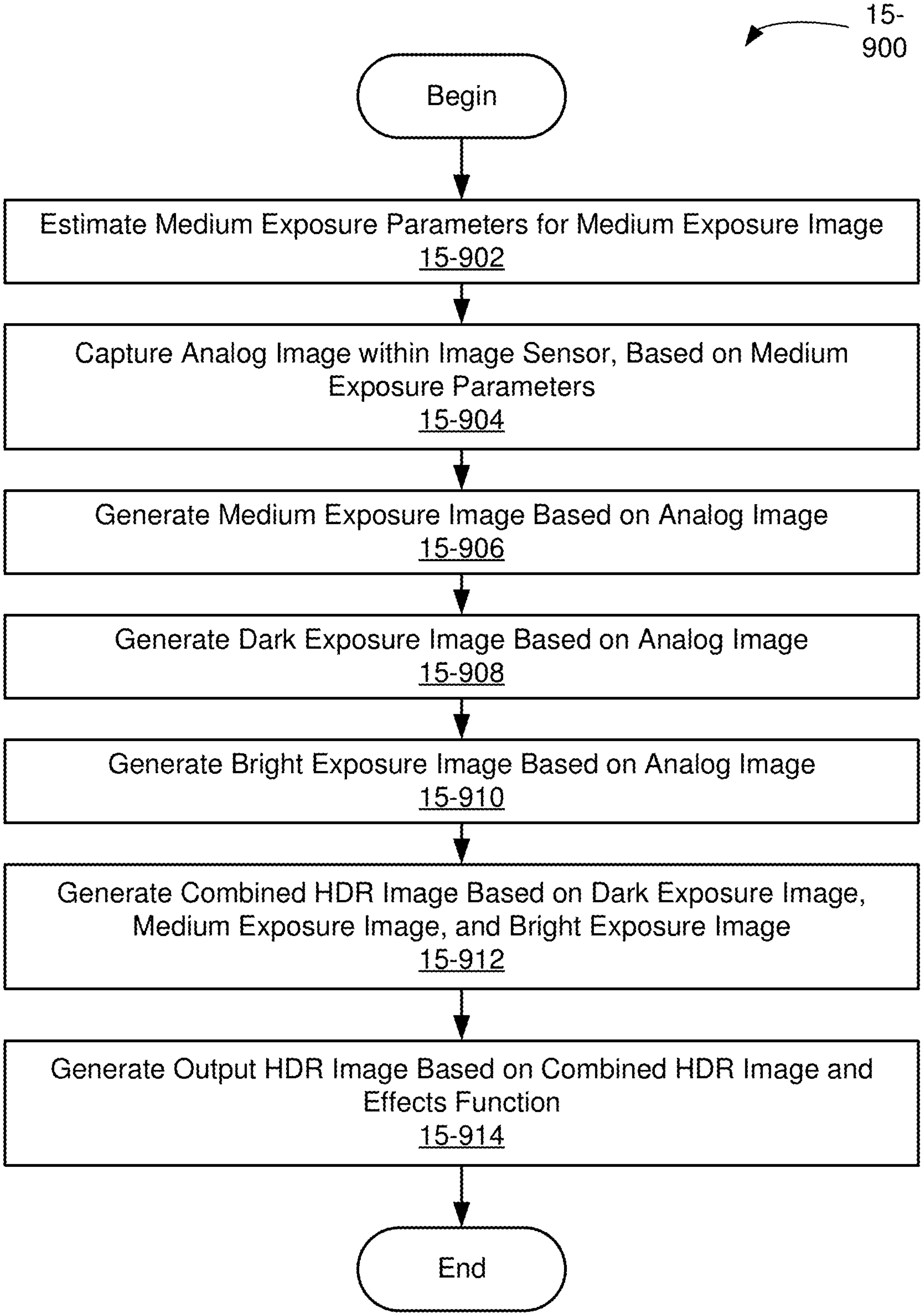

FIG. 15-1 illustrates an exemplary system 15-100 for outputting a blended brighter and a darker pixel, in accordance with one possible embodiment. As an option, the system 15-100 may be implemented in the context of any of the Figures. Of course, however, the system 15-100 may be carried out in any desired environment. Further, the aforementioned definitions may equally apply to the description below.

As shown, the system 15-100 includes a first pixel 15-102 and a second pixel 15-104. In one embodiment, the first pixel may be associated with a brighter pixel, and the second pixel may be associated with a darker pixel. In the context of the present description, a brighter pixel includes any pixel that is brighter than a corresponding darker pixel, and a darker pixel includes any pixel that is darker than a corresponding brighter pixel. A brighter pixel may be associated with an image having brighter overall exposure, and a corresponding darker pixel may be associated with an image having a darker overall exposure. In various embodiments, brighter and darker pixels may be computed by combining other corresponding pixels based on intensity, exposure, color attributes, saturation, and/or any other image or pixel parameter.

In one embodiment, a brighter pixel and a darker pixel may be associated with a brighter pixel attribute and a darker pixel attribute, respectively. In various embodiments, a pixel attribute (e.g. for a brighter pixel attribute, for a darker pixel attribute, etc.) may include an intensity, a saturation, a hue, a color space value (e.g. EGB, YCbCr, YUV, etc.), a brightness, an RGB color, a luminance, a chrominance, and/or any other feature which may be associated with a pixel in some manner.

Additionally, the first pixel 15-102 and the second pixel 15-104 are inputs to a blend process 15-106. In one embodiment, the blending may be based on one or more features associated with the pixels. For example, blending may include a spatial positioning feature wherein the pixel of the brighter pixel is aligned with a corresponding pixel of the darker pixel. Of course, any other relevant techniques known in the art may be used to align corresponding pixels on more than one image.

In other embodiments, various techniques to blend may be used, including taking an average of two or more pixel points, summing and normalizing a color attribute associated with each pixel point (e.g. a summation of a red/green/blue component in a RGB color space, etc.), determining a RGB (or any color space) vector length which may then be normalized, using an average pixel point in combination with a brighter pixel or a darker pixel, and/or using any other combination to blend two or more pixel points. In one embodiment, blending may occur independent of any color values or color spaces. In another embodiment, blending may include mixing two or more pixel points. In a specific embodiment, blending may include an OpenGL (or any vector rendering application) Mix operation whereby the operation linearly interpolates between two input values.

In one embodiment, blending may occur automatically or may be based on user input. For example, in some embodiments, the blending may occur automatically based on one or more set targets, including, for example, a set exposure point, a set focus value, a set temperature (e.g. Kelvin scale, etc.), a predetermined white point value, a predetermined color saturation value, a predetermined normalizing value (e.g. for color space characteristics, etc.), a predetermined levels value, a predetermined curves value, a set black point, a set white point, a set median value point, and/or any other feature of the pixel or image which may be used as a basis for blending. In other embodiments, features associated with the camera may be used as a basis for determining one or more automatic values. For example, a camera may include metadata associated with the pixels, including the ISO value, an exposure value, an aperture value, a histogram distribution, a geo positioning coordinate, an identification of the camera, an identification of the lens, an identification of the user of the camera, the time of day, and/or any other value which may be associated with the camera. In one embodiment, the metadata associated with the pixels may be used to set one or more automatic points for automatically blending.

In one embodiment, such automatic features may be inputted or based, at least in part, on cloud-based input or feedback. For example, a user may develop a set of batch rules or a package of image settings which should be applied to future images. Such settings can be saved to the cloud and/or to any other memory device which can subsequently be accessed by the camera device or module. As an example, a user may use a mobile device for taking and editing photos. Based on such past actions taken (e.g. with respect to editing the pixels or images, etc.), the user may save such actions as a package to be used for future images or pixels received. In other embodiments, the mobile device may recognize and track such actions taken by the user and may prompt the user to save the actions as a package to be applied for future received images or pixels.

In other embodiments, a package of actions or settings may also be associated with third party users. For example, such packages may be received from an online repository (e.g. associated with users on a photo sharing site, etc.), or may be transferred device-to-device (e.g. Bluetooth, NFC, Wifi, Wifi-direct, etc.). In one embodiment, a package of actions or settings may be device specific. For example, a specific device may be known to overexpose images or tint images and the package of actions or settings may be used to correct a deficiency associated with the device, camera, or lens. In other embodiments, known settings or actions may be improved upon. For example, the user may wish to create a black and white to mimic an Ansel Adams type photograph. A collection of settings or actions may be applied which is based on the specific device receiving the pixels or images (e.g. correct for deficiencies in the device, etc.), feedback from the community on how to achieve the best looking Ansel Adams look (e.g. cloud based feedback, etc.), and/or any other information which may be used to create the Ansel Adams type photograph.

In a separate embodiment, the blending may occur based on user input. For example, a number of user interface elements may be displayed to the user on a display, including an element for controlling overall color of the image (e.g. sepia, graytone, black and white, etc.), a package of target points to create a feel (e.g. a Polaroid feel package would have higher exposure with greater contrast, an intense feel package which would increase the saturation levels, etc.), one or more selective colors of an image (e.g. only display one or more colors such as red, blue, yellow, etc.), a saturation level, an exposure level, an ISO value, a black point, a white point, a levels value, a curves value, and/or any other point which may be associated with the image or pixel. In various embodiments, a user interface element may be used to control multiple values or points (e.g. one sliding element controls a package of settings, etc.), or may also be used to allow the user to control each and every element associated with the image or pixel.

Of course, in other embodiments, the blending may occur based on one or more automatic settings and on user input. For example, pixels or images may be blended first using one or more automatic settings, after which the user can then modify specific elements associated with the image. In other embodiments, any combination of automatic or manual settings may be applied to the blending.

In various embodiments, the blending may include mixing one or more pixels. In other embodiments, the blending may be based on a row of pixels (i.e. blending occurs row by row, etc.), by an entire image of pixels (e.g. all rows and columns of pixels, etc.), and/or in any manner associated with the pixels.

In one embodiment, the blend between two or more pixels may include applying an alpha blend. Of course, in other embodiments, any process for combining two or more pixels may be used to create a final resulting image.

As shown, after the blend process, an output 15-108 includes a blended first pixel and a second pixel. In one embodiment, the output may include a blended brighter and darker pixel. Additionally, the first pixel may be brighter than the second pixel.

In one embodiment, the blending of a brighter pixel and a darker pixel may result in a high dynamic range (HDR) pixel as an output. In other embodiments, the output may include a brighter pixel blended with a medium pixel to provide a first resulting pixel. The brighter pixel may be characterized by a brighter pixel attribute and the medium pixel may be characterized by a medium pixel attribute. The blend operation between the brighter pixel and the medium pixel may be based on a scalar result from a first mix value function that receives the brighter pixel attribute and the medium pixel attribute. In a further embodiment, the output may include a medium pixel blended with a darker pixel to provide a second resulting pixel. The darker pixel may be characterized by a darker pixel attribute. The blend operation between the medium pixel and the darker pixel may be based on a scalar result from a second mix value function that receives the medium pixel attribute and the darker pixel attribute. Further, in one embodiment, a scalar may be identified based on a mix value function that receives as inputs the first (e.g. brighter, etc.) pixel attribute and the second (e.g. darker, etc.) pixel attribute. The scalar may provide a blending weight between two different pixels (e.g. between brighter and medium, or between medium and darker). Lastly, in one embodiment, a mix value function (e.g. the first mix value function and the second mix value function) may include a flat region, a transition region, and a saturation region corresponding to thresholds associated with the inputs.

In one embodiment, the output may be based on a mix value surface associated with two or more pixels. For example, in one embodiment, a blending may create an intermediary value which is then used to output a final value associated with two or more pixels. In such an embodiment, the intermediary value (e.g. between two or more pixels, etc.) may be used to compute a value associated with a three-dimensional (3D) surface. The resulting pixel may be associated with the value computed using the intermediary value. Of course, in a variety of embodiments, the output may be associated with any type of functions, and any number of dimensions or inputs.

FIG. 15-2 illustrates a method 15-200 for blending a brighter pixel and a darker pixel, in accordance with one embodiment. As an option, the method 15-200 may be implemented in the context of any of the Figures. Of course, however, the method 15-200 may be carried out in any desired environment. Further, the aforementioned definitions may equally apply to the description below.

As shown, a first pixel attribute of a first pixel is received. See operation 15-202. Additionally, a second pixel attribute of a second pixel is received. See operation 15-204. In one embodiment, the first pixel attribute may correspond with a brighter pixel attribute, the first pixel may correspond with a brighter pixel, the second pixel attribute may correspond with a darker pixel attribute, and the second pixel may correspond with a darker pixel.

In one embodiment, a brighter pixel attribute and a darker pixel attribute each may include an intensity. In one embodiment, the intensity may correspond to a first value of a numeric range (e.g. 0.0 to 1.0) for the first pixel, and a second value of the numeric range for the second pixel. In other embodiments, a first (e.g. brighter, etc.) pixel attribute and a second (e.g. darker, etc.) pixel attribute each may include a saturation, a hue, a color space value (e.g. EGB, YCbCr, YUV, etc.), a brightness, hue, an RGB color, a luminance, a chrominance, and/or any other feature which may be associated with a pixel in some manner.

In another embodiment, a medium pixel attribute of a medium pixel that may be darker than a brighter pixel and brighter than a darker pixel, may be received. In another embodiment, a dark exposure parameter and a bright exposure parameter may be estimated, wherein the bright exposure parameter may be used for receiving the first (e.g. brighter, etc.) pixel attribute of the first (e.g. brighter, etc.) pixel, and the second (e.g. dark, etc.) exposure parameter may be used for receiving the second (e.g. darker, etc.) pixel attribute of the darker pixel. Further, in another embodiment, the dark exposure parameter and the bright exposure parameter may be associated with an exposure time. Still yet, in one embodiment, a medium exposure parameter may be estimated, wherein the medium exposure parameter is used for receiving a medium pixel attribute of a medium pixel.

In an additional embodiment, a medium pixel attribute of a medium pixel may be received, wherein a brighter pixel is associated with a first value, a darker pixel is associated with a second value, and a medium pixel is associated with a third value, the third value being in between the first value and the second value. Additionally, a first resulting pixel may include a first HDR pixel, and a second resulting pixel may include a second HDR pixel, such that the combined pixel may be generated by combining the first HDR pixel and the second HDR pixel based on a predetermined function to generate the combined pixel which may include a third HDR pixel.

As shown, a scalar is identified based on the first pixel attribute and the second pixel attribute. See operation 15-206.

In various embodiments, the scalar may be identified by generating, selecting, interpolating, and/or any other operation which may result in a scalar. In a further embodiment, the scalar may be identified utilizing one or more polynomials.

In one embodiment, a first one of the polynomials may have a first order that may be different than a second order of a second one of the polynomials. In another embodiment, a first polynomial of the plurality of polynomials may be a function of the first (e.g. brighter, etc.) pixel attribute and a second polynomial of the plurality of polynomials may be a function of the second (e.g. darker, etc.) pixel attribute. Still yet, in another embodiment, a first one of the polynomials may be a function of a brighter pixel attribute and may have a first order that may be less than a second order of a second one of the polynomials that may be a function of the darker pixel attribute. Additionally, in one embodiment, the first polynomial may be at least one of a higher order, an equal order, or a lower order relative to the second polynomial.

As shown, blending the first pixel and the second pixel may be based on the scalar, wherein the first pixel is brighter than the second pixel. See operation 15-208.

In another embodiment, a scalar may be identified based on either a polynomial of the form z=(1−(1−(1−x)^A)^B)*((1−(1−y)^C)^D) or a polynomial of the form z=((1−(1−x)^A)^B)*((1−(1−y)^C)^D), where z corresponds to the scalar, x corresponds to the second (e.g. darker, etc.) pixel attribute, y corresponds to the (e.g. brighter, etc.) first pixel attribute, and A, B, C, D correspond to arbitrary constants.

In one embodiment, the blending of a first (e.g. brighter, etc.) pixel and a second (e.g. darker, etc.) pixel may result in a high dynamic range (HDR) pixel as an output. In other embodiments, the blending may include identifying a first scalar based on the brighter pixel attribute and the medium pixel attribute, the first scalar being used for blending the brighter pixel and the medium pixel to provide a first resulting pixel. Additionally, in one embodiment, a second scalar based on the medium pixel attribute and the darker pixel attribute, the second scalar being used for blending the medium pixel and the darker pixel to provide a second resulting pixel.

In one embodiment, a third pixel attribute of a third pixel may be received. Additionally, a second scalar based on the second pixel attribute and the third pixel attribute may be identified. Further, based on the second scalar, the second pixel and the third pixel may be blended. Still yet, a first resulting pixel based on the blending of the first pixel and the second pixel may be generated, and a second resulting pixel based on the blending of the second pixel and the third pixel may be generated.

Additionally, in various embodiments, the first resulting pixel and the second resulting pixel are combined resulting in a combined pixel. Further, in one embodiment, the combined pixel may be processed based on an input associated with an intensity, a saturation, a hue, a color space value (e.g. RGB, YCbCr, YUV, etc.), a brightness, an RGB color, a luminance, a chrominance, and/or any other feature associated with the combined pixel. In a further embodiment, the combined pixel may be processed based on a saturation input or level mapping input.

In one embodiment, level mapping (or any input) may be performed on at least one pixel subject to the blending. In various embodiments, the level mapping (or any input) may occur in response to user input (e.g. selection of an input and/or a value associated with an input, etc.). Of course, the level mapping (or any input) may occur automatically based on a default value or setting, feedback from a cloud-based source (e.g. cloud source best settings for a photo effect, etc.), feedback from a local device (e.g. based on past photos taken by the user and analyzed the user's system, based on photos taken by others including the user within a set geographic proximity, etc.), and/or any other setting or value associated with an automatic action. In one embodiment, the level mapping may comprise an equalization operation, such as an equalization technique known in the art as contrast limited adaptive histogram equalization (CLAHE).

In some embodiments, one or more user interfaces and user interface elements may be used to receive a user input. For example, in one embodiment, a first indicia corresponding to at least one brighter point and a second indicia corresponding to at least one brighter point may be displayed, and the user input may be further capable of including manipulation of at least one of the first indicia or the second indicia. Additionally, in one embodiment, third indicia corresponding to at least one medium point may be displayed, and the user input may be further capable of including manipulation of the third indicia.

In another embodiment, a first one of the polynomials may be a function of a first pixel attribute, and a second one of the polynomials may be a function of a second pixel attribute, and the resulting pixel may be a product of the first and second polynomials. Still yet, in one embodiment, the resulting pixel may be a product of the first and second polynomials in combination with a strength function.

Additionally, in one embodiment, a strength function and/or coefficient may control a function operating on two or more pixels, including the blending (e.g. mixing, etc.) of the two or more pixels. For example, in various embodiments, the strength function may be used to control the blending of the two or more pixels, including providing no HDR effect (e.g. ev0, etc.), a full HDR effect, or even an amplification of the HDR effect. In this manner, the strength function may control the resulting pixel based on the first and second polynomials.

In another embodiment, the blending may include at one or more stages in the blending process. For example, in one embodiment, the first polynomial may be based on a single pixel attribute and the second polynomial may be based on a second single pixel attribute, and blending may include taking an average based on the first and second polynomials. In another embodiment, the first polynomial and the second polynomial may be based on an average of many pixel attributes (e.g. multiple exposures, multiple saturations, etc.), and the blending may include taking an average based on the first and second polynomials.

Of course, in one embodiment, the polynomials may be associated with a surface diagram. For example, in one embodiment, an x value may be associated with a polynomial associated with the first pixel attribute (or a plurality of pixel attributes), and a y value may be associated with a polynomial associated with the second pixel attribute (or a plurality of pixel attributes). Further, in another embodiment, a z value may be associated with a strength function. In one embodiment, a resulting pixel value may be determined by blending the x value and y value based on the z value, as determined by the surface diagram.

In an alternative embodiment, a resulting pixel value may be selected from a table that embodies the surface diagram. In another embodiment, a first value associated with a first polynomial and a second value associated with a second polynomial may each be used to select a corresponding value from a table, and the two values may be used to interpolate a resulting pixel.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

FIG. 15-3 shows a system 15-500 for outputting a HDR pixel, in accordance with one embodiment. As an option, the system 15-500 may be implemented in the context of the any of the Figures. Of course, however, the system 15-500 may be carried out in any desired environment. Further, the aforementioned definitions may equally apply to the description below.

As shown, the system 15-500 includes a non-linear mix function 15-530. In one embodiment, the non-linear mix function 15-530 includes receiving a brighter pixel 15-550 and a darker pixel 15-552. In one embodiment, the brighter pixel 15-550 and the darker pixel 15-552 may be blended via a mix function 15-566, resulting in a HDR pixel 15-559.

In one embodiment, the mix function 15-566 may include any function which is capable of combining two input values (e.g. pixels, etc.). The mix function 15-566 may define a linear blend operation for generating a vec3 value associated with HDR pixel 15-559 by blending a vec3 value associated with the brighter pixel 15-550 and a vec3 value associated with the darker pixel 15-552 based on mix value 15-558. For example the mix function 15-566 may implement the well-known OpenGL mix function. In other examples, the mix function may include normalizing a weighted sum of values for two different pixels, summing and normalizing vectors (e.g. RGB, etc.) associated with the input pixels, computing a weighted average for the two input pixels, and/or applying any other function which may combine in some manner the brighter pixel and the darker pixel. In one embodiment, mix value 15-558 may range from 0 to 1, and mix function 15-566 mixes darker pixel 15-552 and brighter pixel 15-550 based on the mix value 15-558. In another embodiment, the mix value 15-558 ranges from 0 to an arbitrarily large value, however the mix function 15-566 is configured to respond to mix values greater than 1 as though such values are equal to 1. Further still, the mix value may be a scalar.

In one embodiment, a mix value function may include a product of two polynomials and may include a strength coefficient. In a specific example, the mix value function is implemented as mix value surface 15-564, which operates to generate mix value 15-558. One exemplary mix value function is illustrated below in Equation 1:

$$z = p1(x) * p2(y) * s \qquad \text{(Eq. 1)}$$

where:

z is resulting mix value for first and second pixels;

p1 is a first polynomial in x, where x may be a pixel attribute for first (darker) pixel;

p2 is a second polynomial in y, where y may be a pixel attribute for second (lighter) pixel; and s is a strength coefficient (s==0: no mixing, s==1.0: nominal mixing, s>1.0: exaggerated mixing).

In Equation 1, the strength coefficient (s) may cause the resulting mix value to reflect no mixing (e.g. s=0, etc.), nominal mixing (e.g. s=1, etc.), and exaggerated mixing (e.g. s>1.0, etc.) between the first and second pixels.

In another specific embodiment, a mix function may include a specific polynomial form:

$$z = (1 - (1 - (1 - x)^\wedge A)^\wedge B) * ((1 - (1 - y)^\wedge C)^\wedge D) * s \qquad \text{(Eq. 2)}$$

As shown, p1(x) of Equation 1 may be implemented in Equations 2 as the term (1−(1−(1−x)^A)^B), while p2(y) of Equation 2 may be implemented as the term ((1−(1−y)^C)^D). In one embodiment, Equation 2 may include the following coefficients: A=8, B=2, C=8, and D=2. Of course, in other embodiments, other coefficient values may be used to optimize overall mixing, which may include subjective visual quality associated with mixing the first and second pixels. In certain embodiments, Equation 2 may be used to generate a mix value for a combination of an "EV0" pixel (e.g. a pixel from an image having an EV0 exposure), an "EV−" pixel (e.g. a pixel from an image having an exposure of EV−1, EV−2, or EV−3, etc.), and an "EV+" pixel (e.g. a pixel from an image having an exposure of EV+1, EV+2, or EV+3, etc.). Further, in another embodiment, Equation 2 may be used to generate mix values for pixels associated with images having a bright exposure, median exposure, and/or dark exposure in any combination.

In another embodiment, when z=0, the darker pixel may be given full weight, and when z=1, the brighter pixel may be given full weight. In one embodiment, Equation 2 may correspond with the surface diagrams as shown in FIGS. 15-10A and 15-10B.

In another specific embodiment, a mix function may include a specific polynomial form:

$$z = ((1-(1-x)^\wedge A)^\wedge B) * ((1-(1-y)^\wedge C)^\wedge D) * s \qquad \text{(Eq. 3)}$$

As shown, p1(x) of Equation 1 may be implemented in Equations 3 as the term ((1−(1−x)^A)^B), while p2(y) of Equation 3 may be implemented as the term ((1−(1−y)^C)^D). In one embodiment, Equation 3 may include the following coefficients: A=8, B=2, C=2, and D=2. Of course, in other embodiments, other coefficient values may be used to optimize the mixing. In another embodiment, Equation 3 may be used to generate a mix value for an "EV0" pixel, and an "EV−" pixel (e.g., EV−1, EV−2, or EV−3) pixel. Further, in another embodiment, Equation 3 may be used to generate mix values for pixels associated with images having a bright exposure, median exposure, and/or dark exposure in any combination.

In another embodiment, when z=0, the brighter pixel may be given full weight, and when z=1, the darker pixel may be given full weight. In one embodiment, Equation 3 may correspond with the surface diagrams as shown in FIGS. 15-11A and 15-11B.

In another embodiment, the brighter pixel 15-550 may be received by a pixel attribute function 15-560, and the darker pixel 15-552 may be received a pixel attribute function 15-562. In various embodiments, the pixel attribute function 15-560 and/or 562 may include any function which is capable of determining an attribute associated with the input pixel (e.g. brighter pixel, darker pixel, etc.). For example, in various embodiments, the pixel attribute function 15-560 and/or 562 may include determining an intensity, a saturation, a hue, a color space value (e.g. EGB, YCbCr, YUV, etc.), an RGB blend, a brightness, an RGB color, a luminance, a chrominance, and/or any other feature which may be associated with a pixel in some manner.

In response to the pixel attribute function 15-560, a pixel attribute 15-555 associated with brighter pixel 15-550 results and is inputted into a mix value function, such as mix value surface 15-564. Additionally, in response to the pixel attribute function 15-562, a pixel attribute 15-556 associated with darker pixel 15-552 results and is inputted into the mix value function.

In one embodiment, a given mix value function may be associated with a surface diagram. For example, in one embodiment, an x value may be associated with a polynomial associated with the first pixel attribute (or a plurality of pixel attributes), and a y value may be associated with a polynomial associated with the second pixel attribute (or a plurality of pixel attributes). Further, in another embodiment, a strength function may be used to scale the mix value calculated by the mix value function. In one embodiment, the mix value may include a scalar.

In one embodiment, the mix value 15-558 determined by the mix value function may be selected from a table that embodies the surface diagram. In another embodiment, a first value associated with a first polynomial and a second value associated with a second polynomial may each be used to select a corresponding value from a table, and the two or more values may be used to interpolate a mix value. In other words, at least a portion of the mix value function may be implemented as a table (e.g. lookup table) indexed in x and y to determine a value of z. Each value of z may be directly represented in the table or interpolated from sample points comprising the table. Accordingly, a scalar may be identified by at least one of generating, selecting, and interpolating.

As shown, a mix value 15-558 results from the mix value surface 15-564 and is inputted into the mix function 15-566, described previously.

HDR pixel 15-559 may be generated based on the brighter pixel 15-550 and the darker pixel 15-552, in accordance with various embodiments described herein.

FIG. 15-4 illustrates a method 15-600 for generating a HDR pixel based on combined HDR pixel and effects function, in accordance with another embodiment. As an option, the method 15-600 may be implemented in the context of the details of any of the Figures. Of course, however, the method 15-600 may be carried out in any desired environment. Further, the aforementioned definitions may equally apply to the description below.

As shown, in one embodiment, a medium-bright HDR pixel may be generated based on a medium exposure pixel and a bright exposure pixel. See operation 15-602. Additionally, a medium-dark HDR pixel may be generated based on a medium exposure pixel and a dark exposure pixel. See operation 15-604. For example, in one embodiment, a medium exposure pixel may include an EV0 exposure and a bright exposure pixel may include an EV+1 exposure, and medium-bright HDR pixel may be a blend between the EV0 exposure pixel and the EV+1 exposure pixel. Of course, a bright exposure pixel may include an exposure greater (e.g. in any amount, etc.) than the medium exposure value.

In another embodiment, a medium exposure pixel may include an EV0 exposure and a dark exposure pixel may include an EV−1 exposure, and a medium-dark HDR pixel may be a blend between the EV0 exposure and the EV−1 exposure. Of course, a dark exposure pixel may include an exposure (e.g. in any amount, etc.) less than the medium exposure value.

As shown, a combined HDR pixel may be generated based on a medium-bright HDR pixel and a medium-dark HDR pixel. See operation 15-606. In another embodiment, the combined HDR pixel may be generated based on multiple medium-bright HDR pixels and multiple medium-dark HDR pixels.

In a separate embodiment, a second combined HDR pixel may be based on the combined HDR pixel and a medium-bright HDR pixel, or may be based on the combined HDR pixel and a medium-dark HDR pixel. In a further embodiment, a third combined HDR pixel may be based on a first combined HDR pixel, a second combined HDR pixel, a medium-bright HDR pixel, a medium-dark HDR pixel, and/or any combination thereof.

Further, as shown, an output HDR pixel may be generated based on a combined HDR pixel and an effects function. See operation 15-608. For example in one embodiment, an effect function may include a function to alter an intensity, a saturation, a hue, a color space value (e.g. EGB, YCbCr, YUV, etc.), a RGB blend, a brightness, an RGB color, a luminance, a chrominance, a contrast, an attribute levels function, and/or an attribute curves function. Further, an effect function may include a filter, such as but not limited to, a pastel look, a watercolor function, a charcoal look, a graphic pen look, an outline of detected edges, a change of grain or of noise, a change of texture, and/or any other modification which may alter the output HDR pixel in some manner.

FIG. 15-5 illustrates a system 15-700 for outputting a HDR pixel, in accordance with another embodiment. As an option, the system 15-700 may be implemented in the context of the details of any of the Figures. Of course, however, the system 15-700 may be carried out in any desired environment. Further, the aforementioned definitions may equally apply to the description below.

In one embodiment, the system 15-700 may include a pixel blend operation 15-702. In one embodiment, the pixel blend operation 15-702 may include receiving a bright exposure pixel 15-710 and a medium exposure pixel 15-712 at a non-linear mix function 15-732. In another embodiment, the non-linear mix function 15-732 may operate in a manner consistent with non-linear mix function 15-530 of FIG. 15-3. In another embodiment, the pixel blend operation 15-702 may include receiving a dark exposure pixel 15-714 and a medium exposure pixel 15-712 at a non-linear mix function 15-734. In another embodiment, the non-linear mix function 15-734 may operate in a manner consistent with item 15-530 of FIG. 15-3.

In various embodiments, the non-linear mix function 15-732 and/or 734 may receive an input from a bright mix limit 15-720 or dark mix limit 15-722, respectively. In one embodiment, the bright mix limit 15-720 and/or the dark mix limit 15-722 may include an automatic or manual setting. For example, in some embodiments, the mix limit may be set by predefined settings (e.g. optimized settings, etc.). In one embodiment, each mix limit may be predefined to optimize the mix function. In another embodiment, the manual settings may include receiving a user input. For example, in one embodiment, the user input may correspond with a slider setting on a sliding user interface. Each mix limit may correspond to a respective strength coefficient, described above in conjunction with Equations 1-3.

For example, in one embodiment, a mix value function may include a product of two polynomials and may include a strength coefficient. In a specific example, the mix value function is implemented as mix value surface 15-564, which operates to generate mix value 15-558. One exemplary mix value function is illustrated below in Equation 1:

$$z = p1(x) * p2(y) * s \quad \text{(Eq. 1)}$$

where:

z is resulting mix value for first and second pixels;

p1 is a first polynomial in x, where x may be a pixel attribute for first (darker) pixel;

p2 is a second polynomial in y, where y may be a pixel attribute for second (lighter) pixel; and s is a strength coefficient (s==0: no mixing, s==1.0: nominal mixing, s>1.0: exaggerated mixing).

In Equation 1, the strength coefficient (s) may cause the resulting mix value to reflect no mixing (e.g. s=0, etc.), nominal mixing (e.g. s=1, etc.), and exaggerated mixing (e.g. s>1.0, etc.) between the first and second pixels.

In another specific embodiment, a mix function may include a specific polynomial form:

$$z = (1-(1-(1-x)^\wedge A)^\wedge B) * ((1-(1-y)^\wedge C)^\wedge D) * s \quad \text{(Eq. 2)}$$

As shown, p1(x) of Equation 1 may be implemented in Equations 2 as the term (1−(1−(1−x)^A)), while p2(y) of Equation 2 may be implemented as the term ((1−(1−y)^C)^D). In one embodiment, Equation 2 may include the following coefficients: A=8, B=2, C=8, and D=2. Of course, in other embodiments, other coefficient values may be used to optimize overall mixing, which may include subjective visual quality associated with mixing the first and second pixels. In certain embodiments, Equation 2 may be used to generate a mix value for a combination of an “EV0” pixel (e.g. a pixel from an image having an EV0 exposure), an “EV−” pixel (e.g. a pixel from an image having an exposure of EV−1, EV−2, or EV−3, etc.), and an “EV+” pixel (e.g. a pixel from an image having an exposure of EV+1, EV+2, or EV+3, etc.). Further, in another embodiment, Equation 2 may be used to generate mix values for pixels associated with images having a bright exposure, median exposure, and/or dark exposure in any combination.

In another embodiment, when z=0, the darker pixel may be given full weight, and when z=1, the brighter pixel may be given full weight. In one embodiment, Equation 2 may correspond with the surface diagrams as shown in FIGS. 10A and 10B.

In another specific embodiment, a mix function may include a specific polynomial form:

$$z = ((1-(1-x)^\wedge A)^\wedge B) * ((1-(1-y)^\wedge C)^\wedge D) * s \quad \text{(Eq. 3)}$$

As shown, p1(x) of Equation 1 may be implemented in Equations 3 as the term ((1−(1−x)^A)^B), while p2(y) of Equation 3 may be implemented as the term ((1−(1−y)^C)^D). In one embodiment, Equation 3 may include the following coefficients: A=8, B=2, C=2, and D=2. Of course, in other embodiments, other coefficient values may be used to optimize the mixing. In another embodiment, Equation 3 may be used to generate a mix value for an “EV0” pixel, and an “EV−” pixel (e.g., EV−1, EV−2, or EV−3) pixel. Further, in another embodiment, Equation 3 may be used to generate mix values for pixels associated with images having a bright exposure, median exposure, and/or dark exposure in any combination.

In another embodiment, when z=0, the brighter pixel may be given full weight, and when z=1, the darker pixel may be given full weight. In one embodiment, Equation 3 may correspond with the surface diagrams as shown in FIGS. 11A and 11B.

As shown, in one embodiment, the non-linear mix function 15-732 results in a medium-bright HDR pixel 15-740.

In another embodiment, the non-linear mix function 15-734 results in a medium-dark HDR pixel 15-742. In one embodiment, the medium-bright HDR pixel 15-740 and the medium-dark HDR pixel 15-742 are inputted into a combiner function 15-736. In another embodiment, the combiner function 15-736 blends the medium-bright HDR pixel 15-740 and the medium-dark HDR pixel 15-742.

In various embodiments, the combiner function 15-736 may include taking an average of two or more pixel values, summing and normalizing a color attribute associated with each pixel value (e.g. a summation of a red/green/blue component in a RGB color space, etc.), determining a RGB (or any color space) vector length which may then be normalized, using an average pixel value in combination with a brighter pixel or a darker pixel, and/or using any other combination to blend the medium-bright HDR pixel 15-740 and the medium-dark HDR pixel 15-742.

In one embodiment, the combiner function 15-736 results in a combined HDR pixel 15-744. In various embodiments, the combined HDR pixel 15-744 may include any type of blend associated with the medium-bright pixel 15-740 and the medium-dark HDR pixel 15-742. For example, in some embodiments, the combined HDR pixel may include a resulting pixel with no HDR effect applied, whereas in other embodiments, any amount of HDR or even amplification may be applied and be reflected in the resulting combined HDR pixel.

In various embodiments, the combined HDR pixel 15-744 is inputted into an effects function 15-738. In one embodiment, the effects function 15-738 may receive a saturation parameter 15-724, level mapping parameters 15-726, and/or any other function parameter which may cause the effects function 15-738 to modify the combined HDR pixel 15-744 in some manner. Of course, in other embodiments, the effects function 15-738 may include a function to alter an intensity, a hue, a color space value (e.g. EGB, YCbCr, YUV, etc.), a brightness, an RGB color, a luminance, a chrominance, a contrast, and/or a curves function. Further, an effect function may include a filter, such as but not limited to, a pastel look, a watercolor function, a charcoal look, a graphic pen look, an outline of detected edges, a change of grain or of noise, a change of texture, and/or any other modification which may alter the combined HDR pixel 15-744 in some manner. In some embodiments, output HDR pixel 15-746 may be generated by effects function 15-738. Alternatively, effects function 15-738 may be configured to have no effect and output HDR pixel 15-746 is equivalent to combined HDR pixel 15-744. In one embodiment, the effects function 15-738 implements equalization, such as an equalization technique known in the art as contrast limited adaptive histogram equalization (CLAHE).

In some embodiments, and in the alternative, the combined HDR pixel 15-744 may have no effects applied. After passing through an effects function 15-738, an output HDR pixel 15-746 results.

FIG. 15-6 illustrates a method 15-800 for generating a HDR pixel based on a combined HDR pixel and an effects function, in accordance with another embodiment. As an option, the method 15-800 may be implemented in the context of the details of any of the Figures. Of course, however, the method 15-800 may be carried out in any desired environment. Further, the aforementioned definitions may equally apply to the description below.

In one embodiment, a medium exposure parameter may be estimated for a medium exposure image. See operation 15-802. Additionally, a dark exposure parameter is estimated for a dark exposure image (see operation 15-804) and a bright exposure parameter is estimated for a bright exposure image (see operation 15-806).

In various embodiments, an exposure parameter (e.g. associated with medium exposure, dark exposure, or bright exposure, etc.) may include an ISO, an exposure time, an exposure value, an aperture, and/or any other parameter which may affect image capture time. In one embodiment, the capture time may include the amount of time that the image sensor is exposed to optical information presented by a corresponding camera lens.

In one embodiment, estimating a medium exposure parameter, a dark exposure parameter, and/or a bright exposure parameter may include metering an image associated with a photographic scene. For example, in various embodiments, the brightness of light within a lens' field of view may be determined. Further, the metering of the image may include a spot metering (e.g. narrow area of coverage, etc.), an average metering (e.g. metering across the entire photo, etc.), a multi-pattern metering (e.g. matrix metering, segmented metering, etc.), and/or any other type of metering system. The metering of the image may be performed at any resolution, including a lower resolution than available from the image sensor, which may result in faster metering latency.

As shown, a dark exposure image, a medium exposure image, and a bright exposure image are captured. See operation 15-808. In various embodiments, capturing an image (e.g. a dark exposure image, a medium exposure image, a bright exposure image, etc.) may include committing the image (e.g. as seen through the corresponding camera lens, etc.) to an image processor and/or otherwise store the image temporarily in some manner. Of course, in other embodiments, the capturing may include a photodiode which may detect light (e.g. RGB light, etc.), a bias voltage or capacitor (e.g. to store intensity of the light, etc.), and/or any other circuitry necessary to receive the light intensity and store it. In other embodiments, the photodiode may charge or discharge a capacitor at a rate that is proportional to the incident light intensity (e.g. associated with the exposure time, etc.).

Additionally, in one embodiment, a combined HDR image may be generated based on a dark exposure image, a medium exposure image, and a bright exposure image. See operation 15-810. In various embodiments, the combined HDR image may be generated in a manner consistent with combined HDR pixel 15-744 in FIG. 15-5. Further, in one embodiment, an output HDR image may be generated based on a combined HDR image comprising combined HDR pixel 15-744 and an effects function. See operation 15-812. In various embodiments, the output HDR image may be generated in a manner consistent with Output HDR pixel 15-746 in FIG. 15-5.

FIG. 15-7 illustrates a method 15-900 for generating a HDR pixel based on combined HDR pixel and an effects function, in accordance with another embodiment. As an option, the method 15-900 may be implemented in the context of the details of any of the Figures. Of course, however, the method 15-900 may be carried out in any desired environment. Further, the aforementioned definitions may equally apply to the description below.

In one embodiment, a medium exposure parameter may be estimated for medium exposure image. See operation 15-902. In various embodiments, the medium exposure parameter may include an ISO, an exposure time, an exposure value, an aperture, and/or any other parameter which may affect the capture time. In one embodiment, the capture time may include the amount of time that the image sensor is exposed to optical information presented by a corresponding camera lens. In one embodiment, estimating a medium exposure parameter may include metering the image. For example, in various embodiments, the brightness of light within a lens' field of view may be determined. Further, the metering of the image may include a spot metering (e.g. narrow area of coverage, etc.), an average metering (e.g. metering across the entire photo, etc.), a multi-pattern metering (e.g. matrix metering, segmented metering, etc.), and/or any other type of metering system. The metering of the image may be performed at any resolution, including a lower resolution than available from the image sensor, which may result in faster metering latency. Additionally, in one embodiment, the metering for a medium exposure image may include an image at EV0. Of course, however, in other embodiments, the metering may include an image at any shutter stop and/or exposure value.

As shown, in one embodiment, an analog image may be captured within an image sensor based on medium exposure parameters. See operation 15-904. In various embodiments, capturing the analog image may include committing the image (e.g. as seen through the corresponding camera lens, etc.) to an image sensor and/or otherwise store the image temporarily in some manner. Of course, in other embodiments, the capturing may include a photodiode which may detect light (e.g. RGB light, etc.), a bias voltage or capacitor (e.g. to store intensity of the light, etc.), and/or any other circuitry necessary to receive the light intensity and store it. In other embodiments, the photodiode may charge or discharge a capacitor at a rate that is proportional to the incident light intensity (e.g. associated with the exposure time, etc.).

Additionally, in one embodiment, a medium exposure image may be generated based on an analog image. See operation 15-906. Additionally, a dark exposure image may be generated based on an analog image (see operation 15-908), and a brighter exposure image may be generated based on an analog image (see operation 15-910). In various embodiments, generating an exposure image (e.g. medium, dark, bright, etc.) may include applying an ISO or film speed to the analog image. Of course, in another embodiment, any function which may alter the analog image's sensitivity to light may be applied. In one embodiment, the same analog image may be sampled repeatedly to generate multiple images (e.g. medium exposure image, dark exposure image, bright exposure image, etc.). For example, in one embodiment, the current stored within the circuitry may be used multiple times.

Additionally, in one embodiment, a combined HDR image may be generated based on a dark exposure image, a medium exposure image, and a bright exposure image. See operation 15-912. In various embodiments, the combined HDR image may be generated in a manner consistent with Combined HDR pixel 15-744 in FIG. 15-5. Further, in one embodiment, an output HDR image may be generated based on a combined HDR image and an effects function. See operation 15-914. In various embodiments, the output HDR image may be generated in a manner consistent with Output HDR pixel 15-746 in FIG. 15-5.

Figures 8A, 15:
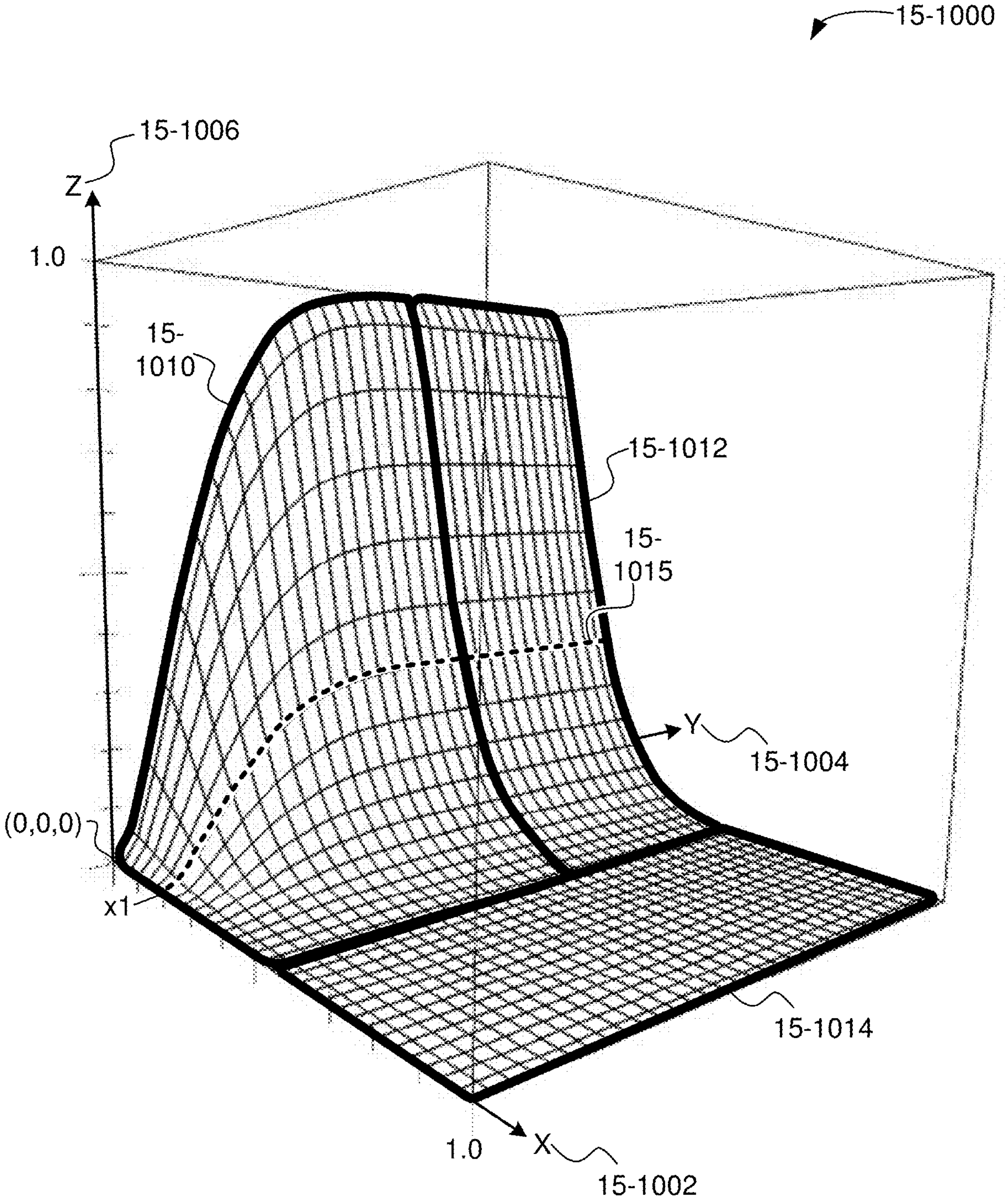

FIG. 15-8A illustrates a surface diagram 15-1000, in accordance with another embodiment. As an option, the surface diagram 15-1000 may be implemented in the context of the details of any of the Figures. Of course, however, the surface diagram 15-1000 may be carried out in any desired environment. Further, the aforementioned definitions may equally apply to the description below.

In one embodiment, surface diagram 15-1000 depicts a surface associated with Equation 2 for determining a mix value for two pixels, based on two pixel attributes for the two pixels. As shown, the surface diagram 15-1000 is illustrated within a unit cube having an x axis 15-1002, a y axis 5-1004, and a z axis 15-1006. As described in Equation 2, variable "x" is associated with an attribute for a first (e.g. darker) pixel, and variable "y" is associated with an attribute for a second (e.g. lighter) pixel. For example, each attribute may represent an intensity value ranging from 0 to 1 along a respective x and y axis of the unit cube. An attribute for the first pixel may correspond to pixel attribute 15-556 of FIG. 15-3, while an attribute for the second pixel may correspond to pixel attribute 15-555. As described in Equation 2, variable "z" is associated with the mix value, such as mix value 15-558, for generating a HDR pixel, such as HDR pixel 15-559, from the two pixels. A mix value of 0 (e.g. z=0) may result in a HDR pixel that is substantially identical to the first pixel, while a mix value of 1 (e.g. z=1) may result in a HDR pixel that is substantially identical to the second pixel.

As shown, surface diagram 15-1000 includes a flat region 15-1014, a transition region 15-1010, and a saturation region 15-1012. The transition region 15-1010 is associated with x values below an x threshold and y values below a y threshold. The transition region 15-1010 is generally characterized as having monotonically increasing z values for corresponding monotonically increasing x and y values. The flat region 15-1014 is associated with x values above the x threshold. The flat region 15-1014 is characterized as having substantially constant z values independent of corresponding x and y values. The saturation region 15-1012 is associated with x values below the x threshold and above the y threshold. The saturation region 15-1012 is characterized as having z values that are a function of corresponding x values while being relatively independent of y values. For example, with x=x1, line 15-1015 shows z monotonically increasing through the transition region 15-1010, and further shows z remaining substantially constant within the saturation region 15-1012. In one embodiment mix value surface 15-564 implements surface diagram 15-1000. In another embodiment, non-linear mix function 15-732 of FIG. 15-5 implements surface diagram 15-1000. In yet another embodiment, non-linear mix function 15-734 of FIG. 15-5 implements surface diagram 15-1000.

Figures 8B, 15:
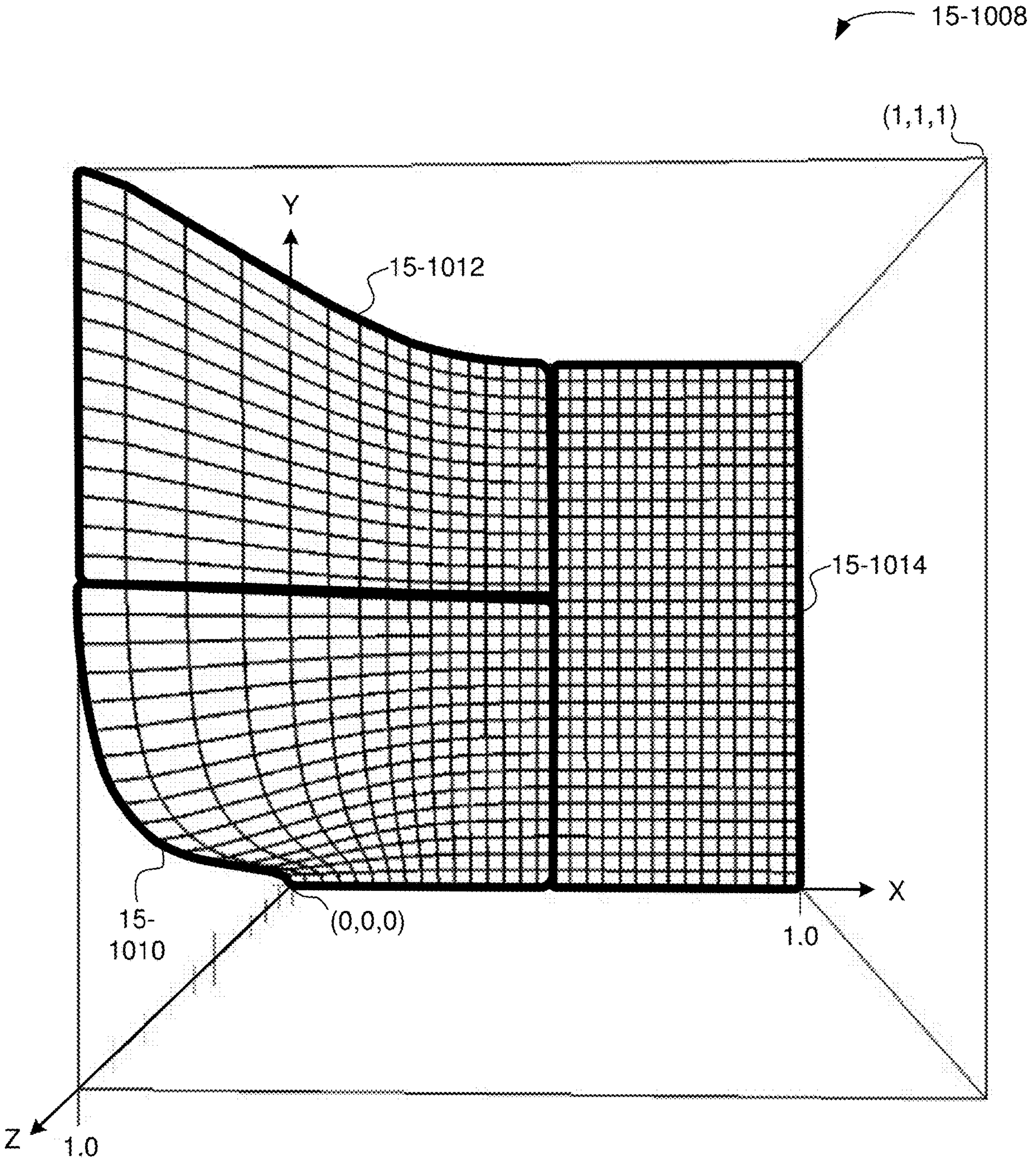
Figures 9A, 15:
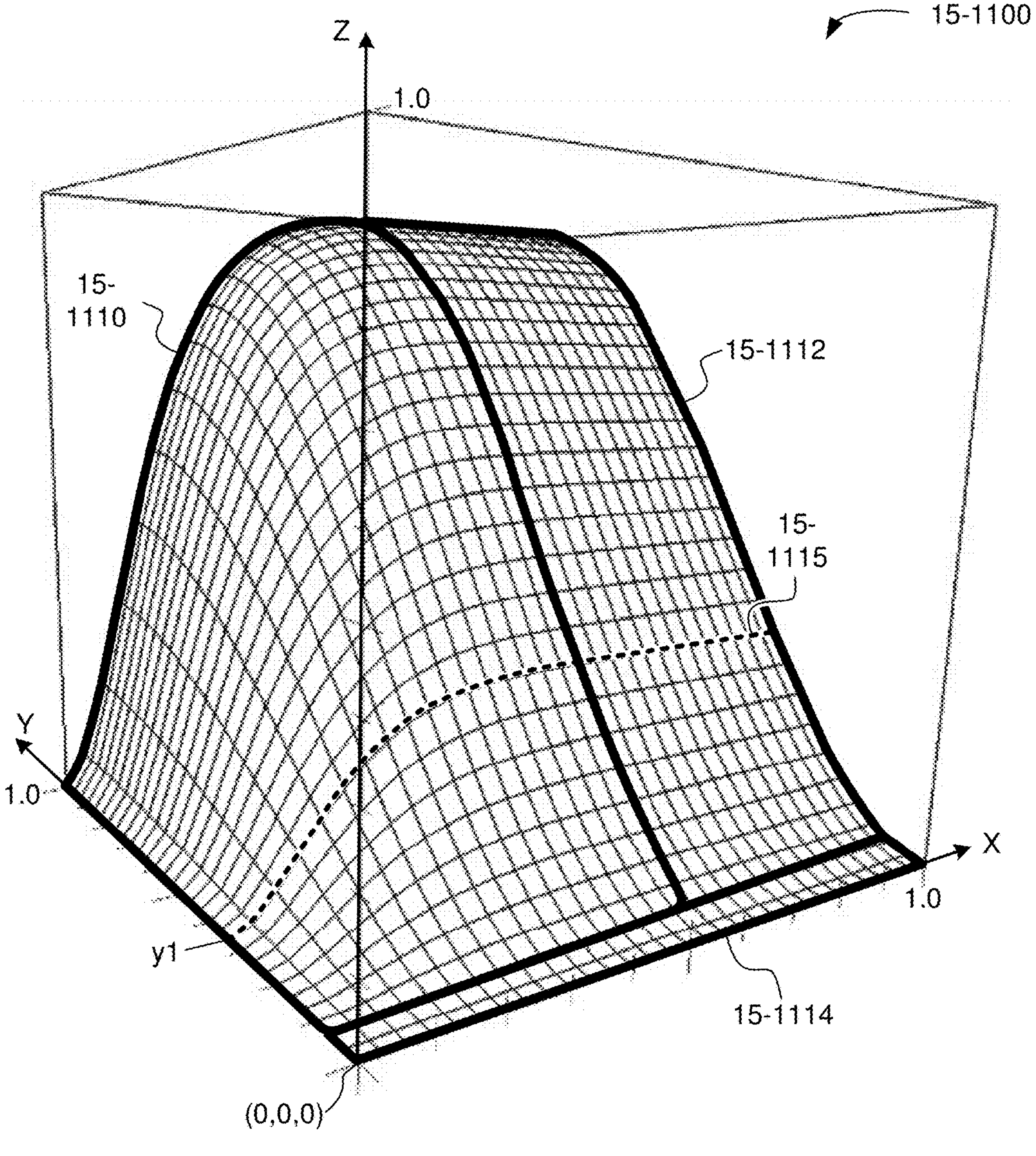
Figures 9B, 15:
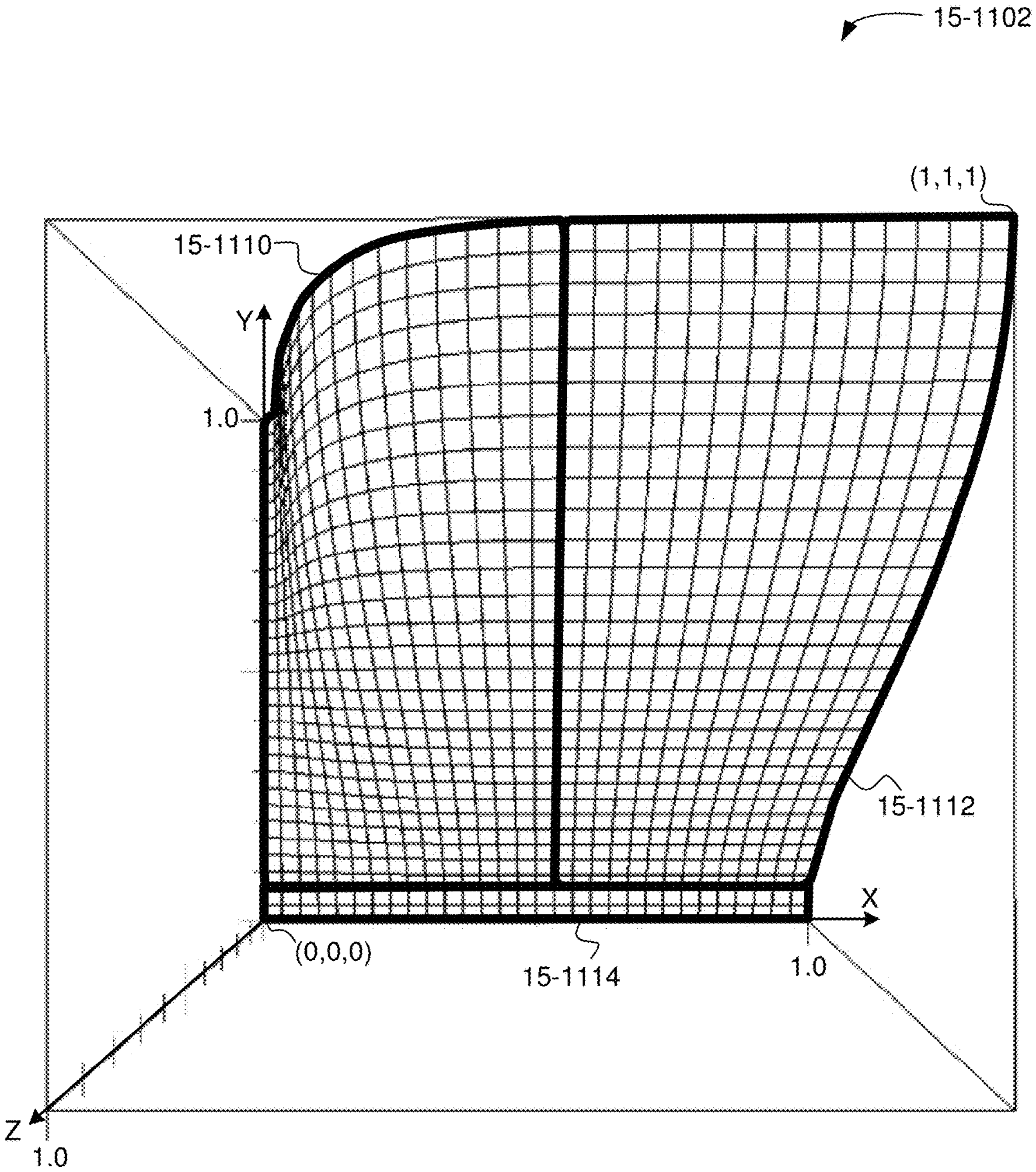
Figures 10, 15:
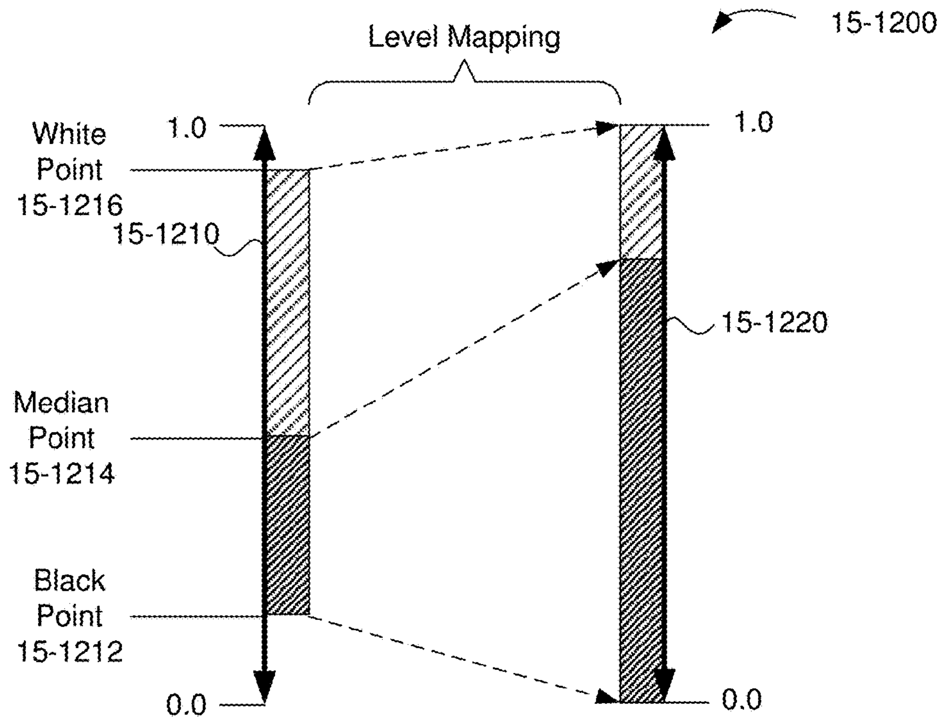
Figures 11, 15:
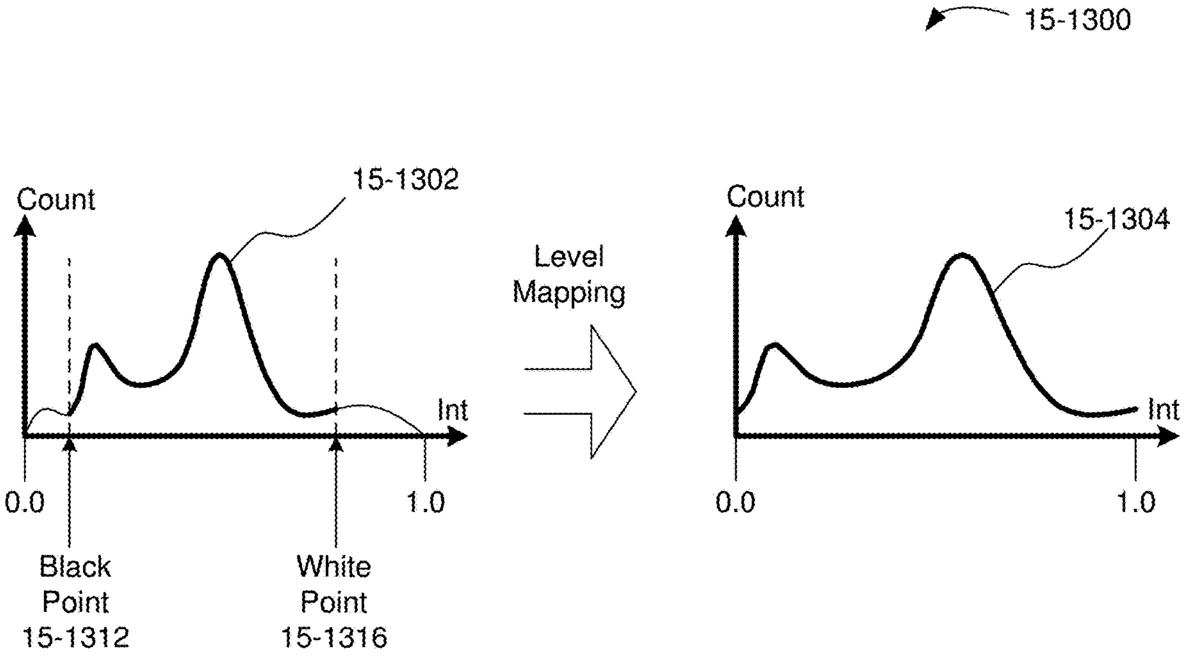
Figures 12, 15:
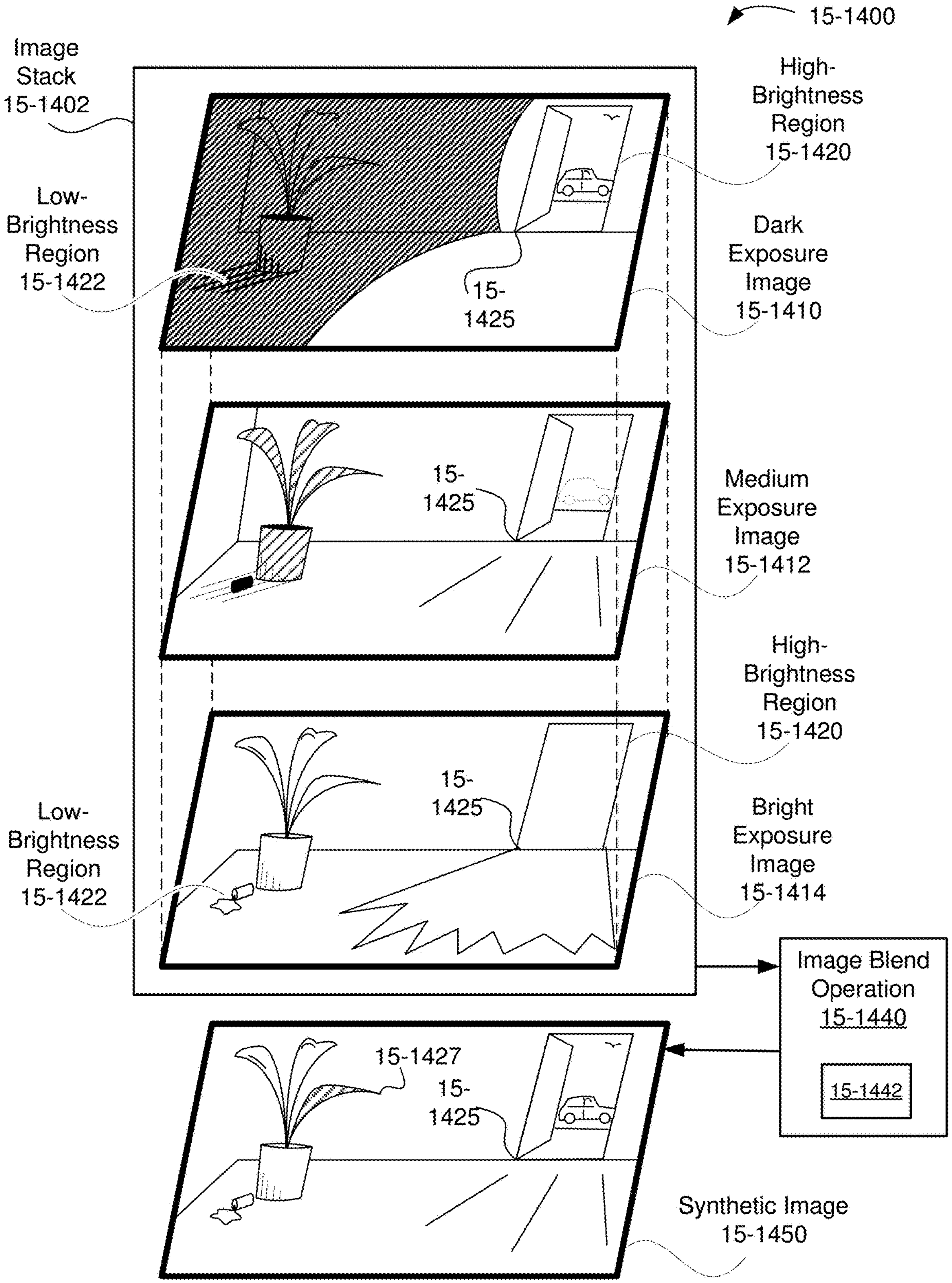
Figures 13, 15:
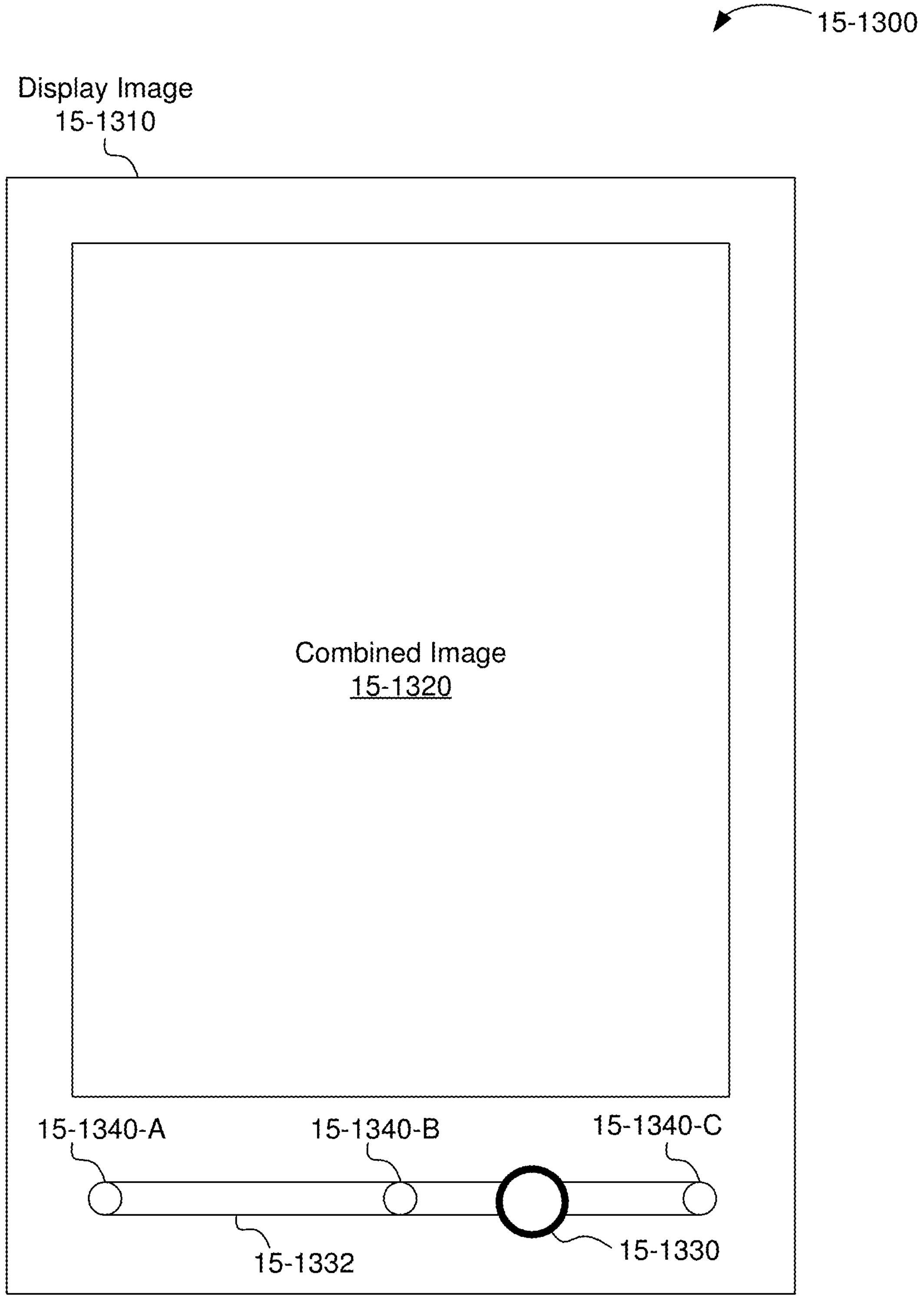
Figures 14, 15:
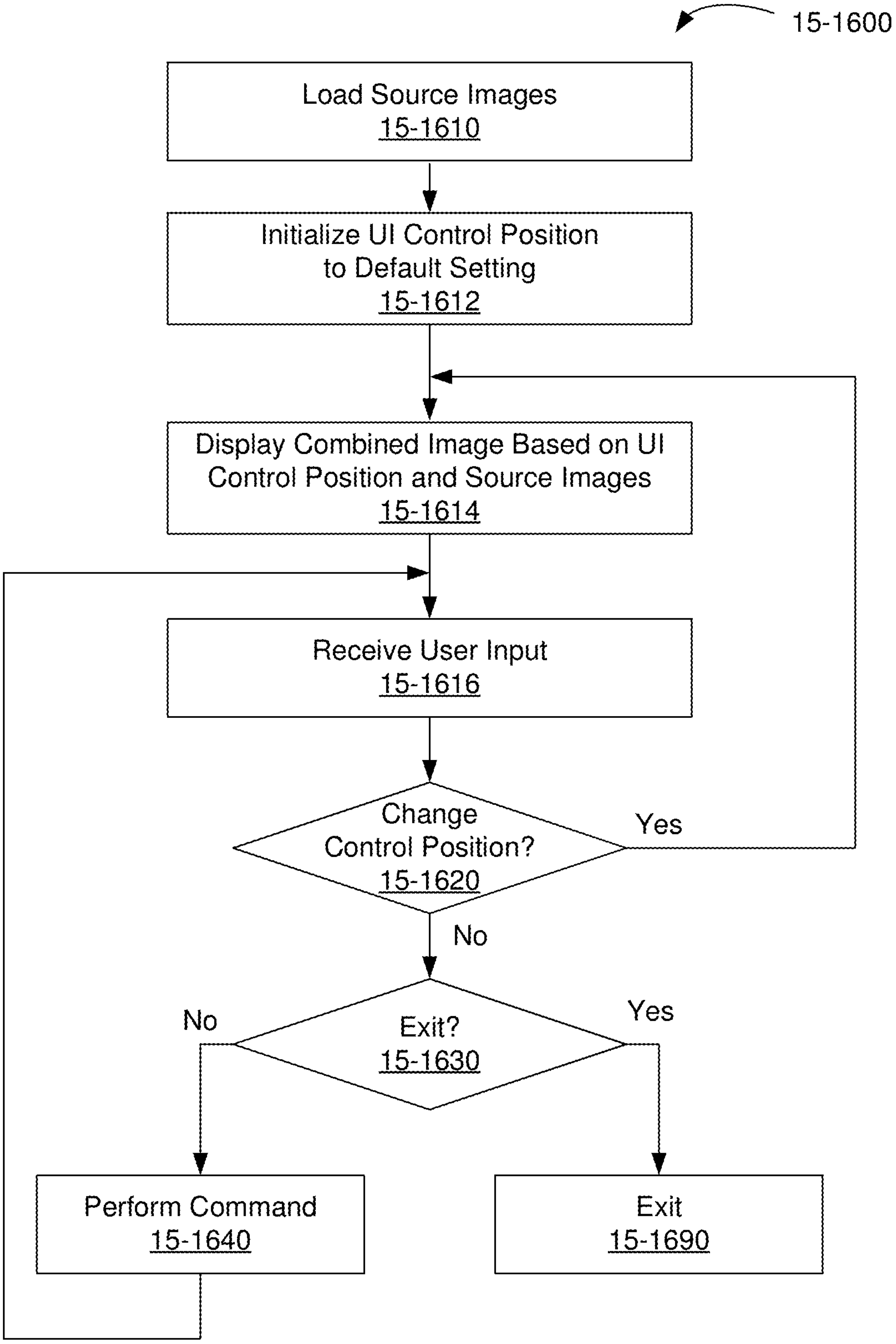

FIG. 15-8B illustrates a surface diagram 15-1008, in accordance with another embodiment. As an option, the surface diagram 15-1008 may be implemented in the context of the details of any of the Figures. Of course, however, the surface diagram 15-1008 may be implemented in any desired environment. Further, the aforementioned definitions may equally apply to the description below.

In one embodiment, the surface diagram 15-1008 provides a separate view (e.g. top down view, etc.) of surface diagram 15-1000 of FIG. 15-8A. Additionally, the description relating to FIG. 15-8A may be applied to FIG. 15-8B as well.

FIG. 15-9A illustrates a surface diagram 15-1100, in accordance with another embodiment. As an option, the surface diagram 15-1100 may be implemented in the context of the details of any of the Figures. Of course, however, the surface diagram 15-1100 may be implemented in any desired environment. Further, the aforementioned definitions may equally apply to the description below.

In one embodiment, surface diagram 15-1100 depicts a surface associated with Equation 3 for determining a mix value for two pixels, based on two pixel attributes for the two pixels. As described in Equation 3, variable "x" is associated with an attribute for a first (e.g. darker) pixel, and variable “y” is associated with an attribute for a second (e.g. lighter) pixel. The flat region 15-1114 may correspond in general character to flat region 15-1014 of FIG. 15-8A. Transition region 15-1110 may correspond in general character to transition region 15-1010. Saturation region 15-1112 may correspond in general character to saturation region 15-1012. While each region of surface diagram 15-1100 may correspond in general character to similar regions for surface diagram 15-1000, the size of corresponding regions may vary between surface diagram 15-1100 and surface diagram 15-1000. For example, the x threshold associated with surface diagram 15-1100 is larger than the x threshold associated with surface diagram 15-1000, leading to a generally smaller flat region 15-1114. As shown, the surface diagram 15-1100 may include a flat region 15-1114, a transition region 15-1110, and a saturation region 15-1112.

FIG. 15-9B illustrates a surface diagram 15-1102, in accordance with another embodiment. As an option, the surface diagram 15-1102 may be implemented in the context of the details of any of the Figures. Of course, however, the surface diagram 15-1102 may be implemented in any desired environment. Further, the aforementioned definitions may equally apply to the description below.

In one embodiment, the surface diagram 15-1102 provides a separate view (e.g. top down view, etc.) of surface diagram 15-1100 of FIG. 15-9A. Additionally, in various embodiments, the description relating to FIG. 15-9A and FIG. 15-8A may be applied to FIG. 15-9B as well.

FIG. 15-10 illustrates a levels mapping function 15-1200, in accordance with another embodiment. As an option, the levels mapping function 15-1200 may be implemented in the context of the details of any of the Figures. Of course, however, the levels mapping function 15-1200 may be carried out in any desired environment. Further, the aforementioned definitions may equally apply to the description below.

In various embodiments, the levels mapping function 15-1200 maps an input range 15-1210 to an output range 15-1220. More specifically, a white point 15-1216 may be mapped to a new white point in the output range 15-1220, a median point 15-1214 may be mapped to a new median point in the output range 15-1220, and a black point 15-1212 may be mapped to a new black point in the output range 15-1220. In one embodiment, the input range 15-1210 may be associated with an input image and the output range 15-1220 may be associated with a mapped image. In one embodiment, levels mapping may include an adjustment of intensity levels of an image based on a black point, a white point, a mid point, a median point, or any other arbitrary mapping function.

In certain embodiments, the white point, median point, black point, or any combination thereof, may be mapped based on an automatic detection of corresponding points or manually by a user. For example, in one embodiment, it may be determined that an object in the input image corresponds with a black point (or a white point, or a median point, etc.), such as through object recognition. For example, it may be determined that a logo is present in an image, and accordingly, set a color point (e.g. white, median, black, etc.) based off of an identified object. In other embodiments, the automatic settings may be associated with one or more settings associated with a camera device. For example, in some embodiments, the camera device may correct for a lens deficiency, a processor deficiency, and/or any other deficiency associated with the camera device by applying, at least in part, a set of one or more settings to the levels mapping.

FIG. 15-11 illustrates a levels mapping function 15-1300, in accordance with another embodiment. As an option, the levels mapping function 15-1300 may be implemented in the context of the details of any of the Figures. Of course, however, the levels mapping function 15-1300 may be carried out in any desired environment. Further, the aforementioned definitions may equally apply to the description below.

In one embodiment, a histogram 15-1302 may be associated with the input image of FIG. 15-10. In some embodiments, the histogram 15-1302 may include statistics for identifying a black point 15-1312 and a white point 15-1316. As indicated with respect to FIG. 12, the setting of the color points (e.g. black, white, etc.) may be based on user input (or another manual input, etc.) or on an automatic setting.

Based on the setting of a new black point and a new white point, a new mapped image may be created from the input image. The mapped image may be associated with a new histogram 15-1304. In one embodiment, after applying the new level mapping to the input image, the new level mapping (e.g. as visualized on the histogram, etc.) may be further modified as desired. For example, in one embodiment, a black point and white point may be automatically selected (e.g. based on optimized settings, etc.). After applying the black point and white point, the user may desire to further refine (or reset) the black point or white point. Of course, in such an embodiment, any color point may be set by the user.

In one embodiment, the white point (or any color point, etc.) may be controlled directly by a user. For example, a slider associated with a white point (or any color point, etc.) may directly control the white point of the pixel or image. In another embodiment, a slider associated with an image may control several settings, including an automatic adjustment to both black and white points (or any color point, etc.) to optimize the resulting pixel or image.

FIG. 15-12 illustrates an image synthesis operation 15-1400, in accordance with another embodiment. As an option, the image synthesis operation 15-1400 may be implemented in the context of the details of any of the Figures. Of course, however, the image synthesis operation 15-1400 may be carried out in any desired environment. Further, the aforementioned definitions may equally apply to the description below.

As shown, an image blend operation 15-1440 comprising the image synthesis operation 15-1400 may generate a synthetic image 15-1450 from an image stack 15-1402, according to one embodiment of the present invention. Additionally, in various embodiments, the image stack 15-1402 may include images 15-1410, 15-1412, and 15-1414 of a scene, which may comprise a high brightness region 15-1420 and a low brightness region 15-1422. In such an embodiment, medium exposure image 15-1412 is exposed according to overall scene brightness, thereby generally capturing scene detail.

In another embodiment, medium exposure image 15-1412 may also potentially capture some detail within high brightness region 15-1420 and some detail within low brightness region 15-1422. Additionally, dark exposure image 15-1410 may be exposed to capture image detail within high brightness region 15-1420. In one embodiment, in order to capture high brightness detail within the scene, image 15-1410 may be exposed according to an exposure offset from medium exposure image 15-1412.

In a separate embodiment, dark exposure image 15-1410 may be exposed according to local intensity conditions for one or more of the brightest regions in the scene. In such an embodiment, dark exposure image 15-1410 may be exposed according to high brightness region 15-1420, to the exclusion of other regions in the scene having lower overall brightness. Similarly, bright exposure image 15-1414 is exposed to capture image detail within low brightness region 15-1422. Additionally, in one embodiment, in order to capture low brightness detail within the scene, bright exposure image 15-1414 may be exposed according to an exposure offset from medium exposure image 15-1412. Alternatively, bright exposure image 15-1414 may be exposed according to local intensity conditions for one or more of the darkest regions of the scene.

As shown, in one embodiment, an image blend operation 15-1440 may generate synthetic image 15-1450 from image stack 15-1402. Additionally, in another embodiment, synthetic image 15-1450 may include overall image detail, as well as image detail from high brightness region 15-1420 and low brightness region 15-1422. Further, in another embodiment, image blend operation 15-1440 may implement any technically feasible operation for blending an image stack. For example, in one embodiment, any high dynamic range (HDR) blending technique may be implemented to perform image blend operation 15-1440, including but not limited to bilateral filtering, global range compression and blending, local range compression and blending, and/or any other technique which may blend the one or more images. In one embodiment, image blend operation 15-1440 includes a pixel blend operation 15-1442. The pixel blend operation 15-1442 may generate a pixel within synthetic image 15-1450 based on values for corresponding pixels received from at least two images of images 15-1410, 15-1412, and 15-1414. In one embodiment, pixel blend operation 15-1442 comprises pixel blend operation 15-702 of FIG. 15-5.

In one embodiment, in order to properly perform a blend operation, all of the images (e.g. dark exposure image, medium exposure image, bright exposure image, etc.) may need to be aligned so that visible detail in each image is positioned in the same location in each image. For example, feature 1425 in each image should be located in the same position for the purpose of blending the images 15-1410, 15-1412, 15-1414 to generate synthetic image 15-1450. In certain embodiments, at least two images of images 15-1410, 15-1412, 15-1414 are generated from a single analog image, as described in conjunction with method 15-900 of FIG. 15-7, thereby substantially eliminating any alignment processing needed prior to blending the images 15-1410, 15-1412, 15-1414.

FIG. 15-13 illustrates a user interface (UI) system 15-1500 for generating a combined image 15-1520, according to one embodiment. As an option, the UI system 15-1500 may be implemented in the context of the details of any of the Figures disclosed herein. Of course, however, the UI system 15-1500 may be carried out in any desired environment. Further, the aforementioned definitions may equally apply to the description below.

In one embodiment, a combined image 15-1520 comprises a combination of at least two related digital images. In one embodiment, the combined image 15-1520 comprises, without limitation, a combined rendering of a first digital image and a second digital image. In another embodiment, the digital images used to compute the combined image 15-1520 may be generated by amplifying an analog signal with at least two different gains, where the analog signal includes optical scene information captured based on an optical image focused on an image sensor. In yet another embodiment, the analog signal may be amplified using the at least two different gains on a pixel-by-pixel, line-by-line, or frame-by-frame basis.

In one embodiment, the UI system 15-1500 presents a display image 15-1510 that includes, without limitation, a combined image 15-1520, a slider control 15-1530 configured to move along track 15-1532, and two or more indication points 15-1540, which may each include a visual marker displayed within display image 15-1510.

In one embodiment, the UI system 15-1500 is generated by an adjustment tool executing within a processor complex 310 of a digital photographic system 300, and the display image 15-1510 is displayed on display unit 312. In one embodiment, at least two digital images, such as the at least two related digital images, comprise source images for generating the combined image 15-1520. The at least two digital images may reside within NV memory 316, volatile memory 318, memory subsystem 362, or any combination thereof. In another embodiment, the UI system 15-1500 is generated by an adjustment tool executing within a computer system, such as a laptop computer or a desktop computer. The at least two digital images may be transmitted to the computer system or may be generated by an attached camera device. In yet another embodiment, the UI system 15-1500 may be generated by a cloud-based server computer system, which may download the at least two digital images to a client browser, which may execute combining operations described below. In another embodiment, the UI system 15-1500 is generated by a cloud-based server computer system, which receives the at least two digital images from a digital photographic system in a mobile device, and which may execute the combining operations described below in conjunction with generating combined image 15-1520.

The slider control 15-1530 may be configured to move between two end points corresponding to indication points 15-1540-A and 15-1540-C. One or more indication points, such as indication point 15-1540-B may be positioned between the two end points. Each indication point 15-1540 may be associated with a specific version of combined image 15-1520, or a specific combination of the at least two digital images. For example, the indication point 15-1540-A may be associated with a first digital image generated utilizing a first gain, and the indication point 15-1540-C may be associated with a second digital image generated utilizing a second gain, where both of the first digital image and the second digital image are generated from a same analog signal of a single captured photographic scene. In one embodiment, when the slider control 15-1530 is positioned directly over the indication point 15-1540-A, only the first digital image may be displayed as the combined image 15-1520 in the display image 15-1510, and similarly when the slider control 15-1530 is positioned directly over the indication point 15-1540-C, only the second digital image may be displayed as the combined image 15-1520 in the display image 15-1510.

In one embodiment, indication point 15-1540-B may be associated with a blending of the first digital image and the second digital image. For example, when the slider control 15-1530 is positioned at the indication point 15-1540-B, the combined image 15-1520 may be a blend of the first digital image and the second digital image. In one embodiment, blending of the first digital image and the second digital image may comprise alpha blending, brightness blending, dynamic range blending, and/or tone mapping or other non-linear blending and mapping operations. In another embodiment, any blending of the first digital image and the second digital image may provide a new image that has a greater dynamic range or other visual characteristics that are different than either of the first image and the second image alone. Thus, a blending of the first digital image and the second digital image may provide a new computed HDR image that may be displayed as combined image 15-1520 or used to generate combined image 15-1520. To this end, a first digital signal and a second digital signal may be combined, resulting in at least a portion of a HDR image. Further, one of the first digital signal and the second digital signal may be further combined with at least a portion of another digital image or digital signal. In one embodiment, the other digital image may include another HDR image.

In one embodiment, when the slider control 15-1530 is positioned at the indication point 15-1540-A, the first digital image is displayed as the combined image 15-1520, and when the slider control 15-1530 is positioned at the indication point 15-1540-C, the second digital image is displayed as the combined image 15-1520; furthermore, when slider control 15-1530 is positioned at indication point 15-1540-B, a blended image is displayed as the combined image 15-1520. In such an embodiment, when the slider control 15-1530 is positioned between the indication point 15-1540-A and the indication point 15-1540-C, a mix (e.g. blend) weight may be calculated for the first digital image and the second digital image. For the first digital image, the mix weight may be calculated as having a value of 0.0 when the slider control 15-1530 is at indication point 15-1540-C and a value of 1.0 when slider control 15-1530 is at indication point 15-1540-A, with a range of mix weight values between 0.0 and 1.0 located between the indication points 15-1540-C and 1540-A, respectively. Referencing the mix operation instead to the second digital image, the mix weight may be calculated as having a value of 0.0 when the slider control 15-1530 is at indication point 15-1540-A and a value of 1.0 when slider control 15-1530 is at indication point 15-1540-C, with a range of mix weight values between 0.0 and 1.0 located between the indication points 15-1540-A and 15-1540-C, respectively.

A mix operation may be applied to the first digital image and the second digital image based upon at least one mix weight value associated with at least one of the first digital image and the second digital image. In one embodiment, a mix weight of 1.0 gives complete mix weight to the digital image associated with the 1.0 mix weight. In this way, a user may blend between the first digital image and the second digital image. To this end, a first digital signal and a second digital signal may be blended in response to user input. For example, sliding indicia may be displayed, and a first digital signal and a second digital signal may be blended in response to the sliding indicia being manipulated by a user.

This system of mix weights and mix operations provides a UI tool for viewing the first digital image, the second digital image, and a blended image as a gradual progression from the first digital image to the second digital image. In one embodiment, a user may save a combined image 15-1520 corresponding to an arbitrary position of the slider control 15-1530. The adjustment tool implementing the UI system 15-1500 may receive a command to save the combined image 15-1520 via any technically feasible gesture or technique. For example, the adjustment tool may be configured to save the combined image 15-1520 when a user gestures within the area occupied by combined image 15-1520. Alternatively, the adjustment tool may save the combined image 15-1520 when a user presses, but does not otherwise move the slider control 15-1530. In another implementation, the adjustment tool may save the combined image 15-1520 when a user gestures, such as by pressing a UI element (not shown), such as a save button, dedicated to receive a save command.

To this end, a slider control may be used to determine a contribution of two or more digital images to generate a final computed image, such as combined image 15-1520. Persons skilled in the art will recognize that the above system of mix weights and mix operations may be generalized to include two or more indication points, associated with two or more related images. Such related images may comprise, without limitation, any number of digital images that have been generated using a same analog signal to have different brightness values, which may have zero interframe time.

Furthermore, a different continuous position UI control, such as a rotating knob, may be implemented rather than the slider 15-1530 to provide mix weight input or color adjustment input from the user.

Of course, in other embodiments, other user interfaces may be used to receive input relating to selecting one or more points of interest (e.g. for focus, for metering, etc.), adjusting one or more parameters associated with the image (e.g. white balance, saturation, exposure, etc.), and/or any other input which may affect the image in some manner.

FIG. 15-14 is a flow diagram of method 15-1600 for generating a combined image, according to one embodiment. As an option, the method 15-1600 may be implemented in the context of the details of any of the Figures disclosed herein. Of course, however, the method 15-1600 may be carried out in any desired environment. Further, the aforementioned definitions may equally apply to the description below.

The method 15-1600 begins in step 15-1610, where an adjustment tool executing within a processor complex, such as processor complex 310, loads at least two related source images, such as the first digital image and the second digital image described in the context of FIG. 15-13. In step 15-1612, the adjustment tool initializes a position for a UI control, such as slider control 15-1530 of FIG. 15-13, to a default setting. In one embodiment, the default setting comprises an end point, such as indication point 15-1540-A, for a range of values for the UI control. In another embodiment, the default setting comprises a calculated value based on one or more of the at least two related source images. In certain embodiments, the default setting is initialized to a value previously selected by a user in association with an image object comprising at least the first digital image and the second digital image.

In step 15-1614, the adjustment tool generates and displays a combined image, such as combined image 15-1520 of FIG. 15-13, based on a position of the UI control and the at least two related source images. In one embodiment, generating the combined image comprises mixing the at least two related source images as described previously in FIG. 15-13. In step 15-1616, the adjustment tool receives user input. The user input may include, without limitation, a UI gesture such as a selection gesture or click gesture within display image 15-1510. If, in step 15-1620, the user input should change the position of the UI control, then the adjustment tool changes the position of the UI control and the method proceeds back to step 15-1614. Otherwise, the method proceeds to step 15-1630.

If, in step 15-1630, the user input does not comprise a command to exit, then the method proceeds to step 15-1640, where the adjustment tool performs a command associated with the user input. In one embodiment, the command comprises a save command and the adjustment tool then saves the combined image, which is generated according to a position of the UI control. The method then proceeds back to step 15-1616.

Returning to step 15-1630, if the user input comprises a command to exit, then the method terminates in step 15-1690, where the adjustment tool exits, thereby terminating execution.

In summary, a technique is disclosed for generating a new digital photograph that beneficially blends a first digital image and a second digital image, where the first digital image and the second digital image are both based on a single analog signal received from an image sensor. The first digital image may be blended with the second digital image based on a function that implements any technically feasible blend technique. An adjustment tool may implement a user interface technique that enables a user to select and save the new digital photograph from a gradation of parameters for combining related images.

One advantage of the disclosed embodiments is that a digital photograph may be selectively generated based on user input using two or more different exposures of a single capture of a photographic scene. Accordingly, the digital photograph generated based on the user input may have a greater dynamic range than any of the individual exposures. Further, the generation of an HDR image using two or more different exposures with zero interframe time allows for the rapid generation of HDR images without motion artifacts.

Figures 15, 15A:
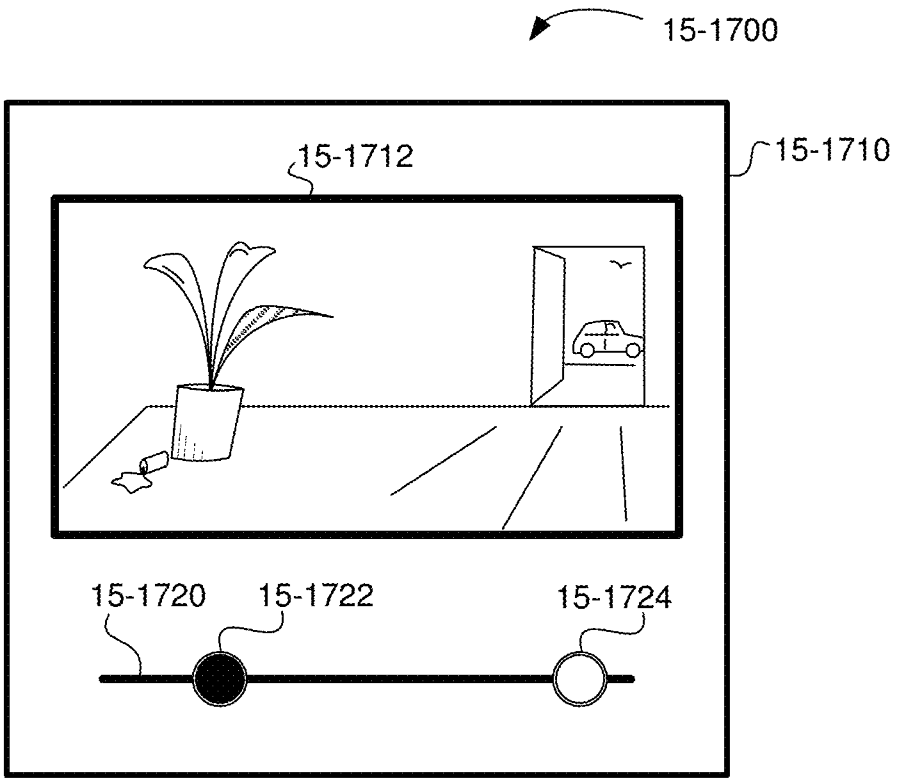

FIG. 15-15A illustrates a user interface (UI) system 15-1700 for adjusting a white point and a black point, in accordance with another embodiment. As an option, the UI system 15-1700 may be implemented in the context of the details of any of the Figures. Of course, however, the UI system 15-1700 may be carried out in any desired environment. Further, the aforementioned definitions may equally apply to the description below.

As shown, in one embodiment, a slider bar 15-1720 may include a black point slider 15-1722 and a white point slider 15-1724. In various embodiments, the white point slider and the black point slider may be adjusted as desired by the user. Additionally, in another embodiment, the white point slider and the black point may be automatically adjusted. For example, in one embodiment, the black point slider may correspond with a darkest detected point in the image. Additionally, in one embodiment, the white point slider may correspond with the brightest detected point in the image. In one embodiment, the black point slider and the white point slider may each determine a corresponding black point and white point for remapping an input image to generate a resulting image 15-1712, such as through levels mapping function 15-1200 of FIG. 15-10. In other embodiments, the black point slider and the white point slider may bend or reshape a levels mapping curve that maps input range 15-1210 to output range 15-1220. As shown, the resulting image 15-1712, the slider bar 15-1720, and the sliders 15-1722, 1724 may be rendered within an application window 15-1710.

In some embodiments, the white point and the black point may be based on a histogram. For example, in one embodiment, the white point and black point may reflect high and low percentage thresholds associated with the histogram.

In one embodiment, a user may move the white point slider and the black point slider back and forth independently to adjust the black point and white point of the resulting image 15-1712. In another embodiment, touching the black point slider 15-1722 may allow the user to drag and drop the black point on a specific point on the image. In like manner, touching the white point slider 15-1724 may allow the user to drag and drop the white point on a specific point on the image. Of course, in other embodiments, the user may interact with the white point and the black point (or any other point) in any manner such that the user may select and/or adjust the white point and the black point (or any other point).

Figures 15, 15B:
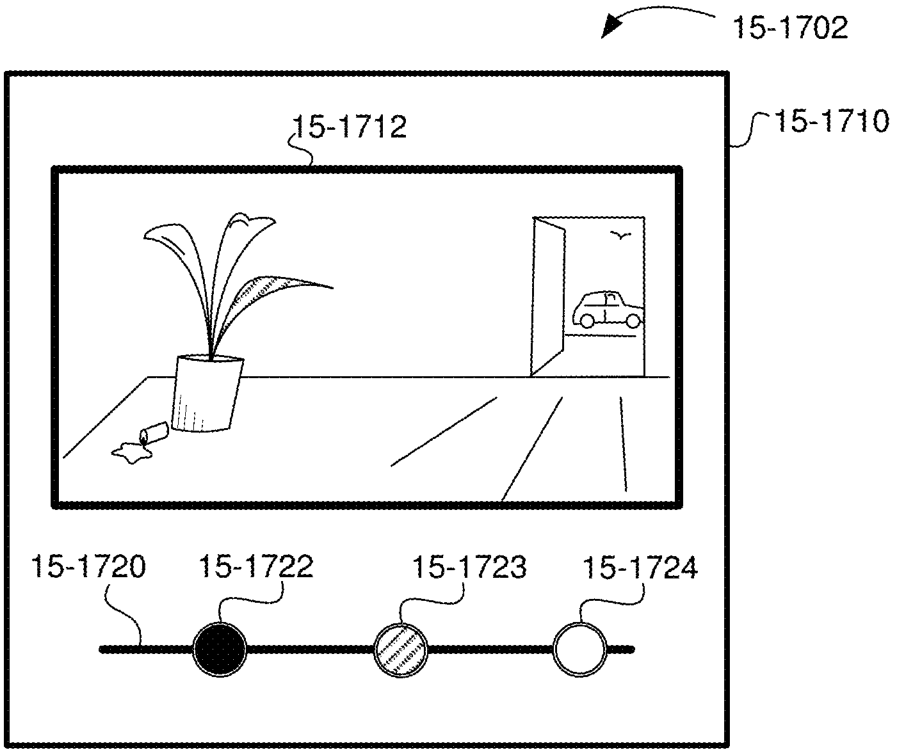

FIG. 15-15B illustrates a user interface (UI) system 15-1702 for adjusting a white point, median point, and a black point, in accordance with another embodiment. As an option, the UI system 15-1702 may be implemented in the context of the details of any of the Figures. Of course, however, the UI system 15-1702 may be carried out in any desired environment. Further, the aforementioned definitions may equally apply to the description below.

As shown, in one embodiment, a slider bar 15-1720 may include a white point slider 15-1722, a median point slider 15-1723, and a white point slider 15-1724. In one embodiment, UI system 15-1702 is configured to operate substantially identically to UI system 15-1700, with the addition of median point slider 15-1723 and corresponding median point levels adjustment within an associated levels adjustment function. The median point may be adjusted manually by the user by moving the median point slider 15-1723 or automatically based on, for example, information within an input image.

Still yet, in various embodiments, one or more of the techniques disclosed herein may be applied to a variety of markets and/or products. For example, although the techniques have been disclosed in reference to a still photo capture, they may be applied to televisions, video capture, web conferencing (or live streaming capabilities, etc.), security cameras (e.g. increase contrast to determine characteristic, etc.), automobiles (e.g. driver assist systems, in-car infotainment systems, etc.), and/or any other product which includes a camera input.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

While the foregoing is directed to embodiments of the present invention, other and further embodiments of the invention may be devised without departing from the basic scope thereof, and the scope thereof is determined by the claims that follow.

What is claimed is:

1. An apparatus, comprising:

an image sensor including a plurality of cells including: a first cell having a first photodiode generating a first analog signal, and a second cell having a second photodiode generating a second analog signal, for being utilized to generate at least a portion of one or more line analog signals that correspond to a line of cells of the image sensor;

a line in communication with the plurality of cells, the line communicating the one or more line analog signals;

a first analog-to-digital channel in communication with the line, the first analog-to-digital channel capable of receiving at least one of the one or more line analog signals for conversion thereof to a first line digital signal;

a second analog-to-digital channel in communication with the line, the second analog-to-digital channel capable of receiving at least one of the one or more line analog signals for conversion thereof to a second line digital signal; and circuitry in communication with the first analog-to-digital channel and the second analog-to-digital channel, the circuitry capable of receiving at least one of the first line digital signal or the second line digital signal, for image generation;

wherein the apparatus is configured such that a first gain and a second gain are capable of being applied before the image generation;

wherein the apparatus is configured such that different adjacent cells of the image sensor correspond with a same color of light, and are subject to:

for a first image, a first sampling for which one or more analog signals generated by each of the different adjacent cells corresponding with the same color of light is sampled and combined before being utilized to generate at least a portion of at least one first line analog signal that corresponds to a line associated with the different adjacent cells of the image sensor, and for a second image, a second sampling for which one or more analog signals generated by at least a subset of the different adjacent cells corresponding with the same color of light is sampled without being combined with any analog signal generated by any other of the different adjacent cells corresponding with the same color of light before being utilized to generate at least a portion of at least one second line analog signal that corresponds to the line associated with the different adjacent cells of the image sensor.

2. The apparatus of claim 1, wherein the apparatus is configured such that: the first and second cells correspond with a first row and the line includes a first column line; the plurality of cells further include a third cell having a third photodiode generating a third analog signal, and a fourth cell having a fourth photodiode generating a fourth analog signal, where the third cell and the fourth cell of the image sensor correspond with the same color of light, and the third and fourth cells are part of a second row and are in communication with the first column line; the plurality of cells further include a fifth cell having a fifth photodiode generating a fifth analog signal, and a sixth cell having a sixth photodiode generating a sixth analog signal, where the fifth cell and the sixth cell of the image sensor correspond with the same color of light, and the fifth and sixth cells are part of the first row and are in communication with a second column line; the plurality of cells further include a seventh cell having a seventh photodiode generating a seventh analog signal, and an eighth cell having an eighth photodiode generating a eighth analog signal, where the seventh cell and the eighth cell of the image sensor correspond with the same color of light, and the seventh and eighth cells are part of the second row and are in communication with the second column line;

for a third image, a third sampling is performed for which: the first analog signal and the second analog signal generated by the first and second cells are combined to form a first row/first column combined signal, and the third analog signal and the fourth analog signal generated by the third and fourth cells are combined to form a second row/first column combined signal, such that: during a first time period: a first gain is applied to the first row/first column combined signal to generate and communicate to the first column line a first-gain amplified first row/first column signal, and the first gain is applied to the second row/first column combined signal to generate and communicate to the first column line a first-gain amplified second row/first column signal that is combined with the first-gain amplified first row/first column signal, to generate a first-gain amplified combined first column signal; during a second time period, after the first time period: a second gain is applied to the first row/first column combined signal to generate and communicate to the first column line a second-gain amplified first row/first column signal, and the second gain is applied to the second row/first column combined signal to generate and communicate to the first column line a second-gain amplified second row/first column signal that is combined with the second-gain amplified first row/first column signal, to generate a second-gain amplified combined first column signal; the fifth analog signal and the sixth analog signal generated by the fifth and sixth cells are combined to form a first row/second column combined signal, and the seventh analog signal and the eighth analog signal generated by the seventh and eighth cells are combined to form a second row/second column combined signal, such that: during the first time period: the first gain is applied to the first row/second column combined signal to generate and communicate to the second column line a first-gain amplified first row/second column signal, and the first gain is applied to the second row/second column combined signal to generate and communicate to the second column line a first-gain amplified second row/second column signal that is combined with the first-gain amplified first row/second column signal, to generate a first-gain amplified combined second column signal that is combined with the first-gain amplified combined first column signal, before analog-to-digital conversion; during the second time period: the second gain is applied to the first row/second column combined signal to generate and communicate to the second column line a second-gain amplified first row/second column signal, and the second gain is applied to the second row/second column combined signal to generate and communicate to the second column line a second-gain amplified second row/second column signal that is combined with the second-gain amplified first row/second column signal, to generate a second-gain amplified combined second column signal that is combined with the second-gain amplified combined first column signal, before analog-to-digital conversion.

3. The apparatus of claim 2, wherein the apparatus is configured such that different combinations of one or more of at least four gains including a first gain, the second gain, a third gain, and a fourth gain, are applied for the first image, the second image, and the third image.

4. The apparatus of claim 3, wherein the apparatus is configured such that the different combinations include: a first combination including: the first gain and the second gain applied in serial before corresponding column line read outs to at least one of the first analog-to-digital channel or the second analog-to-digital channel, and a second combination including: the first gain applied without the second gain being applied before a corresponding column line read out to at least one of the first analog-to-digital channel or the second analog-to-digital channel, and a third gain and a fourth gain applied in parallel after the corresponding column line read out to at least one of the first analog-to-digital channel or the second analog-to-digital channel.

5. The apparatus of claim 1, wherein the apparatus is configured such that:

for the first image, no line analog signals, that are communicated at readout via different column lines in communication with different groups of cells, are combined before analog-to-digital conversion thereof; and for a third image, at least two line analog signals, that are communicated at readout via the different column lines in communication with the different groups of cells, are combined before analog-to-digital conversion thereof.

6. The apparatus of claim 1, wherein the apparatus is configured such that the image sensor further includes other different adjacent cells that correspond with the same color of light, for being utilized to generate at least a portion of another one or more line analog signals that correspond to another line associated with the other different adjacent cells of the image sensor, such that, for a third image, a third sampling is performed for which:

one or more analog signals generated by each of the different adjacent cells and each of additional different adjacent cells also corresponding with the same color of light is sampled and combined to generate at least a portion of at least one third line analog signal that corresponds to the line associated with the different adjacent cells;

one or more analog signals generated by each of the other different adjacent cells corresponding with the same color of light is sampled and combined to generate at least a portion of at least one fourth line analog signal that corresponds to the another line associated with the other different adjacent cells; and the at least portion of the at least one third line analog signal is combined with the at least portion of the at least one fourth line analog signal, before analog-to-digital conversion thereof.

7. The apparatus of claim 6, wherein the apparatus is configured such that the different adjacent cells include a first number of cells, the different adjacent cells and additional different adjacent cells collectively include a second number of cells that is twice the first number of cells, and the other different adjacent cells include the second number of cells.

8. The apparatus of claim 7, wherein the apparatus is configured such that the first number of cells includes at least four (4) cells, and second number of cells includes at least eight (8) cells.

9. The apparatus of claim 6, wherein the apparatus is configured such that, for the first image, no line analog signals, that are communicated at readout via different column lines in communication with different groups of cells associated with different columns, are combined before analog-to-digital conversion thereof.

10. The apparatus of claim 1, wherein the apparatus is configured to generate a first HDR image utilizing the image sensor, and further comprising another image sensor that is utilized to generate an associated image, such that at least a portion of the first HDR image is combined with at least a portion of the associated image, for generating a resulting image that is displayed.

11. The apparatus of claim 1, wherein the apparatus is configured such that, for a third image:

a third sampling is performed for which one or more analog signals generated by each of the different adjacent cells of a first pixel corresponding with the same color of light is combined with analog signals generated by each of other different adjacent cells of a second pixel corresponding with the same color of light, before digital conversion thereof.

12. The apparatus of claim 1, wherein the apparatus is configured such that, for a third image:

a third sampling is performed for which one or more analog signals that is generated by each of the different adjacent cells of a first pixel corresponding with the same color of light and that is communicated via the line associated with the different adjacent pixels, is combined with one or more analog signals that is generated by each of other different adjacent cells of a second pixel corresponding with the same color of light and that is communicated via the line associated with the different adjacent pixels, before digital conversion thereof.

13. The apparatus of claim 1, wherein the apparatus is configured such that, for a third image:

a third sampling is performed for which one or more analog signals that is generated by each of the different adjacent cells corresponding with the same color of light and that is communicated via the line associated with the different adjacent cells, is combined with one or more analog signals that is generated by each of other different adjacent cells corresponding with the same color of light and that is communicated via another line associated with the other different adjacent cells, before digital conversion thereof.

14. The apparatus of claim 1, wherein the apparatus is configured such that, for a third image:

a third sampling is performed for which one or more analog signals generated by each of the different adjacent cells corresponding with the same color of light is sampled and combined before being utilized to generate at least a portion of at least one third line analog signal that corresponds to the line associated with the different adjacent cells of the image sensor, where the at least portion of the at least one third line analog signal that corresponds to the line associated with the different adjacent cells of the image sensor, is combined with at least a portion of at least one fourth line analog signal that corresponds to another line associated with other cells other than the different adjacent cells, before digital conversion thereof.

15. The apparatus of claim 14, wherein the apparatus is configured such that:

the first image is generated when the image sensor is operating in a first mode, and the first image exhibits a first sensitivity and a first resolution, the second image is generated when the image sensor is operating in a second mode, and the second image exhibits a second sensitivity that is less than the first sensitivity and a second resolution that is greater than the first resolution, and the third image is generated when the image sensor is operating in a third mode, and the third image exhibits a third sensitivity that is greater than the first sensitivity and a third resolution that is less than the first resolution.

16. The apparatus of claim 15, wherein the apparatus is configured such that different combinations of one or more of at least four gains including the first gain, the second gain, a third gain, and a fourth gain, are applied for the first mode and the third mode.

17. The apparatus of claim 15, wherein the apparatus is configured such that different combinations of one or more of at least four gains including the first gain, the second gain, a third gain, and a fourth gain, are applied for the first mode, the second mode, and the third mode.

18. The apparatus of claim 15, wherein the image sensor is configured such that the second resolution is four (4) times the first resolution, the second resolution is eight (8) times the third resolution, the first sensitivity is four (4) times the second sensitivity, and the third sensitivity is eight (8) times the second sensitivity.

19. The apparatus of claim 15, wherein the apparatus is configured such that at least one of:

the image sensor includes a sensor that generates images based on sensed light;

the image sensor converts optical scene information to an electronic representation of a photographic scene;

the image sensor includes only the plurality of cells;

the image sensor includes the plurality of cells, in addition to other componentry;

the image sensor includes the plurality of cells, in addition to other componentry including the line;

the line in communication with the plurality of cells is one of a plurality of lines each in communication with a corresponding plurality of cells;

the line in communication with the plurality of cells is one of a plurality of columns;

the line in communication with the plurality of cells is one of a plurality of rows;

multiple of the cells correspond with a single pixel;

each cell corresponds with a pixel, by analog signals generated thereby being used to generate pixel data used to display the pixel;

the first analog signal, the second analog signal, the one or more line analog signals, the first line digital signal, and the second line digital signal, are classes or types of signals that are generated for each image;

the first analog signal, the second analog signal, the one or more line analog signals, the first line digital signal, and the second line digital signal, are generated for each of the first image, the second image, and the third image;

the first photodiode generating the first analog signal, by being an only photodiode that generates the first analog signal;

the first photodiode generating the first analog signal, by not being an only photodiode that generates the first analog signal;

the first photodiode generating the first analog signal, by the first photodiode providing at least one signal that is utilized in generating the first analog signal;

the first photodiode generating the first analog signal, by the first photodiode providing at least one signal that is combined with at least one other signal for generating the first analog signal;

the second photodiode generating the second analog signal, by being an only photodiode that generates the second analog signal;

the second photodiode generating the second analog signal, by not being an only photodiode that generates the second analog signal;

the second photodiode generating the second analog signal, by the second photodiode providing at least one signal that is utilized in generating the second analog signal;

the second photodiode generating the second analog signal, by the second photodiode providing at least one signal that is combined with at least one other signal for generating the second analog signal;

the first analog signal is generated by the first photodiode without being generated by any other photodiode;

the first analog signal is generated by the first photodiode and at least one other photodiode;

the second analog signal is generated by the second photodiode without being generated by any other photodiode;

the second analog signal is generated by the second photodiode and at least one other photodiode;

at least one of the first gain or the second gain is applied to the first analog signal;

at least one of the first gain or the second gain is not applied to the first analog signal;

at least one of the first gain or the second gain is applied to the second analog signal;

at least one of the first gain or the second gain is not applied to the second analog signal;

in communication with, includes constant communication;

in communication with, includes intermittent communication;

in communication with, includes fixed communication;

in communication with, includes selective communication;

in communication with, includes in direct communication;

in communication, includes in direct communication, with no intermediate circuit components therebetween;

in communication with, includes in indirect communication;

in communication, includes in indirect communication, with at least one intermediate circuit component therebetween;

in communication, includes in indirect communication, with at least one switch therebetween;

each cell of the plurality of cells includes a site of a corresponding photodiode;

each cell of the plurality of cells includes a photosite;

each cell of the plurality of cells corresponds with a single pixel;

the first cell is used to generate a first pixel and the second cell is used to generate a second pixel;

the first cell and the second cell are used to generate a same pixel;

the first cell is part of a first pixel and the second cell is part of a second pixel;

the first cell and the second cell are part of a same pixel;

the first analog signal is generated before the second analog signal;

the first analog signal is generated after the second analog signal;

the first analog signal is generated at the same time as the second analog signal;

the first analog-to-digital channel is a channel by including a plurality of inter-coupled components;

the second analog-to-digital channel is a channel by including a plurality of inter-coupled components;

the first analog-to-digital channel is a channel by including a plurality of sequentially-coupled components;

the second analog-to-digital channel is a channel by including a plurality of sequentially-coupled components;

the apparatus includes a single package with the image sensor, the line, the first analog-to-digital channel, the first analog-to-digital channel, and the circuitry packaged therein;

the apparatus includes a non-transitory computer-readable media storing instructions that, when executed by one or more circuits of the apparatus, cause the apparatus to operate;

the apparatus includes a non-transitory computer-readable media storing instructions that, when executed by one or more circuits of the apparatus, cause the apparatus to operate, where the one or more circuits include at least one processor, and the instructions include software instructions;

the apparatus includes a non-transitory computer-readable media storing instructions that, when executed by one or more circuits of the apparatus, cause the apparatus to operate;

the apparatus includes a non-transitory computer-readable media storing instructions that, when executed by one or more circuits of the apparatus, cause the apparatus to operate, where the one or more circuits include at least one processor, and the instructions include image sensor instructions;

the apparatus includes a non-transitory computer-readable media storing instructions that, when executed by one or more circuits of the apparatus, cause the apparatus to operate;

the apparatus includes a non-transitory computer-readable media storing instructions that, when executed by one or more circuits of the apparatus, cause the apparatus to operate, where the one or more circuits include at least one processor, and the instructions include operating-system-related instructions;

the apparatus includes a non-transitory computer-readable media storing instructions that, when executed by one or more circuits of the apparatus, cause the apparatus to operate;

the apparatus includes a non-transitory computer-readable media storing instructions that, when executed by one or more circuits of the apparatus, cause the apparatus to operate, where the one or more circuits include at least one processor, and the instructions do not include software instructions;

the apparatus includes a non-transitory computer-readable media storing instructions that, when executed by one or more circuits of the apparatus, cause the apparatus to operate, where the one or more circuits include at least one processor, and the instructions include firmware instructions;

where the one or more circuits include at least one processor, and the instructions include instructions that are stored in persistent memory;

where the one or more circuits include at least one processor, and the instructions include instructions that are stored in non-volatile memory;

where the one or more circuits include at least one processor, and the instructions include instructions that are read-only;

the apparatus includes a non-transitory computer-readable media storing instructions that, when executed by one or more circuits of the apparatus, cause the apparatus to operate, where the one or more circuits include at least one processor, and the instructions include hardwired instructions;

the apparatus does not include a phone;

the apparatus does not include a fully-completed camera;

the apparatus does not include a fully-operating camera;

the apparatus includes only the image sensor, the line, the first and second analog-to-digital channel and the circuitry;

the at least portion of the one or more line analog signals includes a portion of the one or more line analog signals corresponding to a subset of cells in communication with the line;

the at least portion of the one or more line analog signals includes only a portion of the one or more line analog signals corresponding to a subset of cells in communication with the line;

the at least portion of the one or more line analog signals corresponds to only a subset of cells in communication with the line;

the one or more line analog signals are line analog signals by virtue of being communicated via the line;

the one or more line analog signals are line analog signals by virtue of including cell-specific signals communicated via the line;

the one or more line analog signals are line analog signals by virtue of corresponding to the line of cells;

the one or more line analog signals are line analog signals by virtue of corresponding to at least a subset of the line of cells;

the first line digital signal is a line digital signal by virtue of being communicated via the line;

the first line digital signal is a line digital signal by virtue of corresponding to the line of cells;

the first line digital signal corresponds to at least a subset of the line of cells;

the first line digital signal corresponds to only a subset of the line of cells;

the first line digital signal corresponds to only a subset of cells in communication with the line;

the first line digital signal corresponds to a subset of cells in communication with the line;

the first line digital signal corresponds to the plurality cells;

the first line digital signal is one of a plurality of first line digital signals corresponding to cells in communication with the line;

the first analog-to-digital channel is capable of receiving the at least one of the one or more line analog signals for conversion thereof to the first line digital signal, such that the first line digital signal is capable of being based on the first gain, so as to allow the first analog-to-digital channel to not receive the at least one of the one or more line analog signals;

the first analog-to-digital channel is capable of receiving the at least one of the one or more line analog signals for conversion thereof to the first line digital signal, such that the first line digital signal is capable of being based on the first gain, so as to allow the first analog-to-digital channel to receive the at least one of the one or more line analog signals, but without the conversion thereof;

the first analog-to-digital channel is capable of receiving the at least one of the one or more line analog signals for conversion thereof to the first line digital signal, such that the first line digital signal is capable of being based on the first gain, so as to allow the first analog-to-digital channel to receive the at least one of the one or more line analog signals for the conversion to the first line digital signal without being based on the first gain;

the first analog-to-digital channel is capable of receiving the at least one of the one or more line analog signals for conversion thereof to the first line digital signal, such that the first line digital signal is capable of being based on the first gain, so as to allow the first analog-to-digital channel to receive the at least one of the one or more line analog signals for the conversion to the first line digital signal, without the first line digital signal being used for image generation;

at least one of the first analog signal or the second analog signal is utilized to generate the at least portion of the one or more line analog signals, by being included in the at least portion of the one or more line analog signals;

at least one of the first analog signal or the second analog signal is utilized to generate the at least portion of the one or more line analog signals, by being processed and then included in the at least portion of the one or more line analog signals;

at least one of the first analog signal or the second analog signal is utilized to generate the at least portion of the one or more line analog signals, by being assembled with other analog signals in the at least portion of the one or more line analog signals;

the line is part of the image sensor;

the line is not part of the image sensor;

the first analog-to-digital channel, the second analog-to-digital channel, and the circuitry are part of the image sensor;

the first analog-to-digital channel, the second analog-to-digital channel, and the circuitry are not part of the image sensor;

the line communicates the one or more line analog signals, separately;

the line communicates the one or more line analog signals, together;

the image sensor is integrated with at least one of the line, the first analog-to-digital channel, the second analog-to-digital channel, and the circuitry;

the image sensor is not integrated with at least one of the line, the first analog-to-digital channel, the second analog-to-digital channel, and the circuitry;

the image sensor is integrated, on a same semiconductor platform, with at least one of the line, the first analog-to-digital channel, the second analog-to-digital channel, and the circuitry;

the image sensor is not integrated, on a same semiconductor platform, with at least one of the line, the first analog-to-digital channel, the second analog-to-digital channel, and the circuitry;

the image sensor is packaged with at least one of the line, the first analog-to-digital channel, the second analog-to-digital channel, and the circuitry;

the image sensor is not packaged with at least one of the line, the first analog-to-digital channel, the second analog-to-digital channel, and the circuitry;

the line includes a column line;

the line includes a wire that communicates the one or more line analog signals;

the line includes a wire that communicates the one or more line analog signals that represents pixel data for a column of pixels;

the line includes a row line;

the line includes a wire that communicates the one or more line analog signals;

the line includes a wire that communicates the one or more line analog signals that represents pixel data for a column of pixels;

the first analog-to-digital channel includes an amplifier;

the first analog-to-digital channel includes amplifying circuitry;

the first analog-to-digital channel includes an amplifier for applying the first gain;

the first analog-to-digital channel includes an amplifying circuit for applying the first gain;

the first analog-to-digital channel includes an analog-to-digital converter;

the first analog-to-digital channel includes analog-to-digital converting circuitry;

the first analog-to-digital channel includes distinct amplifying circuitry and analog-to-digital converting circuitry;

the first analog-to-digital channel is capable of receiving the at least one of the one or more line analog signals, via a switch that provides communication between the line and the first analog-to-digital channel;

the first analog-to-digital channel is capable of selectively receiving the at least one of the one or more line analog signals, via a switch that provides communication between the line and the first analog-to-digital channel;

the at least one of the one or more line analog signals that is received by the first analog-to-digital channel, is the same as the at least one of the one or more line analog signals that is received by the second analog-to-digital channel;

the at least one of the one or more line analog signals that is received by the first analog-to-digital channel, is the same as the at least one of the one or more line analog signals that is received by the second analog-to-digital channel, but received at different times;

the at least one of the one or more line analog signals that is received by the first analog-to-digital channel, is different from the at least one of the one or more line analog signals that is received by the second analog-to-digital channel;

the at least one of the one or more line analog signals that is received by the first analog-to-digital channel, is different from the at least one of the one or more line analog signals that is received by the second analog-to-digital channel, and received at different times;

the at least one of the one or more line analog signals capable of being received by the first analog-to-digital channel is capable of being the same as the at least one of the one or more line analog signals capable of being received by the second analog-to-digital channel;

the at least one of the one or more line analog signals capable of being received by the first analog-to-digital channel is capable of being different than the at least one of the one or more line analog signals capable of being received by the second analog-to-digital channel;

the at least one of the one or more line analog signals is capable of being received by the first analog-to-digital channel, as well as being capable of not being received by the first analog-to-digital channel;

the at least one of the one or more line analog signals is capable of being received by the second analog-to-digital channel, as well as being capable of not being received by the second analog-to-digital channel;
the first analog-to-digital channel and the second analog-to-digital channel share a single variable amplifier;
the first analog-to-digital channel and the second analog-to-digital channel each include separate analog-to-digital circuits;
the second analog-to-digital channel includes an amplifier;
the second analog-to-digital channel includes amplifying circuitry;
the second analog-to-digital channel includes an amplifier for applying the second gain;
the second analog-to-digital channel includes an amplifying circuit for applying the second gain;
the second analog-to-digital channel includes an analog-to-digital converter;
the second analog-to-digital channel includes analog-to-digital converting circuitry;
the second analog-to-digital channel includes distinct amplifying circuitry and analog-to-digital converting circuitry;
the first analog-to-digital channel and the second analog-to-digital channel are part of a same circuit;
the first analog-to-digital channel and the second analog-to-digital channel are not part of a same circuit;
the apparatus includes a third analog-to-digital channel;
the circuitry is capable of receiving only one of the first line digital signal or the second line digital signal, before the image generation;
the circuitry is capable of receiving both the first line digital signal and the second line digital signal, before the image generation;
the circuitry is capable of receiving both the first line digital signal and the second line digital signal, in sequence, before the image generation;
the circuitry is capable of receiving both the first line digital signal and the second line digital signal, concurrently, before the image generation;
the at least portion of the first image includes a line of the first image;
the different adjacent cells are laterally adjacent;
the different adjacent cells are diagonally adjacent;
the different adjacent cells are longitudinally adjacent;
the first cell has only the first photodiode;
the first cell has the first photodiode, in addition to at least one other photodiode;
the second cell has only the second photodiode;
the second cell has second first photodiode, in addition to at least one other photodiode;
the first cell and the second cell have a same number of photodiodes;
the first cell and the second cell have a different number of photodiodes;
the first photodiode includes a single photodiode;
the first photodiode is one of a plurality of photodiodes of the first cell;
the first photodiode is utilized to charge a capacitor;
the first photodiode is utilized to charge a capacitive element;
the first photodiode includes a capacitor;
the first photodiode includes a capacitive element;
the first photodiode is not utilized to charge a capacitor;
the first photodiode is not utilized to charge a capacitive element;
the first photodiode does not include a capacitor;
the first photodiode does not include a capacitive element;

the first analog signal and the second analog signal are capable of being amplified with the first gain, the second gain, or both the first gain and the second gain before the image generation;
both the first analog signal and the second analog signal are amplified with the first gain, before the image generation;
only one of the first analog signal or the second analog signal is amplified with the first gain, before the image generation;
both the first analog signal and the second analog signal are amplified with only the first gain, before the image generation;
only one of the first analog signal or the second analog signal is amplified with only the first gain, before the image generation;
both the first analog signal and the second analog signal are amplified with the second gain, before the image generation;
only one of the first analog signal or the second analog signal is amplified with the second gain, before the image generation;
both the first analog signal and the second analog signal are amplified with only the second gain, before the image generation;
only one of the first analog signal or the second analog signal is amplified with only the second gain, before the image generation;
both the first analog signal and the second analog signal are amplified with both the first gain and the second gain, before the image generation;
only one of the first analog signal or the second analog signal is amplified with both the first gain and the second gain, before the image generation;
the first analog signal and the second analog signal are amplified with a same at least one gains;
the first analog signal and the second analog signal are amplified with different gains;
the first line digital signal is converted based on the first gain;
the first line digital signal is converted without being based on the first gain;
the at least portion of the first image is generated based on the first gain, and without being based on the second gain, the first gain, and the second gain;
the at least portion of the first image is generated based on the first gain and the second gain, and without being based on the first gain and the second gain;
the at least portion of the first image is generated based on the first gain, the second gain, and the first gain, and without being based on the second gain;
the at least portion of the first image is generated based on the first gain, the second gain, the first gain, and the second gain;
the at least portion of the first image and at least a portion of a second image are generated based on different gains;
at least one of the first analog signal or the second analog signal is capable of being amplified with at least one of the first gain or the second gain, utilizing a plurality of fixed gain circuits that are selected for the at least one of the first analog signal or the second analog signal;
at least one of the first analog signal or the second analog signal is capable of being amplified with at least one of the first gain or the second gain, utilizing a single variable gain circuit that applies different gains based on receipt of different control signals, for the at least one of the first analog signal or the second analog signal;

at least one of the first analog signal or the second analog signal is capable of being amplified with at least one of the first gain or the second gain, utilizing digital gain values;

at least one of the first analog signal or the second analog signal is capable of being amplified with at least one of the first gain or the second gain, utilizing digital gain values received for control purposes;

at least one of the first analog signal or the second analog signal is capable of being amplified with at least one of the first gain or the second gain, utilizing digital gain values mapped from received ISO values;

at least one of the first analog signal or the second analog signal is capable of being amplified with at least one of the first gain or the second gain, by being capable of: amplifying at least one analog signal in a first scenario with only the first gain, amplifying at least one analog signal in a second scenario with only the second gain, amplifying at least one analog signal in a third scenario with both the first gain and the second gain;

at least one of the first analog signal or the second analog signal is capable of being amplified with at least one of the first gain or the second gain, by both of the first analog signal and the second analog signal being capable of being amplified with at least one of the first gain or the second gain;

at least one of the first analog signal or the second analog signal is capable of being amplified with at least one of the first gain or the second gain, by being capable of: amplifying at least one analog signal with both the first gain and the second gain simultaneously;

at least one of the first analog signal or the second analog signal is capable of being amplified with at least one of the first gain or the second gain, by being capable of: amplifying at least one analog signal with both the first gain and the second gain in parallel;

at least one of the first analog signal or the second analog signal is capable of being amplified with at least one of the first gain or the second gain, by being capable of: amplifying at least one analog signal with both the first gain and the second gain separately;

at least one of the first analog signal or the second analog signal is capable of being amplified with at least one of the first gain or the second gain, by being capable of: amplifying at least one analog signal with both the first gain and the second gain in sequence;

at least one of the first analog signal or the second analog signal is capable of being amplified with at least one of the first gain or the second gain, by the at least one of the first analog signal or the second analog signal being initially amplified with the first gain, and the at least one of the first analog signal or the second analog signal being subsequently amplified with the second gain;

the first gain and the second gain are applied utilizing a single first amplifier, and the first gain and the second gain are applied utilizing a single second amplifier;

the first gain and the second gain are applied utilizing one or more first amplifiers, and the first gain and the second gain are applied utilizing one or more second amplifiers;

the first gain and the second gain are applied utilizing one or more first amplifiers, and the first gain and the second gain are applied utilizing the one or more first amplifiers;

the first gain and the second gain are each a pixel-by-pixel gain;

the first gain and the second gain are each a cell-by-cell gain;

the first gain and the second gain are each applied by a per-cell amplifier;

the first gain and the second gain are each a pixel-by-pixel gain that is applied by a per-cell amplifier;

the first gain and the second gain are each a line-by-line gain;

only one of the first gain or the second gain is a pixel-by-pixel gain;

only one of the first gain or the second gain is a line-by-line gain;

the first gain is a pixel-by-pixel gain, and the second gain is a line-by-line gain;

the different adjacent cells are adjacent to each other;

the line of cells of the image sensor, include a row of the cells;

the line of cells of the image sensor, include a double row of the cells;

the line of cells of the image sensor, include a column of the cells;

the line of cells of the image sensor, include a double column of the cells;

the line of cells of the image sensor include a set of cells capable of communicating via the line;

the line of cells of the image sensor, include a plurality of groups of cells that are capable of communicating via the line;

the line of cells of the image sensor, include a line of a plurality of laterally-spaced cell pairs;

the line of cells of the image sensor, include a line of a plurality of laterally-spaced cell groups;

the line of cells of the image sensor, include a plurality of groups of cells that are capable of communicating via the line, and at least one of the groups includes the plurality of cells;

the line of cells of the image sensor, include a plurality of groups of cells that are capable of communicating via the line, with each group of cells being associated with the same color;

the line of cells of the image sensor, include a plurality of groups of cells that are capable of communicating via the line, with each group of cells being associated with the same color and including a 2×2 cell configuration;

the line of cells of the image sensor, include a plurality of groups of cells that are capable of communicating via the line, with each group of cells being associated with the same color and including a 2×2 cell configuration associated with one or more pixels;

the line of cells of the image sensor, include a plurality of groups of cells that are capable of communicating via the line, with each group of cells being associated with the same color and including a 2×4 cell configuration associated with a single pixel;

the line of cells of the image sensor, include a plurality of groups of cells that are capable of communicating via the line, with each group of cells being associated with the same color and including a 2×2 cell configuration associated with a single pixel;

the line of cells of the image sensor, include a plurality of groups of cells that are capable of communicating via the line, with each group of cells being associated with the same color and including a 2×4 cell configuration associated with one or more pixels;

the line of cells of the image sensor, include a plurality of groups of cells that are capable of communicating via the line, with each group of cells being associated with the same color and including a 1×2 cell configuration;

the line of cells of the image sensor includes the first cell and the second cell;

the line of cells of the image sensor includes the first cell and the second cell, in addition to other cells;

the line of cells of the image sensor includes a row of cells;

the line of cells of the image sensor includes a column of cells;

the line of cells of the image sensor includes cells configured in a same row or column;

the line of cells of the image sensor includes cells configured in a same row or column;

the line of cells of the image sensor includes cells physically positioned in a same row or column;

the line of cells of the image sensor includes cells physically positioned in a same row or column;

the line of cells of the image sensor includes cells physically positioned along a same row or column;

the line of cells of the image sensor includes cells physically positioned along a same row or column;

the line of cells of the image sensor includes a single line of cells physically positioned along a same row or column;

the line of cells of the image sensor includes a line of side-by-side cells physically positioned along a same row or column;

the line of cells of the image sensor includes a line of 4×4 groupings of cells physically positioned along a same row or column;

the line of cells of the image sensor does not include the line in communication with the plurality of cells;

the line of the line of cells includes a geometric line;

the line of the line of cells includes a configuration;

the line of the line of cells is geometric;

the line in communication with the plurality of cells, includes a physical line;

the line in communication with the plurality of cells, is physical;

the line in communication with the plurality of cells, includes a wire;

the line in communication with the plurality of cells, includes a circuit;

the cells of the line of cells of the image sensor, include the plurality of cells of the line in communication with the plurality of cells;

the cells of the line of cells of the image sensor, does not include the plurality of cells of the line in communication with the plurality of cells;

the plurality of cells of the line in communication with the plurality of cells, include the cells of the line of cells of the image sensor;

the plurality of cells of the line in communication with the plurality of cells, does not include the cells of the line of cells of the image sensor;

the at least portion of one or more line analog signals received by the first analog-to-digital channel is the same as the at least portion of one or more line analog signals received by the second analog-to-digital channel;

the at least portion of one or more line analog signals received by the first analog-to-digital channel is different from the at least portion of one or more line analog signals received by the second analog-to-digital channel;

the at least portion of one or more line analog signals is received by the first analog-to-digital channel and the at least portion of one or more line analog signals is received by the second analog-to-digital channel;

the at least portion of one or more line analog signals is received by the first analog-to-digital channel and the at least portion of one or more line analog signals is not received by the second analog-to-digital channel;

the at least portion of one or more line analog signals is not received by the first analog-to-digital channel and the at least portion of one or more line analog signals is received by the second analog-to-digital channel;

the at least portion of one or more line analog signals is received by the first analog-to-digital channel and the at least portion of one or more line analog signals is received by the second analog-to-digital channel, for a same single exposure;

the at least portion of one or more line analog signals is received by the first analog-to-digital channel and the at least portion of one or more line analog signals is not received by the second analog-to-digital channel, for a same single exposure;

the at least portion of one or more line analog signals is not received by the first analog-to-digital channel and the at least portion of one or more line analog signals is received by the second analog-to-digital channel, for a same single exposure;

the first line digital signal and the second line digital signal, are associated with the line of cells;

the first line digital signal and the second line digital signal, are associated with the same line of cells;

the at least portion of one or more line analog signals, include only part of the one or more line analog signals that correspond to only the plurality of cells;

the plurality of cells include only a subset of the line of cells;

the at least portion of one or more line analog signals correspond to the line of cells of the image sensor, by including a first line analog signal portion generated by at least one of the first analog signal or the second analog signal;

the at least portion of one or more line analog signals correspond to the line of cells of the image sensor, by including a first line analog signal portion generated by at least one of the first analog signal or the second analog signal;

the at least portion of one or more line analog signals correspond to the line of cells of the image sensor, by including a line analog signal portion generated utilizing both the first analog signal and the second analog signal;

the at least portion of one or more line analog signals correspond to the line of cells of the image sensor, by including a line analog signal portion generated utilizing both the first analog signal and the second analog signal, uncombined;

the at least portion of one or more line analog signals correspond to the line of cells of the image sensor, by including a line analog signal portion generated utilizing both the first analog signal and the second analog signal, combined;

the at least portion of one or more line analog signals correspond to the line of cells of the image sensor, by including a first line analog signal portion generated utilizing only the first analog signal, and a second line analog signal portion generated utilizing only the second analog signal;

at least one of the first analog signal or the second analog signal is capable of being amplified with at least one of the first gain or the second gain before being utilized to generate the at least portion of one or more line analog signals that correspond to the line of cells of the image sensor, by the at least one of the first analog signal or the second analog signal being capable of being amplified with at least one of the first gain or the second gain before the at least one of the first analog signal or the second analog signal being communicated via the line to at least one of the first analog-to-digital channel or the second analog-to-digital channel;

the at least portion of one or more line analog signals that correspond to the line of cells of the image sensor are generated by being aggregated for all cells of the line of cells;

the at least portion of one or more line analog signals that correspond to the line of cells of the image sensor are generated by being read out on the line that is in communication with the first analog-to-digital channel and the second analog-to-digital channel;

the at least portion of one or more line analog signals that correspond to the line of cells of the image sensor are generated by being assembled on the line, before being communicated to at least one of the first analog-to-digital channel or the second analog-to-digital channel;

for the image generation, at least one of the first line digital signal or the second line digital signal is combined with other line digital signals that are generated utilizing other line analog signals that, in turn, are generated utilizing other photodiode-generated analog signals;

the image generation includes a combination of the first line digital signal and the second line digital signal;

the image generation includes a combination of at least a portion of the first line digital signal and at least a portion of the second line digital signal;

the image generation includes a last processing step before at least one image is ready for display;

the second mode includes an isolation mode;

the first mode includes a current sharing mode; or the first mode includes a first current sharing mode, and the third mode includes a first current sharing mode. the at least subset of the different adjacent cells includes all of the different adjacent cells;

the at least subset of the different adjacent cells includes less than all of the different adjacent cells;

the at least one first line signal is associated with a first exposure, and the at least one second line signal is associated with a second exposure;

the at least one first line signal is associated with the first sampling, and the at least one second line signal is associated with the second sampling;

at least one first source-follower-configured transistor is a transistor that is configured to receive an input at a gate thereof and output via a source terminal thereof;

the at least one first source-follower-configured transistor amplifies;

the at least one first source-follower-configured transistor includes an amplifier circuit;

the other of the different adjacent cells includes another subset of the different adjacent cells other than the at least subset thereof;

the at least subset of the different adjacent cells includes a first one of the different adjacent cells, and the other of the different adjacent cells includes a second one of the different adjacent cells, where the different adjacent cells include two cells;

the one or more analog signals generated by each of the different adjacent cells corresponding with the same color of light is sampled, by being received from corresponding photodiodes;

the one or more analog signals generated by each of the different adjacent cells corresponding with the same color of light is sampled, by being received directly from corresponding photodiodes;

the one or more analog signals generated by each of the different adjacent cells corresponding with the same color of light is sampled, by being received indirectly from corresponding photodiodes;

the one or more analog signals generated by each of the different adjacent cells corresponding with the same color of light is sampled via one or more switches associated with the different adjacent cells;

the one or more analog signals generated by each of the different adjacent cells corresponding with the same color of light is sampled via switches each associated with each of the different adjacent cells;

the plurality of cells correspond with the same color of light, by each being capable of detecting the same color of light;

the plurality of cells correspond with the same color of light, by each being capable of detecting the same color of light without a requirement of detecting the same color of light;

the plurality of cells correspond with the same color of light, by each being capable of detecting the same color of light without a requirement of detecting the same color of light;

the first and second cells correspond with the same color of light, always;

the first and second correspond with the same color of light, at least sometimes;

the first and second correspond with the same color of light, in one mode of operation of the image sensor;

the first and second correspond with the same color of light, in one mode of operation of the image sensor, but not another mode;

the plurality of cells correspond with the same color of light, by each including a filter for the same color of light positioned thereon;

the plurality of cells correspond with the same color of light, by each including a configurable filter configured for the same color of light in certain modes while being configured for different colors of light in certain other modes;

the plurality of cells correspond with the same color of light, by each including a lens for the same color of light positioned thereon;

the plurality of cells correspond with the same color of light, by each including a corresponding photodiode that is configured for the detecting the same color of light;

the plurality of cells correspond with the same color of light, in addition to having an ability to detect white light;

the at least portion of the at least one first line analog signal corresponds to the line associated with the different adjacent cells of the image sensor, by the at least portion of the at least one first line analog signal being communicated via the line associated with the different adjacent cells of the image sensor;

the at least portion of the at least one first line analog signal corresponds to the line associated with the different adjacent cells of the image sensor, by the at least portion of the at least one first line analog signal being configured to be communicated via the line associated with the different adjacent cells of the image sensor;

the line associated with the different adjacent cells of the image sensor, is associated with the different adjacent cells, by the line associated with the different adjacent cells communicating line analog signals that are generated from cell analog signals generated by the different adjacent cells;

the line is associated with only the plurality of cells;

the line is associated with the plurality of cells, in addition to other adjacent cells;

the line is associated with the plurality of cells, in addition to other adjacent cells associated with one or more different rows;

the line is associated with the plurality of cells, in addition to other adjacent cells associated with one or more different lines;

the line associated with the different adjacent cells includes the line in communication with the plurality of cells;

the line associated with the different adjacent cells does not include the line in communication with the plurality of cells;

the line associated with the different adjacent cells includes the line of cells of the image sensor;

the line associated with the different adjacent cells does not include the line of cells of the image sensor;

the line associated with the different adjacent cells, includes a physical line;

the line associated with the different adjacent cells, is physical;

the line associated with the different adjacent cells, includes a wire;

the line associated with the different adjacent cells, includes a circuit;

the line associated with the different adjacent cells, includes that which communicates the at least portion of the at least one first line analog signal and the at least portion of the at least one second line analog signal;

the different adjacent cells are a subset of the plurality of cells;

the different adjacent cells are separate from the plurality of cells;

the different adjacent cells include a 1×2 cell configuration;

the different adjacent cells include a 2×1 cell configuration;

the different adjacent cells include a 2×2 cell configuration;

the different adjacent cells include a 4×4 cell configuration;

the different adjacent cells include a 8×8 cell configuration;

the different adjacent cells include a first row of two cells and a second row of two cells;

the different adjacent cells include a first row of two cells and a second row of two cells that are all in communication with the line;

the plurality of cells corresponds with the same color of light, only when operating in the first mode and the third mode;

the plurality of cells corresponds with the same color of light, only when operating in the first mode and the third mode, but still exist for use in the second mode;

the plurality of cells does not correspond with the same color of light, when operating in the second mode, as a result of a processing of an output of the plurality of cells;

the plurality of cells corresponds with the same color of light, only when operating in the first mode and the third mode, but still exist for the use during the second sampling;

the plurality of cells corresponds with the same color of light, when operating both in the first mode and in the third mode;

the image sensor is operates in the first mode for the first image, and the image sensor operates in the second mode for the second image;

the image sensor is operates in the first mode in a first scenario, and the image sensor operates in the second mode in a second scenario;

the image sensor switches between operation in the first mode and in the second mode, automatically;

the image sensor switches between operation in the first mode and in the second mode, in response to user input;

in the event that the image sensor is operating in the first mode, the first analog signal and the second analog signal are not combined before being utilized to generate the at least portion of the one or more line analog signals, by the first analog signal, by itself, being amplified with at least one of the first gain or the second gain before being communicated, via the line, as at least part of the at least portion of the one or more line analog signals;

in the event that the image sensor is operating in the second mode, the first analog signal is combined with the second analog signal before being utilized to generate the at least portion of the one or more line analog signals, by the first analog signal being combined with the second analog signal before being amplified with at least one of the first gain or the second gain before being communicated, via the line, as at least part of the at least portion of the one or more line analog signals;

in the event that the image sensor is operating in the second mode, the first analog signal is combined with the second analog signal before being utilized to generate the at least portion of the one or more line analog signals, by the first analog signal being combined with the second analog signal before being utilized to generate the at least portion of the one or more line analog signals, by a voltage associated with the first analog signal being added to another voltage associated with the second analog signal;

the first sensitivity and the second sensitivity include light sensitivity;

the at least portion of the first image exhibits the second sensitivity that is greater than the first sensitivity, by combining separate voltages that are generated by separate photodiodes receiving separate light;

the at least portion of the first image exhibits the second resolution, by combining separate voltages that are generated by separate photodiodes receiving separate light;

a first high dynamic range (HDR) image is generated that includes an image that is generated utilizing at least two different gains, for different exposures;

a first high dynamic range (HDR) image is generated that includes an image that is generated utilizing at least two different gains, for a same single exposure;

the at least one first line analog signal, the at least one second line analog signal, and the at least one third line analog signal, are all communicated via the line in communication with the plurality of cells;

the at least one first line analog signal, the at least one second line analog signal, and the at least one third line analog signal, are all communicated via the line associated with the different adjacent cells;

the at least one first line analog signal, the at least one second line analog signal, and the at least one third line analog signal, differ with respect to which of the first image, the second image, or the third image they are intended to be used to generate;

the at least one first line analog signal, the at least one second line analog signal, and the at least one third line analog signal, differ only with respect to which of the first image, the second image, or the third image they are intended to be used to generate;

the at least one first line analog signal, the at least one second line analog signal, and the at least one third line analog signal, differ in terms of resolution;

the at least one first line analog signal, the at least one second line analog signal, and the at least one third line analog signal, differ in terms of sensitivity;

the at least portion of the at least one third line analog signal that corresponds to the line associated with the different adjacent cells of the image sensor, is combined with at least the portion of the at least one fourth line analog signal that corresponds with the another line associated with the other cells, by being averaged;

the different adjacent cells include all cells of a pixel;

the different adjacent cells include a subset of cells of a pixel;

the different adjacent cells are of a same pixel;

the different adjacent cells are of different pixels;

the at least portion of the at least one third line analog signal that corresponds to the line associated with the different adjacent cells of the image sensor, is combined with at least the portion of the at least one fourth line analog signal that corresponds with the another line associated with the other cells, after being output via different sampling circuits;

the at least portion of the at least one third line analog signal that corresponds to the line associated with the different adjacent cells of the image sensor, is combined with at least the portion of the at least one fourth line analog signal that corresponds with the another line associated with the other cells, after not being output via different sampling circuits;

the at least portion of the at least one third line analog signal that corresponds to the line associated with the different adjacent cells of the image sensor, is combined with at least the portion of the at least one fourth line analog signal that corresponds with the another line associated with the other cells, before analog-to-digital conversion thereof;

the different adjacent cells are part of a same pixel;

the different adjacent cells are part of different pixels;

at least one of the first resolution, the second resolution, or the third resolution, includes a one-half vertical resolution;

at least one of the first resolution, the second resolution, or the third resolution, includes a one-half horizontal resolution;

at least one of the first resolution, the second resolution, or the third resolution, includes a full resolution may be blended;

the different adjacent cells include green cells of a same pixel;

the different adjacent cells include green cells of adjacent pixels;

the at least portion of the at least one third line analog signal that corresponds to the line associated with the different adjacent cells of the image sensor, is combined with at least a portion of the at least one fourth line analog signal that corresponds to another line associated with other cells of the image sensor corresponding with the same color of light, by being combined before being communicated over respective lines; or the at least portion of the at least one third line analog signal that corresponds to the line associated with the different adjacent cells of the image sensor, is combined with at least a portion of the at least one fourth line analog signal that corresponds to another line associated with other cells of the image sensor corresponding with the same color of light, by being combined after being communicated over respective lines.

20. The apparatus of claim 14, wherein the apparatus is configured such that the at least portion of the at least one third line analog signal is communicated over the line in parallel with the at least portion of the at least one fourth line analog signal being communicated over the another line.

21. The apparatus of claim 14, wherein the apparatus is configured such that the at least portion of the at least one third line analog signal is combined with the at least portion of the at least one fourth line analog signal, by being averaged.

22. The apparatus of claim 14, wherein the apparatus is configured to generate a first HDR image utilizing the image sensor, and further comprising another image sensor that is utilized to generate a second HDR image, such that at least a portion of the first HDR image is combined with at least a portion of the second HDR image, for generating a resulting HDR image that is displayed.

23. The apparatus of claim 14, wherein the apparatus is configured such that the other cells include other adjacent cells that are adjacent to each other and correspond with the same color of light.

24. The apparatus of claim 14, wherein the apparatus is configured such that the first gain and the second gain are capable of being applied at a pixel-level, and a third gain and a fourth gain are capable of being applied at a line-level.

25. The apparatus of claim 14, wherein the apparatus is configured such that the first gain and the second gain are capable of being applied at a pixel-level via one or more amplifiers, and a third gain and a fourth gain are capable of being applied at a line-level via two line-level amplifying circuits.

26. The apparatus of claim 14, wherein the apparatus is configured such that, for the first image, the one or more analog signals generated by each of the different adjacent cells corresponding with the same color of light is combined before being sampled.

27. The apparatus of claim 14, wherein the apparatus is configured such that the one or more analog signals generated by each of the different adjacent cells corresponding with the same color of light is combined utilizing a plurality of switches that are directly coupled to the first photodiode and the second photodiode.

28. The apparatus of claim 14, wherein the apparatus is configured such that:

the first gain and the second gain are capable of being applied to at least one of: at least one of the one or more analog signals generated for the first image before being utilized to generate the at least portion of the at least one first line analog signal that corresponds to the line associated with the different adjacent cells of the image sensor, at least one of the one or more analog signals generated for the second image before being utilized to generate the at least portion of the at least one second line analog signal that corresponds to the line associated with the different adjacent cells of the image sensor, or at least one of the one or more analog signals generated for the third image before being utilized to generate the at least portion of the at least one third line analog signal that corresponds to the line associated with the different adjacent cells of the image sensor; and a third gain and a fourth gain are capable of being applied to at least one of: the at least portion of the at least one first line analog signal after being communicated via the line associated with the different adjacent cells of the image sensor and before digital conversion thereof, the at least portion of the at least one second line analog signal after being communicated via the line associated with the different adjacent cells of the image sensor and before digital conversion thereof, or the at least portion of the at least one third line analog signal after being communicated via the line associated with the different adjacent cells of the image sensor and before digital conversion thereof.

29. The apparatus of claim 28, wherein the apparatus is configured such that, for the second image, both the first gain and the second gain are applied.

30. The apparatus of claim 28, wherein the apparatus is configured such that, for the second image, both the first gain and the second gain are applied, by:

the first gain being applied to generate a first part of the at least portion of the at least one second line analog signal that corresponds to the line associated with the different adjacent cells of the image sensor; and after the first gain is applied, the second gain being applied to generate a second part of the at least portion of the at least one second line analog signal that corresponds to the line associated with the different adjacent cells of the image sensor.

31. The apparatus of claim 28, wherein the apparatus is configured such that, for the second image, the first gain, the second gain, the third gain, and the fourth gain are applied, by:

the first gain being applied to generate a first part of the at least portion of the at least one second line analog signal that corresponds to the line associated with the different adjacent cells of the image sensor;

after the first gain is applied, the second gain being applied to generate a second part of the at least portion of the at least one second line analog signal that corresponds to the line associated with the different adjacent cells of the image sensor;

after the first gain is applied, the third gain being applied to the first part of the at least portion of the at least one second line analog signal that corresponds to the line associated with the different adjacent cells of the image sensor; and after the second gain is applied, the fourth gain being applied to the second part of the at least portion of the at least one second line analog signal that corresponds to the line associated with the different adjacent cells of the image sensor;

wherein the apparatus is further configured such that the circuitry receives the first line digital signal and the second line digital signal, for high dynamic range (HDR) image generation.

32. The apparatus of claim 31, wherein the apparatus is configured such that the first gain is greater than the second gain, and the third gain is greater than the fourth gain.

33. The apparatus of claim 31, wherein the apparatus is configured such that a ratio between the first gain and the second gain is the same as a ratio between the third gain and the fourth gain.

34. The apparatus of claim 31, wherein the apparatus is configured such that, for the first image, the first gain is applied without the second gain being applied.

35. The apparatus of claim 31, wherein the apparatus is configured such that, for the third image, the first gain is applied without the second gain being applied.

36. The apparatus of claim 28, wherein the apparatus is configured such that, for the second image, the first gain, the third gain, and the fourth gain are applied without the second gain being applied, by:

the first gain being applied without application of the second gain to generate the at least portion of the at least one second line analog signal that corresponds to the line associated with the different adjacent cells of the image sensor;

after the first gain is applied, the third gain being applied to the at least portion of the at least one second line analog signal that corresponds to the line associated with the different adjacent cells of the image sensor, before generating the first line digital signal for the second image; and after the first gain is applied, the fourth gain being applied to the at least portion of the at least one second line analog signal that corresponds to the line associated with the different adjacent cells of the image sensor, before generating the second line digital signal for the second image;

wherein the apparatus is further configured such that the circuitry receives the first line digital signal and the second line digital signal, for high dynamic range (HDR) image generation.

37. The apparatus of claim 36, wherein the apparatus is configured such that, for the first image, the first gain and the second gain are applied.

38. The apparatus of claim 36, wherein the apparatus is configured such that, for the first image, the first gain and the second gain are applied, without the third gain and the fourth gain being applied.

39. The apparatus of claim 36, wherein the apparatus is configured such that, for the third image, the first gain and the second gain are applied.

40. The apparatus of claim 36, wherein the apparatus is configured such that, for the third image, the first gain and the second gain are applied, without the third gain and the fourth gain being applied.

41. The apparatus of claim 28, wherein the apparatus is configured such that, for the first image, the first gain, the third gain, and the fourth gain are applied without the second gain being applied, by:

the first gain being applied without application of the second gain to generate the at least portion of the at least one first line analog signal that corresponds to the line associated with the different adjacent cells of the image sensor;

after the first gain is applied, the third gain being applied to the at least portion of the at least one first line analog signal that corresponds to the line associated with the different adjacent cells of the image sensor, before generating the first line digital signal for the first image; and after the first gain is applied, the fourth gain being applied to the at least portion of the at least one first line analog signal that corresponds to the line associated with the different adjacent cells of the image sensor, before generating the second line digital signal for the first image;

wherein the apparatus is further configured such that the circuitry receives the first line digital signal and the second line digital signal, for high dynamic range (HDR) image generation.

42. The apparatus of claim 41, wherein the apparatus is configured such that, for the second image, the first gain and the second gain are applied.

43. The apparatus of claim 41, wherein the apparatus is configured such that, for the second image, the first gain and the second gain are applied, without the third gain and the fourth gain being applied.

44. The apparatus of claim 28, wherein the apparatus is configured such that, for the first image, the first gain and the second gain are applied, by:

the first gain being applied to generate a first part of the at least portion of the at least one first line analog signal that corresponds to the line associated with the different adjacent cells of the image sensor; and after the first gain is applied, the second gain being applied to generate a second part of the at least portion of the at least one first line analog signal that corresponds to the line associated with the different adjacent cells of the image sensor;

wherein the apparatus is further configured such that the circuitry receives the first line digital signal and the second line digital signal, for high dynamic range (HDR) image generation.

45. The apparatus of claim 44, wherein the apparatus is configured such that, for the second image, the first gain is applied without the second gain being applied.

46. The apparatus of claim 44, wherein the apparatus is configured such that, for the second image, the first gain, the third gain, and the fourth gain are applied without the second gain being applied.

47. The apparatus of claim 28, wherein the apparatus is configured such that, for the first image, the first gain, the second gain, the third gain, and the fourth gain are applied, by:

the first gain being applied to generate a first part of the at least portion of the at least one first line analog signal that corresponds to the line associated with the different adjacent cells of the image sensor;

after the first gain is applied, the second gain being applied to generate a second part of the at least portion of the at least one first line analog signal that corresponds to the line associated with the different adjacent cells of the image sensor;

after the first gain is applied, the third gain being applied to the first part of the at least portion of the at least one first line analog signal that corresponds to the line associated with the different adjacent cells of the image sensor; and after the second gain is applied, the fourth gain being applied to the second part of the at least portion of the at least one first line analog signal that corresponds to the line associated with the different adjacent cells of the image sensor;

wherein the apparatus is further configured such that the circuitry receives the first line digital signal and the second line digital signal, for high dynamic range (HDR) image generation.

48. The apparatus of claim 47, wherein the apparatus is configured such that, for the second image, the first gain is applied without the second gain being applied.

49. The apparatus of claim 28, wherein the apparatus is configured such that, for the third image, the first gain, the third gain, and the fourth gain are applied without the second gain being applied, by:

the first gain being applied without application of the second gain to generate the at least portion of the at least one third line analog signal that corresponds to the line associated with the different adjacent cells of the image sensor;

after the first gain is applied, the third gain being applied, before generating the first line digital signal for the third image; and after the first gain is applied, the fourth gain being applied, before generating the second line digital signal for the third image;

wherein the apparatus is further configured such that the circuitry receives the first line digital signal and the second line digital signal, for high dynamic range (HDR) image generation.

50. The apparatus of claim 49, wherein the apparatus is configured such that, for the second image, the first gain and the second gain are applied.

51. The apparatus of claim 49, wherein the apparatus is configured such that, for the second image, the first gain and the second gain are applied, without the third gain and the fourth gain being applied.

52. The apparatus of claim 28, wherein the apparatus is configured such that, for the third image, the first gain and the second gain being applied, by:

the first gain being applied to generate a first part of the at least portion of the at least one third line analog signal that corresponds to the line associated with the different adjacent cells of the image sensor; and after the first gain is applied, the second gain being applied to generate a second part of the at least portion of the at least one third line analog signal that corresponds to the line associated with the different adjacent cells of the image sensor;

wherein the apparatus is further configured such that the circuitry receives the first line digital signal and the second line digital signal, for high dynamic range (HDR) image generation.

53. The apparatus of claim 52, wherein the apparatus is configured such that, for the second image, the first gain is applied without the second gain being applied.

54. The apparatus of claim 52, wherein the apparatus is configured such that, for the second image, the first gain, the third gain, and the fourth gain are applied without the second gain being applied.

55. The apparatus of claim 28, wherein the apparatus is configured such that, for the third image, the first gain, the second gain, the third gain, and the fourth gain are applied, by:

the first gain being applied to generate a first part of the at least portion of the at least one third line analog signal that corresponds to the line associated with the different adjacent cells of the image sensor;

after the first gain is applied, the second gain being applied to generate a second part of the at least portion of the at least one third line analog signal that corresponds to the line associated with the different adjacent cells of the image sensor;

after the first gain is applied, the third gain being applied to the first part of the at least portion of the at least one third line analog signal that corresponds to the line associated with the different adjacent cells of the image sensor; and after the second gain is applied, the fourth gain being applied to the second part of the at least portion of the at least one third line analog signal that corresponds to the line associated with the different adjacent cells of the image sensor;

wherein the apparatus is further configured such that the circuitry receives the first line digital signal and the second line digital signal to generate a resultant high dynamic range (HDR) image.

56. The apparatus of claim 55, wherein the apparatus is configured such that, for the second image, the first gain is applied without the second gain being applied.

57. The apparatus of claim 28, wherein the apparatus is configured such that, for the third image:

the first gain is applied to generate a first part of the at least portion of the at least one third line analog signal that corresponds to the line associated with the different adjacent cells of the image sensor;

after the first gain is applied, the second gain is applied to generate a second part of the at least portion of the at least one third line analog signal that corresponds to the line associated with the different adjacent cells of the image sensor;

the circuitry receives the first line digital signal for the third image and the second line digital signal for the third image to generate a first high dynamic range (HDR) image; and in response to receiving user input, the image sensor switches modes, such that, for the second image:

the first gain is applied without application of the second gain to generate the at least portion of the at least one second line analog signal that corresponds to the line associated with the different adjacent cells of the image sensor, after the first gain is applied, the third gain is applied, before generating the first line digital signal for the second image, after the first gain is applied, the fourth gain is applied, before generating the second line digital signal for the second image, and the circuitry receives the first line digital signal for the second image and the second line digital signal for the second image to generate a second high dynamic range (HDR) image.

58. The apparatus of claim 57, wherein the apparatus is configured such that, for the third image, the third and fourth gains are not applied.

59. The apparatus of claim 57, wherein the apparatus is configured such that at least a portion of the first HDR image is combined with at least a portion of the second HDR image, to generate at least a portion of a resultant HDR image.

60. The apparatus of claim 28, wherein the apparatus is configured such that, for the third image:

the first gain is applied to generate a first part of the at least portion of the at least one third line analog signal that corresponds to the line associated with the different adjacent cells of the image sensor;

after the first gain is applied, the second gain is applied to generate a second part of the at least portion of the at least one third line analog signal that corresponds to the line associated with the different adjacent cells of the image sensor;

the circuitry receives the first line digital signal for the third image and the second line digital signal for the third image to generate a first high dynamic range (HDR) image; and in response to receiving user input, the image sensor switches modes, such that, for the first image:

the first gain is applied without application of the second gain to generate the at least portion of the at least one first line analog signal that corresponds to the line associated with the different adjacent cells of the image sensor, after the first gain is applied, the third gain is applied, before generating the first line digital signal for the first image, after the first gain is applied, the fourth gain is applied, before generating the second line digital signal for the first image, and the circuitry receives the first line digital signal for the first image and the second line digital signal for the first image to generate a second high dynamic range (HDR) image.

61. The apparatus of claim 60, wherein the apparatus is configured such that, for the third image, the third and fourth gains are not applied.

62. The apparatus of claim 60, wherein the apparatus is configured such that at least a portion of the first HDR image is combined with at least a portion of the second HDR image, to generate at least a portion of a resultant HDR image.

63. The apparatus of claim 28, wherein the apparatus is configured such that:

in response to receipt of a user input for a shutter control:

a plurality of the third images are generated;

at least a portion of: a first one of the plurality of third images, a second one of the plurality of third images, and a third one of the plurality of third images, are combined to generate at least a portion of at least one synthetic image;

the first image is generated; and the at least portion of the at least one synthetic image is combined with at least a portion of the first image, to generate a high dynamic range (HDR) image.

64. The apparatus of claim 28, wherein the apparatus is configured such that:

in response to receipt of a user input for a shutter control:

a plurality of the third images are each generated, by:

the first gain being applied to generate a first part of the at least portion of the at least one third line analog signal, for a corresponding one of the plurality of the third images, that corresponds to the line associated with the different adjacent cells of the image sensor, and after the first gain is applied, the second gain being applied to generate a second part of the at least portion of the at least one third line analog signal, for the corresponding one of the plurality of the third images, that corresponds to the line associated with the different adjacent cells of the image sensor;

at least a portion of a first one of the plurality of third images, a second one of the plurality of third images, and a third one of the plurality of third images, are combined to generate at least a portion of at least one synthetic image;

the first image is generated; and the at least portion of the at least one synthetic image is combined with at least a portion of the first image, to generate a high dynamic range (HDR) image.

65. The apparatus of claim 64, wherein the apparatus is configured such that the plurality of the third images are generated without applying the third gain and the fourth gain.

66. The apparatus of claim 64, wherein the apparatus is configured such that the first image is generated, by:

the first gain being applied without application of the second gain to generate the at least portion of the at least one first line analog signal that corresponds to the line associated with the different adjacent cells of the image sensor, after the first gain is applied, the third gain being applied to the at least portion of the at least one first line analog signal that corresponds to the line associated with the different adjacent cells of the image sensor, before generating the first line digital signal for the first image, and after the first gain is applied, the fourth gain being applied to the at least portion of the at least one first line analog signal that corresponds to the line associated with the different adjacent cells of the image sensor, before generating the second line digital signal for the first image.

67. The apparatus of claim 64, wherein the apparatus is configured such that the first image is generated, by:

the first gain being applied to generate a first part of the at least portion of the at least one first line analog signal that corresponds to the line associated with the different adjacent cells of the image sensor; and after the first gain is applied, the second gain being applied to generate a second part of the at least portion of the at least one first line analog signal that corresponds to the line associated with the different adjacent cells of the image sensor.

68. The apparatus of claim 64, wherein the apparatus is configured such that at least one of:

the first part of the at least portion of the at least one third line analog signal and the second part of the at least portion of the at least one third line analog signal, are different parts of a same third line analog signal;

the first part of the at least portion of the at least one third line analog signal and the second part of the at least portion of the at least one third line analog signal, are different line analog signals;

the first analog signal and the second analog signal are each separately amplified with the third gain and the fourth gain;

the first analog signal and the second analog signal are combined before being together amplified with the third gain and the fourth gain;

a first mode and a second mode are binning modes; or the first mode and the second mode are ISO modes.

69. The apparatus of claim 14, wherein the apparatus is configured such that the first image and the third image are generated in response to receipt of a user input for a shutter control, and at least a portion of the first image is combined with at least a portion of the third image, resulting in a resultant high dynamic range (HDR) image.

70. The apparatus of claim 14, wherein the apparatus is configured such that a plurality of third images are generated, at least a portion of a first one of the plurality of third images is combined with at least a portion of a second one of the plurality of third images to generate at least one synthetic image, and at least a portion of the at least one synthetic image is combined with at least a portion of the first image, to generate a resultant image.

71. The apparatus of claim 14, wherein the apparatus is configured such that, in response to receipt of a user input for a shutter control: a plurality of third images are generated, at least a portion of a first one of the plurality of third images is combined with at least a portion of a second one of the plurality of third images to generate at least one synthetic image, and at least a portion of the at least one synthetic image is combined with at least a portion of the first image, to generate a resultant high dynamic range (HDR) image.

72. The apparatus of claim 71, wherein the apparatus is configured such that the at least one synthetic image, the first image, and the resultant HDR image, are stored in an image set that makes the at least one synthetic image, the first image, and the resultant HDR image individually accessible to a user.

73. The apparatus of claim 71, wherein the apparatus is configured such that the plurality of third images, the at least one synthetic image, the first image, and the resultant HDR image, are stored in an image set that makes the plurality of third images, the at least one synthetic image, the first image, and the resultant HDR image separately accessible to a user.

74. The apparatus of claim 14, wherein the apparatus is configured such that, in response to receipt of a user input for a shutter control: a plurality of third images are generated, at least a portion of a first one of the plurality of third images is combined with at least a portion of a second one of the plurality of third images to generate at least one synthetic image, and at least a portion of the at least one synthetic image is combined with at least a portion of the second image, to generate a resultant high dynamic range (HDR) image.

75. The apparatus of claim 14, wherein the apparatus is configured such that:

the first image and the third image are generated in response to receipt of a user input for a shutter control, and at least a portion of the first image is combined with at least a portion of the third image, resulting in a resultant high dynamic range (HDR) image.

76. The apparatus of claim 75, wherein the apparatus is configured such that at least one difference exists between a plurality of processes including a first process for generating the at least portion of the first image and a second process for generating the at least portion of the third image, the at least one difference including at least one of:

one of the processes amplifies with only one of the first gain or the second gain, and another one of the processes amplifies with both the first gain and the second gain;

one of the processes amplifies with only one of the first gain or the second gain, and another one of the processes amplifies with only another one of the first gain or the second gain;

one of the processes utilizes only one of the first analog-to-digital channel or the second analog-to-digital channel, and another one of the processes utilizes both the first analog-to-digital channel and the second analog-to-digital channel; or one of the processes utilizes only one of the first analog-to-digital channel or the second analog-to-digital channel, and another one of the processes utilizes only another one of the first analog-to-digital channel or the second analog-to-digital channel.

77. The apparatus of claim 75, wherein the apparatus is configured such that at least one difference exists between a plurality of processes including a first process for generating the at least portion of the first image and a second process for generating the at least portion of the third image, the at least one difference including at least two of:

one of the processes amplifies with only one of the first gain or the second gain, and another one of the processes amplifies with both the first gain and the second gain;

one of the processes amplifies with only one of the first gain or the second gain, and another one of the processes amplifies with only another one of the first gain or the second gain;

one of the processes utilizes only one of the first analog-to-digital channel or the second analog-to-digital channel, and another one of the processes utilizes both the first analog-to-digital channel and the second analog-to-digital channel; and one of the processes utilizes only one of the first analog-to-digital channel or the second analog-to-digital channel, and another one of the processes utilizes only another one of the first analog-to-digital channel or the second analog-to-digital channel.

78. The apparatus of claim 14, wherein the apparatus is configured such that:

the second image and the third image are generated in response to receipt of a user input for a shutter control, and at least a portion of the second image is combined with at least a portion of the third image, resulting in a resultant high dynamic range (HDR) image.

79. The apparatus of claim 78, wherein the apparatus is configured such that at least one difference exists between a plurality of processes including a first process for generating the at least portion of the second image and a second process for generating the at least portion of the third image, the at least one difference including at least one of:

one of the processes amplifies with only one of the first gain or the second gain, and another one of the processes amplifies with both the first gain and the second gain;

one of the processes amplifies with only one of the first gain or the second gain, and another one of the processes amplifies with only another one of the first gain or the second gain;

one of the processes utilizes only one of the first analog-to-digital channel or the second analog-to-digital channel, and another one of the processes utilizes both the first analog-to-digital channel and the second analog-to-digital channel; or one of the processes utilizes only one of the first analog-to-digital channel or the second analog-to-digital channel, and another one of the processes utilizes only another one of the first analog-to-digital channel or the second analog-to-digital channel.

80. The apparatus of claim 78, wherein the apparatus is configured such that at least one difference exists between a plurality of processes including a first process for generating the at least portion of the second image and a second process for generating the at least portion of the third image, the at least one difference including at least two of:

one of the processes amplifies with only one of the first gain or the second gain, and another one of the processes amplifies with both the first gain and the second gain;

one of the processes amplifies with only one of the first gain or the second gain, and another one of the processes amplifies with only another one of the first gain or the second gain;

one of the processes utilizes only one of the first analog-to-digital channel or the second analog-to-digital channel, and another one of the processes utilizes both the first analog-to-digital channel and the second analog-to-digital channel; and one of the processes utilizes only one of the first analog-to-digital channel or the second analog-to-digital channel, and another one of the processes utilizes only another one of the first analog-to-digital channel or the second analog-to-digital channel.

81. The apparatus of claim 14, wherein the apparatus is configured such that:

the first image and the second image are generated in response to receipt of a user input for a shutter control, and at least a portion of the first image is combined with at least a portion of the second image, resulting in a resultant high dynamic range (HDR) image.

82. The apparatus of claim 81, wherein the apparatus is configured such that at least one difference exists between a plurality of processes including a first process for generating the at least portion of the first image and a second process for generating the at least portion of the second image, the at least one difference including at least one of:

one of the processes amplifies with only one of the first gain or the second gain, and another one of the processes amplifies with both the first gain and the second gain;

one of the processes amplifies with only one of the first gain or the second gain, and another one of the processes amplifies with only another one of the first gain or the second gain;

one of the processes utilizes only one of the first analog-to-digital channel or the second analog-to-digital channel, and another one of the processes utilizes both the first analog-to-digital channel and the second analog-to-digital channel; or one of the processes utilizes only one of the first analog-to-digital channel or the second analog-to-digital channel, and another one of the processes utilizes only another one of the first analog-to-digital channel or the second analog-to-digital channel.

83. The apparatus of claim 81, wherein the apparatus is configured such that at least one difference exists between a plurality of processes including a first process for generating the at least portion of the first image and a second process for generating the at least portion of the second image, the at least one difference including at least two of:

one of the processes amplifies with only one of the first gain or the second gain, and another one of the processes amplifies with both the first gain and the second gain;

one of the processes amplifies with only one of the first gain or the second gain, and another one of the processes amplifies with only another one of the first gain or the second gain;

one of the processes utilizes only one of the first analog-to-digital channel or the second analog-to-digital channel, and another one of the processes utilizes both the first analog-to-digital channel and the second analog-to-digital channel; and one of the processes utilizes only one of the first analog-to-digital channel or the second analog-to-digital channel, and another one of the processes utilizes only another one of the first analog-to-digital channel or the second analog-to-digital channel.

84. The apparatus of claim 14, wherein the apparatus is configured such that the at least one third line analog signal that corresponds to the line associated with the different adjacent cells of the image sensor, corresponds only to a single column, and is not communicated via another line corresponding to another single column.

85. The apparatus of claim 14, wherein the apparatus is configured such that the different adjacent cells are part of a same single pixel.

86. The apparatus of claim 14, wherein the apparatus is configured such that the different adjacent cells are part of a first same single pixel in communication with the line, and the other cells are part of a second same single pixel in communication with the another line.

87. The apparatus of claim 86, wherein the apparatus is configured such that the first pixel and the second pixel are part of a same row.

88. The apparatus of claim 86, wherein the apparatus is configured such that the first pixel and the second pixel are part of a same row, and in different columns.

89. The apparatus of claim 86, wherein the apparatus is configured such that the first pixel and the second pixel are part of a same column.

90. The apparatus of claim 86, wherein the apparatus is configured such that the first pixel and the second pixel are part of a same column, and in different rows.

91. The apparatus of claim 14, wherein the apparatus is configured such that at least a portion of the first image is combined with at least a portion of the second image to reduce noise and improve an exposure of a combined HDR image.

92. The apparatus of claim 14, wherein the apparatus is configured such that the at least portion of the at least one third line analog signal that corresponds to the line associated with the different adjacent cells of the image sensor, is combined with the at least portion of the at least one fourth line analog signal that corresponds to the another line associated with the other cells, by the at least portion of the at least one third line analog signal that corresponds to the line associated with the different adjacent cells of the image sensor, being averaged with the at least portion of the at least one fourth line analog signal that corresponds to the another line associated with the other cells.

93. The apparatus of claim 14, wherein the image sensor is configured such that:

the first sampling is that for which the one or more analog signals generated by each of the different adjacent cells corresponding with the same color of light is sampled and combined, before at least one of the first gain or the second gain is applied thereto; and the third sampling is that for which the one or more analog signals generated by each of the different adjacent cells corresponding with the same color of light is sampled and combined, before at least one of the first gain or the second gain is applied thereto.

94. An apparatus, comprising:

an image sensor including a plurality of cells including: a first cell having a first photodiode generating a first analog signal, and a second cell having a second photodiode generating a second analog signal, for being utilized to generate at least a portion of one or more line analog signals;

a line in communication with the plurality of cells, the line communicating the one or more line analog signals;

a first analog-to-digital channel in communication with the line, the first analog-to-digital channel capable of receiving at least one of the one or more line analog signals for conversion thereof to a first line digital signal;

a second analog-to-digital channel in communication with the line, the second analog-to-digital channel capable of receiving at least one of the one or more line analog signals for conversion thereof to a second line digital signal; and circuitry in communication with the first analog-to-digital channel and the second analog-to-digital channel, the circuitry capable of receiving at least one of the first line digital signal or the second line digital signal, for image generation;

wherein the apparatus is configured such that a first gain and a second gain are capable of being applied before the image generation, and at least three different cells are sampled with at least three different exposure times to generate at least three analog signals for being combined to generate at least a portion of a first high dynamic range (HDR) image.

95. An apparatus, comprising:

an image sensor including a plurality of cells including: a first cell having a first photodiode generating a first analog signal, and a second cell having a second photodiode generating a second analog signal, for being utilized to generate at least a portion of one or more line analog signals;

a line in communication with the plurality of cells, the line communicating the one or more line analog signals;

a first analog-to-digital channel in communication with the line, the first analog-to-digital channel capable of receiving at least one of the one or more line analog signals for conversion thereof to a first line digital signal;

a second analog-to-digital channel in communication with the line, the second analog-to-digital channel capable of receiving at least one of the one or more line analog signals for conversion thereof to a second line digital signal; and circuitry in communication with the first analog-to-digital channel and the second analog-to-digital channel, the circuitry capable of receiving at least one of the first line digital signal or the second line digital signal, for image generation;

wherein the apparatus is configured such that a first gain and a second gain are capable of being applied before the image generation, and, in response to receiving a user input to capture a photographic scene:

at least a portion of a first image is generated for the photographic scene utilizing a first brightness level at a first time, at least a portion of a second image is generated for the photographic scene utilizing a second brightness level at a second time, and the at least portion of the first image is combined with the at least portion of the second image to generate at least a portion of at least one high dynamic range (HDR) image.

96. The apparatus of claim 95, wherein the apparatus is configured such that, for both the first image and the second image, analog signals generated by different cells corresponding with a same color of light are combined into a combined analog signal that is utilized to generate at least a portion of at least one line analog signal communicated over the line that is in communication with the different cells of the image sensor, where the at least portion of the at least one line analog signal is combined with at least a portion of at least one other line analog signal that is communicated over another line that is in communication with other different cells of the image sensor, before digital conversion thereof.

97. The apparatus of claim 95, wherein the apparatus is configured such that, for at least one of the first image or the second image, analog signals generated by different cells of a first line corresponding with a same color of light are combined with analog signals generated by other different cells of a second line corresponding with the same color of light, before digital conversion thereof.

98. The apparatus of claim 95, wherein the apparatus is configured such that, for at least one of the first image or the second image, analog signals generated by different cells of a first pixel corresponding with a same color of light are combined with analog signals generated by other different cells of a second pixel corresponding with the same color of light, before digital conversion thereof.

99. The apparatus of claim 95, wherein the apparatus is configured such that, for at least one of the first image or the second image, analog signals generated by different cells corresponding with a same color of light are combined to generate a combined analog signal that is utilized to generate at least a portion of at least one line analog signal communicated over the line that is in communication with the different cells of the image sensor, where the at least portion of the at least one line analog signal is combined with at least a portion of at least one other line analog signal that is communicated over another line that is in communication with other different cells of the image sensor, before digital conversion of a result based on the combination of the at least portion of the at least one line analog signal and the at least portion of the at least one other line analog signal.

100. The apparatus of claim 99, wherein the apparatus is configured such that, for at least one other of the first image or the second image, additional analog signals generated by the different cells corresponding with the same color of light are combined into an additional combined analog signal that is utilized to generate at least a portion of at least one additional line analog signal communicated over the line that is in communication with the different cells of the image sensor, without the at least one additional line analog signal being combined, before digital conversion, with any other line analog signal that is communicated over the another line that is in communication with the other different cells of the image sensor.

101. The apparatus of claim 99, wherein the apparatus is configured such that the first brightness level and the second brightness level are utilized by utilizing the first gain for providing the first brightness level, and utilizing the second gain for providing the second brightness level.

102. The apparatus of claim 99, wherein the apparatus is configured such that the first brightness level and the second brightness level are utilized by utilizing a first exposure time for providing the first brightness level, and utilizing a second exposure time for providing the second brightness level.

103. The apparatus of claim 102, wherein the apparatus is configured such that the first exposure time and the second exposure time are set based on additional user input received before the user input.

104. The apparatus of claim 99, wherein the apparatus is configured such that additional images are generated for the photographic scene at times between the first time and the second time, in response to receiving the user input to capture the photographic scene, where only a subset of the additional images are utilized such that at least a portion of the subset of the additional images is combined to generate the at least portion of the at least one HDR image.

105. The apparatus of claim 104, wherein the apparatus is configured such that the subset of the additional images are automatically selected based on a quality thereof.

106. The apparatus of claim 104, wherein the apparatus is configured such that a number of the additional images that are generated, is based on receiving additional user input.

107. The apparatus of claim 99, wherein the apparatus is configured such that:

the first image is generated for the photographic scene utilizing the first brightness level at the first time, and the second image is generated for the photographic scene utilizing the second brightness level at the second time, based on receiving additional user input selecting a corresponding mode of operation;

the first image and the second image include ambient images that are generated without a strobe illumination; and the first image and the second image are generated in addition to additional images for the photographic scene, such that the first image and the second image are selected based on a quality thereof, instead of one or more of the additional images, for generating the least one HDR image for the photographic scene.

108. The apparatus of claim 99, wherein the apparatus is configured such that:

the first gain and the second gain are capable of being applied after the combined analog signal is generated and before the at least portion of the at least one line analog signal is communicated over the line; and a third gain and a fourth gain are capable of being applied after the at least portion of the at least one line analog signal is communicated over the line, and before analog-to-digital conversion.

109. The apparatus of claim 108, wherein the apparatus is configured such that different combinations of one or more of at least four gains including the first gain, the second gain, the third gain, and the fourth gain, are utilized for the generating the first image and the second image.

110. The apparatus of claim 108, wherein the apparatus is configured such that:

the first image and the second image include ambient images that are generated without a strobe illumination;

the first image and the second image are generated in addition to additional images for the photographic scene, such that the first image and the second image are selected based on a quality thereof, instead of one or more of the additional images, for generating the least one HDR image for the photographic scene; and different combinations of one or more of at least four gains including the first gain, the second gain, the third gain, and the fourth gain, are utilized for the generating the first image, the second image, and the additional images.

111. The apparatus of claim 108, wherein the apparatus is configured such that:

the at least one of the first image or the second image, includes only the first image;

the second image is generated by additional analog signals generated by the different cells corresponding with the same color of light being combined into an additional combined analog signal that is utilized to generate at least a portion of at least one additional line analog signal communicated over the line that is in communication with the different cells of the image sensor, without the at least one additional line analog signal being combined, before digital conversion, with any other line analog signal that is communicated over the another line that is in communication with the other different cells of the image sensor.

112. The apparatus of claim 108, wherein the apparatus is configured such that:

the at least one of the first image or the second image, includes only the first image;

the second image is generated without additional analog signals generated by the different cells corresponding with the same color of light being combined into an additional combined analog signal that is utilized to generate at least a portion of at least one additional line analog signal communicated over the line that is in communication with the different cells of the image sensor.

113. The apparatus of claim 108, wherein the apparatus is configured such that, for at least the first image:

the first gain is applied after the combined analog signal is generated and before at least a portion of at least one first line analog signal, that is generated based on the first gain, is communicated over the line; and the second gain is applied after the combined analog signal is generated and before at least a portion of at least one second line analog signal, that is generated based on the second gain, is communicated over the line.

114. The apparatus of claim 113, wherein the apparatus is configured such that the third gain and the fourth gain are not applied for the first image.

115. The apparatus of claim 113, wherein the apparatus is configured such that the first gain and the second gain are applied in serial, such that the at least portion of the at least one first line analog signal and the at least portion of the at least one second line analog signal are generated in serial.

116. The apparatus of claim 99, wherein the apparatus is configured such that at least one difference exists between a plurality of configurations including a first configuration for generating the first image and a second configuration for generating the second image, the at least one difference including at least one of:

one of the configurations amplifies with only one of the first gain or the second gain, and another one of the configurations amplifies with both the first gain and the second gain;

one of the configurations amplifies with only one of the first gain or the second gain, and another one of the configurations amplifies with only another one of the first gain or the second gain;

one of the configurations utilizes only one of the first analog-to-digital channel or the second analog-to-digital channel, and another one of the configurations utilizes both the first analog-to-digital channel and the second analog-to-digital channel; or one of the configurations utilizes only one of the first analog-to-digital channel or the second analog-to-digital channel, and another one of the configurations utilizes only another one of the first analog-to-digital channel or the second analog-to-digital channel.

117. The apparatus of claim 99, wherein the apparatus is configured such that at least one difference exists between a plurality of configurations including a first configuration for generating the first image and a second configuration for generating the second image, the at least one difference including at least two of:

one of the configurations amplifies with only one of the first gain or the second gain, and another one of the configurations amplifies with both the first gain and the second gain;

one of the configurations amplifies with only one of the first gain or the second gain, and another one of the configurations amplifies with only another one of the first gain or the second gain;

one of the configurations utilizes only one of the first analog-to-digital channel or the second analog-to-digital channel, and another one of the configurations utilizes both the first analog-to-digital channel and the second analog-to-digital channel; and one of the configurations utilizes only one of the first analog-to-digital channel or the second analog-to-digital channel, and another one of the configurations utilizes only another one of the first analog-to-digital channel or the second analog-to-digital channel.

118. The apparatus of claim 99, wherein the apparatus is configured such that at least one of the first gain or the second gain is capable of being applied to at least one of the first analog signal or the second analog signal before a source-follower-configured transistor is utilized for communication thereof via the line as the at least one of the one or more line analog signals, and at least one of a third gain or a fourth gain is capable of being applied to the at least one of the one or more line analog signals after the source-follower-configured transistor is utilized for communication thereof via the line.

119. The apparatus of claim 99, wherein the apparatus is configured such that at least one of the first gain or the second gain is applied to at least one of the first analog signal or the second analog signal before a source-follower-configured transistor is utilized for communication thereof via the line as the at least one of the one or more line analog signals, and at least one of a third gain or a fourth gain is applied to the at least one of the one or more line analog signals after the source-follower-configured transistor is utilized for communication thereof via the line, where application of the at least one of the first gain or the second gain avoids noise associated with utilization of the source-follower-configured transistor.

120. The apparatus of claim 99, and further comprising: one or more non-transitory memories with instructions stored thereon that, when executed by one or more processors of a mobile device including a touch interface-equipped display, cause the apparatus to:

display, utilizing the touch interface-equipped display, a user interface element for setting an exposure time parameter; and in the event of receipt, utilizing the touch interface-equipped display, of a selection user input on the user interface element, set the exposure time parameter based thereon, such that the first image and the second image are generated based on the set exposure time parameter.

121. The apparatus of claim 99, and further comprising: one or more non-transitory memories with instructions stored thereon that, when executed by one or more processors of a mobile device including a touch interface-equipped display, cause the apparatus to:

display, utilizing the touch interface-equipped display, the HDR image with a plurality of user interface elements including a first user interface element for controlling a blur effect on the HDR image, a second user interface element for controlling a brightness effect on the HDR image, and a third user interface element for controlling a color effect on the HDR image;

in the event of receipt, utilizing the touch interface-equipped display, of a selection user input on at least one of the first user interface element, the second user interface element, or the third user interface element: display, utilizing the touch interface-equipped display, at least one slider user interface element for controlling at least one of the blur effect, the brightness effect, or the color effect, on the HDR image;

in the event of receipt, utilizing the touch interface-equipped display, of a sliding user input on the at least one slider user interface element: control display, utilizing the touch interface-equipped display, of the at least one of the blur effect, the brightness effect, or the color effect, on the HDR image for generating a processed HDR image;

display, utilizing the touch interface-equipped display, of a save user interface element; and in the event of receipt, utilizing the touch interface-equipped display, of a save user input on the save user interface element after the receipt of the sliding user input on the at least one slider user interface element, update an image set to include the processed HDR image.

122. The apparatus of claim 121, wherein the apparatus is configured to:

display, utilizing the touch interface-equipped display, the processed HDR image with the at least one slider user interface element being set based on the sliding user input; and in the event of receipt, utilizing the touch interface-equipped display, of an additional sliding user input on the at least one slider user interface element: control display, utilizing the touch interface-equipped display, of the at least one of the blur effect, the brightness effect, or the color effect, for generating a further processed HDR image.

123. The apparatus of claim 99, and further comprising: one or more non-transitory memories with instructions stored thereon that, when executed by one or more processors of a mobile device including a strobe and a touch screen, cause the apparatus to:

display, utilizing the touch screen, the photographic scene;

receive, utilizing the touch screen, additional user input in connection with the photographic scene;

based on the additional user input, identify a point of interest in the photographic scene;

based on the identification of the point of interest in the photographic scene, identify information associated with the point of interest; and based on the information associated with the point of interest, set one or more capture parameters for generating the HDR image including the point of interest in the photographic scene.

124. The apparatus of claim 99, and further comprising: one or more non-transitory memories with instructions stored thereon that, when executed by one or more processors of a mobile device including a strobe and a touch screen, cause the apparatus to:

display, utilizing the touch screen, the photographic scene;

receive, utilizing the touch screen, additional user input in connection with the photographic scene;

based on the additional user input, identify a point of interest in the photographic scene;

based on the identification of the point of interest in the photographic scene, set one or more parameters for generating the HDR image including the point of interest in the photographic scene.

125. The apparatus of claim 124, wherein the apparatus is configured such that the one or more parameters include a metering parameter.

126. The apparatus of claim 99, wherein the apparatus is configured to:

generate another HDR image;

filter at least one of the HDR image or the another HDR image utilizing a first filter to generate a first filtered image;

filter at least one of the HDR image or the another HDR image utilizing a second filter to generate a second filtered image; and select at least one of the HDR image, the another HDR image, the first filtered image, or the second filtered image;

store, in an image set, the HDR image, the another HDR image, the first filtered image, and the second filtered image.

127. The apparatus of claim 99, wherein the apparatus is configured to:

generate another HDR image without any combination of any line analog signal communicated over the line with any other line analog signal communicated over any other line in communication with another plurality of cells, before digital conversion; and generate at least a portion of a resultant HDR images by combining at least a portion of the HDR image and at least a portion of the another HDR image.

128. The apparatus of claim 99, wherein the apparatus is configured such that:

the at least one of the first image or the second image, includes only the first image that has a first resolution;

the second image is generated with a second resolution that is greater than the first resolution.

129. The apparatus of claim 99, wherein the apparatus is configured such that:

the at least one of the first image or the second image, includes only the first image that has a first resolution;

the second image is generated with a second resolution that is a maximum resolution.

130. The apparatus of claim 99, wherein the apparatus is configured such that the at least portion of the at least one line analog signal is communicated over the line in parallel with the at least portion of the at least one other line analog signal being communicated over the another line.

131. The apparatus of claim 99, wherein the apparatus is configured such that the at least portion of the at least one line analog signal is combined with the at least portion of the at least one other line analog signal, by being averaged.

132. The apparatus of claim 99, wherein the apparatus is configured such that the other different cells of the image sensor correspond with the same color of light.

133. The apparatus of claim 99, wherein the apparatus is configured such that at least one of:

the combined analog signal reflects a gain;

the combined analog signal does not reflect a gain;

the different cells of the image sensor includes the first cell and the second cell;

the different cells of the image sensor includes the plurality of cells;

the plurality of cells includes the different cells of the image sensor;

the line and the another line include different rows;

the line and the another line include different columns;

the result based on the combination of the at least portion of the at least one line analog signal and the at least portion of the at least one other line analog signal, includes at least one analog signal that represents the combination of the at least portion of the at least one line analog signal and the at least portion of the at least one other line analog signal;

the result based on the combination of the at least portion of the at least one line analog signal and the at least portion of the at least one other line analog signal, includes the combination of the at least portion of the at least one line analog signal and the at least portion of the at least one other line analog signal;

the result based on the combination of the at least portion of the at least one line analog signal and the at least portion of the at least one other line analog signal, includes a processed version of the combination of the at least portion of the at least one line analog signal and the at least portion of the at least one other line analog signal;

the result based on the combination of the at least portion of the at least one line analog signal and the at least portion of the at least one other line analog signal, includes at least one analog signal with a gain applied thereto after the combination of the at least portion of the at least one line analog signal and the at least portion of the at least one other line analog signal;

the result based on the combination of the at least portion of the at least one line analog signal and the at least portion of the at least one other line analog signal, includes at least one analog signal with a gain applied thereto after the combination of the at least portion of the at least one line analog signal and the at least portion of the at least one other line analog signal;

the result based on the combination of the at least portion of the at least one line analog signal and the at least portion of the at least one other line analog signal, includes at least one analog signal with at least one gain applied before the combination of the at least portion of the at least one line analog signal and the at least portion of the at least one other line analog signal;

the at least one of the first image or the second image, includes only the first image;

the at least one of the first image or the second image, includes only the second image;

the at least one of the first image or the second image, includes both the first image and the second image;

the analog signals generated by the different cells corresponding with the same color of light are sampled before being combined;

the analog signals generated by the different cells corresponding with the same color of light are combined before being sampled;

at least one line analog signal and the at least one other line analog signal, include different rows;

at least one line analog signal and the at least one other line analog signal, include different columns;

the result based on the combination of the at least portion of the at least one line analog signal and the at least portion of the at least one other line analog signal, includes a direct result of the combination of the at least portion of the at least one line analog signal and the at least portion of the at least one other line analog signal;

the result based on the combination of the at least portion of the at least one line analog signal and the at least portion of the at least one other line analog signal, includes an indirect result of the combination of the at least portion of the at least one line analog signal and the at least portion of the at least one other line analog signal;

the result based on the combination of the at least portion of the at least one line analog signal and the at least portion of the at least one other line analog signal, includes a processed result of the combination of the at least portion of the at least one line analog signal and the at least portion of the at least one other line analog signal;

the image generation includes generating images that are ready for display; or the image generation includes generating images that are ready for use.

134. An apparatus, comprising:

an image sensor including a plurality of cells including: a first cell having a first photodiode generating a first analog signal, and a second cell having a second photodiode generating a second analog signal, for being utilized to generate at least a portion of one or more line analog signals;

a line in communication with the plurality of cells, the line communicating the one or more line analog signals;

a first analog-to-digital channel in communication with the line, the first analog-to-digital channel capable of receiving at least one of the one or more line analog signals for conversion thereof to a first line digital signal;

a second analog-to-digital channel in communication with the line, the second analog-to-digital channel capable of receiving at least one of the one or more line analog signals for conversion thereof to a second line digital signal; and circuitry in communication with the first analog-to-digital channel and the second analog-to-digital channel, the circuitry capable of receiving at least one of the first line digital signal or the second line digital signal, for image generation;

wherein the apparatus is configured such that the plurality of cells are each sampled with at least three different exposure times to generate at least three analog signals for being utilized to generate at least a portion of at least three different images including at least a portion of a first image, at least a portion of a second image, and at least a portion of a third image, based on which at least a portion of at least one high dynamic range (HDR) image is generated.

135. The apparatus of claim 134, wherein the apparatus is configured to generate a first HDR image utilizing the image sensor, and further comprising another image sensor that is utilized to generate an associated image, such that at a portion of the first HDR image is combined with at a portion of the associated image, for generating a resulting HDR image that is displayed.

136. The apparatus of claim 134, wherein the apparatus is configured to generate a first HDR image utilizing the image sensor, and further comprising another image sensor that is utilized to generate an associated image, such that at a portion of the first HDR image is combined with at a portion of the associated image, for generating the HDR image.

137. The apparatus of claim 134, wherein the apparatus is configured such that the at least three different images are each generated utilizing a different ISO.

138. The apparatus of claim 134, wherein the apparatus is configured such that at least a part of the first image is representative of light captured by the image sensor during only a first exposure time associated therewith.

139. The apparatus of claim 134, wherein the apparatus is configured such that the at least three different exposure times includes a first exposure time, a second exposure time, and a third exposure time, that do not overlap.

140. The apparatus of claim 134, wherein the apparatus is configured such that at least portions of readouts of the at least three analog signals, at least partially overlap in time.

141. The apparatus of claim 134, wherein the apparatus is configured such that at least portions of readouts of at least two of the at least three analog signals, at least partially occur concurrently.

142. The apparatus of claim 134, wherein the apparatus is configured such that at least portions of readouts of the at least three analog signals, at least partially occur concurrently.

143. The apparatus of claim 134, wherein the apparatus is configured such that the at least three different exposure times includes a first exposure time, a second exposure time, and a third exposure time; and the first exposure time starts first in order, the second exposure time starts second in order, and the third exposure time starts third in order.

144. The apparatus of claim 143, wherein the apparatus is configured such that the first exposure time is greater than the second exposure time, and the second exposure time is greater than the third exposure time.

145. The apparatus of claim 144, wherein the apparatus is configured such that at least portions of readouts of at least two of the at least three analog signals, at least partially occur concurrently.

146. The apparatus of claim 144, wherein the apparatus is configured such that at least portions of readouts of the at least three analog signals, at least partially occur concurrently.

147. The apparatus of claim 134, wherein the apparatus is configured such that a first gain is applied for the generation of the at least portion of the first image, and a second gain is applied for the generation of the at least portion of the second image.

148. The apparatus of claim 147, wherein the apparatus is configured such that:

the first gain is applied before at least a part of one or more line analog signals is read out to at least one of the first analog-to-digital channel or the second analog-to-digital channel for the at least portion of the first image; and a third gain is applied after the at least part of one or more line analog signals is read out to at least one of the first analog-to-digital channel or the second analog-to-digital channel for the at least portion of the first image and before the at least portion of the first image is converted to a digital format.

149. The apparatus of claim 148, wherein the apparatus is configured such that: the first gain is greater than the second gain, and the third gain is greater than a fourth gain that is capable of being applied.

150. The apparatus of claim 147, wherein the apparatus is configured such that:

the first gain is applied before at least a part of one or more line analog signals is read out to at least one of the first analog-to-digital channel or the second analog-to-digital channel for the at least portion of the first image;

the second gain is applied before at least a part of another one or more line analog signals is read out to at least one of the first analog-to-digital channel or the second analog-to-digital channel for the at least portion of the second image;

a third gain is applied for the generation of the at least portion of the first image after the at least part of one or more line analog signals is read out to at least one of the first analog-to-digital channel or the second analog-to-digital channel for the at least portion of the first image and before the at least portion of the first image is converted to a digital format; and a fourth gain is applied for the generation of the at least portion of the second image after the at least part of another one or more line analog signals is read out to at least one of the first analog-to-digital channel or the second analog-to-digital channel for the at least portion of the second image and before the at least portion of the second image is converted to the digital format.

151. The apparatus of claim 150, wherein the apparatus is configured such that:

the third gain is applied before the at least portion of the first image is converted to the digital format via the first analog-to-digital channel; and the fourth gain is applied before the at least portion of the second image is converted to the digital format via the second analog-to-digital channel.

152. The apparatus of claim 151, wherein the apparatus is configured such that: the first gain is greater than the second gain, and the third gain is greater than the fourth gain.

153. The apparatus of claim 134, wherein the apparatus is configured such that a first gain is applied to at least a part of a first one of the at least three analog signals before the same being read out to at least one of the first analog-to-digital channel or the second analog-to-digital channel for the at least portion of the first image, and a second gain is applied to at least a part of a second one of the at least three analog signals before the same being read out to at least one of the first analog-to-digital channel or the second analog-to-digital channel for the at least portion of the second image.

154. The apparatus of claim 134, wherein the apparatus is configured such that a first gain is applied to at least a part of one or more line analog signals after the same being read out to at least one of the first analog-to-digital channel or the second analog-to-digital channel for the at least portion of the first image, and a second gain is applied to at least a part of another one or more line analog signals after the same being read out to at least one of the first analog-to-digital channel or the second analog-to-digital channel for the at least portion of the second image.

155. The apparatus of claim 134, wherein the apparatus is configured such that:

a first gain is applied to at least a part of a first one of the at least three analog signals before the same being read out to at least one of the first analog-to-digital channel or the second analog-to-digital channel for the at least portion of the first image, and a second gain is applied to at least a part of one or more line analog signals after the same being read out to at least one of the first analog-to-digital channel or the second analog-to-digital channel for the at least portion of the second image; and the at least portion of the at least one HDR image is generated by: combining the at least portion of the first image and the at least portion of the second image to create at least a portion of a resulting image, and combining the at least portion of the resulting image and the at least portion of the third image.

156. The apparatus of claim 155, wherein the circuitry is separate from an application processor, and the apparatus is configured such that the at least portion of the first image and the at least portion of the second image are combined via the circuitry before the at least portion of the resulting image is sent to the application processor.

157. The apparatus of claim 156, wherein the apparatus is configured such that the application processor combines the at least portion of the resulting image and the at least portion of the third image.

158. The apparatus of claim 156, wherein the circuitry and the application processor are embodied in separate integrated circuits that are packaged in a single package.

159. The apparatus of claim 156, wherein the image sensor and the application processor are embodied in separate integrated circuits that are packaged in a single package.

160. The apparatus of claim 134, wherein the circuitry is part of an application processor that generates the at least portion of the at least one HDR image based on the at least portion of the first image, the at least portion of the second image, and the at least portion of the third image.

161. The apparatus of claim 160, wherein the image sensor and the application processor are embodied in separate integrated circuits that are packaged in a single package.

162. The apparatus of claim 134, wherein the apparatus is configured such that the at least one HDR image includes a first HDR image, one of the first HDR image or a second HDR image is generated without a first gain nor a second gain being applied, and another one of the first HDR image or the second HDR image is generated with at least one of the first gain or the second gain being applied, such that at least a portion of the first HDR image and at least a portion of the second HDR image are combined for generating at least a portion of a resultant HDR image.

163. The apparatus of claim 162, wherein the apparatus is configured such that the second HDR image is generated by combining different portions of different images which are generated by sampling the plurality of cells with the at least three different exposure times.

164. The apparatus of claim 162, wherein the apparatus is configured such that the second HDR image is generated without combining different portions of different images which are generated by sampling the plurality of cells with the at least three different exposure times.

165. The apparatus of claim 134, wherein the apparatus is configured such that the at least one HDR image includes a first HDR image, one of the first HDR image or a second HDR image is generated with one of a first gain or a second gain being applied, and another one of the first HDR image or the second HDR image is generated with another one of the first gain or the second gain being applied, such that at least a portion of the first HDR image and at least a portion of the second HDR image are combined for generating at least a portion of a resultant HDR image.

166. The apparatus of claim 165, wherein the apparatus is configured such that the second HDR image is generated by combining different portions of different images which are generated by sampling the plurality of cells with the at least three different exposure times.

167. The apparatus of claim 165, wherein the apparatus is configured such that the second HDR image is generated without combining different portions of different images which are generated by sampling the plurality of cells with the at least three different exposure times.

168. The apparatus of claim 134, wherein the apparatus is configured such that the at least one HDR image includes a first HDR image, one of the first HDR image or a second HDR image is generated with only one of a first gain or a second gain being applied, and another one of the first HDR image or the second HDR image is generated with both the first gain and the second gain being applied, such that at least a portion of the first HDR image and at least a portion of the second HDR image are combined for generating at least a portion of a resultant HDR image.

169. The apparatus of claim 168, wherein the apparatus is configured such that the second HDR image is generated by combining different portions of different images which are generated by sampling the plurality of cells with the at least three different exposure times.

170. The apparatus of claim 168, wherein the apparatus is configured such that the second HDR image is generated without combining different portions of different images which are generated by sampling the plurality of cells with the at least three different exposure times.

171. The apparatus of claim 134, wherein the apparatus is configured such that the plurality of cells includes different adjacent cells that correspond with a same color of light, and:

in the event that the image sensor is operating in a first mode, the first analog signal and the second analog signal are not combined for a single exposure before being utilized to generate the at least portion of the one or more line analog signals, and in the event that the image sensor is operating in a second mode, the first analog signal is combined with the second analog signal for the single exposure before being utilized to generate the at least portion of the one or more line analog signals.

172. The apparatus of claim 171, wherein the apparatus is configured such that at least one difference exists between a plurality of configurations including a first configuration for generating the at least portion of the first image and a second configuration for generating the at least portion of the second image, the at least one difference including at least one of:

one of the configurations does not amplify with neither a first gain nor a second gain, and another one of the configurations amplifies with at least one of the first gain or the second gain;

one of the configurations amplifies with only one of the first gain or the second gain, and another one of the configurations amplifies with both the first gain and the second gain;

one of the configurations amplifies with only one of the first gain or the second gain, and another one of the configurations amplifies with only another one of the first gain or the second gain;

one of the configurations utilizes only one of the first analog-to-digital channel or the second analog-to-digital channel for the image generation, and another one of the configurations utilizes both the first analog-to-digital channel and the second analog-to-digital channel for the image generation;

one of the configurations utilizes only one of the first analog-to-digital channel or the second analog-to-digital channel for the image generation, and another one of the configurations utilizes only another one of the first analog-to-digital channel or the second analog-to-digital channel for the image generation; or one of the configurations causes the image sensor to operate in the first mode, and another one of the configurations causes the image sensor to operate in the second mode.

173. The apparatus of claim 171, wherein the apparatus is configured such that at least one difference exists between a plurality of configurations including a first configuration for generating the at least portion of the first image and a second configuration for generating the at least portion of the second image, the at least one difference including at least two of:

one of the configurations does not amplify with neither a first gain nor a second gain, and another one of the configurations amplifies with at least one of the first gain or the second gain;

one of the configurations amplifies with only one of the first gain or the second gain, and another one of the configurations amplifies with both the first gain and the second gain;

one of the configurations amplifies with only one of the first gain or the second gain, and another one of the configurations amplifies with only another one of the first gain or the second gain;

one of the configurations utilizes only one of the first analog-to-digital channel or the second analog-to-digital channel for the image generation, and another one of the configurations utilizes both the first analog-to-digital channel and the second analog-to-digital channel for the image generation;

one of the configurations utilizes only one of the first analog-to-digital channel or the second analog-to-digital channel for the image generation, and another one of the configurations utilizes only another one of the first analog-to-digital channel or the second analog-to-digital channel for the image generation; and one of the configurations causes the image sensor to operate in the first mode, and another one of the configurations causes the image sensor to operate in the second mode.

174. The apparatus of claim 171, wherein the apparatus is configured such that at least one difference exists between a plurality of configurations including a first configuration for generating the at least portion of the first image and a second configuration for generating the at least portion of the second image, the at least one difference including at least three of:

one of the configurations does not amplify with neither a first gain nor a second gain, and another one of the configurations amplifies with at least one of the first gain or the second gain;

one of the configurations amplifies with only one of the first gain or the second gain, and another one of the configurations amplifies with both the first gain and the second gain;

one of the configurations amplifies with only one of the first gain or the second gain, and another one of the configurations amplifies with only another one of the first gain or the second gain;

one of the configurations utilizes only one of the first analog-to-digital channel or the second analog-to-digital channel for the image generation, and another one of the configurations utilizes both the first analog-to-digital channel and the second analog-to-digital channel for the image generation;

one of the configurations utilizes only one of the first analog-to-digital channel or the second analog-to-digital channel for the image generation, and another one of the configurations utilizes only another one of the first analog-to-digital channel or the second analog-to-digital channel for the image generation; and one of the configurations causes the image sensor to operate in the first mode, and another one of the configurations causes the image sensor to operate in the second mode.

175. The apparatus of claim 171, wherein the apparatus is configured such that at least one difference exists between a plurality of configurations including a first configuration for generating the at least portion of the first image, a second configuration for generating the at least portion of the second image, and a third configuration for generating the at least portion of the second image the at least one difference including at least one of:

one of the configurations does not amplify with neither a first gain nor a second gain, and another one of the configurations amplifies with at least one of the first gain or the second gain;

one of the configurations amplifies with only one of the first gain or the second gain, and another one of the configurations amplifies with both the first gain and the second gain;

one of the configurations amplifies with only one of the first gain or the second gain, and another one of the configurations amplifies with only another one of the first gain or the second gain;

one of the configurations utilizes only one of the first analog-to-digital channel or the second analog-to-digital channel for the image generation, and another one of the configurations utilizes both the first analog-to-digital channel and the second analog-to-digital channel for the image generation;

one of the configurations utilizes only one of the first analog-to-digital channel or the second analog-to-digital channel for the image generation, and another one of the configurations utilizes only another one of the first analog-to-digital channel or the second analog-to-digital channel for the image generation; or one of the configurations causes the image sensor to operate in the first mode, and another one of the configurations causes the image sensor to operate in the second mode.

176. The apparatus of claim 171, wherein the apparatus is configured such that at least one difference exists between a plurality of configurations including a first configuration for generating the at least portion of the first image, a second configuration for generating the at least portion of the second image, and a third configuration for generating the at least portion of the second image the at least one difference including at least two of:

one of the configurations does not amplify with neither a first gain nor a second gain, and another one of the configurations amplifies with at least one of the first gain or the second gain;

one of the configurations amplifies with only one of the first gain or the second gain, and another one of the configurations amplifies with both the first gain and the second gain;

one of the configurations amplifies with only one of the first gain or the second gain, and another one of the configurations amplifies with only another one of the first gain or the second gain;

one of the configurations utilizes only one of the first analog-to-digital channel or the second analog-to-digital channel for the image generation, and another one of the configurations utilizes both the first analog-to-digital channel and the second analog-to-digital channel for the image generation; and one of the configurations utilizes only one of the first analog-to-digital channel or the second analog-to-digital channel for the image generation, and another one of the configurations utilizes only another one of the first analog-to-digital channel or the second analog-to-digital channel for the image generation.

177. The apparatus of claim 171, wherein the apparatus is configured such that at least one difference exists between a plurality of configurations including a first configuration for generating the at least portion of the first image, a second configuration for generating the at least portion of the second image, and a third configuration for generating the at least portion of the second image the at least one difference including at least three of:

one of the configurations does not amplify with neither a first gain nor a second gain, and another one of the configurations amplifies with at least one of the first gain or the second gain;

one of the configurations amplifies with only one of the first gain or the second gain, and another one of the configurations amplifies with both the first gain and the second gain;

one of the configurations amplifies with only one of the first gain or the second gain, and another one of the configurations amplifies with only another one of the first gain or the second gain;

one of the configurations utilizes only one of the first analog-to-digital channel or the second analog-to-digital channel for the image generation, and another one of the configurations utilizes both the first analog-to-digital channel and the second analog-to-digital channel for the image generation; and one of the configurations utilizes only one of the first analog-to-digital channel or the second analog-to-digital channel for the image generation, and another one of the configurations utilizes only another one of the first analog-to-digital channel or the second analog-to-digital channel for the image generation.

178. The apparatus of claim 171, wherein the apparatus is configured such that:

the at least one HDR image includes a first HDR image, and the first HDR image and a second HDR image are generated in response to receipt of a user input for a shutter control;

at least a portion of the first HDR image is combined with at least a portion of the second HDR image, resulting in at least a portion of a resultant HDR image; and at least one difference exists between a plurality of processes including a first process for generating the at least portion of the first HDR image based on a single exposure and a second process for generating the at least portion of the second HDR image based on the another single exposure, the at least one difference including at least one of:

one of the processes does not amplify with neither a first gain nor a second gain, and another one of the processes amplifies with at least one of the first gain or the second gain;

one of the processes amplifies with only one of the first gain or the second gain, and another one of the processes amplifies with both the first gain and the second gain;

one of the processes amplifies with only one of the first gain or the second gain, and another one of the processes amplifies with only another one of the first gain or the second gain;

one of the processes utilizes only one of the first analog-to-digital channel or the second analog-to-digital channel for the image generation, and another one of the processes utilizes both the first analog-to-digital channel and the second analog-to-digital channel for the image generation;

one of the processes utilizes only one of the first analog-to-digital channel or the second analog-to-digital channel for the image generation, and another one of the processes utilizes only another one of the first analog-to-digital channel or the second analog-to-digital channel for the image generation; or one of the processes is performed when the image sensor operates in the first mode, and another one of the processes is performed when the image sensor operates in the second mode.

179. The apparatus of claim 171, wherein the apparatus is configured such that:

the at least one HDR image includes a first HDR image, and the first HDR image and a second HDR image are generated in response to receipt of a user input for a shutter control;

at least a portion of the first HDR image is combined with at least a portion of the second HDR image, resulting in at least a portion of a resultant HDR image; and at least one difference exists between a plurality of processes including a first process for generating the at least portion of the first HDR image based on a single exposure and a second process for generating the at least portion of the second HDR image based on the another single exposure, the at least one difference including at least two of:

one of the processes does not amplify with neither a first gain nor a second gain, and another one of the processes amplifies with at least one of the first gain or the second gain;

one of the processes amplifies with only one of the first gain or the second gain, and another one of the processes amplifies with both the first gain and the second gain;

one of the processes amplifies with only one of the first gain or the second gain, and another one of the processes amplifies with only another one of the first gain or the second gain;

one of the processes utilizes only one of the first analog-to-digital channel or the second analog-to-digital channel for the image generation, and another one of the processes utilizes both the first analog-to-digital channel and the second analog-to-digital channel for the image generation;

one of the processes utilizes only one of the first analog-to-digital channel or the second analog-to-digital channel for the image generation, and another one of the processes utilizes only another one of the first analog-to-digital channel or the second analog-to-digital channel for the image generation; and one of the processes is performed when the image sensor operates in the first mode, and another one of the processes is performed when the image sensor operates in the second mode.

180. The apparatus of claim 171, wherein the apparatus is configured such that:

the at least one HDR image includes a first HDR image, and the first HDR image and a second HDR image are generated in response to receipt of a user input for a shutter control;

at least a portion of the first HDR image is combined with at least a portion of the second HDR image, resulting in at least a portion of a resultant HDR image; and at least one difference exists between a plurality of processes including a first process for generating the at least portion of the first HDR image based on a single exposure and a second process for generating the at least portion of the second HDR image based on the another single exposure, the at least one difference including at least three of:

one of the processes does not amplify with neither a first gain nor a second gain, and another one of the processes amplifies with at least one of the first gain or the second gain;

one of the processes amplifies with only one of the first gain or the second gain, and another one of the processes amplifies with both the first gain and the second gain;

one of the processes amplifies with only one of the first gain or the second gain, and another one of the processes amplifies with only another one of the first gain or the second gain;

one of the processes utilizes only one of the first analog-to-digital channel or the second analog-to-digital channel for the image generation, and another one of the processes utilizes both the first analog-to-digital channel and the second analog-to-digital channel for the image generation;

one of the processes utilizes only one of the first analog-to-digital channel or the second analog-to-digital channel for the image generation, and another one of the processes utilizes only another one of the first analog-to-digital channel or the second analog-to-digital channel for the image generation; and one of the processes is performed when the image sensor operates in the first mode, and another one of the processes is performed when the image sensor operates in the second mode.

181. The apparatus of claim 134, wherein the apparatus is configured such that the plurality of cells includes different adjacent cells corresponding with a same color of light, and are subject to:

for a fourth image, a first sampling for which one or more analog signals generated by each of the different adjacent cells corresponding with the same color of light are combined, and for at least one of the first image, the second image, or the third image: a second sampling for which one or more analog signals generated by at least a subset of the different adjacent cells corresponding with the same color of light is sampled without being combined with any analog signal generated by any other of the different adjacent cells corresponding with the same color of light before a corresponding one of the at least three analog signals is generated.

182. The apparatus of claim 134, wherein the apparatus is configured such that the plurality of cells includes different adjacent cells corresponding with a same color of light, and are subject to:

for the first image, the second image, and the third image: one or more analog signals generated by each of the different adjacent cells corresponding with the same color of light are combined before a corresponding one of the at least three analog signals is generated, where different combinations of one or more gains of at least four gains are applied for each of the first image, the second image, and the third image, the different combinations including a first combination including: a first gain and a second gain applied in serial before corresponding line read outs via the line, and a second combination including: the first gain applied before a corresponding line read out via the line, and a third gain and a fourth gain applied in parallel after the corresponding line read out via the line.

183. The apparatus of claim 134, wherein the apparatus is configured such that the plurality of cells includes different adjacent cells corresponding with a same color of light, and are subject to:

for the first image, the second image, and the third image: a first sampling for which one or more analog signals generated by each of the different adjacent cells corresponding with the same color of light are combined before a corresponding one of the at least three analog signals is generated, and for a fourth image, a second sampling for which one or more analog signals generated by at least a subset of the different adjacent cells corresponding with the same color of light is sampled without being combined with any analog signal generated by any other of the different adjacent cells corresponding with the same color of light.

184. The apparatus of claim 134, wherein the apparatus is configured such that the plurality of cells includes different adjacent cells corresponding with a same color of light, and are subject to:

for at least one image including at least one of the first image, the second image, or the third image: a first sampling for which one or more analog signals generated by each of the different adjacent cells corresponding with the same color of light are combined before a corresponding one of the at least three analog signals is generated, and for a fourth image, a second sampling for which one or more analog signals generated by at least a subset of the different adjacent cells corresponding with the same color of light is sampled without being combined with any analog signal generated by any other of the different adjacent cells corresponding with the same color of light.

185. The apparatus of claim 134, wherein the apparatus is configured such that at least one of:

the plurality of cells are each sampled with the at least three different exposure times to generate at least three analog signals for being utilized to generate the at least portion of the at least three different images, by the plurality of cells each being sampled with: a first one of the at least three different exposure times to generate a first one of the at least three analog signals for being utilized to generate the at least portion of the first image, a second one of the at least three different exposure times to generate a second one of the at least three analog signals for being utilized to generate the at least portion of the second image, and a third one of the at least three different exposure times to generate a third one of the at least three analog signals for being utilized to generate the at least portion of the third image; or the plurality of cells are each sampled with the at least three different exposure times to generate at least three analog signals for being utilized to generate the at least portion of the at least three different images, by the plurality of cells each being sampled with: a first one of the at least three different exposure times to generate a first one of the at least three analog signals for being utilized to generate only the at least portion of the first image, a second one of the at least three different exposure times to generate a second one of the at least three analog signals for being utilized to generate only the at least portion of the second image, and a third one of the at least three different exposure times to generate a third one of the at least three analog signals for being utilized to generate only the at least portion of the third image.

186. An apparatus, comprising:

an image sensor including a plurality of cells including: a first cell having a first photodiode generating a first analog signal, and a second cell having a second photodiode generating a second analog signal, for being utilized to generate at least a portion of one or more line analog signals;

a line in communication with the plurality of cells, the line communicating the one or more line analog signals;

a first analog-to-digital channel in communication with the line, the first analog-to-digital channel capable of receiving at least one of the one or more line analog signals for conversion thereof to a first line digital signal;

a second analog-to-digital channel in communication with the line, the second analog-to-digital channel capable of receiving at least one of the one or more line analog signals for conversion thereof to a second line digital signal; and circuitry in communication with the first analog-to-digital channel and the second analog-to-digital channel, the circuitry capable of receiving at least one of the first line digital signal or the second line digital signal, for image generation;

wherein the apparatus is configured such that a first gain and a second gain are capable of being applied before the image generation, and the first analog signal is amplified with a third gain and a fourth gain, and the second analog signal is amplified with the third gain and the fourth gain, so that amplified analog signals are generated for a same single exposure, and the amplified analog signals are utilized to generate the at least portion of the one or more line analog signals for the same single exposure.

187. The apparatus of claim 186, wherein the apparatus is configured such that:

in a first mode of the image sensor, the first analog signal and the second analog signal are representative of a same color and the first analog signal and the second analog signal are combined before being amplified with the third gain and the fourth gain to generate the amplified analog signals that include a first amplified analog signal generated by amplification with the third gain and without the fourth gain and a second amplified analog signal generated by amplification with the fourth gain and without the third gain, where:

at least a first part of the at least portion of the one or more line analog signals is generated utilizing the first amplified analog signal, for communication of the at least first part of the at least portion of the one or more line analog signals utilizing one or more source-follower-configured transistors, and, thereafter, at least a second part of the at least portion of the one or more line analog signals is generated utilizing the second amplified analog signal, for communication of the at least second part of the at least portion of the one or more line analog signals utilizing the one or more source-follower-configured transistors; and in a second mode of the image sensor, at least one of the first gain or the second gain is applied without at least one of the third gain or the fourth gain.

188. The apparatus of claim 187, wherein the apparatus is configured such that the first analog-to-digital channel receives the at least first part of the at least portion of the one or more line analog signals and the second analog-to-digital channel receives the at least second part of the at least portion of the one or more line analog signals.

189. The apparatus of claim 187, wherein the apparatus is configured such that, when the image sensor operates in the first mode:

the at least first part of the at least portion of the one or more line analog signals is received by the first analog-to-digital channel after the amplification with the third gain and without the fourth gain, to generate the first line digital signal;

the at least second part of the at least portion of the one or more line analog signals is received by the second analog-to-digital channel after the amplification with the fourth gain and without the third gain, to generate the second line digital signal; and the circuitry is capable of receiving both the first line digital signal and the second line digital signal, and combining at least a portion of the first line digital signal and at least a portion of the second line digital signal, to generate a high dynamic range (HDR) image.

190. The apparatus of claim 189, wherein the apparatus is configured such that the third gain and the fourth gain are applied before utilizing the one or more source-follower-configured transistors to avoid amplification of noise associated with utilizing the one or more source-follower-configured transistors via the third gain and the fourth gain.

191. The apparatus of claim 187, wherein the apparatus is configured such that:

the at least first part of the at least portion of the one or more line analog signals is received by the first analog-to-digital channel after the amplification with the third gain and without the fourth gain, to generate the first line digital signal based on the first gain;

the at least second part of the at least portion of the one or more line analog signals is received by the second analog-to-digital channel after the amplification with the fourth gain and without the third gain, to generate the second line digital signal based on the second gain; and the circuitry is capable of receiving both the first line digital signal and the second line digital signal, and combining at least a portion of the first line digital signal and at least a portion of the second line digital signal, to generate a high dynamic range (HDR) image.

192. The apparatus of claim 191, wherein the apparatus is configured such that the first gain is greater than the second gain, and the third gain is greater than the fourth gain.

193. The apparatus of claim 191, wherein the apparatus is configured such that a ratio between first gain and the second gain is the same as a ratio between the third gain and the fourth gain.

194. The apparatus of claim 191, wherein the apparatus is configured such that the third gain and the fourth gain are applied before utilizing the one or more source-follower-configured transistors to avoid amplification of noise associated with utilizing the one or more source-follower-configured transistors via the third gain and the fourth gain, the first gain is applied after the communication of the at least first part of the at least portion of the one or more line analog signals utilizing the one or more source-follower-configured transistors for complementing the third gain, and the second gain is applied after the communication of the at least second part of the at least portion of the one or more line analog signals utilizing the one or more source-follower-configured transistors for complementing the fourth gain.

195. The apparatus of claim 187, wherein the apparatus is configured such that only one of the first analog-to-digital channel or the second analog-to-digital channel, receives both the at least first part of the at least portion of the one or more line analog signals and the at least second part of the at least portion of the one or more line analog signals.

196. The apparatus of claim 187, wherein the apparatus is configured such that:

the at least first part of the at least portion of the one or more line analog signals is received by the first analog-to-digital channel after the amplification with the third gain and without the fourth gain, to generate the first line digital signal;

the at least second part of the at least portion of the one or more line analog signals is received by the first analog-to-digital channel after the amplification with the fourth gain and without the third gain, to generate another first line digital signal; and the circuitry is capable of receiving both the first line digital signal and the another first line digital signal, and combining at least a portion of the first line digital signal and at least a portion of the another first line digital signal, to generate a high dynamic range (HDR) image.

197. The apparatus of claim 196, wherein the apparatus is configured such that the third gain and the fourth gain are applied before utilizing the one or more source-follower-configured transistors to avoid amplification of noise associated with utilizing the one or more source-follower-configured transistors via the third gain and the fourth gain.

198. The apparatus of claim 187, wherein the apparatus is configured such that:

the at least first part of the at least portion of the one or more line analog signals is received by the first analog-to-digital channel after the amplification with the third gain and without the fourth gain, to generate the first line digital signal based on the first gain after the communication of the at least first part of the at least portion of the one or more line analog signals utilizing the one or more source-follower-configured transistors;

the at least second part of the at least portion of the one or more line analog signals is received by the first analog-to-digital channel after the amplification with the fourth gain and without the third gain, to generate another first digital signal after the communication of the at least second part of the at least portion of the one or more line analog signals utilizing the one or more source-follower-configured transistors; and the circuitry is capable of receiving both the first line digital signal and the another first line digital signal, and combining at least a portion of the first line digital signal and at least a portion of the another first line digital signal, to generate a high dynamic range (HDR) image.

199. The apparatus of claim 198, wherein the apparatus is configured such that the third gain and the fourth gain are applied before utilizing the one or more source-follower-configured transistors to avoid amplification of noise associated with utilizing the one or more source-follower-configured transistors via the third gain and the fourth gain, and the first gain is applied after the communication of the at least first part of the at least portion of the one or more line analog signals utilizing the one or more source-follower-configured transistors for complementing the third gain.

200. The apparatus of claim 187, wherein the apparatus is configured such that at least a portion of a first image is generated while the image sensor is operating in the second mode and applying the first gain, the second gain, and the third gain for the image generation, without applying the fourth gain for the image generation.

201. The apparatus of claim 187, wherein the apparatus is configured such that at least a portion of a first image is generated while the image sensor is operating in the second mode and applying the first gain and the second gain for the image generation, without applying the third gain nor the fourth gain for the image generation.

202. The apparatus of claim 187, wherein the apparatus is configured such that at least a portion of a first image is generated while the image sensor is operating in the first mode and applying the third gain and the fourth gain, without applying the first gain nor the second gain for the image generation.

203. The apparatus of claim 187, wherein the apparatus is configured such that:

at least a portion of a first image is generated while the image sensor is operating in the first mode and applying the third gain and the fourth gain, without applying the first gain nor the second gain for the image generation; and at least a portion of a second image is generated while the image sensor is operating in the second mode and applying the first gain, the second gain, and the third gain, without applying the fourth gain for the image generation.

204. The apparatus of claim 203, wherein the apparatus is configured such that the at least portion of the first image and the at least portion of the second image are generated and combined in response to detecting a single shutter control user input, to generate a resultant high dynamic range (HDR) image.

205. The apparatus of claim 204, wherein the apparatus is configured such that the second image has a resolution that is greater than that of the first image.

206. The apparatus of claim 187, wherein the apparatus is configured such that:

the first photodiode generates, for another same single exposure, another first analog signal;

the second photodiode generates, for the another same single exposure, another second analog signal;

a first image is generated for the same single exposure and a second image is generated for the another same single exposure;

at least a portion of the first image and at least a portion of the second image are combined to generate at least a portion of a first high dynamic range (HDR) image.

207. The apparatus of claim 206, wherein the apparatus is configured such that:

the at least portion of the first image is generated while the image sensor is operating in the first mode; and the at least portion of the second image is generated while the image sensor is operating in the second mode.

208. The apparatus of claim 207, wherein the apparatus is configured such that:

the at least portion of the first image is generated by utilizing only one of the first analog-to-digital channel or the second analog-to-digital channel; and the at least portion of the second image is generated by utilizing only another one of the first analog-to-digital channel or the second analog-to-digital channel.

209. The apparatus of claim 207, wherein the apparatus is configured such that:

the at least portion of the first image is generated by utilizing only one of the first analog-to-digital channel or the second analog-to-digital channel; and the at least portion of the second image is generated by utilizing both the first analog-to-digital channel and the second analog-to-digital channel.

210. The apparatus of claim 207, wherein the apparatus is configured such that:

the at least portion of the first image is generated by utilizing both the first analog-to-digital channel and the second analog-to-digital channel; and the at least portion of the second image is generated by utilizing only one of the first analog-to-digital channel or the second analog-to-digital channel.

211. The apparatus of claim 206, wherein the apparatus is configured such that:

the at least portion of the first image is generated while the image sensor is operating in a third mode that causes the first image to have a resolution that is greater than that of the second image and is less than that of a third image generated while the image sensor is operating in the second mode; and the at least portion of the second image is generated while the image sensor is operating in the first mode.

212. The apparatus of claim 211, wherein the apparatus is configured such that:

the at least portion of the first image is generated by utilizing only one of the first analog-to-digital channel or the second analog-to-digital channel; and the at least portion of the second image is generated by utilizing only another one of the first analog-to-digital channel or the second analog-to-digital channel.

213. The apparatus of claim 211, wherein the apparatus is configured such that:

the at least portion of the first image is generated by utilizing only one of the first analog-to-digital channel or the second analog-to-digital channel; and the at least portion of the second image is generated by utilizing both the first analog-to-digital channel and the second analog-to-digital channel.

214. The apparatus of claim 211, wherein the apparatus is configured such that:

the at least portion of the first image is generated by utilizing both the first analog-to-digital channel and the second analog-to-digital channel; and the at least portion of the second image is generated by utilizing only one of the first analog-to-digital channel or the second analog-to-digital channel.

215. The apparatus of claim 206, wherein the apparatus is configured such that:

the at least portion of the first image is generated while the image sensor is operating in the first mode; and the at least portion of the second image is generated while the image sensor is operating in the first mode.

216. The apparatus of claim 215, wherein the apparatus is configured such that:

the at least portion of the first image is generated by utilizing only one of the first analog-to-digital channel or the second analog-to-digital channel; and the at least portion of the second image is generated by utilizing only another one of the first analog-to-digital channel or the second analog-to-digital channel.

217. The apparatus of claim 215, wherein the apparatus is configured such that:

the at least portion of the first image is generated by utilizing only one of the first analog-to-digital channel or the second analog-to-digital channel; and the at least portion of the second image is generated by utilizing both the first analog-to-digital channel and the second analog-to-digital channel.

218. The apparatus of claim 215, wherein the apparatus is configured such that:

the at least portion of the first image is generated by utilizing both the first analog-to-digital channel and the second analog-to-digital channel; and the at least portion of the second image is generated by utilizing only one of the first analog-to-digital channel or the second analog-to-digital channel.

219. The apparatus of claim 187, wherein the apparatus is configured such that:

the same single exposure is sampled during a first time period to generate the at least first part of the at least portion of the one or more line analog signals;

the same single exposure is sampled during a second time period, after and not overlapping with the first time period, to generate the at least second part of the at least portion of the one or more line analog signals.

220. The apparatus of claim 187, wherein the apparatus is configured such that:

the same single exposure is sampled during a first time period to generate the at least first part of the at least portion of the one or more line analog signals;

the same single exposure is sampled during a second time period, after and not overlapping with the first time period, to generate the at least second part of the at least portion of the one or more line analog signals, such that:

the at least first part of the at least portion of the one or more line analog signals and the at least second part of the at least portion of the one or more line analog signals are generated based on a same single voltage level that is stored based on the same single exposure, to reduce motion blur.

221. The apparatus of claim 187, wherein the apparatus is configured such that the third gain and the fourth gain are applied by an amplifying circuit that is a component of a sampling circuit that is in communication between the line, and the first and second photodiodes.

222. The apparatus of claim 221, wherein the apparatus is configured such that the first gain and the second gain are applied by different amplifying circuits that are in communication between the line, and the circuitry.

223. The apparatus of claim 222, wherein the apparatus is configured such that the amplifying circuit is shared among at least one cell including a plurality of photodiodes.

224. The apparatus of claim 187, wherein the apparatus is configured such that:

neither the first gain nor the second gain is applied, in the first mode of the image sensor; and both the first gain and the second gain are applied and only one of the third gain or the fourth gain is applied, in the second mode of the image sensor.

225. The apparatus of claim 187, wherein the apparatus is configured such that:

neither the first gain nor the second gain is applied, in the first mode of the image sensor; and both the third gain and the fourth gain are applied, in the second mode of the image sensor.

226. The apparatus of claim 187, wherein the apparatus is configured such that:

only one of the first gain or the second gain is applied, in the first mode of the image sensor; and both the first gain and the second gain are applied and only one of the third gain or the fourth gain is applied, in the second mode of the image sensor.

227. The apparatus of claim 187, wherein the apparatus is configured such that:

only one of the first gain or the second gain is applied, in the first mode of the image sensor; and both the third gain and the fourth gain are applied, in the second mode of the image sensor.

228. The apparatus of claim 187, wherein the apparatus is configured such that no binning occurs during the second mode.

229. The apparatus of claim 187, wherein the apparatus is configured such that a different non-zero amount of binning occurs during the second mode, as compared to the first mode.

230. The apparatus of claim 187, wherein the apparatus is configured such that no photodiode-generated analog signals are combined during the second mode.

231. The apparatus of claim 187, wherein the apparatus is configured such that a different number of analog signals are combined from a different number of cells during the second mode, as compared to the first mode.

232. The apparatus of claim 187, wherein the apparatus is configured such that the first analog signal and the second analog signal are combined before being amplified.

233. The apparatus of claim 186, wherein the apparatus is configured such that at least one of the third gain or the fourth gain is capable of being applied to at least one of the first analog signal or the second analog signal before one or more source-follower-configured transistors is utilized for communication thereof via the line as the at least one of the one or more line analog signals, and at least one of the first gain or the second gain is capable of being applied to the at least one of the one or more line analog signals after the one or more source-follower-configured transistors is utilized for communication thereof via the line.

234. The apparatus of claim 186, wherein the apparatus is configured such that at least one of the third gain or the fourth gain is applied to at least one of the first analog signal or the second analog signal before one or more source-follower-configured transistors is utilized for communication thereof via the line as the at least portion of the one or more line analog signals, and at least one of the first gain or the second gain is applied to the at least portion of the one or more line analog signals after the one or more source-follower-configured transistors is utilized for communication thereof via the line, where application of the at least one of the third gain or the fourth gain avoids noise associated with utilization of the one or more source-follower-configured transistors.

235. The apparatus of claim 186, wherein the apparatus is configured to generate a first HDR image utilizing the image sensor, and further comprising another image sensor that is utilized to generate an associated image, such that at a portion of the first HDR image is combined with at a portion of the associated image, for generating a resulting HDR image that is displayed.

236. The apparatus of claim 186, wherein the apparatus is configured to generate a first HDR image utilizing the image sensor, and further comprising another image sensor that is utilized to generate an associated image, such that at a portion of the first HDR image is combined with at a portion of the associated image, for generating a resulting HDR image that is displayed.

237. A non-transitory computer-readable media storing instructions that, when executed by one or more circuits of an apparatus that includes an image sensor including a plurality of cells, a first analog-to-digital channel, a second analog-to-digital channel, and circuitry, cause the apparatus to:

generate at least one analog signal;

apply a first gain to the at least one analog signal for generating a first gain-amplified analog signal;

convert the first gain-amplified analog signal to a first gain-amplified digital signal;

apply a second gain for generating a second gain-amplified analog signal;

convert the second gain-amplified analog signal to a second gain-amplified digital signal; and combine at least a portion of the first gain-amplified digital signal and at least a portion of the second gain-amplified digital signal, resulting in image generation;

wherein different adjacent cells of the image sensor correspond with a same color of light, and the instructions, when executed by the one or more circuits of the apparatus, cause the apparatus to perform:

for a first image, a first sampling for which one or more analog signals generated by each of the different adjacent cells corresponding with the same color of light is sampled and combined, and for a second image, a second sampling for which one or more analog signals generated by at least a subset of the different adjacent cells corresponding with the same color of light is sampled without being combined with any analog signal generated by any other of the different adjacent cells corresponding with the same color of light.

238. The non-transitory computer-readable media of claim 237, wherein the instructions, when executed by the one or more circuits of the apparatus, cause the apparatus to operate such that:

for a third image, the different adjacent cells of the image sensor are subject to a third sampling for which one or more analog signals generated by each of the different adjacent cells corresponding with the same color of light is sampled and combined, where at least a portion of at least one third-image-related column analog signal that corresponds to a column in communication with the different adjacent cells of the image sensor, is combined with at least a portion of at least one other third-image-related column analog signal that corresponds to another column in communication with other different adjacent cells of the image sensor corresponding with the same color of light;

the first gain and the second gain are applied for the third image; and a third gain and a fourth gain are applied to one or more analog signals after at least one of the first gain or the second gain is applied thereto.

239. The non-transitory computer-readable media of claim 238, wherein the instructions, when executed by the one or more circuits of the apparatus, cause the apparatus to operate such that:

for the third image:

the first gain is applied to generate a first part of the at least portion of the at least one third-image-related column analog signal that corresponds to the column associated with the different adjacent cells of the image sensor, after the first gain is applied, the second gain is applied to generate a second part of the at least portion of the at least one third-image-related column analog signal that corresponds to the column associated with the different adjacent cells of the image sensor, and at least a portion of a digital form of the first part of the at least portion of the at least one third-image-related column analog signal is combined with at least a portion of a digital form of the second part of the at least portion of the at least one third-image-related column analog signal, to generate a first high dynamic range (HDR) image; and in response to receiving user input, the image sensor switches modes, such that, for the first image:

the first gain is applied without application of the second gain to generate at least a portion of at least one first-image-related column analog signal that corresponds to the column associated with the different adjacent cells of the image sensor, after the first gain is applied, the third gain is applied, before generating a first digital signal for the first image, after the first gain is applied, the fourth gain is applied, before generating a second digital signal for the first image, and at least a portion of the first digital signal for the first image is combined with at least a portion of the second digital signal for the first image, to generate a second high dynamic range (HDR) image.

240. The non-transitory computer-readable media of claim 239, wherein the instructions, when executed by the one or more circuits of the apparatus, cause the apparatus to operate such that the first image is generated, by:

the first gain being applied without application of the second gain to generate the at least portion of the at least one first-image-related column analog signal that corresponds to the column in communication with the different adjacent cells of the image sensor;

after the first gain is applied, the third gain being applied to the at least portion of the at least one first-image-related column analog signal that corresponds to the column in communication with the different adjacent cells of the image sensor, before generating the first digital signal for the first image; and after the first gain is applied, the fourth gain being applied to the at least portion of the at least one first-image-related column analog signal that corresponds to the column in communication with the different adjacent cells of the image sensor, before generating the second digital signal for the first image.

241. The non-transitory computer-readable media of claim 238, wherein the instructions, when executed by the one or more circuits of the apparatus, cause the apparatus to operate such that:

the third gain and the fourth gain are applied to the one or more analog signals that are generated for at least one of the first image or the second image; and the third and fourth gains are not applied for the third image.

242. The non-transitory computer-readable media of claim 241, wherein the instructions, when executed by the one or more circuits of the apparatus, cause the apparatus to operate such that the first gain is greater than the second gain, and the third gain is greater than the fourth gain.

243. The non-transitory computer-readable media of claim 238, wherein the instructions, when executed by the one or more circuits of the apparatus, cause the apparatus to operate such that:

for the third image:

the first gain is applied to generate a first part of the at least portion of the at least one third-image-related column analog signal that corresponds to the column associated with the different adjacent cells of the image sensor, after the first gain is applied, the second gain is applied to generate a second part of the at least portion of the at least one third-image-related column analog signal that corresponds to the column associated with the different adjacent cells of the image sensor, and at least a portion of a digital form of the first part of the at least portion of the at least one third-image-related column analog signal is combined with at least a portion of a digital form of the second part of the at least portion of the at least one third-image-related column analog signal, to generate a first high dynamic range (HDR) image; and in response to receiving user input, the image sensor switches modes, such that, for the second image:

the first gain is applied without application of the second gain to generate at least a portion of at least one second-image-related column analog signal that corresponds to the column associated with the different adjacent cells of the image sensor, after the first gain is applied, the third gain is applied, before generating a first digital signal for the second image, after the first gain is applied, the fourth gain is applied, before generating a second digital signal for the second image, and at least a portion of the first digital signal for the second image is combined with at least a portion of the second digital signal for the second image, to generate a second high dynamic range (HDR) image.

244. The non-transitory computer-readable media of claim 238, wherein the instructions, when executed by the one or more circuits of the apparatus, cause the apparatus to operate such that:

in response to receipt of a user input for a shutter control:

a plurality of the third images are each generated, by:

the first gain being applied to generate a first part of the at least portion of the at least one third-image-related column analog signal, for a corresponding one of the plurality of the third images, that corresponds to the column associated with the different adjacent cells of the image sensor, and after the first gain is applied, the second gain being applied to generate a second part of the at least portion of the at least one third-image-related column analog signal, for the corresponding one of the plurality of the third images, that corresponds to the column associated with the different adjacent cells of the image sensor;

at least a portion of a first one of the plurality of third images, a second one of the plurality of third images, and a third one of the plurality of third images, are combined to generate at least a portion of at least one synthetic image;

the first image is generated; and the at least portion of the at least one synthetic image is combined with at least a portion of the first image, to generate a high dynamic range (HDR) image.

245. The non-transitory computer-readable media of claim 244, wherein the instructions, when executed by the one or more circuits of the apparatus, cause the apparatus to operate such that: the plurality of the third images are generated without applying the third gain and the fourth gain.

246. The non-transitory computer-readable media of claim 244, wherein the instructions, when executed by the one or more circuits of the apparatus, cause the apparatus to operate such that: the first gain is greater than the second gain, and the third gain is greater than the fourth gain.

247. The non-transitory computer-readable media of claim 238, wherein the instructions, when executed by the one or more circuits of the apparatus, cause the apparatus to operate such that:

in response to receipt of a user input for a shutter control:

a plurality of the third images are each generated, by:

the first gain being applied to generate a first part of the at least portion of the at least one third-image-related column analog signal, for a corresponding one of the plurality of the third images, that corresponds to the column associated with the different adjacent cells of the image sensor, and after the first gain is applied, the second gain being applied to generate a second part of the at least portion of the at least one third-image-related column analog signal, for the corresponding one of the plurality of the third images, that corresponds to the column associated with the different adjacent cells of the image sensor;

at least a portion of a first one of the plurality of third images, a second one of the plurality of third images, and a third one of the plurality of third images, are combined to generate at least a portion of at least one synthetic image;

the second image is generated; and the at least portion of the at least one synthetic image is combined with at least a portion of the second image, to generate a high dynamic range (HDR) image.

248. The non-transitory computer-readable media of claim 238, wherein the instructions, when executed by the one or more circuits of the apparatus, cause the apparatus to operate such that the third gain and the fourth gain are capable of being applied to the at least portion of the at least one third-image-related column analog signal after the at least portion of the at least one third-image-related column analog signal is combined with the at least portion of the at least one other third-image-related column analog signal for a different column.

249. The non-transitory computer-readable media of claim 238, wherein the instructions, when executed by the one or more circuits of the apparatus, cause the apparatus to operate such that the third gain and the fourth gain are capable of being applied to the at least portion of the at least one third-image-related column analog signal before the at least portion of the at least one third-image-related column analog signal is combined with the at least portion of the at least one other third-image-related column analog signal.

250. The non-transitory computer-readable media of claim 238, wherein the instructions, when executed by the one or more circuits of the apparatus, cause the apparatus to operate such that the second gain is applied to the at least one column analog signal for generating the second gain-amplified analog signal.

251. The non-transitory computer-readable media of claim 238, wherein the instructions, when executed by the one or more circuits of the apparatus, cause the apparatus to operate such that the at least one analog signal is captured during a first exposure of a photographic scene, and the second gain is applied to at least one other analog signal captured during a second exposure of the photographic scene for generating the second gain-amplified analog signal.

252. A non-transitory computer-readable media storing instructions that, when executed by one or more circuits of an apparatus that includes an image sensor including a plurality of cells, a first analog-to-digital channel, a second analog-to-digital channel, and circuitry, cause the apparatus to:

generate at least one analog signal;

apply a first gain to the at least one analog signal for generating a first gain-amplified analog signal;

convert the first gain-amplified analog signal to a first gain-amplified digital signal;

apply a second gain for generating a second gain-amplified analog signal;

convert the second gain-amplified analog signal to a second gain-amplified digital signal; and combine at least a portion of the first gain-amplified digital signal and at least a portion of the second gain-amplified digital signal, resulting in image generation;

wherein first and second cells of the image sensor correspond with a same color of light, and the instructions, when executed by the one or more circuits of the apparatus, cause the apparatus to perform:

for a first image, a first sampling for which a first analog signal and a second analog signal generated by the first and second cells corresponding with the same color of light are sampled and combined before at least one of the first gain or the second gain is applied thereto; and for a second image, a second sampling for which at least one of the first analog signal or the second analog signal is sampled such that the combining of the first analog signal and the second analog signal does not occur before at least one of the first gain or the second gain is applied thereto.

253. A non-transitory computer-readable media storing instructions that, when executed by one or more circuits of an apparatus that includes an image sensor including a plurality of cells, a first analog-to-digital channel, a second analog-to-digital channel, and circuitry, cause the apparatus to:

generate at least one analog signal;

apply a first gain to the at least one analog signal for generating a first gain-amplified analog signal;

convert the first gain-amplified analog signal to a first gain-amplified digital signal;

apply a second gain for generating a second gain-amplified analog signal;

convert the second gain-amplified analog signal to a second gain-amplified digital signal; and combine at least a portion of the first gain-amplified digital signal and at least a portion of the second gain-amplified digital signal, resulting in image generation;

wherein the instructions, when executed by the one or more circuits of the apparatus, cause the apparatus to operate such that at least three different cells are sampled with at least three different exposure times to generate at least three analog signals for being combined to generate at least a portion of a first image.

254. A non-transitory computer-readable media storing instructions that, when executed by one or more circuits of an apparatus that includes an image sensor including a plurality of cells, a first analog-to-digital channel, a second analog-to-digital channel, and circuitry, cause the apparatus to:

generate at least one analog signal;

apply a first gain to the at least one analog signal for generating a first gain-amplified analog signal;

convert the first gain-amplified analog signal to a first gain-amplified digital signal;

apply a second gain for generating a second gain-amplified analog signal;

convert the second gain-amplified analog signal to a second gain-amplified digital signal; and combine at least a portion of the first gain-amplified digital signal and at least a portion of the second gain-amplified digital signal, resulting in image generation;

wherein the instructions, when executed by the one or more circuits of the apparatus, cause the apparatus to operate such that, in response to receiving a user input to capture a photographic scene:

at least a portion of a first image is generated for the photographic scene utilizing a first brightness level at a first time, at least a portion of a second image is generated for the photographic scene utilizing a second brightness level at a second time, and the at least portion of the first image is combined with the at least portion of the second image to generate at least a portion of at least one high dynamic range (HDR) image.

255. The non-transitory computer-readable media of claim 254, wherein the instructions, when executed by the one or more circuits of the apparatus, cause the apparatus to operate such that, for both the first image and the second image:

the at least one analog signal corresponds with the photographic scene at a different corresponding time;

the first gain and the second gain are both applied;

the second gain is applied to the at least one analog signal for generating the second gain-amplified analog signal;

the first image is generated for the photographic scene utilizing the first brightness level at the first time, and the second image is generated for the photographic scene utilizing the second brightness level at the second time, based on receiving additional user input selecting a corresponding mode of operation;

the first image and the second image include ambient images that are generated without a strobe illumination; and the first image and the second image are generated in addition to additional images for the photographic scene, such that the first image and the second image are selected based on a quality thereof, instead of one or more of the additional images, for generating the least one HDR image for the photographic scene.

256. The non-transitory computer-readable media of claim 255, wherein the instructions, when executed by the one or more circuits of the apparatus, cause the apparatus to operate such that a third gain and a fourth gain are capable of being applied, but are not applied for the generation of the first image and the second image.

257. The non-transitory computer-readable media of claim 255, wherein the instructions, when executed by the one or more circuits of the apparatus, cause the apparatus to operate such that the first gain and the second gain are applied in sequence.

258. A non-transitory computer-readable media storing instructions that, when executed by one or more circuits of an apparatus that includes an image sensor including a plurality of cells, a first analog-to-digital channel, a second analog-to-digital channel, and circuitry, cause the apparatus to:

generate at least one analog signal;

apply a first gain to the at least one analog signal for generating a first gain-amplified analog signal;

convert the first gain-amplified analog signal to a first gain-amplified digital signal;

apply a second gain for generating a second gain-amplified analog signal;

convert the second gain-amplified analog signal to a second gain-amplified digital signal; and combine at least a portion of the first gain-amplified digital signal and at least a portion of the second gain-amplified digital signal, resulting in image generation;

wherein the instructions, when executed by the one or more circuits of the apparatus, cause the apparatus to operate such that:

the plurality of cells are each sampled with at least three different exposure times to generate at least three analog signals for being utilized to generate at least a portion of at least three different images including at least a portion of a first image, at least portion of a second image, and at least portion of a third image, based on which at least a portion of at least one high dynamic range (HDR) image is generated.

259. The non-transitory computer-readable media of claim 258, wherein the instructions, when executed by the one or more circuits of the apparatus, cause the apparatus to operate such that: the at least portion of the at least three different images are generated utilizing a rolling shutter that is configured so that the at least three different exposure times do not overlap and include a first exposure time that starts first in order and that has a first duration, a second exposure time that starts second in order and that has a second duration greater than the first duration, and a third exposure time that starts third in order and that has a third duration greater than the second duration.

260. The non-transitory computer-readable media of claim 258, wherein the instructions, when executed by the one or more circuits of the apparatus, cause the apparatus to operate such that: the at least portion of the at least three different images are generated utilizing a rolling shutter that is configured so that the at least three different exposure times do not overlap and include:

a first exposure time that starts first in order and that has a first duration that occurs after a first reset signal corresponding to the at least portion of the first image;

a second exposure time that starts second in order and that has a second duration less than the first duration, where the second duration occurs after a second reset signal corresponding to the at least portion of the second image, and a third exposure time that starts third in order and that has a third duration less than the second duration, where the third duration occurs after a third reset signal corresponding to the at least portion of the third image.

261. The non-transitory computer-readable media of claim 260, wherein the instructions, when executed by the one or more circuits of the apparatus, cause the apparatus to operate such that: the first gain is applied for the generation of the at least portion of the first image, and the second gain is applied for the generation of the at least portion of the second image.

262. The non-transitory computer-readable media of claim 260, wherein the instructions, when executed by the one or more circuits of the apparatus, cause the apparatus to operate such that: only the first gain is applied for the generation of the at least portion of the first image, and only the second gain is applied for the generation of the at least portion of the second image.

263. The non-transitory computer-readable media of claim 260, wherein the instructions, when executed by the one or more circuits of the apparatus, cause the apparatus to operate such that: the first gain is applied before a read out of at least a portion of one or more line analog signals to at least one of the first analog-to-digital channel or the second analog-to-digital channel for the at least portion of the first image, the second gain is applied before a read out of at least a portion of one or more line analog signals to at least one of the first analog-to-digital channel or the second analog-to-digital channel for the at least portion of the second image.

264. The non-transitory computer-readable media of claim 260, wherein the instructions, when executed by the one or more circuits of the apparatus, cause the apparatus to operate such that: the first gain is applied after at least a portion of one or more line analog signals a read out to at least one of the first analog-to-digital channel or the second analog-to-digital channel for the at least portion of the first image, the second gain is applied after at least a portion of one or more line analog signals is read out to at least one of the first analog-to-digital channel or the second analog-to-digital channel for the at least portion of the second image.

265. The non-transitory computer-readable media of claim 264, wherein the instructions, when executed by the one or more circuits of the apparatus, cause the apparatus to operate such that:

the first gain is applied via the first analog-to-digital channel; and the second gain is applied via the second analog-to-digital channel.

266. The non-transitory computer-readable media of claim 260, wherein the instructions, when executed by the one or more circuits of the apparatus, cause the apparatus to operate such that:

the first gain is applied before at least a portion of one or more line analog signals is read out to at least one of the first analog-to-digital channel or the second analog-to-digital channel for the at least portion of the first image; and a third gain is applied after the at least portion of the one or more line analog signals is read out to at least one of the first analog-to-digital channel or the second analog-to-digital channel for the at least portion of the first image and before the at least portion of the first image is converted to a digital format.

267. The non-transitory computer-readable media of claim 266, wherein the instructions, when executed by the one or more circuits of the apparatus, cause the apparatus to operate such that:

the second gain is applied before at least a portion of one or more line analog signals is read out to at least one of the first analog-to-digital channel or the second analog-to-digital channel for the at least portion of the second image; and a fourth gain is applied after the at least portion of the one or more line analog signals is read out to at least one of the first analog-to-digital channel or the second analog-to-digital channel for the at least portion of the second image and before the at least portion of the second image is converted to a digital format.

268. The non-transitory computer-readable media of claim 267, wherein the instructions, when executed by the one or more circuits of the apparatus, cause the apparatus to operate such that: the first gain is greater than the second gain, and the third gain is greater than the fourth gain.

269. The non-transitory computer-readable media of claim 260, wherein the instructions, when executed by the one or more circuits of the apparatus, cause the apparatus to operate such that:

the first gain is applied before at least a portion of one or more line analog signals is read out to at least one of the first analog-to-digital channel or the second analog-to-digital channel for the at least portion of the first image;

the second gain is applied before at least a portion of one or more line analog signals is read out to at least one of the first analog-to-digital channel or the second analog-to-digital channel for the at least portion of the second image;

a third gain is applied after the at least portion of the one or more line analog signals is read out to at least one of the first analog-to-digital channel or the second analog-to-digital channel for the at least portion of the first image and before the at least portion of the first image is converted to a digital format; and a fourth gain is applied after the at least portion of the one or more line analog signals is read out to at least one of the first analog-to-digital channel or the second analog-to-digital channel for the at least portion of the second image and before the at least portion of the second image is converted to the digital format.

270. The non-transitory computer-readable media of claim 269, wherein the instructions, when executed by the one or more circuits of the apparatus, cause the apparatus to operate such that:

the third gain is applied before the at least portion of the first image is converted to the digital format via the first analog-to-digital channel; and the fourth gain is applied before the at least portion of the second image is converted to the digital format via the second analog-to-digital channel.

271. The non-transitory computer-readable media of claim 270, wherein the instructions, when executed by the one or more circuits of the apparatus, cause the apparatus to operate such that: the first gain is greater than the second gain, and the third gain is greater than the fourth gain.

272. The non-transitory computer-readable media of claim 260, wherein the instructions, when executed by the one or more circuits of the apparatus, cause the apparatus to operate such that: the at least one HDR image includes a first HDR image, the first HDR image is generated by: combining the at least portion of the first image and the at least portion of the second image to create at least a portion of a resulting image, and combining the at least portion of the resulting image and the at least portion of the third image.

273. The non-transitory computer-readable media of claim 272, wherein the instructions, when executed by the one or more circuits of the apparatus, cause the apparatus to operate such that: the at least portion of the first image and the at least portion of the second image are combined before the at least portion of the resulting image being sent to an application processor, and the at least portion of the resulting image and the at least portion of the third image are combined utilizing the application processor.

274. The non-transitory computer-readable media of claim 260, wherein the instructions, when executed by the one or more circuits of the apparatus, cause the apparatus to operate such that: the at least one HDR image includes a first HDR image, an application processor generates the first HDR image based on the at least portion of the first image, the at least portion of the second image, and the at least portion of the third image.

275. The non-transitory computer-readable media of claim 260, wherein the instructions, when executed by the one or more circuits of the apparatus, cause the apparatus to operate such that: different adjacent cells of the image sensor correspond with a same color of light, and are subject to:

for at least one of the first image, the second image, or the third image: a sampling for which one or more analog signals generated by each of the different adjacent cells corresponding with the same color of light are combined to form a combined signal that is amplified with both the first gain and the second gain to generate a first gain-amplified analog signal and a second gain-amplified analog signal.

276. The non-transitory computer-readable media of claim 275, wherein the instructions, when executed by the one or more circuits of the apparatus, cause the apparatus to operate such that: different combinations of gains are applied for at least two of the first image, the second image, and the third image.

277. The non-transitory computer-readable media of claim 260, wherein the instructions, when executed by the one or more circuits of the apparatus, cause the apparatus to operate such that: different adjacent cells of the image sensor correspond with a same color of light, and are subject to:

for the first image, the second image, and the third image: a first sampling for which one or more analog signals generated by each of the different adjacent cells corresponding with the same color of light are combined, and for a fourth image, a second sampling for which one or more analog signals generated by at least a subset of the different adjacent cells corresponding with the same color of light is sampled without being combined with any analog signal generated by any other of the different adjacent cells corresponding with the same color of light.

278. The non-transitory computer-readable media of claim 260, wherein the instructions, when executed by the one or more circuits of the apparatus, cause the apparatus to operate such that: different adjacent cells of the image sensor correspond with a same color of light, and are subject to:

for at least the first image, a first sampling for which one or more analog signals generated by each of the different adjacent cells corresponding with the same color of light are combined, and for a fourth image, a second sampling for which one or more analog signals generated by at least a subset of the different adjacent cells corresponding with the same color of light is sampled without being combined with any analog signal generated by any other of the different adjacent cells corresponding with the same color of light.

279. The non-transitory computer-readable media of claim 260, wherein the instructions, when executed by the one or more circuits of the apparatus, cause the apparatus to operate such that:

the at least one analog signal is generated as a result of a single exposure;

the second gain is applied to the at least one analog signal for generating the second gain-amplified analog signal;

the at least portion of the first gain-amplified digital signal and the at least portion of the second gain-amplified digital signal are combined to generate the at least portion of the first image.

280. The non-transitory computer-readable media of claim 260, wherein the instructions, when executed by the one or more circuits of the apparatus, cause the apparatus to operate such that:

the at least one analog signal is generated as a result of a single exposure;

the second gain is applied to at least one other analog signal for generating the second gain-amplified analog signal, the at least one other analog signal is generated as a result of another single exposure;

the at least portion of the first gain-amplified digital signal is utilized to generate the at least portion of the first image, and the at least portion of the second gain-amplified digital signal is utilized to generate the at least portion of the second image.

281. The non-transitory computer-readable media of claim 260, wherein the instructions, when executed by the one or more circuits of the apparatus, cause the apparatus to operate such that: the at least one HDR image includes a first HDR image, and the at least portion of the first gain-amplified digital signal and the at least portion of the second gain-amplified digital signal are combined to generate at least a portion of the first HDR image.

282. The non-transitory computer-readable media of claim 260, wherein the instructions, when executed by the one or more circuits of the apparatus, cause the apparatus to operate such that: the at least one HDR image includes a first HDR image, the at least portion of the first gain-amplified digital signal and the at least portion of the second gain-amplified digital signal are combined to generate a second HDR image that is combined with the first HDR image, where at least a portion of the first HDR image and at least a portion of the second HDR image are combined for generating at least a portion of a resultant HDR image.

283. The non-transitory computer-readable media of claim 260, wherein the instructions, when executed by the one or more circuits of the apparatus, cause the apparatus to operate such that: at least one reset signal is generated between the generation of the first image and the second image.

284. The non-transitory computer-readable media of claim 260, wherein the instructions, when executed by the one or more circuits of the apparatus, cause the apparatus to operate such that: the at least portion of the first image is generated utilizing the first analog-to-digital channel without utilizing the second analog-to-digital channel for generating the at least portion of the first image.

285. The non-transitory computer-readable media of claim 260, wherein the instructions, when executed by the one or more circuits of the apparatus, cause the apparatus to operate such that: the at least portion of the first image is generated utilizing the first analog-to-digital channel and the second analog-to-digital channel.

286. An apparatus, comprising:

an image sensor including a plurality of cells including: a first cell having a first photodiode generating a first analog signal, and a second cell having a second photodiode generating a second analog signal, for being utilized to generate at least a portion of one or more line analog signals;

a line in communication with the plurality of cells, the line communicating the one or more line analog signals;

a first analog-to-digital channel in communication with the line, the first analog-to-digital channel capable of receiving at least one of the one or more line analog signals for conversion thereof to a first line digital signal;

a second analog-to-digital channel in communication with the line, the second analog-to-digital channel capable of receiving at least one of the one or more line analog signals for conversion thereof to a second line digital signal; and circuitry in communication with the first analog-to-digital channel and the second analog-to-digital channel, the circuitry capable of receiving at least one of the first line digital signal or the second line digital signal, for image generation;

wherein the apparatus is configured such that a first gain and a second gain are capable of being applied before the image generation, the first cell and the second cell of the image sensor correspond with a same color of light, and the apparatus is subject to:

for a first image, a first sampling for which the first analog signal and the second analog signal generated by the first and second cells corresponding with the same color of light are sampled and combined before at least one of the first gain or the second gain is applied thereto; and for a second image, a second sampling for which at least one of the first analog signal or the second analog signal is sampled such that the combining of the first analog signal and the second analog signal does not occur before at least one of the first gain or the second gain is applied thereto.

* * * * *